US009696719B2

(12) United States Patent
Aviel

(10) Patent No.: US 9,696,719 B2
(45) Date of Patent: Jul. 4, 2017

(54) SUPER LANDMARKS AS NAVIGATION AIDS

(71) Applicant: Mobileye Vision Technologies Ltd., Jerusalem (IL)

(72) Inventor: Yuval Aviel, Eshtaol (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 0 days.

(21) Appl. No.: 15/272,610

(22) Filed: Sep. 22, 2016

(65) Prior Publication Data

US 2017/0010104 A1    Jan. 12, 2017

Related U.S. Application Data

(63) Continuation of application No. PCT/US2016/017411, filed on Feb. 10, 2016.

(Continued)

(51) Int. Cl.
*G01C 21/32* (2006.01)
*G05D 1/00* (2006.01)
*G06F 17/30* (2006.01)
*B60W 30/18* (2012.01)
(Continued)

(52) U.S. Cl.
CPC ........... *G05D 1/0088* (2013.01); *B60W 30/18* (2013.01); *B62D 15/025* (2013.01); *G01C 21/14* (2013.01);
(Continued)

(58) Field of Classification Search
CPC ........ G01C 21/23; G01C 21/21; G01C 21/14; G01C 21/34; G01C 21/3476; G01C 21/36;
(Continued)

(56) References Cited

U.S. PATENT DOCUMENTS

2013/0332063 A1    12/2013  Pirwani et al.
2014/0244125 A1     8/2014  Dorum et al.
2016/0334796 A1*   11/2016  Inoue .................. G05D 1/0278

FOREIGN PATENT DOCUMENTS

EP          1 555 511 A1    7/2005

OTHER PUBLICATIONS

International Search Report and Written Opinion dated Aug. 23, 2016, issued by the European Patent Office in International Application No. PCT/US2016/017411 (21 pages).

* cited by examiner

*Primary Examiner* — Richard Camby
(74) *Attorney, Agent, or Firm* — Finnegan, Henderson, Farabow, Garrett & Dunner LLP

(57) ABSTRACT

Systems and methods are provided for autonomously navigating a vehicle along a road segment. In one implementation, a system includes at least one processor programmed to receive from a camera at least one image representative of an environment of the vehicle. The at least one image may be analyzed to identify at least one recognized landmark based upon one or more landmark group characteristics associated with a group of recognized landmarks. The current location of the vehicle relative to a predetermined road model trajectory associated with the road segment may be determined based, at least in part, on a predetermined location of the recognized landmark. An autonomous steering action for the vehicle may be determined based on a direction of the predetermined road model trajectory at the determined current location of the vehicle relative to the predetermined road model trajectory.

28 Claims, 109 Drawing Sheets

Related U.S. Application Data

(60) Provisional application No. 62/114,091, filed on Feb. 10, 2015, provisional application No. 62/164,055, filed on May 20, 2015, provisional application No. 62/170,728, filed on Jun. 4, 2015, provisional application No. 62/181,784, filed on Jun. 19, 2015, provisional application No. 62/192,576, filed on Jul. 15, 2015, provisional application No. 62/215,764, filed on Sep. 9, 2015, provisional application No. 62/219,733, filed on Sep. 17, 2015, provisional application No. 62/261,578, filed on Dec. 1, 2015, provisional application No. 62/261,598, filed on Dec. 1, 2015, provisional application No. 62/267,643, filed on Dec. 15, 2015, provisional application No. 62/269,818, filed on Dec. 18, 2015, provisional application No. 62/270,408, filed on Dec. 21, 2015, provisional application No. 62/270,418, filed on Dec. 21, 2015, provisional application No. 62/270,431, filed on Dec. 21, 2015, provisional application No. 62/271,103, filed on Dec. 22, 2015, provisional application No. 62/274,883, filed on Jan. 5, 2016, provisional application No. 62/274,968, filed on Jan. 5, 2016, provisional application No. 62/275,007, filed on Jan. 5, 2016, provisional application No. 62/275,046, filed on Jan. 5, 2016, provisional application No. 62/277,068, filed on Jan. 11, 2016.

(51) Int. Cl.

| | | |
|---|---|---|
| *G01C 21/14* | (2006.01) | |
| *G05D 1/02* | (2006.01) | |
| *G08G 1/0967* | (2006.01) | |
| *B62D 15/02* | (2006.01) | |
| *G08G 1/0962* | (2006.01) | |
| *G08G 1/16* | (2006.01) | |
| *G01C 21/34* | (2006.01) | |
| *G01C 21/36* | (2006.01) | |
| *G06K 9/00* | (2006.01) | |
| *G01C 21/16* | (2006.01) | |
| *G08G 1/01* | (2006.01) | |
| *H04L 29/08* | (2006.01) | |
| *G06T 7/00* | (2017.01) | |

(52) U.S. Cl.
CPC .......... *G01C 21/165* (2013.01); *G01C 21/32* (2013.01); *G01C 21/34* (2013.01); *G01C 21/3476* (2013.01); *G01C 21/36* (2013.01); *G01C 21/3623* (2013.01); *G01C 21/3691* (2013.01); *G05D 1/0212* (2013.01); *G05D 1/0246* (2013.01); *G05D 1/0278* (2013.01); *G05D 1/0287* (2013.01); *G06F 17/30241* (2013.01); *G06F 17/30377* (2013.01); *G06K 9/00791* (2013.01); *G06K 9/00798* (2013.01); *G08G 1/0112* (2013.01); *G08G 1/09623* (2013.01); *G08G 1/096725* (2013.01); *G08G 1/167* (2013.01); *B60W 2420/42* (2013.01); *B60W 2550/22* (2013.01); *B60W 2720/10* (2013.01); *G06T 7/00* (2013.01); *G06T 2207/20081* (2013.01); *G06T 2207/30256* (2013.01); *G06T 2207/30261* (2013.01); *H04L 67/12* (2013.01)

(58) Field of Classification Search
CPC .............. G01C 21/3623; G01C 21/165; G01C 21/3691; G01C 21/3644; G01C 21/3407; G06F 17/30241; G06F 17/30377; G05D 1/0088; G05D 1/0278; G05D 1/0212; G05D 1/0246; G05D 1/0287; G05D 1/0251; G05D 1/0253; G05D 2201/0213; G05D 1/0221; B60W 30/18; B60W 3420/42; B60W 2550/22; B60W 2720/10; B60W 30/14; B60W 2710/18; B60W 2710/20; G08G 1/096725; G08G 1/09623; G08G 1/167; G08G 1/0112; G08G 1/096805; H04L 67/12
See application file for complete search history.

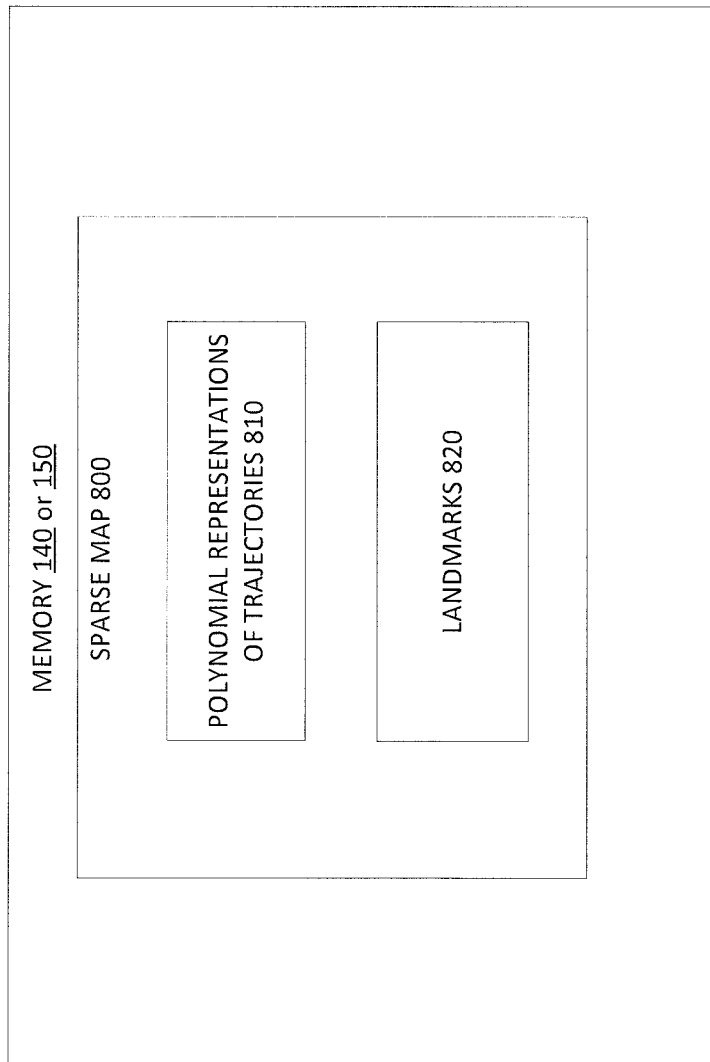

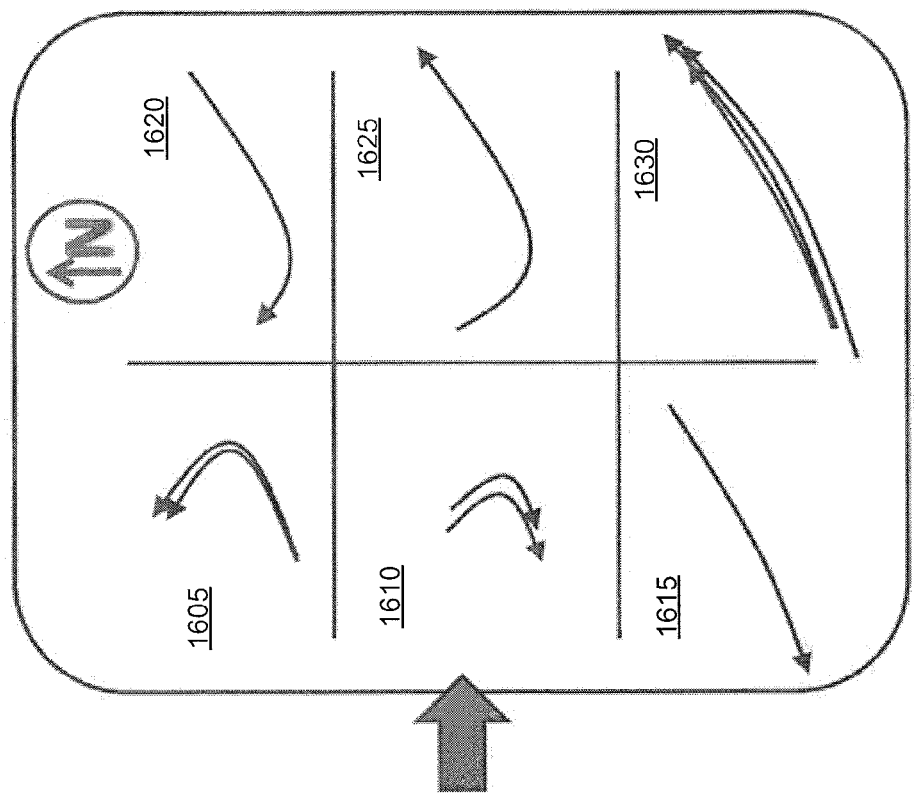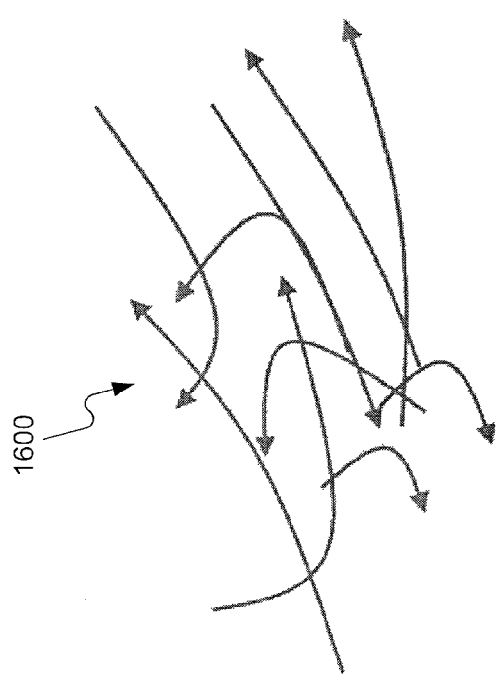
FIG. 16

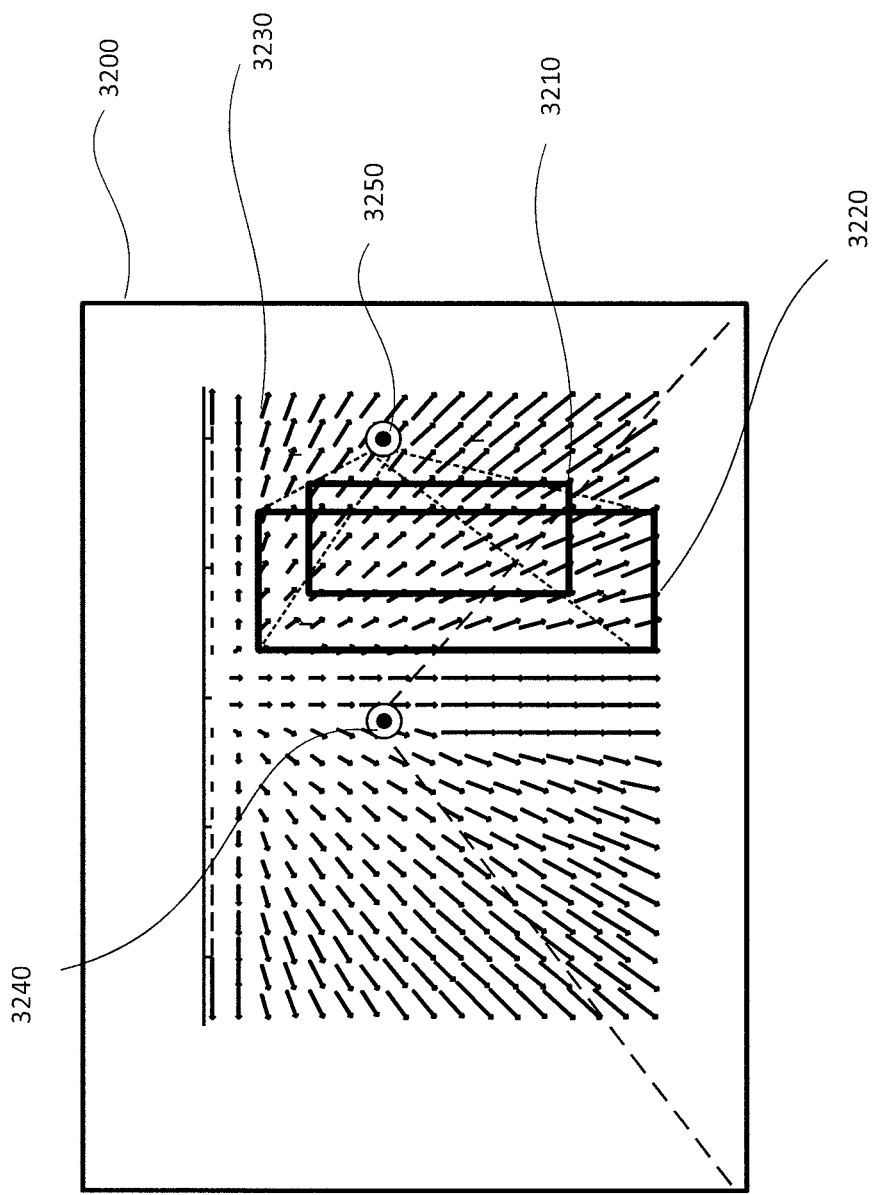

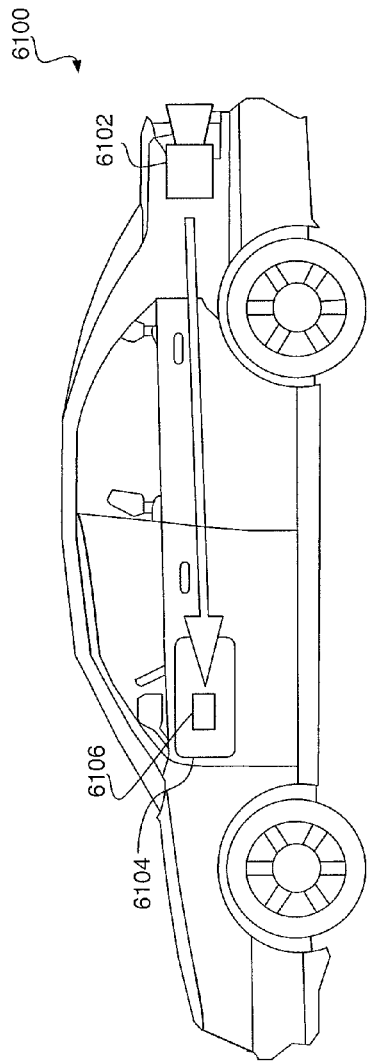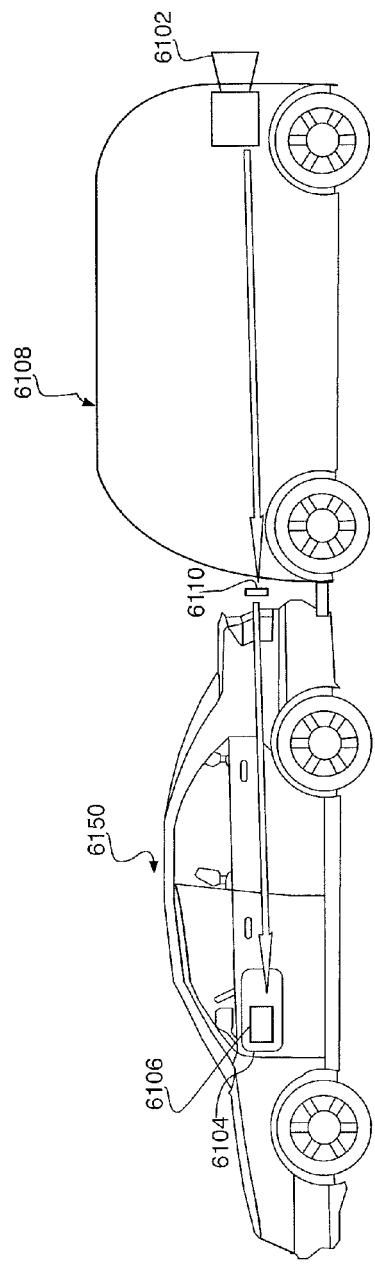
FIG. 61A
FIG. 61B

6500

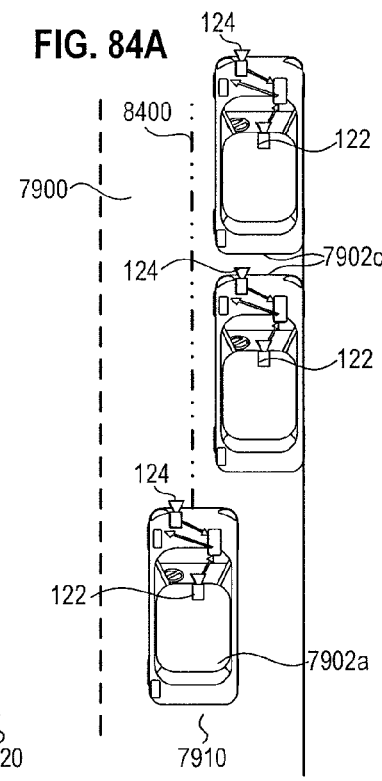
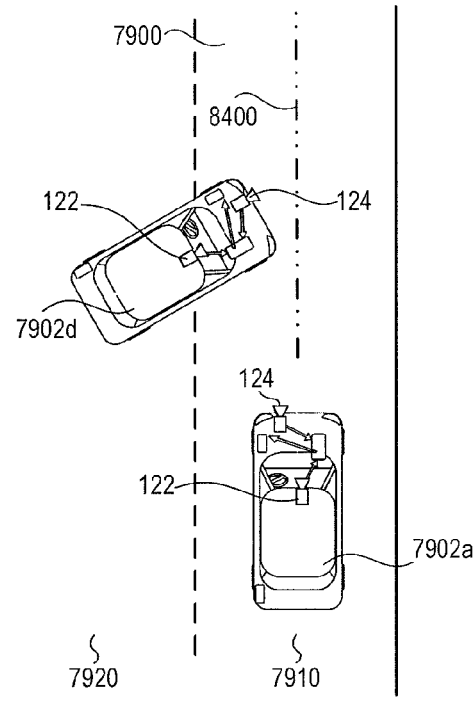
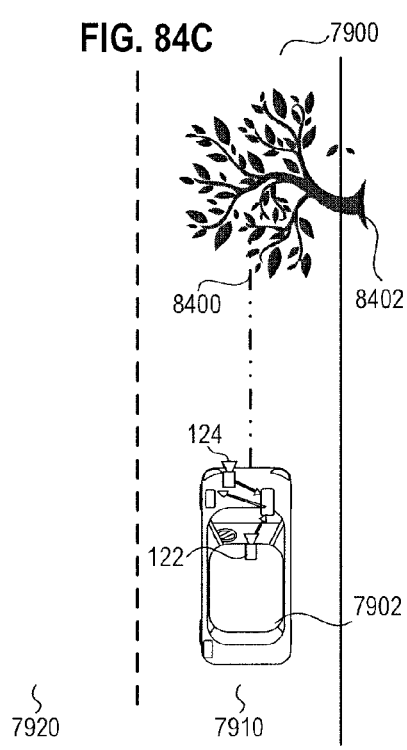
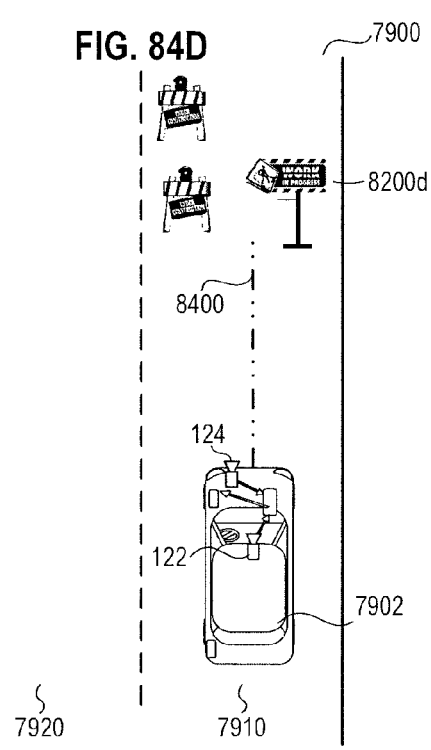

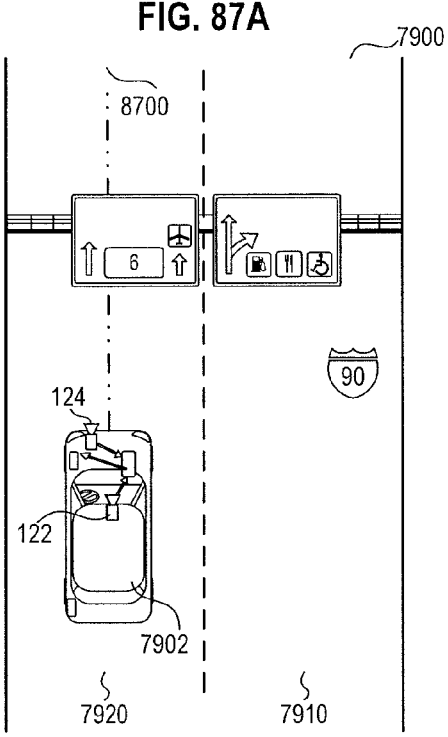
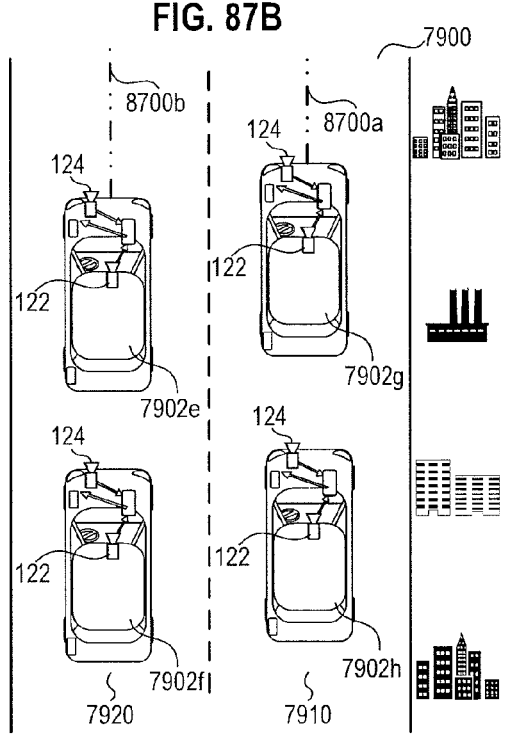
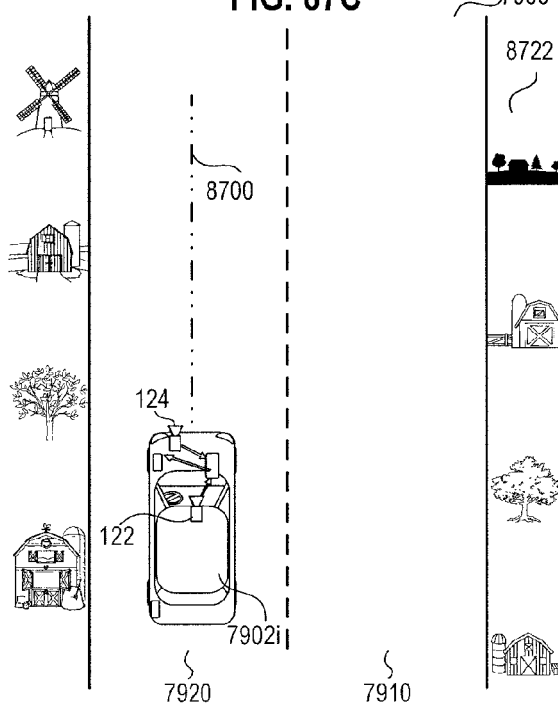
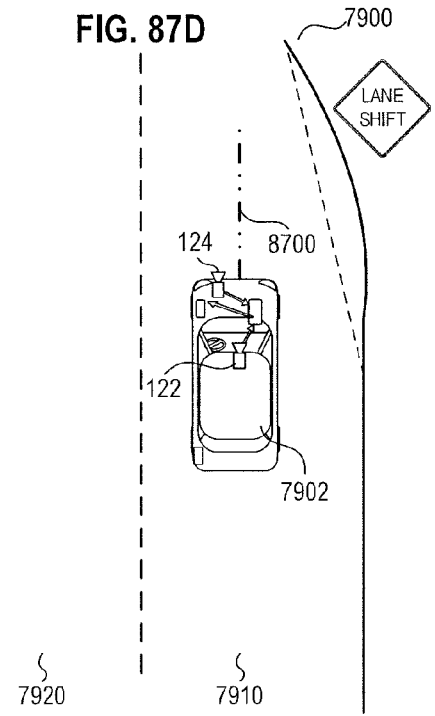

SUPER LANDMARKS AS NAVIGATION AIDS

CROSS REFERENCES TO RELATED APPLICATIONS

This application claims is a continuation of and claims priority to International Application No. PCT/US2016/017411, filed Feb. 10, 2016, which claims the benefit of priority of U.S. Provisional Patent Application No. 62/114,091, filed on Feb. 10, 2015; U.S. Provisional Patent Application No. 62/164,055, filed on May 20, 2015; U.S. Provisional Patent Application No. 62/170,728, filed on Jun. 4, 2015; U.S. Provisional Patent Application No. 62/181,784, filed on Jun. 19, 2015; U.S. Provisional Patent Application No. 62/192,576, filed on Jul. 15, 2015; U.S. Provisional Patent Application No. 62/215,764, filed on Sep. 9, 2015; U.S. Provisional Patent Application No. 62/219,733, filed on Sep. 17, 2015; U.S. Provisional Patent Application No. 62/261,578, filed on Dec. 1, 2015; U.S. Provisional Patent Application No. 62/261,598, filed on Dec. 1, 2015; U.S. Provisional Patent Application No. 62/267,643, filed on Dec. 15, 2015; U.S. Provisional Patent Application No. 62/269,818, filed on Dec. 18, 2015; U.S. Provisional Patent Application No. 62/270,408, filed on Dec. 21, 2015; U.S. Provisional Patent Application No. 62/270,418, filed on Dec. 21, 2015; U.S. Provisional Patent Application No. 62/270,431, filed on Dec. 21, 2015; U.S. Provisional Patent Application No. 62/271,103, filed on Dec. 22, 2015; U.S. Provisional Patent Application No. 62/274,883, filed on Jan. 5, 2016; U.S. Provisional Patent Application No. 62/274,968, filed on Jan. 5, 2016; U.S. Provisional Patent Application No. 62/275,007, filed on Jan. 5, 2016; U.S. Provisional Patent Application No. 62/275,046, filed on Jan. 5, 2016; and U.S. Provisional Patent Application No. 62/277,068, filed on Jan. 11, 2016. All of the foregoing applications are incorporated herein by reference in their entirety.

BACKGROUND

Technical Field

The present disclosure relates generally to autonomous vehicle navigation and a sparse map for autonomous vehicle navigation. Additionally, this disclosure relates to systems and methods for constructing, using, and updating the sparse map for autonomous vehicle navigation.

Background Information

As technology continues to advance, the goal of a fully autonomous vehicle that is capable of navigating on roadways is on the horizon. Autonomous vehicles may need to take into account a variety of factors and make appropriate decisions based on those factors to safely and accurately reach an intended destination. For example, an autonomous vehicle may need to process and interpret visual information (e.g., information captured from a camera) and may also use information obtained from other sources (e.g., from a GPS device, a speed sensor, an accelerometer, a suspension sensor, etc.). At the same time, in order to navigate to a destination, an autonomous vehicle may also need to identify its location within a particular roadway (e.g., a specific lane within a multi-lane road), navigate alongside other vehicles, avoid obstacles and pedestrians, observe traffic signals and signs, and travel from on road to another road at appropriate intersections or interchanges. Harnessing and interpreting vast volumes of information collected by an autonomous vehicle as it travels to its destination poses a multitude of design challenges. The sheer quantity of data (e.g., captured image data, map data, GPS data, sensor data, etc.) that an autonomous vehicle may need to analyze, access, and/or store poses challenges that can in fact limit or even adversely affect autonomous navigation. Furthermore, if an autonomous vehicle relies on traditional mapping technology to navigate, the sheer volume of data needed to store and update the map poses daunting challenges.

SUMMARY

Embodiments consistent with the present disclosure provide systems and methods for autonomous vehicle navigation. The disclosed embodiments may use cameras to provide autonomous vehicle navigation features. For example, consistent with the disclosed embodiments, the disclosed systems may include one, two, or more cameras that monitor the environment of a vehicle. The disclosed systems may provide a navigational response based on, for example, an analysis of images captured by one or more of the cameras. The navigational response may also take into account other data including, for example, global positioning system (GPS) data, sensor data (e.g., from an accelerometer, a speed sensor, a suspension sensor, etc.), and/or other map data.

In some embodiments, the disclosed systems and methods may use a sparse map for autonomous vehicle navigation. For example, the sparse map may provide sufficient information for navigation without requiring excessive data storage.

In other embodiments, the disclosed systems and methods may construct a road model for autonomous vehicle navigation. For example, the disclosed systems and methods may use crowd sourced data for autonomous vehicle navigation including recommended trajectories. As other examples, the disclosed systems and methods may identify landmarks in an environment of a vehicle and refine landmark positions.

In yet other embodiments, the disclosed systems and methods may use a sparse road model for autonomous vehicle navigation. For example, the disclosed systems and methods may provide navigation based on recognized landmarks, align a vehicle's tail for navigation, allow a vehicle to navigate road junctions, allow a vehicle to navigate using local overlapping maps, allow a vehicle to navigate using a sparse map, navigate based on an expected landmark location, autonomously navigate a road based on road signatures, provide forward navigation based on a rearward facing camera, navigate based on a free space determination, navigate in snow, provide autonomous vehicle speed calibration, determine lane assignment based on a recognized landmark location, and use super landmarks as navigation aids.

In still yet other embodiments, the disclosed systems and methods may provide adaptive autonomous navigation. For example, disclosed systems and methods may provide adaptive navigation based on user intervention, provide self-aware adaptive navigation, provide an adaptive road model manager, and manage a road model based on selective feedback.

In some embodiments, a non-transitory computer-readable medium may include a sparse map for autonomous vehicle navigation along a road segment. The sparse map may include a polynomial representation of a target trajectory for the autonomous vehicle along the road segment; and a plurality of predetermined landmarks associated with the road segment, wherein the plurality of predetermined landmarks may be spaced apart by at least 50 meters, and wherein the sparse map may have a data density of no more than 1 megabyte per kilometer.

In some embodiments of the non-transitory computer-readable medium, the polynomial representation may be a three-dimensional polynomial representation. The polynomial representation of the target trajectory may be determined based on two or more reconstructed trajectories of prior traversals of vehicles along the road segment. The plurality of predetermined landmarks may include a traffic sign represented in the sparse map by no more than 50 bytes of data. The plurality of predetermined landmarks may include a directional sign represented in the sparse map by no more than 50 bytes of data. The plurality of predetermined landmarks may include a general purpose sign represented in the sparse map by no more than 100 bytes of data. The plurality of predetermined landmarks may include a generally rectangular object represented in the sparse map by no more than 100 bytes of data. The representation of the generally rectangular object in the sparse map may include a condensed image signature associated with the generally rectangular object. The plurality of predetermined landmarks may be represented in the sparse map by parameters including landmark size, distance to previous landmark, landmark type, and landmark position. The plurality of predetermined landmarks included in the sparse map may be spaced apart by at least 2 kilometers. The plurality of predetermined landmarks included in the sparse map may be spaced apart by at least 1 kilometer. The plurality of predetermined landmarks included in the sparse map may be spaced apart by at least 100 meters. The sparse map may have a data density of no more than 100 kilobytes per kilometer. The sparse map may have a data density of no more than 10 kilobytes per kilometer. The plurality of predetermined landmarks may appear in the sparse map at a rate that is above a rate sufficient to maintain a longitudinal position determination accuracy within 1 meter.

In some embodiments, an autonomous vehicle may include a body; and a non-transitory computer-readable medium that may include a sparse map for autonomous vehicle navigation along a road segment. The sparse map may include a polynomial representation of a target trajectory for the autonomous vehicle along the road segment; and a plurality of predetermined landmarks associated with the road segment, wherein the plurality of predetermined landmarks are spaced apart by at least 50 meters, and wherein the sparse map has a data density of no more than 1 megabyte per kilometer. The autonomous vehicle may include a processor configured to execute data included in the sparse map for providing autonomous vehicle navigation along the road segment.

In some embodiments of the autonomous vehicle, the polynomial representation may be a three-dimensional polynomial representation. The polynomial representation of the target trajectory may be determined based on two or more reconstructed trajectories of prior traversals of vehicles along the road segment.

In some embodiments, an autonomous vehicle may include a body; and a processor configured to receive data included in a sparse map and execute the data for autonomous vehicle navigation along a road segment. The sparse map may include a polynomial representation of a target trajectory for the autonomous vehicle along the road segment; and a plurality of predetermined landmarks associated with the road segment, wherein the plurality of predetermined landmarks are spaced apart by at least 50 meters, and wherein the sparse map has a data density of no more than 1 megabyte per kilometer.

In some embodiments, a method of processing vehicle navigation information for use in autonomous vehicle navigation may include receiving, by a server, navigation information from a plurality of vehicles. The navigation information from the plurality of vehicles may be associated with a common road segment. The method may include storing, by the server, the navigation information associated with the common road segment. The method may include generating, by the server, at least a portion of an autonomous vehicle road navigation model for the common road segment based on the navigation information from the plurality of vehicles; and distributing, by the server, the autonomous vehicle road navigation model to one or more autonomous vehicles for use in autonomously navigating the one or more autonomous vehicles along the common road segment.

In some embodiments of the method, the navigation information may include a trajectory from each of the plurality of vehicles as each vehicle travels over the common road segment. The trajectory may be determined based on sensed motion of a camera, including three-dimensional translation and three-dimensional rotational motions. The navigation information may include a lane assignment. Generating at least a portion of the autonomous vehicle road navigation model may include clustering vehicle trajectories along the common road segment and determining a target trajectory along the common road segment based on the clustered vehicle trajectories. The autonomous vehicle road navigation model may include a three-dimensional spline corresponding to the target trajectory along the common road segment. The target trajectory may be associated with a single lane of the common road segment. The autonomous vehicle road navigation model may include a plurality of target trajectories, each associated with a separate lane of the common road segment. Determining the target trajectory along the common road segment based on the clustered vehicle trajectories may include finding a mean or average trajectory based on the clustered vehicle trajectories. The target trajectory may be represented by a three-dimensional spline. The spline may be defined by less than 10 kilobytes per kilometer. The autonomous vehicle road navigation model may include identification of at least one landmark, including a position of the at least one landmark. The position of the at least one landmark may be determined based on position measurements performed using sensor systems associated with the plurality of vehicles. The position measurements may be averaged to obtain the position of the at least one landmark. The at least one landmark may include at least one of a traffic sign, an arrow marking, a lane marking, a dashed lane marking, a traffic light, a stop line, a directional sign, a landmark beacon, or a lamppost.

In some embodiments, a navigation system for a vehicle may include at least one processor programmed to receive from a camera, at least one environmental image associated with the vehicle; analyze the at least one environmental image to determine navigation information related to the vehicle; transmit the navigation information from the vehicle to a server. The at least one processor may be programmed to receive, from the server, an autonomous vehicle road navigation model. The autonomous vehicle road navigation model may include at least one update based on the transmitted navigation information. The at least one processor may be programmed to cause at least one navigational maneuver by the vehicle based on the autonomous vehicle road navigation model.

In some embodiments of the navigation system, the navigation information may include a trajectory from each of the plurality of vehicles as each vehicle travels over the common road segment.

In some embodiments, a server for processing vehicle navigation information for use in autonomous vehicle navigation may include a communication unit configured to communicate with a plurality of vehicles; and at least one processor programmed to receive, via the communication unit, the navigation information from the vehicles. The at least one processor may be programmed to generate at least a portion of an autonomous vehicle road navigation model based on the navigation information; and transmit at least the portion of the autonomous vehicle road navigation model to at least one of the vehicles to cause a navigational maneuver by the at least one of the vehicles based on the portion of the autonomous vehicle road navigation model.

In some embodiments of the server, the navigation information may include a trajectory from each of the plurality of vehicles as each vehicle travels over the common road segment. The portion of autonomous vehicle road navigation model may include an update to the autonomous vehicle road navigation model.

In some embodiments, a navigation system for a vehicle may include at least one processor programmed to receive, from one or more sensors, outputs indicative of a motion of the vehicle; determine an actual trajectory of the vehicle based on the outputs from the one or more sensors; receive, from a camera, at least one environmental image associated with the vehicle; analyze the at least one environmental image to determine information associated with at least one navigational constraint; determine a target trajectory, including the actual trajectory of the vehicle and one or more modifications to the actual trajectory based on the determined information associated with the at least one navigational constraint; and transmit the target trajectory from the vehicle to a server.

In some embodiments of the system, the one or more sensors may include a speed sensor. The one or more sensors may include an accelerometer. The one or more sensors may include the camera. The at least one navigational constraint may include at least one of a barrier, an object, a lane marking, a sign, or another vehicle. The camera may be included in the vehicle.

In some embodiments, a method of uploading a target trajectory to a server may include receiving, from one or more sensors, outputs indicative of a motion of a vehicle; determining an actual trajectory of the vehicle based on the outputs from the one or more sensors; receiving, from a camera, at least one environmental image associated with the vehicle; analyzing the at least one environmental image to determine information associated with at least one navigational constraint; determining a target trajectory, including the actual trajectory of the vehicle and one or more modifications to the actual trajectory based on the determined information associated with the at least one navigational constraint; and transmitting the target trajectory from the vehicle to a server.

In some embodiments of the method, the one or more sensors may include a speed sensor. The one or more sensors may include an accelerometer. The one or more sensors may include the camera. The at least one navigational constraint may include at least one of a barrier, an object, a lane marking, a sign, or another vehicle. The camera may be included in the vehicle.

In some embodiments, a system for identifying a landmark for use in autonomous vehicle navigation may include at least one processor programmed to: receive at least one identifier associated with the landmark; associate the landmark with a corresponding road segment; update an autonomous vehicle road navigation model relative to the corresponding road segment to include the at least one identifier associated with the landmark; and distribute the updated autonomous vehicle road navigation model to a plurality of autonomous vehicles. The at least one identifier may be determined based on acquisition, from a camera associated with a host vehicle, of at least one image representative of an environment of the host vehicle; analysis of the at least one image to identify the landmark in the environment of the host vehicle; and analysis of the at least one image to determine the at least one identifier associated with the landmark.

In some embodiments of the system, the at least one identifier may include a position of the landmark. The at least one identifier may include a shape of the landmark. The at least one identifier may include a size of the landmark. The at least one identifier may include a distance of the landmark relative to another landmark. The at least one identifier may be determined based on the landmark being identified as one of a plurality of landmark types. The landmark types may include a traffic sign. The landmark types may include a post. The landmark types may include a directional indicator. The landmark types may include a rectangular sign. The at least one identifier further may include a condensed signature representation. The condensed signature representation of the landmark may be determined based on mapping an image of the landmark to a sequence of numbers of a predetermined data size. The condensed signature representation may indicate an appearance of the landmark. The condensed signature representation may indicate at least one of a color pattern of an image of the landmark or a brightness pattern of the image. The landmark may include at least one of a directional sign, a traffic sign, a lamppost, a road marking, and a business sign.

In some embodiments, a method of identifying a landmark for use in autonomous vehicle navigation may include receiving at least one identifier associated with the landmark; associating the landmark with a corresponding road segment; updating an autonomous vehicle road navigation model relative to the corresponding road segment to include the at least one identifier associated with the landmark; and distributing the updated autonomous vehicle road navigation model to a plurality of autonomous vehicles.

In some embodiments, the method may include determining the at least one identifier. Determining the at least one identifier may include acquiring, from a camera associated with a host vehicle, at least one image representative of an environment of the host vehicle; analyzing the at least one image to identify the landmark in the environment of the host vehicle; and analyzing the at least one image to determine the at least one identifier associated with the landmark. The at least one identifier may include a distance of the landmark relative to another landmark, and wherein determining the at least one identifier includes determining a distance of the landmark relative to another landmark. The at least one identifier may further include a condensed signature representation, and wherein determining the at least one identifier includes determining the condensed signature representation from the at least one image.

In some embodiments, a system for determining a location of a landmark for use in navigation of an autonomous vehicle may include at least one processor programmed to: receive a measured position of the landmark; and determine a refined position of the landmark based on the measured position of the landmark and at least one previously acquired position for the landmark. The measured position and the at least one previously acquired position may be determined based on acquisition, from a camera associated with a host vehicle, of at least one environmental image associated with the host vehicle, analysis of the at least one environmental image to identify the landmark in the environment of the host vehicle, reception of global positioning system (GPS) data representing a location of the host vehicle, analysis of the at least one environmental image to determine a relative position of the identified landmark with respect to the host vehicle, and determination of a globally localized position of the landmark based on at least the GPS data and the determined relative position.

In some embodiments of the system, the landmark may include at least one of a traffic sign, an arrow, a lane marking, a dashed lane marking, a traffic light, a stop line, a directional sign, a landmark beacon, or a lamppost. Analysis of the at least one image to determine the relative position of the identified landmark with respect to the vehicle may include calculating a distance based on a scale associated with the at least one image. Analyzing the at least one image to determine the relative position of the identified landmark with respect to the vehicle may include calculating a distance based on an optical flow associated with the at least one image. The GPS data may be received from a GPS device included in the host vehicle. The camera may be included in the host vehicle. Determining the refined position of the landmark may include averaging the measured position of the landmark with the at least one previously acquired position.

In some embodiments, a method for determining a location of a landmark for use in navigation of an autonomous vehicle may include receiving a measured position of the landmark; and determining a refined position of the landmark based on the measured position of the landmark and at least one previously acquired position for the landmark. The measured position and the at least one previously acquired position may be determined based on acquisition, from a camera associated with a host vehicle, of at least one environmental image associated with the host vehicle, analysis of the at least one environmental image to identify the landmark in the environment of the host vehicle, reception of global positioning system (GPS) data representing a location of the host vehicle, analysis of the at least one environmental image to determine a relative position of the identified landmark with respect to the host vehicle, and determination of a globally localized position of the landmark based on at least the GPS data and the determined relative position.

In some embodiments of the method, the landmark may include at least one of a traffic sign, an arrow, a lane marking, a dashed lane marking, a traffic light, a stop line, a directional sign, a landmark beacon, or a lamppost. Analysis of the at least one image to determine the relative position of the identified landmark with respect to the vehicle may include calculating a distance based on a scale associated with the at least one image. Analysis of the at least one image to determine the relative position of the identified landmark with respect to the vehicle may include calculating a distance based on an optical flow associated with the at least one image. The GPS data may be received from a GPS device included in the host vehicle. The camera may be included in the host vehicle. Determining the refined position of the landmark may include averaging the measured position of the landmark with the at least one previously acquired position.

In some embodiments, an autonomous vehicle may include a body and at least one processor programmed to receive a measured position of the landmark; and determine a refined position of the landmark based on the measured position of the landmark and at least one previously acquired position for the landmark. The at least one processor may be further programmed to determine the measured position and the at least one previously acquired position based on acquisition, from a camera associated with the vehicle, of at least one environmental image associated with the vehicle, analysis of the at least one environmental image to identify the landmark in the environment of the vehicle, reception of global positioning system (GPS) data representing a location of the vehicle, analysis of the at least one environmental image to determine a relative position of the identified landmark with respect to the vehicle, and determination of a globally localized position of the landmark based on at least the GPS data and the determined relative position.

In some embodiments of the vehicle, the landmark may include at least one of a traffic sign, an arrow, a lane marking, a dashed lane marking, a traffic light, a stop line, a directional sign, a landmark beacon, or a lamppost. Analysis of the at least one image to determine the relative position of the identified landmark with respect to the vehicle may include calculating a distance based on a scale associated with the at least one image. Analyzing the at least one image to determine the relative position of the identified landmark with respect to the vehicle may include calculating a distance based on an optical flow associated with the at least one image. The GPS data may be received from a GPS device included in the host vehicle. Determining the refined position of the landmark may include averaging the measured position of the landmark with the at least one previously acquired position In some embodiments, a system for autonomously navigating a vehicle along a road segment may include at least one processor programmed to: receive from an image capture device at least one image representative of an environment of the vehicle; analyze the at least one image to identify at least one recognized landmark; determine a current location of the vehicle relative to a predetermined road model trajectory associated with the road segment based, at least in part, on a predetermined location of the recognized landmark; and determine an autonomous steering action for the vehicle based on a direction of the predetermined road model trajectory at the determined current location of the vehicle relative to the predetermined road model trajectory.

In some embodiments of the system, the recognized landmark may include at least one of a traffic sign, an arrow marking, a lane marking, a dashed lane marking, a traffic light, a stop line, a directional sign, a reflector, a landmark beacon, or a lamppost. The recognized landmark may include a change in spacing of lines on the road segment. The recognized landmark may include a sign for a business. The predetermined road model trajectory may include a three-dimensional polynomial representation of a target trajectory along the road segment. Navigation between recognized landmarks may include integration of vehicle velocity to determine a location of the vehicle along the predetermined road model trajectory. The processor may be further programmed to adjust a steering system of the vehicle based on the autonomous steering action to navigate the vehicle. The processor may be further programmed to: determine a distance of the vehicle from the at least one recognized landmark; and determine whether the vehicle is positioned on the predetermined road model trajectory associated with the road segment based on the distance. The processor may be further programmed to adjust the steering system of the vehicle to move the vehicle from a current position of the vehicle to a position on the predetermined road model trajectory when the vehicle is not positioned on the predetermined road model trajectory.

In some embodiments, a vehicle may include a body; at least one image capture device configured to acquire at least one image representative of an environment of the vehicle; and at least one processor programmed to: receive from the at least one image capture device the at least one image; analyze the at least one image to identify at least one recognized landmark; determine a current location of the vehicle relative to a predetermined road model trajectory associated with the road segment based, at least in part, on a predetermined location of the recognized landmark; and determine an autonomous steering action for the vehicle based on a direction of the predetermined road model trajectory at the determined current location of the vehicle relative to the predetermined road model trajectory.

In some embodiments of the vehicle, the recognized landmark may include at least one of a traffic sign, an arrow marking, a lane marking, a dashed lane marking, a traffic light, a stop line, a directional sign, a reflector, a landmark beacon, a lamppost, a change is spacing of lines on the road, or a sign for a business. The predetermined road model trajectory may include a three-dimensional polynomial representation of a target trajectory along the road segment. Navigation between recognized landmarks may include integration of vehicle velocity to determine a location of the vehicle along the predetermined road model trajectory. The processor may be further programmed to adjust the steering system of the vehicle based on the autonomous steering action to navigate the vehicle. The processor may be further programmed to: determine a distance of the vehicle from the at least one recognized landmark; and determine whether the vehicle is positioned on the predetermined road model trajectory associated with the road segment based on the distance. The processor may be further programmed to adjust the steering system of the vehicle to move the vehicle from a current position of the vehicle to a position on the predetermined road model trajectory when the vehicle is not positioned on the predetermined road model trajectory.

In some embodiments, a method of navigating a vehicle may include receiving, from an image capture device associated with the vehicle, at least one image representative of an environment of the vehicle; analyzing, using a processor associated with the vehicle, the at least one image to identify at least one recognized landmark; determining a current position of the vehicle relative to a predetermined road model trajectory associated with the road segment based, at least in part, on a predetermined location of the recognized landmark; determining an autonomous steering action for the vehicle based on a direction of the predetermined road model trajectory at the determined current location of the vehicle relative to the predetermined road model trajectory; and adjusting a steering system of the vehicle based on the autonomous steering action to navigate the vehicle.

In some embodiments, the method may include determining a location of the vehicle along the predetermined road model trajectory by integrating the vehicle velocity. The method may include determining, using the processor, a distance of the vehicle from the at least one recognized landmark; and determining whether the vehicle is positioned on the predetermined road model trajectory associated with the road segment based on the distance. The method may include determining a transformation required to move the vehicle from a current position of the vehicle to a position on the predetermined road model trajectory; and adjusting the steering system of the vehicle based on the transformation.

In some embodiments, a system for autonomously navigating an autonomous vehicle along a road segment may include at least one processor programmed to receive from an image capture device, a plurality of images representative of an environment of the autonomous vehicle; determine a traveled trajectory of the autonomous vehicle along the road segment based, at least in part, on analysis of one or more of the plurality of images; determine a current location of the autonomous vehicle along a predetermined road model trajectory based on analysis of one or more of the plurality of images; determine a heading direction for the autonomous vehicle based on the determined traveled trajectory; and determine a steering direction for the autonomous vehicle, relative to the heading direction, by comparing the traveled trajectory to the predetermined road model trajectory at the current location of the autonomous vehicle.

In some embodiments of the system, the comparison between the traveled trajectory and the predetermined road model trajectory may include determination of a transformation that reduces an error between the traveled trajectory and the predetermined road model trajectory. The processor may be further programmed to adjust the steering system of the autonomous vehicle based on the transformation. The predetermined road model trajectory may include a three-dimensional polynomial representation of a target trajectory along the road segment. The predetermined road model trajectory may be retrieved from a database stored in a memory included in the autonomous vehicle. The predetermined road model trajectory may be retrieved from a database accessible to the autonomous vehicle over a wireless communications interface. The image capture device may be included in the autonomous vehicle. Determination of the steering direction may be further based on one or more additional cues, including one or more of a left lane mark polynomial model, a right lane mark polynomial model, holistic path prediction, motion of a forward vehicle, determined free space ahead of the autonomous vehicle, and virtual lanes or virtual lane constraints determined based on positions of vehicles forward of the autonomous vehicle. Determination of the steering direction may be based on weights applied to the one or more additional cues.

In some embodiments, an autonomous vehicle may include a body; at least one image capture device configured to acquire at least one image representative of an environment of the autonomous vehicle; and at least one processor programmed to: receive from the image capture device, a plurality of images representative of the environment of the autonomous vehicle; determine a traveled trajectory of the autonomous vehicle along the road segment based, at least in part, on analysis of one or more of the plurality of images; determine a current location of the autonomous vehicle along a predetermined road model trajectory based on analysis of one or more of the plurality of images; determine a heading direction for the autonomous vehicle based on the determined traveled trajectory; and determine a steering direction for the autonomous vehicle, relative to the heading direction, by comparing the traveled trajectory to the predetermined road model trajectory at the current location of the autonomous vehicle.

In some embodiments of the autonomous vehicle, the comparison between the traveled trajectory and the predetermined road model trajectory may include determination of a transformation that reduces an error between the traveled trajectory and the predetermined road model trajectory. The predetermined road model trajectory may include a three-dimensional polynomial representation of a target trajectory along the road segment. The predetermined road model trajectory may be retrieved from one of a database stored in a memory included in the autonomous vehicle and a database accessible to the autonomous vehicle over a wireless communications interface. Determination of the steering direction may be further based on one or more additional cues, including one or more of a left lane mark polynomial model, a right lane mark polynomial model, holistic path prediction, motion of a forward vehicle, determined free space ahead of the autonomous vehicle, and virtual lanes or virtual lane constraints determined based on positions of vehicles forward of the autonomous vehicle. Determination of the steering direction may be based on weights applied to the one or more additional cues In some embodiments, a method of navigating an autonomous vehicle may include receiving, from an image capture device, a plurality of images representative of an environment of the autonomous vehicle; determining a traveled trajectory of the autonomous vehicle along the road segment based, at least in part, on analysis of one or more of the plurality of images; determining a current location of the autonomous vehicle along a predetermined road model trajectory based on analysis of one or more of the plurality of images; determining a heading direction for the autonomous vehicle based on the determined traveled trajectory; and determining a steering direction for the autonomous vehicle, relative to the heading direction, by comparing the traveled trajectory to the predetermined road model trajectory at the current location of the autonomous vehicle.

In some embodiments of the method, comparing the traveled trajectory to the predetermined road model trajectory may include determining a transformation that reduces an error between the traveled trajectory and the predetermined road model trajectory. Determining a steering direction may be based on one or more additional cues, including one or more of a left lane mark polynomial model, a right lane mark polynomial model, holistic path prediction, motion of a forward vehicle, determined free space ahead of the autonomous vehicle, and virtual lanes or virtual lane constraints determined based on positions of vehicles forward of the autonomous vehicle. Determining the steering direction may include applying weights to the one or more additional cues.

In some embodiments, a system for autonomously navigating a vehicle through a road junction may include at least one processor programmed to: receive from an image capture device at least one image representative of an environment of the vehicle; analyze the at least one image to identify two or more landmarks located in the environment of the vehicle; determine, for each of the two or more landmarks, a directional indicator relative to the vehicle; determine a current location of the vehicle relative to the road junction based on an intersection of the directional indicators for the two or more landmarks; determine a heading for the vehicle based on the directional indicators for the two or more landmarks; and determine a steering angle for the vehicle by comparing the vehicle heading with a predetermined road model trajectory at the current location of the vehicle.

In some embodiments of the system, the predetermined road model trajectory may include a three-dimensional polynomial representation of a target trajectory along the road segment. The two or more landmarks may include three or more landmarks. The at least one processor may be further programmed to transmit a control signal specifying the steering angle to a steering system of the vehicle. The processor may be configured to retrieve the predetermined road model trajectory from a database stored in a memory included in the vehicle. The processor may be configured to retrieve the predetermined road model trajectory from a database accessible to the vehicle over a wireless communications interface. The camera may be included in the vehicle. The processor may be further programmed to determine the heading for the vehicle by: determining a previous location of the vehicle relative to the road junction based on the intersection of the directional indicators for the two or more landmarks; and determining the heading based on the previous location and the current location.

In some embodiments, an autonomous vehicle may include a body; at least one image capture device configured to acquire at least one image representative of an environment of the vehicle; and at least one processor programmed to: receive from a camera at least one image representative of an environment of the vehicle; analyze the at least one image to identify two or more landmarks located in the environment of the vehicle; determine, for each of the two or more landmarks, a directional indicator relative to the vehicle; determine a current location of the vehicle relative to the road junction based on an intersection of the directional indicators for the two or more landmarks; determine a heading for the vehicle based on the directional indicators for the two or more landmarks; and determine a steering angle for the vehicle by comparing the vehicle heading with a predetermined road model trajectory at the current location of the vehicle.

In some embodiments of the vehicle, the predetermined road model trajectory may include a three-dimensional polynomial representation of a target trajectory along the road segment. The two or more landmarks may include three or more landmarks. The at least one processor may be further programmed to transmit a control signal specifying the steering angle to a steering system of the vehicle. The predetermined road model trajectory may be retrieved from one of a database stored in a memory included in the vehicle and a database accessible to the vehicle over a wireless communications interface. The processor may be further programmed to determine a heading for the vehicle by: determining a previous location of the vehicle relative to the road junction based on the intersection of the directional indicators for the two or more landmarks; and determining the heading based on the previous location and the current location.

In some embodiments, a method of navigating an autonomous vehicle may include receiving, from an image capture device, at least one image representative of an environment of the vehicle; analyzing, using at least one processor, the at least one image to identify two or more landmarks located in the environment of the vehicle; determining, for each of the two or more landmarks, a directional indicator relative to the vehicle; determining a current location of the vehicle relative to the road junction based on an intersection of the directional indicators for the two or more landmarks; determining a heading for the vehicle based on the directional indicators for the two or more landmarks; and determining a steering angle for the vehicle by comparing the vehicle heading with a predetermined road model trajectory at the current location of the vehicle.

In some embodiments of the method, the predetermined road model trajectory may include a three-dimensional polynomial representation of a target trajectory along the road segment. The method may include retrieving the predetermined road model trajectory from one of a database stored in a memory included in the vehicle and a database accessible to the vehicle over a wireless communications interface. The method may include transmitting a control signal specifying the steering angle to a steering system of the vehicle. Determining the heading for the vehicle may include determining a previous location of the vehicle relative to the road junction based on the intersection of the directional indicators for the two or more landmarks; and determining the heading based on the previous location and the current location.

In some embodiments, a system for autonomously navigating a vehicle based on a plurality of overlapping navigational maps may include at least one processor programmed to: receive a first navigational map for use in autonomously controlling the vehicle, wherein the first navigational map is associated with a first road segment; determine at least a first autonomous navigational response for the vehicle along the first road segment based on analysis of the first navigational map; receive a second navigational map for use in autonomously controlling the vehicle, wherein the second navigational map is associated with a second road segment, wherein the first road segment is different from the second road segment, and wherein the first road segment and the second road segment overlap one another at an overlap segment; determine at least a second autonomous navigational response for the vehicle along the second road segment based on analysis of the second navigational map; and determine at least a third autonomous navigational response for the vehicle in the overlap segment based on at least one of the first navigational map and the second navigational map.

In some embodiments of the system, each of the plurality of overlapping navigational maps may have its own coordinate frame. Each of the plurality of overlapping navigational maps may include a polynomial representation of a target trajectory along a road segment. Each of the overlapping navigational maps may be a sparse map having a data density of no more than 10 kilobytes per kilometer. The overlap segment may have a length of at least 50 meters. The overlap segment may have a length of at least 100 meters. The at least one processor may be programmed to determine the third autonomous navigational response based on both the first navigational map and the second navigational map. The third autonomous navigational response may be a combination of the first autonomous navigational response and the second autonomous navigational response. The third autonomous navigational response may be an average of the first autonomous navigational response and the second autonomous navigational response. The processor may be further programmed to: determine an error between the first autonomous navigational response and the second autonomous navigational response; and determine the third autonomous navigational response based on the second autonomous navigational response when the error is less than a threshold error.

In some embodiments, an autonomous vehicle may include a body; at least one image capture device configured to acquire at least one image representative of an environment of the vehicle; at least one processor programmed to: determine a current location of the vehicle based on the at least one image; receive a first navigational map associated with a first road segment; determine at least a first autonomous navigational response for the vehicle based on analysis of the first navigational map, when the current location of the vehicle lies on the first navigational map; receive a second navigational map associated with a second road segment different from the second road segment, the first road segment and the second road segment overlapping one another at an overlap segment; determine at least a second autonomous navigational response for the vehicle based on analysis of the second navigational map when the current location of the vehicle lies on the second navigational map; and determine at least a third autonomous navigational response for the vehicle based on at least one of the first navigational map and the second navigational map when the current location of the vehicle lies in the overlap segment.

In some embodiments of the autonomous vehicle, each of the first navigational map and the second navigational map may have its own coordinate frame. Each of the first navigational map and the second navigational map may include a polynomial representation of a target trajectory along a road segment. The at least one processor may be programmed to determine the third autonomous navigational response based on both the first navigational map and the second navigational map. The third autonomous navigational response may be a combination of the first autonomous navigational response and the second autonomous navigational response. The processor may be further programmed to: determine an error between the first autonomous navigational response and the second autonomous navigational response; and determine the third autonomous navigational response based on the second autonomous navigational response when the error is less than a threshold error.

In some embodiments, a method of navigating an autonomous vehicle may include receiving from an image capture device, at least one image representative of an environment of the vehicle; determining, using a processor associated with the vehicle, a current location of the vehicle based on the at least one image; receiving a first navigational map associated with a first road segment; determining at least a first autonomous navigational response for the vehicle based on analysis of the first navigational map, when the current location of the vehicle lies on the first navigational map; receiving a second navigational map associated with a second road segment different from the second road segment, the first road segment and the second road segment overlapping one another at an overlap segment; determining at least a second autonomous navigational response for the vehicle based on analysis of the second navigational map when the current location of the vehicle lies on the second navigational map; and determining at least a third autonomous navigational response for the vehicle based on at least one of the first navigational map and the second navigational map when the current location of the vehicle lies in the overlap segment.

In some embodiments of the method, each of the plurality of overlapping navigational maps may have its own coordinate frame, and each of the plurality of overlapping navigational maps may include a polynomial representation of a target trajectory along a road segment. Determining the third autonomous navigational response may include determining a combination of the first autonomous navigational response and the second autonomous navigational response. The method may include determining an error between the first autonomous navigational response and the second autonomous navigational response; and determining the third autonomous navigational response based on the second autonomous navigational response when the error is less than a threshold error.

In some embodiments, a system for sparse map autonomous navigation of a vehicle along a road segment may include at least one processor programmed to: receive a sparse map of the road segment, wherein the sparse map has a data density of no more than 1 megabyte per kilometer; receive from a camera, at least one image representative of an environment of the vehicle; analyze the sparse map and the at least one image received from the camera; and determine an autonomous navigational response for the vehicle based solely on the analysis of the sparse map and the at least one image received from the camera.

In some embodiments of the system, the sparse map may include a polynomial representation of a target trajectory along the road segment. The sparse map may include one or more recognized landmarks. The recognized landmarks may be spaced apart in the sparse map at a rate of no more than 0.5 per kilometer. The recognized landmarks may be spaced apart in the sparse map at a rate of no more than 1 per kilometer. The recognized landmarks may be spaced apart in the sparse map at a rate of no more than 1 per 100 meters. The sparse map may have a data density of no more than 100 kilobytes per kilometer. The sparse map may have a data density of no more than 10 kilobytes per kilometer.

In some embodiments, a method for sparse map autonomous navigation of a vehicle along a road segment may include receiving a sparse map of the road segment, wherein the sparse map has a data density of no more than 1 megabyte per kilometer; receiving from a camera, at least one image representative of an environment of the vehicle; analyzing the sparse map and the at least one image received from the camera; and determining an autonomous navigational response for the vehicle based solely on the analysis of the sparse map and the at least one image received from the camera.

In some embodiments of the method, the sparse map may include a polynomial representation of a target trajectory along the road segment. The sparse map may include one or more recognized landmarks. The recognized landmarks may be spaced apart in the sparse map at a rate of no more than 0.5 per kilometer. The recognized landmarks may be spaced apart in the sparse map at a rate of no more than 1 per kilometer. The recognized landmarks may be spaced apart in the sparse map at a rate of no more than 1 per 100 meters. The sparse map may have a data density of no more than 100 kilobytes per kilometer. The sparse map may have a data density of no more than 10 kilobytes per kilometer.

In some embodiments, a non-transitory computer readable medium may store instructions causing at least one processor to perform sparse map autonomous navigation of a vehicle along a road segment, which may include receiving a sparse map of the road segment. The instructions may cause the processor to perform the steps of: receiving a sparse map of the road segment, wherein the sparse map has a data density of no more than 1 megabyte per kilometer; receiving from a camera, at least one image representative of an environment of the vehicle; analyzing the sparse map and the at least one image received from the camera; and determining an autonomous navigational response for the vehicle based solely on the analysis of the sparse map and the at least one image received from the camera.

In some embodiments of the non-transitory computer readable medium, the sparse map may include a polynomial representation of a target trajectory along the road segment. The sparse map may include one or more recognized landmarks. The recognized landmarks may be spaced apart in the sparse map at a rate of no more than 0.5 per kilometer.

In some embodiments, a system for autonomously navigating a vehicle along a road segment based on a predetermined landmark location may include at least one processor programmed to: receive from a camera, at least one image representative of an environment of the vehicle; determine a position of the vehicle along a predetermined road model trajectory associated with the road segment based, at least in part, on information associated with the at least one image; identify a recognized landmark forward of the vehicle based on the determined position, wherein the recognized landmark is beyond a sight range of the camera; determine a current distance between the vehicle and the recognized landmark by comparing the determined position of the vehicle with a predetermined position of the recognized landmark; and determine an autonomous navigational response for the vehicle based on the determined current distance.

In some embodiments of the system, the predetermined position of the recognized landmark may be determined as an average of a plurality of acquired position measurements associated with the recognized landmark, wherein the plurality of acquired position measurements are determined based on acquisition of at least one environmental image, analysis of the at least one environmental image to identify the recognized landmark in the environment, reception of global positioning system (GPS) data, analysis of the at least one environmental image to determine a relative position of the recognized landmark with respect to the vehicle, and determination of a globally localized position of the recognized landmark based on at least the GPS data and the determined relative position. The autonomous navigational response may include application of brakes associated with the vehicle. The autonomous navigational response may include modifying a steering angle of the vehicle. The recognized landmark may include a stop line, a traffic light, a stop sign, or a curve along the road segment. The camera may be included in the vehicle.

In some embodiments, a method for autonomously navigating a vehicle along a road segment based on a predetermined landmark location may include receiving from a camera, at least one image representative of an environment of the vehicle; determining a position of the vehicle along a predetermined road model trajectory associated with the road segment based, at least in part, on information associated with the at least one image; identifying a recognized landmark forward of the vehicle based on the determined position, wherein the recognized landmark is beyond a sight range of the camera; determining a current distance between the vehicle and the recognized landmark by comparing the determined position of the vehicle with a predetermined position of the recognized landmark; and determining an autonomous navigational response for the vehicle based on the determined current distance.

In some embodiments of the method, the predetermined position of the recognized landmark may be determined as an average of a plurality of acquired position measurements associated with the recognized landmark, wherein the plurality of acquired position measurements may be determined based on acquisition of at least one environmental image, analysis of the at least one environmental image to identify the recognized landmark in the environment, reception of global positioning system (GPS) data, analysis of the at least one environmental image to determine a relative position of the recognized landmark with respect to the vehicle, and determination of a globally localized position of the recognized landmark based on at least the GPS data and the determined relative position. The autonomous navigational response may include application of brakes associated with the vehicle. The autonomous navigational response may include modifying a steering angle of the vehicle. The recognized landmark may include a stop line, a traffic light, a stop sign, or a curve along the road segment. The camera may be included in the vehicle.

In some embodiments, a non-transitory computer readable medium may store instructions causing at least one processor to perform autonomous navigation of a vehicle along a road segment. The instructions may cause the processor to perform the steps of: receiving from a camera, at least one image representative of an environment of the vehicle; determining a position of the vehicle along a predetermined road model trajectory associated with the road segment based, at least in part, on information associated with the at least one image; identifying a recognized landmark forward of the vehicle based on the determined position, wherein the recognized landmark is beyond a sight range of the camera; determining a current distance between the vehicle and the recognized landmark by comparing the determined position of the vehicle with a predetermined position of the recognized landmark; and determining an autonomous navigational response for the vehicle based on the determined current distance.

In some embodiments of the non-transitory computer readable medium, the autonomous navigational response may include application of brakes associated with the vehicle. The autonomous navigational response may include modifying a steering angle of the vehicle. The recognized landmark may include a stop line, a traffic light, a stop sign, or a curve along the road segment.

In some embodiments, a system for autonomously navigating a vehicle along a road segment may include at least one processor programmed to: receive, from at least one sensor, information relating to one or more aspects of the road segment; determine a local feature of the road segment based on the received information; compare the local feature to a predetermined signature feature for the road segment; determine a current location of the vehicle along a predetermined road model trajectory associated with the road segment based on the comparison of the local feature and the predetermined signature feature; and determine an autonomous steering action for the vehicle based on a direction of the predetermined road model trajectory at the determined location.

In some embodiments of the system, the at least one processor may be further programmed to: determine a heading direction of the vehicle at the current location, and determine the autonomous steering action by comparing the direction of the predetermined road model trajectory with the heading direction. The heading direction may be determined based on a travelled trajectory of the vehicle. The at least one sensor may include an image capture device configured to acquire at least one image representative of an environment of the vehicle. The signature feature may include a road width profile over at least a portion of the road segment. The signature feature may include a lane width profile over at least a portion of the road segment. The signature feature may include a dashed line spacing profile over at least a portion of the road segment. The signature feature may include a predetermined number of road markings along at least a portion of the road segment. The signature feature may include a road surface profile over at least a portion of the road segment. The signature feature may include a predetermined curvature associated with the road segment. Determining the current location of the vehicle may include comparing first parameter values indicative of a curvature of the predetermined road model trajectory and second parameter values indicative of a curvature of a measured trajectory for the vehicle. The at least one sensor may include a suspension component monitor.

In some embodiments, a vehicle may include a body; at least one sensor configured to acquire information relating to one or more aspects of the road segment; and at least one processor programmed to: determine a local feature of the road segment based on the information received from the at least one sensor; compare the local feature to a predetermined signature feature for the road segment; determine a current location of the vehicle along a predetermined road model trajectory associated with the road segment based on the comparison of the local feature and the predetermined signature feature; and determine an autonomous steering action for the vehicle based on a direction of the predetermined road model trajectory at the current location.

In some embodiments of the vehicle, the signature feature may include at least one of a road width profile over at least a portion of the road segment, a lane width profile over at least a portion of the road segment, a dashed line spacing profile over at least a portion of the road segment, a predetermined number of road markings along at least a portion of the road segment, a road surface profile over at least a portion of the road segment, and a predetermined curvature associated with the road segment. The vehicle may include a suspension component monitor, wherein the processor is further programmed to determine the local feature based on signals from the suspension component monitor. The processor may be further programmed to: determine a heading direction of the vehicle; determine a direction of the predetermined road model trajectory at the current location; and determine the autonomous steering action by comparing the direction with the heading direction.

In some embodiments, a method of navigating a vehicle may include receiving, from at least one sensor, information relating to one or more aspects of the road segment; determining, using at least one processor, a local feature of the road segment based on the information received from the at least one sensor; comparing the received information to a predetermined signature feature for the road segment; determining a current location of the vehicle along a predetermined road model trajectory associated with the road segment based on the comparison of the received information and the predetermined signature feature; and determining an autonomous steering action for the vehicle based on a direction of the predetermined road model trajectory at the current location.

In some embodiments, the method may include determining a heading direction of the vehicle at the current location; determining the direction of the predetermined road model trajectory at the current location; and determining the autonomous steering action by comparing the direction of the predetermined road model trajectory with the heading direction. The local feature may include at least one of a road width profile over at least a portion of the road segment, a lane width profile over at least a portion of the road segment, a dashed line spacing profile over at least a portion of the road segment, a predetermined number of road markings along at least a portion of the road segment, a road surface profile over at least a portion of the road segment, and a predetermined curvature associated with the road segment. The method may include determining, using a suspension component monitor, a road surface profile; comparing the road surface profile with a predetermined road surface profile; and determining the current location based on the comparison of the road surface profile and the predetermined road surface profile.

In some embodiments, a system for autonomously navigating a vehicle may include at least one processor programmed to: receive from a rearward facing camera, at least one image representing an area at a rear of the vehicle; analyze the at least one rearward facing image to locate in the image a representation of at least one landmark; determine at least one indicator of position of the landmark relative to the vehicle; determine a forward trajectory for the vehicle based, at least in part, upon the indicator of position of the landmark relative to the vehicle; and cause the vehicle to navigate along the determined forward trajectory.

In some embodiments of the system, the indicator of position may include a distance between the vehicle and the landmark. The indicator of position may include a relative angle between the vehicle and the landmark. The landmark may include a road edge, a lane marking, a reflector, a pole, a change in line pattern on a road, or a road sign. The landmark may include a backside of a road sign. The at least one processor may be further programmed to determine a lane offset amount of the vehicle within a current lane of travel based on the indicator of position of the landmark, and wherein determination of the forward trajectory is further based on the determined lane offset amount. The at least one processor may be further programmed to receive from another camera, at least one image representing another area of the vehicle, and wherein the determination of the forward trajectory is further based on the at least one image received from the another camera.

In some embodiments, a method of autonomously navigating a vehicle may include receiving from a rearward facing camera, at least one image representing an area at a rear of the vehicle; analyzing the at least one rearward facing image to locate in the image a representation of at least one landmark; determining at least one indicator of position of the landmark relative to the vehicle; determining a forward trajectory for the vehicle based, at least in part, upon the indicator of position of the landmark relative to the vehicle; and causing the vehicle to navigate along the determined forward trajectory.

In some embodiments of the method, the indicator of position may include a distance between the vehicle and the landmark. The indicator of position may include a relative angle between the vehicle and the landmark. The landmark may include a road edge, a lane marking, a reflector, a pole, a change in line pattern on a road, or a road sign. The landmark may include a backside of a road sign. The method may include determining a lane offset amount of the vehicle within a current lane of travel based on the indicator of position of the landmark, and wherein the determining of the forward trajectory may be based on the determined lane offset amount.

In some embodiments, a vehicle may include a body; a rearward facing camera; and at least one processor programmed to: receive, via a rearward camera interface connecting the rearward facing camera, at least one image representing an area at a rear of the vehicle; analyze the at least one rearward facing image to locate in the image a representation of at least one landmark; determine at least one indicator of position of the landmark relative to the vehicle; determine a forward trajectory for the vehicle based, at least in part, upon the indicator of position of the landmark relative to the vehicle; and cause the vehicle to navigate along the determined forward trajectory.

In some embodiments of the vehicle, the rearward facing camera may be mounted on an object connected to the vehicle. The object may be a trailer, a bike carrier, a ski/snowboard carrier, a mounting base, or a luggage carrier. The rearward camera interface may include a detachable interface. The rearward camera interface may include a wireless interface.

In some embodiments, a system for navigating a vehicle by determining a free space region in which a vehicle can travel may include at least one processor programmed to: receive from an image capture device, a plurality of images associated with an environment of a vehicle; analyze at least one of the plurality of images to identify a first free space boundary on a driver side of the vehicle and extending forward of the vehicle, a second free space boundary on a passenger side of the vehicle and extending forward of the vehicle, and a forward free space boundary forward of the vehicle and extending between the first free space boundary and the second free space boundary; wherein the first free space boundary, the second free space boundary, and the forward free space boundary define a free space region forward of the vehicle; determine a navigational path for the vehicle through the free space region; and cause the vehicle to travel on at least a portion of the determined navigational path within the free space region forward of the vehicle.

In some embodiments of the system, the first free space boundary may correspond to at least one of a road edge, a curb, a barrier, a lane dividing structure, a parked vehicle, a tunnel wall, or a bridge structure. The second free space boundary may correspond to at least one of a road edge, a curb, a barrier, a lane dividing structure, a parked vehicle, a tunnel wall, or a bridge structure. The forward free space boundary may correspond to a road horizon line. The at least one processor may be further programmed to identify, based on analysis of the at least one of the plurality of images, an obstacle forward of the vehicle and exclude the identified obstacle from the free space region forward of the vehicle. The obstacle may include a pedestrian. The obstacle may include another vehicle. The obstacle may include debris. The at least one processor may be further programmed to identify, based on analysis of the at least one of the plurality of images, an obstacle forward of the vehicle and exclude a region surrounding the identified obstacle from the free space region forward of the vehicle. The at least one processor may be further programmed to determine the region surrounding the identified obstacle based on one or more of the following: a speed of the vehicle, a type of the obstacle, an image capture rate of the image capture device, and a movement speed of the obstacle.

In some embodiments, a vehicle may include a body, the body including a driver side and a passenger side; an image capture device; and at least one processor programmed to: receive from the image capture device, a plurality of images associated with an environment of the vehicle; analyze at least one of the plurality of images to identify a first free space boundary on the driver side of the body and extending forward of the body, a second free space boundary on the passenger side of the body and extending forward of the body, and a forward free space boundary forward of the body and extending between the first free space boundary and the second free space boundary; wherein the first free space boundary, the second free space boundary, and the forward free space boundary define a free space region forward of the body; determine a navigational path for the vehicle through the free space region; and cause the vehicle to travel on at least a portion of the determined navigational path within the free space region forward of the vehicle.

In some embodiments, a method of navigating a vehicle by determining a free space region in which a vehicle can travel may include receiving from an image capture device, a plurality of images associated with an environment of a vehicle; analyzing at least one of the plurality of images to identify a first free space boundary on a driver side of the vehicle and extending forward of the vehicle, a second free space boundary on a passenger side of the vehicle and extending forward of the vehicle, and a forward free space boundary forward of the vehicle and extending between the first free space boundary and the second free space boundary; wherein the first free space boundary, the second free space boundary, and the forward free space boundary define a free space region forward of the vehicle; determining a navigational path for the vehicle through the free space region; and causing the vehicle to travel on at least a portion of the determined navigational path within the free space region forward of the vehicle.

In some embodiments of the method, the first free space boundary may correspond to at least one of a road edge, a curb, a barrier, a lane dividing structure, a parked vehicle, a tunnel wall, or a bridge structure. The second free space boundary may correspond to at least one of a road edge, a curb, a barrier, a lane dividing structure, a parked vehicle, a tunnel wall, or a bridge structure. The forward free space boundary may correspond to a road horizon line. The method may include identifying, based on analysis of the at least one of the plurality of images, an obstacle forward of the vehicle; and excluding the identified obstacle from the free space region forward of the vehicle. The obstacle may include a pedestrian. The obstacle may include another vehicle. The obstacle may include debris. The method may include identifying, based on analysis of the at least one of the plurality of images, an obstacle forward of the vehicle; and excluding a region surrounding the identified obstacle from the free space region forward of the vehicle. The method may include determining the region surrounding the identified obstacle based on one or more of the following: a speed of the vehicle, a type of the obstacle, an image capture rate of the image capture device, and a movement speed of the obstacle.

In some embodiments, a system for navigating a vehicle on a road with snow covering at least some lane markings and road edges may include at least one processor programmed to: receive from an image capture device, at least one environmental image forward of the vehicle, including areas where snow covers at least some lane markings and road edges; identify, based on an analysis of the at least one image, at least a portion of the road that is covered with snow and probable locations for road edges bounding the at least a portion of the road that is covered with snow; and cause the vehicle to navigate a navigational path that includes the identified portion of the road and falls within the determined probable locations for the road edges.

In some embodiments of the system, the analysis of the at least one image may include identifying at least one tire track in the snow. The analysis of the at least one image may include identifying a change of light across a surface of the snow. The analysis of the at least one image may include identifying a plurality of trees along an edge of the road. The analysis of the at least one image may include recognizing a change in curvature at a surface of the snow. The recognized change in curvature may be determined to correspond to a probable location of a road edge. The analysis of the at least one image may include a pixel analysis of the at least one image in which at least a first pixel is compared to at least a second pixel in order to determine a feature associated with a surface of the snow covering at least some lane markings and road edges. The feature may correspond to an edge of a tire track. The feature may correspond to an edge of the road. The at least one processor may be further programmed to cause the vehicle to navigate between determined edges of the road. The at least one processor may be further programmed to cause the vehicle to navigate by at least partially following tire tracks in the snow.

In some embodiments, a method of navigating a vehicle on a road with snow covering at least some lane markings and road edges may include receiving from an image capture device, at least one environmental image forward of the vehicle, including areas where snow covers at least some lane markings and road edges; identifying, based on an analysis of the at least one image, at least a portion of the road that is covered with snow and probable locations for road edges bounding the at least a portion of the road that is covered with snow; and causing the vehicle to navigate a navigational path that includes the identified portion of the road and falls within the determined probable locations for the road edges.

In some embodiments of the method, the analysis of the at least one image may include identifying at least one tire track in the snow. The analysis of the at least one image may include identifying a change of light across a surface of the snow. The analysis of the at least one image may include identifying a plurality of trees along an edge of the road. The analysis of the at least one image may include recognizing a change in curvature at a surface of the snow. The recognized change in curvature may be determined to correspond to a probable location of a road edge. The analysis of the at least one image may include a pixel analysis of the at least one image in which at least a first pixel is compared to at least a second pixel in order to determine a feature associated with a surface of the snow covering at least some lane markings and road edges. The feature may correspond to an edge of a tire track. The feature may correspond to an edge of the road. The method may include causing the vehicle to navigate between determined edges of the road. The method may include causing the vehicle to navigate by at least partially following tire tracks in the snow.

In some embodiments, a system for navigating a vehicle on a road at least partially covered with snow may include at least one processor programmed to: receive from an image capture device, a plurality of images captured of an environment forward of the vehicle, including areas where snow covers a road on which the vehicle travels; analyze at least one of the plurality of images to identify a first free space boundary on a driver side of the vehicle and extending forward of the vehicle, a second free space boundary on a passenger side of the vehicle and extending forward of the vehicle, and a forward free space boundary forward of the vehicle and extending between the first free space boundary and the second free space boundary; wherein the first free space boundary, the second free space boundary, and the forward free space boundary define a free space region forward of the vehicle; determine a first proposed navigational path for the vehicle through the free space region; provide the at least one of the plurality of images to a neural network and receive from the neural network a second proposed navigational path for the vehicle based on analysis of the at least one of the plurality of images by the neural network; determine whether the first proposed navigational path agrees with the second proposed navigational path; and cause the vehicle to travel on at least a portion of the first proposed navigational path if the first proposed navigational path is determined to agree with the second proposed navigational path.

In some embodiments, a system for calibrating an indicator of speed of an autonomous vehicle may include at least one processor programmed to: receive from a camera a plurality of images representative of an environment of the vehicle; analyze the plurality of images to identify at least two recognized landmarks; determine, based on known locations of the two recognized landmarks, a value indicative of a distance between the at least two recognized landmarks; determine, based on an output of at least one sensor associated with the autonomous vehicle, a measured distance between the at least two landmarks; and determine a correction factor for the at least one sensor based on a comparison of the value indicative of the distance between the at least to recognized landmarks and the measured distance between the at least two landmarks.

In some embodiments of the system, the correction factor may be determined such that an operation on the determined distance along the road segment by the correction factor matches the distance value received via the wireless transceiver. The two recognized landmarks may include one or more of a traffic sign, an arrow marking, a lane marking, a dashed lane marking, a traffic light, a stop line, a directional sign, a reflector, a landmark beacon, or a lamppost. The at least one sensor may include a speedometer associated with the vehicle. The known locations of the two recognized landmarks may be received from a server based system located remotely with respect to the vehicle. Each of the known locations may constitute a refined location determined based on a plurality of GPS-based measurements.

In some embodiments, a system for calibrating an indicator of speed of an autonomous vehicle may include at least one processor programmed to: determine a distance along a road segment based on an output of at least one sensor associated with the autonomous vehicle; receive, via a wireless transceiver, a distance value associated with the road segment; and determine a correction factor for the at least one sensor based on the determined distance along the road segment and the distance value received via the wireless transceiver.

In some embodiments of the system, the distance value associated with the road segment, received via the wireless transceiver, may be determined based on prior measurements made by a plurality of measuring vehicles. The plurality of measuring vehicles may include at least 100 measuring vehicles. The plurality of measuring vehicles may include at least 1000 measuring vehicles. The correction factor may be determined such that an operation on the determined distance along the road segment by the correction factor matches the distance value received via the wireless transceiver. The at least one processor may be programmed to determine a composite correction factor based on a plurality of determined correction factors. The composite correction factor may be determined by averaging the plurality of determined correction factors. The composite correction factor may be determined by finding a mean of the plurality of determined correction factors.

In some embodiments, a vehicle may include a body; a camera; and at least one processor programmed to: receive from the camera a plurality of images representative of an environment of the vehicle; analyze the plurality of images to identify at least two recognized landmarks; determine, based on known locations of the two recognized landmarks, a value indicative of a distance between the at least two recognized landmarks; determine, based on an output of at least one sensor associated with the autonomous vehicle, a measured distance between the at least two landmarks; and determine a correction factor for the at least one sensor based on a comparison of the value indicative of the distance between the at least to recognized landmarks and the measured distance between the at least two landmarks.

In some embodiments of the vehicle, the at least one sensor may include a speedometer associated with the vehicle. The two recognized landmarks may include one or more of a traffic sign, an arrow marking, a lane marking, a dashed lane marking, a traffic light, a stop line, a directional sign, a reflector, a landmark beacon, or a lamppost. The known locations of the two recognized landmarks may be received from a server based system located remotely with respect to the vehicle.

In some embodiments, a system for determining a lane assignment for an autonomous vehicle along a road segment may include at least one processor programmed to: receive from a camera at least one image representative of an environment of the vehicle; analyze the at least one image to identify at least one recognized landmark; determine an indicator of a lateral offset distance between the vehicle and the at least one recognized landmark; and determine a lane assignment of the vehicle along the road segment based on the indicator of the lateral offset distance between the vehicle and the at least one recognized landmark.

In some embodiments of the system, the environment of the vehicle may include the road segment, a number of lanes, and the at least one recognized landmark. The at least one recognized landmark may include at least one of a traffic sign, an arrow marking, a lane marking, a dashed lane marking, a traffic light, a stop line, a directional sign, a reflector, a landmark beacon, or a lamppost. The at least one recognized landmark may include a sign for a business. The lateral offset distance between the vehicle and the at least one recognized landmark may be a sum of a first distance between the vehicle and a first side of the road segment and a second distance between the first side of the road and the at least one recognized landmark. The determination of the indicator of the lateral offset distance between the vehicle and the at least one recognized landmark may be based on a predetermined position of the at least one recognized landmark. The determination of the indicator of the lateral offset distance between the vehicle and the at least one recognized landmark may be based on a scale associated with the at least one image. The determination of the lane assignment may be further based on at least one of a width of the road segment, a number of lanes of the road segment, and a lane width. The determination of the lane assignment may be further based on a predetermined road model trajectory associated with the road segment. The at least one recognized landmark may include a first recognized landmark on a first side of the vehicle and a second recognized landmark on a second side of the vehicle and wherein determination of the lane assignment of the vehicle along the road segment is based on a first indicator of lateral offset distance between the vehicle and the first recognized landmark and a second indicator of lateral offset distance between the vehicle and the second recognized landmark.

In some embodiments, a computer-implemented method for determining a lane assignment for an autonomous vehicle along a road segment may include the following operations performed by one or more processors: receiving from a camera at least one image representative of an environment of the vehicle; analyzing the at least one image to identify at least one recognized landmark; determining an indicator of a lateral offset distance between the vehicle and the at least one recognized landmark; and determining a lane assignment of the vehicle along the road segment based on the indicator of the lateral offset distance between the vehicle and the at least one recognized landmark.

In some embodiments of the method, the at least one recognized landmark may include at least one of a traffic sign, an arrow marking, a lane marking, a dashed lane marking, a traffic light, a stop line, a directional sign, a reflector, a landmark beacon, or a lamppost. The at least one recognized landmark may include a sign for a business. The determination of the lane assignment may be further based on a predetermined road model trajectory associated with the road segment. The at least one recognized landmark may include a first recognized landmark on a first side of the vehicle and a second recognized landmark on a second side of the vehicle and wherein determination of the lane assignment of the vehicle along the road segment is based on a first indicator of lateral offset distance between the vehicle and the first recognized landmark and a second indicator of lateral offset distance between the vehicle and the second recognized landmark.

In some embodiments, a computer-readable storage medium may include a set of instructions that are executable by at least one processor to cause the at least one processor to perform a method for determining a lane assignment for an autonomous vehicle along a road segment. The method may include receiving from a camera at least one image representative of an environment of the vehicle; analyzing the at least one image to identify at least one recognized landmark; determining an indicator of a lateral offset distance between the vehicle and the at least one recognized landmark; and determining a lane assignment of the vehicle along the road segment based on the indicator of the lateral offset distance between the vehicle and the at least one recognized landmark.

In some embodiments of the computer-readable storage medium, the at least one recognized landmark may include at least one of a traffic sign, an arrow marking, a lane marking, a dashed lane marking, a traffic light, a stop line, a directional sign, a reflector, a landmark beacon, or a lamppost. The at least one recognized landmark may include a sign for a business. The determination of the lane assignment may be further based on a predetermined road model trajectory associated with the road segment. The at least one recognized landmark may include a first recognized landmark on a first side of the vehicle and a second recognized landmark on a second side of the vehicle and wherein determination of the lane assignment of the vehicle along the road segment is based on a first indicator of lateral offset distance between the vehicle and the first recognized landmark and a second indicator of lateral offset distance between the vehicle and the second recognized landmark.

In some embodiments, a system for autonomously navigating a vehicle along a road segment may include at least one processor programmed to: receive from a camera at least one image representative of an environment of the vehicle; analyze the at least one image to identify at least one recognized landmark, wherein the at least one recognized landmark is part of a group of recognized landmarks, and identification of the at least one recognized landmark is based, at least in part, upon one or more landmark group characteristics associated with the group of recognized landmarks; determine a current location of the vehicle relative to a predetermined road model trajectory associated with the road segment based, at least in part, on a predetermined location of the recognized landmark; and determine an autonomous steering action for the vehicle based on a direction of the predetermined road model trajectory at the determined current location of the vehicle relative to the predetermined road model trajectory.

In some embodiments of the system, the at least one recognized landmark may include at least one of a traffic sign, an arrow marking, a lane marking, a dashed lane marking, a traffic light, a stop line, a directional sign, a reflector, a landmark beacon, or a lamppost. The at least one recognized landmark may include a sign for a business. The predetermined road model trajectory may include a three-dimensional polynomial representation of a target trajectory along the road segment. The at least one processor may be further programmed to determine a current location of the vehicle along the predetermined road model trajectory based on a vehicle velocity. The one or more landmark group characteristics may include relative distances between members of the group of recognized landmarks. The one or more landmark group characteristics may include an ordering sequence of members of the group of recognized landmarks. The one or more landmark group characteristics may include a number of landmarks included in the group of recognized landmarks. Identification of the at least one recognized landmark may be based, at least in part, upon a super landmark signature associated with the group of recognized landmarks. The at least one processor may be programmed to determine an autonomous steering action for the vehicle by comparing a heading direction of the vehicle to the predetermined road model trajectory at the determined current location of the vehicle.

In some embodiments, a computer-implemented method for autonomously navigating a vehicle along a road segment may include the following operations performed by one or more processors: receiving from a camera at least one image representative of an environment of the vehicle; analyzing the at least one image to identify at least one recognized landmark, wherein the at least one recognized landmark is part of a group of recognized landmarks, and identification of the at least one recognized landmark is based, at least in part, upon one or more landmark group characteristics associated with the group of recognized landmarks; determining, relative to the vehicle, a current location of the vehicle relative to a predetermined road model trajectory associated with the road segment based, at least in part, on a predetermined location of the recognized landmark; and determining an autonomous steering action for the vehicle based on a direction of the predetermined road model trajectory at the determined current location of the vehicle relative to the predetermined road model trajectory.

In some embodiments of the method, the at least one recognized landmark may include at least one of a traffic sign, an arrow marking, a lane marking, a dashed lane marking, a traffic light, a stop line, a directional sign, a reflector, a landmark beacon, or a lamppost. The at least one recognized landmark may include a sign for a business. The one or more landmark group characteristics may include relative distances between members of the group of recognized landmarks. The one or more landmark group characteristics may include an ordering sequence of members of the group of recognized landmarks.

In some embodiments, a computer-readable storage medium may include a set of instructions that are executable by at least one processor to cause the at least one processor to perform a method for autonomously navigating a vehicle along a road segment. The method may include receiving from a camera at least one image representative of an environment of the vehicle; analyzing the at least one image to identify at least one recognized landmark, wherein the at least one recognized landmark is part of a group of recognized landmarks, and identification of the at least one recognized landmark is based, at least in part, upon one or more landmark group characteristics associated with the group of recognized landmarks; determining, relative to the vehicle, a current location of the vehicle relative to a predetermined road model trajectory associated with the road segment based, at least in part, on a predetermined location of the recognized landmark; and determining an autonomous steering action for the vehicle based on a direction of the predetermined road model trajectory at the determined current location of the vehicle relative to the predetermined road model trajectory.

In some embodiments of the computer-readable storage medium, the at least one landmark may include at least one of a traffic sign, an arrow marking, a lane marking, a dashed lane marking, a traffic light, a stop line, a directional sign, a reflector, a landmark beacon, or a lamppost. The at least one recognized landmark may include a sign for a business. The one or more landmark group characteristics may include relative distances between members of the group of recognized landmarks. The one or more landmark group characteristics may include an ordering sequence of members of the group of recognized landmarks.

In some embodiments, a navigation system for a vehicle may include at least one processor programmed to: receive from a camera, at least one environmental image associated with the vehicle; determine a navigational maneuver for the vehicle based on analysis of the at least one environmental image; cause the vehicle to initiate the navigational maneuver; receive a user input, associated with a user's navigational response different from the initiated navigational maneuver; determine navigational situation information relating to the vehicle based on the received user input; and store the navigational situation information in association with information relating to the user input.

In some embodiments of the system, the navigational maneuver may be based on a recognized landmark identified in the at least one environmental image. The information relating to the user input may include information specifying at least one of a degree of a turn of the vehicle, an amount of an acceleration of the vehicle, and an amount of braking of the vehicle. The control system may include at least one of a steering control, an acceleration control, and a braking control. The navigational situation information may include one or more images captured by a camera onboard the vehicle. The user input may include at least one of braking, steering, or accelerating. The navigational situation information may include a location of the vehicle. The navigational situation information may include at least one output of a sensor onboard the vehicle. The sensor may be a speedometer. The sensor may be an accelerometer. The sensor may be an IR sensor. The navigational situation information may include a time of day. The navigational situation information may include an indication of the presence of a vision inhibitor. The vision inhibitor may be caused by glare. The navigational situation information may be determined based on the at least one environmental image. The system may include a transmitter for sending the navigational situation information to a server remote from the vehicle.

In some embodiments, a non-transitory computer-readable medium may include instructions that are executable by at least one processor to cause the at least one processor to perform a method. The method may include receiving from a camera, at least one environmental image associated with the vehicle; determining a navigational maneuver for the vehicle based on analysis of the at least one environmental image; causing the vehicle to initiate the navigational maneuver; receiving a user input, associated with a user's navigational response different from the initiated navigational maneuver; determining navigational situation information relating to the vehicle based on the received user input; and storing the navigational situation information in association with information relating to the user input.

In some embodiments, a navigation system for a vehicle may include at least one processor programmed to: determine a navigational maneuver for the vehicle based, at least in part, on a comparison of a motion of the vehicle with respect to a predetermined model representative of a road segment; receive from a camera, at least one image representative of an environment of the vehicle; determine, based on analysis of the at least one image, an existence in the environment of the vehicle of a navigational adjustment condition; cause the vehicle to adjust the navigational maneuver based on the existence of the navigational adjustment condition; and store information relating to the navigational adjustment condition.

In some embodiments of the system, the navigational adjustment condition may include a parked car. The navigational adjustment condition may include a lane shift. The navigational adjustment condition may include at least one of a newly encountered traffic sign or a newly encountered traffic light. The navigational adjustment condition may include an area of construction. The processor may be further programmed to cause the stored information relating to the navigational adjustment condition to be transmitted to a road model management system for determining whether an update to the predetermined model representative of the road segment is warranted by the navigational adjustment condition. The information stored relative to the navigational adjustment condition may include at least one of an indicator of location where the navigational adjustment condition was encountered, an indication of the adjustment made to the navigational maneuver, and the at least one image. The predetermined model representative of the road segment may include a three-dimensional spline representing a predetermined path of travel along the road segment.

In some embodiments, a method for navigating a vehicle may include determining a navigational maneuver for the vehicle based, at least in part, on a comparison of a motion of the vehicle with respect to a predetermined model representative of a road segment; receiving from a camera, at least one image representative of an environment of the vehicle; determining, based on analysis of the at least one image, an existence in the environment of the vehicle of a navigational adjustment condition; causing the vehicle to adjust the navigational maneuver based on the existence of the navigational adjustment condition; and storing information relating to the navigational adjustment condition.

In some embodiments of the method, the navigational adjustment condition may include a parked car. The navigational adjustment condition may include a lane shift. The navigational adjustment condition may include at least one of a newly encountered traffic sign or a newly encountered traffic light. The navigational adjustment condition may include an area of construction. The method may include causing the stored information relating to the navigational adjustment condition to be transmitted to a road model management system for determining whether an update to the predetermined model representative of the road segment is warranted by the navigational adjustment condition. The information stored relative to the navigational adjustment condition may include at least one of an indicator of location where the navigational adjustment condition was encountered, an indication of the adjustment made to the navigational maneuver, and the at least one image. The predetermined model representative of the road segment may include a three-dimensional spline representing a predetermined path of travel along the road segment.

In some embodiments, a non-transitory computer-readable medium may include instructions that are executable by at least one processor to cause the at least one processor to perform a method. The method may include determining a navigational maneuver for the vehicle based, at least in part, on a comparison of a motion of the vehicle with respect to a predetermined model representative of a road segment; receiving from a camera, at least one image representative of an environment of the vehicle; determining, based on analysis of the at least one image, an existence in the environment of the vehicle of a navigational adjustment condition; causing the vehicle to adjust the navigational maneuver based on the existence of the navigational adjustment condition; and storing information relating to the navigational adjustment condition.

In some embodiments of the computer-readable medium, the method may include causing the stored information relating to the navigational adjustment condition to be transmitted to a road model management system for determining whether an update to the predetermined model representative of the road segment is warranted by the navigational adjustment condition. The information stored relative to the navigational adjustment condition may include at least one of an indicator of location where the navigational adjustment condition was encountered, an indication of the adjustment made to the navigational maneuver, and the at least one image. The predetermined model representative of the road segment may include a three-dimensional spline representing a predetermined path of travel along the road segment.

In some embodiments, a system for interacting with a plurality of autonomous vehicles may include a memory including a predetermined model representative of at least one road segment; and at least one processor programmed to: receive from each of the plurality of autonomous vehicles navigational situation information associated with an occurrence of an adjustment to a determined navigational maneuver; analyze the navigational situation information; determine, based on the analysis of the navigational situation information, whether the adjustment to the determined navigational maneuver was due to a transient condition; and update the predetermined model representative of the at least one road segment if the adjustment to the determined navigational maneuver was not due to a transient condition.

In some embodiments of the system, the predetermined model representative of at least one road segment may include a three-dimensional spline representing a predetermined path of travel along the at least one road segment. The update to the predetermined model may include an update to the three-dimensional spline representing a predetermined path of travel along the at least one road segment. The adjustment to a determined navigational maneuver may be resulted from a user intervention. The adjustment to a determined navigational maneuver may be resulted from an automatic determination, based on image analysis, of an existence in a vehicle environment of a navigational adjustment condition. The navigational situation information may include at least one image representing an environment of an autonomous vehicle. The navigational situation information may include a video representing an environment of an autonomous vehicle. The transient condition may be associated with a parked car, an intervening car, a pedestrian, a low light condition, a glare condition, a temporary barrier, or temporary roadwork.

In some embodiments, a method for interacting with a plurality of autonomous vehicles may include receiving from each of the plurality of autonomous vehicles navigational situation information associated with an occurrence of an adjustment to a determined navigational maneuver; analyzing the navigational situation information; determining, based on the analysis of the navigational situation information, whether the adjustment to the determined navigational maneuver was due to a transient condition; and updating a predetermined model representative of the at least one road segment if the adjustment to the determined navigational maneuver was not due to a transient condition.

In some embodiments of the method, the predetermined model representative of at least one road segment may include a three-dimensional spline representing a predetermined path of travel along the at least one road segment. The update to the predetermined model may include an update to the three-dimensional spline representing a predetermined path of travel along the at least one road segment. The adjustment to a determined navigational maneuver may be resulted from a user intervention. The adjustment to a determined navigational maneuver may be resulted from an automatic determination, based on image analysis, of an existence in a vehicle environment of a navigational adjustment condition. The navigational situation information may include at least one image representing an environment of an autonomous vehicle. The navigational situation information may include a video representing an environment of an autonomous vehicle. The transient condition may be associated with a parked car, an intervening car, a pedestrian, a low light condition, a glare condition, a temporary barrier, or temporary roadwork.

In some embodiments, a non-transitory computer-readable medium may include instructions that are executable by at least one processor to cause the at least one processor to perform a method. The method may include receiving from each of the plurality of autonomous vehicles navigational situation information associated with an occurrence of an adjustment to a determined navigational maneuver; analyzing the navigational situation information; determining, based on the analysis of the navigational situation information, whether the adjustment to the determined navigational maneuver was due to a transient condition; and updating the predetermined model representative of the at least one road segment if the adjustment to the determined navigational maneuver was not due to a transient condition.

In some embodiments of the computer-readable medium, the predetermined model representative of at least one road segment may include a three-dimensional spline representing a predetermined path of travel along the at least one road segment. Updating the predetermined model may include an update to the three-dimensional spline representing a predetermined path of travel along the at least one road segment. The transient condition may be associated with a parked car, an intervening car, a pedestrian, a low light condition, a glare condition, a temporary barrier, or temporary roadwork.

In some embodiments, a system for interacting with a plurality of autonomous vehicles may include a memory including a predetermined road model representative of at least one road segment; and at least one processor programmed to: selectively receive, from the plurality of autonomous vehicles, road environment information based on navigation by the plurality of autonomous vehicles through their respective road environments; determine whether one or more updates to the predetermined road model are required based on the road environment information; and update the predetermined road model to include the one or more updates.

In some embodiments of the system, the road model may include a three-dimensional spline representing a predetermined path of travel along the at least one road segment. Selectively receiving the road environment information may include a limitation on a frequency of information transmissions received from a particular vehicle. Selectively receiving the road environment information may include a limitation on a frequency of information transmissions received from a group of vehicles. Selectively receiving the road environment information may include a limitation on a frequency of information transmissions received from vehicles traveling within a particular geographic region. Selectively receiving the road environment information may include a limitation on a frequency of information transmissions received from vehicles based on a determined model confidence level associated with a particular geographic region. Selectively receiving the road environment information may include a limitation on information transmissions received from vehicles to only those transmissions that include a potential discrepancy with respect to at least one aspect of the predetermined road model.

In some embodiments, a method for interacting with a plurality of autonomous vehicles may include selectively receiving, from the plurality of autonomous vehicles, road environment information based on navigation by the plurality of autonomous vehicles through their respective road environments; determining whether one or more updates to the predetermined road model are required based on the road environment information; and updating the predetermined road model to include the one or more updates.

In some embodiments of the method, the road model may include a three-dimensional spline representing a predetermined path of travel along the at least one road segment. Selectively receiving the road environment information may include a limitation on a frequency of information transmissions received from a particular vehicle. Selectively receiving the road environment information may include a limitation on a frequency of information transmissions received from a group of vehicles. Selectively receiving the road environment information may include a limitation on a frequency of information transmissions received from vehicles traveling within a particular geographic region. Selectively receiving the road environment information may include a limitation on a frequency of information transmissions received from vehicles based on a determined model confidence level associated with a particular geographic region. Selectively receiving the road environment information may include a limitation on information transmissions received from vehicles to only those transmissions that include a potential discrepancy with respect to at least one aspect of the predetermined road model.

In some embodiments, a non-transitory computer-readable medium may include instructions that are executable by at least one processor to cause the at least one processor to perform a method. The method may include selectively receiving, from the plurality of autonomous vehicles, road environment information based on navigation by the plurality of autonomous vehicles through their respective road environments; determining whether one or more updates to the predetermined road model are required based on the road environment information; and updating the predetermined road model to include the one or more updates.

In some embodiments of the computer-readable medium, the road model may include a three-dimensional spline representing a predetermined path of travel along the at least one road segment. Selectively receiving the road environment information may include a limitation on a frequency of information transmissions received from a particular vehicle. Selectively receiving the road environment information may include a limitation on a frequency of information transmissions received from a group of vehicles. Selectively receiving the road environment information may include a limitation on a frequency of information transmissions received from vehicles traveling within a particular geographic region. Selectively receiving the road environment information may include a limitation on information transmissions received from vehicles to only those transmissions that include a potential discrepancy with respect to at least one aspect of the predetermined road model.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 8 shows a sparse map for providing autonomous vehicle navigation, consistent with the disclosed embodiments.

FIG. 16 illustrates a process of clustering vehicle trajectories associated with vehicles, consistent with the disclosed embodiments.

FIG. 32 illustrates an example optical flow method for determining a distance from a vehicle to a landmark consistent with the disclosed embodiments.

FIG. 61A is a diagrammatic side view representation of an exemplary vehicle consistent with disclosed embodiments.

FIG. 61B is a diagrammatic side view representation of an exemplary vehicle consistent with disclosed embodiments.

FIG. 84A illustrates a plan view of a vehicle traveling on a roadway with multiple parked cars consistent with the disclosed embodiments.

FIG. 84B illustrates a plan view of a vehicle traveling on a roadway with a car intervening directly in front of the vehicle consistent with the disclosed embodiments.

FIG. 84C illustrates a plan view of a vehicle traveling on a roadway with a temporary barrier directly in front of the vehicle consistent with the disclosed embodiments.

FIG. 84D illustrates a plan view of a vehicle traveling on a roadway with temporary roadwork directly in front of the vehicle consistent with the disclosed embodiments.

FIG. 87A illustrates a plan view of a single vehicle traveling on an interstate roadway consistent with the disclosed embodiments.

FIG. 87B illustrates a plan view of a group of vehicles traveling on a city roadway consistent with the disclosed embodiments.

FIG. 87C illustrates a plan view of a vehicle traveling on a roadway within a particular rural geographic region consistent with the disclosed embodiments.

FIG. 87D illustrates a plan view of a vehicle traveling on a roadway with a lane shift consistent with the disclosed embodiments.

FIG. 88 illustrates an example flowchart representing a method for road model management based on selective feedback consistent with the disclosed embodiments.

DETAILED DESCRIPTION

Figure 1:
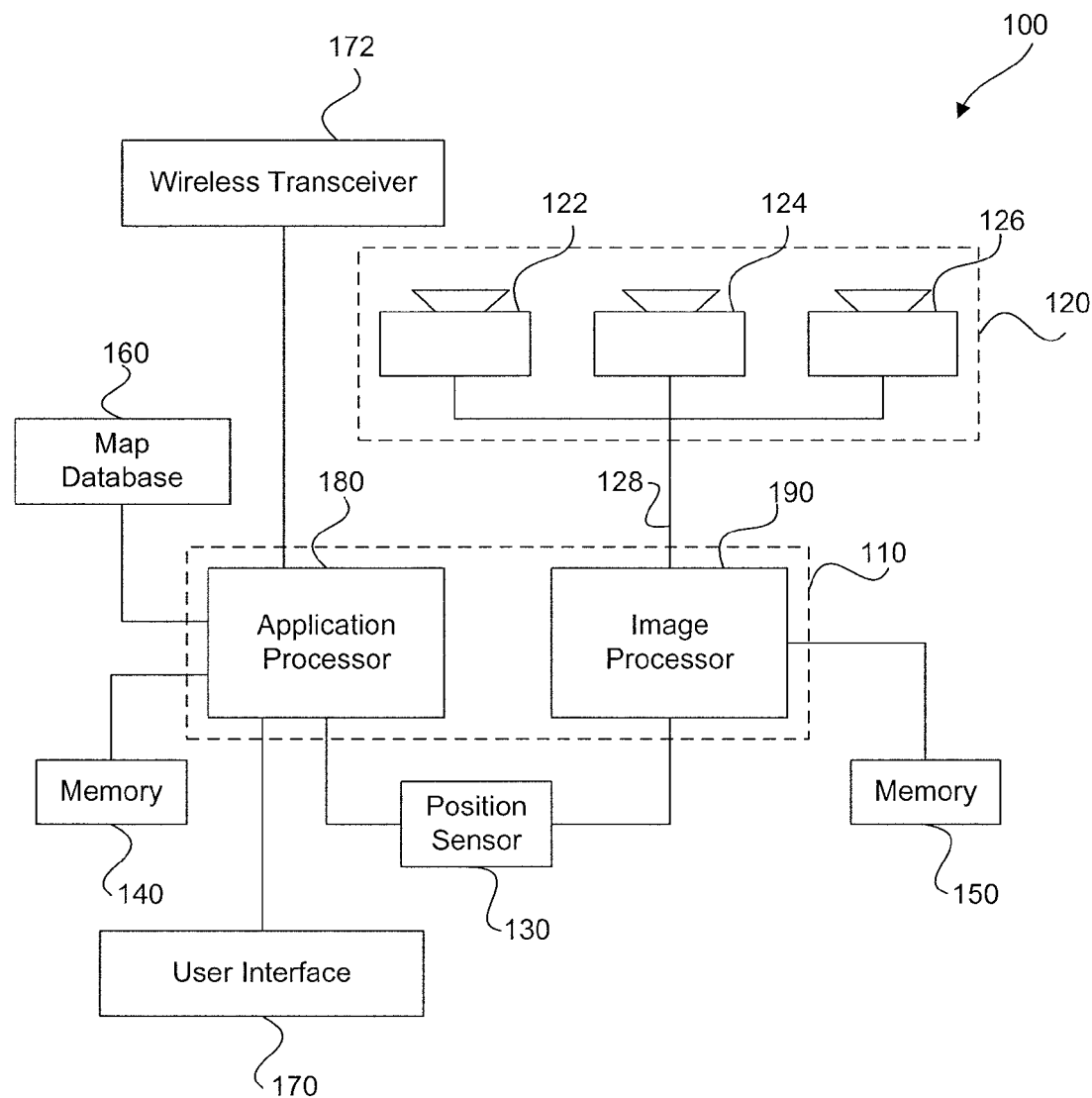
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Autonomous Vehicle Overview

As used throughout this disclosure, the term "autonomous vehicle" refers to a vehicle capable of implementing at least one navigational change without driver input. A "navigational change" refers to a change in one or more of steering, braking, or acceleration of the vehicle. To be autonomous, a vehicle need not be fully automatic (e.g., fully operation without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints), but may leave other aspects to the driver (e.g., braking). In some cases, autonomous vehicles may handle some or all aspects of braking, speed control, and/or steering of the vehicle.

As human drivers typically rely on visual cues and observations order to control a vehicle, transportation infrastructures are built accordingly, with lane markings, traffic signs, and traffic lights are all designed to provide visual information to drivers. In view of these design characteristics of transportation infrastructures, an autonomous vehicle may include a camera and a processing unit that analyzes visual information captured from the environment of the vehicle. The visual information may include, for example, components of the transportation infrastructure (e.g., lane markings, traffic signs, traffic lights, etc.) that are observable by drivers and other obstacles (e.g., other vehicles, pedestrians, debris, etc.). Additionally, an autonomous vehicle may also use stored information, such as information that provides a model of the vehicle's environment when navigating. For example, the vehicle may use GPS data, sensor data (e.g., from an accelerometer, a speed sensor, a suspension sensor, etc.), and/or other map data to provide information related to its environment while it is traveling, and the vehicle (as well as other vehicles) may use the information to localize itself on the model.

In some embodiments in this disclosure, an autonomous vehicle may use information obtained while navigating (e.g., from a camera, GPS device, an accelerometer, a speed sensor, a suspension sensor, etc.). In other embodiments, an autonomous vehicle may use information obtained from past navigations by the vehicle (or by other vehicles) while navigating. In yet other embodiments, an autonomous vehicle may use a combination of information obtained while navigating and information obtained from past navigations. The following sections provide an overview of a system consistent with the disclosed embodiments, following by an overview of a forward-facing imaging system and methods consistent with the system. The sections that follow disclose systems and methods for constructing, using, and updating a sparse map for autonomous vehicle navigation.

System Overview

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, a user interface 170, and a wireless transceiver 172. Processing unit 110 may include one or more processing devices. In some embodiments, processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras), such as image capture device 122, image capture device 124, and image capture device 126. System 100 may also include a data interface 128 communicatively connecting processing device 110 to image acquisition device 120. For example, data interface 128 may include any wired and/or wireless link or links for transmitting image data acquired by image accusation device 120 to processing unit 110.

Wireless transceiver 172 may include one or more devices configured to exchange transmissions over an air interface to one or more networks (e.g., cellular, the Internet, etc.) by use of a radio frequency, infrared frequency, magnetic field, or an electric field. Wireless transceiver 172 may use any known standard to transmit and/or receive data (e.g., Wi-Fi, Bluetooth®, Bluetooth Smart, 802.15.4, ZigBee, etc.).

Both applications processor 180 and image processor 190 may include various types of processing devices. For example, either or both of applications processor 180 and image processor 190 may include a microprocessor, preprocessors (such as an image preprocessor), graphics processors, a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc. and may include various architectures (e.g., x86 processor, ARM®, etc.).

In some embodiments, applications processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture consists of two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed embodiments.

Any of the processing devices disclosed herein may be configured to perform certain functions. Configuring a processing device, such as any of the described EyeQ processors or other controller or microprocessor, to perform certain functions may include programming of computer executable instructions and making those instructions available to the processing device for execution during operation of the processing device. In some embodiments, configuring a processing device may include programming the processing device directly with architectural instructions. In other embodiments, configuring a processing device may include storing executable instructions on a memory that is accessible to the processing device during operation. For example, the processing device may access the memory to obtain and execute the stored instructions during operation.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices. Further, in some embodiments, system 100 may include one or more of processing unit 110 without including other components, such as image acquisition unit 120.

Processing unit 110 may comprise various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., applications processor 180 and/or image processor 190), may control operation of various aspects of system 100. These memory units may include various databases and image processing software. The memory units may include random access memory, read only memory, flash memory, disk drives, optical storage, tape storage, removable storage and/or any other types of storage. In some embodiments, memory units 140, 150 may be separate from the applications processor 180 and/or image processor 190. In other embodiments, these memory units may be integrated into applications processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

In some embodiments, system 100 may include components such as a speed sensor (e.g., a tachometer) for measuring a speed of vehicle 200 and/or an accelerometer for measuring acceleration of vehicle 200.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, applications processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.).

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

Figure 2A:
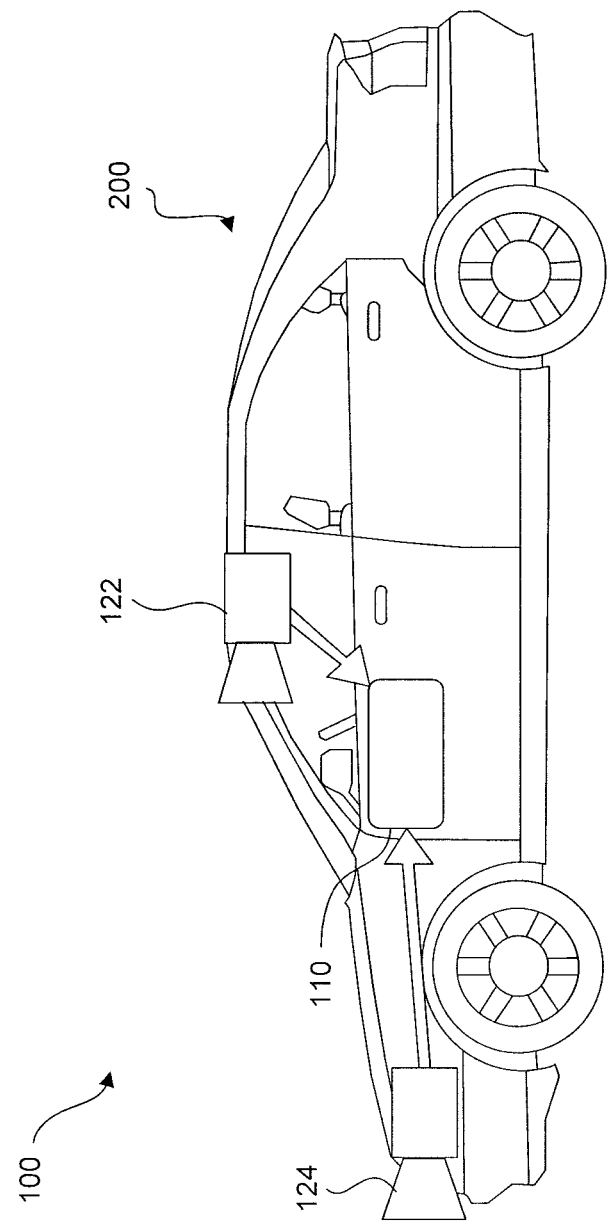
FIG. 2A is a diagrammatic side view representation of an exemplary vehicle including a system consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver. Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

As discussed earlier, wireless transceiver 172 may and/or receive data over one or more networks (e.g., cellular networks, the Internet, etc.). For example, wireless transceiver 172 may upload data collected by system 100 to one or more servers, and download data from the one or more servers. Via wireless transceiver 172, system 100 may receive, for example, periodic or on demand updates to data stored in map database 160, memory 140, and/or memory 150. Similarly, wireless transceiver 172 may upload any data (e.g., images captured by image acquisition unit 120, data received by position sensor 130 or other sensors, vehicle control systems, etc.) from by system 100 and/or any data processed by processing unit 110 to the one or more servers.

System 100 may upload data to a server (e.g., to the cloud) based on a privacy level setting. For example, system 100 may implement privacy level settings to regulate or limit the types of data (including metadata) sent to the server that may uniquely identify a vehicle and or driver/owner of a vehicle. Such settings may be set by user via, for example, wireless transceiver 172, be initialized by factory default settings, or by data received by wireless transceiver 172.

In some embodiments, system 100 may upload data according to a "high" privacy level, and under setting a setting, system 100 may transmit data (e.g., location information related to a route, captured images, etc.) without any details about the specific vehicle and/or driver/owner. For example, when uploading data according to a "high" privacy setting, system 100 may not include a vehicle identification number (VIN) or a name of a driver or owner of the vehicle, and may instead of transmit data, such as captured images and/or limited location information related to a route.

Other privacy levels are contemplated. For example, system 100 may transmit data to a server according to an "intermediate" privacy level and include additional information not included under a "high" privacy level, such as a make and/or model of a vehicle and/or a vehicle type (e.g., a passenger vehicle, sport utility vehicle, truck, etc.). In some embodiments, system 100 may upload data according to a "low" privacy level. Under a "low" privacy level setting, system 100 may upload data and include information sufficient to uniquely identify a specific vehicle, owner/driver, and/or a portion or entirely of a route traveled by the vehicle. Such "low" privacy level data may include one or more of, for example, a VIN, a driver/owner name, an origination point of a vehicle prior to departure, an intended destination of the vehicle, a make and/or model of the vehicle, a type of the vehicle, etc.

Figure 2B:
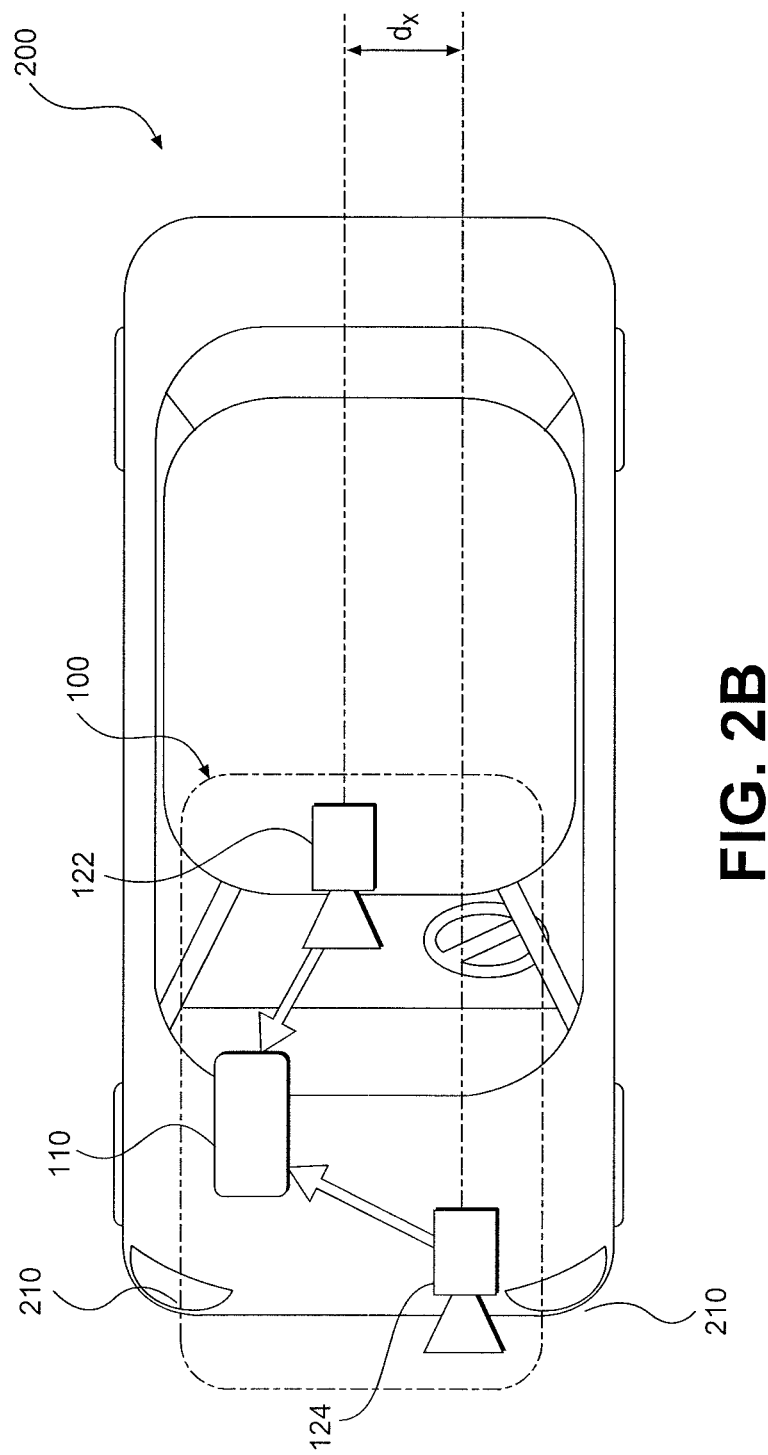
FIG. 2B is a diagrammatic top view representation of the vehicle and system shown in FIG. 2A consistent with the disclosed embodiments.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
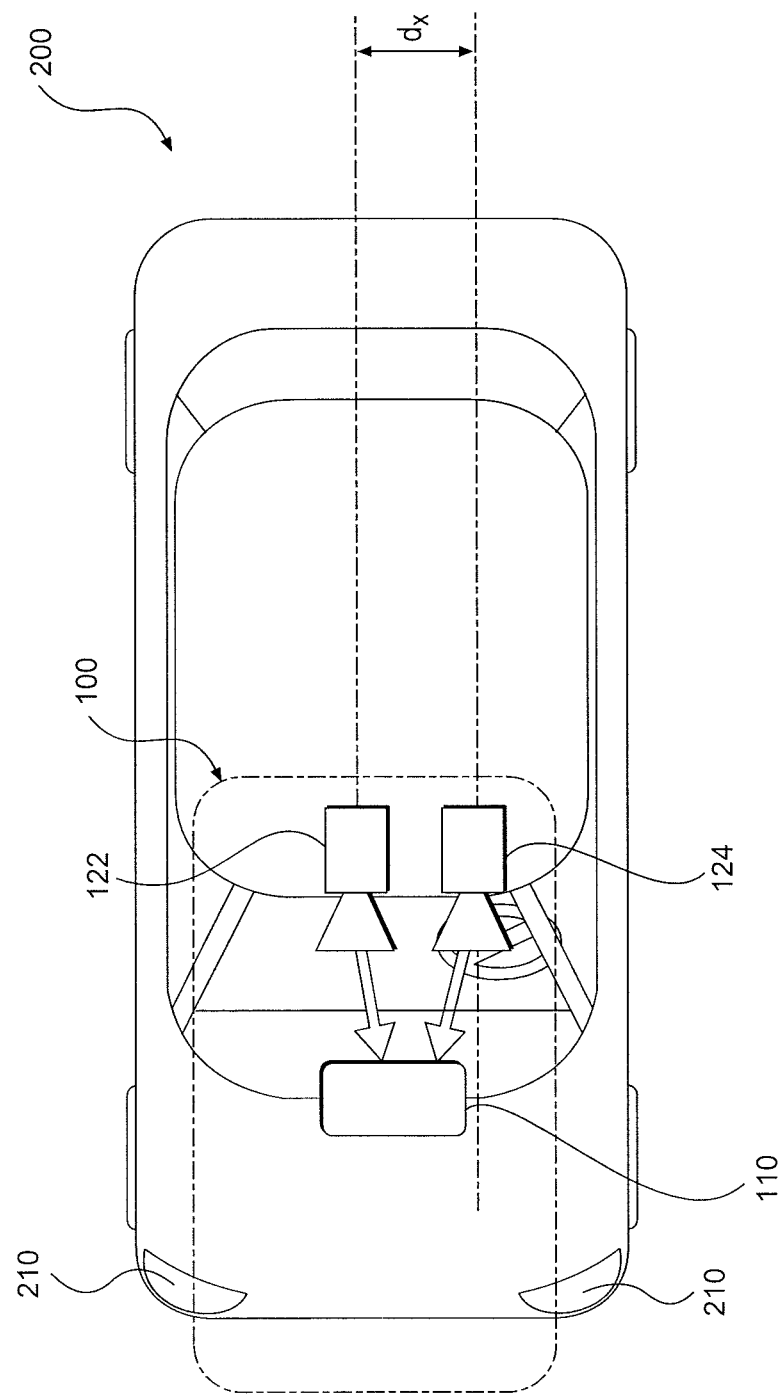
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
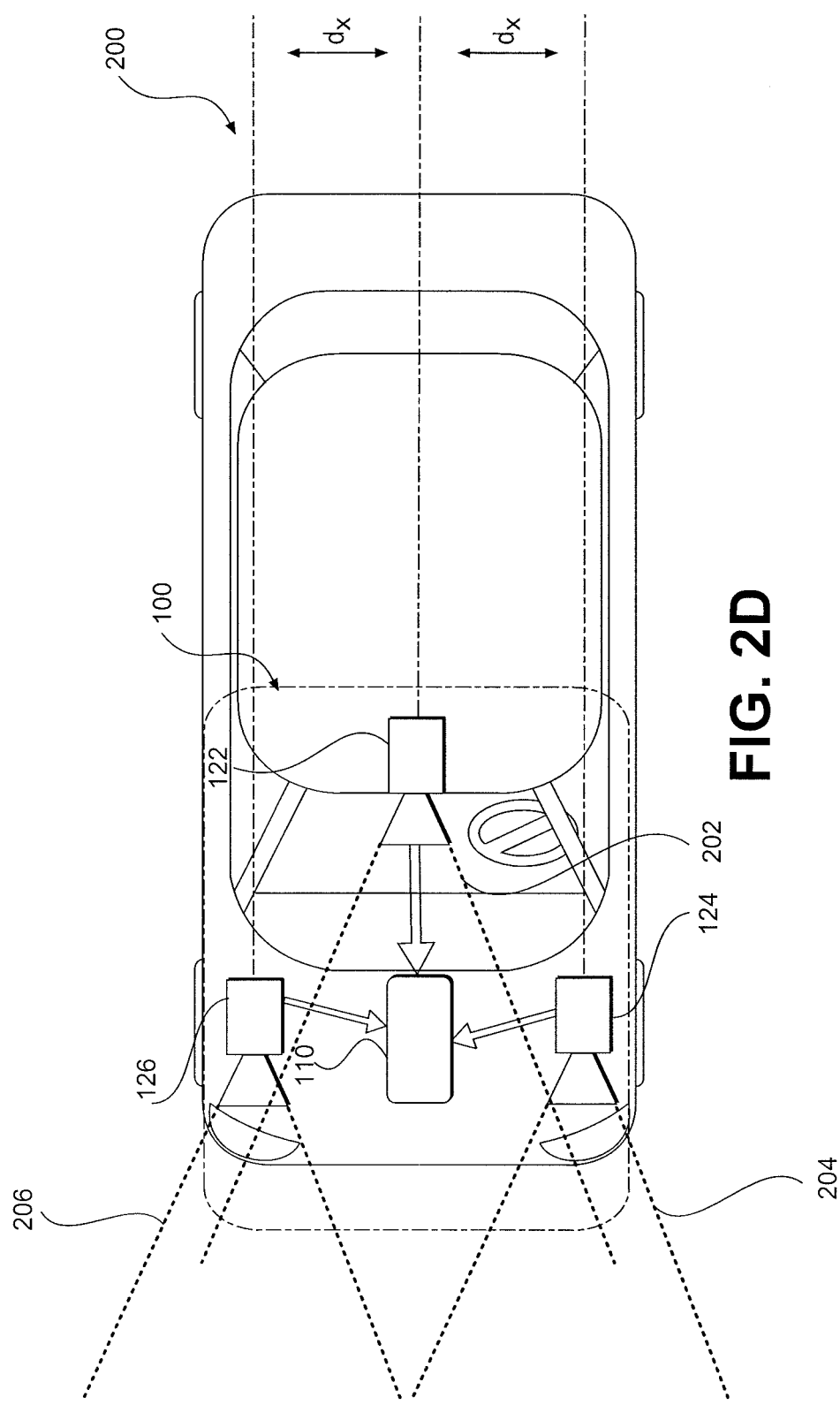
FIG. 2D is a diagrammatic top view representation of yet another embodiment of a vehicle including a system consistent with the disclosed embodiments.
Figure 2E:
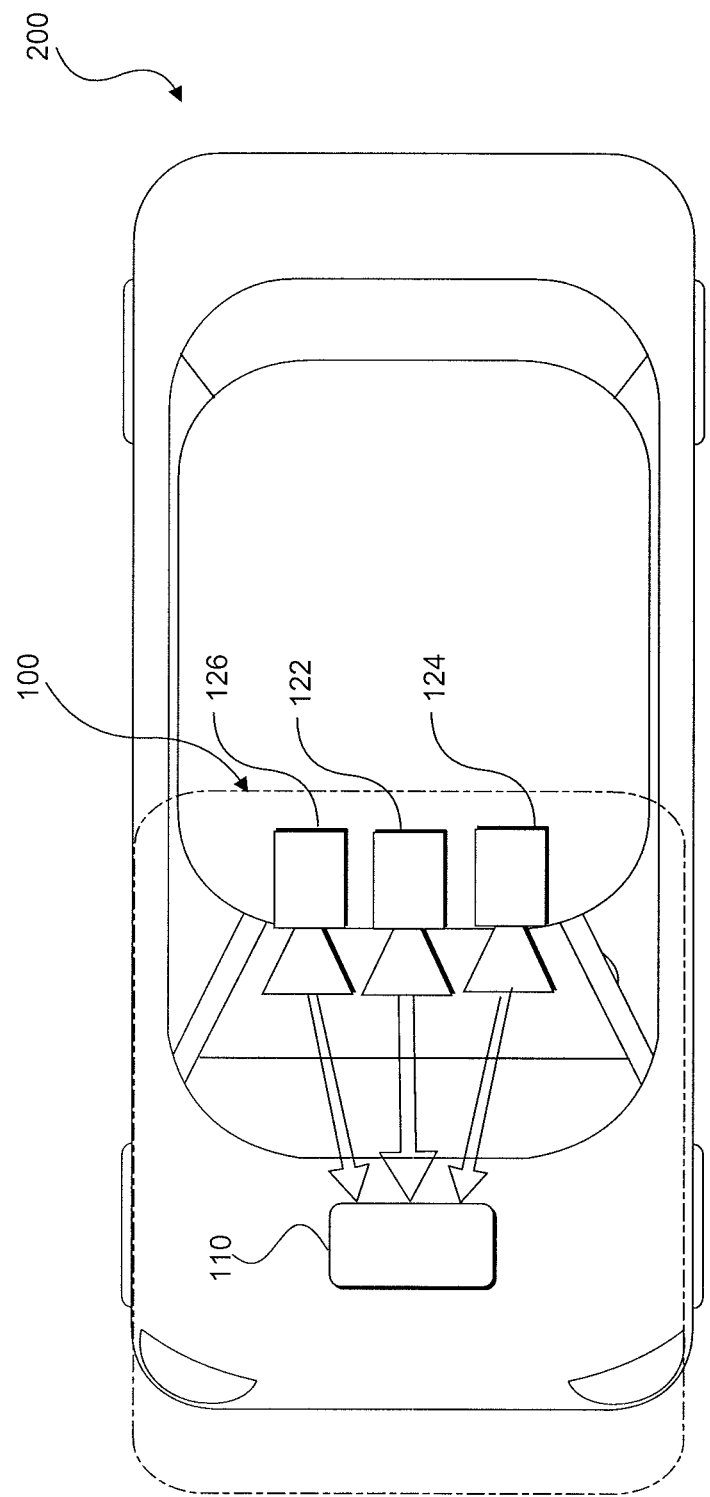
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, and other types of vehicles.

The first image capture device 122 may include any suitable type of image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV in the range of 100 to 180 degrees. In some embodiments, image capture device 122 may include a wide angle bumper camera or one with up to a 180 degree FOV. In some embodiments, image capture device 122 may be a 7.2M pixel image capture device with an aspect ratio of about 2:1 (e.g., H×V=3800×1900 pixels) with about 100 degree horizontal FOV. Such an image capture device may be used in place of a three image capture device configuration. Due to significant lens distortion, the vertical FOV of such an image capture device may be significantly less than 50 degrees in implementations in which the image capture device uses a radially symmetric lens. For example, such a lens may not be radially symmetric which would allow for a vertical FOV greater than 50 degrees with 100 degree horizontal FOV.

The first image capture device 122 may acquire a plurality of first images relative to a scene associated with the vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

In some embodiments, one or more of the image capture devices (e.g., image capture devices 122, 124, and 126) disclosed herein may constitute a high resolution imager and may have a resolution greater than 5M pixel, 7M pixel, 10M pixel, or greater.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOVs (such as FOVs 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with the vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by $d_x$, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

Image capture devices 122 may have any suitable resolution capability (e.g., number of pixels associated with the image sensor), and the resolution of the image sensor(s) associated with the image capture device 122 may be higher, lower, or the same as the resolution of the image sensor(s) associated with image capture devices 124 and 126. In some embodiments, the image sensor(s) associated with image capture device 122 and/or image capture devices 124 and 126 may have a resolution of 640×480, 1024×768, 1280×960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments, the fields of view of image capture devices 122, 124, and 126 may be aligned such that a center of the narrower FOV image capture devices 124 and/or 126 may be located in a lower half of the field of view of the wider FOV device 122.

Figure 2F:
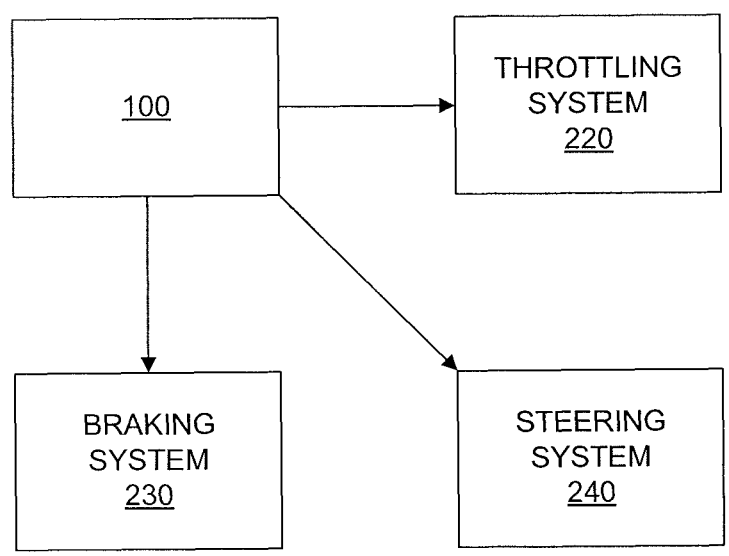
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 24 indicating operating conditions of vehicle 200 (e.g., speed, whether vehicle 200 is braking and/or turning, etc.). Further details are provided in connection with FIGS. 4-7, below.

Figure 3A:
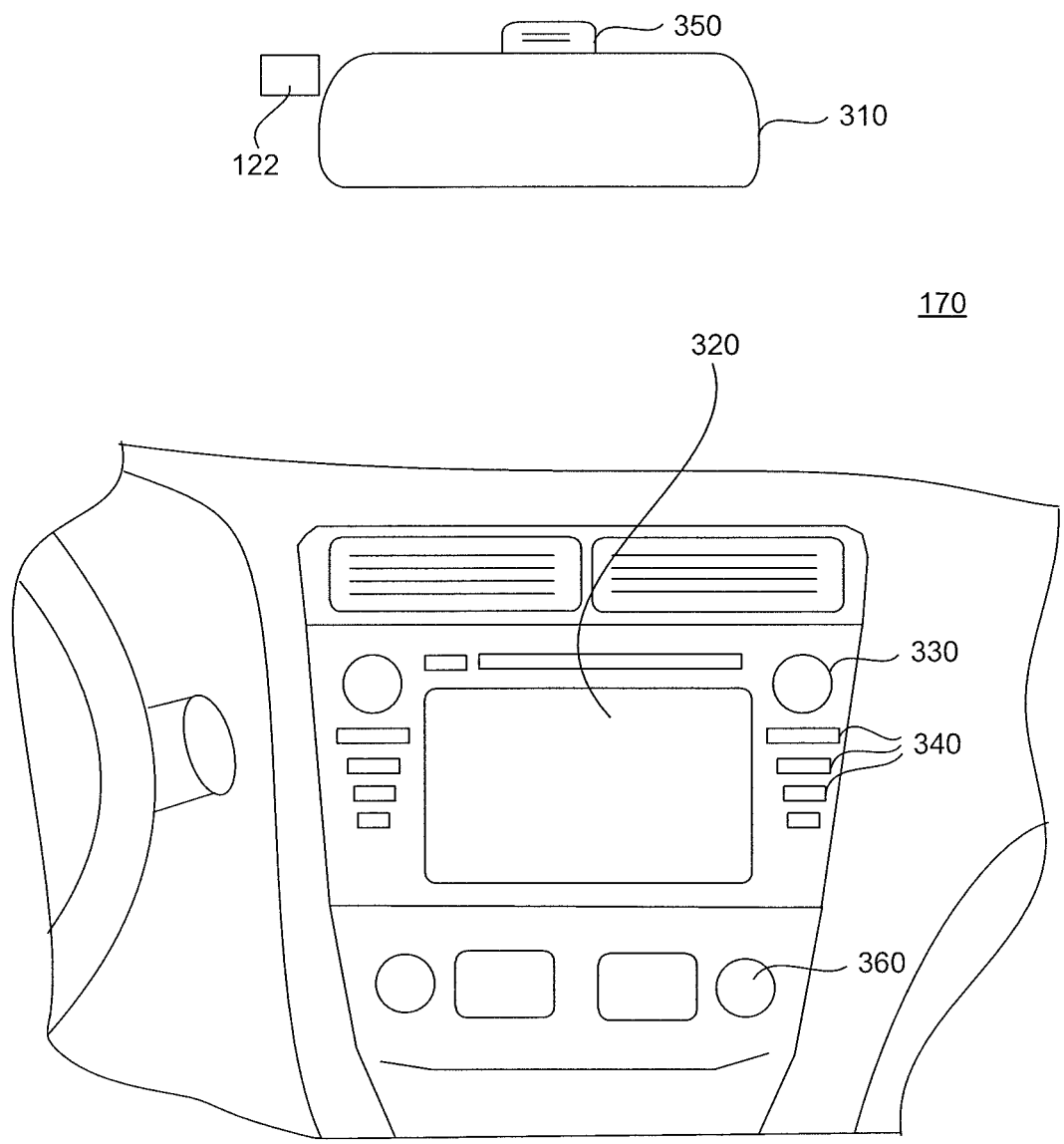
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
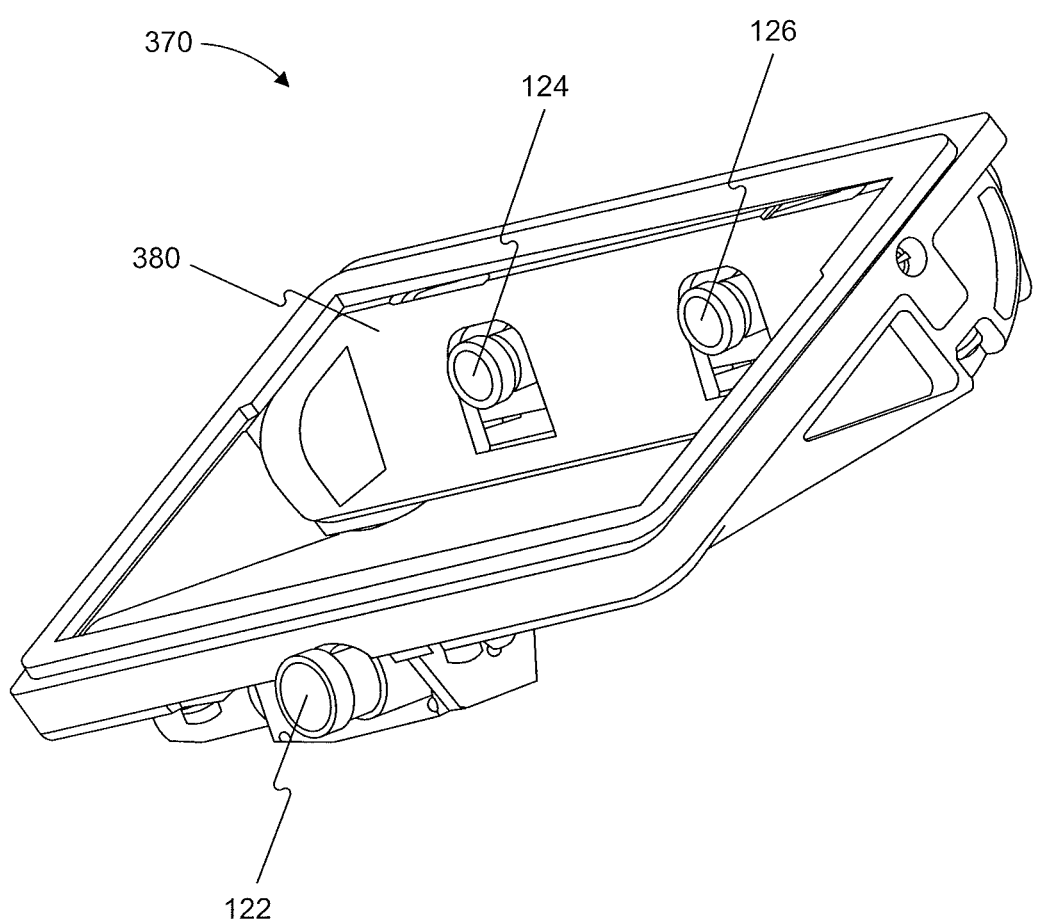
FIG. 3B is an illustration of an example of a camera mount that is configured to be positioned behind a rearview mirror and against a vehicle windshield consistent with the disclosed embodiments.
Figure 3C:
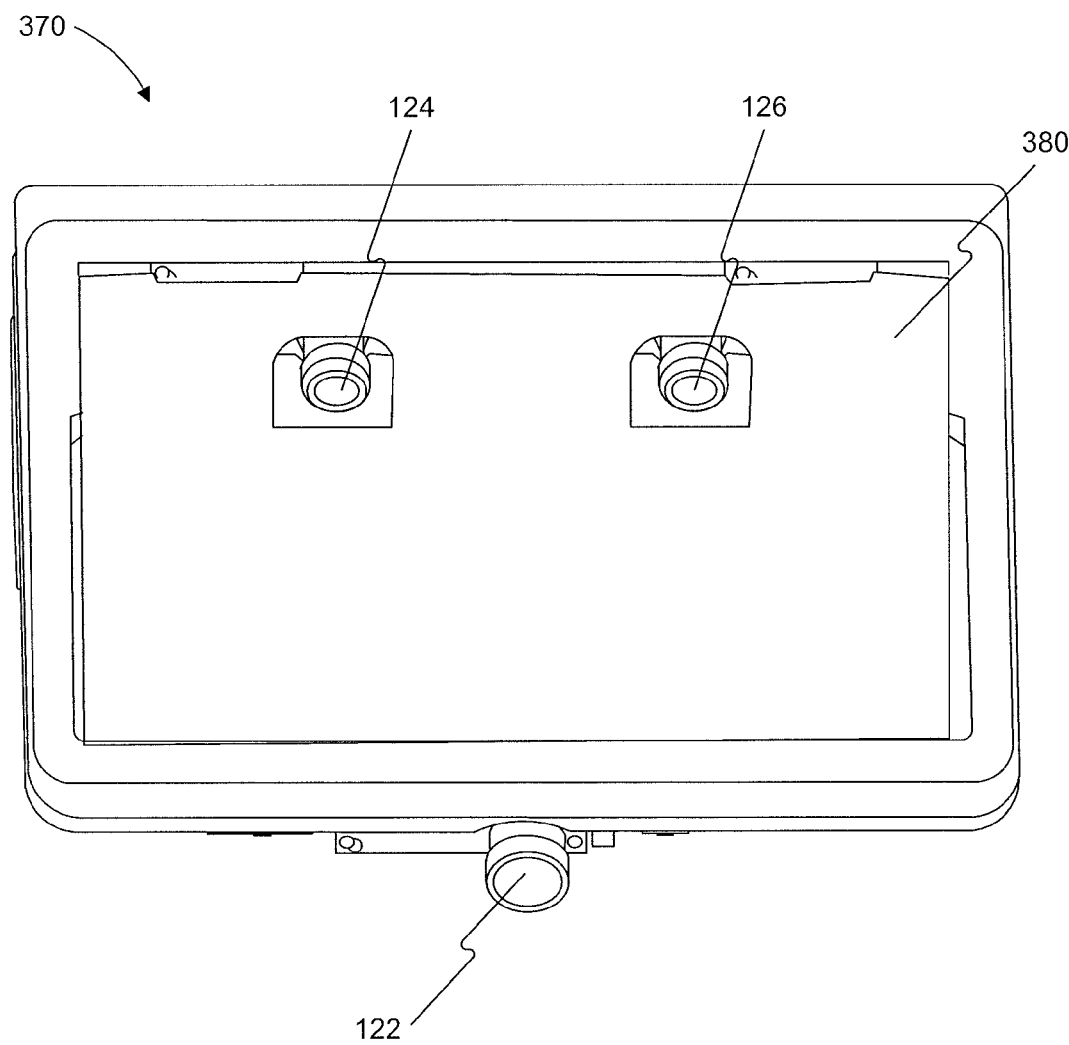
FIG. 3C is an illustration of the camera mount shown in FIG. 3B from a different perspective consistent with the disclosed embodiments.
Figure 3D:
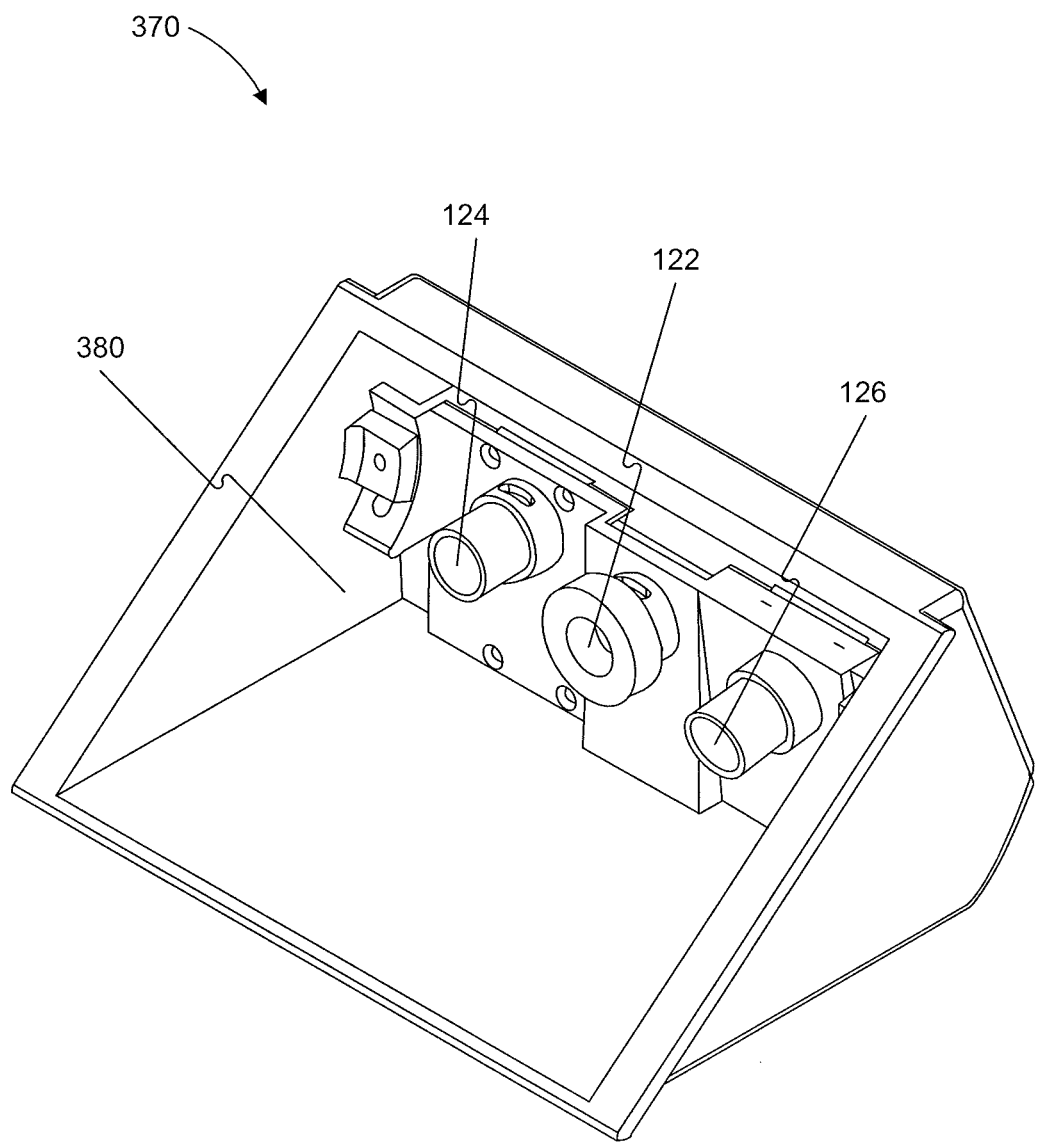
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that it aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings and/or alerts to vehicle occupants based on the analysis of the collected data. Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122-126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122-126 may be positioned behind rearview mirror 310 and positioned substantially side-by-side (e.g., 6 cm apart). Further, in some embodiments, as discussed above, one or more of image capture devices 122-126 may be mounted behind glare shield 380 that is flush with the windshield of vehicle 200. Such shielding may act to minimize the impact of any reflections from inside the car on image capture devices 122-126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122-126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine the 3D reconstruction with 3D map data or with 3D information calculated based on information from another camera.

The second processing device may receive images from main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images.

The third processing device may receive images from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
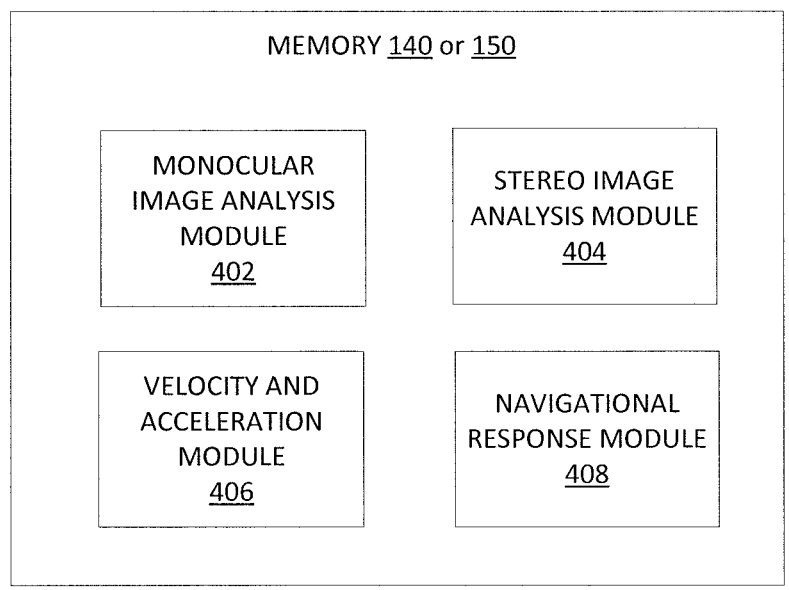
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, application processor 180 and/or image processor 190 may execute the instructions stored in any of modules 402-408 included in memory 140. One of skill in the art will understand that references in the following discussions to processing unit 110 may refer to application processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with navigational response module 408.

In one embodiment, stereo image analysis module 404 may store instructions (such as computer vision software) which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Figure 5A:
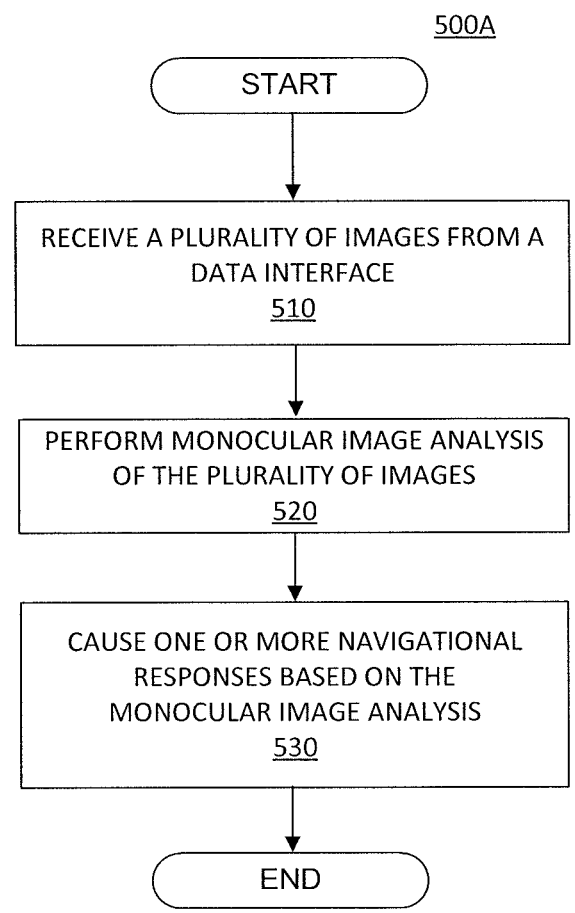
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
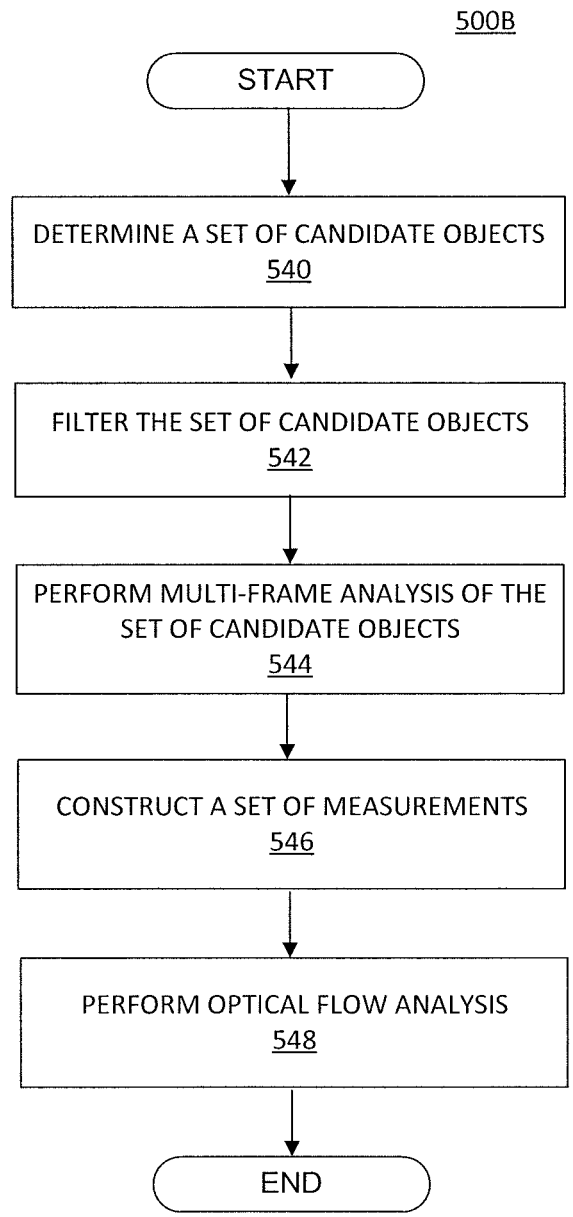
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Figure 5C:
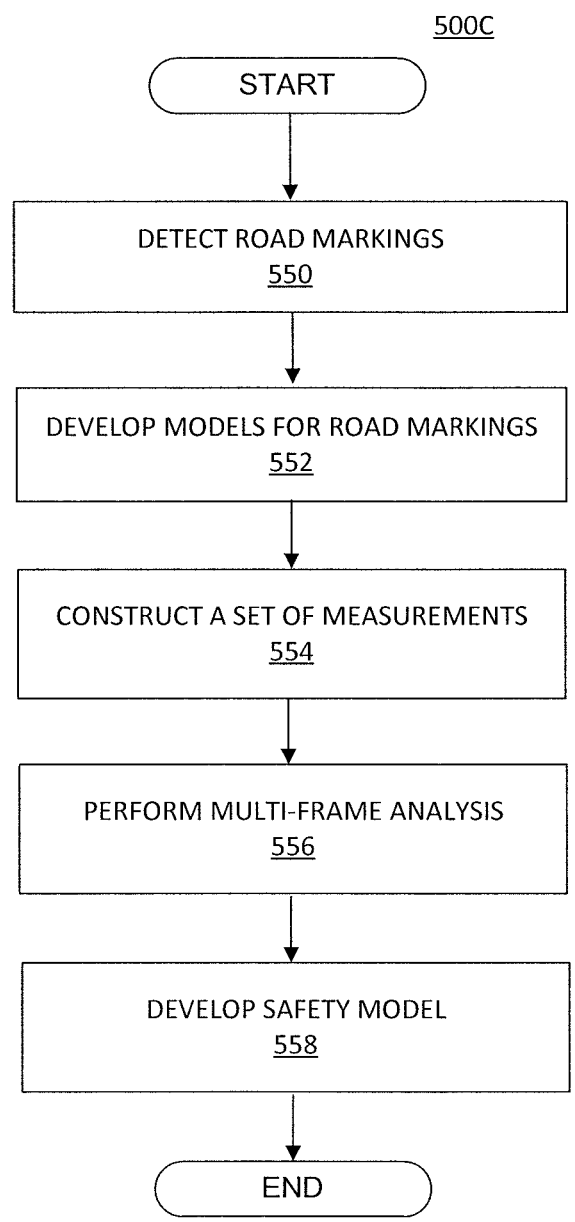
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550-556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
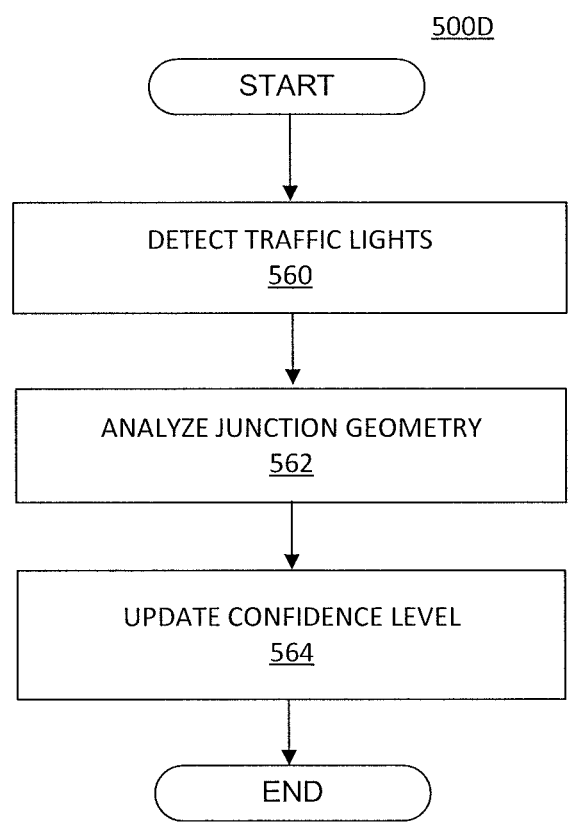
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, Processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560-564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
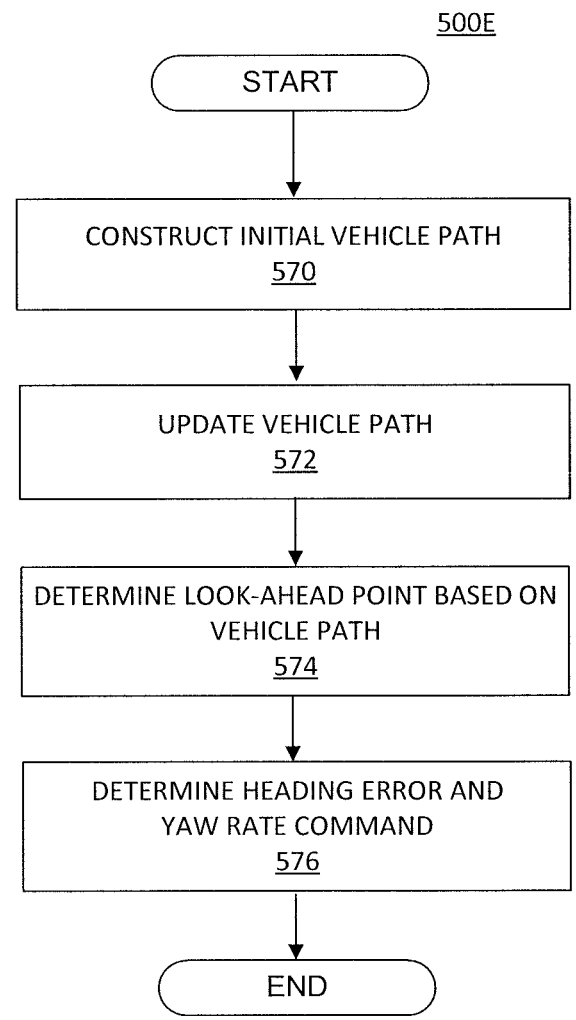
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and the distance $d_i$ between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance $d_i$ described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as $(x_l, z_l)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the arctangent of the look-ahead point, e.g., arctan $(x_l/z_l)$. Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance).

Figure 5F:
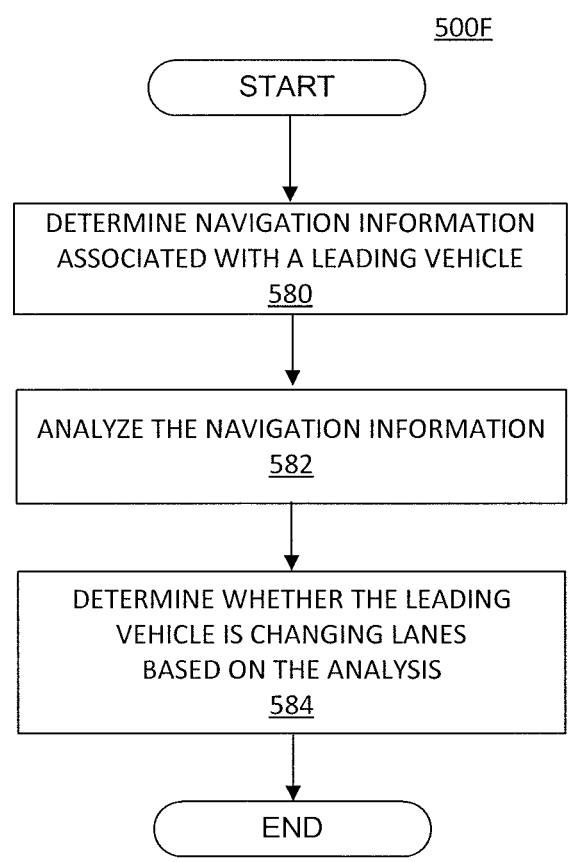
FIG. 5F is a flowchart showing an exemplary process for determining whether a leading vehicle is changing lanes consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2+\delta_x^2)/2/(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights.

Figure 6:
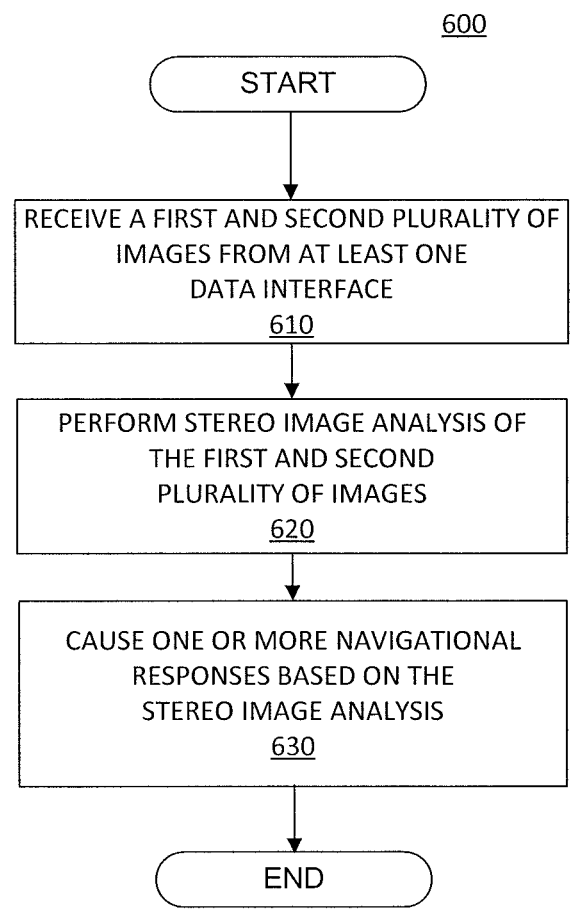
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 110 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing if the two image streams. For example, position, velocity, and/or acceleration relative to vehicle 200 may be determined based on trajectories, positions, movement characteristics, etc. of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof.

Figure 7:
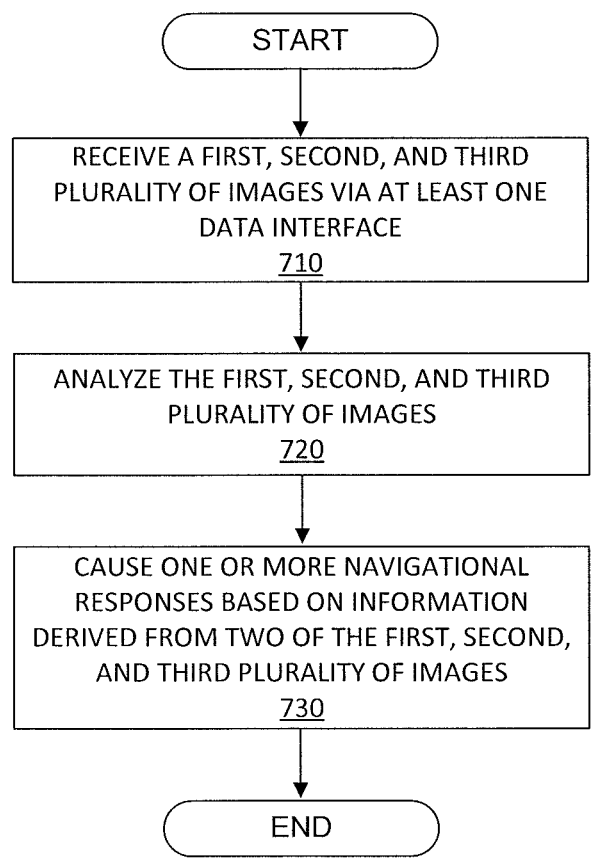
FIG. 7 is a flowchart showing an exemplary process for causing one or more navigational responses based on an analysis of three sets of images consistent with the disclosed embodiments.

FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 200 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126—including their respective locations and fields of view 202, 204, and 206—may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof.

Sparse Road Model for Autonomous Vehicle Navigation

In some embodiments, the disclosed systems and methods may use a sparse map for autonomous vehicle navigation. For example, the sparse map may provide sufficient information for navigating an autonomous vehicle without storing and/or updating a large quantity of data. As discussed below in further detail, an autonomous vehicle may use the sparse map to navigate one or more roads based on one or more stored trajectories.

Sparse Map for Autonomous Vehicle Navigation

In some embodiments, the disclosed systems and methods may use a sparse map for autonomous vehicle navigation. For example, the sparse map may provide sufficient information for navigation without requiring excessive data storage or data transfer rates. As discussed below in further detail, a vehicle (which may be an autonomous vehicle) may use the sparse map to navigate one or more roads. For example, in some embodiments, the sparse map may include data related to a road and potentially landmarks along the road that may be sufficient for vehicle navigation, but which also exhibit small data footprints. For example, the sparse data maps described in detail below may require significantly less storage space and data transfer bandwidth as compared with digital maps including detailed map information, such as image data collected along a road. For example, rather than storing detailed representations of a road segment, the sparse data map may store three dimensional polynomial representations of preferred vehicle paths along a road. These paths may require very little data storage space. Further, in the described sparse data maps, landmarks may be identified and included in the sparse map road model to aid in navigation. These landmarks may be located at any spacing suitable for enabling vehicle navigation, but in some cases, such landmarks need not be identified and included in the model at high densities and short spacings. Rather, in some cases, navigation may be possible based on landmarks that are spaced apart by at least 50 meters, at least 100 meters, at least 500 meters, at least 1 kilometer, or at least 2 kilometers. As will be discussed in more detail in other sections, the sparse map may be generated based on data collected or measured by vehicles equipped with various sensors and devices, such as image capture devices, Global Positioning System sensors, motion sensors, etc., as the vehicles travel along roadways. In some cases, the sparse map may be generated based on data collected during multiple drives of one or more vehicles along a particular roadway.

Consistent with disclosed embodiments, an autonomous vehicle system may use a sparse map for navigation. At the core of the sparse maps, one or more three-dimensional contours may represent predetermined trajectories that autonomous vehicles may traverse as they move along associated road segments. The sparse maps may also include data representing one or more road features. Such road features may include recognized landmarks, road signature profiles, and any other road-related features useful in navigating a vehicle. The sparse maps may enable autonomous navigation of a vehicle based on relatively small amounts of data included in the sparse map. For example, rather than including detailed representations of a road, such as road edges, road curvature, images associated with road segments, or data detailing other physical features associated with a road segment, the disclosed embodiments of the sparse map may require relatively little storage space (and relatively little bandwidth when portions of the sparse map are transferred to a vehicle), but may still adequately provide for autonomous vehicle navigation. The small data footprint of the disclosed sparse maps, discussed in further detail below, may be achieved in some embodiments by storing representations of road-related elements that require small amounts of data, but still enable autonomous navigation. For example, rather than storing detailed representations of various aspects of a road, the disclosed sparse maps may store polynomial representations of one or more trajectories that a vehicle may follow along the road. Thus, rather than storing (or having to transfer) details regarding the physical nature of the road to enable navigation along the road, using the disclosed sparse maps, a vehicle may be navigated along a particular road segment without, in some cases, having to interpret physical aspects of the road, but rather, by aligning its path of travel with a trajectory (e.g., a polynomial spline) along the particular road segment. In this way, the vehicle may be navigated based mainly upon the stored trajectory (e.g., a polynomial spline) that may require much less storage space than an approach involving storage of roadway images, road parameters, road layout, etc.

In addition to the stored polynomial representations of trajectories along a road segment, the disclosed sparse maps may also include small data objects that may represent a road feature. In some embodiments, the small data objects may include digital signatures, which are derived from a digital image (or a digital signal) that was obtained by a sensor (e.g., a camera or other sensor, such as a suspension sensor) onboard a vehicle traveling along the road segment. The digital signature may have a reduced size relative to the signal that was acquired by the sensor. In some embodiments, the digital signature may be created to be compatible with a classifier function that is configured to detect and to identify the road feature from the signal that is acquired by the sensor, for example during a subsequent drive. In some embodiments, a digital signature may be created such that it has a footprint that is as small as possible, while retaining the ability to correlate or match the road feature with the stored signature based on an image (or a digital signal generated by a sensor, if the stored signature is not based on an image and/or includes other data) of the road feature that is captured by a camera onboard a vehicle traveling along the same road segment at a subsequent time. In some embodiments, a size of the data objects may be further associated with a uniqueness of the road feature. For example, for a road feature that is detectable by a camera onboard a vehicle, and where the camera system onboard the vehicle is coupled to a classifier which is capable of distinguishing the image data corresponding to that road feature as being associated with a particular type of road feature, for example, a road sign, and where such a road sign is locally unique in that area (e.g., there is no identical road sign or road sign of the same type nearby), it may be sufficient to store data indicating the type of the road feature and its location.

As will be discussed in further detail below, road features (e.g., landmarks along a road segment) may be stored as small data objects that may represent a road feature in relatively few bytes, while at the same time providing sufficient information for recognizing and using such a feature for navigation. In just one example, a road sign may be identified as a recognized landmark on which navigation of a vehicle may be based. A representation of the road sign may be stored in the sparse map to include, e.g., a few bytes of data indicating a type of landmark (e.g., a stop sign) and a few bytes of data indicating a location of the landmark. Navigating based on such data-light representations of the landmarks (e.g., using representations sufficient for locating, recognizing, and navigating based upon the landmarks) may provide a desired level of navigational functionality associated with sparse maps without significantly increasing the data overhead associated with the sparse maps. This lean representation of landmarks (and other road features) may take advantage of the sensors and processors included onboard such vehicles that are configured to detect, identify, and/or classify certain road features. When, for example, a sign or even a particular type of a sign is locally unique (e.g., when there is no other sign or no other sign of the same type) in a given area, the sparse map may use data indicating a type of a landmark (a sign or a specific type of sign), and during navigation (e.g., autonomous navigation) when a camera onboard an autonomous vehicle captures an image of the area including a sign (or of a specific type of sign), the processor may process the image, detect the sign (if indeed present in the image), classify it as a sign (or as a specific type of sign), and correlate its location with the location of the sign as stored in the sparse map.

In some embodiments, an autonomous vehicle may include a vehicle body and a processor configured to receive data included in a sparse map and generate navigational instructions for navigating the vehicle along a road segment based on the data in the sparse map.

FIG. 8 shows a sparse map 800 that vehicle 200 (which may be an autonomous vehicle) may access for providing autonomous vehicle navigation. Sparse map 800 may be stored in a memory, such as memory 140 or 150. Such memory devices may include any types of non-transitory storage devices or computer-readable media. For example, in some embodiments, memory 140 or 150 may include hard drives, compact discs, flash memory, magnetic based memory devices, optical based memory devices, etc. In some embodiments, sparse map 800 may be stored in a database (e.g., map database 160) that may be stored in memory 140 or 150, or other types of storage devices.

In some embodiments, sparse map 800 may be stored on a storage device or a non-transitory computer-readable medium provided onboard vehicle 200 (e.g., a storage device included in a navigation system onboard vehicle 200). A processor (e.g., processing unit 110) provided on vehicle 200 may access sparse map 800 stored in the storage device or computer-readable medium provided onboard vehicle 200 in order to generate navigational instructions for guiding the autonomous vehicle 200 as it traverses a road segment.

Sparse map 800 need not be stored locally with respect to a vehicle, however. In some embodiments, sparse map 800 may be stored on a storage device or computer-readable medium provided on a remote server that communicates with vehicle 200 or a device associated with vehicle 200. A processor (e.g., processing unit 110) provided on vehicle 200 may receive data included in sparse map 800 from the remove server and may execute the data for guiding the autonomous driving of vehicle 200. In such embodiments, sparse map 800 may be made accessible to a plurality of vehicles traversing various road segments (e.g., tens, hundreds, thousands, or millions of vehicles, etc.). It should be noted also that sparse map 800 may include multiple sub-maps. For example, in some embodiments, sparse map 800 may include hundreds, thousands, millions, or more, of sub-maps that can be used in navigating a vehicle. Such sub-maps may be referred to as local maps, and a vehicle traveling along a roadway may access any number of local maps relevant to a location in which the vehicle is traveling. The local map sections of sparse map 800 may be stored with a Global Navigation Satellite System (GNSS) key as an index to the database of sparse map 800. Thus, while computation of steering angles for navigating a host vehicle in the present system may be performed without reliance upon a GNSS position of the host vehicle, road features, or landmarks, such GNSS information may be used for retrieval of relevant local maps.

Collection of data and generation of sparse map 800 is covered in detail in other sections. In general, however, sparse map 800 may be generated based on data collected from one or more vehicles as they travel along roadways. For example, using sensors aboard the one or more vehicles (e.g., cameras, speedometers, GPS, accelerometers, etc.), the trajectories that the one or more vehicles travel along a roadway may be recorded, and the polynomial representation of a preferred trajectory for vehicles making subsequent trips along the roadway may be determined based on the collected trajectories travelled by the one or more vehicles. Similarly, data collected by the one or more vehicles may aid in identifying potential landmarks along a particular roadway. Data collected from traversing vehicles may also be used to identify road profile information, such as road width profiles, road roughness profiles, traffic line spacing profiles, etc. Using the collected information, sparse map 800 may be generated and distributed (e.g., for local storage or via on-the-fly data transmission) for use in navigating one or more autonomous vehicles. Map generation may not end upon initial generation of the map, however. As will be discussed in greater detail in other sections, sparse map 800 may be continuously or periodically updated based on data collected from vehicles as those vehicles continue to traverse roadways included in sparse map 800.

Data recorded in sparse map 800 may include position information based on Global Positioning System (GPS) data. For example, location information may be included in sparse map 800 for various map elements, including, for example, landmark locations, road profile locations, etc. Locations for map elements included in sparse map 800 may be obtained using GPS data collected from vehicles traversing a roadway. For example, a vehicle passing an identified landmark may determine a location of the identified landmark using GPS position information associated with the vehicle and a determination of a location of the identified landmark relative to the vehicle (e.g., based on image analysis of data collected from one or more cameras on board the vehicle). Such location determinations of an identified landmark (or any other feature included in sparse map 800) may be repeated as additional vehicles pass the location of the identified landmark. Some or all of the additional location determinations can be used to refine the location information stored in sparse map 800 relative to the identified landmark. For example, in some embodiments, multiple position measurements relative to a particular feature stored in sparse map 800 may be averaged together. Any other mathematical operations, however, may also be used to refine a stored location of a map element based on a plurality of determined locations for the map element.

The sparse map of the disclosed embodiments may enable autonomous navigation of a vehicle using relatively small amounts of stored data. In some embodiments, sparse map 800 may have a data density (e.g., including data representing the target trajectories, landmarks, and any other stored road features) of less than 2 MB per kilometer of roads, less than 1 MB per kilometer of roads, less than 500 kB per kilometer of roads, or less than 100 kB per kilometer of roads. In some embodiments, the data density of sparse map 800 may be less than 10 kB per kilometer of roads or even less than 2 kB per kilometer of roads (e.g., 1.6 kB per kilometer), or no more than 10 kB per kilometer of roads, or no more than 20 kB per kilometer of roads. In some embodiments, most if not all of the roadways of the United States may be navigated autonomously using a sparse map having a total of 4 GB or less of data. These data density values may represent an average over an entire sparse map 800, over a local map within sparse map 800, and/or over a particular road segment within sparse map 800.

As noted, sparse map 800 may include representations of a plurality of target trajectories 810 for guiding autonomous driving or navigation along a road segment. Such target trajectories may be stored as three-dimensional splines. The target trajectories stored in sparse map 800 may be determined based on two or more reconstructed trajectories of prior traversals of vehicles along a particular road segment. A road segment may be associated with a single target trajectory or multiple target trajectories. For example, on a two lane road, a first target trajectory may be stored to represent an intended path of travel along the road in a first direction, and a second target trajectory may be stored to represent an intended path of travel along the road in another direction (e.g., opposite to the first direction). Additional target trajectories may be stored with respect to a particular road segment. For example, on a multi-lane road one or more target trajectories may be stored representing intended paths of travel for vehicles in one or more lanes associated with the multi-lane road. In some embodiments, each lane of a multi-lane road may be associated with its own target trajectory. In other embodiments, there may be fewer target trajectories stored than lanes present on a multi-lane road. In such cases, a vehicle navigating the multi-lane road may use any of the stored target trajectories to guides its navigation by taking into account an amount of lane offset from a lane for which a target trajectory is stored (e.g., if a vehicle is traveling in the left most lane of a three lane highway, and a target trajectory is stored only for the middle lane of the highway, the vehicle may navigate using the target trajectory of the middle lane by accounting for the amount of lane offset between the middle lane and the left-most lane when generating navigational instructions).

In some embodiments, the target trajectory may represent an ideal path that a vehicle should take as the vehicle travels. The target trajectory may be located, for example, at an approximate center of a lane of travel. In other cases, the target trajectory may be located elsewhere relative to a road segment. For example, a target trajectory may approximately coincide with a center of a road, an edge of a road, or an edge of a lane, etc. In such cases, navigation based on the target trajectory may include a determined amount of offset to be maintained relative to the location of the target trajectory. Moreover, in some embodiments, the determined amount of offset to be maintained relative to the location of the target trajectory may differ based on a type of vehicle (e.g., a passenger vehicle including two axles may have a different offset from a truck including more than two axles along at least a portion of the target trajectory).

Sparse map 800 may also include data relating to a plurality of predetermined landmarks 820 associated with particular road segments, local maps, etc. As discussed in detail in other sections, these landmarks may be used in navigation of the autonomous vehicle. For example, in some embodiments, the landmarks may be used to determine a current position of the vehicle relative to a stored target trajectory. With this position information, the autonomous vehicle may be able to adjust a heading direction to match a direction of the target trajectory at the determined location.

The plurality of landmarks 820 may be identified and stored in sparse map 800 at any suitable spacing. In some embodiments, landmarks may be stored at relatively high densities (e.g., every few meters or more). In some embodiments, however, significantly larger landmark spacing values may be employed. For example, in sparse map 800, identified (or recognized) landmarks may be spaced apart by 10 meters, 20 meters, 50 meters, 100 meters, 1 kilometer, or 2 kilometers. In some cases, the identified landmarks may be located at distances of even more than 2 kilometers apart. Between landmarks, and therefore between determinations of vehicle position relative to a target trajectory, the vehicle may navigate based on dead reckoning in which it uses sensors to determine its ego motion and estimate its position relative to the target trajectory. Because errors may accumulate during navigation by dead reckoning, over time the position determinations relative to the target trajectory may become increasingly less accurate. The vehicle may use landmarks occurring in sparse map 800 (and their known locations) to remove the dead reckoning-induced errors in position determination. In this way, the identified landmarks included in sparse map 800 may serve as navigational anchors from which an accurate position of the vehicle relative to a target trajectory may be determined. Because a certain amount of error may be acceptable in position location, an identified landmark need not always be available to an autonomous vehicle. Rather, suitable navigation may be possible even based on landmark spacings, as noted above, of 10 meters, 20 meters, 50 meters, 100 meters, 500 meters, 1 kilometer, 2 kilometers, or more. In some embodiments, a density of 1 identified landmark every 1 km of road may be sufficient to maintain a longitudinal position determination accuracy within 1 m. Thus, not every potential landmark appearing along a road segment need be stored in sparse map 800.

Figure 9A:
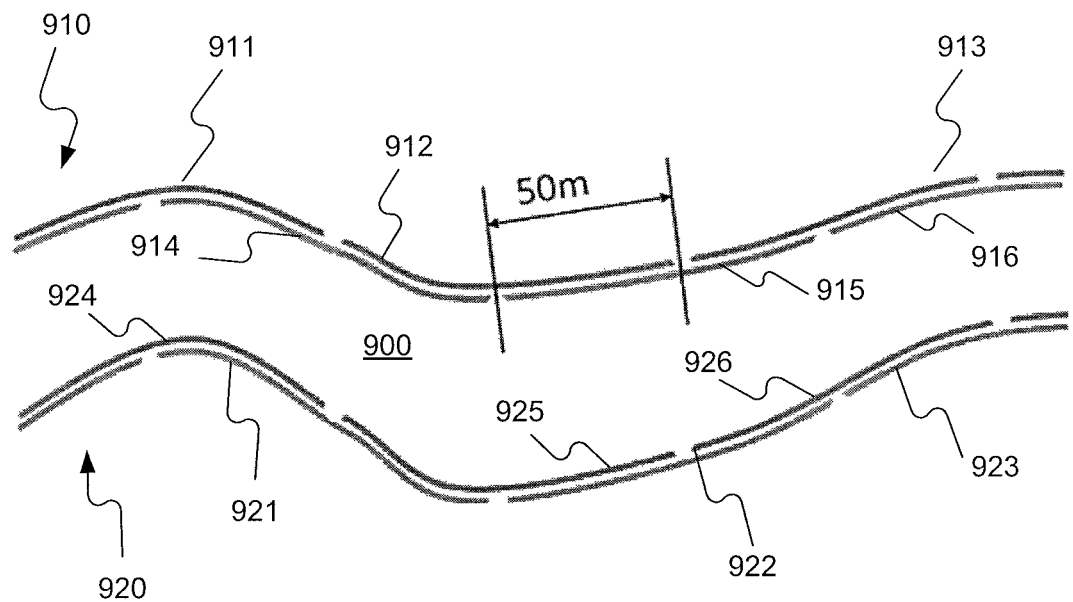
FIG. 9A illustrates a polynomial representation of a portions of a road segment consistent with the disclosed embodiments.

In addition to target trajectories and identified landmarks, sparse map 800 may include information relating to various other road features. For example, FIG. 9A illustrates a representation of curves along a particular road segment that may be stored in sparse map 800. In some embodiments, a single lane of a road may be modeled by a three-dimensional polynomial description of left and right sides of the road. Such polynomials representing left and right sides of a single lane are shown in FIG. 9A. Regardless of how many lanes a road may have, the road may be represented using polynomials in a way similar to that illustrated in FIG. 9A. For example, left and right sides of a multi-lane road may be represented by polynomials similar to those shown in FIG. 9A, and intermediate lane markings included on a multi-lane road (e.g., dashed markings representing lane boundaries, solid yellow lines representing boundaries between lanes traveling in different directions, etc.) may also be represented using polynomials such as those shown in FIG. 9A.

As shown in FIG. 9A, a lane 900 may be represented using polynomials (e.g., a first order, second order, third order, or any suitable order polynomials). For illustration, lane 900 is shown as a two-dimensional lane and the polynomials are shown as two-dimensional polynomials. Lane 900 includes a left side 910 and a right side 920. In some embodiments, more than one polynomial may be used to represent a location of each side of the road or lane boundary. For example, each of left side 910 and right side 920 may be represented by a plurality of polynomials of any suitable length. In some cases, the polynomials may have a length of about 100 m, although other lengths greater than or less than 100 m may also be used. Additionally, the polynomials can overlap with one another in order to facilitate seamless transitions in navigating based on subsequently encountered polynomials as a host vehicle travels along a roadway. For example, each of left side 910 and right side 920 may be represented by a plurality of third order polynomials separated into segments of about 100 meters in length (an example of the first predetermined range), and overlapping each other by about 50 meters. The polynomials representing the left side 910 and the right side 920 may or may not have the same order. For example, in some embodiments, some polynomials may be second order polynomials, some may be third order polynomials, and some may be fourth order polynomials.

In the example shown in FIG. 9A, left side 910 of lane 900 is represented by two groups of third order polynomials. The first group includes polynomial segments 911, 912, and 913. The second group includes polynomial segments 914, 915, and 916. The two groups, while substantially parallel to each other, follow the locations of their respective sides of the road. Polynomial segments 911-916 have a length of about 100 meters and overlap adjacent segments in the series by about 50 meters. As noted previously, however, polynomials of different lengths and different overlap amounts may also be used. For example, the polynomials may have lengths of 500 m, 1 km, or more, and the overlap amount may vary from 0 to 50 m, 50 m to 100 m, or greater than 100 m. Additionally, while FIG. 9A is shown as representing polynomials extending in 2D space (e.g., on the surface of the paper), it is to be understood that these polynomials may represent curves extending in three dimensions (e.g., including a height component) to represent elevation changes in a road segment in addition to X-Y curvature.

Figure 9B:
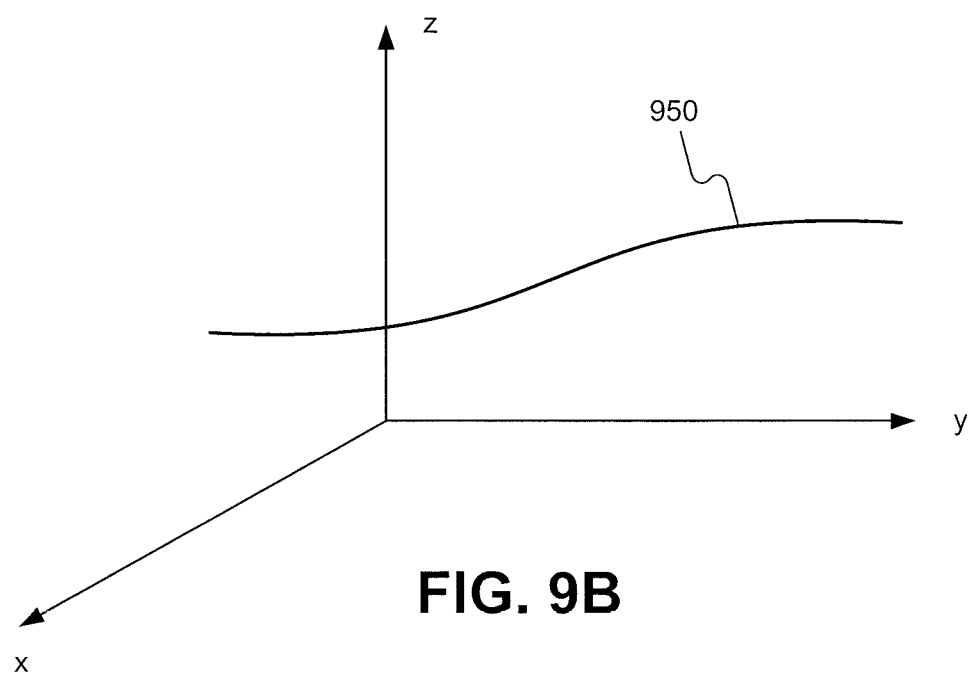
FIG. 9B illustrates a curve in three-dimensional space representing a target trajectory of a vehicle, for a particular road segment, included in a sparse map consistent with the disclosed embodiments.

Returning to the target trajectories of sparse map 800, FIG. 9B shows a three-dimensional polynomial representing a target trajectory for a vehicle traveling along a particular road segment. The target trajectory represents not only the X-Y path that a host vehicle should travel along a particular road segment, but also the elevation change that the host vehicle will experience when traveling along the road segment. Thus, each target trajectory in sparse map 800 may be represented by one or more three-dimensional polynomials, like the three-dimensional polynomial 950 shown in FIG. 9B. Sparse map 800 may include a plurality of trajectories (e.g., millions or billions or more to represent trajectories of vehicles along various road segments along roadways throughout the world). In some embodiments, each target trajectory may correspond to a spline connecting three-dimensional polynomial segments.

Regarding the data footprint of polynomial curves stored in sparse map 800, in some embodiments, each third degree polynomial may be represented by four parameters, each requiring four bytes of data. Suitable representations may be obtained with third degree polynomials requiring about 192 bytes of data for every 100 m. This translates to approximately 200 kB per hour in data usage/transfer requirements for a host vehicle traveling approximately 100 km/hr.

Sparse map 800 may describe the lanes network using a combination of geometry descriptors and meta-data. The geometry may be described by polynomials or splines as described above. The meta-data may describe the number of lanes, special characteristics (such as a car pool lane), and possibly other sparse labels. The total footprint of such indicators may be negligible.

As previously noted, sparse map 800 may include a plurality of predetermined landmarks associated with a road segment. Rather than storing actual images of the landmarks and relying, for example, on image recognition analysis based on captured images and stored images, each landmark in sparse map 800 may be represented and recognized using less data than a stored, actual image would require. Data representing landmarks may include sufficient information for describing or identifying the landmarks along a road. Storing data describing characteristics of landmarks, rather than the actual images of landmarks, may reduce the size of sparse map 800.

Figure 10:
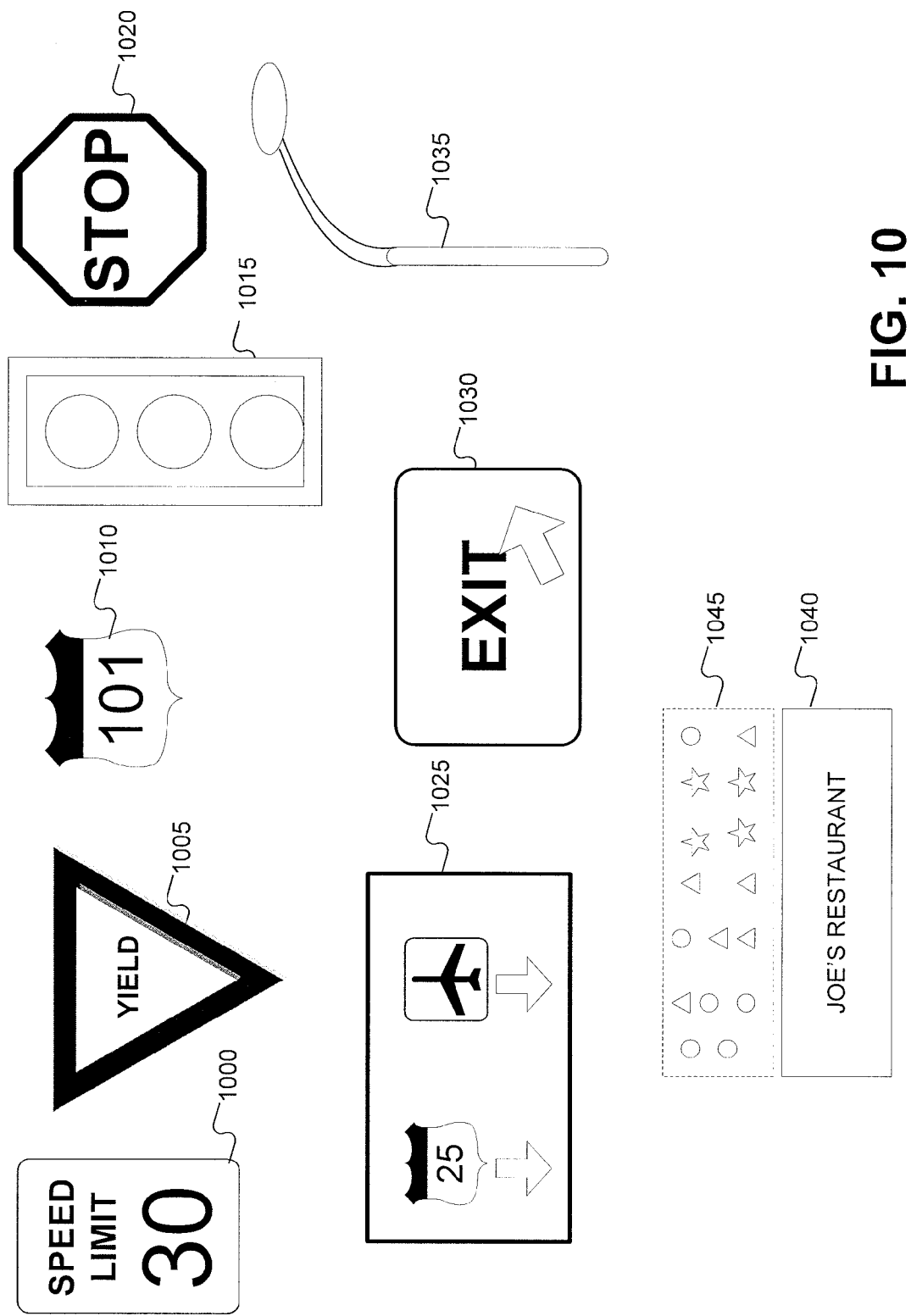
FIG. 10 illustrates example landmarks that may be included in sparse map consistent with the disclosed embodiments.

FIG. 10 illustrates examples of types of landmarks that may be represented in sparse map 800. The landmarks may include any visible and identifiable objects along a road segment. The landmarks may be selected such that they are fixed and do not change often with respect to their locations and/or content. The landmarks included in sparse map 800 may be useful in determining a location of vehicle 200 with respect to a target trajectory as the vehicle traverses a particular road segment. Examples of landmarks may include traffic signs, directional signs, general signs (e.g., rectangular signs), roadside fixtures (e.g., lampposts, reflectors, etc.), and any other suitable category. In some embodiments, lane marks on the road, may also be included as landmarks in sparse map 800.

Examples of landmarks shown in FIG. 10 include traffic signs, directional signs, roadside fixtures, and general signs. Traffic signs may include, for example, speed limit signs (e.g., speed limit sign 1000), yield signs (e.g., yield sign 1005), route number signs (e.g., route number sign 1010), traffic light signs (e.g., traffic light sign 1015), stop signs (e.g., stop sign 1020). Directional signs may include a sign that includes one or more arrows indicating one or more directions to different places. For example, directional signs may include a highway sign 1025 having arrows for directing vehicles to different roads or places, an exit sign 1030 having an arrow directing vehicles off a road, etc.

General signs may be unrelated to traffic. For example, general signs may include billboards used for advertisement, or a welcome board adjacent a border between two countries, states, counties, cities, or towns. FIG. 10 shows a general sign 1040 ("Joe's Restaurant"). Although general sign 1040 may have a rectangular shape, as shown in FIG. 10, general sign 1040 may have other shapes, such as square, circle, triangle, etc.

Landmarks may also include roadside fixtures. Roadside fixtures may be objects that are not signs, and may not be related to traffic or directions. For example, roadside fixtures may include lampposts (e.g., lamppost 1035), power line posts, traffic light posts, etc.

Landmarks may also include beacons that may be specifically designed for usage in an autonomous vehicle navigation system. For example, such beacons may include stand-alone structures placed at predetermined intervals to aid in navigating a host vehicle. Such beacons may also include visual/graphical information added to existing road signs (e.g., icons, emblems, bar codes, etc.) that may be identified or recognized by a vehicle traveling along a road segment. Such beacons may also include electronic components. In such embodiments, electronic beacons (e.g., RFID tags, etc.) may be used to transmit non-visual information to a host vehicle. Such information may include, for example, landmark identification and/or landmark location information that a host vehicle may use in determining its position along a target trajectory.

In some embodiments, the landmarks included in sparse map 800 may be represented by a data object of a predetermined size. The data representing a landmark may include any suitable parameters for identifying a particular landmark. For example, in some embodiments, landmarks stored in sparse map 800 may include parameters such as a physical size of the landmark (e.g., to support estimation of distance to the landmark based on a known size/scale), a distance to a previous landmark, lateral offset, height, a type code (e.g., a landmark type-what type of directional sign, traffic sign, etc.), a GPS coordinate (e.g., to support global localization), and any other suitable parameters. Each parameter may be associated with a data size. For example, a landmark size may be stored using 8 bytes of data. A distance to a previous landmark, a lateral offset, and height may be specified using 12 bytes of data. A type code associated with a landmark such as a directional sign or a traffic sign may require about 2 bytes of data. For general signs, an image signature enabling identification of the general sign may be stored using 50 bytes of data storage. The landmark GPS position may be associated with 16 bytes of data storage. These data sizes for each parameter are examples only, and other data sizes may also be used.

Representing landmarks in sparse map 800 in this manner may offer a lean solution for efficiently representing landmarks in the database. In some embodiments, signs may be referred to as semantic signs and non-semantic signs. A semantic sign may include any class of signs for which there's a standardized meaning (e.g., speed limit signs, warning signs, directional signs, etc.). A non-semantic sign may include any sign that is not associated with a standardized meaning (e.g., general advertising signs, signs identifying business establishments, etc.). For example, each semantic sign may be represented with 38 bytes of data (e.g., 8 bytes for size; 12 bytes for distance to previous landmark, lateral offset, and height; 2 bytes for a type code; and 16 bytes for GPS coordinates). Sparse map 800 may use a tag system to represent landmark types. In some cases, each traffic sign or directional sign may be associated with its own tag, which may be stored in the database as part of the landmark identification. For example, the database may include on the order of 1000 different tags to represent various traffic signs and on the order of about 10000 different tags to represent directional signs. Of course, any suitable number of tags may be used, and additional tags may be created as needed. General purpose signs may be represented in some embodiments using less than about 100 bytes (e.g., about 86 bytes including 8 bytes for size; 12 bytes for distance to previous landmark, lateral offset, and height; 50 bytes for an image signature; and 16 bytes for GPS coordinates).

Thus, for semantic road signs not requiring an image signature, the data density impact to sparse map 800, even at relatively high landmark densities of about 1 per 50 m, may be on the order of about 760 bytes per kilometer (e.g., 20 landmarks per km×38 bytes per landmark=760 bytes). Even for general purpose signs including an image signature component, the data density impact is about 1.72 kB per km (e.g., 20 landmarks per km×86 bytes per landmark=1,720 bytes). For semantic road signs, this equates to about 76 kB per hour of data usage for a vehicle traveling 100 km/hr. For general purpose signs, this equates to about 170 kB per hour for a vehicle traveling 100 km/hr.

In some embodiments, a generally rectangular object, such as a rectangular sign, may be represented in sparse map 800 by no more than 100 byte of data. The representation of the generally rectangular object (e.g., general sign 1040) in sparse map 800 may include a condensed image signature (e.g., condensed image signature 1045) associated with the generally rectangular object. This condensed image signature may be used, for example, to aid in identification of a general purpose sign, for example, as a recognized landmark. Such a condensed image signature (e.g., image information derived from actual image data representing an object) may avoid a need for storage of an actual image of an object or a need for comparative image analysis performed on actual images in order to recognize landmarks.

Referring to FIG. 10, sparse map 800 may include or store a condensed image signature 1045 associated with a general sign 1040, rather than an actual image of general sign 1040. For example, after an image capture device (e.g., image capture device 122, 124, or 126) captures an image of general sign 1040, a processor (e.g., image processor 190 or any other processor that can process images either aboard or remotely located relative to a host vehicle) may perform an image analysis to extract/create condensed image signature 1045 that includes a unique signature or pattern associated with general sign 1040. In one embodiment, condensed image signature 1045 may include a shape, color pattern, a brightness pattern, or any other feature that may be extracted from the image of general sign 1040 for describing general sign 1040. For example, in FIG. 10, the circles, triangles, and stars shown in condensed image signature 1045 may represent areas of different colors. The pattern represented by the circles, triangles, and stars may be stored in sparse map 800, e.g., within the 50 bytes designated to include an image signature. Notably, the circles, triangles, and stars are not necessarily meant to indicate that such shapes are stored as part of the image signature. Rather, these shapes are meant to conceptually represent recognizable areas having discernible color differences, textual areas, graphical shapes, or other variations in characteristics that may be associated with a general purpose sign. Such condensed image signatures can be used to identify a landmark in the form of a general sign. For example, the condensed image signature can be used to perform a same-not-same analysis based on a comparison of a stored condensed image signature with image data captured, for example, using a camera onboard an autonomous vehicle.

Figure 11A:
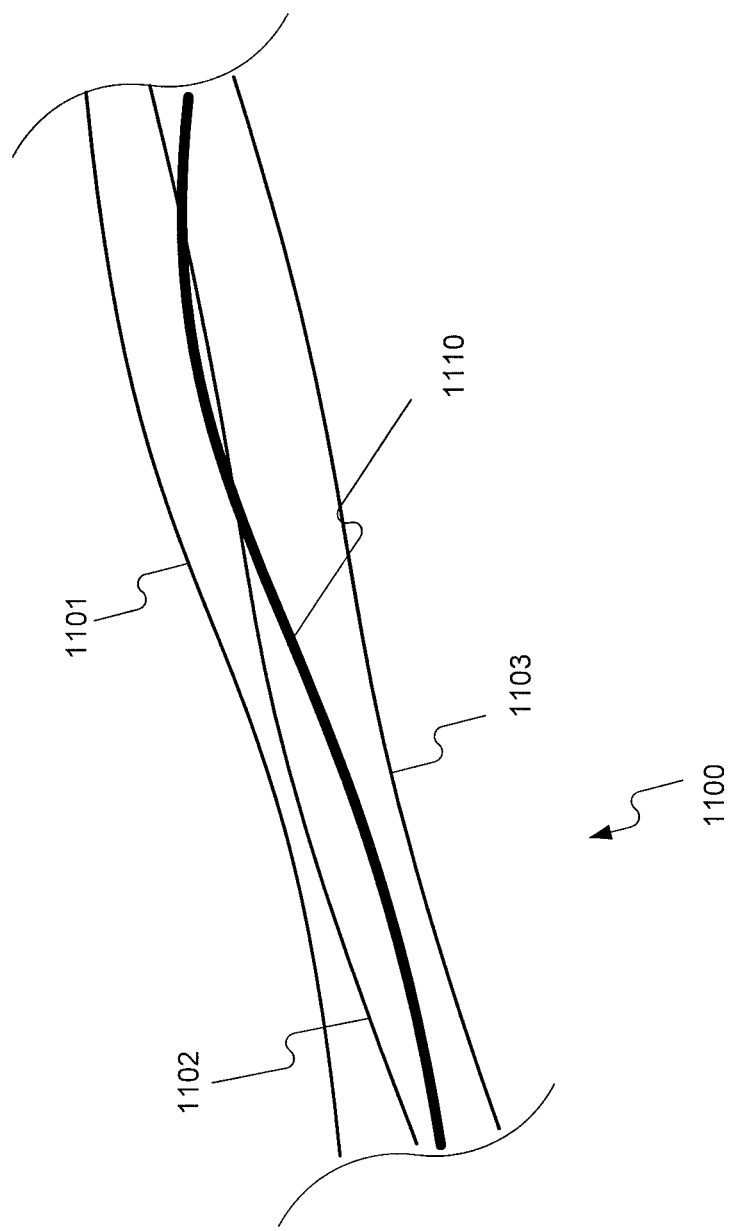
FIG. 11A shows polynomial representations of trajectories consistent with the disclosed embodiments.

Returning to the target trajectories a host vehicle may use to navigate a particular road segment, FIG. 11A shows polynomial representations trajectories capturing during a process of building or maintaining sparse map 800. A polynomial representation of a target trajectory included in sparse map 800 may be determined based on two or more reconstructed trajectories of prior traversals of vehicles along the same road segment. In some embodiments, the polynomial representation of the target trajectory included in sparse map 800 may be an aggregation of two or more reconstructed trajectories of prior traversals of vehicles along the same road segment. In some embodiments, the polynomial representation of the target trajectory included in sparse map 800 may be an average of the two or more reconstructed trajectories of prior traversals of vehicles along the same road segment. Other mathematical operations may also be used to construct a target trajectory along a road path based on reconstructed trajectories collected from vehicles traversing along a road segment.

As shown in FIG. 11A, a road segment 1100 may be travelled by a number of vehicles 200 at different times. Each vehicle 200 may collect data relating to a path that it took along the road segment. The path traveled by a particular vehicle may be determined based on camera data, accelerometer information, speed sensor information, and/or GPS information, among other potential sources. Such data may be used to reconstruct trajectories of vehicles traveling along the road segment, and based on these reconstructed trajectories, a target trajectory (or multiple target trajectories) may be determined for the particular road segment. Such target trajectories may represent a preferred path of a host vehicle (e.g., guided by an autonomous navigation system) as it travels along the road segment.

In the example shown in FIG. 11A, a first reconstructed trajectory 1101 may be determined based on data received from a first vehicle traversing road segment 1100 at a first time period (e.g., day 1), a second reconstructed trajectory 1102 may be obtained from a second vehicle traversing road segment 1100 at a second time period (e.g., day 2), and a third reconstructed trajectory 1103 may be obtained from a third vehicle traversing road segment 1100 at a third time period (e.g., day 3). Each trajectory 1101, 1102, and 1103 may be represented by a polynomial, such as a three-dimensional polynomial. It should be noted that in some embodiments, any of the reconstructed trajectories may be assembled onboard the vehicles traversing road segment 1100.

Additionally, or alternatively, such reconstructed trajectories may be determined on a server side based on information received from vehicles traversing road segment 1100. For example, in some embodiments, vehicles 200 may transmit data to one or more servers relating to their motion along road segment 1100 (e.g., steering angle, heading, time, position, speed, sensed road geometry, and/or sensed landmarks, among things). The server may reconstruct trajectories for vehicles 200 based on the received data. The server may also generate a target trajectory for guiding navigation of autonomous vehicle that will travel along the same road segment 1100 at a later time based on the first, second, and third trajectories 1101, 1102, and 1103. While a target trajectory may be associated with a single prior traversal of a road segment, in some embodiments, each target trajectory included in sparse map 800 may be determined based on two or more reconstructed trajectories of vehicles traversing the same road segment. In FIG. 11A, the target trajectory is represented by 1110. In some embodiments, the target trajectory 1110 may be generated based on an average of the first, second, and third trajectories 1101, 1102, and 1103. In some embodiments, the target trajectory 1110 included in sparse map 800 may be an aggregation (e.g., a weighted combination) of two or more reconstructed trajectories.

Figure 11B:
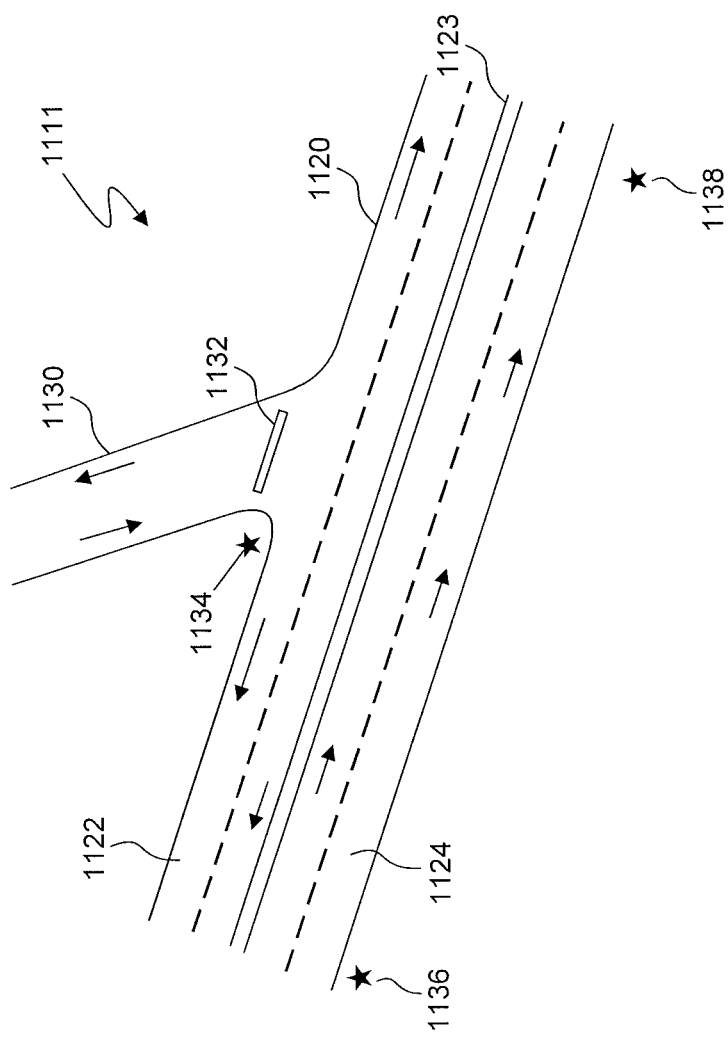
FIGS. 11B and 11C show target trajectories along a multi-lane road consistent with disclosed embodiments.
Figure 11C:
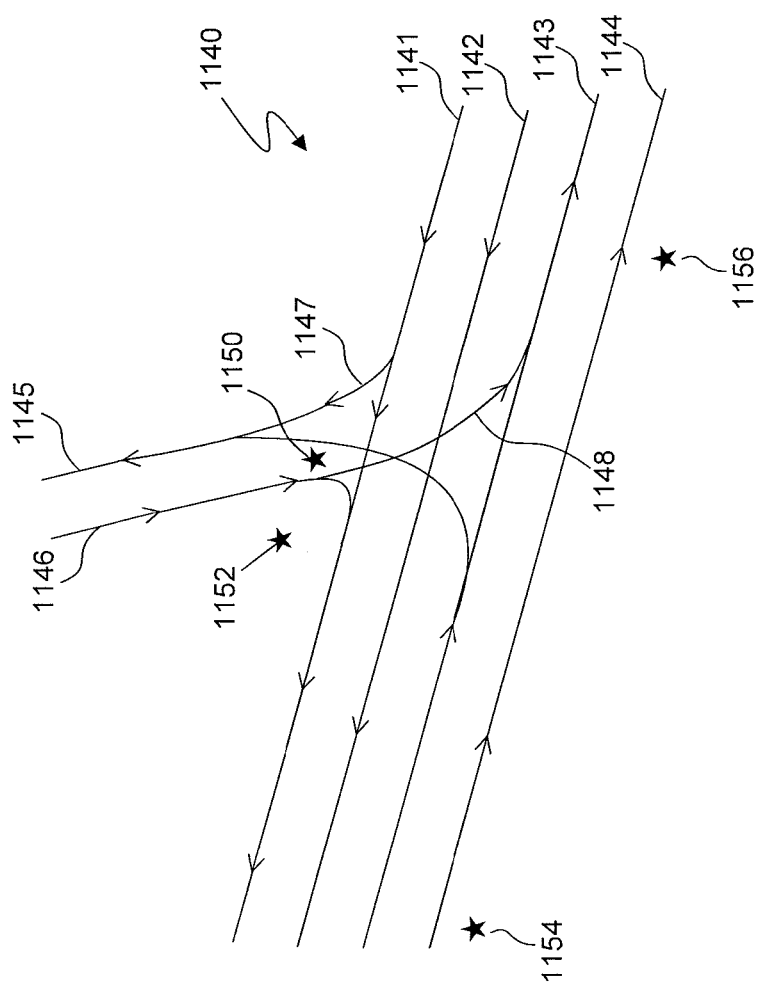

FIGS. 11B and 11C further illustrate the concept of target trajectories associated with road segments present within a geographic region 1111. As shown in FIG. 11B, a first road segment 1120 within geographic region 1111 may include a multilane road, which includes two lanes 1122 designated for vehicle travel in a first direction and two additional lanes 1124 designated for vehicle travel in a second direction opposite to the first direction. Lanes 1122 and lanes 1124 may be separated by a double yellow line 1123. Geographic region 1111 may also include a branching road segment 1130 that intersects with road segment 1120. Road segment 1130 may include a two-lane road, each lane being designated for a different direction of travel. Geographic region 1111 may also include other road features, such as a stop line 1132, a stop sign 1134, a speed limit sign 1136, and a hazard sign 1138.

As shown in FIG. 11C, sparse map 800 may include a local map 1140 including a road model for assisting with autonomous navigation of vehicles within geographic region 1111. For example, local map 1140 may include target trajectories for one or more lanes associated with road segments 1120 and/or 1130 within geographic region 1111. For example, local map 1140 may include target trajectories 1141 and/or 1142 that an autonomous vehicle may access or rely upon when traversing lanes 1122. Similarly, local map 1140 may include target trajectories 1143 and/or 1144 that an autonomous vehicle may access or rely upon when traversing lanes 1124. Further, local map 1140 may include target trajectories 1145 and/or 1146 that an autonomous vehicle may access or rely upon when traversing road segment 1130. Target trajectory 1147 represents a preferred path an autonomous vehicle should follow when transitioning from lanes 1120 (and specifically, relative to target trajectory 1141 associated with a right-most lane of lanes 1120) to road segment 1130 (and specifically, relative to a target trajectory 1145 associated with a first side of road segment 1130. Similarly, target trajectory 1148 represents a preferred path an autonomous vehicle should follow when transitioning from road segment 1130 (and specifically, relative to target trajectory 1146) to a portion of road segment 1124 (and specifically, as shown, relative to a target trajectory 1143 associated with a left lane of lanes 1124.

Sparse map 800 may also include representations of other road-related features associated with geographic region 1111. For example, sparse map 800 may also include representations of one or more landmarks identified in geographic region 1111. Such landmarks may include a first landmark 1150 associated with stop line 1132, a second landmark 1152 associated with stop sign 1134, a third landmark associated with speed limit sign 1154, and a fourth landmark 1156 associated with hazard sign 1138. Such landmarks may be used, for example, to assist an autonomous vehicle in determining its current location relative to any of the shown target trajectories, such that the vehicle may adjust its heading to match a direction of the target trajectory at the determined location.

Figure 11D:
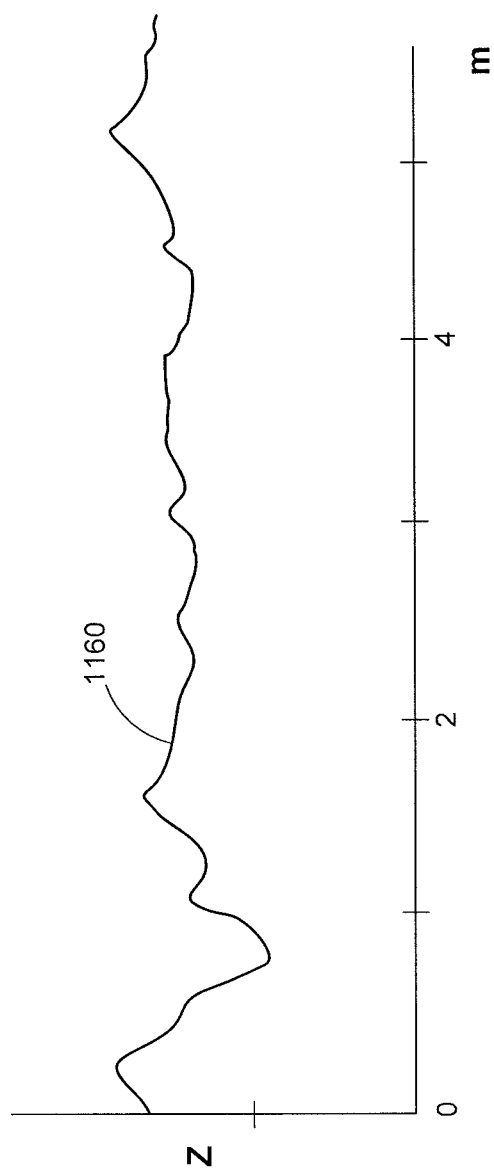
FIG. 11D shows an example road signature profile consistent with disclosed embodiments.

In some embodiments, sparse map 800 may also include road signature profiles. Such road signature profiles may be associated with any discernible/measurable variation in at least one parameter associated with a road. For example, in some cases, such profiles may be associated with variations in surface roughness of a particular road segment, variations in road width over a particular road segment, variations in distances between dashed lines painted along a particular road segment, variations in road curvature along a particular road segment, etc. FIG. 11D shows an example of a road signature profile 1160. While profile 1160 may represent any of the parameters mentioned above, or others, in one example, profile 1160 may represent a measure of road surface roughness, as obtained, for example, by monitoring one or more sensors providing outputs indicative of an amount of suspension displacement as a vehicle travels a particular road segment. Alternatively, profile 1160 may represent variation in road width, as determined based on image data obtained via a camera onboard a vehicle traveling a particular road segment. Such profiles may be useful, for example, in determining a particular location of an autonomous vehicle relative to a particular target trajectory. That is, as it traverses a road segment, an autonomous vehicle may measure a profile associated with one or more parameters associated with the road segment. If the measured profile can be correlated/matched with a predetermined profile that plots the parameter variation with respect to position along the road segment, then the measured and predetermined profiles may be used (e.g., by overlaying corresponding sections of the measured and predetermined profiles) in order to determine a current position along the road segment and, therefore, a current position relative to a target trajectory for the road segment.

In some embodiments, sparse map 800 may include different trajectories based on different characteristics associated with a user of autonomous vehicles, environmental conditions, and/or other parameters relating to driving. For example, in some embodiments, different trajectories may be generated based on different user preferences and/or profiles. Sparse map 800 including such different trajectories may be provided to different autonomous vehicles of different users. For example, some users may prefer to avoid toll roads, while others may prefer to take the shortest or fastest routes, regardless of whether there is a toll road on the route. The disclosed systems may generate different sparse maps with different trajectories based on such different user preferences or profiles. As another example, some users may prefer to travel in a fast moving lane, while others may prefer to maintain a position in the central lane at all times.

Different trajectories may be generated and included in sparse map 800 based on different environmental conditions, such as day and night, snow, rain, fog, etc. Autonomous vehicles driving under different environmental conditions may be provided with sparse map 800 generated based on such different environmental conditions. In some embodiments, cameras provided on autonomous vehicles may detect the environmental conditions, and may provide such information back to a server that generates and provides sparse maps. For example, the server may generate or update an already generated sparse map 800 to include trajectories that may be more suitable or safer for autonomous driving under the detected environmental conditions. The update of sparse map 800 based on environmental conditions may be performed dynamically as the autonomous vehicles are traveling along roads.

Other different parameters relating to driving may also be used as a basis for generating and providing different sparse maps to different autonomous vehicles. For example, when an autonomous vehicle is traveling at a high speed, turns may be tighter. Trajectories associated with specific lanes, rather than roads, may be included in sparse map 800 such that the autonomous vehicle may maintain within a specific lane as it follows a specific trajectory. When an image captured by a camera onboard the autonomous vehicle indicates that the vehicle has drifted outside of the lane (e.g., crossed the lane mark), an action may be triggered within the vehicle to bring the vehicle back to the designated lane according to the specific trajectory.

Constructing a Road Model for Autonomous Vehicle Navigation

In some embodiments, the disclosed systems and methods may construct a road model for autonomous vehicle navigation. For example, the road model may include crowd sourced data. The disclosed systems and methods may refine the crowd sourced data based on observed local conditions. Further, the disclosed systems and methods may determine a refined trajectory for an autonomous vehicle based on sensor information. Still further, the disclosed systems and methods may identify landmarks for use in the road model, as well refine the positions of the landmarks in the road model. These systems and methods are disclosed in further detail in the following sections.

Crowd Sourcing Data for Autonomous Vehicle Navigation

In some embodiments, the disclosed systems and methods may construct a road model for autonomous vehicle navigation. For example, disclosed systems and methods may use crowd sourced data for generation of an autonomous vehicle road model that one or more autonomous vehicles may use to navigate along a system of roads. By crowd sourcing, it means that data are received from various vehicles (e.g., autonomous vehicles) travelling on a road segment at different times and such data are used to generate and/or update the road model. The model may, in turn, be transmitted to the vehicles or other vehicles later travelling along the road segment for assisting autonomous vehicle navigation. The road model may include a plurality of target trajectories representing preferred trajectories that autonomous vehicles should follow as they traverse a road segment. The target trajectories may be the same as a reconstructed actual trajectory collected from a vehicle traversing a road segment, which may be transmitted from the vehicle to a server. In some embodiments, the target trajectories may be different from actual trajectories that one or more vehicles previously took when traversing a road segment. The target trajectories may be generated based on actual trajectories (e.g., through averaging or any other suitable operation).

The vehicle trajectory data that a vehicle may upload to a server may correspond with the actual reconstructed trajectory for the vehicle, or it may correspond to a recommended trajectory, which may be based on or related to the actual reconstructed trajectory of the vehicle, but may differ from the actual reconstructed trajectory. For example, vehicles may modify their actual, reconstructed trajectories and submit (e.g., recommend) to the server the modified actual trajectories. The road model may use the recommended, modified trajectories as target trajectories for autonomous navigation of other vehicles.

In addition to trajectory information, other information for potential use in building a sparse data map 800 may include information relating to potential landmark candidates. For example, through crowd sourcing of information, the disclosed systems and methods may identify potential landmarks in an environment and refine landmark positions. The landmarks may be used by a navigation system of autonomous vehicles to determine and/or adjust the position of the vehicle along the target trajectories.

The reconstructed trajectories that a vehicle may generate as it travels along a road may be obtained by any suitable method. In some embodiments, the reconstructed trajectories may be developed by stitching together segments of motion for the vehicle, using, e.g., ego motion estimation (e.g., three dimensional translation and three dimensional rotation of the camera, and hence the body of the vehicle). The rotation and translation estimation may be determined based on analysis of images captured by one or more image capture devices along with information from other sensors or devices, such as inertial sensors and speed sensors. For example, the inertial sensors may include an accelerometer or other suitable sensors configured to measure changes in translation and/or rotation of the vehicle body. The vehicle may include a speed sensor that measures a speed of the vehicle.

In some embodiments, the ego motion of the camera (and hence the vehicle body) may be estimated based on an optical flow analysis of the captured images. An optical flow analysis of a sequence of images identifies movement of pixels from the sequence of images, and based on the identified movement, determines motions of the vehicle. The ego motion may be integrated over time and along the road segment to reconstruct a trajectory associated with the road segment that the vehicle has followed.

Data (e.g., reconstructed trajectories) collected by multiple vehicles in multiple drives along a road segment at different times may be used to construct the road model (e.g., including the target trajectories, etc.) included in sparse data map 800. Data collected by multiple vehicles in multiple drives along a road segment at different times may also be averaged to increase an accuracy of the model. In some embodiments, data regarding the road geometry and/or landmarks may be received from multiple vehicles that travel through the common road segment at different times. Such data received from different vehicles may be combined to generate the road model and/or to update the road model.

The disclosed systems and methods may enable autonomous vehicle navigation (e.g., steering control) with low footprint models, which may be collected by the autonomous vehicles themselves without the aid of expensive surveying equipment. To support the autonomous navigation (e.g., steering applications), the road model may include the geometry of the road, its lane structure, and landmarks that may be used to determine the location or position of vehicles along a trajectory included in the model. Generation of the road model may be performed by a remote server that communicates with vehicles travelling on the road and that receives data from the vehicles. The data may include sensed data, trajectories reconstructed based on the sensed data, and/or recommended trajectories that may represent modified reconstructed trajectories. The server may transmit the model back to the vehicles or other vehicles that later travel on the road to aid in autonomous navigation.

The geometry of a reconstructed trajectory (and also a target trajectory) along a road segment may be represented by a curve in three dimensional space, which may be a spline connecting three dimensional polynomials. The reconstructed trajectory curve may be determined from analysis of a video stream or a plurality of images captured by a camera installed on the vehicle. In some embodiments, a location is identified in each frame or image that is a few meters ahead of the current position of the vehicle. This location is where the vehicle is expected to travel to in a predetermined time period. This operation may be repeated frame by frame, and at the same time, the vehicle may compute the camera's ego motion (rotation and translation). At each frame or image, a short range model for the desired path is generated by the vehicle in a reference frame that is attached to the camera. The short range models may be stitched together to obtain a three dimensional model of the road in some coordinate frame, which may be an arbitrary or predetermined coordinate frame. The three dimensional model of the road may then be fitted by a spline, which may include or connect one or more polynomials of suitable orders.

To conclude the short range road model at each frame, one or more detection modules may be used. For example, a bottom-up lane detection module may be used. The bottom-up lane detection module may be useful when lane marks are drawn on the road. This module may look for edges in the image and assembles them together to form the lane marks. A second module may be used together with the bottom-up lane detection module. The second module is an end-to-end deep neural network, which may be trained to predict the correct short range path from an input image. In both modules, the road model may be detected in the image coordinate frame and transformed to a three dimensional space that may be virtually attached to the camera.

Although the reconstructed trajectory modeling method may introduce an accumulation of errors due to the integration of ego motion over a long period of time, which may include a noise component, such errors may be inconsequential as the generated model may provide sufficient accuracy for navigation over a local scale. In addition, it is possible to cancel the integrated error by using external sources of information, such as satellite images or geodetic measurements. For example, the disclosed systems and methods may use a GNSS receiver to cancel accumulated errors. However, the GNSS positioning signals may not be always available and accurate. The disclosed systems and methods may enable a steering application that depends weakly on the availability and accuracy of GNSS positioning. In such systems, the usage of the GNSS signals may be limited. For example, in some embodiments, the disclosed systems may use the GNSS signals for database indexing purposes only.

In some embodiments, the range scale (e.g., local scale) that may be relevant for an autonomous vehicle navigation steering application may be on the order of 50 meters, 100 meters, 200 meters, 300 meters, etc. Such distances may be used, as the geometrical road model is mainly used for two purposes: planning the trajectory ahead and localizing the vehicle on the road model. In some embodiments, the planning task may use the model over a typical range of 40 meters ahead (or any other suitable distance ahead, such as 20 meters, 30 meters, 50 meters), when the control algorithm steers the vehicle according to a target point located 1.3 seconds ahead (or any other time such as 1.5 seconds, 1.7 seconds, 2 seconds, etc.). The localization task uses the road model over a typical range of 60 meters behind the car (or any other suitable distances, such as 50 meters, 100 meters, 150 meters, etc.), according to a method called "tail alignment" described in more detail in another section. The disclosed systems and methods may generate a geometrical model that has sufficient accuracy over particular range, such as 100 meters, such that a planned trajectory will not deviate by more than, for example, 30 cm from the lane center.

As explained above, a three dimensional road model may be constructed from detecting short range sections and stitching them together. The stitching may be enabled by computing a six degree ego motion model, using the videos and/or images captured by the camera, data from the inertial sensors that reflect the motions of the vehicle, and the host vehicle velocity signal. The accumulated error may be small enough over some local range scale, such as of the order of 100 meters. All this may be completed in a single drive over a particular road segment.

In some embodiments, multiple drives may be used to average the resulted model, and to increase its accuracy further. The same car may travel the same route multiple times, or multiple cars may send their collected model data to a central server. In any case, a matching procedure may be performed to identify overlapping models and to enable averaging in order to generate target trajectories. The constructed model (e.g., including the target trajectories) may be used for steering once a convergence criterion is met. Subsequent drives may be used for further model improvements and in order to accommodate infrastructure changes.

Sharing of driving experience (such as sensed data) between multiple cars becomes feasible if they are connected to a central server. Each vehicle client may store a partial copy of a universal road model, which may be relevant for its current position. A bidirectional update procedure between the vehicles and the server may be performed by the vehicles and the server. The small footprint concept discussed above enables the disclosed systems and methods to perform the bidirectional updates using a very small bandwidth.

Information relating to potential landmarks may also be determined and forwarded to a central server. For example, the disclosed systems and methods may determine one or more physical properties of a potential landmark based on one or more images that include the landmark. The physical properties may include a physical size (e.g., height, width) of the landmark, a distance from a vehicle to a landmark, a distance between the landmark to a previous landmark, the lateral position of the landmark (e.g., the position of the landmark relative to the lane of travel), the GPS coordinates of the landmark, a type of landmark, identification of text on the landmark, etc. For example, a vehicle may analyze one or more images captured by a camera to detect a potential landmark, such as a speed limit sign. The vehicle may determine a distance from the vehicle to the landmark based on the analysis of the one or more images. In some embodiments, the distance may be determined based on analysis of images of the landmark using a suitable image analysis method, such as a scaling method and/or an optical flow method. In some embodiments, the disclosed systems and methods may be configured to determine a type or classification of a potential landmark. In case the vehicle determines that a certain potential landmark corresponds to a predetermined type or classification stored in a sparse map, it may be sufficient for the vehicle to communicate to the server an indication of the type or classification of the landmark, along with its location. The server may store such indications. At a later time, other vehicles may capture an image of the landmark, process the image (e.g., using a classifier), and compare the result from processing the image to the indication stored in the server with regard to the type of landmark. There may be various types of landmarks, and different types of landmarks may be associated with different types of data to be uploaded to and stored in the server, different processing onboard the vehicle may detects the landmark and communicate information about the landmark to the server, and the system onboard the vehicle may receive the landmark data from the server and use the landmark data for identifying a landmark in autonomous navigation.

In some embodiments, multiple autonomous vehicles travelling on a road segment may communicate with a server. The vehicles (or clients) may generate a curve describing its drive (e.g., through ego motion integration) in an arbitrary coordinate frame. The vehicles may detect landmarks and locate them in the same frame. The vehicles may upload the curve and the landmarks to the server. The server may collect data from vehicles over multiple drives, and generate a unified road model. The server may distribute the model to clients (e.g., vehicles). The server may continuously or periodically update the model when receiving new data from the vehicles. For example, the server may process the new data to evaluate whether it includes information that should trigger an updated, or creation of new data on the server. The server may distribute the updated model or the updates to the vehicles for providing autonomous vehicle navigation.

The server may use one or more criteria for determining whether new data received from the vehicles should trigger an update to the model or trigger creation of new data. For example, when the new data indicates that a previously recognized landmark at a specific location no longer exists, or is replaced by another landmark, the server may determine that the new data should trigger an update to the model. As another example, when the new data indicates that a road segment has been closed, and when this has been corroborated by data received from other vehicles, the server may determine that the new data should trigger an update to the model.

The server may distribute the updated model (or the updated portion of the model) to one or more vehicles that are traveling on the road segment, with which the updates to the model are associated. The server may also distribute the updated model to vehicles that are about to travel on the road segment, or vehicles whose planned trip includes the road segment, with which the updates to the model are associated. For example, while an autonomous vehicle is traveling along another road segment before reaching the road segment with which an update is associated, the server may distribute the updates or updated model to the autonomous vehicle before it reaches the road segment.

In some embodiments, the remote server may collect trajectories and landmarks from multiple clients (e.g., vehicles that travel along a common road segment). The server may match curves using landmarks and create an average road model based on the trajectories collected from the multiple vehicles. The server may also compute a graph of roads and the most probable path at each node or conjunction of the road segment.

The server may average landmark properties received from multiple vehicles that travelled along the common road segment, such as the distances between one landmark to another (e.g., a previous one along the road segment) as measured by multiple vehicles, to determine an arc-length parameter and support localization along the path and speed calibration for each client vehicle. The server may average the physical dimensions of a landmark measured by multiple vehicles travelled along the common road segment and recognized the same landmark. The averaged physical dimensions may be used to support distance estimation, such as the distance from the vehicle to the landmark. The server may average lateral positions of a landmark (e.g., position from the lane in which vehicles are travelling in to the landmark) measured by multiple vehicles travelled along the common road segment and recognized the same landmark. The averaged lateral portion may be used to support lane assignment. The server may average the GPS coordinates of the landmark measured by multiple vehicles travelled along the same road segment and recognized the same landmark. The averaged GPS coordinates of the landmark may be used to support global localization or positioning of the landmark in the road model.

In some embodiments, the server may identify model changes, such as constructions, detours, new signs, removal of signs, etc., based on data received from the vehicles. The server may continuously or periodically or instantaneously update the model upon receiving new data from the vehicles. The server may distribute updates to the model or the updated model to vehicles for providing autonomous navigation.

In some embodiments, the server may analyze driver interventions during the autonomous driving. The server may analyze data received from the vehicle at the time and location where intervention occurs, and/or data received prior to the time the intervention occurred. The server may identify certain portions of the data that caused or are closely related to the intervention, for example, data indicating a temporary lane closure setup, data indicating a pedestrian in the road. The server may update the model based on the identified data. For example, the server may modify one or more trajectories stored in the model.

Consistent with disclosed embodiments, the system can store information obtained during autonomous navigation (or regular driver-controlled navigation) for use in later traversals along the same road. The system may share that information with other vehicles when they navigate along the road. Each client system may then further refine the crowd sourced data based on observed local conditions.

Figure 12:
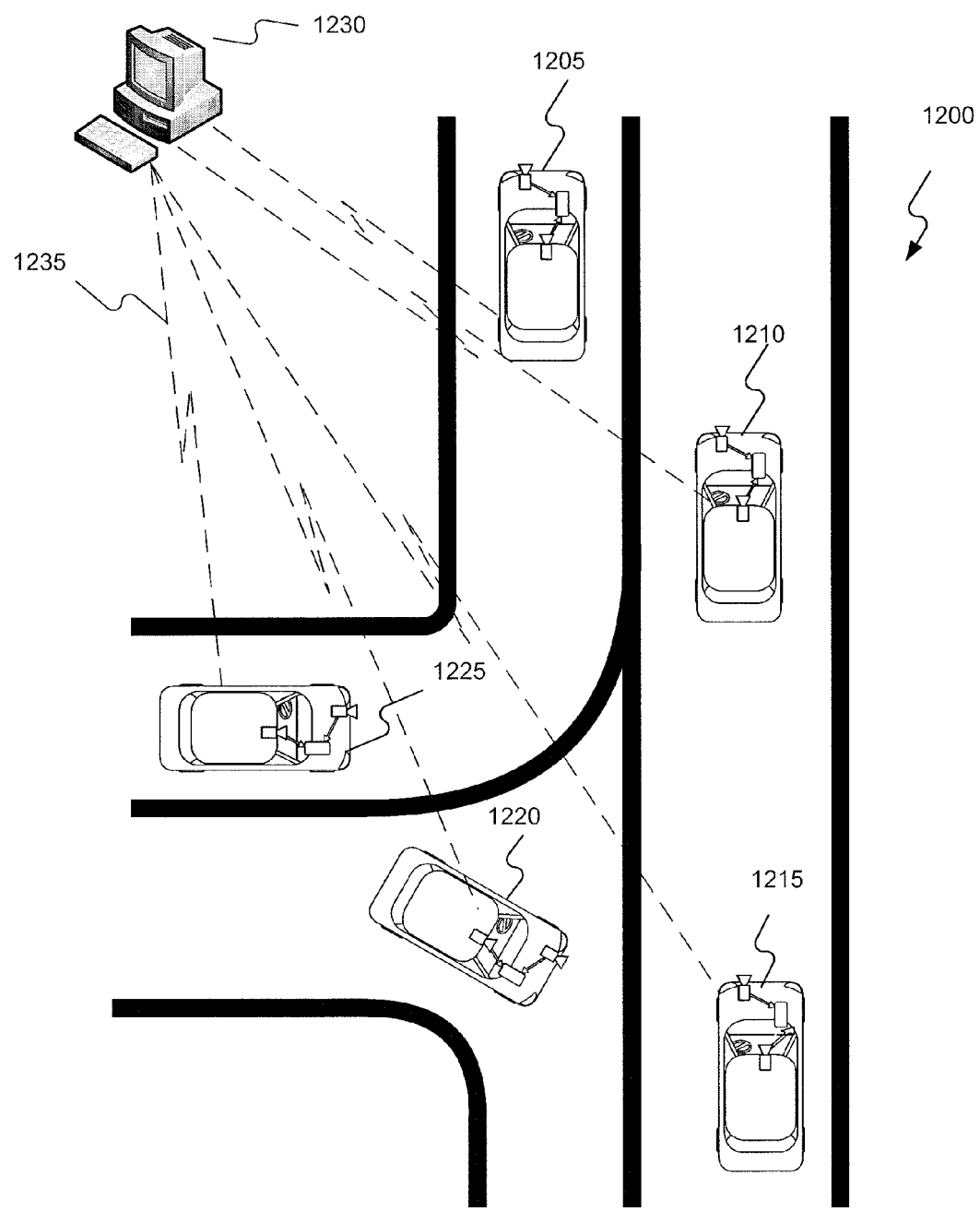
FIG. 12 is a schematic illustration of a system that uses crowd sourcing data received from a plurality of vehicles for autonomous vehicle navigation, consistent with the disclosed embodiments.

FIG. 12 is a schematic illustration of a system that uses crowd sourcing data for autonomous vehicle navigation. FIG. 12 shows a road segment 1200 that includes one or more lanes. A plurality of vehicles 1205, 1210, 1215, 1220, and 1225 may travel on road segment 1200 at the same time or at different times (although shown as appearing on road segment 1200 at the same time in FIG. 12). At least one of vehicles 1205-1225 may be an autonomous vehicle. For simplicity of the present example, all of the vehicles 1205-1225 are presumed to be autonomous vehicles. Each vehicle may be similar to vehicles disclosed in other embodiments (e.g., vehicle 200), and may include components or devices included in or associated with vehicles disclosed in other embodiments. Each vehicle may be equipped with an image capture device or camera (e.g., image capture device 122 or camera 122). Each vehicle may communicate with a remote server 1230 via one or more networks (e.g., over a cellular network and/or the Internet, etc.) through wireless communication paths 1235, as indicated by the dashed lines. Each vehicle may transmit data to server 1230 and receive data from server 1230. For example, server 1230 may collect data from multiple vehicles travelling on the road segment 1200 at different times, and may process the collected data to generate an autonomous vehicle road navigation model, or an update to the model. Server 1230 may transmit the autonomous vehicle road navigation model or the update to the model to the vehicles that transmitted data to server 1230. Server 1230 may transmit the autonomous vehicle road navigation model or the update to the model to other vehicles that travel on road segment 1200 at later times.

As vehicles 1205-1225 travel on road segment 1200, navigation information collected (e.g., detected, sensed, or measured) by vehicles 1205-1225 may be transmitted to server 1230. In some embodiments, the navigation information may be associated with the common road segment 1200. The navigation information may include a trajectory associated with each of the vehicles 1205-1225 as each vehicle travels over road segment 1200. In some embodiments, the trajectory may be reconstructed based on data sensed by various sensors and devices provided on vehicle 1205. For example, the trajectory may be reconstructed based on at least one of accelerometer data, speed data, landmarks data, road geometry or profile data, vehicle positioning data, and ego motion data. In some embodiments, the trajectory may be reconstructed based on data from inertial sensors, such as accelerometer, and the velocity of vehicle 1205 sensed by a speed sensor. In addition, in some embodiments, the trajectory may be determined (e.g., by a processor onboard each of vehicles 1205-1225) based on sensed ego motion of the camera, which may indicate three dimensional translation and/or three dimensional rotations (or rotational motions). The ego motion of the camera (and hence the vehicle body) may be determined from analysis of one or more images captured by the camera.

In some embodiments, the trajectory of vehicle 1205 may be determined by a processor provided aboard vehicle 1205 and transmitted to server 1230. In other embodiments, server 1230 may receive data sensed by the various sensors and devices provided in vehicle 1205, and determine the trajectory based on the data received from vehicle 1205.

In some embodiments, the navigation information transmitted from vehicles 1205-1225 to server 1230 may include data regarding the road geometry or profile. The geometry of road segment 1200 may include lane structure and/or landmarks. The lane structure may include the total number of lanes of road segment 1200, the type of lanes (e.g., one-way lane, two-way lane, driving lane, passing lane, etc.), markings on lanes, width of lanes, etc. In some embodiments, the navigation information may include a lane assignment, e.g., which lane of a plurality of lanes a vehicle is traveling in. For example, the lane assignment may be associated with a numerical value "3" indicating that the vehicle is traveling on the third lane from the left or right. As another example, the lane assignment may be associated with a text value "center lane" indicating the vehicle is traveling on the center lane.

Server 1230 may store the navigation information on a non-transitory computer-readable medium, such as a hard drive, a compact disc, a tape, a memory, etc. Server 1230 may generate (e.g., through a processor included in server 1230) at least a portion of an autonomous vehicle road navigation model for the common road segment 1200 based on the navigation information received from the plurality of vehicles 1205-1225. Server 1230 may determine a trajectory associated with each lane based on crowd sourced data (e.g., navigation information) received from multiple vehicles (e.g., 1205-1225) that travel on a lane of road segment at different times. Server 1230 may generate the autonomous vehicle road navigation model or a portion of the model (e.g., an updated portion) based on a plurality of trajectories determined based on the crowd sourced navigation data. Server 1230 may transmit the model or the updated portion of the model to one or more of autonomous vehicles 1205-1225 traveling on road segment 1200 or any other autonomous vehicles that travel on road segment at a later time for updating an existing autonomous vehicle road navigation model provided in a navigation system of the vehicles. The autonomous vehicle road navigation model may be used by the autonomous vehicles in autonomously navigating along the common road segment 1200.

In some embodiments, the autonomous vehicle road navigation model may be included in a sparse map (e.g., sparse map 800 depicted in FIG. 8). Sparse map 800 may include sparse recording of data related to road geometry and/or landmarks along a road, which may provide sufficient information for guiding autonomous navigation of an autonomous vehicle, yet does not require excessive data storage. In some embodiments, the autonomous vehicle road navigation model may be stored separately from sparse map 800, and may use map data from sparse map 800 when the model is executed for navigation. In some embodiments, the autonomous vehicle road navigation model may use map data included in sparse map 800 for determining target trajectories along road segment 1200 for guiding autonomous navigation of autonomous vehicles 1205-1225 or other vehicles that later travel along road segment 1200. For example, when the autonomous vehicle road navigation model is executed by a processor included in a navigation system of vehicle 1205, the model may cause the processor to compare the trajectories determined based on the navigation information received from vehicle 1205 with predetermined trajectories included in sparse map 800 to validate and/or correct the current traveling course of vehicle 1205.

In the autonomous vehicle road navigation model, the geometry of a road feature or target trajectory may be encoded by a curve in a three-dimensional space. In one embodiment, the curve may be a three dimensional spline including one or more connecting three dimensional polynomials. As one of skill in the art would understand, a spline may be a numerical function that is piece-wise defined by a series of polynomials for fitting data. A spline for fitting the three dimensional geometry data of the road may include a linear spline (first order), a quadratic spline (second order), a cubic spline (third order), or any other splines (other orders), or a combination thereof. The spline may include one or more three dimensional polynomials of different orders connecting (e.g., fitting) data points of the three dimensional geometry data of the road. In some embodiments, the autonomous vehicle road navigation model may include a three dimensional spline corresponding to a target trajectory along a common road segment (e.g., road segment 1200) or a lane of the road segment 1200.

The autonomous vehicle road navigation model may include other information, such as identification of at least one landmark along road segment 1200. The landmark may be visible within a field of view of a camera (e.g., camera 122) installed on each of vehicles 1205-1225. In some embodiments, camera 122 may capture an image of a landmark. A processor (e.g., processor 180, 190, or processing unit 110) provided on vehicle 1205 may process the image of the landmark to extract identification information for the landmark. The landmark identification information, rather than an actual image of the landmark, may be stored in sparse map 800. The landmark identification information may require much less storage space than an actual image. Other sensors or systems (e.g., GPS system) may also provide certain identification information of the landmark (e.g., position of landmark). The landmark may include at least one of a traffic sign, an arrow marking, a lane marking, a dashed lane marking, a traffic light, a stop line, a directional sign (e.g., a highway exit sign with an arrow indicating a direction, a highway sign with arrows pointing to different directions or places), a landmark beacon, or a lamppost. A landmark beacon refers to a device (e.g., an RFID device) installed along a road segment that transmits or reflects a signal to a receiver installed on a vehicle, such that when the vehicle passes by the device, the beacon received by the vehicle and the location of the device (e.g., determined from GPS location of the device) may be used as a landmark to be included in the autonomous vehicle road navigation model and/or the sparse map 800.

The identification of at least one landmark may include a position of the at least one landmark. The position of the landmark may be determined based on position measurements performed using sensor systems (e.g., Global Positioning Systems, inertial based positioning systems, landmark beacon, etc.) associated with the plurality of vehicles 1205-1225. In some embodiments, the position of the landmark may be determined by averaging the position measurements detected, collected, or received by sensor systems on different vehicles 1205-1225 through multiple drives. For example, vehicles 1205-1225 may transmit position measurements data to server 1230, which may average the position measurements and use the averaged position measurement as the position of the landmark. The position of the landmark may be continuously refined by measurements received from vehicles in subsequent drives.

The identification of the landmark may include a size of the landmark. The processor provided on a vehicle (e.g., 1205) may estimate the physical size of the landmark based on the analysis of the images. Server 1230 may receive multiple estimates of the physical size of the same landmark from different vehicles over different drives. Server 1230 may average the different estimates to arrive at a physical size for the landmark, and store that landmark size in the road model. The physical size estimate may be used to further determine or estimate a distance from the vehicle to the landmark. The distance to the landmark may be estimated based on the current speed of the vehicle and a scale of expansion based on the position of the landmark appearing in the images relative to the focus of expansion of the camera. For example, the distance to landmark may be estimated by $Z=V*dt*R/D$, where V is the speed of vehicle, R is the distance in the image from the landmark at time t1 to the focus of expansion, and D is the change in distance for the landmark in the image from t1 to t2. dt represents the (t2−t1). For example, the distance to landmark may be estimated by $Z=V*dt*RD$, where V is the speed of vehicle, R is the distance in the image between the landmark and the focus of expansion, dt is a time interval, and D is the image displacement of the landmark along the epipolar line. Other equations equivalent to the above equation, such as $Z=V*\omega/\Delta\omega$, may be used for estimating the distance to the landmark. Here, V is the vehicle speed, ω is an image length (like the object width), and Δω is the change of that image length in a unit of time.

When the physical size of the landmark is known, the distance to the landmark may also be determined based on the following equation: $Z=f*W/\omega$, where f is the focal length, W is the size of the landmark (e.g., height or width), $\omega$ is the number of pixels when the landmark leaves the image. From the above equation, a change in distance Z may be calculated using $\Delta Z=f*W*\Delta\omega/\omega^2+f*\Delta W/\omega$, where $\Delta W$ decays to zero by averaging, and where $\Delta\omega$ is the number of pixels representing a bounding box accuracy in the image. A value estimating the physical size of the landmark may be calculated by averaging multiple observations at the server side. The resulting error in distance estimation may be very small. There are two sources of error that may occur when using the formula above, namely $\Delta W$ and $\Delta\omega$. Their contribution to the distance error is given by $\Delta Z=f*W*\Delta\omega/\omega)^2+f*\Delta W/\omega$. However, $\Delta W$ decays to zero by averaging; hence $\Delta Z$ is determined by $\Delta\omega$ (e.g., the inaccuracy of the bounding box in the image).

For landmarks of unknown dimensions, the distance to the landmark may be estimated by tracking feature points on the landmark between successive frames. For example, certain features appearing on a speed limit sign may be tracked between two or more image frames. Based on these tracked features, a distance distribution per feature point may be generated. The distance estimate may be extracted from the distance distribution. For example, the most frequent distance appearing in the distance distribution may be used as the distance estimate. As another example, the average of the distance distribution may be used as the distance estimate.

Figure 13:
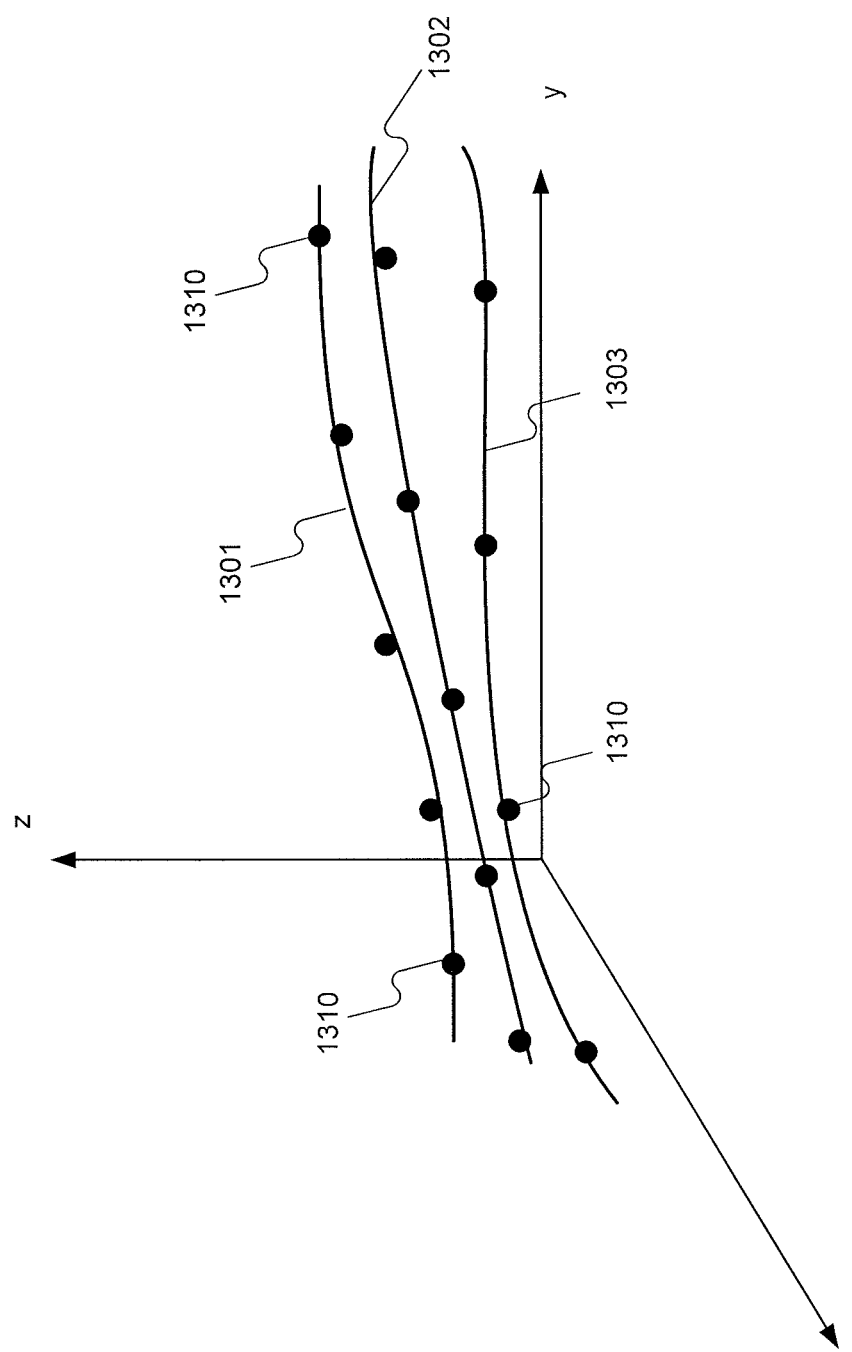
FIG. 13 illustrates an example autonomous vehicle road navigation model represented by a plurality of three dimensional splines, consistent with the disclosed embodiments.

FIG. 13 illustrates an example autonomous vehicle road navigation model represented by a plurality of three dimensional splines 1301, 1302, and 1303. The curves 1301-1303 shown in FIG. 13 are for illustration purpose only. Each spline may include one or more three dimensional polynomials connecting a plurality of data points 1310. Each polynomial may be a first order polynomial, a second order polynomial, a third order polynomial, or a combination of any suitable polynomials having different orders. Each data point 1310 may be associated with the navigation information received from vehicles 1205-1225. In some embodiments, each data point 1310 may be associated with data related to landmarks (e.g., size, location, and identification information of landmarks) and/or road signature profiles (e.g., road geometry, road roughness profile, road curvature profile, road width profile). In some embodiments, some data points 1310 may be associated with data related to landmarks, and others may be associated with data related to road signature profiles.

Figure 14:
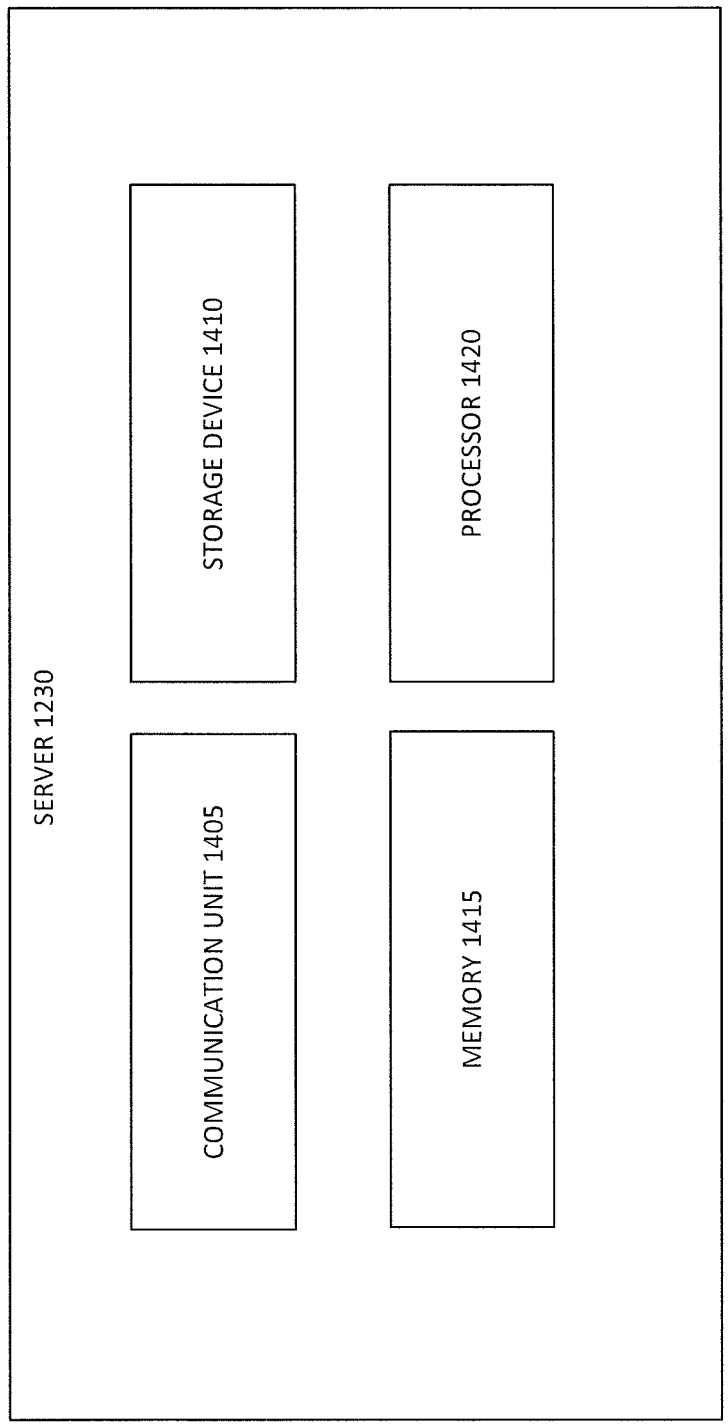
FIG. 14 illustrates a block diagram of a server consistent with the disclosed embodiments.

FIG. 14 illustrates a block diagram of server 1230. Server 1230 may include a communication unit 1405, which may include both hardware components (e.g., communication control circuits, switches, and antenna), and software components (e.g., communication protocols, computer codes). Server 1230 may communicate with vehicles 1205-1225 through communication unit 1405. For example, server 1230 may receive, through communication unit 1405, navigation information transmitted from vehicles 1205-1225. Server 1230 may distribute, through communication unit 1405, the autonomous vehicle road navigation model to one or more autonomous vehicles.

Server 1230 may include one or more storage devices 1410, such as a hard drive, a compact disc, a tape, etc. Storage device 1410 may be configured to store data, such as navigation information received from vehicles 1205-1225 and/or the autonomous vehicle road navigation model that server 1230 generates based on the navigation information. Storage device 1410 may be configured to store any other information, such as a sparse map (e.g., sparse map 800 discussed in connection with FIG. 8).

In addition to or in place of storage device 1410, server 1230 may include a memory 1415. Memory 1415 may be similar to or different from memory 140 or 150. Memory 1415 may be a non-transitory memory, such as a flash memory, a random access memory, etc. Memory 1415 may be configured to store data, such as computer codes or instructions executable by a processor (e.g., processor 1420), map data (e.g., data of sparse map 800), the autonomous vehicle road navigation model, and/or navigation information received from vehicles 1205-1225.

Server 1230 may include a processor 1420 configured to execute computer codes or instructions stored in memory 1415 to perform various functions. For example, processor 1420 may analyze the navigation information received from vehicles 1205-1225, and generate the autonomous vehicle road navigation model based on the analysis. Processor 1420 may control communication unit 1405 to distribute the autonomous vehicle road navigation model to one or more autonomous vehicles (e.g., one or more of vehicles 1205-1225 or any vehicle that travels on road segment 1200 at a later time). Processor 1420 may be similar to or different from processor 180, 190, or processing unit 110.

Figure 15:
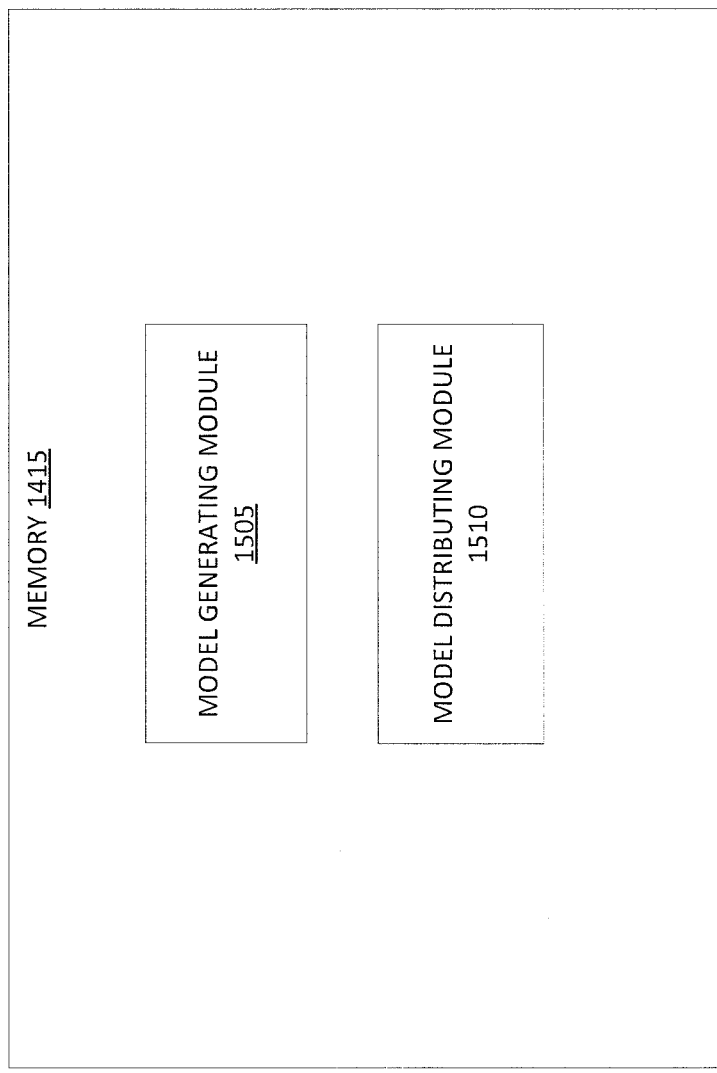
FIG. 15 illustrates a block diagram of a memory consistent with the disclosed embodiments.

FIG. 15 illustrates a block diagram of memory 1415, which may store computer codes or instructions for performing one or more operations for processing vehicle navigation information for use in autonomous vehicle navigation. As shown in FIG. 15, memory 1415 may store one or more modules for performing the operations for processing vehicle navigation information. For example, memory 1415 may include a model generating module 1505 and a model distributing module 1510. Processor 1420 may execute the instructions stored in any of modules 1505 and 1510 included in memory 1415.

Model generating module 1505 may store instructions which, when executed by processor 1420, may generate at least a portion of an autonomous vehicle road navigation model for a common road segment (e.g., road segment 1200) based on navigation information received from vehicles 1205-1225. For example, in generating the autonomous vehicle road navigation model, processor 1420 may cluster vehicle trajectories along the common road segment 1200 into different clusters. Processor 1420 may determine a target trajectory along the common road segment 1200 based on the clustered vehicle trajectories for each of the different clusters. Such an operation may include finding a mean or average trajectory of the clustered vehicle trajectories (e.g., by averaging data representing the clustered vehicle trajectories) in each cluster. In some embodiments, the target trajectory may be associated with a single lane of the common road segment 1200. The autonomous vehicle road navigation model may include a plurality of target trajectories each associated with a separate lane of the common road segment 1200. In some embodiments, the target trajectory may be associated with the common road segment 1200 instead of a single lane of the road segment 1200. The target trajectory may be represented by a three dimensional spline. In some embodiments, the spline may be defined by less than 10 kilobytes per kilometer, less than 20 kilobytes per kilometer, less than 100 kilobytes per kilometer, less than 1 megabyte per kilometer, or any other suitable storage size per kilometer.

The road model and/or sparse map may store trajectories associated with a road segment. These trajectories may be referred to as target trajectories, which are provided to autonomous vehicles for autonomous navigation. The target trajectories may be received from multiple vehicles, or may be generated based on actual trajectories or recommended trajectories (actual trajectories with some modifications) received from multiple vehicles. The target trajectories included in the road model or sparse map may be continuously updated (e.g., averaged) with new trajectories received from other vehicles.

Vehicles travelling on a road segment may collect data by various sensors. The data may include landmarks, road signature profile, vehicle motion (e.g., accelerometer data, speed data), vehicle position (e.g., GPS data), and may either reconstruct the actual trajectories themselves, or transmit the data to a server, which will reconstruct the actual trajectories for the vehicles. In some embodiments, the vehicles may transmit data relating to a trajectory (e.g., a curve in an arbitrary reference frame), landmarks data, and lane assignment along traveling path to server 1230. Various vehicles travelling along the same road segment at multiple drives may have different trajectories. Server 1230 may identify routes or trajectories associated with each lane from the trajectories received from vehicles through a clustering process.

FIG. 16 illustrates a process of clustering vehicle trajectories associated with vehicles 1205-1225 for determining a target trajectory for the common road segment (e.g., road segment 1200). The target trajectory or a plurality of target trajectories determined from the clustering process may be included in the autonomous vehicle road navigation model or sparse map 800. In some embodiments, vehicles 1205-1225 traveling along road segment 1200 may transmit a plurality of trajectories 1600 to server 1230. In some embodiments, server 1230 may generate trajectories based on landmark, road geometry, and vehicle motion information received from vehicles 1205-1225. To generate the autonomous vehicle road navigation model, server 1230 may cluster vehicle trajectories 1600 into a plurality of clusters 1605-1630, as shown in FIG. 16.

Clustering may be performed using various criteria. In some embodiments, all drives in a cluster may be similar with respect to the absolute heading along the road segment 1200. The absolute heading may be obtained from GPS signals received by vehicles 1205-1225. In some embodiments, the absolute heading may be obtained using dead reckoning. Dead reckoning, as one of skill in the art would understand, may be used to determine the current position and hence heading of vehicles 1205-1225 by using previously determined position, estimated speed, etc. Trajectories clustered by absolute heading may be useful for identifying routes along the roadways.

In some embodiments, all the drives in a cluster may be similar with respect to the lane assignment (e.g., in the same lane before and after a junction) along the drive on road segment 1200. Trajectories clustered by lane assignment may be useful for identifying lanes along the roadways. In some embodiments, both criteria (e.g., absolute heading and lane assignment) may be used for clustering.

In each cluster 1605-1630, trajectories may be averaged to obtain a target trajectory associated with the specific cluster. For example, the trajectories from multiple drives associated with the same lane cluster may be averaged. The averaged trajectory may be a target trajectory associate with a specific lane. To average a cluster of trajectories, server 1230 may select a reference frame of an arbitrary trajectory C0. For all other trajectories (C1, ..., Cn), server 1230 may find a rigid transformation that maps Ci to C0, where i=1, 2, ..., n, where n is a positive integer number, corresponding to the total number of trajectories included in the cluster. Server 1230 may compute a mean curve or trajectory in the C0 reference frame.

In some embodiments, the landmarks may define an arc length matching between different drives, which may be used for alignment of trajectories with lanes. In some embodiments, lane marks before and after a junction may be used for alignment of trajectories with lanes.

To assemble lanes from the trajectories, server 1230 may select a reference frame of an arbitrary lane. Server 1230 may map partially overlapping lanes to the selected reference frame. Server 1230 may continue mapping until all lanes are in the same reference frame. Lanes that are next to each other may be aligned as if they were the same lane, and later they may be shifted laterally.

Landmarks recognized along the road segment may be mapped to the common reference frame, first at the lane level, then at the junction level. For example, the same landmarks may be recognized multiple times by multiple vehicles in multiple drives. The data regarding the same landmarks received in different drives may be slightly different. Such data may be averaged and mapped to the same reference frame, such as the C0 reference frame. Additionally or alternatively, the variance of the data of the same landmark received in multiple drives may be calculated.

In some embodiments, each lane of road segment 120 may be associated with a target trajectory and certain landmarks. The target trajectory or a plurality of such target trajectories may be included in the autonomous vehicle road navigation model, which may be used later by other autonomous vehicles travelling along the same road segment 1200. Landmarks identified by vehicles 1205-1225 while the vehicles travel along road segment 1200 may be recorded in association with the target trajectory. The data of the target trajectories and landmarks may be continuously or periodically updated with new data received from other vehicles in subsequent drives.

For localization of an autonomous vehicle, the disclosed systems and methods may use an extended Kalman filter. The location of the vehicle may be determined based on three dimensional position data and/or three dimensional orientation data, prediction of future location ahead of vehicle's current location by integration of ego motion. The localization of vehicle may be corrected or adjusted by image observations of landmarks. For example, when vehicle detects a landmark within an image captured by the camera, the landmark may be compared to a known landmark stored within the road model or sparse map 800. The known landmark may have a known location (e.g., GPS data) along a target trajectory stored in the road model and/or sparse map 800. Based on the current speed and images of the landmark, the distance from the vehicle to the landmark may be estimated. The location of the vehicle along a target trajectory may be adjusted based on the distance to the landmark and the landmark's known location (stored in the road model or sparse map 800). The landmark's position/location data (e.g., mean values from multiple drives) stored in the road model and/or sparse map 800 may be presumed to be accurate.

In some embodiments, the disclosed system may form a closed loop subsystem, in which estimation of the vehicle six degrees of freedom location (e.g., three dimensional position data plus three dimensional orientation data) may be used for navigating (e.g., steering the wheel of) the autonomous vehicle to reach a desired point (e.g., 1.3 second ahead in the stored). In turn, data measured from the steering and actual navigation may be used to estimate the six degrees of freedom location.

In some embodiments, poles along a road, such as lampposts and power or cable line poles may be used as landmarks for localizing the vehicles. Other landmarks such as traffic signs, traffic lights, arrows on the road, stop lines, as well as static features or signatures of an object along the road segment may also be used as landmarks for localizing the vehicle. When poles are used for localization, the x observation of the poles (i.e., the viewing angle from the vehicle) may be used, rather than the y observation (i.e., the distance to the pole) since the bottoms of the poles may be occluded and sometimes they are not on the road plane.

Figure 17:
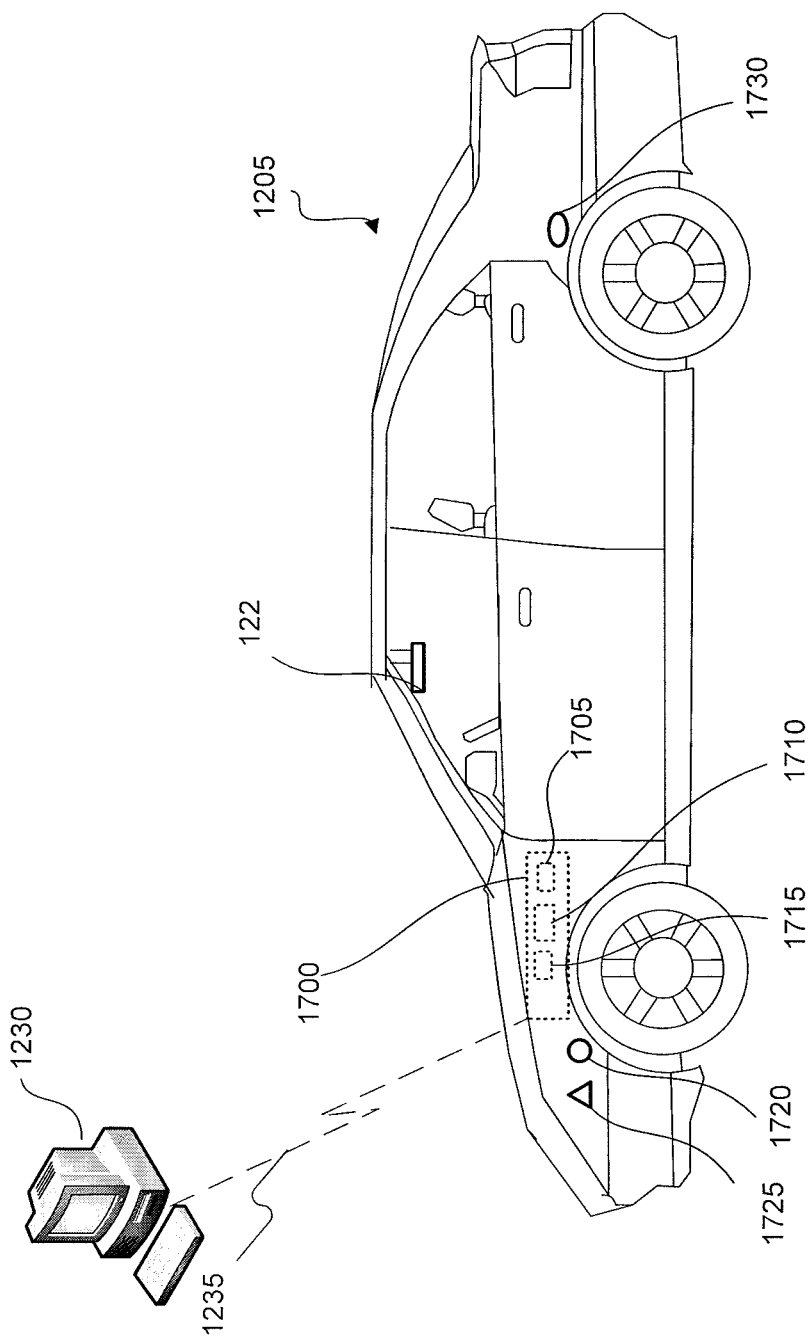
FIG. 17 illustrates a navigation system for a vehicle, which may be used for autonomous navigation, consistent with the disclosed embodiments.

FIG. 17 illustrates a navigation system for a vehicle, which may be used for autonomous navigation. For illustration, the vehicle is referenced as vehicle 1205. The vehicle shown in FIG. 17 may be any other vehicle disclosed herein, including, for example, vehicles 1210, 1215, 1220, and 1225, as well as vehicle 200 shown in other embodiments. As shown in FIG. 12, vehicle 1205 may communicate with server 1230. Vehicle 1205 may include an image capture device 122 (e.g., camera 122). Vehicle 1205 may include a navigation system 1700 configured for providing navigation guidance for vehicle 1205 to travel on a road (e.g., road segment 1200). Vehicle 1205 may also include other sensors, such as a speed sensor 1720 and an accelerometer 1725. Speed sensor 1720 may be configured to detect the speed of vehicle 1205. Accelerometer 1725 may be configured to detect an acceleration or deceleration of vehicle 1205. Vehicle 1205 shown in FIG. 17 may be an autonomous vehicle, and the navigation system 1700 may be used for providing navigation guidance for autonomous driving. Alternatively, vehicle 1205 may also be a non-autonomous, human-controlled vehicle, and navigation system 1700 may still be used for providing navigation guidance.

Navigation system 1700 may include a communication unit 1705 configured to communicate with server 1230 through communication path 1235. Navigation system 1700 may include a GPS unit 1710 configured to receive and process GPS signals. Navigation system 1700 may include at least one processor 1715 configured to process data, such as GPS signals, map data from sparse map 800 (which may be stored on a storage device provided onboard vehicle 1205 or received from server 1230), road geometry sensed by a road profile sensor 1730, images captured by camera 122, and/or autonomous vehicle road navigation model received from server 1230. The road profile sensor 1730 may include different types of devices for measuring different types of road profile, such as road surface roughness, road width, road elevation, road curvature, etc. For example, the road profile sensor 1730 may include a device that measures the motion of a suspension of vehicle 1205 to derive the road roughness profile. In some embodiments, the road profile sensor 1730 may include radar sensors to measure the distance from vehicle 1205 to road sides (e.g., barrier on the road sides), thereby measuring the width of the road. In some embodiments, the road profile sensor 1730 may include a device configured for measuring the up and down elevation of the road. In some embodiment, the road profile sensor 1730 may include a device configured to measure the road curvature. For example, a camera (e.g., camera 122 or another camera) may be used to capture images of the road showing road curvatures. Vehicle 1205 may use such images to detect road curvatures.

The at least one processor 1715 may be programmed to receive, from camera 122, at least one environmental image associated with vehicle 1205. The at least one processor 1715 may analyze the at least one environmental image to determine navigation information related to the vehicle 1205. The navigation information may include a trajectory related to the travel of vehicle 1205 along road segment 1200. The at least one processor 1715 may determine the trajectory based on motions of camera 122 (and hence the vehicle), such as three dimensional translation and three dimensional rotational motions. In some embodiments, the at least one processor 1715 may determine the translation and rotational motions of camera 122 based on analysis of a plurality of images acquired by camera 122. In some embodiments, the navigation information may include lane assignment information (e.g., in which lane vehicle 1205 is travelling along road segment 1200). The navigation information transmitted from vehicle 1205 to server 1230 may be used by server 1230 to generate and/or update an autonomous vehicle road navigation model, which may be transmitted back from server 1230 to vehicle 1205 for providing autonomous navigation guidance for vehicle 1205.

The at least one processor 1715 may also be programmed to transmit the navigation information from vehicle 1205 to server 1230. In some embodiments, the navigation information may be transmitted to server 1230 along with road information. The road location information may include at least one of the GPS signal received by the GPS unit 1710, landmark information, road geometry, lane information, etc. The at least one processor 1715 may receive, from server 1230, the autonomous vehicle road navigation model or a portion of the model. The autonomous vehicle road navigation model received from server 1230 may include at least one update based on the navigation information transmitted from vehicle 1205 to server 1230. The portion of the model transmitted from server 1230 to vehicle 1205 may include an updated portion of the model. The at least one processor 1715 may cause at least one navigational maneuver (e.g., steering such as making a turn, braking, accelerating, passing another vehicle, etc.) by vehicle 1205 based on the received autonomous vehicle road navigation model or the updated portion of the model.

The at least one processor 1715 may be configured to communicate with various sensors and components included in vehicle 1205, including communication unit 1705, GPS unit 1715, camera 122, speed sensor 1720, accelerometer 1725, and road profile sensor 1730. The at least one processor 1715 may collect information or data from various sensors and components, and transmit the information or data to server 1230 through communication unit 1705. Alternatively or additionally, various sensors or components of vehicle 1205 may also communicate with server 1230 and transmit data or information collected by the sensors or components to server 1230.

In some embodiments, vehicles 1205-1225 may communicate with each other, and may share navigation information with each other, such that at least one of the vehicles 1205-1225 may generate the autonomous vehicle road navigation model based on information shared by other vehicles. In some embodiments, vehicles 1205-1225 may share navigation information with each other and each vehicle may update its own the autonomous vehicle road navigation model provided in the vehicle. In some embodiments, at least one of the vehicles 1205-1225 (e.g., vehicle 1205) may function as a hub vehicle. The at least one processor 1715 of the hub vehicle (e.g., vehicle 1205) may perform some or all of the functions performed by server 1230. For example, the at least one processor 1715 of the hub vehicle may communicate with other vehicles and receive navigation information from other vehicles. The at least one processor 1715 of the hub vehicle may generate the autonomous vehicle road navigation model or an update to the model based on the shared information received from other vehicles. The at least one processor 1715 of the hub vehicle may transmit the autonomous vehicle road navigation model or the update to the model to other vehicles for providing autonomous navigation guidance.

Figure 18:
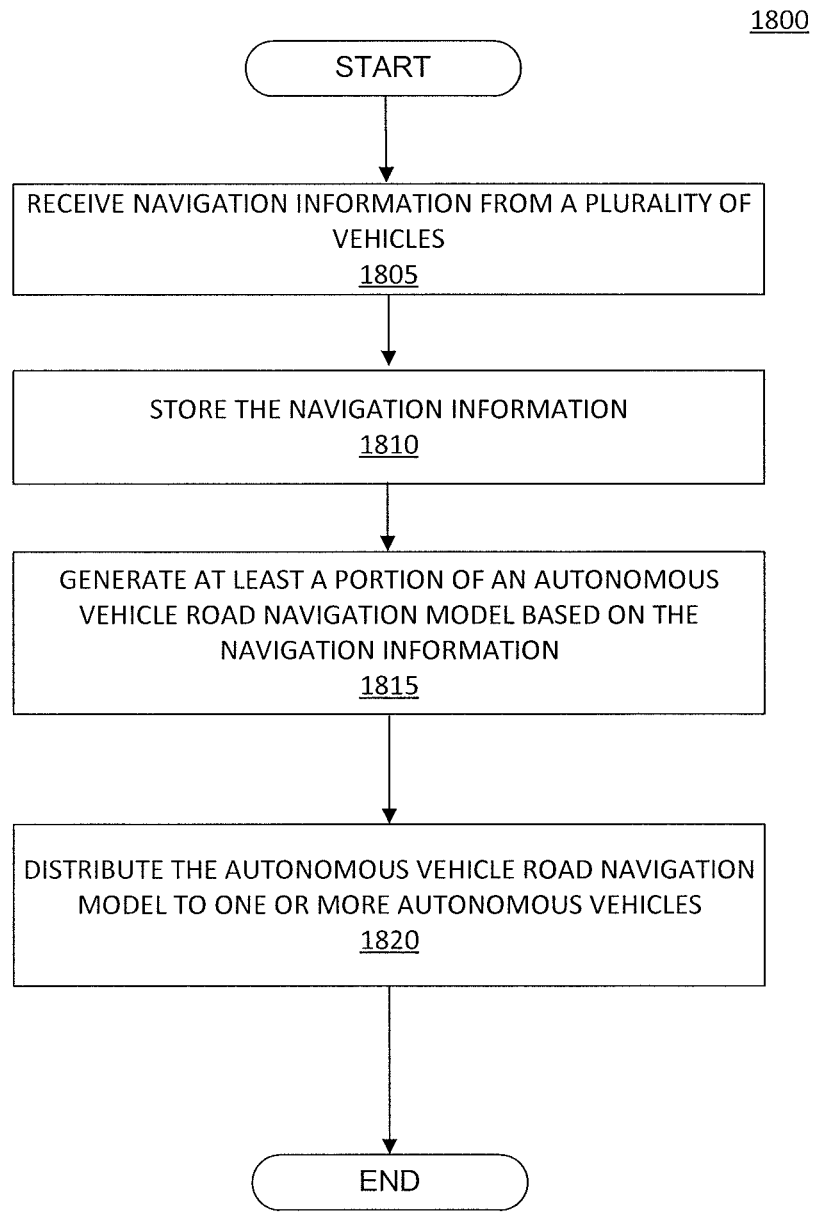
FIG. 18 is a flowchart showing an example process for processing vehicle navigation information for use in autonomous vehicle navigation, consistent with the disclosed embodiments.

FIG. 18 is a flowchart showing an example process 1800 for processing vehicle navigation information for use in autonomous vehicle navigation. Process 1800 may be performed by server 1230 or processor 1715 included in a hub vehicle. In some embodiments, process 1800 may be used for aggregating vehicle navigation information to provide an autonomous vehicle road navigation model or to update the model. Process 1800 may include receiving navigation information from a plurality of vehicles (step 1805). For example, server 1230 may receive the navigation information from vehicles 1205-1225. The navigation information may be associated with a common road segment (e.g., road segment 1200) along which the vehicles 1205-1225 travel. Process 1800 may include storing the navigation information associated with the common road segment (step 1810). For example, server 1230 may store the navigation information in storage device 1410 and/or memory 1415. Process 1800 may include generating at least a portion of an autonomous vehicle road navigation model based on the navigation information (step 1815). For example, server 1230 may generate at least a portion of the autonomous vehicle road navigation model for common road segment 1200 based on the navigation information received from vehicles 1205-1225 that travel on the common road segment 1200. Process 1800 may further include distributing the autonomous vehicle road navigation model to one or more autonomous vehicles (step 1820). For example, server 1230 may distribute the autonomous vehicle road navigation model or a portion (e.g., an update) of the model to vehicles 1205-1225, or any other vehicles later travel on road segment 1200 for use in autonomously navigating the vehicles along road segment 1200.

Process 1800 may include additional operations or steps. For example, generating the autonomous vehicle road navigation model may include clustering vehicle trajectories received from vehicles 1205-1225 along road segment 1200 into a plurality of clusters. Process 1800 may include determining a target trajectory along common road segment 1200 by averaging the clustered vehicle trajectories in each cluster. Process 1800 may also include associating the target trajectory with a single lane of common road segment 1200. Process 1800 may include determining a three dimensional spline to represent the target trajectory in the autonomous vehicle road navigation model.

Figure 19:
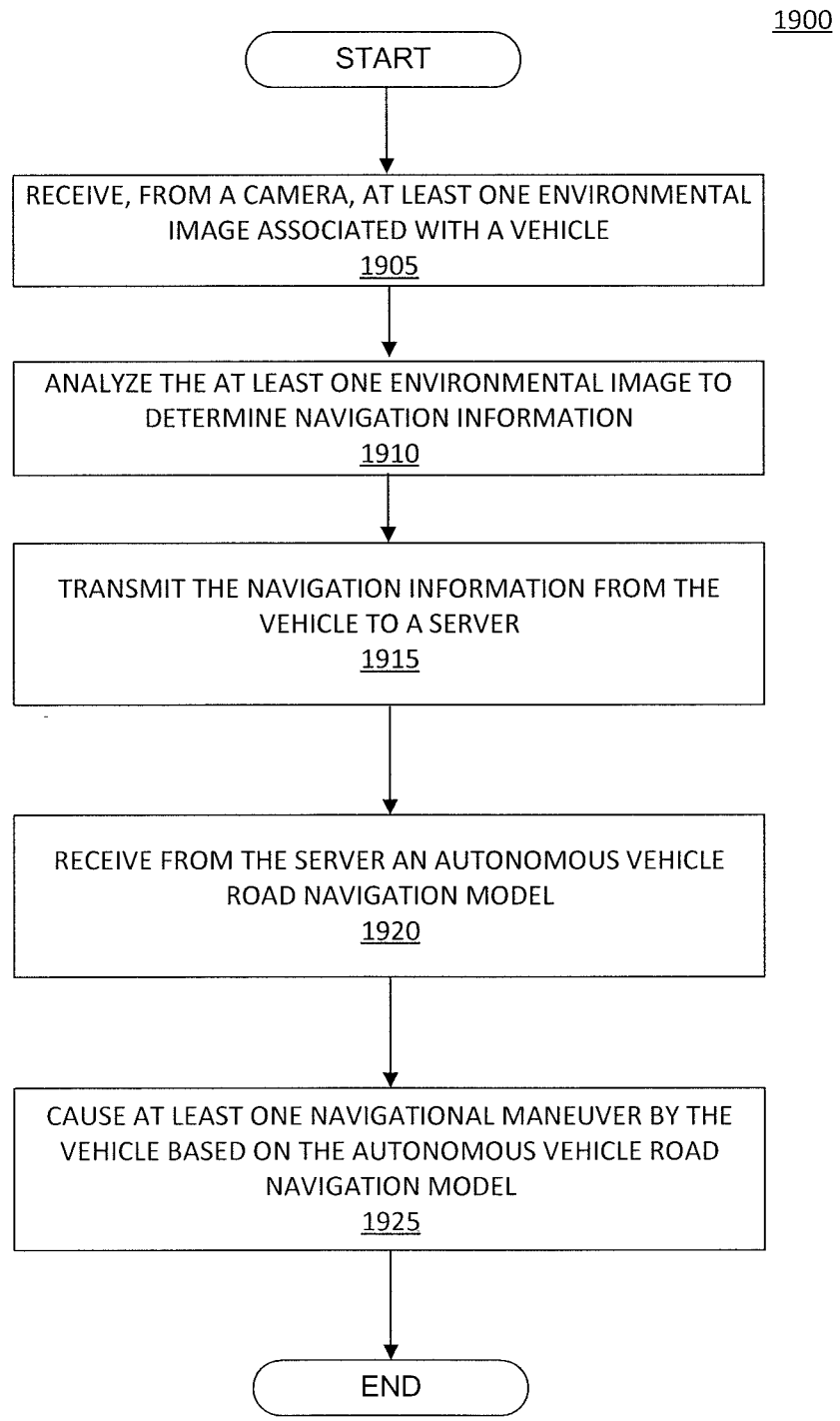
FIG. 19 is a flowchart showing an example process performed by a navigation system of a vehicle, consistent with the disclosed embodiments.

FIG. 19 is a flowchart showing an example process 1900 performed by a navigation system of a vehicle. Process 1900 may be performed by processor 1715 included in navigation system 1700. Process 1900 may include receiving, from a camera, at least one environmental image associated with the vehicle (step 1905). For example, processor 1715 may receive, from camera 122, at least one environmental image associated with vehicle 1205. Camera 122 may capture one or more images of the environment surrounding vehicle 1205 as vehicle 1205 travels along road segment 1200. Process 1900 may include analyzing the at least one environmental image to determine navigation information related to the vehicle (step 1910). For example, processor 1715 may analyze the environmental images received from camera 122 to determine navigation information, such as a trajectory of travel along road segment 1200. Processor 1715 may determine the trajectory of travel of vehicle 1205 based on camera ego motions (e.g., three dimensional translation and/or three dimensional rotational motions) sensed by, e.g., the analysis of the images.

Process 1900 may include transmitting the navigation information from the vehicle to a server (step 1915). In some embodiments, the navigation information may be transmitted along with road information from the vehicle to server 1230. For example, processor 1715 may transmit, via communication unit 1705, the navigation information along with road information, such as the lane assignment, road geometry, from vehicle 1205 to server 1230. Process 1900 may include receiving from the server an autonomous vehicle road navigation model or a portion of the model (step 1920). For example, processor 1715 may receive the autonomous vehicle road navigation model or a portion of the model from server 1230. The model or the portion of the model may include at least one update to the model based on the navigation information transmitted from vehicle 1205. Processor 1715 may update an existing model provided in navigation system 1700 of vehicle 1205. Process 1900 may include causing at least one navigational maneuver by the vehicle based on the autonomous vehicle road navigation model (step 1925). For example, processor 1715 may cause vehicle 1205 to steer, make a turn, change lanes, accelerate, brake, stop, etc. Processor 1715 may send signals to at least one of throttling system 220, braking system 230, and steering system 240 to cause vehicle 1205 to perform the navigational maneuver.

Process 1900 may include other operations or steps performed by processor 1715. For example, the navigation information may include a target trajectory for vehicles to travel along a road segment, and process 1900 may include clustering, by processor 1715, vehicle trajectories related to multiple vehicles travelling on the road segment and determining the target trajectory based on the clustered vehicle trajectories. Clustering vehicle trajectories may include clustering, by processor 1715, the multiple trajectories related to the vehicles travelling on the road segment into a plurality of clusters based on at least one of the absolute heading of vehicles or lane assignment of the vehicles. Generating the target trajectory may include averaging, by processor 1715, the clustered trajectories. Other processes or steps performed by server 1230, as described above, may also be included in process 1900.

The disclosed systems and methods may include other features. For example, the disclosed systems may use local coordinates, rather than global coordinates. For autonomous driving, some systems may present data in world coordinates. For example, longitude and latitude coordinates on the earth surface may be used. In order to use the map for steering, the host vehicle must know its position and orientation relative to the map. It seems natural to use a GPS device on board, in order to position the vehicle on the map and in order to find the rotation transformation between the body reference frame and the world reference frame (say, North, East and Down). Once the body reference frame is aligned with the map reference frame, then the desired route may be expressed in the body reference frame and the steering commands may be computed or generated.

However, one possible issue with this strategy is that current GPS technology does not usually provide the body location and pose with sufficient accuracy and availability. To overcome this problem, it has been proposed to use landmarks whose world coordinates are known. The idea is to construct very detailed maps (called High Definition or HD maps), that contain landmarks of different kinds. The assumption is that the vehicle is equipped with a sensor that can detect and locate the landmarks in its own reference frame. Once the relative position between the vehicle and the landmarks is found, the landmarks' world coordinates are taken from the HD map, and the vehicle can use them to compute its own location and pose.

This method is still using the global world coordinate system as a mediator that establishes the alignment between the map and the body reference frames. Namely, the landmarks are used in order to compensate for the limitations of the GPS device onboard the vehicles. The landmarks, together with an HD map, may enable to compute the precise vehicle pose in global coordinates, and hence the map-body alignment problem is solved.

In the disclosed systems and methods, instead of using one global map of the world, many map pieces or local maps may be used for autonomous navigation. Each piece of a map or each local map may define its own coordinate frame. These coordinate frames may be arbitrary. The vehicle's coordinates in the local maps may not need to indicate where the vehicle is located on the surface of earth. Moreover, the local maps may not be required to be accurate over large scales, meaning there may be no rigid transformation that can embed a local map in the global world coordinate system.

There are two main processes associated with this representation of the world, one relates to the generation of the maps and the other relates to using them. With respect to maps generation, this type of representation may be created and maintained by crowd sourcing. There may be no need to apply sophisticated survey equipment, because the use of HD maps is limited, and hence crowd sourcing becomes feasible. With respect to usage, an efficient method to align the local map with the body reference frame without going through a standard world coordinate system may be employed. Hence there may be no need, at least in most scenarios and circumstances, to have a precise estimation of the vehicle location and pose in global coordinates. The memory footprint of the local maps may be kept very small.

The principle underlying the maps generation is the integration of ego motion. The vehicles sense the motion of the camera in space (3D translation and 3D rotation). The vehicles or the server may reconstruct the trajectory of the vehicle by integration of ego motion over time, and this integrated path may be used as a model for the road geometry. This process may be combined with sensing of close range lane marks, and then the reconstructed route may reflect the path that a vehicle should follow, and not the particular path that it did follow. In other words, the reconstructed route or trajectory may be modified based on the sensed data relating to close range lane marks, and the modified reconstructed trajectory may be used as a recommended trajectory or target trajectory, which may be saved in the road model or sparse map for use by other vehicles navigating the same road segment.

In some embodiments, the map coordinate system may be arbitrary. A camera reference frame may be selected at an arbitrary time, and used as the map origin. The integrated trajectory of the camera may be expressed in the coordinate system of that particular chosen frame. The value of the route coordinates in the map may not directly represent a location on earth.

The integrated path may accumulate errors. This may be due to the fact that the sensing of the ego motion may not be absolutely accurate. The result of the accumulated error is that the local map may diverge, and the local map may not be regarded as a local copy of the global map. The larger the size of the local map piece, the larger the deviation from the "true" geometry on earth.

The arbitrariness and the divergence of the local maps may not be a design principle but rather may be a consequence. These properties may be a consequence of the integration method, which may be applied in order to construct the maps in a crowd sourcing manner (by vehicles traveling along the roads). However, vehicles may successfully use the local maps for steering.

The proposed map may diverge over long distances. Since the map is used to plan a trajectory in the immediate vicinity of the vehicle, the effect of the divergence may be acceptable. At any time instance, the system (e.g., server 1230 or vehicle 1205) may repeat the alignment procedure, and use the map to predict the road location (in the camera coordinate frame) some 1.3 seconds ahead (or any other seconds, such as 1.5 seconds, 1.0 second, 1.8 seconds, etc.). As long as the accumulated error over that distance is small enough, then the steering command provided for autonomous driving may be used.

In some embodiments, a local map may focus on a local area, and may not cover a too large area. This means that a vehicle that is using a local map for steering in autonomous driving, may arrive at some point to the end of the map and may have to switch to another local piece of map. The switching may be enabled by the local maps overlapping each other. Once the vehicle enters the area that is common to both maps, the system (e.g., server 1230 or vehicle 1205) may continue to generate steering commands based on a first local map (the map that is being used), but at the same time the system may localize the vehicle on the other map (or second local map) that overlaps with the first local map. In other words, the system may simultaneously align the present coordinate frame of the camera both with the coordinate frame of the first map and with the coordinate frame of the second map. When the new alignment is established, the system may switch to the other map and plan the vehicle trajectory there.

The disclosed systems may include additional features, one of which is related to the way the system aligns the coordinate frames of the vehicle and the map. As explained above that landmarks may be used for alignment, assuming the vehicle may measure its relative position to them. This is useful in autonomous driving, but sometimes it may result in a demand for a large number of landmarks and hence a large memory footprint. The disclosed systems may therefore use an alignment procedure that addresses this problem. In the alignment procedure, the system may compute a 1D estimator for the location of the vehicle along the road, using sparse landmarks and integration of ego speed. The system may use the shape of the trajectory itself to compute the rotation part of the alignment, using a tail alignment method discussed in details below in other sections. The idea is that the vehicle reconstructs its own trajectory while driving the "tail" and computes a rotation around its assumed position along the road, in order to align the tail with the map.

In the disclosed systems and methods, a GPS device may still be used. Global coordinates may be used for indexing the database that stores the trajectories and/or landmarks. The relevant piece of local map and the relevant landmarks in the vicinity of the vehicles may be stored in memory and retrieved from the memory using global GPS coordinates. However, in some embodiments, the global coordinates may not be used for path planning, and may not be accurate. In one example, the usage of global coordinates may be limited for indexing of the information.

In situations where "tail alignment" cannot function well, the system may compute the vehicle's pose using a larger number of landmarks. This may be a rare case, and hence the impact on the memory footprint may be moderate. Road intersections are examples of such situations.

The disclosed systems and methods may use semantic landmarks (e.g., traffic signs), since they can be reliably detected from the scene and matched with the landmarks stored in the road model or sparse map. In some cases the disclosed systems may use non-semantic landmarks (e.g., general purpose signs) as well, and in such cases the non-semantic landmarks may be attached to an appearance signature, as discussed above. The system may use a learning method for the generation of signatures that follows the "same or not-same" recognition paradigm.

For example, given many drives with GPS coordinates along them, the disclosed systems may produce the underlying road structure junctions and road segments. The roads are assumed to be far enough from each other to be able to differentiate them using the GPS. Only a coarse grained map may be needed. To generate the underlying road structure graph, the space may be divided into a lattice of a given resolution (e.g., 50 m by 50 m). Every drive may be seen as an ordered list of lattice sites. The system may color every lattice site belonging to a drive to produce an image of the merged drives. The colored lattice points may be represented as nodes on the merged drives. The drives passing from one node to another may be represented as links. The system may fill small holes in the image, to avoid differentiating lanes and correct for GPS errors. The system may use a suitable thinning algorithm (e.g., an algorithm named "Zhang-Suen" thinning algorithm) to obtain the skeleton of the image. This skeleton may represent the underlying road structure, and junctions may be found using a mask (e.g., a point connected to at least three others). After the junctions are found, the segments may be the skeleton parts that connect them. To match the drives back to the skeleton, the system may use a Hidden Markov Model. Every GPS point may be associated with a lattice site with a probability inverse to its distance from that site. Use a suitable algorithm (e.g., an algorithm named the "Viterbi" algorithm) to match GPS points to lattice sites, while not allowing consecutive GPS points to match to non neighboring lattice sites.

A plurality of methods may be used for mapping the drives back to the map. For example, a first solution may include keeping track during the thinning process. A second solution may use proximity matching. A third solution may use hidden Markov model. The hidden Markov model assumes an underlying hidden state for every observation, and assigns probabilities for a given observation given the state, and for a state given the previous state. A Viterbi algorithm may be used to find the most probable states given a list of observations.

The disclosed systems and methods may include additional features. For example, the disclosed systems and methods may detect highway entrances/exits. Multiple drives in the same area may be merged using GPS data to the same coordinate system. The system may use visual feature points for mapping and localization.

In some embodiments, generic visual features may be used as landmarks for the purpose of registering the position and orientation of a moving vehicle, in one drive (localization phase), relative to a map generated by vehicles traversing the same stretch of road in previous drives (mapping phase). These vehicles may be equipped with calibrated cameras imaging the vehicle surroundings and GPS receivers. The vehicles may communicate with a central server (e.g., server 1230) that maintains an up-to-date map including these visual landmarks connected to other significant geometric and semantic information (e.g. lane structure, type and position of road signs, type and position of road marks, shape of nearby drivable ground area delineated by the position of physical obstacles, shape of previously driven vehicle path when controlled by human driver, etc.). The total amount of data that may be communicated between the central server and vehicles per length of road is small, both in the mapping and localization phases.

In the mapping phase, the disclosed systems (e.g., vehicles or server) may detect feature points (FPs) and compute their descriptors (e.g. using the FAST/BRISK/ORB detectors and descriptors or a detector/descriptor pair that was trained using the database discussed below). The system may track FPs between frames in which they appear using their motion in the image plane and by matching their descriptors using e.g. Euclidean or Hamming distance in descriptor space. The system may use tracked FPs to estimate camera motion and world positions of objects on which FPs were detected and tracked. The system may classify FPs as ones that will likely be detected in future drives (e.g. FPs detected on momentarily moving objects, parked cars and shadow texture will likely not reappear in future drives). This reproducibility classification (RC) may be a function of both the intensities in a region of the image pyramid surrounding the detected FP, the motion of the tracked FP in the image plane, the extent of viewpoints in which it was successfully tracked/detected and its relative 3D position. In some embodiments, the vehicles may send representative FP descriptors (computed from a set of observations), estimated 3D position relative to vehicle and momentary vehicle GPS coordinates to server 1230.

During the mapping phase, when communication bandwidth between the mapping vehicles and central server is limited, the vehicles may send FPs to the server at a high frequency when the presence of FPs or other semantic landmarks in the map (such as road signs and lane structure) is limited and insufficient for the purpose of localization. Although vehicles in the mapping phase may send FPs at a low spatial frequency these may be agglomerated in the server. Detection of reoccurring FPs may also be performed by the server and the server may store the set of reoccurring FPs. Visual appearance of landmarks may at least in some cases be sensitive to the time of day or the season in which they were captured. To increase reproducibility probability of FPs, these may be binned by the server into time-of-day and season bins.

The vehicles may send the server other semantic and geometric information in the nearby FP coordinate system (lane shape, structure of road plane, 3D position of obstacles, free space in mapping clip momentary coordinate system, path driven by human driver in a setup drive to a parking location).

In a localization phase, the server may send a map containing landmarks in the form of FP positions and descriptors to vehicles. Feature points (FPs) may be detected and tracked in near real time within a set of current consecutive frames. Tracked FPs may be used to estimate camera motion and world positions of FPs. Currently detected FP descriptors may be searched to match a list of map FPs having GPS coordinates within an estimated finite GPS uncertainty radius from the momentary GPS reading. Matching may be done by searching all pairs of current and mapping FPs that minimize an Euclidean or Hamming distance in descriptor space. Using the FP matches and their current and map positions, rotation and translation between the momentary vehicle position and the local map coordinate system may be registered.

The disclosed systems and methods may include a method for training a reproducibility classifier. Training may be performed in one of the following schemes in order of growing labeling cost and resulting classifier accuracy.

In the first scheme, a database including a large number of clips recorded by vehicle cameras with matching momentary vehicle GPS position may be collected. This database may include a representative sample of drives (with respect to various properties: e.g., time of day, season, weather condition, type of roadway). Feature points (FPs) extracted from frames of different drives at a similar GPS position and heading may be potentially matched within a GPS uncertainty radius. Unmatched FPs may be labeled unreproducible and those matched may be labeled reproducible. A classifier may then be trained to predict the reproducibility label of an FP given its appearance in the image pyramid, its momentary position relative to the vehicle and the extent of viewpoints positions in which it was successfully tracked.

In the second scheme, FP pairs extracted from the clip database described in the first scheme may also be labeled by a human responsible for annotating FP matches between clips.

In a third scheme, a database augmenting that of the first scheme with precise vehicle position, vehicle orientation and image pixel depth using Light Detection And Ranging (LIDAR) measurements may be used to accurately match world positions in different drives. Feature point descriptors may then be computed at the image region corresponding to these world points at different viewpoints and drive times. The classifier may then be trained to predict the average distance in descriptor space a descriptor is located from its matched descriptors. In this case reproducibility may be measured by likely having a low descriptor distance.

Uploading Recommended, not Actual Trajectories

Consistent with disclosed embodiments, the system may generate an autonomous vehicle road navigation model based on the observed trajectories of vehicles traversing a common road segment (e.g., which may correspond to the trajectory information forwarded to a server by a vehicle). The observed trajectories, however, may not correspond to actual trajectories taken by vehicles traversing a road segment. Rather, in certain situations, the trajectories uploaded to the server may be modified with respect to actual reconstructed trajectories determined by the vehicles. For example, a vehicle system, while reconstructing a trajectory actually taken, may use sensor information (e.g., analysis of images provided by a camera) to determine that its own trajectory may not be the preferred trajectory for a road segment. For example, the vehicle may determine based on image data from onboard cameras that it is not driving in a center of a lane or that it crossed over a lane boundary for a determined period of time. In such cases, among others, a refinement to the vehicle's reconstructed trajectory (the actual path traversed) may be made based on information derived from the sensor output. The refined trajectory, not the actual trajectory, may then be uploaded to the server for potential use in building or updating sparse data map 800.

Referring to FIGS. 12 and 17, vehicle 1205 may communicate with server 1230. Vehicle 1205 may be an autonomous vehicle or a traditional, primarily human-controlled vehicle. Vehicle 1205 may collect (or detect, sense, measure) data regarding road segment 1200 as vehicle 1205 travels along road segment 1200. The collected data may include navigation information, such as road geometry, recognized landmark including signs, road markings, etc. Vehicle 1205 may transmit the collected data to server 1230. Server 1230 may generate and/or update an autonomous vehicle road navigation model based on the data received from vehicle 1205. The autonomous vehicle road navigation model may include a plurality of target trajectories representing preferred paths of travel along particular road segments.

As shown in FIG. 17, vehicle 1205 may include navigation system 1700. Navigation system may include a storage device (e.g., a hard drive, a memory) configured for storing the autonomous vehicle road navigation model and/or map data (e.g., map data of sparse map 800). It should be noted that the storage device may store a local copy of the entire road model from sparse data map 800. Alternately, the storage device may store only portions of sparse data maps (e.g., local maps) provided to the navigating vehicle as needed. In such embodiments, the local maps may be stored only temporarily in the storage device and may be purged from the storage device upon receipt of one or more newly received local maps or after a vehicle is determined to have exited a particular navigational area or zone. Navigation system 1700 may include at least one processor 1715.

Navigation system 1700 may include one or more sensors, such as camera 122, GPS unit 1710, road profile sensor 1730, speed sensor 1720, and accelerometer 1725. Vehicle 1205 may include other sensors, such as radar sensors. The sensors included in vehicle 1205 may collect data related to road segment 1200 as vehicle 1205 travels along road segment 1200.

The processor 1715 may be configured to receive, from the one or more sensors, outputs indicative of a motion of vehicle 1205. For example, accelerometer 1725 may output signals indicating three dimensional translation and/or three dimensional rotational motions of camera 122. Speed sensor may output a speed of vehicle 1205. Road profile sensor 1730 may output signals indicating road roughness, road width, road elevation, road curvature, which may be used to determine the motion or trajectory of the vehicle 1205.

Processor 1715 may determine an actual trajectory of vehicle 1205 based on the outputs from the one or more sensors. For example, based on analysis of images output from camera 122, processor 1715 may identify landmarks along road segment 1200. Landmarks may include traffic signs (e.g., speed limit signs), directional signs (e.g., highway directional signs pointing to different routes or places), and general signs (e.g., a rectangular business sign that is associated with a unique signature, such as a color pattern). The identified landmark may be compared with the landmark stored in sparse map 800. When a match is found, the location of the landmark stored in sparse map 800 may be used as the location of the identified landmark. The location of the identified landmark may be used for determining the location of the vehicle 1205 along a target trajectory. In some embodiments, processor 1715 may also determine the location of vehicle 1205 based on GPS signals output by GPS unit 1710.

Processor 1715 may determine the vehicle motion based on output from the accelerometer 1725, the camera 122, and/or the speed sensor 1720. For example, speed sensor 1720 may output a current speed of vehicle 1205 to processor 1715. Accelerometer 1725 may output a signal indicating three dimensional translation and/or rotation of vehicle 1205 to processor 1715. The camera 122 may output a plurality of images of the surrounding of vehicle 1205 to processor 1715. Based on the outputs from the plurality of sensors and devices, processor 1715 may determine an actual trajectory of vehicle 1205. The actual trajectory reflects the actual path vehicle 1205 has taken or is taking, including, e.g., which lane along road segment 1200 vehicle 1205 has travelled in or is travelling in, and what different road segments vehicle 1205 have travelled along.

Processor 1715 may receive, from camera 122, at least one environmental image associated with vehicle 1205. For example, camera 122 may be a front-facing camera, which may capture an image of the environment in front of vehicle 1205. Camera 122 may be facing other directions, such as the sides of vehicle 1205 or the rear of vehicle 1205. Vehicle 1205 may include a plurality of cameras facing different directions. Processor 1715 may analyze the at least one environmental image to determine information associated with at least one navigational constraint. The navigational constraint may include at least one of a barrier (e.g., a lane separating barrier), an object (e.g., a pedestrian, a lamppost, a traffic light post), a lane marking (e.g., a solid yellow lane marking), a sign (e.g., a traffic sign, a directional sign, a general sign), or another vehicle (e.g., a leading vehicle, a following vehicle, a vehicle that is traveling on the side of vehicle 1205).

Processor 1715 may also determine a target trajectory for transmitting to server 1230. The target trajectory may be the same as the actual trajectory determined by processor 1715 based on the sensor outputs. In some embodiments, the target trajectory may be different from the actual trajectory determined based on the sensor outputs. The target trajectory may include one or more modifications to the actual trajectory based on the determined information associated with the at least one navigational constraint.

For example, the environmental image captured by camera 122 may include a barrier, such as a temporary lane shifting barrier 100 meters ahead of vehicle 1250 that changes the lanes (e.g., when lanes are temporarily shifted due to an accident ahead). Processor 1715 may detect the temporary lane shifting barrier from the image, and take a lane different from a lane corresponding to the target trajectory stored in the road model or sparse map in compliance to the temporary lane shift. The actual trajectory of vehicle may reflect this change of lanes. However, the lane shifting is temporary and may be cleared in the next 10, 15, or 30 minutes. Vehicle 1205 may thus modify the actual trajectory (i.e., the shift of lanes) vehicle 1205 has taken to reflect that a target trajectory should be different from the actual trajectory vehicle 1205 has taken. For example, the system may recognize that the path traveled differs from a preferred trajectory for the road segment. Thus, the system may adjust a reconstructed trajectory prior to uploading the trajectory information to the servers. In other embodiments, the actual reconstructed trajectory information may be uploaded, by one or more recommended trajectory refinements (e.g., a size and direction of a translation to be made to at least a portion of the reconstructed trajectory) may also be uploaded. In some embodiments, processor 1715 may transmit a modified actual trajectory to server 1230. Server 1230 may generate or update a target trajectory based on the received information and may transmit the target trajectory to other autonomous vehicles that later travel on the same road segment.

As another example, the environmental image may include an object, such as a pedestrian suddenly appearing in road segment 1200. Processor 1715 may detect the pedestrian, and vehicle 1205 may change lanes to avoid a collision with the pedestrian. The actual trajectory vehicle 1205 reconstructed based on sensed data may include the change of lanes. However, the pedestrian may soon leave the roadway. So, vehicle 1205 may modify the actual trajectory (or determine a recommended modification) to reflect that the target trajectory should be different from the actual trajectory taken (as the appearance of the pedestrian is a temporary condition that should not be accounted for in the target trajectory determination. In some embodiments, the vehicle may transmit to the server data indicating a temporary deviation from the predetermined trajectory, when the actual trajectory is modified. The data may indicate a cause of the deviation, or the server may analyze the data to determine a cause of the deviation. Knowing the cause of the deviation may be useful. For example, when the deviation is due to the driver noticing an accident that has recently occurred and, in response steering the wheel to avoid collision, the server may plan a more moderate adjustment to the model or a specific trajectory associated with the road segment based on the cause of deviation. As another example, when the cause of deviation is a pedestrian crossing the road, the server may determine that there is no need to change the trajectory in the future.

As another example, the environmental image may include a lane marking indicating that vehicle 1205 is driving slightly outside of a lane, perhaps under the control of a human driver. Processor 1715 may detect the lane marking from the captured images and may modify the actual trajectory of vehicle 1205 to account for the departure from the lane. For example, a translation may be applied to the reconstructed trajectory so that it falls within the center of an observed lane.

Figure 20:
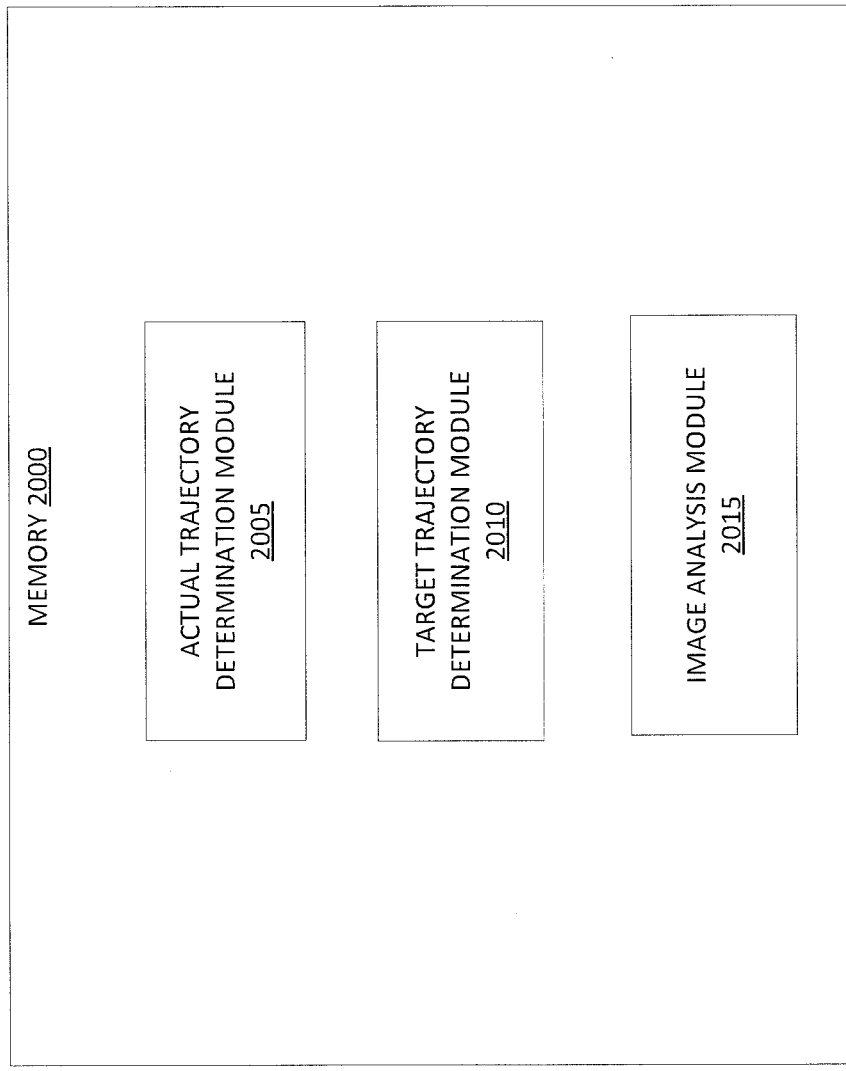
FIG. 20 shows an example diagram of a memory consistent with the disclosed embodiments.

FIG. 20 shows an example memory 2000. Memory 2000 may include various modules, which when executed by a processor, may cause the processor to perform the disclosed methods. For example, memory 2000 may include an actual trajectory determination module 2005. Actual trajectory determination module 2005, when executed by a processor (e.g., processor 1715 or other processors), may cause the processor to determine an actual trajectory of a vehicle based on data output or received from one or more sensors included in the vehicle. For example, the processor may reconstruct the actual trajectory based on signals received from one or more of accelerometer 1725, camera 122, and/or speed sensor 1720. In some embodiments, the processor may determine the actual trajectory based on the outputs received from the sensors indicative of a motion of the vehicle.

Memory 2000 may also include a target trajectory determination module 2010. Target trajectory determination module 2010, when executed by the processor, may cause the processor to determine a target trajectory based on the actual trajectory. For example, based on data received from the sensor, the processor may determine that one or more modifications need to be made to the actual trajectory. The modified actual trajectory may be used as the target trajectory for transmitting to a server (e.g., server 1230). The target trajectory may represent a better trajectory than the actual trajectory for other autonomous vehicles to follow when the other autonomous vehicles travel on the same road segment at a later time. In some embodiments, the processor may determine a target trajectory that includes the actual trajectory and one or more modifications based on information associated with navigational constraints.

Memory 2000 may also include an image analysis module 2015. Image analysis module, when executed by the processor, may cause the processor to analyze one or more images captured by a camera (e.g., camera 122) using various image analysis algorithms. For example, the processor may analyze an image of the environment to identify a landmark, at least one navigational constraint, or to calculate a distance from the vehicle to the landmark, etc.

Figure 21:
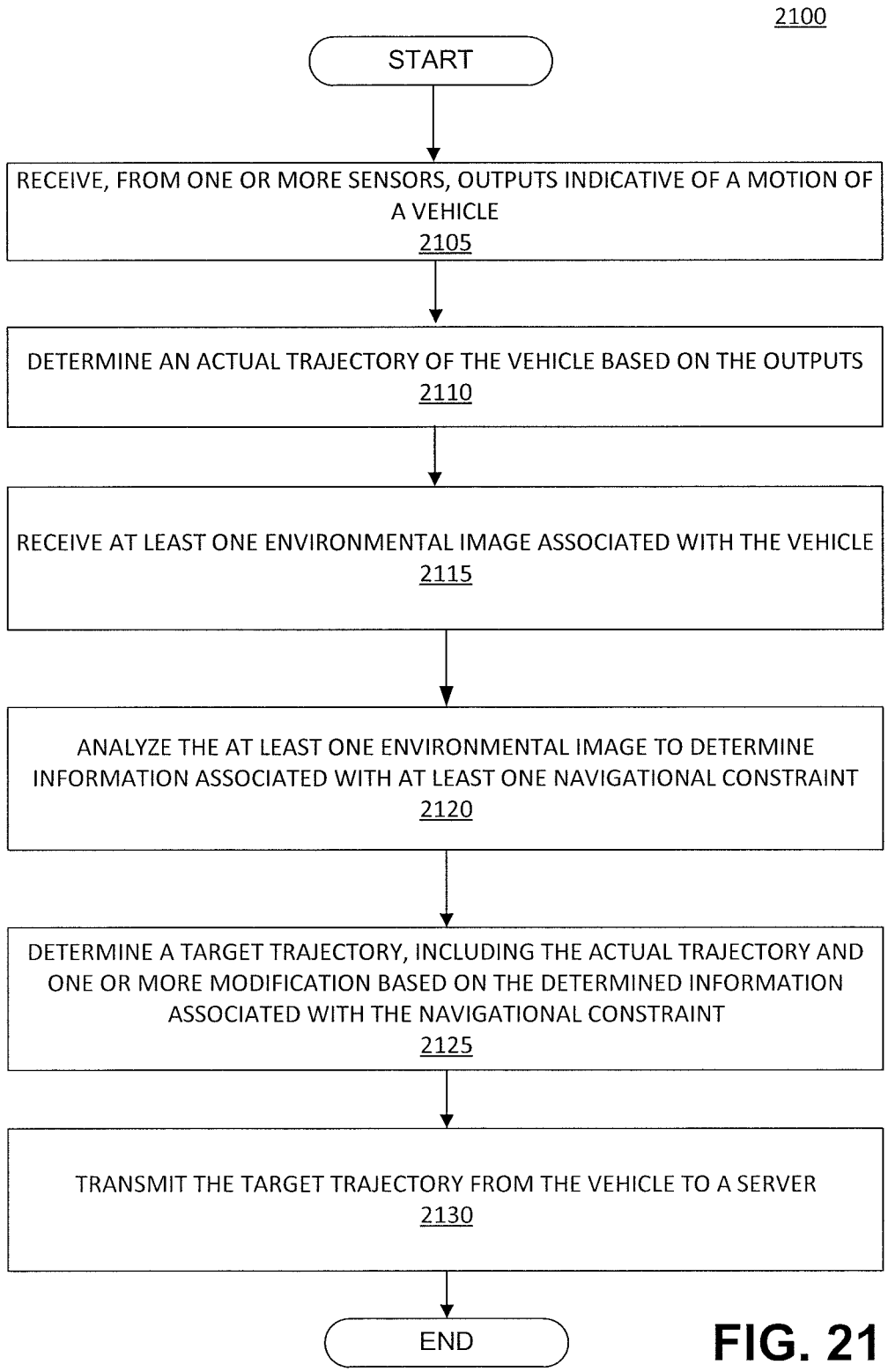
FIG. 21 is a flowchart illustrating an example process for uploading a recommended trajectory to a server consistent with the disclosed embodiments.

FIG. 21 is a flowchart illustrating an example process for uploading recommended trajectory to a server. Process 2100 may be performed by a processor included in a navigation system of a vehicle, such as processor 1715 included in navigation system 1700 of autonomous vehicle 1205. Process 2100 may include receiving, from one or more sensors, outputs indicative of a motion of a vehicle (step 2105). For example, processor 1715 may receive outputs from inertial sensors, such as accelerometer 1725 indicating the three dimensional translation and/or three dimensional rotational motions of vehicle 1205. Process 2100 may include determining an actual trajectory of the vehicle based on the outputs from the one or more sensors (step 2110). For example, processor 1715 may analyze images from camera 122, speed from speed sensor 1720, position information from GPS unit 1710, motion data from accelerometer 1725, to determine an actual trajectory. Process 2100 may include receiving, from the camera, at least one environmental image associated with the vehicle (step 2115). For example, processor 1715 may receive at least one environmental image associated with vehicle 1205 from camera 122. Camera 122 may be a front-facing camera, which may capture an image of an environment in front of vehicle 1205. Process 2100 may include analyzing the at least one environmental image to determine information associated with at least one navigation constraint (step 2120). For example, processor 1715 may analyze the environmental images from camera 122 to detect at least one of a barrier, an object, a lane marking, a sign, or another vehicle in the images. Process 2100 may also include determining a target trajectory, including the actual trajectory and one or more modifications to the actual trajectory based on the determined information associated with the navigational constraint (step 2125). For example, based on at least one of the barrier, object, lane marking, sign, or another vehicle detected from the environmental images, processor 1715 may modify the actual trajectory, e.g., to include a lane or a road other than the lane or road vehicle 1205 is travelling in. The modified actual trajectory may be used as the target trajectory. The target trajectory may reflect a safer or better trajectory than the actual trajectory vehicle 1205 is taking. Process 2100 may further include transmitting the target trajectory to a server (step 2130). For example, processor 1715 may transmit the target trajectory from vehicle 1205 to server 1230. Server 1230 may transmit the target trajectory received from vehicle 1205 to other vehicles (which may be autonomous vehicles or traditional, human-operated vehicles). Other vehicles may change their lanes or paths based on the target trajectory. In some embodiments, process 2100 may include overriding a change in trajectory that is suggested by the server. For example, when the vehicle is approaching a lane split, and the server determines to change the current lane to a lane that has been temporarily closed or marked for other traffic, processor 1715 may override the determination by the server based on the detection (e.g., from images captured by the camera onboard the vehicle) of the temporary closure.

Process 2100 may include other operations or steps. For example, processor 1715 may receive target trajectories from server 1230. The target trajectories may be transmitted to server 1230 from other vehicles travelling ahead of vehicle 1205 on the same road segment 1200. Processor 1715 may update an autonomous vehicle road navigation model provided in navigation system 1700 with the target trajectories received from server 1230, and cause vehicle 1205 to make a navigational maneuver, such as changing a lane.

Landmark Identification

Consistent with disclosed embodiments, the system may identify landmarks for use in an autonomous vehicle road navigation model. This identification may include a determination of a landmark type, physical size, and location of the identified landmark, among other characteristics.

Figure 22:
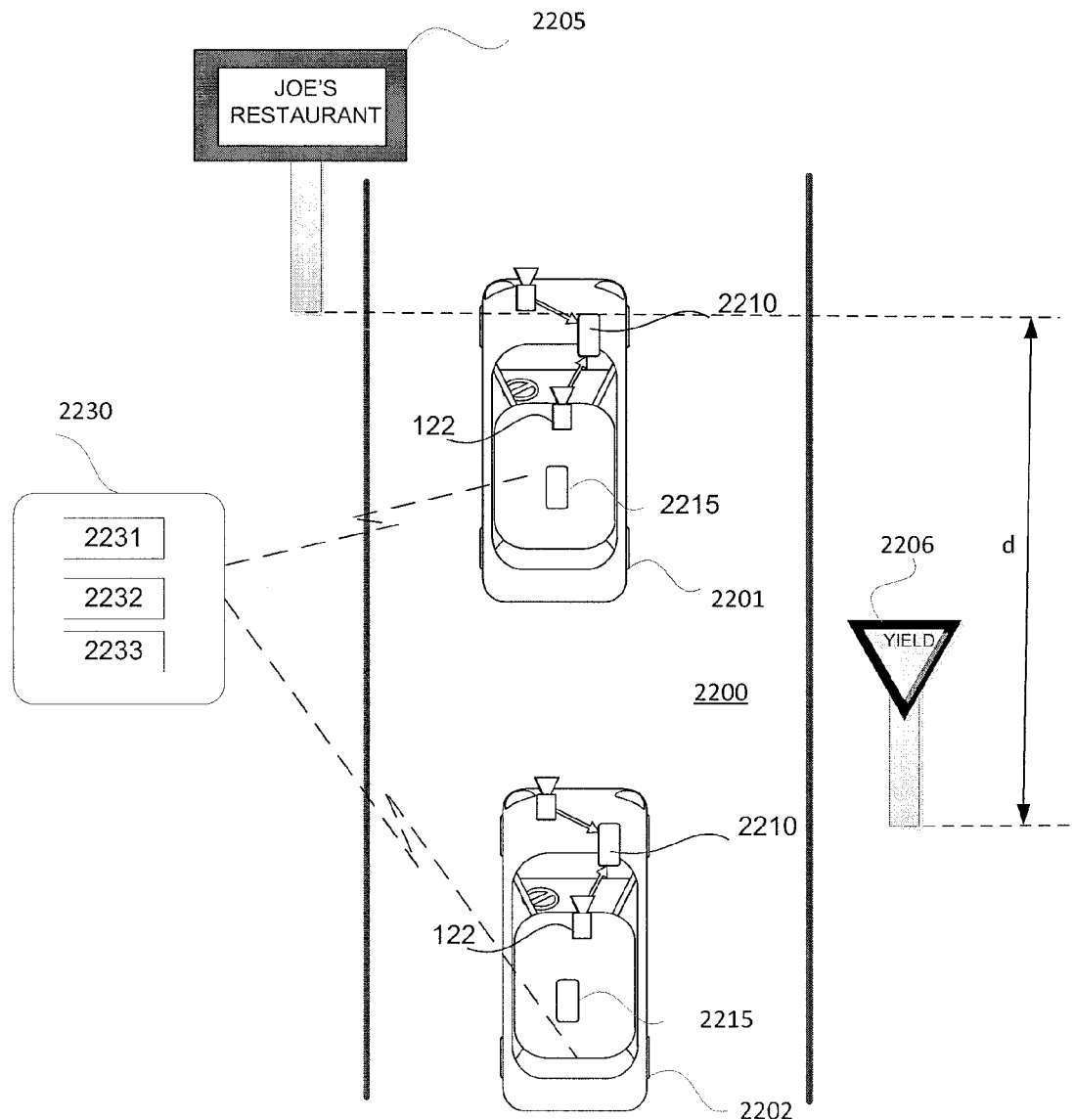
FIG. 22 illustrates an example environment including a system for identifying a landmark for use in autonomous vehicle navigation consistent with the disclosed embodiments.

FIG. 22 illustrates an example environment including a system for identifying a landmark for use in autonomous vehicle navigation. In this example, FIG. 22 shows a road segment 2200. Vehicles 2201 and 2202 may be traveling along road segment 2200. Along the road segment 2200, there may be one or more signs or objects (e.g., 2205 and 2206), which may be identified as landmarks. Landmarks may be stored in an autonomous vehicle road navigation model or a sparse map (e.g., sparse map 800). Actual images of the landmarks need not be saved in the model or sparse map. Rather, as previously discussed, a small amount of data that characterizes the landmark type, location, physical size, and, in certain cases, a condensed image signature may be stored in the model or sparse map, thereby reducing the storage space required for storing the model or sparse map and/or transmitting some or all of the sparse map to autonomous vehicles. In addition, not every landmark appearing along a road segment is stored. The model or sparse map may have sparse recording of recognized landmarks, which may be spaced apart from each other along a road segment by at least 50 meters, 100 meters, 500 meters, 1 kilometer, 2 kilometers, etc. Sparse recording of the landmarks also reduce the storage space required for storing data relating to the landmarks. Landmarks stored in the model and/or sparse map may be used for autonomous vehicle navigation along road segment 2200. For example, recognized landmarks included in sparse data map 800 may be used for locating vehicles 2201 and 2202 (e.g., determining locations of vehicles 2201 and 2202 along a target trajectory stored in the model or sparse map).

Vehicles 2201 and 2202 may be autonomous vehicles, and may be similar to vehicles disclosed in other embodiments. For example, vehicles 2201 and 2202 may include components and devices included in vehicle 200, such as at least one image capture device (e.g., image capture device or camera 122). Vehicles 2201 and 2202 may each include at least one processor 2210, which may be similar to processor 180, 190, or processing unit 110. Each of vehicles 2201 and 2202 may include a communication unit 2215, which may communicate with a server 2230 via one or more networks (e.g., over a cellular network and/or the Internet, etc.).

Server 2230 may include both hardware components (e.g., circuits, switches, network cards) and software components (e.g., communication protocols, computer-readable instructions or codes). For example, server 2230 may include a communication unit 2231 configured to communicate with communication units 2215 of vehicles 2201 and 2202. Server 2230 may include at least one processor 2232 configured to process data, such as the autonomous vehicle road navigation model, the sparse map (e.g., sparse map 800), and/or navigation information received from vehicles 2201 and 2202. The navigation information may include any information received from vehicles 2201 and 2202, such as images of landmarks, landmark identifiers, Global Positioning System signals, ego motion data, speed, acceleration, road geometry (e.g., road profile, lane structure, elevation of road segment 2200), etc. Server 2230 may include a storage device 2233, which may be a hard drive, a compact disc, a memory, or other non-transitory computer readable media.

Vehicles 2201 and 2202 may capture at least one image, via camera 122, of an environment of vehicles as the vehicles travel along road segment 2200. The image of the environment may include an image of signs or landmarks 2205 and 2206. In some embodiments, at least one identifier associated with landmarks 2205 and 2206 may be determined by vehicles 2201 and 2202, and the identifier may be transmitted to server 2230 from the vehicles. In some embodiments, at least one identifier associated with landmarks 2205 and 2206 may be determined by server 2230 based on images of the landmarks 2205 and 2206 captured by cameras 122 and transmitted to server 2230.

For example, camera 122 installed on a host vehicle (e.g., vehicle 2201 hosting camera 122) may acquire at least one image representative of an environment of vehicle 2201 (e.g., in front of vehicle 2201). Processor 2215 included in vehicle 2201 may analyze the at least one image to identify a landmark (e.g., landmark 2206) in the environment of the host vehicle. Processor 2215 may also analyze the at least one image to determine the at least one identifier associated with the landmark.

In some embodiments, processor 2215 may then transmit the at least one identifier to server 2230. Server 2230 (e.g., through processor 2232 and communication unit 2231) may receive the at least one identifier associated with the landmark. Processor 2232 may associate the landmark with the corresponding road segment 2200. Processor 2232 may update the autonomous vehicle road navigation model relative to the corresponding road segment 2200 to include the at least one identifier associated with the landmark. Processor 2232 may distribute the updated autonomous vehicle road navigation model to a plurality of autonomous vehicles, such as vehicles 2201 and 2202, and other vehicles that travel along road segment 2200 at later times.

The at least one identifier associated with the landmark (e.g., landmark 2205 or 2206) may include a position of the landmark. The position may be determined based on the signals provided by various sensors or devices installed on vehicles 2201 and 2202 (e.g., GPS signals, vehicle motion signals). The identifier may include a shape of the landmark. For example, the identifier may include data indicating a rectangular shape of landmark 2205 or a triangular shape of landmark 2206. The identifier may include a size of the landmark. For example, the identifier may include data indicating a width and/or height of the rectangular sign 2205 and/or the triangular sign 2206. The identifier may include a distance of the landmark relative to another landmark. For example, the identifier associated with landmark 2206 may include a distance d from landmark 2206 to landmark 2205. The distance d is shown as a distance between landmarks 2205 and 2206 along road segment 2200. Other distances may also be used, such as the direct distance between landmarks 2205 and 2206 crossing the road segment 2200. In some embodiments, the distance may refer to a distance from the recognized landmark (e.g., 2206) to a previously recognized landmark (e.g., a landmark that is recognized at least 50 meters, 100 meters, 500 meters, 1 kilometer, 2 kilometers away back along road segment 2200).

In some embodiments, the identifier may be determined based on the landmark being identified as one of a plurality of landmark types. In other words, the identifier may be the type of the landmark. The landmark types include a traffic sign (e.g., a speed limit sign), a post (e.g., a lamppost), a directional indicator (e.g., a high way exit sign with an arrow indicating a direction), a business sign (e.g., a rectangular sign such as sign 2205), a reflector (e.g., a reflective mirror at a curve for safety purposes), a distance marker, etc. Each type may be associated with a unique tag (e.g., a numerical value, a text value, etc.), which requires little data storage (e.g., 4 bytes, 8 bytes, etc.). When a landmark is recognized as a specific, stored type, the tag corresponding to the type of the landmark may be stored, along with other features of the landmark (e.g., size, shape, location, etc.).

Landmarks may be classified into two categories: landmarks that are directly relevant to driving, and landmarks that are not directly relevant to driving. Landmarks directly relevant to driving may include traffic signs, arrows on the road, lane markings, traffic lights, stop lines, etc. These landmarks may include a standard form. Landmarks directly relevant to driving may be readily recognizable by the autonomous vehicle as a certain type. Thus, a tag corresponding to the type of landmarks may be stored with small data storage space (e.g., 1 byte, 2 bytes, 4 bytes, 8 bytes, etc.). For example, a tag having a numerical value of "55" may be associated with a stop sign, "100" associated with a speed limit, "108" associated with a traffic light, etc.

Landmarks not directly relevant to driving may include, for example, lampposts, directional signs, businesses signs or billboards (e.g., for advertisements). These landmarks may not have a standard form. Landmarks that are not directly relevant to driving, such as billboards for advertisement and lamppost, may not be readily recognizable by the autonomous vehicle. Signs like billboards may be referred to as general signs. General signs may be identified using a condensed signature representation (or a condensed signature). For example, the identifier associated with a general sign landmark may include the condensed signature representation derived from an image of the landmark. The general sign landmark may be stored using data representing the condensed signature, rather than an actual image of the landmark. The condensed signature may require small data storage space. In some embodiments, the condensed signature may be represented by one or more integer numbers, which may require only a few bytes of data storage. The condensed signature representation may include unique features, patterns, or characteristics extracted or derived from an image of the landmarks. The condensed signature representation of landmarks may indicate an appearance of the landmarks.

The identifier of the landmarks may be stored within the autonomous vehicle road navigation model or sparse map 800, which may be used for providing navigation guidance to autonomous vehicles. For example, when another vehicle later travels along road segment 2200 a previously determined position for the recognized landmark may be used in a determination of the location of that vehicle relative to a target trajectory for a road segment.

Figure 23:
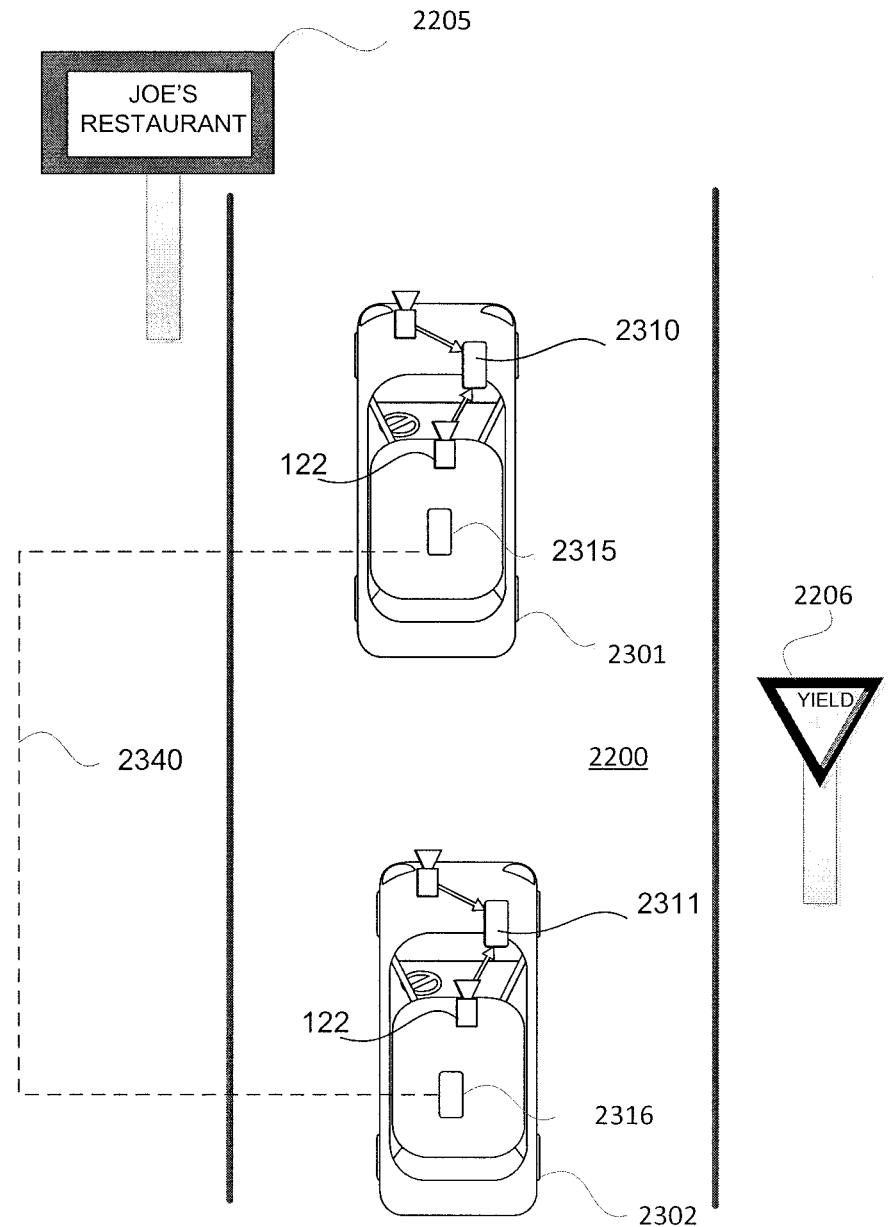
FIG. 23 illustrates an example environment including a system for identifying a landmark for use in autonomous vehicle navigation consistent with the disclosed embodiments.

FIG. 23 illustrates an example environment including a system for identifying a landmark for use in autonomous vehicle navigation. Vehicles 2301 and 2302 (which may be autonomous vehicles) may travel on road segment 2200. Vehicles 2301 and 2302 may be similar to other vehicles (e.g., vehicles 200, 2201, and 2202) disclosed in other embodiments. Vehicle 2301 may include a camera 122, a processor 2310, and a communication unit 2315. Vehicle 2302 may include a camera 122, a processor 2311, and a communication unit 2315. In this embodiment, one of the vehicles 2301 and 2302 may function as a hub vehicle (e.g., vehicle 2301), which may perform functions performed by server 2230 in the embodiments shown in FIG. 22. For example, a server similar to server 2230 may be installed on hub vehicle 2301 to perform functions similar to those performed by server 2230. As another example, the processor 2310 provided on vehicle 2301 may perform some or all of the functions of server 2230.

As shown in FIG. 23, vehicles 2301 and 2302 may communicate with each other through communication units 2315, 2316, and a communication path 2340. Other autonomous vehicles on road segment 2200, although not shown in FIG. 23, may also communicate with hub vehicle 2301. Vehicle 2302 (and other vehicles) may transmit landmark data (e.g., images of a landmark 2206) captured or processed by processor 2311 on vehicle 2302 to processor 2310 on hub vehicle 2301. Vehicle 2302 may also transmit other navigation information (e.g., road geometry) to hub vehicle 2301. In some embodiments, processor 2310 on hub vehicle 2301 may process the landmark data received from vehicle 2302 to determine an identifier associated with a landmark detected by vehicle 2302. In some embodiments, processor 2311 on vehicle 2302 may process images to determine an identifier associated with a landmark, and transmit the identifier to vehicle 2301. Processor 2310 on hub vehicle 2301 may associate the landmark with road segment 2200, and update an autonomous vehicle road navigation model and/or sparse map 800 to include the identifier associated with the landmark 2206. Processor 2310 on hub vehicle 2301 may distribute the updated autonomous vehicle road navigation model and/or sparse map 800 to a plurality of autonomous vehicles, such as vehicle 2302 and other autonomous vehicles travelling on road segment 2200. It should be understood that any functions referenced or described relative to the hub vehicle may be performed by one or more servers located remotely with respect to the vehicles traveling on a system of roads. For example, such servers may be located in one or more central facilities and may be in communication with deployed vehicles via wireless communication interfaces.

Figure 24:
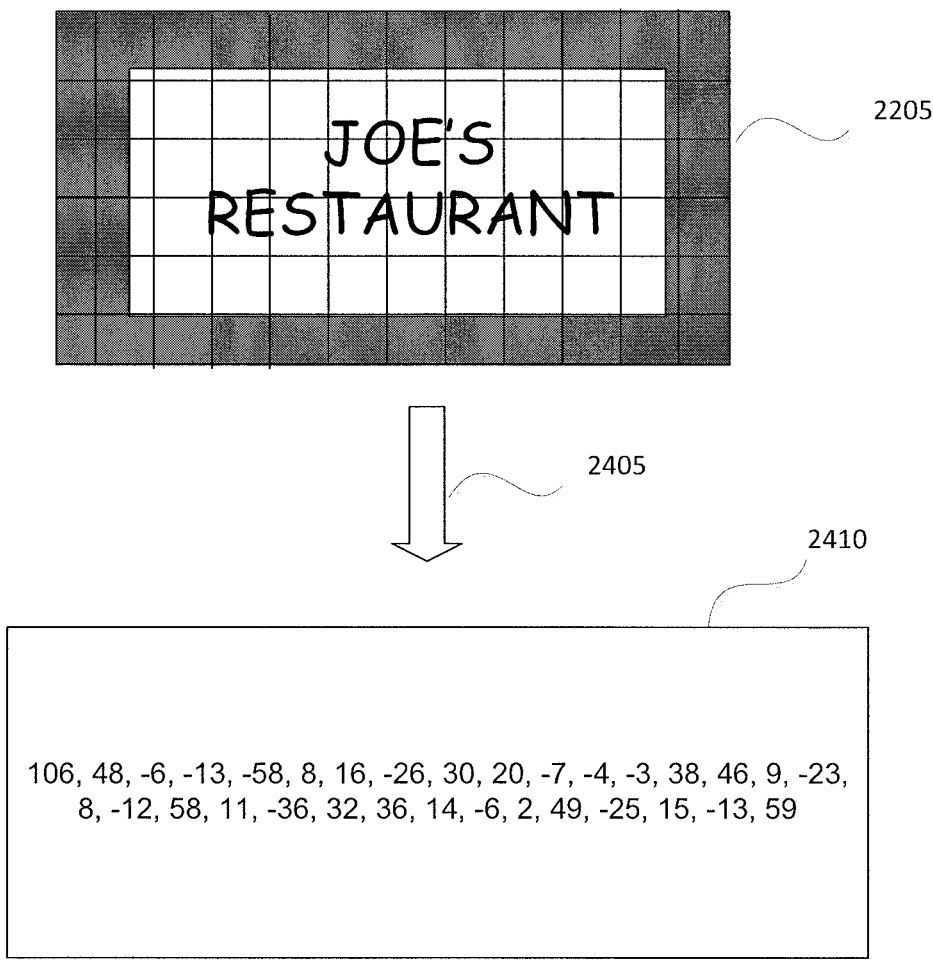
FIG. 24 illustrates a method of determining a condensed signature representation of a landmark consistent with the disclosed embodiments.

FIG. 24 illustrates a method of determining a condensed signature representation of a landmark. The condensed signature representation (or condense signature, or signature) may be determined for a landmark that is not directly relevant to driving, such as a general sign. For example, condensed signature representation may be determined for a rectangular business sign (advertisement), such as sign or landmark 2205. The condensed signature, rather than an actual image of the general sign may be stored within the model or sparse map, which may be used for later comparison with a condensed signature derived by other vehicles. In the embodiment shown in FIG. 24, an image of the landmark 2205 may be mapped to a sequence of numbers of a predetermined data size, such as 32 bytes (or any other size, such as 16 bytes, 64 bytes, etc.). The mapping may be performed through a mapping function indicated by arrow 2405. Any suitable mapping function may be used. In some embodiments, a neural network may be used to learn the mapping function based on a plurality of training images. FIG. 24 shows an example array 2410 including 32 numbers within a range of −128 to 127. The array 2410 of numbers may be an example condensed signature representation or identifier of landmark 2205.

Figure 25:
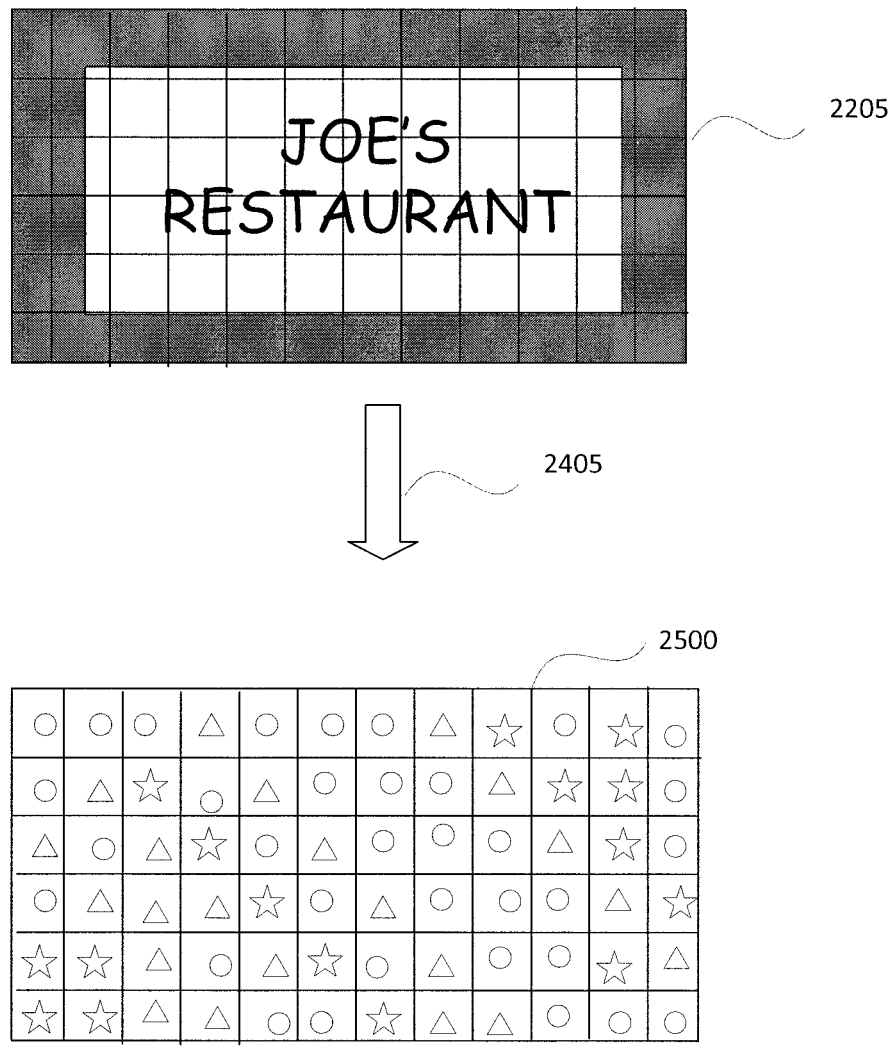
FIG. 25 illustrates another method of determining a condensed signature representation of a landmark consistent with the disclosed embodiments.

FIG. 25 illustrates another method of determining a condensed signature representation of a landmark. For example, a color pattern may be extracted or derived from an image of a general sign, such as rectangular business sign 2205. As another example, a brightness pattern may be extracted or derived from the image of the general sign. The condensed signature representation may include at least one of the color pattern or the brightness pattern. In some embodiments, an image of the landmark 2205 may be divided into a plurality of pixel sections, as shown by the grids in FIG. 25. For each pixel section, a color value or a brightness value may be calculated and associated with the pixel section, as represented by one of the circle, star, or triangle. A pattern 2500 may represent a color pattern (in which case each of the circle, start, and triangle represents a color value), or a brightness pattern (in which case each of the circle, start, and triangle represents a brightness value). Pattern 2500 may be used as the condensed signature representation of landmark 2205.

Figure 26:
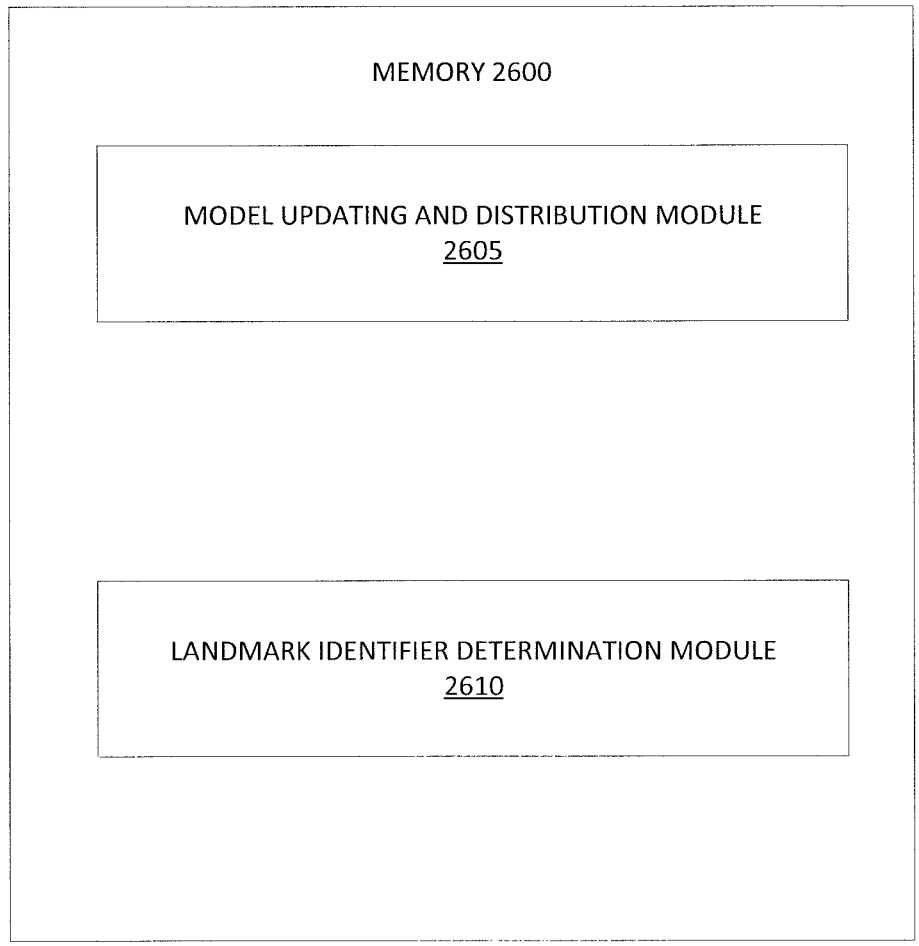
FIG. 26 illustrates an example block diagram of a memory consistent with the disclosed embodiments.

FIG. 26 illustrates an example block diagram of a memory, which may store computer code or instructions for performing one or more operations for identifying a landmark for use in autonomous vehicle navigation. As shown in FIG. 26, memory 2600 may store one or more modules for performing the operations for identifying a landmark for use in autonomous vehicle navigation.

For example, memory 2600 may include a model updating and distribution module 2605 and a landmark identifier determination module 2610. In some embodiments, the model updating and distribution module 2605 and the landmark identifier determination module 2610 may be stored in the same memory 2600, or in different memories. A processor may execute the modules to perform various functions defined by the instructions or codes included within the modules. For example, when executed by a processor, the model updating and distribution module 2605 may cause the processor to update an autonomous vehicle road navigation model relative to a corresponding road segment to include at least one identifier associated with a landmark. The model updating and distribution module 2605 may also cause the processor to distribute the updated autonomous vehicle road navigation model to a plurality of autonomous vehicles for providing autonomous navigation. When executed by a processor, the landmark identifier determination module 2610 may cause the processor to analyze at least one image representative of an environment of a vehicle to identify a landmark in the image. The landmark identifier determination module 2610 may also cause the processor to analyze the image to determine at least one identifier associated with the landmark. The identifier may be used for updating the model in the model updating and distribution module 2605.

In some embodiments, the landmark identifier determination module 2610 may be configured with a certain predefined detection priority. For example, the landmark identifier determination module 2610 may cause the processor to first search for road signs, and if no road sign is found within a certain distance from a previous landmark, then landmark identifier determination module 2610 may use other landmarks.

In addition the landmark identifier determination module 2610 may include a minimum landmark density/frequency and a maximum landmark density/frequency, to limit the landmark frequency (e.g., detected or stored landmarks over a predetermined distance). In some embodiments, these limits may ensure that there are enough landmarks but not too many that are recognized or detected and stored.

In some embodiments, the landmark density/frequency may be associated with a storage size or a bandwidth size. When more road signs are available, more storage space or bandwidth may be used. Alternatively or additionally, different settings may be associated with different types of landmarks. For example, traffic signs may be associated with a higher landmark density/frequency, whereas general signs may be associated with a lower landmark density/frequency, such that within a predetermined distance, more traffic signs may be detected and stored than general signs.

In some embodiments, memory 2600 may be included in server 2230, for example, as part of storage device 2233. Processor 2232 included in server 2230 may execute the model updating and distribution module 2605 to update the autonomous vehicle road navigation model to include at least one identifier associated with a landmark, and distribute the updated model to a plurality of autonomous vehicles. In some embodiments, processor 2232 included in server 2230 may receive data (images of landmarks, navigation information, road information, etc.) from vehicles (e.g., 2201, 2202), and may execute the landmark identifier determination module 2610 to determine an identifier associated with the landmark based on the received data.

In some embodiments, memory 2600 may be a memory provided on a hub autonomous vehicle that performs functions of server 2230. For example, when the hub vehicle is vehicle 2201, processor 2210 may execute the model updating and distribution module 2605 to update the autonomous vehicle road navigation model to include an identifier associated with a landmark. Processor 2210 may also distribute the updated model to a plurality of other autonomous vehicles travelling on road segment 2200. In some embodiments, processor 2210 of hub vehicle 2201 may receive data (e.g., images of landmarks, navigation information, road information, etc.) from other autonomous vehicles (e.g., vehicle 2202). Processor 2210 of hub vehicle 2201 may execute the landmark identifier determination module 2610 to determine an identifier of a landmark based on the data received from other autonomous vehicles. For example, processor 2210 of hub vehicle 2201 may analyze an image of an environment of another vehicle to identify a landmark, and to determine at least one identifier associated with the landmark. The identifier may be used by the model updating and distribution module 2605 in updating the model by hub vehicle 2201.

In some embodiments, the model updating and distribution module 2605 and the landmark identifier determination module 2610 may be stored in separate memories. For example, the model updating and distribution module 2605 may be stored in a memory included in server 2230, and the landmark identifier determination module 2610 may be stored in a memory provided on an autonomous vehicle (e.g., a memory of a navigation system provided on vehicles 2201, 2202, 2301, and 2302). A processor provided in server 2230 (e.g., processor 2232) may execute the model updating and distribution module 2605 to update the model and distribute the updated model to autonomous vehicles. A processor provided in the autonomous vehicles (e.g., processor 2210, 2310, or 2311) may execute the landmark identifier determination module 2610 to determine an identifier associated with a landmark.

Figure 27:
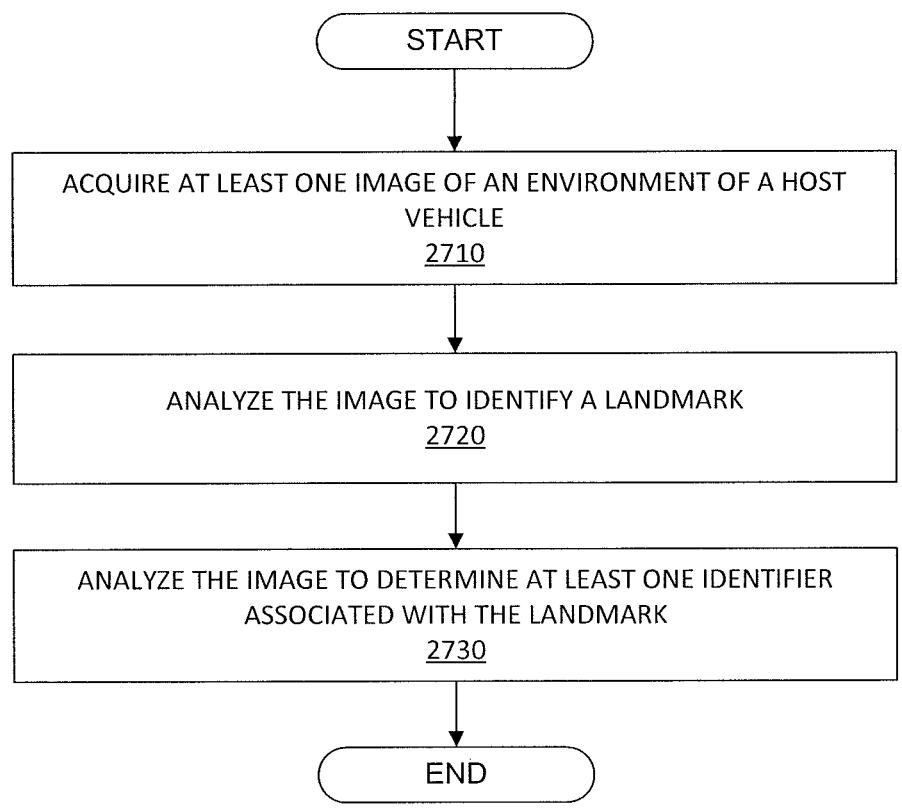
FIG. 27 is a flowchart showing an exemplary process for determining an identifier of a landmark consistent with the disclosed embodiments.

FIG. 27 is a flowchart showing an exemplary process 2700 for determining an identifier of a landmark. Process 2700 may be performed when the landmark identifier determination module 2610 is executed by a processor, e.g., processor 2232 included in server 2230, or processor 2210, 2310, and 2311 provided on autonomous vehicles. Process 2700 may include acquiring at least one image of an environment of a host vehicle (step 2710). For example, camera 122 provided on host vehicle 2202 (on which camera 122 is hosted) may capture at least one image of the environment surrounding vehicle 2202. Processor 2210 provided on vehicle 2202 may receive the image from camera 122. Process 2700 may also include analyzing the image to identify a landmark (step 2720). For example, processor 2210 provided on vehicle 2202 may analyze the image received from camera 122 to identify a landmark in the environment surrounding vehicle 2202. Process 2700 may also include analyzing the image to determine at least one identifier associated with the landmark (step 2730). For example, processor 2210 provided on vehicle 2202 may analyze the image received from camera 122 to determine at least one identifier associated with the landmark. The identifier may include any observable characteristic associated with the candidate landmark, including any of those discussed above, among others. For example, observation of such landmarks may be made through visual recognition based on analysis of captured images and/or may involve sensing by one of more sensors (e.g., a suspension sensor), or any other means of observation.

Process 2700 may include other operations or steps. For example, in identifying a landmark from the image of the environment, processor 2210 may identify the landmark based on a predetermined type. In determining the identifier associated with the landmark, processor 2210 may determine a position of the landmark based on GPS signals received by vehicle 2202, or other sensor signals that may be used to determine the position. Processor 2210 may determine at least one of a shape or size of the landmark from the image. Processor 2210 may also determine a distance of the landmark to another landmark as appearing in the image, or in the real world. Processor 2210 may extract or derive a condensed signature representation as part of the identifier of the landmark. Processor 2210 may determine the condensed signature representation based on mapping the image of the landmark to a sequence of numbers of a predetermined data size (e.g., 32 bytes, 64 byte, etc.). Processor 2210 may determine at least one of a color pattern or a brightness pattern as the condensed signature representation of the landmark.

Figure 28:
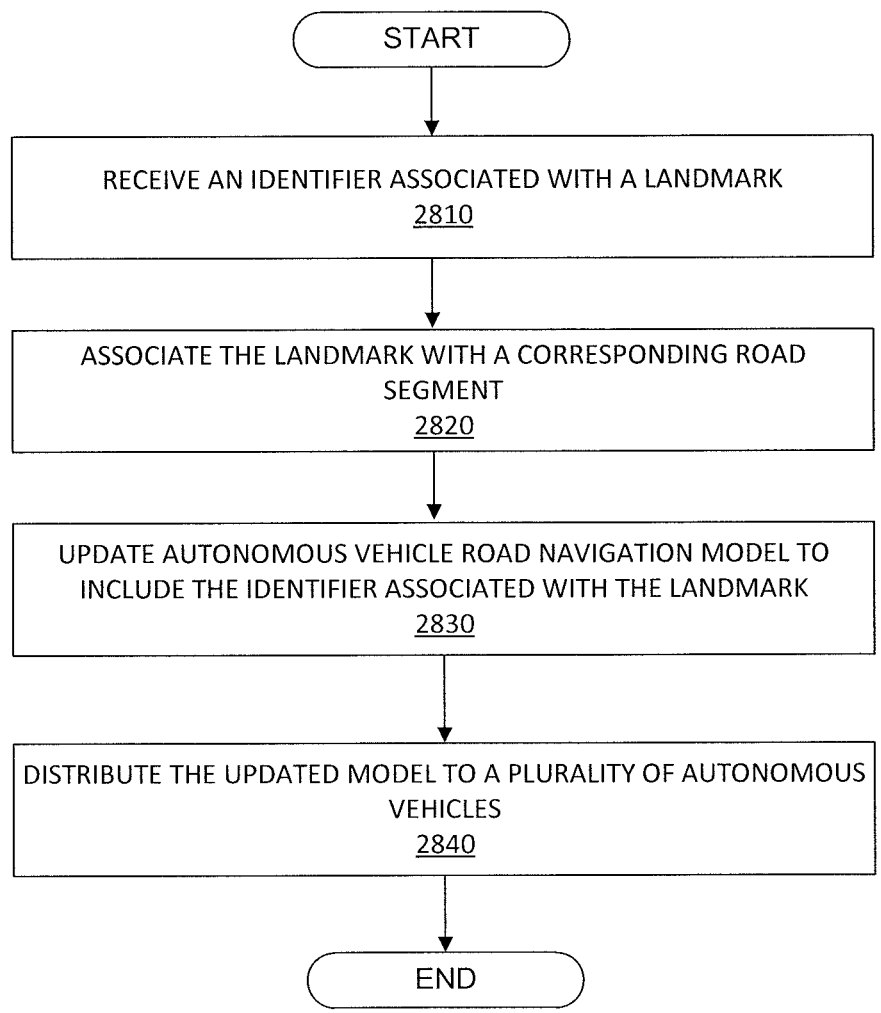
FIG. 28 is a flowchart showing an exemplary process for updating and distributing a vehicle road navigation model based on an identifier consistent with the disclosed embodiments.

FIG. 28 is a flowchart showing an exemplary process for updating and distributing a vehicle road navigation model based on an identifier. Process 2800 may be performed when the model updating and distribution module 2602 is executed by a processor, such as processor 2232 included in server 2230, or processors 2210, 2310, and 2311 included in autonomous vehicles. Process 2800 may include receiving an identifier associated with a landmark (step 2810). For example, processor 2232 may receive at least one identifier associated with a landmark from autonomous vehicle 2201 or 2202. Process 2800 may include associating the landmark with a corresponding road segment (step 2820). For example, processor 2232 may associate landmark 2206 with road segment 2200. Process 2800 may include updating an autonomous vehicle road navigation model to include the identifier associated with the landmark (step 2830). For example, processor 2232 may update the autonomous vehicle road navigation model to include an identifier (including, e.g., position information, size, shape, pattern) associated with landmark 2205 in the model. In some embodiments, processor 2232 may also update sparse map 800 to include the identifier associated with landmark 2205. Process 2800 may include distributing the updated model to a plurality of autonomous vehicles (step 2840). For example, processor 2232 may distribute the updated model to autonomous vehicles 2201, 2202, and other vehicles that travel on road segment 2200 at later times. The update model may provide updated navigation guidance to autonomous vehicles.

Process 2800 may include other operations or steps. For example, processor 2232 included in server 2230 may perform some or all of the process 2700 for determining an identifier associated with a landmark. Processor 2232 may receive data (including an image of the environment) related to landmarks from vehicles 2201 and 2202. Processor 2232 may analyze the data (e.g., the image) to identify a landmark in the image and to determine an identifier associated with the image.

The disclosed systems and methods may include other features. For example, in some embodiments, the vehicle location along a road segment may be determined by a processor on the vehicle or a remote server by integrating the velocity of the vehicle between two landmarks. Thus, the landmarks may serve as one dimensional (1D) localization anchors. In the model, the position of a landmark may be computed based on positions identified by multiple vehicles in multiple drives by, e.g., averaging these positions.

For certain landmarks, such as the general signs, the disclosed systems store an image signature (e.g., a condensed signature) rather than an actual image of the landmarks. Some types of landmarks may be detected with a relatively high precision, and may be readily used for localization (e.g., determining the position of the vehicle). For example, a sign that is directly relevant to traffic, such as a circular speed limit sign with the digits "80" may be readily classified as a certain type and easily detected. On the other hand, a beacon sign (e.g., a rectangular advertisement sign) that invites the driver to a nearby restaurant may be harder to find without any false detections. The reason is that it is difficult to learn a model for a very diverse class of objects (e.g., the advertisement sign may not fall into a known class or type). When other easy-to-detect signs are not available, general signs may also be used as landmarks, although they pose some risk of false detections.

For a landmark that is hard to interpret, the disclosed systems associate an appearance signature (or condensed signature, or signature) with it. The signature may be stored in the model (e.g., the road model or the autonomous vehicle road navigation model), together with the positional information of the landmark. When the vehicle detects such an object and matches it to the stored mode, the disclosed systems may match the signatures of the landmarks. The signature may not encode class information (e.g., class information indicating whether the identified object is a sign), but rather a "same-not-same" information (e.g., information indicating whether the identified object is the same as one that has been before, or one that has been stored in the model.

The systems (e.g., the remove server or the processor provided on the vehicle) may learn the image signatures from prior examples. A pair of images may be tagged the "same" if and only if they belong to the same specific object (a particular landmark at a particular position). In some embodiments, the disclosed systems may learn the signatures using a neural network, such as a Siamese neural network. The signature of the landmark may require small storage space, such as 10 bytes, 20 bytes, 32 bytes, 50 bytes, 100 bytes, etc.

The landmarks may be used for longitudinal localization of a vehicle along a road. Once the relative distances between landmarks (e.g., a first landmark and a second landmark spaced apart from the first landmark by a certain distance along the road) are estimated with a sufficient accuracy, then once when the vehicle passes a landmark, the vehicle may "reset" the identifier position estimation and cancel errors that emerge from integration of ego speed.

The system may use the ego speed from either the wheels sensor (e.g., a speed sensor), or from the Global Navigation Satellite System (GNSS) system. In the first option, the system may learn a calibration factor per vehicle, to cancel inter-vehicles variability.

To localize the position of a camera, the disclosed systems may identify visual landmarks. Any object with prominent features that may be repeatedly identified may serve as a visual landmark. On road scenarios, road side signs and traffic signs in particular, frequently serve as landmarks. Traffic signs usually are associated with a type. Traffic sign of "yield" type, for example, may appear exactly or substantially the same all over a particular country. When the disclosed systems identify a traffic sign with a type, also known as typed-traffic-sign, the systems may look for this type in the map and establish the camera localization when a match is found.

Some traffic signs, however, do not look the same. A common example is the "directional" traffic signs, which tell the driver which lane goes where. Other, more generic, signs may also be used, such as signs of a particular restaurant or advertisements. The standard traffic signs may be detected using traffic sign recognition algorithms designed to recognize tens or a few hundreds of signs. These standard signs may be stored in the map using one identification byte and a few bytes for localization (e.g., position of the signs).

One way to store generic signs is to store the image of the signs in the map database, and look for that image. This solution, however, may require a large memory footprint. Whereas a typed traffic sign may require a single integer (e.g., four bytes), an image patch with an untyped-traffic sign may require 256 bytes or more to store even a low resolution of 32×32 pixel image. The solution provided by the disclosed systems and methods uses a signature function that maps any given image patch showing the sign to a unique sequence of 32 bytes (any other bytes may also be used, e.g., 50 bytes). Conceptually, the output of the function is the signature of the image patch showing the sign. Using this signature function, the systems may transform any sign to a "signature," which may be a sequence of 32 bytes (or 8 integers). Using the signature, the system may then look in the map for the location of a sign with a similar signature or conversely, look in the image for a signature, which according to the map, should be visible in that area of the image.

The signature function may be designed to give similar signatures to similar image patches, and different signatures to different image patches. The systems may use a deep neural network to learn both the signature function and a distance function between two signatures. In the neural network, the actual size of the sign in the image is not known. Rectangles of various sizes that may be candidates for signs are detected in the image. Each rectangle may then be scaled to a uniform size of, for example, 32×32 pixels, although other sizes may also be used. For training the neural network, similar images of the same sign are tagged as the "same," whereas images for different signs captured in the same geographic location are tagged as "different." The image patches were all scaled to a uniform size. The systems may use a Siamese network that receives two image patches of 32×32 pixels each and outputs a binary bit: 0 means image patches are not the same and 1 means image patches are the same. For example, in the example shown in FIG. 24, the signature 2410 of landmark 2205 may be stored in the map. The signature includes a sequence of integer numbers (first sequence), as shown in FIG. 24. When a vehicle passes a sign at the same location as sign 2205, the vehicle may capture an image of the sign, and derive a second sequence of numbers using the mapping function. For example, the second sequence of number may include [44, 4, −2, −34, −58, 5, −17, −106, 26, −23, −8, −4, 7, 57, −16, −9, −11, 1, −26, 34, 18, −21, −19, −52, 17, −6, 4, 33, −6, 9, −7, −6]. The system may compare the second sequence with the first second sequence using the neural network, which may output a score for the comparison. In some embodiments, a negative score may indicate that the two signatures are not the same, and a positive score may indicate that the two signatures are the same. It is noted that the system may not require two signatures to be exactly the same in order for them to be regarded as the same. The neural network may be capable of processing low resolution input images, which leads to a low computational cost while achieving high performance.

After the training is completed, the Siamese network may be separated into two networks: Signature network, which may be the part of the network that receives a single patch, and outputs the "signature" of the landmark image; and the SNS (same-not-same) network, which may be the part that receives the two different signatures and outputs a scalar (e.g., the score).

The signature of a landmark may be attached to its location on the map. When a rectangle candidate for landmark is observed, its signature may be computed using the Signature-network. Then the two signatures, the one from the map and the one from the current landmark are fed into the SNS network. If the output score of the SNS network is negative, it may indicate that the landmark in the captured image is not the same as the one stored in the map. If the output score of the SNS network is positive, it may indicate that the landmark in the captured image is the same as the one stored in the map.

The signatures may require small storage space. For example, the signatures may use 32 bytes (although other size, such as 10 bytes, 20 bytes, 50 bytes, etc., may also be used). Such small-sized signatures may also enable transmission on low bandwidth communication channels.

Signatures may be associated with other sizes. There may be a tradeoff between the length (hence the size) of the signature and the discrimination ability of the algorithm. Smaller size may give a higher error rate, whereas larger signature may give less error. Since the disclosed systems may limit the discrimination requirements to landmark signatures from the same geographic location, the signature size may be more compact.

An example use of landmarks in an autonomous navigation system included in a vehicle is provided below. A camera provided on the vehicle may detect a landmark candidate, e.g., a rectangular sign. A processor (provided on the vehicle or on a remote server) may scale the rectangular sign to a standard size (for example 32×32 pixels). The processor may compute a signature (for example using a system, such as a neural network trained on example data). The processor may compare the computed signature to a signature stored in the map. If signatures match then the processor may obtain the size of the landmark size from the map. The processor may also estimate a distance from the vehicle to the landmark based on the landmark size and/or vehicle motion data (e.g., speed, translation and/or rotation data). The processor may use the distance from the landmark to localize the position of the vehicle along the road or path (e.g., along a target trajectory stored in the map).

The disclosed systems and methods may detect typical street structures such as lampposts. The system may take into account both the local shape of the lamppost and the arrangement of the lamppost in the scene: lampposts are typically at the side of the road (or on the divider), lampposts often appear more than once in a single image and at different sizes, Lampposts on highways may have fixed spacing based on country standards (e.g., around 25 m to 50 m spacing). The disclosed systems may use a convolutional neural network algorithm to classify a constant strip from the image (e.g., 136×72 pixels) that may be sufficient to catch almost all the street poles. The network may not contain any affine layers, and may only be composed of convolution layers, Max Pooling vertical layers and ReLu layers. The network's output dimension may be 3 times of the strip width, these three channels may have 3 degrees of freedom for each column in the strip. The first degree of freedom may indicate whether there is a street pole in this column, the second degree of freedom may indicate this pole's top, and the third degree of freedom may indicate its bottom. With the network's output results, the system may take all the local maximums that are above a threshold, and built rectangles bounding the poles.

After the system obtains the initial rectangles, the system may use two alignment neural networks and one filter neural network, and algorithms to track these poles including optical flow and Kalman Filter. Poles that were detected multiple times and tracked well were given a higher confidence.

This disclosure introduces an idea related to landmark definition within the context of camera (or vehicle) localization in urban scenarios. Some landmarks such as traffic signs tend to be quite common and one single landmark of this sort may not be uniquely identified unless the GPS localization is good. However a sequence of common landmarks may be quite unique and may give localization even when GPS signal is poor as in "urban canyons." An urban area with high buildings may cause satellites signal to reflect, hence causing poor GPS signals. On the other hand, an urban area is crowded with landmarks of all kinds and sorts. Hence a camera may be used to self-localize, using visual landmarks. Certain landmarks, however, may be seen repeatedly along the path or trajectory, making it hard to match the landmark to a concrete location on the map. A "yield" sign may be common in urban scenarios. When observing just a "yield" traffic sign, the system may not be able to use it for localization, since there are many "yield" signs in the vicinity of the vehicle, and the system may not be able to know which one of them is the one captured by the camera.

The disclosed systems and methods may use any of the following solutions. In solution one, while virtually all localization algorithms use landmarks, the disclosed system may use the positional arrangement of the landmarks to create a positional-landmark. For example, the positional relation between a plurality of landmarks appearing in the same image may be measured by a vehicle. The configuration of the landmarks' positional relation may be taken as a positional-landmark. Instead of just noting the landmarks, the system may compute also the distances among the different landmarks appearing in the same image. These set of distances may establish a signature of the landmark positioning with respect to each other. For example, a sequence of landmarks detected by the vehicle may be spaced apart by 11 mm between the first and the second landmarks, 16 mm between the second and third landmarks, and 28 mm between the third and fourth landmarks. In some embodiments, the specific positional arrangement of the currently visible landmarks may be unique in the map, and therefore, may be used as a positional-landmark for localization purposes. Since the positional-landmarks may be unique, it may be easy to associate them with a location on the map.

Solution two uses another way to create a unique landmark based on landmarks is to use the sequence of the landmarks, rather than a single landmark. For example, a sequence of landmarks may include a stop sign, a speed limit sign, and a yield sign. While the yield sign landmark may be abundant, and hence have little localization value, the sequence of several landmarks may be more unique and may lead to unambiguous localization.

In some embodiments, the above solutions may be used together. For example, the route may be tagged with a sequence of landmarks and the distance between them. When the GPS signal is weak, the location and distance between landmarks may be based primarily on odometry (e.g., based on images and/or inertial sensors and speedometer). Multiple vehicles drive along the route and capture landmarks and their positions along the route. The collected information regarding the landmarks may be sent from the vehicles to the server. The server may collate the landmark information into landmarks sequences. Each data collecting vehicles may give slightly different distances. The average distance or a robust statistic such as median may be used. The variance among the distances may also be stored in the map. The sequences of the landmarks may be aligned taking into account possibly missing landmarks in the recordings from some of the vehicles. The number of times a landmark is missing gives an indication as to the landmark visibility. The visibility of the landmark at that position in the sequence may also be stored in the map.

When a client vehicle drives along the route, it may compare the landmarks and distances detected by the client vehicle with the sequences stored in the map (or alternatively received from the server). The vehicle may match landmarks types in both sequences, and may penalize the detected sequence for missing landmarks and for distance errors. Landmarks that have low visibility or that have large distance variances may be penalized less.

The camera for detecting landmarks may be augmented any distance measurement apparatus, such as laser or radar.

It is possible that vehicles traveling along a route may record two different sequences. For example, of 50 vehicles traveling along a route, 20 of them may report a sequence of "star, star, square, circle, star" (where "star," "square," "circle" may each represent a certain type of sign) with consistent distances, whereas the other 30 of them may report: "star, star, square, square, triangle" with consistent distances and where the first three "star, star, square" have consistent distance with the other 20 vehicles. This may indicate that there is some interesting road feature such as an intersection or road split.

Refining Landmark Positions

While the models used for steering in the system need not be globally accurate, consistent with disclosed embodiments, global localization may be useful for navigation systems. For example, global coordinates may be useful as an index to determine which local map may be relevant for navigation along a particular road segment or to differentiate one similar landmark from another (e.g., a speed limit sign located near milepost 45 versus a similar speed limit sign located at milepost 68). Global coordinates may be assigned to landmarks in the model by first determining, based on image analysis, a location of a particular landmark relative to a host vehicle. Adding these relative coordinates to the host vehicle's global position may define the global position of the landmark. This measurement, however, may be no more accurate than the measured position of the host vehicle based on the standard automotive Global Navigation Satellite System (GNSS) receiver. Thus, while such position determination may be sufficient for indexing purposes, the disclosed navigational techniques described in detail in later sections rely upon landmarks to determine a current position of a vehicle relative to a target trajectory for a road segment. Usage of landmarks for this purpose may require more accurate position information for the landmarks than a GPS based measurement can provide. For example, if a GPS measurement is accurate only to +−5 meters, then the position determination relative to a target trajectory could be incorrect by 5 or meters, which may be unsuitable for enabling the vehicle to follow a target trajectory.

One solution would be to survey the landmarks associated with a road segment and define highly accurate positions for those landmarks in global coordinates. Such a method, however, would be prohibitively costly in time and money. As another approach to refining the accuracy of a determined landmark position (to a level sufficient to serve as a global localization reference for the disclosed methods of autonomous vehicle navigation), multiple measurements of the landmark position may be made, and the multiple measurements may be used to refine the determined position of the landmark. The multiple measurements may be obtained by passing vehicles equipped to determine a position of the landmark relative to GPS positions for the vehicles obtained as the vehicles pass by the landmark.

FIGS. 22 and 23 each show an example system for identifying a landmark for use in autonomous vehicle navigation. The systems may also determine a location or position of the landmark. In the embodiment shown in FIG. 22, the system may include server 2230, which may be configured to communicate with a plurality of vehicles (e.g., vehicles 2201 and 2202) travelling on road segment 2200. Along the road segment 2200, there may be one or more landmarks. The landmarks may include at least one of a traffic sign, an arrow, a lane marking, a dashed lane marking, a traffic light, a stop line, a directional sign, a landmark beacon, or a lamppost. For illustration, FIG. 22 shows two landmarks 2205 and 2206. Server 2230 may receive data collected by vehicles 2201 and 2202, including landmarks (e.g., 2205 and 2206) recognized by vehicles 2201 and 2202. Data collected by vehicles 2201 and 2202 regarding landmarks may include position data (e.g., location of the landmarks), physical size of the landmarks, distances between two sequentially recognized landmarks along road segment 2200, the distance from vehicle 2201 or 2202 to a landmark (e.g., 2205 or 2206). Vehicles 2201 and 2202 may both pass landmark 2206, and may measure positions of landmark 2206 and transmit the measured positions to server 2230. Server 2230 may determine a refined position of a landmark based on the measured position data of the landmarks received from vehicles 2201 and 2202. For example, the refined position may be an average of the measured position data received from vehicles 2201 and 2202, which both pass and recognize landmark 2206. The refined position of landmark 2206 may be stored in an autonomous vehicle road navigation model or sparse map 800, along with an identifier (e.g., a type, size, condensed signature) of landmark 2206. The target position of landmark 2206 may be used by other vehicles later traveling along road segment 2200 to determine their location along a target trajectory associated with road segment 2200, which may be stored in the model or sparse map. A refined position of a recognized landmark (e.g., one that has been included in sparse map 800) may be updated or further refined when server 2230 receives new measured position data from other vehicles relative to the recognized landmark.

In the embodiment shown in FIG. 23, the system may utilize one of the autonomous vehicles as a hub vehicle to perform some or all of the functions performed by the remote server 2230 shown in FIG. 22, and therefore, may not include a server. The hub vehicle may communicate with other autonomous vehicles and may receive data from other vehicles. The hub vehicle may perform functions related to generating a road model, an update to the model, a sparse map, an update to the sparse map, a target trajectory, etc. In some embodiments, the hub vehicle may also determine a refined position of a landmark stored in a model or sparse map based on multiple positions measured by multiple vehicles traversing road segment 2200.

For example, in the embodiment shown in FIG. 23, vehicle 2201 may be the hub vehicle, which includes at least one processor (e.g., processor 2310) configured to receive various data, including measured position of landmark 2206, from vehicle 2202. Vehicle 2201 may determine a refined position of landmark 2206 based on the measured position data received from vehicle 2202, and other previously received measured position data from vehicles previously passed and recognized landmark 2206. The refined position of landmark 2206 may be stored within the road model or sparse map 800. The refined position may be updated or refined when vehicle 2201 receives new measured position data from other vehicles regarding the same landmark.

Figure 29:
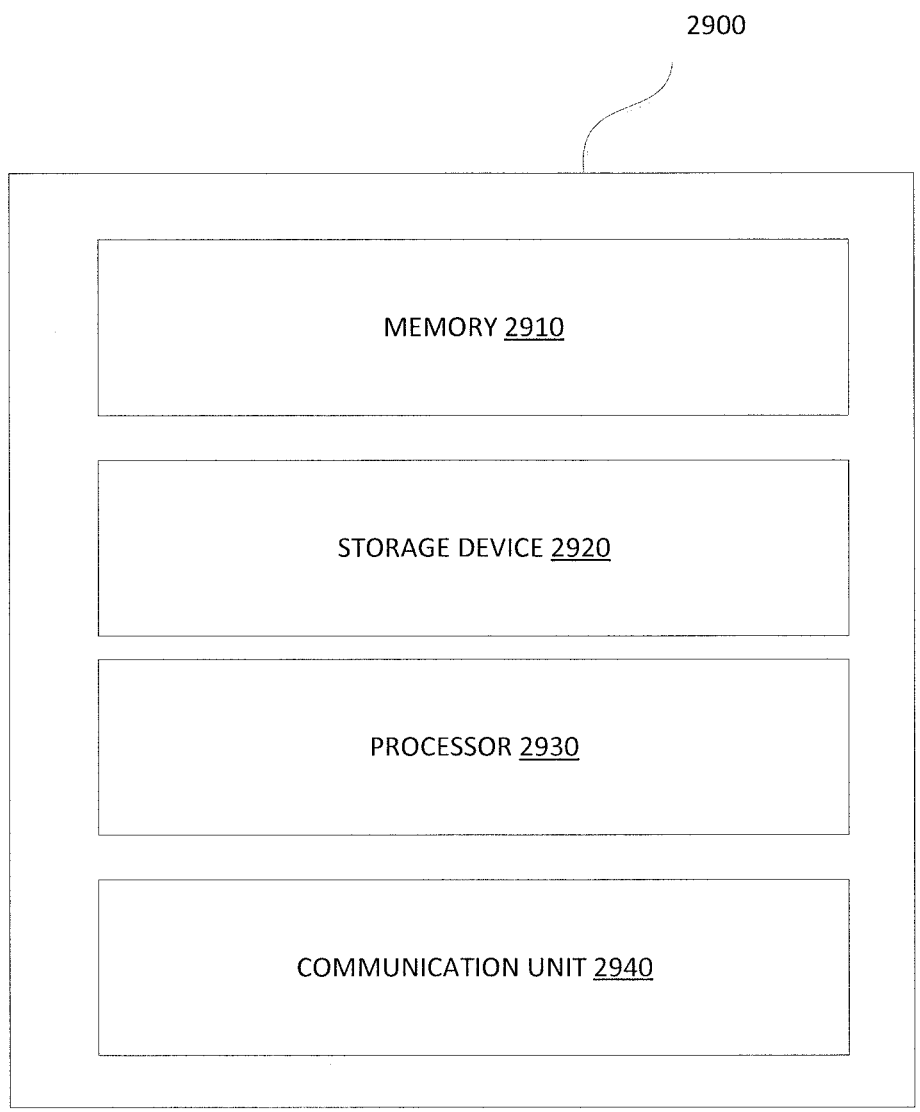
FIG. 29 illustrates an example block diagram of a system for determining a location of a landmark for use in navigation of an autonomous vehicle consistent with the disclosed embodiments.

FIG. 29 shows an example block diagram of a system 2900 for determining/processing/storing a location of a landmark. System 2900 may be implemented in server 2230 or in a hub vehicle (e.g., 2201). System 2900 may include a memory 2910. Memory 2910 may be similar to other memories disclosed in other embodiments. For example, memory 2910 may be a non-transitory flash memory. Memory 2910 may store data such as computer codes or instructions, which may be executed by a processor. System 2900 may include a storage device 2920. Storage device 2920 may include one or more of a hard drive, a compact disc, a magnetic tape, etc. Storage device 2920 may be configured to store data, such as sparse map 800, an autonomous vehicle road navigation model, road profile data, landmarks information, etc. System 2900 may include at least one processor 2930 configured to execute various codes or instructions to perform one or more disclosed methods or processes. Processor 2930 may be similar to any other processors disclosed in other embodiments. Processor 2930 may include both hardware components (e.g., computing circuits) and software components (e.g., software codes). System 2900 may also include a communication unit 2940 configured to communicate with autonomous vehicles via wireless communications, such as wireless internet, cellular communications network, etc.

Figure 30:
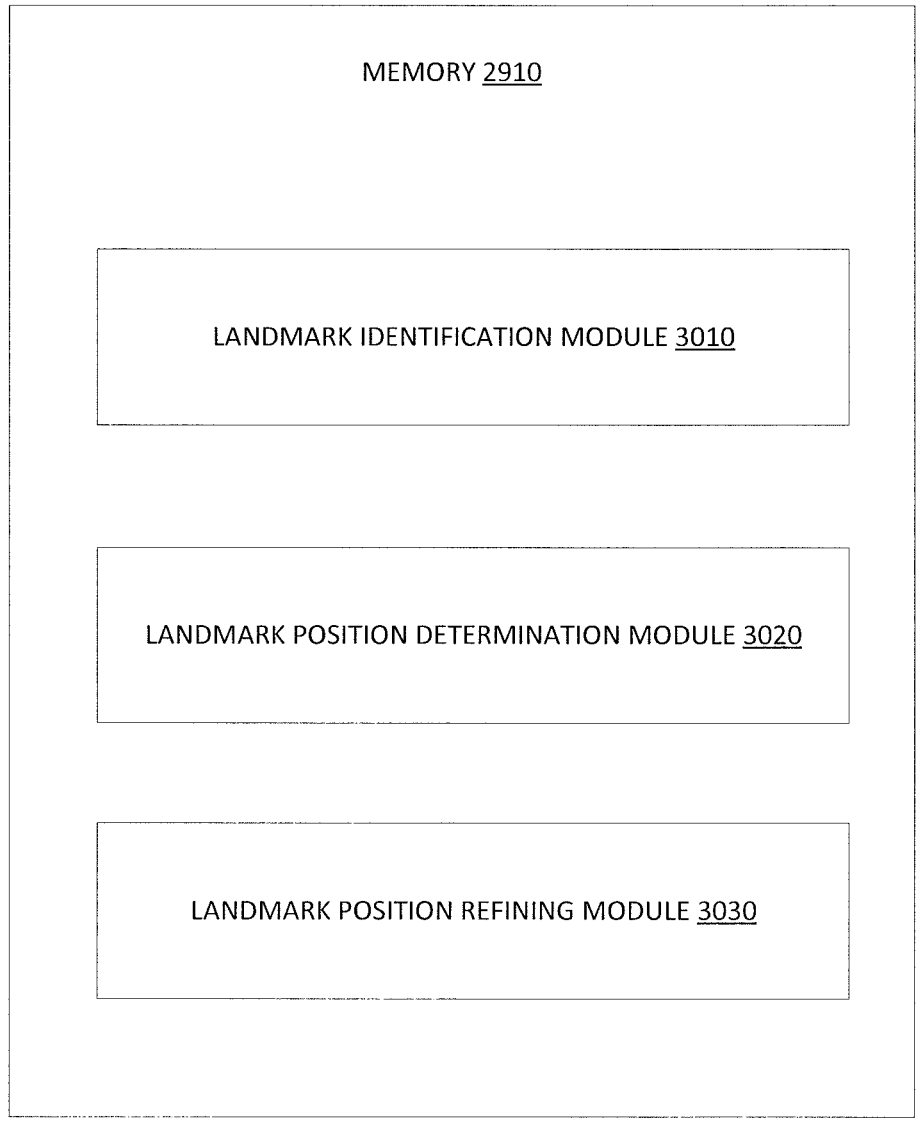
FIG. 30 illustrates an example block diagram of a memory consistent with the disclosed embodiments.

FIG. 30 shows an example block diagram of memory 2910 included in system 2900. Memory 2910 may store computer code or instructions for performing one or more operations for determining a location or position of a landmark for use in autonomous vehicle navigation. As shown in FIG. 30, memory 2910 may store one or more modules for performing the operations for determining the location of a landmark.

For example, memory 2910 may include a landmark identification module 3010 and a landmark position determination module 3020. Memory 2910 may also include a landmark position refining module 3030. A processor (e.g., processor 2930) may execute the modules to perform various functions defined by the instructions or codes included within the modules.

For example, when executed by a processor, the landmark identification module 3010 may cause the processor to identify a landmark from an image captured by a camera provided on a vehicle. In some embodiments, the processor may acquire at least one environmental image associated with a host vehicle from a camera installed on the host vehicle. The processor may analyze the at least one environmental image to identify the landmark in the environment of the host vehicle. The processor may identify a type of the landmark, a physical size of the landmark, and/or a condensed signature of the landmark.

When executed by a processor, the landmark position determination module 3020 may cause the processor to determine a position of a landmark. In some embodiments, the processor may receive global positioning system (GPS) data representing a location of the host vehicle, analyze the environmental image to determine a relative position of the identified landmark with respect to the host vehicle (e.g., a distance from the vehicle to the landmark). The processor may further determine a globally localized position of the landmark based on at least the GPS data and the determined relative position. This globally localized position may be used as the location of the landmark and stored in the model or map.

When executed by a processor, the landmark position refining module 3030 may refine a position determined by module 3020. In some embodiments, the processor may receive multiple positions relating to the same landmark from multiple vehicles in multiple drive, or may measure the positions of the same landmark by the same vehicle in multiple drives. The multiple positions may be used to refine a position of the landmark already stored in the map. For example, the processor may calculate an average of the multiple positions, or a median value of the multiple positions and use that (average or median) to update the position of the landmark stored in the map. As another example, whenever the processor receives a new position measured by a new vehicle identifying the same landmark, the new position may be used to update the position of the landmark already stored in the map.

Figure 31:
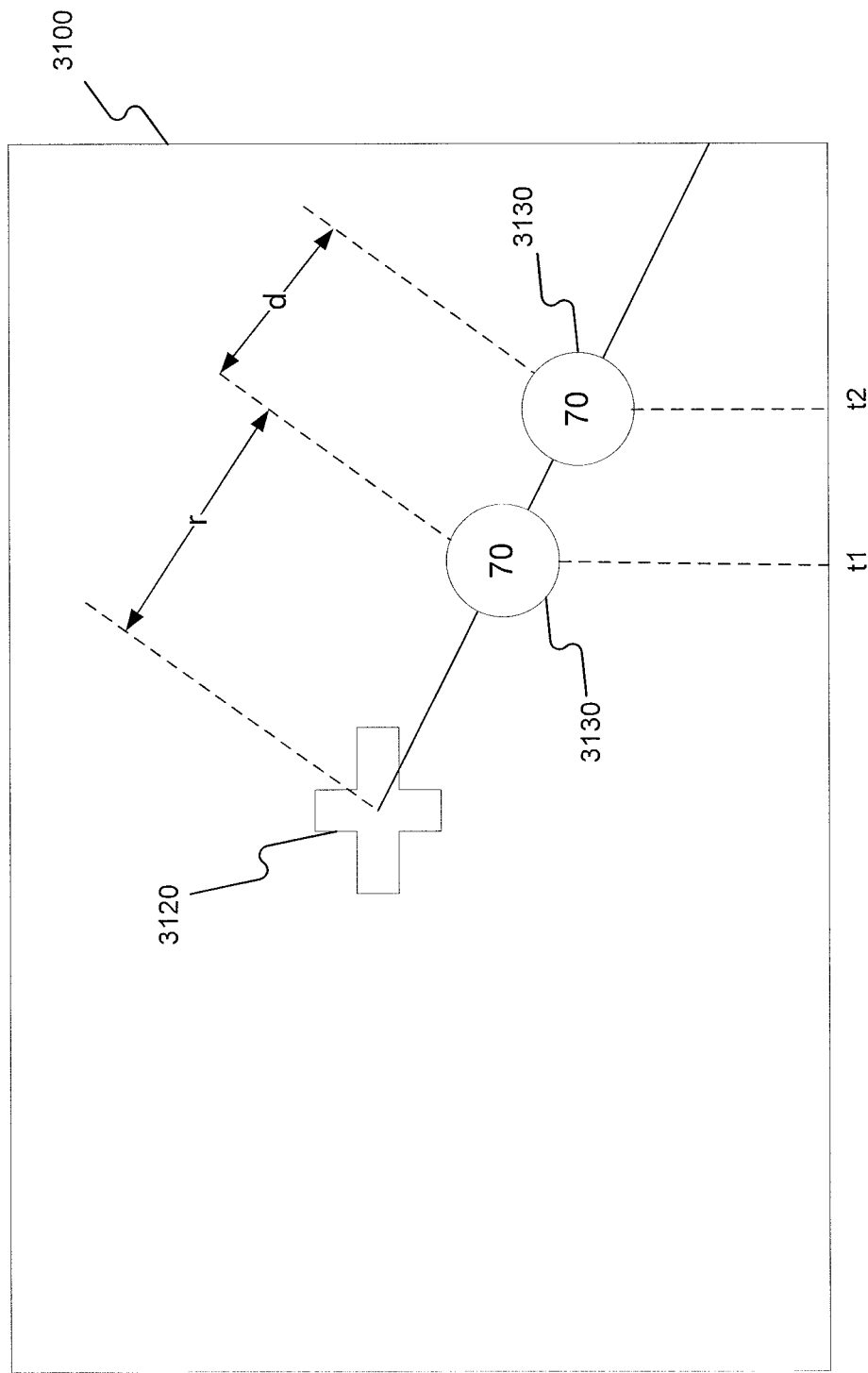
FIG. 31 illustrates an example scaling method for determining a distance from a vehicle to a landmark consistent with the disclosed embodiments.

Various methods may be used to determine the relative position of the identified landmark with respect to the vehicle based on the analysis of one or more images captured by a camera provided on the vehicle. For example, FIG. 31 shows a method for determining a relative position of the landmark to the host vehicle (or a distance from the host vehicle to the landmark) based on a scale associated with one or more images of the landmark. In this example, camera 122 provided on vehicle 2201 may capture an image 3100 of the environment in front of vehicle 2201. The environment may include landmark 3130, which is a speed limit sign, as represented by the circle with number "70." The focus of expansion is indicated by number 3120. Camera 122 may capture a plurality of images of the environment, such as a sequence of images. The speed limit sign 3130 may appear in a first image at the location indicated by time t1. The speed limit sign 3130 may appear in a second image captured after the first image at the location indicated by time t2. The distance between the first location (at time t1) to the focus of expansion 3120 is indicated by r, and the distance between the first and second locations of the speed limit sign 3130 is indicated by d. The distance from vehicle 2201 to landmark 3130 may be calculated by $Z=V*(t2-t1)*r/d$, where V is the speed of vehicle 2201, and Z is the distance from vehicle 2201 to landmark 3130 (or the relative position from the landmark 3130 to vehicle 2201).

FIG. 32 illustrates a method for determining the relative position of the landmark with respect to the host vehicle (or a distance from the vehicle to the landmark) based on an optical flow analysis associated with a plurality of images of the environment within a field of view 3200. For example, camera 122 may capture a plurality of images of the environment in front of vehicle 2201. The environment may include a landmark. A first image of the landmark (represented by the smaller bold rectangle) is referenced as 3210, and a second image of the landmark (represented by the larger bold rectangle) is referenced as 3220. An optical flow analysis may analyze two or more images of the same object, and may derive an optical flow field 3230, as indicated by the field of arrows. The first focus of expansion is referenced by number 3240, and the second focus of expansion is referenced by number 3250. In some embodiments, the optical flow analysis may determine a time to collision (TTC) based on a rate of expansion derived from the optical flow of the images. The distance from the vehicle to the landmark may be estimated based on the time to collision and the speed of the vehicle.

Figure 33A:
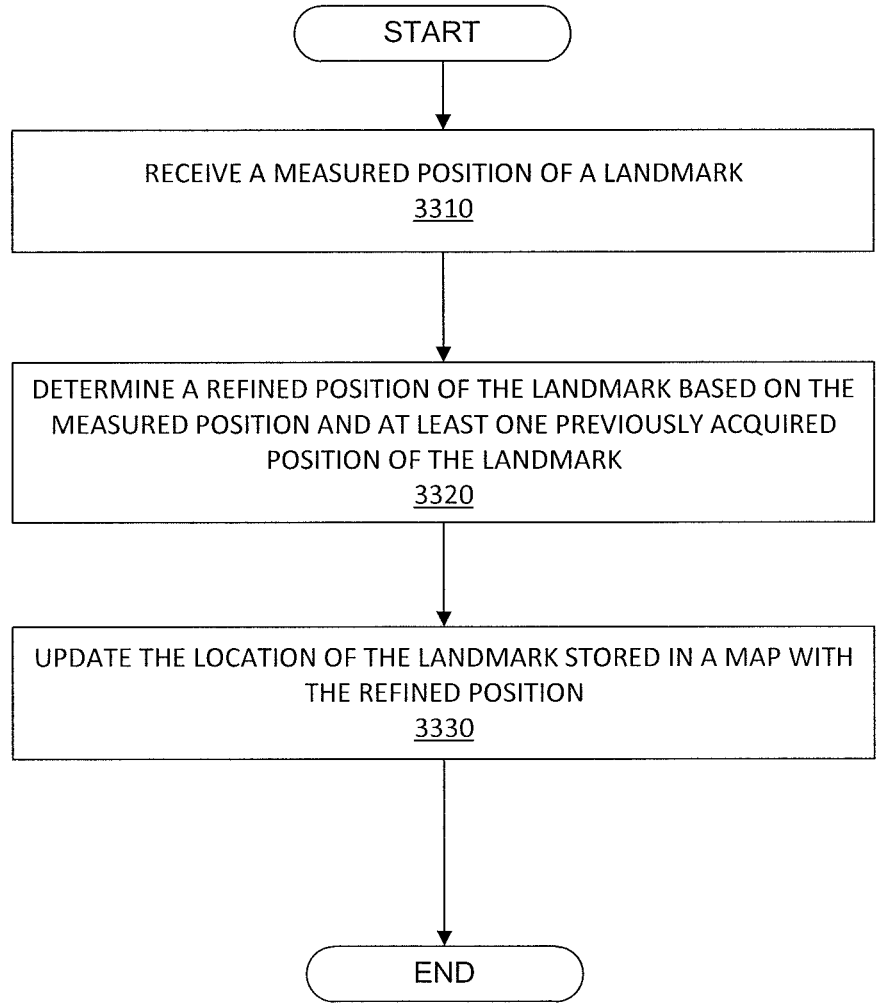
FIG. 33A is a flowchart showing an example process for determining a location of a landmark for use in navigation of an autonomous vehicle consistent with the disclosed embodiments.

FIG. 33A is a flowchart showing an example process 3300 for determining a location of a landmark for use in navigation of an autonomous vehicle. Process 3300 may be performed by processor 2930, which may be included in a remote server (e.g., server 2230), or on an autonomous vehicle (e.g., vehicle 2301). Process 3300 may include receiving a measured position of a landmark (step 3310). For example, processor 2930 may receive a measured position of landmark 2206 from vehicle 2202. Vehicle 2202 may measure the position of the landmark 2206 based on the GPS data indicating the location of the vehicle, a relative position of the landmark with respect to vehicle 2202 determined from analysis of one or more images of an environment of vehicle 2202 including the landmark. Process 3000 may include determining a refined position of the landmark based on the measured position and at least one previously acquired position of the landmark (step 3320). For example, processor 2930 may average the measured position with the at least one previously acquired position of the landmark, such as one or more previously acquired positions received from other vehicles that identified the landmark. In some embodiments, processor 2930 may average the measured position with a position stored in a map (e.g., sparse map 800) that is determined based on at least one previously acquired position of the landmark. Processor 2930 may use the averaged position as the refined position. In some embodiments, processor 2930 may calculate a median value of the measured position and the at least one previously acquired position (e.g., a plurality of previously acquired positions), and use the median value as the refined position. Other statistical parameters that may be obtained from the measured position and the plurality of previously acquired positions may be used as the target position. Process 3000 may update the location of the landmark stored in a map with the refined position (step 3330). For example, processor 2930 may replace the position stored in the map with the refined position. When new position data is received, processor 2930 may repeat steps 3320 and 3330 to refine the position of the landmark stored in the map, thereby increasing the accuracy of the position of the landmark.

Figure 33B:
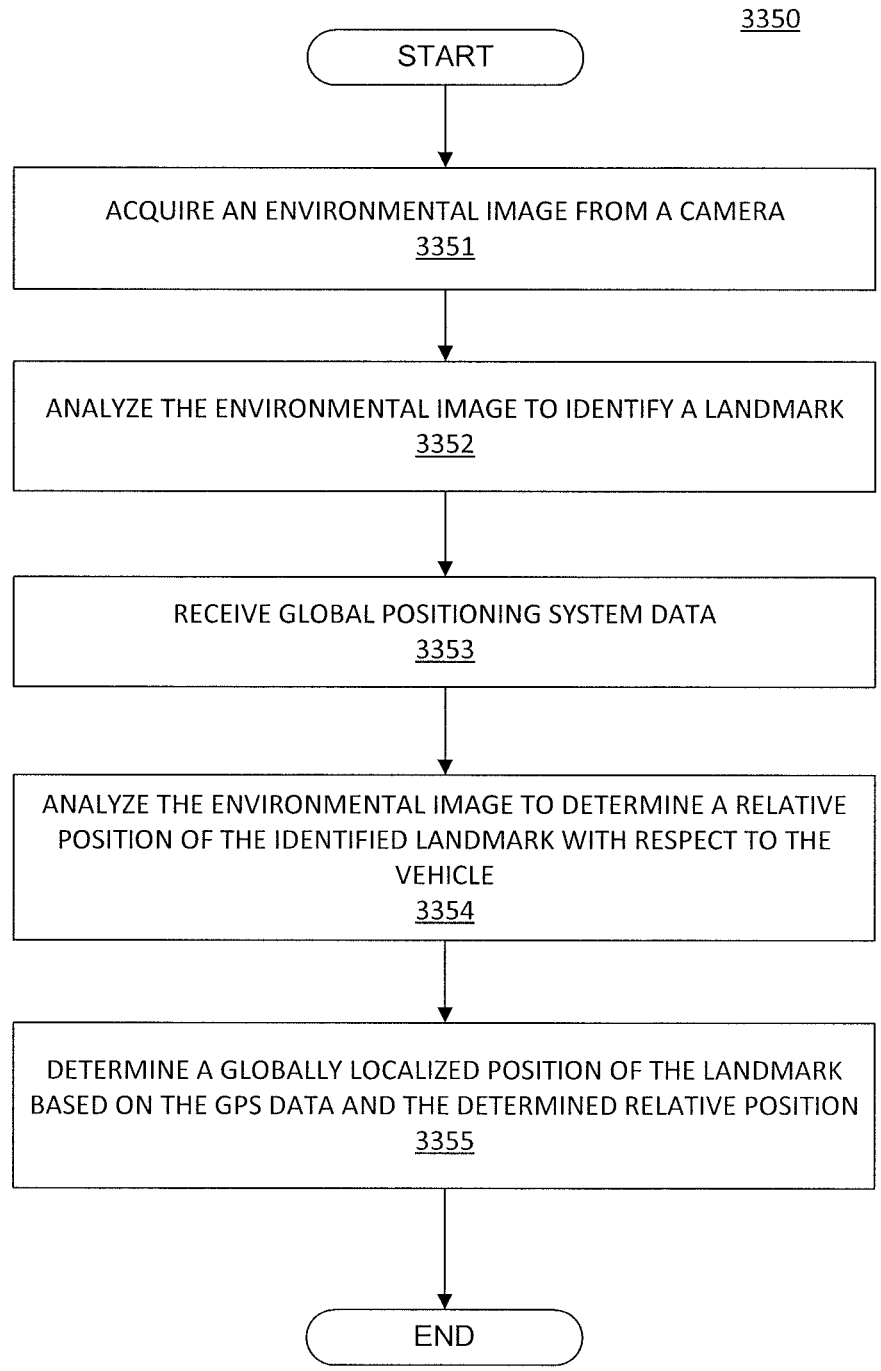
FIG. 33B is a flowchart showing an example process for measuring a position of a landmark for use in navigation of an autonomous vehicle consistent with the disclosed embodiments.

FIG. 33B is a flowchart showing an example process 3350 for measuring the position of a landmark. Process 3350 may be performed by processor 2930, which may be provided in server 2230 or the autonomous vehicles (e.g., vehicles 2201, 2202, 2301, and 2302). A previously acquired position stored in a map may also be obtained using process 3350. Process 3350 may include acquiring an environmental image from a camera (step 3351). For example, camera 122 provided on vehicle 2202 may capture one or more images of the environment of vehicle 2202, which may include landmark 2206. Processor 2930 may acquire images from camera 122. Process 3350 may include analyzing the environmental image to identify a landmark (step 3351). For example, processor 2930 (or processor 2210) provided on vehicle 2202 may analyze the images to identify landmark 2206. Process 3350 may also include receiving GPS data from a GPS unit provided on the vehicle (step 3353). For example, processor 2930 may receive GPS data from the GPS unit provided on vehicle 2202. The GPS data may represent the location of vehicle 2202 (host vehicle). Process 3350 may include analyzing the environmental image to determine a relative position of the identified landmark with respect to the vehicle (step 3354). For example, processor 2930 may analyze the images of the environment to determine a relative position of the identified landmark 2206 with respect to vehicle 2202 using a suitable method. In some embodiments, processor 2930 may analyze the images to determine the relative position based on a scale discussed above in connection with FIG. 31. In some embodiments, processor 2930 may analyze the images to determine the relative position based on an optical flow analysis of the images, as discussed above in connection with FIG. 32. Process 3350 may further include determining a globally localized position of the landmark based on the GPS data and the determined relative position of the landmark with respect to the vehicle (step 3355). For example, processor 2930 may calculate the globally localized position of the landmark by combining the position of vehicle 2202 as indicated by the GPS data and the relative position (or distance from vehicle 2202 to landmark 2206). The globally localized position of the landmark may be used as the measured position of the landmark.

The disclosed systems and methods may include other features discussed below. The disclosed system may be capable of steering an autonomous vehicle along a target trajectory without knowing the precise location of the vehicle relative to a global coordinate frame. The GPS information may have an error of greater than 10 m, so the GPS information is primarily used to index the memory in order to retrieve a landmark candidate or a relevant road tile. The global localization may be determined using the visual ego motion. In order to avoid drifts, the system may estimate the GPS location of the landmarks by combining the GPS position of the host vehicle and the relative position of the landmark to the host vehicle. The global landmark location may be refined (e.g., averaged) with location data obtained from multiple vehicles and multiple drives. The measured position or location of the landmark may behave like a random variable, and hence may be averaged to improve accuracy. The GPS signals are used primarily as a key or index to a database storing the landmarks, and do not have to have high precision for determining the position of the vehicle. Low precision GPS data may be used to determine the location of the vehicle, which is used to determine the position of the landmark. Errors introduced by the low precision GPS data may accumulate. Such errors may be fixed by averaging the position data of the landmark from multiple drives.

In some embodiments, for steering purpose, the GPS coordinates may only be used to index the database. The GPS data may not be taken into account in the computation of the steering angle. The model including the location of the landmarks may be transitioned to a global coordinate system. The transition may include determining the GPS coordinates of landmarks by averaging, concluding the GPS position of the vehicle near (globally localized) landmarks, and extending the global localization away from landmarks, by using the curve geometry, the location along path, the lane assignment and the in-lane position.

Autonomous Navigation Using a Sparse Road Model

In some embodiments, the disclosed systems and methods may use a sparse road model for autonomous vehicle navigation. For example, the disclosed systems and methods may provide navigation based on recognized landmarks, align a vehicle's tail for navigation, allow a vehicle to navigate road junctions, allow a vehicle to navigate using local overlapping maps, allow a vehicle to navigate using a sparse map, navigate a vehicle based on an expected landmark location, autonomously navigate a vehicle based on road signatures, navigate a vehicle forward based on a rearward facing camera, navigate a vehicle based on a free space determination, and navigate a vehicle in snow. Additionally, the disclosed embodiments provide systems and methods for autonomous vehicle speed calibration, determining a lane assignment of a vehicle based on a recognized landmark location, and using super landmarks as navigation aids when navigating a vehicle. These systems and methods are detailed below.

Navigation Based on Recognized Landmarks

Consistent with disclosed embodiments, the system may use landmarks, for example, to determine the position of a host vehicle along a path representative of a target road model trajectory (e.g., by identifying an intersection point of a relative direction vector to the landmark with the target road model trajectory). Once this position is determined, a steering direction can be determined by comparing a heading direction to the target road model trajectory at the determined position. Landmarks may include, for example, any identifiable, fixed object in an environment of at least one road segment or any observable characteristic associated with a particular section of the road segment. In some cases, landmarks may include traffic signs (e.g., speed limit signs, hazard signs, etc.). In other cases, landmarks may include road characteristic profiles associated with a particular section of a road segment. In yet other cases, landmarks may include road profiles as sensed, for example, by a suspension sensor of the vehicle. Further examples of various types of landmarks are discussed in previous sections, and some landmark examples are shown in FIG. 10.

Figure 34:
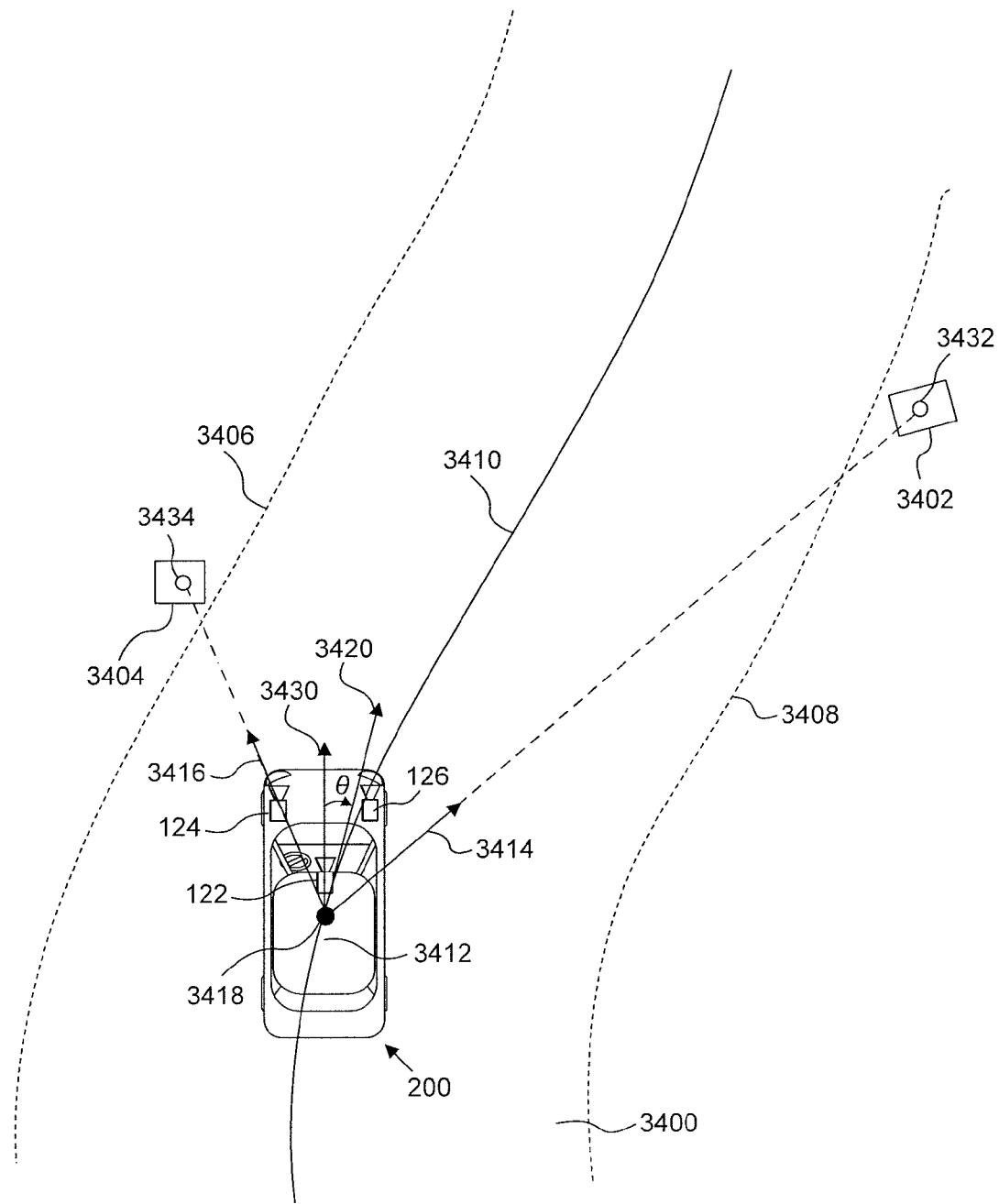
FIG. 34 is a diagrammatic top view representation of an exemplary vehicle including a system consistent with the disclosed embodiments in which the vehicle navigates using a landmark.

FIG. 34 illustrates vehicle 200 (which may be an autonomous vehicle) travelling on road segment 3400 in which the disclosed systems and methods for navigating vehicle 200 using one or more recognized landmarks 3402, 3404 may be used. Although, FIG. 34 depicts vehicle 200 as equipped with image capture devices 122, 124, 126, more or fewer image capture devices may be employed on any particular vehicle 200. As illustrated in FIG. 34, road segment 3400 may be delimited by left side 3406 and right side 3408. A predetermined road model trajectory 3410 may define a preferred path (e.g., a target road model trajectory) within road segment 3400 that vehicle 200 may follow as vehicle 200 travels along road segment 3400. In some exemplary embodiments, predetermined road model trajectory 3410 may be located equidistant from left side 3406 and right side 3408. It is contemplated however that predetermined road model trajectory 3410 may be located nearer to one or the other of left side 3406 and right side 3408 of road segment 3400. Further, although FIG. 34 illustrates one lane in road segment 3400, it is contemplated that road segment 3400 may have any number of lanes. It is also contemplated that vehicle 200 travelling along any lane of road segment 3400 may be navigated using one or more landmarks 3402, 3404 according to the disclosed methods and systems.

Image acquisition unit 120 may be configured to acquire an image representative of an environment of vehicle 200. For example, image acquisition unit 120 may obtain an image showing a view in front of vehicle 200 using one or more of image capture devices 122, 124, 126. Processing unit 110 of vehicle 200 may be configured to detect one or more landmarks 3402, 3404 in the one or more images acquired by image acquisition unit 120. Processing unit 110 may detect the one or more landmarks 3402, 3404 using one or more processes of landmark identification discussed above with reference to FIGS. 22-28. Although FIG. 34 illustrates only two landmarks 3402, 3404, it is contemplated that vehicle 200 may detect fewer than or more than landmarks 3402, 3404 based on the images acquired by image acquisition unit 120.

Processing unit 110 may be configured to determine positions 3432, 3434 of the one or more landmarks 3402, 3404, respectively, relative to a current position 3412 of vehicle 200. Processing unit 110 may also be configured to determine a distance between current position 3412 of vehicle 200 and the one or more landmarks 3402, 3404. Further, processing unit 110 may be configured to determine one or more directional indicators 3414, 3416 of the one or more landmarks 3402, 3404 relative to current position 3412 of vehicle 200. Processing unit 110 may be configured to determine directional indicators 3414, 3416 as vectors originating from current position 3412 of vehicle 200 and extending towards, for example, positions 3432, 3434 of landmarks 3402, 3404, respectively.

Processing unit 110 may also be configured to determine an intersection point 3418 of the one or more directional indicators 3414, 3416 with predetermined road model trajectory 3410. In one exemplary embodiment as illustrated in FIG. 34, intersection point 3418 may coincide with current position 3412 of vehicle 200. This may occur, for example, when vehicle 200 is located on predetermined road model trajectory 3410. Although generally vehicle 200 may be expected to be located on or very near predetermined road model trajectory 3410, it is contemplated that vehicle 200 may not be located on predetermined road model trajectory 3410 as will be discussed below with respect to FIG. 35.

Processing unit 110 may be configured to determine a direction 3420 of predetermined road model trajectory 3410 at intersection point 3418. Processing unit 110 may determine direction 3420 as a direction tangential to predetermined road model trajectory 3410. In one exemplary embodiment, processing unit 110 may be configured to determine direction 3420 based on a gradient or slope of a three-dimensional polynomial representing predetermined road model trajectory 3410.

Processing unit 110 may also be configured to determine heading direction 3430 of vehicle 200. As illustrated in FIG. 34, heading direction 3430 of vehicle 200 may be a direction along which image capture device 122 may be oriented relative to a local coordinate system associated with vehicle 200. Processing unit 110 may be configured to determine whether heading direction 3430 of vehicle 200 is aligned with (i.e., generally parallel to) direction 3420 of predetermined road model trajectory 3410. When heading direction 3430 is not aligned with direction 3420 of predetermined road model trajectory 3410 at intersection point 3418, processing unit 110 may determine an autonomous steering action such that heading direction 3430 of vehicle 200 may be aligned with direction 3420 of predetermined road model trajectory 3410. In one exemplary embodiment, an autonomous steering action may include, for example, a determination of an angle by which the steering wheel or front wheels of vehicle 200 may be turned to help ensure that heading direction 3430 of vehicle 200 may be aligned with direction 3420 of predetermined road model trajectory 3410. In another exemplary embodiment, an autonomous steering action may also include a reduction or acceleration in a current velocity of vehicle 200 to help ensure that heading direction 3430 of vehicle 200 may be aligned with direction 3420 of predetermined road model trajectory 3410 in a predetermined amount of time. Processing unit 110 may be configured to execute instructions stored in navigational response module 408 to trigger a desired navigational response by, for example, turning the steering wheel of vehicle 200 to achieve a rotation of a predetermined angle. Rotation by the predetermined angle may help align heading direction 3430 of vehicle 200 with direction 3420.

Processing unit 110 may include additional considerations when determining the autonomous steering action. For example, in some exemplary embodiments, processing unit 110 may determine the autonomous steering action based on a kinematic and physical model of the vehicle, which may include the effects of a variety of possible autonomous steering actions on the vehicle or on a user of vehicle 200. Processing unit 110 may implement a selection criteria for selecting at least one autonomous steering action from the plurality of autonomous steering actions. In other exemplary embodiments, processing unit 110 may determine an autonomous steering action based on a "look ahead" operation, which may evaluate portions of road segment 3400 located in front of current location 3418 of vehicle 200. Processing unit 110 may determine an effect of one or more autonomous steering actions on the behavior of vehicle 200 or on a user of vehicle 200 at a location in front of current location 3418, which may be caused by the one or more autonomous steering actions. In yet other exemplary embodiments, processing unit 110 may further account for the presence and behavior of one or more other vehicles in the vicinity of vehicle 200 and a possible (estimated) effect of one or more autonomous steering actions on such one or more other vehicles. Processing unit 110 may implement the additional considerations as overrides. Thus, for example, processing unit 110 may initially determine an autonomous steering action that may help ensure that heading direction 3430 of vehicle 200 may be aligned with direction 3420 of predetermined road model trajectory 3410 at current location 3418. When processing unit 110 determines that the determined autonomous steering does not comply with one or more constraints imposed by the additional considerations, processing unit 110 may modify the autonomous steering action to help ensure that all the constraints may be satisfied.

Image acquisition unit 120 may repeatedly acquire an image of the environment in front of vehicle 200, for example, after a predetermined amount of time. Processing unit 110 may also be configured to repeatedly detect the one or more landmarks 3402, 3404 in the image acquired by image acquisition unit 120 and determine the autonomous steering action as discussed above. Thus, image acquisition unit 120 and processing unit 110 may cooperate to navigate vehicle 200 along road segment 3400 using one or more landmarks 3402, 3404.

Figure 35:
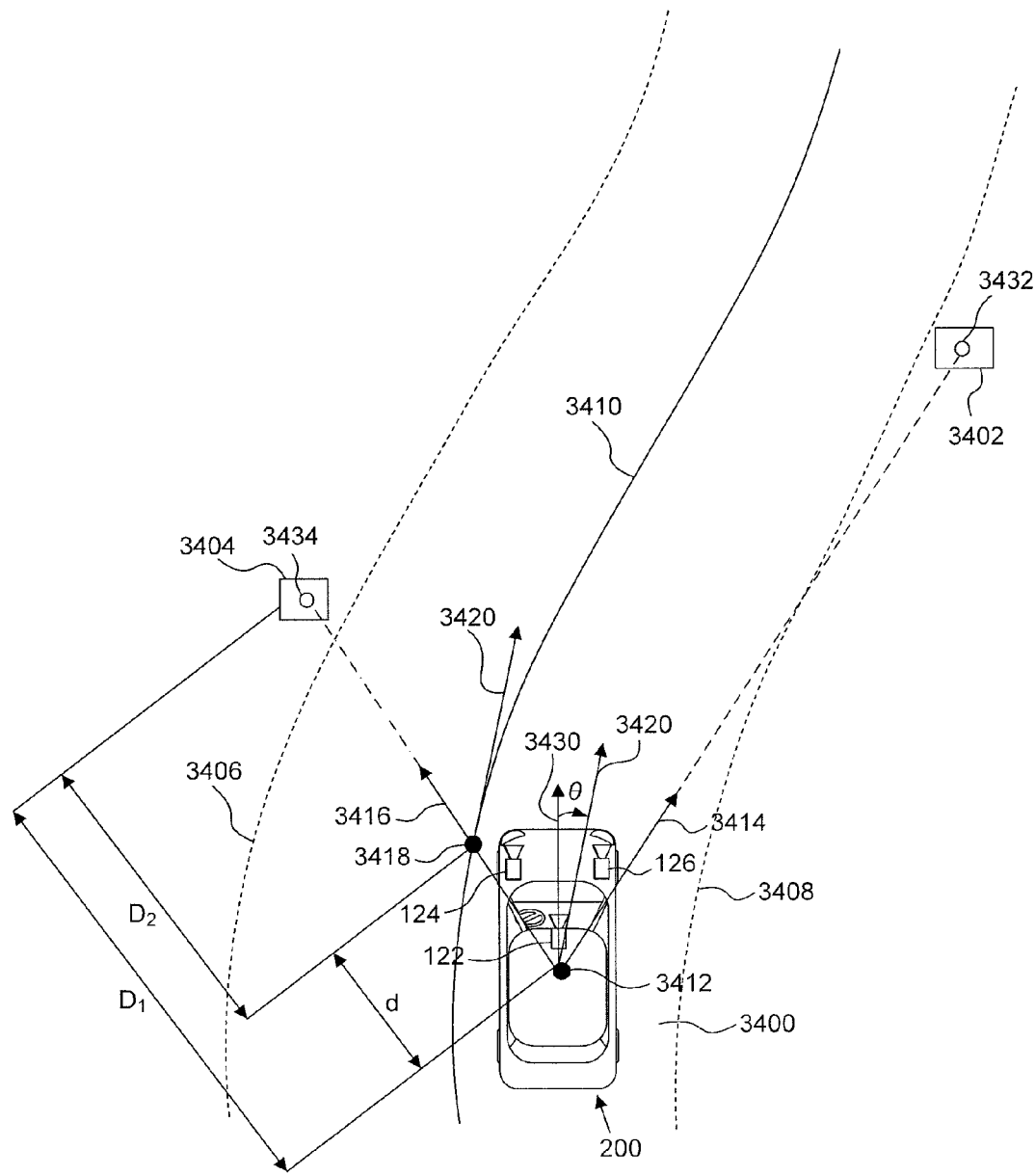
FIG. 35 is another diagrammatic top view representation of an exemplary vehicle including a system consistent with the disclosed embodiments in which the vehicle navigates using a landmark.

FIG. 35 illustrates another vehicle 200 travelling on road segment 3400 in which the disclosed systems and methods for navigating vehicle 200 using one or more recognized landmarks 3402, 3404 may be used. Unlike FIG. 34, vehicle 200 of FIG. 35 is not located on predetermined road model trajectory 3410. As a result, as illustrated in FIG. 35, intersection point 3418 of directional indicator 3416 may not coincide with current position 3412 of vehicle 200.

As discussed above with respect to FIG. 34, processing unit 110 may be configured to determine a direction 3420 of predetermined road model trajectory 3410 at intersection point 3418. Processing unit 110 may also be configured to determine whether heading direction 3430 of vehicle 200 is aligned with (i.e. generally parallel to) direction 3420. When heading direction 3430 is not aligned with direction 3420 of predetermined road model trajectory 3410 at intersection point 3418, processing unit 110 may determine a first autonomous steering action such that heading direction 3430 of vehicle 200 may be aligned with direction 3420 of predetermined road model trajectory 3410. For example, as illustrated in FIG. 35, processing unit 110 may determine the first autonomous steering action to require a rotation by an angle to help ensure that heading direction 3430 of vehicle 200 may be aligned with direction 3420.

In addition, when current position 3412 of vehicle 200 is not located on predetermined road model trajectory 3410, processing unit 120 may determine a second autonomous steering action to help ensure that vehicle 200 may move from current position 3412 to intersection point 3418 on predetermined road model trajectory 3410. For example, as illustrated in FIG. 35, processing unit 110 may determine a distance "d" by which vehicle 200 must be translated to move current position 3412 to coincide with intersection point 3418 on predetermined road model trajectory 3410. Although not illustrated in FIG. 35, processing unit 110 may also be configured to determine a rotation that may be required to help ensure that vehicle 200 may move from current position 3412 to intersection point 3418 on predetermined road model trajectory 3410. Processing unit 110 may be configured to execute instructions stored in navigational response module 408 to trigger a desired navigational response corresponding to the first autonomous steering action, the second autonomous steering action, or some combination of the first and the second autonomous steering actions. In some embodiment, processing unit 110 may execute instructions to trigger a desired navigational response corresponding to the first autonomous steering action and the second autonomous steering action sequentially in any order.

Figure 36:
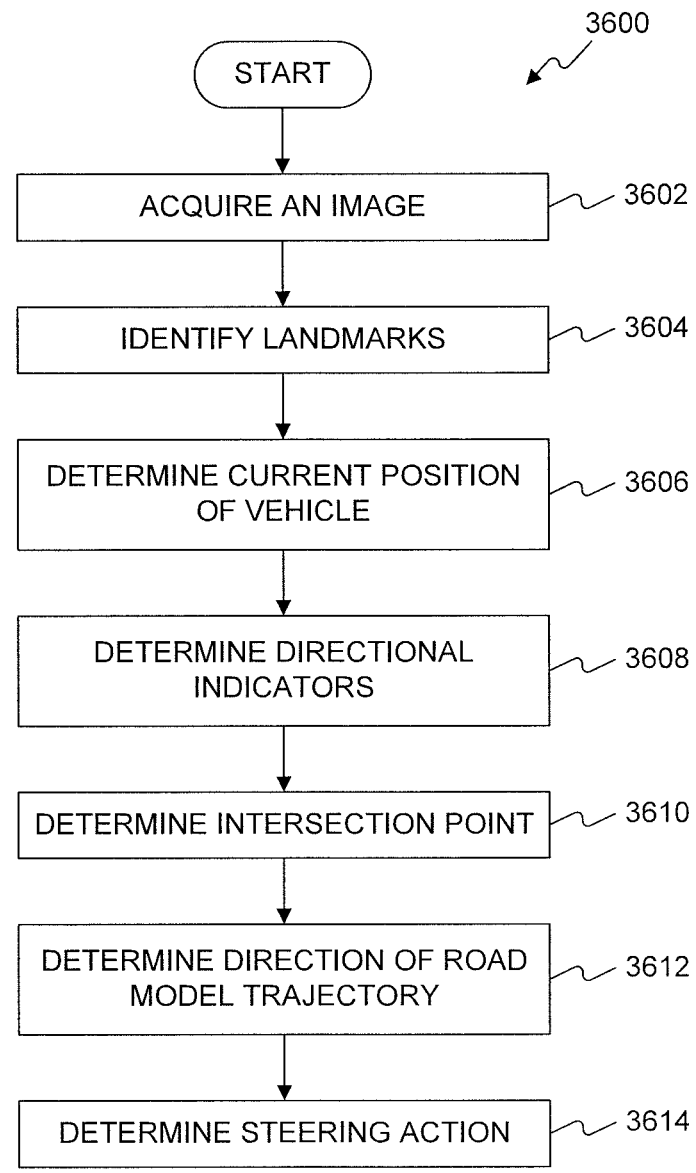
FIG. 36 is a flowchart showing an exemplary process for navigating an exemplary vehicle using a landmark.

FIG. 36 is a flowchart showing an exemplary process 3600, for navigating vehicle 200 along road segment 3400, using one or more landmarks 3402, 3404, consistent with disclosed embodiments. Steps of process 3600 may be performed by one or more of processing unit 110 and image acquisition unit 120, with or without the need to access memory 140 or 150. The order and arrangement of steps in process 3600 is provided for purposes of illustration. As will be appreciated from this disclosure, modifications may be made to process 3600 by, for example, adding, combining, removing, and/or rearranging the steps for the process.

As illustrated in FIG. 36, process 3600 may include a step 3602 of acquiring an image representative of an environment of the vehicle. In one exemplary embodiment, image acquisition unit 120 may acquire one or more images of an area forward of vehicle 200 (or to the sides or rear of a vehicle, for example). For example, image acquisition unit 120 may obtain an image using image capture device 122 having a field of view 202. In other exemplary embodiments, image acquisition unit 120 may acquire images from one or more of image capture devices 122, 124, 126, having fields of view 202, 204, 206. Image acquisition unit 120 may transmit the one or more images to processing unit 110 over a data connection (e.g., digital, wired, USB, wireless, Bluetooth, etc.).

Process 3600 may also include a step 3604 of identifying one or more landmarks 3402, 3404 in the one or more images. Processing unit 110 may receive the one or more images from image acquisition unit 120. Processing unit 110 may execute monocular image analysis module 402 to analyze the plurality of images at step 3604, as described in further detail in connection with FIGS. 5B-5D. By performing the analysis, processing unit 110 may detect a set of features within the set of images, for example, one or more landmarks 3402, 3404. Landmarks 3402, 3404 may include one or more traffic signs, arrow markings, lane markings, dashed lane markings, traffic lights, stop lines, directional signs, reflectors, landmark beacons, lampposts, a change is spacing of lines on the road, signs for businesses, and the like.

In some embodiments, processing unit 110 may execute monocular image analysis module 402 to perform multi-frame analysis on the plurality of images to detect landmarks 3402, 3404. For example, processing unit 110 may estimate camera motion between consecutive image frames and calculate the disparities in pixels between the frames to construct a 3D-map of the road. Processing unit 110 may then use the 3D-map to detect the road surface, as well as landmarks 3402, 3404. In another exemplary embodiment, image processor 190 of processing unit 110 may combine a plurality of images received from image acquisition unit 120 into one or more composite images. Processing unit 110 may use the composite images to detect the one or more landmarks 3402, 3404.

In some embodiments, processing unit 110 may be able to recognize various attributes of objects that may qualify as potential landmarks. This information may be uploaded to a server, for example, remote from the vehicle. The server may process the received information and may establish a new, recognized landmark within sparse data map 800, for example. It may also be possible for the server to update one or more characteristics (e.g., size, position, etc.) of a recognized landmark already included in sparse data map 800.

In some cases, processing unit 110 may receive information from a remote server that may aid in locating recognized landmarks (e.g., those landmarks that have already been identified and represented in sparse data map 800). For example, as a vehicle travels along a particular road segment, processor 110 may access one or more local maps corresponding to the road segment being traversed. The local maps may be part of sparse data map 800 stored on a server located remotely with respect to the vehicle, and the one or more local maps may be wirelessly downloaded as needed. In some cases, the sparse map 800 may be stored locally with respect to the navigating vehicle. The local maps may include various features associated with a road segment. For example, the local maps may include a polynomial spline representative of a target trajectory that the vehicle should follow along the road segment. The local maps may also include representations of recognized landmarks. In some cases, as previously described, the recognized landmarks may include information such as a landmark type, position, size, distance to another landmark, or other characteristics. In the case of non-semantic signs (e.g., general signs not necessarily associated with road navigation), for example, the information stored in sparse data map 800 may include a condensed image signature associated with the non-semantic road sign.

Such information received from sparse data map 800 may aid processor unit 110 in identifying recognized landmarks along a road segment. For example, processor unit 110 may determine based on its current position (determined, for example, based on GPS data, dead reckoning relative to a last determined position, or any other suitable method) and information included in a local map (e.g., a localized position of the next landmark to be encountered and/or information indicating a distance from the last encountered landmark to the next landmark) that a recognized landmark should be located at a position approximately 95 meters ahead of the vehicle and 10 degrees to the right of a current heading direction. Processor unit 110 may also determine from the information in the local map that the recognized landmark is of a type corresponding to a speed limit sign and that the sign has a rectangular shape of about 2 feet wide by 3 feet tall.

Thus, when processor unit 110 receives images captured by the onboard camera, those images may be analyzed by searching for an object at the expected location of a recognized landmark from sparse map 800. In the speed limit sign example, processor unit 110 may review captured images and look for a rectangular shape at a position in the image 10 degrees to the right of a heading direction of the vehicle. Further, the processor may look for a rectangular shape occupying a number of pixels of the image that a 2 foot by 3 foot rectangular sign would be expected to occupy at a relative distance of 95 meters. Upon identifying such an object in the image, where expected, the processor may develop a certain confidence level that the expected recognized landmark has been identified. Further confirmation may be obtained, for example, by analyzing the image to determine what text or graphics appear on the sign in the captured images. Through textual or graphics recognition processes, the processor unit may determine that the rectangular shape in the captured image includes the text "Speed Limit 55." By comparing the captured text to a type code associated with the recognized landmark stored in sparse data map 800 (e.g., a type indicating that the next landmark to be encountered is a speed limit sign), this information can further verify that the observed object in the captured images is, in fact, the expected recognized landmark.

Process 3600 may include a step 3606 of determining a current position 3412 of vehicle 200 relative to a target trajectory. Processing unit 110 may determine current position 3412 of vehicle 200 in many different ways. For example, processing unit 110 may determine current position 3412 based on signals from position sensor 130, for example, a GPS sensor. In another exemplary embodiment, processing unit 110 may determine current position 3412 of vehicle 200 by integrating a velocity of vehicle 200 as vehicle 200 travels along predetermined road model trajectory 3410. For example, processing unit 110 may determine a time "t" required for vehicle 200 to travel between two locations on predetermined road model trajectory 3410. Processing unit 110 may integrate the velocity of vehicle 200 over time t to determine current position 3412 of vehicle 200 relative to the two locations on predetermined road model trajectory 3410.

Once a recognized landmark is identified in a captured image, predetermined characteristics of the recognized landmark may be used to assist a host vehicle in navigation. For example, in some embodiments, the recognized landmark may be used to determine a current position of the host vehicle. In some cases, the current position of the host vehicle may be determined relative to a target trajectory from sparse data model 800. Knowing the current position of the vehicle relative to a target trajectory may aid in determining a steering angle needed to cause the vehicle to follow the target trajectory (for example, by comparing a heading direction to a direction of the target trajectory at the determined current position of the vehicle relative to the target trajectory).

A position of the vehicle relative to a target trajectory from sparse data map 800 may be determined in a variety of ways. For example, in some embodiments, a 6D Kalman filtering technique may be employed. In other embodiments, a directional indicator may be used relative to the vehicle and the recognized landmark. For example, process 3600 may also include a step 3608 of determining one or more directional indicators 3414, 3416 associated with the one or more landmarks 3402, 3404, respectively. Processing unit 110 may determine directional indicators 3414, 3416 based on the relative positions 3432, 3434 of the one or more landmarks 3402, 3404, respectively, relative to current position 3412 of vehicle 200. For example, processing unit 110 may receive landmark positions 3432, 3434 for landmarks 3402, 3404, respectively, from information, which may be stored in one or more databases in memory 140 or 150. Processing unit 110 may also determine distances between current position 3412 of vehicle 200 and landmark positions 3432, 3434 for landmarks 3402, 3404, respectively. In addition, processing unit 110 may determine directional indicator 3414 as a vector extending from current position 3412 of vehicle 200 and extending along a straight line passing through current position 3412 and landmark position 3432. Likewise, processing unit 110 may determine directional indicator 3416 as a vector extending from current position 3412 of vehicle 200 and extending along a straight line passing through current position 3412 and landmark position 3434. Although two landmarks 3402, 3404 are referenced in the above discussion, it is contemplated that processing unit 110 may determine landmark positions 3432, 3434, distances between current position 3412 and landmark positions 3402, 34014, and directional indicators 3414, 3416 for fewer than or more than landmarks 3402, 3404.

Process 3600 may include a step 3610 of determining an intersection point 3418 of directional indicator 3416 with predetermined road model trajectory 3410. Processing unit 110 may determine a location of intersection point 3418 at which predetermined road model trajectory 3410 intersects with a straight line extending between current position 3412 of vehicle 200 and landmark position 3434. Processing unit 110 may obtain a mathematical representation of predetermined road model trajectory 3410 from information stored in memories 140, 150. Processing unit 110 may also generate a mathematical representation of a straight line passing through both current position 3412 of vehicle 200 and landmark position 3434 of landmark 3404. Processing unit 110 may use the mathematical representation of predetermined road model trajectory 3410 and the mathematical representation of a straight line extending between current position 3412 and landmark position 3434 to determine a location of intersection point 3418.

In one exemplary embodiment as illustrated in FIG. 34, intersection point 3418 may coincide with current position 3412 of vehicle 200 (e.g., a position of a point of reference, which may be arbitrarily assigned, associated with the vehicle). This may happen, for example, when vehicle 200 is located on predetermined road model trajectory 3410. In another exemplary embodiment as illustrated in FIG. 35, intersection point 3418 may be separated from current position 3412. Processing unit 110 may detect that vehicle 200 is not located on predetermined road model trajectory 3410 by comparing a first distance "$D_1$" (see, e.g., FIG. 35) between current position 3412 and landmark position 3434 with a second distance "$D_2$" between intersection point 3418 and landmark position 3434.

When intersection point 3418 is separated from current position 3412 of vehicle 200, processing unit 110 may determine an amount of translation and/or rotation that may be required to help move vehicle 200 from current position 3412 to intersection point 3418 on predetermined road model trajectory 3410. In some exemplary embodiments, processing unit 110 may execute navigation module 408 to cause one or more navigational responses in vehicle 200 based on the analysis performed at step 520 and the techniques as described above in connection with FIG. 4. For example, processing unit 110 may issue commands to steering system 240 to move vehicle 200 so that a current position 3412 of vehicle 200 may coincide with intersection point 3418.

Process 3600 may include a step 3612 of determining direction 3420 of predetermined road model trajectory 3410 at intersection point 3418. In one exemplary embodiment, processing unit 110 may obtain a mathematical representation (e.g. three-dimensional polynomial) of predetermined road model trajectory 3410. Processing unit 110 may determine direction 3420 as a vector oriented tangentially to predetermined road model trajectory 3410 at intersection point 3418. For example, processing unit 110 may determine direction 3420 as a vector pointing along a gradient of the mathematical representation of predetermined road model trajectory 3410 at intersection point 3418.

Process 3600 may also include a step 3614 of determining an autonomous steering action for vehicle 200. In one exemplary embodiment, processing unit 110 may determine a heading direction 3430 of vehicle 200. For example, as illustrated in FIGS. 34 and 35, processing unit 110 may determine heading direction 3430 of vehicle 200 as the direction in which image capture device 122 may be oriented relative to a local coordinate system associated with vehicle 200. In another exemplary embodiment, processing unit 200 may determine heading direction 3430 as the direction of motion of vehicle 200 at current position 3412. Processing unit 110 may also determine a rotational angle between heading direction 3430 and direction 3420 of predetermined road model trajectory 3410. Processing unit 110 may execute the instructions in navigational module 408 to determine an autonomous steering action for vehicle 200 that may help ensure that heading direction 3430 of vehicle 200 is aligned (i.e., parallel) with direction 3420 of predetermined road model trajectory 3410 at intersection point 3418. Processing unit 110 may also send control signals to steering system 240 to adjust rotation of the wheels of vehicle 200 to turn vehicle 200 so that heading direction 3430 may be aligned with direction 3420 of predetermined road model trajectory 3410 at intersection point 3418. In one exemplary embodiment, processing unit 110 may send signals to steering system 240 to adjust rotation of the wheels of vehicle 200 to turn vehicle 200 until a difference between heading direction 3430 and direction 3420 of predetermined road model trajectory 3410 at intersection point 3418 may be less than a predetermined threshold value.

Processing unit 110 and/or image acquisition unit 120 may repeat steps 3602 through 3614 after a predetermined amount of time. In one exemplary embodiment, the predetermined amount of time may range between about 0.5 seconds to 1.5 seconds. By repeatedly determining intersection point 3418, heading direction 3430, direction 3420 of predetermined road model trajectory 3410 at intersection point 3418, and the autonomous steering action required to align heading direction 3430 with direction 3420, processing unit 110 and/or image acquisition unit 120 may help to navigate vehicle 200, using the one or more landmarks 3402, 3404, so that vehicle 200 may travel along road segment 3400.

Tail Alignment Navigation

Consistent with disclosed embodiments, the system can determine a steering direction for a host vehicle by comparing and aligning a traveled trajectory of the host vehicle (the tail) with a predetermined road model trajectory at a known location along the road model trajectory. The traveled trajectory provides a vehicle heading direction at the host vehicle location, and the steering direction can be obtained, relative to the heading direction, by determining a transformation (e.g., rotation and potentially translation) that minimizes or reduces an error between the traveled trajectory and the road model trajectory at the known location of the vehicle along the road model trajectory.

Tail alignment is a method of aligning an autonomous vehicle's heading with a pre-existing model of the path based on information regarding the path over which the vehicle has already travelled. Tail alignment uses a tracked path of the autonomous vehicle over a certain distance (hence the "tail"). The tracked path is a representation of the path over which the autonomous vehicle has already travelled in order to reach a current location of the autonomous vehicle. For example, the tracked path may include a predetermined distance (e.g. 60 m or other desired length) of the path behind the autonomous vehicle over which the autonomous vehicle travelled to reach its current location. The tracked path may be compared with the model to determine, for example, a heading angle of the autonomous vehicle.

In some embodiments, a rear looking camera may be used to determine or aid in determination of the travelled path. A rear looking camera may be useful both for modeling, heading estimation, and lateral offset estimation. By adding a rear looking camera it may be possible to boost the reliability of the system, since a bad illumination situation (e.g., low sun on the horizon) rarely would affect both front looking and rear looking cameras.

The tracked path can also optionally be combined with a predicted path of the autonomous vehicle. The predicted path may be generated by processing images of the environment ahead of the autonomous vehicle and detecting lane, or other road layout, markings. In this regard it is worth noting, that in a potential implementation of the present disclosure, a road model may diverge due to accumulated errors (integration of ego motion). Thus, for example, a predicted path over a predetermined distance (e.g. 40 m) ahead of the current location of the autonomous vehicle may be compared with the tracked path to determine the heading angle for the autonomous vehicle.

Figure 37:
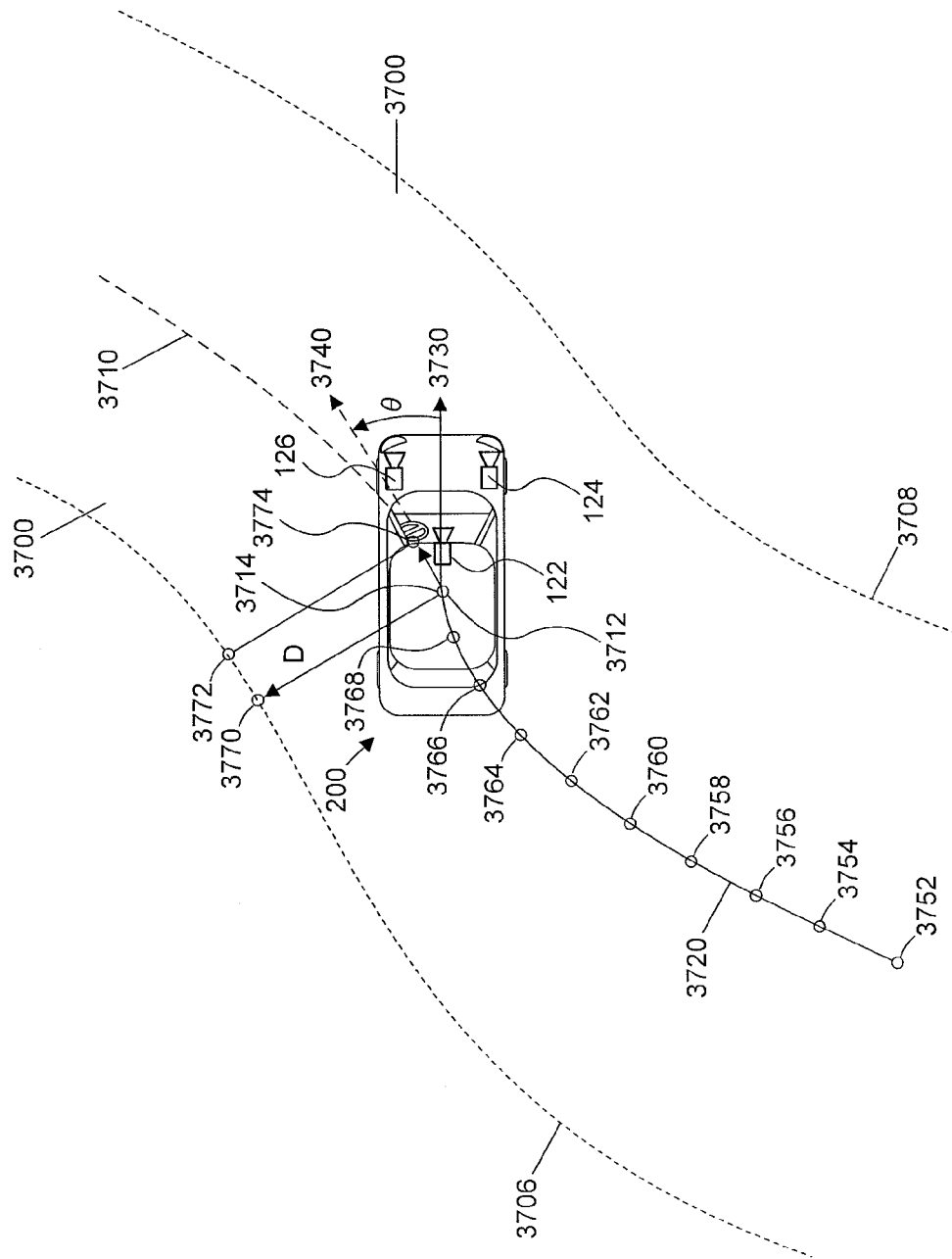
FIG. 37 is a diagrammatic top view representation of an exemplary autonomous vehicle including a system consistent with the disclosed embodiments in which the autonomous vehicle navigates using tail alignment.

FIG. 37 illustrates vehicle 200 (which may be an autonomous vehicle) travelling on road segment 3700 in which the disclosed systems and methods for navigating vehicle 200 using tail alignment may be used. As used here and throughout this disclosure, the term "autonomous vehicle" refers to vehicles capable of implementing at least one navigational change in course without driver input. To be autonomous, a vehicle need not be fully automatic (e.g., fully operational without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints), but may leave other aspects to the driver (e.g., braking). In some cases, autonomous vehicles may handle some or all aspects of braking, speed control, and/or steering of the vehicle.

Although, FIG. 37 depicts vehicle 200 as equipped with image capture devices 122, 124, 126, more or fewer image capture devices may be employed on any particular vehicle 200. As illustrated in FIG. 37, road segment 3700 may be delimited by left side 3706 and right side 3708. A predetermined road model trajectory 3710 may define a preferred path (i.e. a target road model trajectory) within road segment 3700 that vehicle 200 may follow as vehicle 200 travels along road segment 3700. In some exemplary embodiments, predetermined road model trajectory 3710 may be located equidistant from left side 3706 and right side 3708. It is contemplated however that predetermined road model trajectory 3710 may be located nearer to one or the other of left side 3706 and right side 3708 of road segment 3700. Further, although FIG. 37 illustrates one lane in road segment 3700, it is contemplated that road segment 3700 may have any number of lanes. It is also contemplated that vehicle 200 travelling along any lane of road segment 3400 may be navigated using tail alignment according to the disclosed methods and systems.

Image acquisition unit 120 may be configured to acquire a plurality of images representative of an environment of vehicle 200, as vehicle 200 travels along road segment 3700. For example, image acquisition unit 120 may obtain the plurality of images showing views in front of vehicle 200 using one or more of image capture devices 122, 124, 126. Processing unit 110 of vehicle 200 may be configured to detect a location of vehicle 200 in each of the plurality of images. Processing unit 110 of vehicle 200 may also be configured to determine a traveled trajectory 3720 based on the detected locations. As used in this disclosure, the travelled trajectory 3720 may represent an actual path taken by vehicle 200 as vehicle 200 travels along road segment 3700.

Processing unit 110 may be configured to determine a current location 3712 of vehicle 200 based on analysis of the plurality of images. In one exemplary embodiment as illustrated in FIG. 37, the current location 3712 of vehicle 200 may coincide with a target location 3714 on predetermined road model trajectory 3710. This may occur, for example, when vehicle 200 is located on predetermined road model trajectory 3710. Although generally vehicle 200 may be expected to be located on or very near predetermined road model trajectory 3710, it is contemplated that vehicle 200 may not be located on predetermined road model trajectory 3710 as will be discussed below with respect to FIG. 38.

Processing unit 110 may be configured to determine an autonomous steering action for vehicle 200 by comparing the travelled trajectory 3720 with the predetermined road model trajectory 3710 at current location 3712 of vehicle 200. For example, processing unit 110 may be configured to determine a transformation (i.e., rotation and potentially translation) such that an error between the travelled trajectory 3720 and the predetermined road model trajectory 3710 may be reduced.

Processing unit 110 may be configured to determine a heading direction 3730 of vehicle 200 at current location 3712. Processing unit 110 may determine heading direction 3730 based on the travelled trajectory 3720. For example, processing unit 110 may determine heading direction 3730 as a gradient of travelled trajectory 3720 at current location 3712 of vehicle 200. Processing unit 110 may also be configured to determine steering direction 3740 as a direction tangential to predetermined road model trajectory 3710. In one exemplary embodiment, processing unit 110 may be configured to determine steering direction 3740 based on a gradient of a three-dimensional polynomial representing predetermined road model trajectory 3710.

Processing unit 110 may be configured to determine whether heading direction 3730 of vehicle 200 is aligned with (i.e., generally parallel to) steering direction 3740 of predetermined road model trajectory 3710. When heading direction 3730 is not aligned with steering direction 3740 of predetermined road model trajectory 3710 at current location 3712 of vehicle 200, processing unit 110 may determine an autonomous steering action such that heading direction 3730 of vehicle 200 may be aligned with steering direction 3740 of predetermined road model trajectory 3710. Processing unit 110 may be configured to execute instructions stored in navigational response module 408 to trigger a desired navigational response by, for example, turning the steering wheel of vehicle 200 to achieve a rotation of angle □. Rotation by the angle □ may help align heading direction 3730 of vehicle 200 with steering direction 3740. Thus, for example, processing unit 110 may perform tail alignment of vehicle 200 by determining the angle □ by which vehicle 200 may turn so that heading direction 3730 of autonomous vehicle may be aligned with steering direction 3740.

Image acquisition unit 120 may repeatedly acquire the plurality of images of the environment in front of vehicle 200, for example, after a predetermined amount of time. Processing unit 110 may also be configured to repeatedly determine the transformation as discussed above. Thus, image acquisition unit 120 and processing unit 110 may cooperate to navigate vehicle 200 along road segment 3400 using the travelled trajectory 3720 (i.e. the "tail") of vehicle 200.

Figure 38:
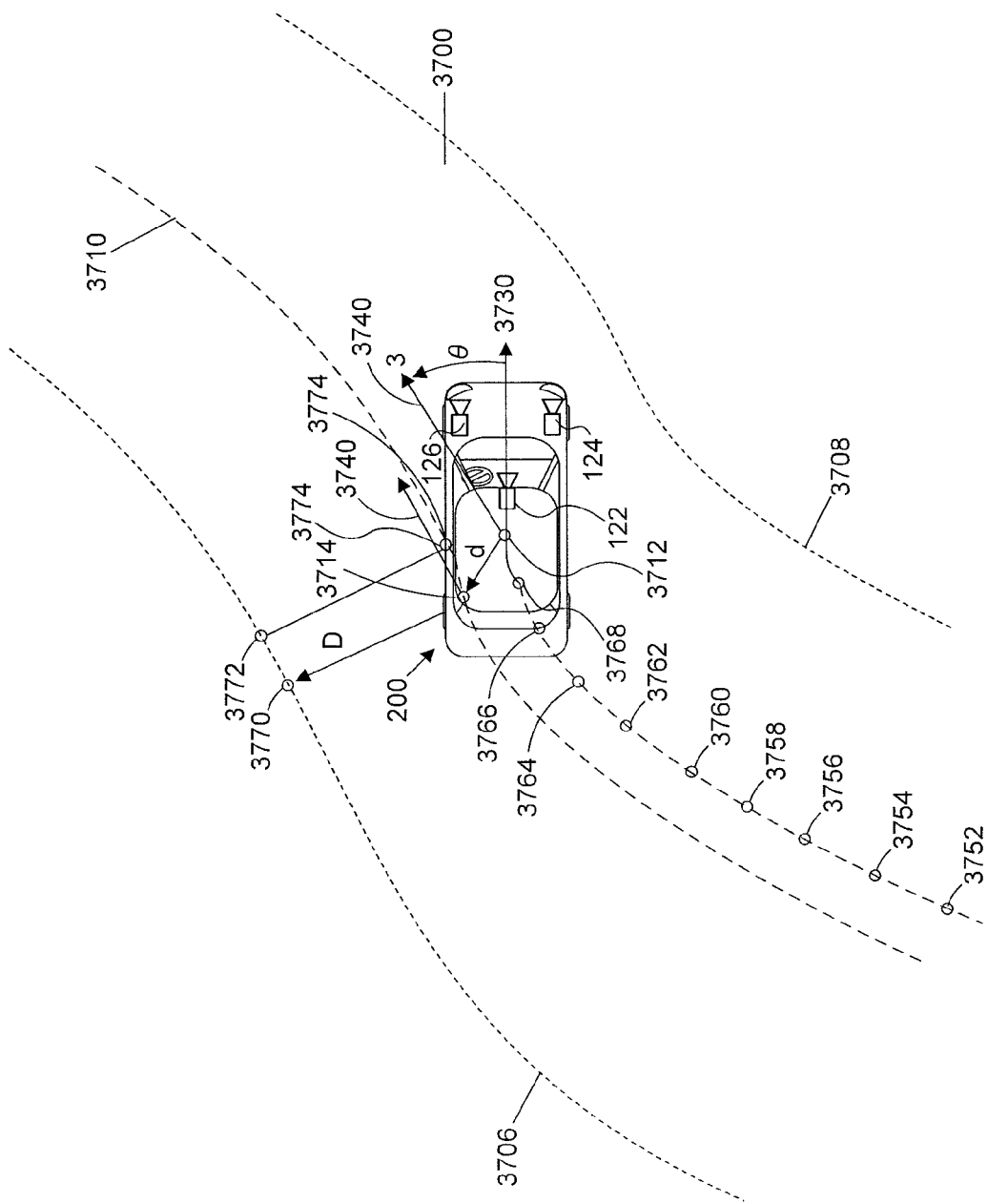
FIG. 38 is another diagrammatic top view representation of an exemplary autonomous vehicle including a system consistent with the disclosed embodiments in which the autonomous vehicle navigates using tail alignment.

FIG. 38 illustrates another vehicle 200 travelling on road segment 3700 in which disclosed systems and methods for navigating vehicle 200 using tail alignment. Unlike FIG. 38, vehicle 200 of FIG. 38 is not located on predetermined road model trajectory 3710. As a result, as illustrated in FIG. 38, target location 3714 of vehicle 200 may not coincide with current location 3712 of vehicle 200.

As discussed above with respect to FIG. 37, processing unit 110 may be configured to determine a steering direction 3740 of predetermined road model trajectory 3710 at current location 3712 of vehicle 200. Processing unit 110 may determine steering direction 3740 as the direction of the gradient of predetermined road model trajectory 3710 at target location 3714. Processing unit 110 may also be configured to determine whether heading direction 3730 of vehicle 200 is aligned with (i.e., generally parallel to) steering direction 3740. When heading direction 3730 is not aligned with steering direction 3740, processing unit 110 may determine a transformation that may include, for example, a rotation angle that may be required to align heading direction 3730 with steering direction 3740. In addition, the transformation may include a translation "d" that may be required to ensure that vehicle 200 may move from current location 3712 to target location 3714 on predetermined road model trajectory 3710.

Processing unit 110 may be configured to determine the transformation by comparing predetermined road model trajectory 3710 with the travelled trajectory 3720 of vehicle 200. In one exemplary embodiment, processing unit 110 may determine the transformation by reducing an error between predetermined road model trajectory 3710 and travelled trajectory 3720. Processing unit 110 may be configured to execute instructions stored in navigational response module 408 to trigger a desired navigational response based on the determined transformation.

Figure 39:
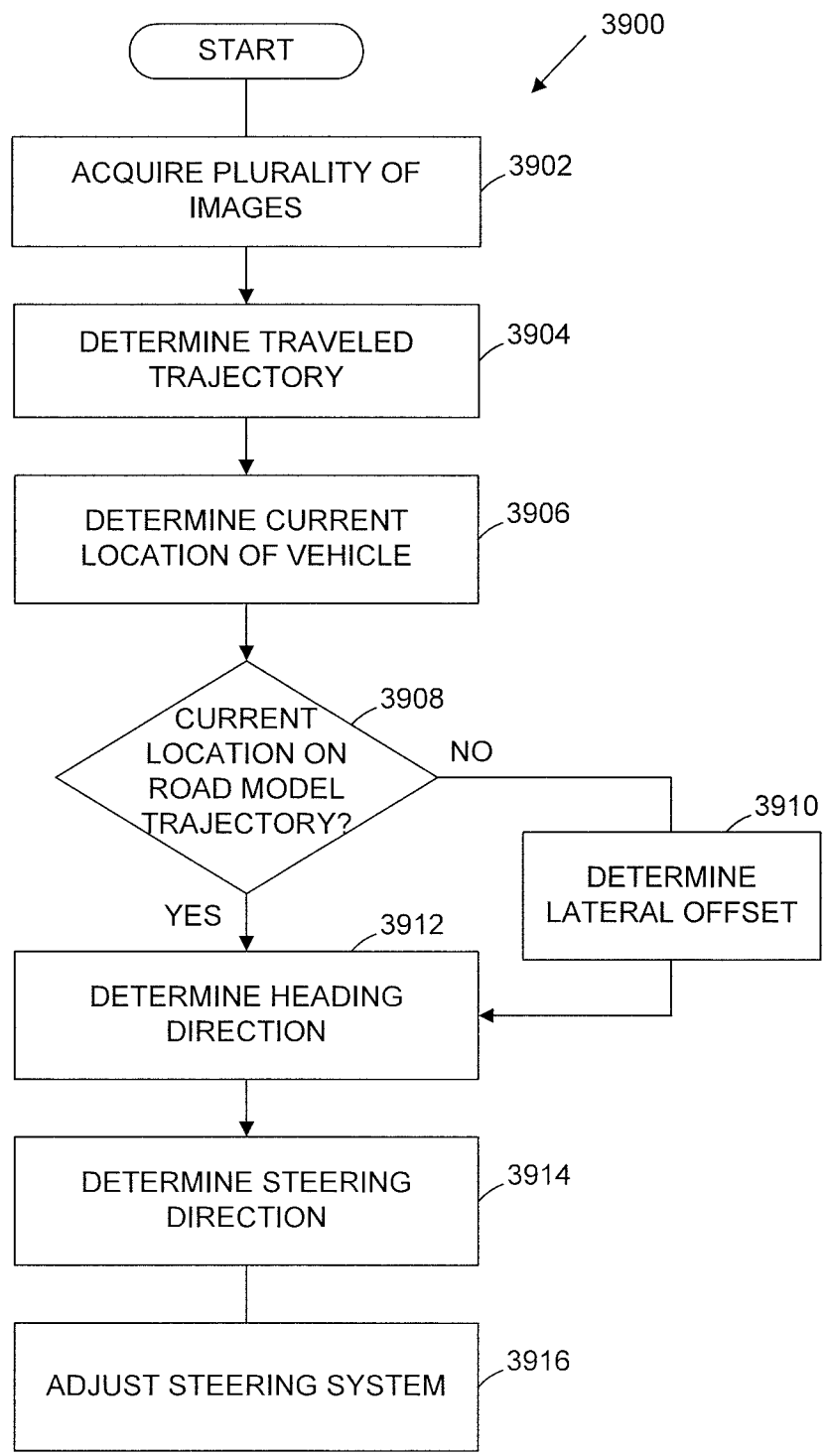
FIG. 39 is a flowchart showing an exemplary process for navigating an exemplary autonomous vehicle using tail alignment.

FIG. 39 is a flowchart showing an exemplary process 3900, for navigating vehicle 200 along road segment 3700, using tail alignment, consistent with disclosed embodiments. Steps of process 3900 may be performed by one or more of processing unit 110 and image acquisition unit 120, with or without the need to access memory 140 or 150. The order and arrangement of steps in process 3900 is provided for purposes of illustration. As will be appreciated from this disclosure, modifications may be made to process 3900 by, for example, adding, combining, removing, and/or rearranging the steps for the process.

As illustrated in FIG. 39, process 3900 may include a step 3902 of acquiring a plurality of images representative of an environment of the vehicle. In one exemplary embodiment, image acquisition unit 120 may acquire the plurality of images of an area forward of vehicle 200 (or to the sides or rear of a vehicle, for example) at multiple locations as vehicle travels along road segment 3700. For example, image acquisition unit 120 may obtain images using image capture device 122 having a field of view 202 at each of locations 3752-3768 and 3712 (see FIGS. 37, 38). In other exemplary embodiments, image acquisition unit 120 may acquire images from one or more of image capture devices 122, 124, 126, having fields of view 202, 204, 206 at each of locations 3752-3768 and 3712. Image acquisition unit 120 may transmit the one or more images to processing unit 110 over a data connection (e.g., digital, wired, USB, wireless, Bluetooth, etc.). Images obtained by the one or more image capture devices 122, 124, 126 may be stored in one or more of memories 140, 150, and/or database 160.

Process 3900 may also include a step 3904 of determining travelled trajectory 3720. Processing unit 110 may receive the one or more images from image acquisition unit 120. Processing unit 110 may execute processes similar to those discussed with respect to FIGS. 34-36 to identify locations 3752-3768 of vehicle 200 in the plurality of images. For example, processing unit 110 may identify one or more landmarks and use directional vectors of the landmarks to determine locations 3752-3768 and current location 3712 using the systems and methods disclosed with respect to FIGS. 34-36. Processing unit 110 may determine travelled trajectory 3720 based on the determined locations 3752-3768 and current location 3712 of vehicle 200. In one exemplary embodiment, processing unit 110 may determine travelled trajectory 3720 by curve-fitting a three-dimensional polynomial to the determined locations 3752-3768 and current location 3712 of vehicle 200.

In some embodiments, processing unit 110 may execute monocular image analysis module 402 to perform multi-frame analysis on the plurality of images. For example, processing unit 110 may estimate camera motion between consecutive image frames and calculate the disparities in pixels between the frames to construct a 3D-map of the road. Processing unit 110 may then use the 3D-map to detect the road surface as well as to generate travelled trajectory 3720 of vehicle 200.

Process 3900 may include a step 3906 of determining a current location 3712 of vehicle 200. Processing unit 110 may determine current location 3712 of vehicle 200 by performing processes similar to those discussed, for example, with respect to FIGS. 34-36 regarding navigation based on recognized landmarks. In some exemplary embodiments, processing unit 110 may determine current location 3712 based on signals from position sensor 130, for example, a GPS sensor. In another exemplary embodiment, processing unit 110 may determine current location 3712 of vehicle 200 by integrating a velocity of vehicle 200 as vehicle 200 travels along travelled trajectory 3720. For example, processing unit 110 may determine a time "t" required for vehicle 200 to travel between two locations 3751 and 3712 on travelled trajectory 3720. Processing unit 110 may integrate the velocity of vehicle 200 over time t to determine current location 3712 of vehicle 200 relative to location 3751.

Process 3900 may also include a step 3908 of determining whether current location 3712 of vehicle 200 is located on predetermined road model trajectory 3710. In some exemplary embodiments, predetermined road model trajectory 3710 may be represented by a three-dimensional polynomial of a target trajectory along road segment 3700. Processing unit 110 may retrieve predetermined road model trajectory 3710 from database 160 stored in one or memories 140 and 150 included in vehicle 200. In some embodiments, processing unit 110 may retrieve predetermined road model trajectory 3710 from database 160 stored at a remote location via a wireless communications interface.

Processing unit 110 may determine whether current location 3712 of vehicle 200 is located on predetermined road model trajectory 3710, using processes similar to those discussed with respect to FIGS. 34-37, by for example, determining a distance between vehicle 200 and a recognized landmark. When processing unit 110 determines that current location of vehicle 200 is on predetermined road model trajectory 3710 (see FIG. 37), processing unit 110 may proceed to step 3912. When processing unit 110 determines, however, that current location of vehicle 200 is not on predetermined road model trajectory 3710 (see FIG. 38), processing unit 110 may proceed to step 3910.

In step 3910, processing unit 110 may determine a lateral offset "d" that may help ensure that vehicle 200 may move from current location 3712 to target location 3714 on predetermined road model trajectory 3710. Processing unit 110 may determine lateral offset d. In one embodiment, processing unit 110 may determine lateral offset d by determining the left and right sides 3706, 3708. In one other exemplary embodiments, processing unit 110 may determine a translation function needed to convert current location 3712 to target location 3714. In another embodiment, processing unit 110 may determine the translation function by reducing the error between current location 3712 and target location 3714. In additional exemplary embodiments, processing unit 110 may determine the lateral offset d by observing (using one or more onboard cameras and one or more images captured by those cameras) left side 3706 and right side 3708 of road segment 3700. After determining the lateral offset d, processing unit may proceed to step 3912.

Process 3900 may include a step 3912 of determining heading direction 3730 of vehicle 200, and possibly a correction to the current location 3712 computed in step 3906. In one exemplary embodiment, processing unit 110 may determine heading direction 3730 and a correction to location 3712 by aligning the travelled trajectory 3720 at current location 3712 with the model trajectory 3710. The alignment procedure may provide a rigid transformation that reduces or minimizes the distance between 3720 and 3712. In one exemplary embodiment, processing unit 110 may compute a rigid transformation with four degrees of freedom, accounting for 3D rotation (heading) and 1D longitudinal translation. In another exemplary embodiment, processing unit 110 may compute a rigid transformation with any number of parameters (degrees of freedom) between 1 and 6. After alignment, processing unit 110 may determine the predicted location 3774 (see FIGS. 37, 38) of vehicle 200 after time "t" based on a current velocity of vehicle 200 and the geometry of the model trajectory 3710.

In other exemplary embodiments, in step 3912, processing unit 110 may determine heading direction 3730 of vehicle 200, and possibly a correction to the current location 3712 computed in step 3906. For example, processing unit 110 may determine heading direction 3730 and improved location 3712 by aligning the travelled trajectory 3720 at current location 3712 with the model trajectory 3710. The alignment procedure may find a rigid transformation that minimizes the distance between 3720 and 3712. In one exemplary embodiment, processing unit 110 may compute a rigid transformation with four degrees of freedom, accounting for 3D rotation (heading) and 1D longitudinal translation. In another exemplary embodiment, processing unit 110 may compute a rigid transformation with any number of parameters (degreed of freedom) between 1 and 6. After alignment, processing unit 110 may determine the predicted location 3774 (see FIGS. 37, 38) of vehicle 200 after time "t" based on a current velocity of vehicle 200 and the geometry of the model trajectory 3710.

In yet other exemplary embodiments, processing unit 110 may determine heading direction 3730 and a location 3712 as a gradient of travelled trajectory 3720 at current location 3712 of vehicle 200. For example, processing unit 110 may obtain a slope of a three-dimensional polynomial representing travelled trajectory 3720 to determine heading direction 3730 of vehicle 200. In another exemplary embodiment, process 110 may project travelled trajectory 3720 forward from current location 3712. In projecting travelled trajectory 3720, processing unit 110 may determine a predicted location 3774 (see FIGS. 37, 38) of vehicle 200 after time "t" based on a current velocity of vehicle 200.

Processing unit 110 may also determine predicted location 3774 of vehicle 200 after time "t" based on one of many cues. For example, processing unit 110 may determine predicted location 3774 of vehicle 200 after time "t" based on a left lane mark polynomial, which may be a polynomial representing left side 3706 of road segment 3700. Thus, for example, processing unit 110 may determine left position 3770 (see FIGS. 37, 38) on the left lane mark polynomial corresponding to current location 3712 of vehicle 200. Processing unit 110 may determine location 3770 by determining the distance "D" between current location 3712 and left side 3706 based on the left lane mark polynomial. It is contemplated that when vehicle 200 is not located on predetermined road model trajectory 3710 (as in FIG. 38), processing unit 110 may determine distance D as the distance between target location 3714 and left side 3706. Processing unit 110 may also determine a location 3772 on left side 3706 after time "t" using the mathematical representation of the left lane mark polynomial and current velocity of vehicle 200. Processing unit 110 may determine predicted location 3774 of vehicle 200 by laterally offsetting the determined location 3773 on left side 3706 by distance D. In another exemplary embodiment, processing unit 110 may determine the location of vehicle 200 after time "t" based on a right lane mark polynomial, which may be a polynomial representing right side 3708 of road segment 3700. Processing unit 110 may perform processes similar to those discussed above with respect to left lane mark polynomial to determine predicted position 3774 of vehicle 200 based on right lane mark polynomial.

In some exemplary embodiments, processor 110 may determine the location of vehicle 200 after time "t" based on the trajectory followed by a forward vehicle, which may be travelling in front of vehicle 200. In other exemplary embodiments, processing unit 200 may determine the location of vehicle 200 after time "t" by determining an amount of free space ahead of vehicle 200 and a current velocity of vehicle 200. In some embodiments, processing unit 200 may determine the location of vehicle 200 after time "t" based on virtual lanes or virtual lane constraints. For example, when processing unit 110 detects two vehicles travelling in front of vehicle 200, one in each adjacent lane, processing unit 110 may use the average lateral distance between the two vehicles in front as a trajectory (virtual lane marker), which may be used to determine a position of vehicle 200 after time "t." In other embodiments, processing unit 110 may use mathematical representations of left side 3706 (i.e. left lane mark polynomial) and right side 3708 (i.e. right lane mark polynomial) as defining virtual lane constraints. Processing unit 110 may determine predicted position 3774 of vehicle 200 based on the virtual lane constraints (i.e. based on both the left and the right lane mark polynomials) and an estimated location of vehicle 200 from the left and right sides 3706, 3708.

In other embodiments, processing unit 110 may determine predicted location 3774 of vehicle 200 after time "t" based on following a trajectory predicted using holistic path prediction methods. In some exemplary embodiments, processing unit 110 may determine predicted location 3774 of vehicle 200 after time "t" by applying weights to some or all of the above-described cues. For example, processing unit 110 may determine the location of vehicle 200 after time "t" as a weighted combination of the locations predicted based on one or more of a left lane mark polynomial model, a right lane mark polynomial model, holistic path prediction, motion of a forward vehicle, determined free space ahead of the autonomous vehicle, and virtual lanes. Processing unit 110 may use current location 3712 of vehicle 200 and predicted location 3774 after time "t" to determine heading direction 3730 for vehicle 200.

In some embodiments, in step 3912 of process 3900, processing unit 110 may also estimate a longitudinal offset. For example, processing unit 110 may solve for the heading and the offset by an alignment procedure, between the model trajectory and the tail of vehicle 200.

Process 3900 may also include a step 3914 of determining steering direction 3740. In one exemplary embodiment, processing unit 110 may obtain a mathematical representation (e.g. three-dimensional polynomial) of predetermined road model trajectory 3710. Processing unit 110 may determine steering direction 3740 as a vector oriented tangentially to predetermined road model trajectory 3710 at target location 3714. For example, processing unit 110 may determine direction 3740 as a vector pointing along a gradient of the mathematical representation of predetermined road model trajectory 3710 at target location 3714.

Process 3900 may also include a step 3916 of adjusting steering system 240 of vehicle 200 based on the transformation determined, for example, in steps 3910-3914. The required transformation may include lateral offset d. The transformation may further include rotation by an angle to help ensure that heading direction 3730 of vehicle 200 may be aligned with steering direction 3740. Although, FIGS. 37, 38 illustrate determination of one angle between heading direction 3730 and steering direction 3740, it is contemplated that in three-dimensional space, rotation along three angles in three generally orthogonal planes may be required to ensure that heading direction 3730 may be aligned with steering direction 3730. One of ordinary skill in the art would, therefore, recognize that the transformation determined in steps 3910-3914 may include at least three rotational angles and at least one translation (i.e. lateral offset).

Processing unit 110 may send control signals to steering system 240 to adjust rotation of the wheels of vehicle 200 so that heading direction 3730 may be aligned with steering direction 3740 and vehicle 200 may move from current location 3712 to target location 3714 when vehicle 200 is located off predetermined road model trajectory 3710. Processing unit 110 and/or image acquisition unit 120 may repeat steps 3902 through 3916 after a predetermined amount of time. In one exemplary embodiment, the predetermined amount of time may range between about 0.5 seconds to 1.5 seconds. By repeatedly determining lateral offset d and rotation angles, processing unit 110 and/or image acquisition unit 120 may help to navigate vehicle 200, using tail alignment, along road segment 3700.

As discussed in other sections, navigation of an autonomous vehicle along a road segment may include the use of one or more recognized landmarks. Among other things, such recognized landmarks may enable the autonomous vehicle to determine its current location with respect to a target trajectory from sparse data model 800. The current location determination using one or more recognized landmarks may be more precise than determining a position using GPS sensing, for example.

Between recognized landmarks, the autonomous vehicle may navigate using a dead-reckoning technique. This technique may involve periodically estimating a current location of the vehicle with respect to the target trajectory based on sensed ego-motion of the vehicle. Such sensed ego motion may enable the vehicle (e.g., using processing unit 110) to not only estimate the current location of the vehicle relative to the target trajectory, but it may also enable the processing unit 110 to reconstruct the vehicle's travelled trajectory. Sensors that may be used to determine the ego motion of the vehicle may include various sensors such as, for example, onboard cameras, speedometers, and/or accelerometers. Using such sensors, processing unit 110 may sense where the vehicle has been and reconstruct the travelled trajectory. This reconstructed travelled trajectory may then be compared to the target trajectory using the tail alignment technique described above to determine what navigational changes, if any, are required to align the traveled trajectory at a current location with the target trajectory at the current location.

Navigating Road Junctions

Consistent with disclosed embodiments, the system may navigate through road junctions, which may constitute areas with few or no lane markings. Junction navigation may include 3D localization based on two or more landmarks. Thus, for example, the system may rely on two or more landmarks to determine a current location and a heading of an autonomous vehicle. Further, the system may determine a steering action based on the determined heading and a direction of a predetermine road model trajectory representing a preferred path for the vehicle.

Figure 40:
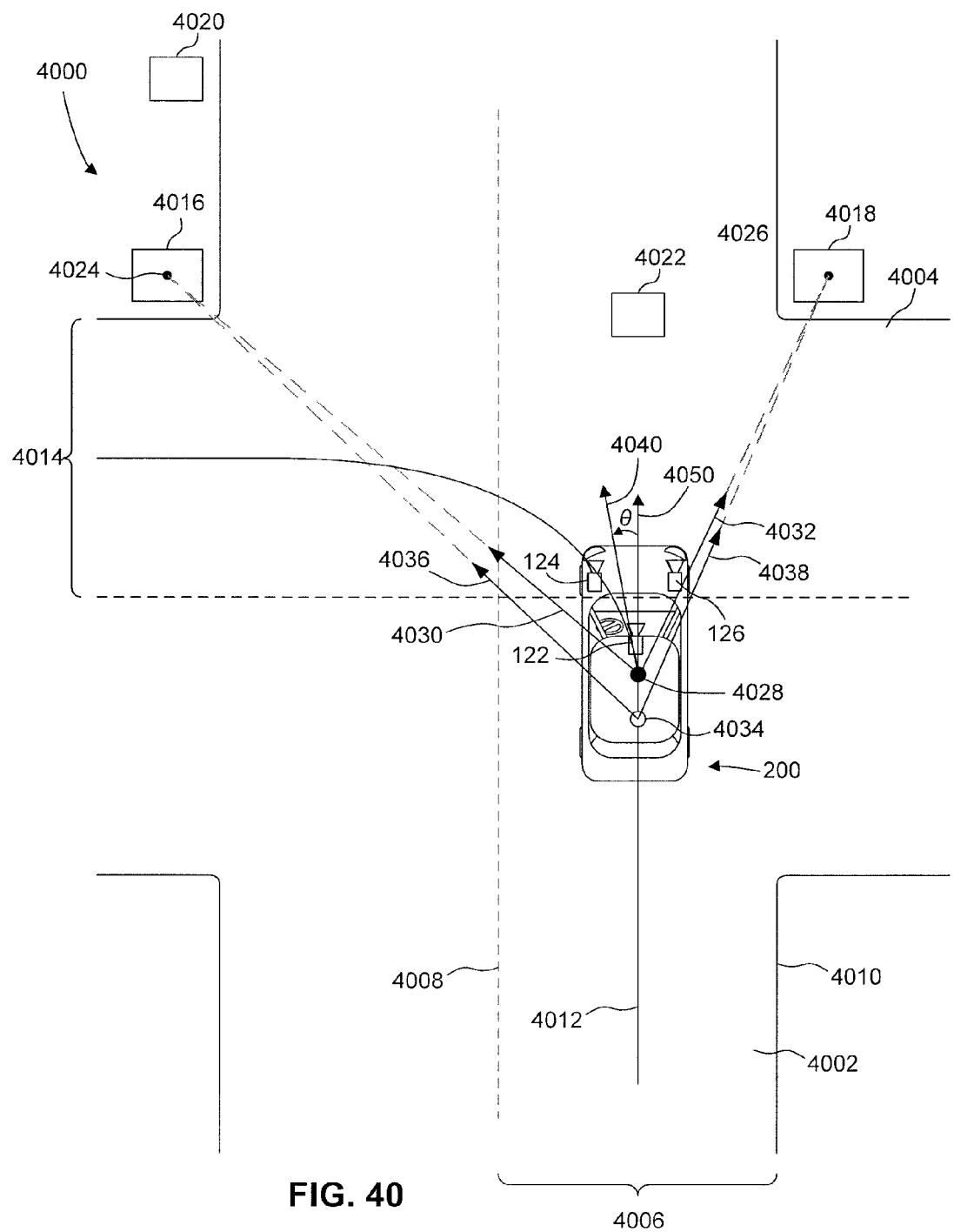
FIG. 40 is a diagrammatic top view representation of an exemplary vehicle including a system consistent with the disclosed embodiments in which the vehicle navigates road junctions using two or more landmarks.

FIG. 40 illustrates vehicle 200 (which may be an autonomous vehicle) travelling through road junction 4000 in which the disclosed systems and methods for navigating road junctions may be used. As illustrated in FIG. 40, vehicle 200 may be travelling along road segment 4002, which may intersect with road segment 4004. Although road segments 4002 and 4004 appear to intersect at right angles in FIG. 40, it is contemplated that road segments 4002 and 4004 may intersect at any angle. Further, although road segments 4002 and 4004 each have two lanes in FIG. 40, it is contemplated that road segments 4002 and 4004 may have any number of lanes. It is also contemplated that road segments 4002 and 4004 may have the same number or different number of lanes.

Vehicle 200 may travel along lane 4006 of road segment 4002. Vehicle 200 may be equipped with three image capture devices 122, 124, 126. Although, FIG. 40 depicts vehicle 200 as equipped with image capture devices 122, 124, 126, more or fewer image capture devices may be employed on any particular vehicle 200. As illustrated in FIG. 40, lane 4006 of road segment 4002 may be delimited by left side 4008 and right side 4010. A predetermined road model trajectory 4012 may define a preferred path (i.e., a target road model trajectory) within lane 4006 of road segments 4002, 4004 that vehicle 200 may follow as vehicle 200 travels along road segments 4002, 4004 through junction 4000. In some exemplary embodiments, predetermined road model trajectory 4012 may be located equidistant from left side 4008 and right side 4010. It is contemplated however that predetermined road model trajectory 4012 may be located nearer to one or the other of left side 4008 and right side 4010 of road segment 4002.

In one exemplary embodiment, predetermined road model trajectory 4012 may be mathematically defined using a three-dimensional polynomial function. In some exemplary embodiments, processing unit 110 of vehicle 200 may be configured to retrieve predetermined road model trajectory 4012 from a database (e.g. 160) stored in one or more of memories 140, 150 included in vehicle 200. In other exemplary embodiments, processing unit 110 of vehicle 200 may be configured to retrieve predetermined road model trajectory 4012 from a database (e.g. 160), which may be stored remotely from vehicle 200, over a wireless communications interface. As illustrated in the exemplary embodiment of FIG. 40, predetermined road model trajectory 4012 may allow vehicle 200 to turn left from lane 4006 of road segment 4002 into lane 4014 of road segment 4004.

Image acquisition unit 120 may be configured to acquire an image representative of an environment of vehicle 200. For example, image acquisition unit 120 may obtain an image showing a view in front of vehicle 200 using one or more of image capture devices 122, 124, 126. Processing unit 110 of vehicle 200 may be configured to detect two or more landmarks 4016, 4018 in the one or more images acquired by image acquisition unit 120. Such detection may occur using the landmark detection techniques previously discussed, for example. Processing unit 110 may detect the two or more landmarks 4016, 4018 using one or more processes of landmark identification discussed above with reference to FIGS. 22-28. Although FIG. 40 illustrates two landmarks 4016, 4018, it is contemplated that vehicle 200 may detect more than two landmarks 4016, 4018 (i.e., three or more landmarks) based on the images acquired by image acquisition unit 120. For example, FIG. 40 illustrates additional landmarks 4020 and 4022, which may be detected and used by processing unit 110.

Processing unit 110 may be configured to determine positions 4024, 4026 of landmarks 4016, 4018, respectively, relative to vehicle 200. Processing unit 110 may also be configured to determine one or more directional indicators 4030, 4032 of landmarks 4016, 4018 relative to vehicle 200. Further, processing unit 110 may be configured to determine current location 4028 of vehicle 200 based on an intersection of directional indicators 4030, 4032. In one exemplary embodiment as illustrated in FIG. 40, processing unit 110 may be configured to determine current location 4028 as the intersection point of directional indicators 4030, 4032.

Processing unit 110 may be configured to determine previous location 4034 of vehicle 200. In one exemplary embodiment, processing unit 110 may repeatedly determine a location of vehicle 200 as vehicle 200 travels on road segments 4002 and 4004. Thus, for example, before vehicle 200 reaches its current location 4028, vehicle may be located at previous location 4034 and may travel from previous location 4034 to current location 4028. Before reaching current location 4028, processing unit 110 of vehicle 200 may be configured to determine positions 4024, 4026 of landmarks 4016, 4018, respectively, relative to vehicle 200. Processing unit 110 may also be configured to determine directional indicators 4036, 4038 of landmarks 4016, 4018 relative to vehicle 200. Processing unit 110 may also be configured to determine previous location 4034 of vehicle 200 based on an intersection of directional indicators 4036, 4038. In one exemplary embodiment as illustrated in FIG. 40, processing unit 110 may be configured to determine previous location 4034 as the intersection point of directional indicators 4036, 4038.

Processing unit 110 may be configured to determine a direction 4040 of predetermined road model trajectory 4012 at current location 4028 of vehicle 200. Processing unit 110 may determine direction 4040 as a direction tangential to predetermined road model trajectory 4012. In one exemplary embodiment, processing unit 110 may be configured to determine direction 4040 based on a gradient or slope of a three-dimensional polynomial representing predetermined road model trajectory 4012.

Processing unit 110 may also be configured to determine heading direction 4050 of vehicle 200. Processing unit 110 may determine heading direction 4050 based on landmarks 4016 and 4018. Processing unit 110 may determine heading direction 4050 based on current location 4028 and previous location 4034 of vehicle 200. For example, processing unit 110 may determine heading direction 4050 as a vector extending from previous location 4034 towards current location 4028. In some exemplary embodiments, processing unit 110 may determine heading direction 4050 as a direction along which image capture device 122 may be oriented relative to a local coordinate system associated with vehicle 200.

Processing unit 110 may be configured to determine whether heading direction 4050 of vehicle 200 is aligned with (i.e., generally parallel to) direction 4040 of predetermined road model trajectory 4012. When heading direction 4050 is not aligned with direction 4040 of predetermined road model trajectory 4012 at current location 4028 of vehicle 200, processing unit 110 may determine a steering angle between heading direction 4050 of vehicle 200 and direction 4040 of predetermined road model trajectory 4012. In one exemplary embodiment, processing unit 110 may also determine, for example, a reduction or acceleration in a current velocity of vehicle 200 required to help ensure that heading direction 4050 of vehicle 200 may be aligned with direction 4040 of predetermined road model trajectory 4012 in a predetermined amount of time. Processing unit 110 may be configured to execute instructions stored in navigational response module 408, for example, to transmit a control signal specifying the steering angle to steering system 240 of the vehicle. Steering system 200, in turn, may be configured to rotate wheels of vehicle 200 to help ensure that heading direction 4050 of vehicle 200 may be aligned with direction 4040 of predetermined road model trajectory 4012.

Image acquisition unit 120 may repeatedly acquire an image of the environment in front of vehicle 200, for example, after a predetermined amount of time. Processing unit 110 may also be configured to repeatedly detect landmarks 4016, 4018, 4020, 4022, etc., in the image acquired by image acquisition unit 120 and determine the steering angle as discussed above. Thus, image acquisition unit 120 and processing unit 110 may cooperate to navigate vehicle 200 through junction 400 using two or more of landmarks 4016, 4018, 4020, 4022.

Figure 41:
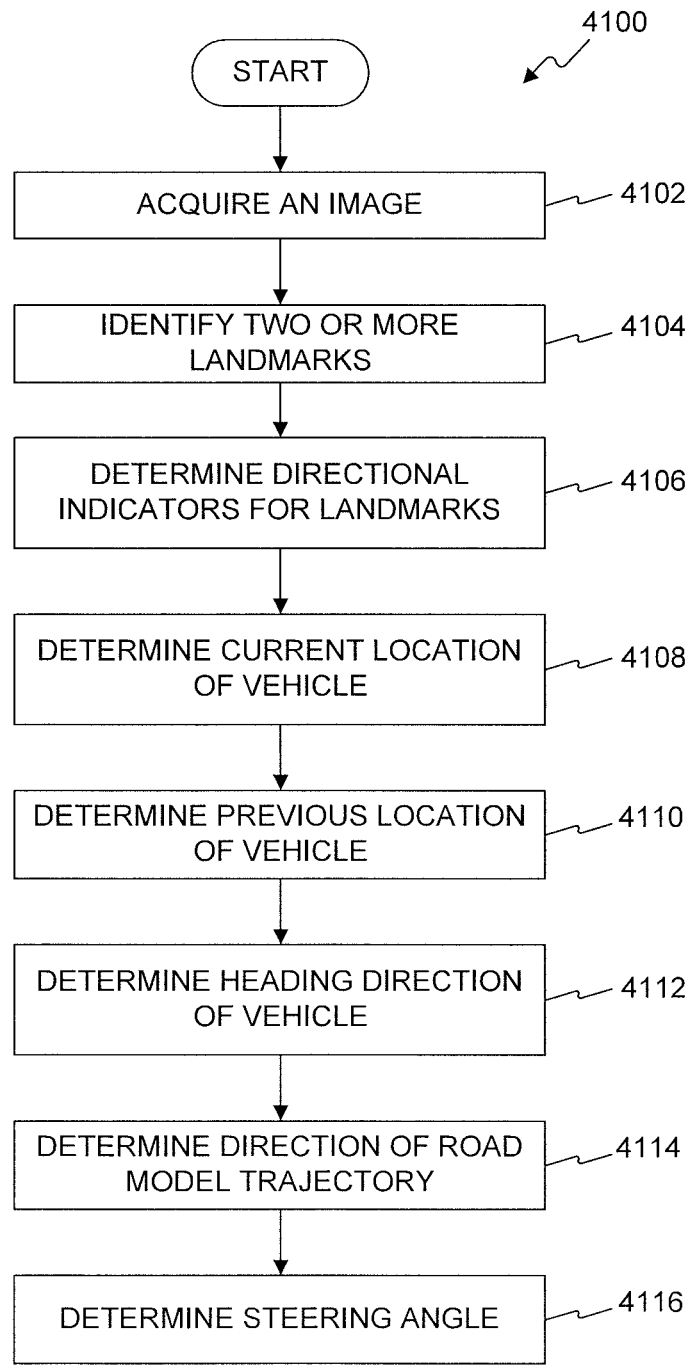
FIG. 41 is a flowchart showing an exemplary process for navigating an exemplary vehicle over road junctions using two or more landmarks.

FIG. 41 is a flowchart showing an exemplary process 4100, for navigating vehicle 200 through junction 4000, using two or more landmarks 4016, 4018, 4020, 4022, consistent with disclosed embodiments. Steps of process 4100 may be performed by one or more of processing unit 110 and image acquisition unit 120, with or without the need to access memory 140 or 150. The order and arrangement of steps in process 4100 is provided for purposes of illustration. As will be appreciated from this disclosure, modifications may be made to process 4100 by, for example, adding, combining, removing, and/or rearranging the steps for the process.

As illustrated in FIG. 41, process 4100 may include a step 4102 of acquiring an image representative of an environment of the vehicle. In one exemplary embodiment, image acquisition unit 120 may acquire one or more images of an area forward of vehicle 200 (or to the sides or rear of a vehicle, for example). For example, image acquisition unit 120 may obtain an image using image capture device 122 having a field of view 202. In other exemplary embodiments, image acquisition unit 120 may acquire images from one or more of image capture devices 122, 124, 126, having fields of view 202, 204, 206. Image acquisition unit 120 may transmit the one or more images to processing unit 110 over a data connection (e.g., digital, wired, USB, wireless, Bluetooth, etc.).

Process 4100 may also include a step 4104 of identifying two or more landmarks 4016, 4018, 4020, 4022 in the one or more images. Processing unit 110 may receive the one or more images from image acquisition unit 120. Processing unit 110 may execute monocular image analysis module 402 to analyze the plurality of images at step 4104, as described in further detail in connection with FIGS. 5B-5D. By performing the analysis, processing unit 110 may detect a set of features within the set of images, for example, two or more landmarks 4016, 4018, 4020, 4022. Landmarks 4016, 4018, 4020, 4022 may include one or more traffic signs, arrow markings, lane markings, dashed lane markings, traffic lights, stop lines, directional signs, reflectors, landmark beacons, lampposts, a change in spacing of lines on the road, signs for businesses, and the like.

In some embodiments, processing unit 110 may execute monocular image analysis module 402 to perform multi-frame analysis on the plurality of images to detect two or more landmarks 4016, 4018, 4020, 4022. For example, processing unit 110 may estimate camera motion between consecutive image frames and calculate the disparities in pixels between the frames to construct a 3D-map of the road. Processing unit 110 may then use the 3D-map to detect the road surface, as well as landmarks 4016, 4018, 4020, 4022. In another exemplary embodiment, image processor 190 of processing unit 110 may combine a plurality of images received from image acquisition unit 120 into one or more composite images. Processing unit 110 may use the composite images to detect the two or more landmarks 4016, 4018, 4020, 4022. For example, in some embodiments, processing unit 110 may perform stereo processing of images from two or more image capture devices.

Process 4100 may also include a step 4106 of determining directional indicators 4030, 4032 associated with at least two landmarks 4016, 4018, respectively. Processing unit 110 may determine directional indicators 4030, 4032 based on the positions 4024, 4026 of the at least two landmarks 4016, 4018, respectively, relative to vehicle 200. For example, processing unit 110 may receive landmark positions 4024, 4026 for landmarks 4016, 4018, respectively, from information, which may be stored in one or more databases in memory 140 or 150. Processing unit 110 may determine directional indicator 4030 as a vector extending from vehicle 200 towards landmark position 4024. Likewise, processing unit 110 may determine directional indicator 4032 as a vector extending from vehicle 200 towards landmark position 4026. Although two landmarks 4016, 4018 are referenced in the above discussion, it is contemplated that processing unit 110 may determine landmark positions 4024, 4026, and directional indicators 4030, 4032 for more than two landmarks 4016, 4018 (e.g., for landmarks 4020, 4022).

Process 4100 may include a step 4108 of determining current location 4028 of vehicle 200. Processing unit 110 may determine current location 4028 based on an intersection of directional indicators 4030 and 4032 of landmarks 4016, 4018, respectively (e.g., at an intersection point of directional indicators 4030 and 4032). Process 4100 may include a step 4110 of determining previous location 4034 of vehicle 200. As discussed above, processing unit 110 may be configured to determine previous location 4034 of vehicle 200 based on two or more landmarks 4016, 4018, 4020, 4022. In one exemplary embodiment, processing unit 110 may repeatedly determine a location of vehicle 200 using two or more landmarks 4016, 4018, 4020, 4022 as vehicle 200 moves on road segments 4002 and 4004. Thus, for example, before vehicle 200 reaches its current location 4028, vehicle may be located at previous location 4034 and may travel from previous location 4034 to current location 4028. Before reaching current location 4028, processing unit 110 of vehicle 200 may be configured to determine positions 4024, 4026 of landmarks 4016, 4018, respectively, relative to vehicle 200. Processing unit 110 may perform processes similar to those discussed above with respect to step 4108 to determine previous location 4034 of vehicle 200. For example, processing unit 110 may be configured to determine directional indicators 4036, 4038 of landmarks 4016, 4018 relative to vehicle 200. Processing unit 110 may also be configured to determine previous location 4034 of vehicle 200 based on an intersection of directional indicators 4036, 4038 (e.g. at an intersection point of directional indicators 4036 and 4038).

Process 4100 may include a step 4112 of determining heading direction 4050 of vehicle 200. As discussed above, processing unit 110 may determine heading direction 4050 based on current location 4028 and previous location 4034 of vehicle 200, both of which may be determined using two or more of landmarks 4016, 4018, 4020, 4022. In one exemplary embodiment, processing unit 110 may determine heading direction 4050 as a vector extending from previous location 4034 towards current location 4028. In another exemplary embodiment, processing unit 110 may determine heading direction 4050 as a direction along which image capture device 122 may be oriented relative to a local coordinate system associated with vehicle 200. Although only two landmarks 4016, 4018 have been described with respect to determining current location 4028 and previous location 4024 of vehicle 200, it is contemplated that processing unit may use more than two landmarks 4016, 4018 to determine current location 4028 and previous location 4024 of vehicle 200 and heading direction 4050.

Process 4100 may include a step 4114 of determining direction 4040 of predetermined road model trajectory 4012 at current location 4028 of vehicle 200. In one exemplary embodiment, processing unit 110 may obtain a mathematical representation (e.g. three-dimensional polynomial) of predetermined road model trajectory 4012. Processing unit 110 may determine direction 4040 as a vector oriented tangentially to predetermined road model trajectory 4012 at current location 4028 of vehicle 200. For example, processing unit 110 may determine direction 4040 as a vector pointing along a gradient of the mathematical representation of predetermined road model trajectory 4012 at current location 4028 of vehicle 200. Although the above description assumes that current location 4028 and previous location 4034 of vehicle 200 are located on predetermined road model trajectory 4012, processing unit 110 may perform processes similar to those discussed above with respect to FIGS. 34-39 when vehicle 200 is not located on predetermined road model trajectory 4012. For example, processing unit 110 may determine a transform required to move vehicle 200 to predetermined road model trajectory 4012 before determining direction 4040 as discussed above.

Process 4100 may also include a step 4116 of determining steering angle ☐ for vehicle 200. Processing unit 110 may also determine steering angle ☐ as an angle between heading direction 4050 and direction 4040 of predetermined road model trajectory 4012 at current location 4028 of vehicle 200. Processing unit 110 may execute instructions in navigational module 408, for example, to transmit a control signal specifying steering angle ☐ to steering system 240. Steering system 240 may help adjust, for example, a steering wheel of vehicle 200 to turn the wheels of vehicle 200 to help ensure that heading direction 4050 of vehicle 200 may be aligned (i.e., parallel) with direction 4040 of predetermined road model trajectory 4012.

Processing unit 110 and/or image acquisition unit 120 may repeat steps 4102 through 4116 after a predetermined amount of time. In one exemplary embodiment, the predetermined amount of time may range between about 0.5 seconds to 1.5 seconds. By repeatedly determining current location 4028, heading direction 4050, direction 4040 of predetermined road model trajectory 4012 at current location 4028, and steering angle ☐ required to align heading direction 4050 with direction 4040, processing unit 110 may transmit one or more control signals to one or more of throttling system 220, steering system 240, and braking system 230 to navigate vehicle 200 through road junction 4000, using two or more landmarks 4016, 4018, 4020, 4022.

Navigation Using Local Overlapping Maps

Consistent with disclosed embodiments, the system may use a plurality of local maps for navigation. Each map may have its own arbitrary coordinate frame. To ease the transition in navigating from one local map to another, the maps may include an overlap segment, and navigation in the overlap segment may be based on both of the overlapping maps.

Figure 42:
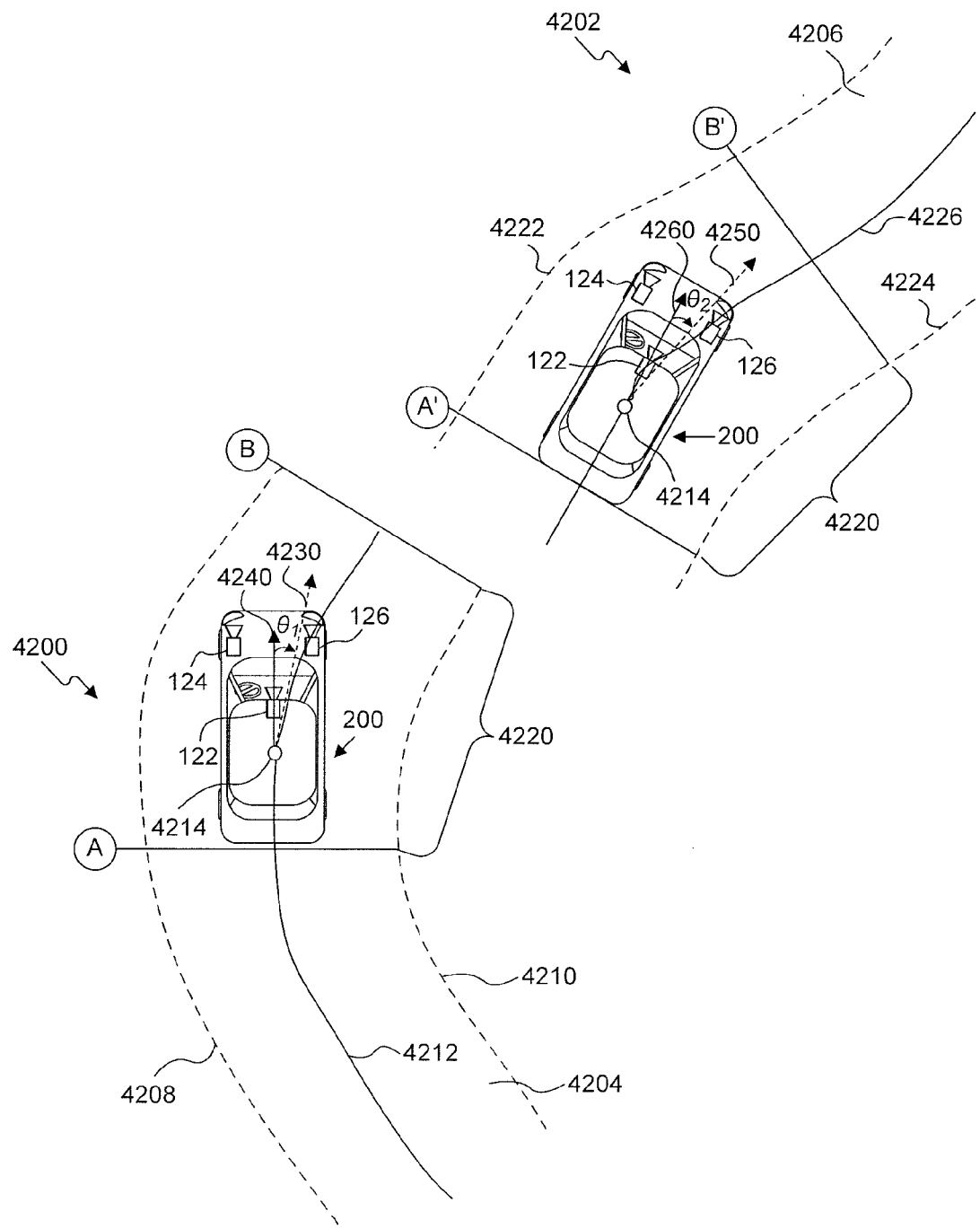
FIG. 42 is a diagrammatic top view representation of an exemplary vehicle including a system consistent with the disclosed embodiments in which the vehicle navigates using overlapping maps.

FIG. 43 illustrates first and second local maps 4200 and 4202 associated with first and second road segments 4204 and 4206, respectively. First road segment 4204 may be different from second road segment 4206. Maps 4200 and 4202 may each have their own arbitrary coordinate frame. Maps 4200 and 4202 may also each constitute a sparse map having the same or different data densities. In one exemplary embodiment, maps 4200 and 4202 may each have a data density of no more than 10 kilobytes per kilometer. Of course, local maps 4200 and 4202 may include other data density values, such as any of the data densities previously discussed relative to sparse map 800, for example. Vehicle 200 (which may be an autonomous vehicle) travelling on a first road segment 4204 and/or on second road segment 4206 may use the disclosed systems and methods for navigation. Vehicle 200 may include at least one image capture device 122, which may be configured to obtain one or more images representative of an environment of the autonomous vehicle. Although FIG. 42 depicts vehicle 200 as equipped with image capture devices 122, 124, 126, more or fewer image capture devices may be employed on any particular vehicle 200. As illustrated in FIG. 42, map 4200 may include road segment 4204, which may be delimited by left side 4208 and right side 4210. A predetermined road model trajectory 4212 may define a preferred path (i.e., a target road model trajectory) within road segment 4204. Predetermined road model trajectory 4212 may be mathematically represented by a three-dimensional polynomial. Vehicle 200 may follow predetermined road model trajectory 4212 as vehicle 200 travels along road segment 4204. In some exemplary embodiments, predetermined road model trajectory 4212 may be located equidistant from left side 4208 and right side 4210. It is contemplated however that predetermined road model trajectory 4212 may be located nearer to one or the other of left side 4208 and right side 4210 of road segment 4204. As also illustrated in FIG. 42, a portion of road segment 4204 between delimiting points A and B may represent an overlap segment 4220. As will be described later, overlap segment 4220 between positions A and B of road segment 4204 may overlap with a portion of road segment 4206. Further, although FIG. 42 illustrates one lane in road segment 4204, it is contemplated that road segment 4204 may have any number of lanes. It is also contemplated that vehicle 200 travelling along any lane of road segment 4204 may be navigated according to the disclosed methods and systems. Further, in some embodiments, a road segment may extend between two known locations such as, for example, two intersections.

As also illustrated in FIG. 42, map 4202 may include road segment 4206, which may be delimited by left side 4222 and right side 4224. A predetermined road model trajectory 4226 may define a preferred path (i.e., a target road model trajectory) within road segment 4206. Predetermined road model trajectory 4226 may be mathematically represented by a three-dimensional polynomial. Vehicle 200 may follow predetermined road model trajectory 4226 as vehicle 200 travels along road segment 4206. In some exemplary embodiments, predetermined road model trajectory 4226 may be located equidistant from left side 4222 and right side 4224. It is contemplated however that predetermined road model trajectory 4226 may be located nearer to one or the other of left side 4222 and right side 4224 of road segment 4206. As also illustrated in FIG. 42, a portion of road segment 4206 between delimiting points A' and B' may represent overlap segment 4220, which may overlap with overlap segment 4220 between delimiting points A and B of road segment 4204. Although FIG. 42 illustrates one lane in road segment 4206, it is contemplated that road segment 4206 may have any number of lanes. It is also contemplated that vehicle 200 travelling along any lane of road segment 4206 may be navigated according to the disclosed methods and systems.

As used in this disclosure, the term overlap indicates that overlap segment 4220 represents the same portion of the road that may be travelled on by vehicle 200. In some embodiments, an overlap segment 4220 may include a segment of map 4200 that represents a road segment and associated road features (such as landmarks, etc.) that are also represented by a corresponding segment (i.e., the overlap segment) of map 4222. As a result, overlap segment 4220 may include portions of road segments 4204, 4206 having the same size (length, width, height, etc.), shapes (orientation and inclination, etc.), etc. Moreover, the shapes and lengths of predetermined road model trajectories 4212 and 4226 in the overlap segment 4220 may be similar. However, because maps 4200 and 4202 may have different local coordinate systems, the mathematical representations (e.g., three-dimensional polynomials) of predetermined road model trajectories 4212 and 4226 may differ in the overlap segment 4220. In one exemplary embodiment, overlap segment 4220 may have a length ranging between 50 m and 150 m.

Image acquisition unit 120 may be configured to acquire an image representative of an environment of vehicle 200. For example, image acquisition unit 120 may obtain an image showing a view in front of vehicle 200 using one or more of image capture devices 122, 124, 126. Processing unit 110 of vehicle 200 may be configured to detect a current location 4214 of vehicle 200 using one or more navigational processes discussed above with reference to FIGS. 34-36. Processing unit 110 may also be configured to determine whether current position 4214 of vehicle 200 lies on road segment 4204 or 4206 using one or more processes of determining intersection points of directional vectors for recognized landmarks with one or more of predetermined road model trajectories 4212 and 4226 as discussed above with reference to FIGS. 34-36. Furthermore, processing unit 110 may be configured to determine whether current location 4214 of vehicle 200 lies on road segment 4204, road segment 4206, or in the overlap segment 4220, using similar processes discussed above with reference to FIGS. 34-36.

When vehicle 200 is located on road segment 4204, processing unit 110 may be configured to align a local coordinate system of vehicle 200 with a local coordinate system associated with road segment 4204. After aligning the two coordinate systems, processing unit 110 may be configured to determine a direction 4230 of predetermined road model trajectory 4212 at current location 4214 of vehicle 200. Processing unit 110 may determine direction 4230 as a direction tangential to predetermined road model trajectory 4212. In one exemplary embodiment, processing unit 110 may be configured to determine direction 4230 based on a gradient or slope of a three-dimensional polynomial representing predetermined road model trajectory 4212.

Processing unit 110 may also be configured to determine heading direction 4240 of vehicle 200. As illustrated in FIG. 42, heading direction 4240 of vehicle 200 may be a direction along which image capture device 122 may be oriented relative to the local coordinate system associated with vehicle 200. Processing unit 110 may be configured to determine whether heading direction 4240 of vehicle 200 is aligned with (i.e., generally parallel to) direction 4230 of predetermined road model trajectory 4212. When heading direction 4240 is not aligned with direction 4230 of predetermined road model trajectory 4212 at current location 4214 of vehicle 200, processing unit 110 may determine a first autonomous navigational response (ANR) that may help ensure that heading direction 4240 of vehicle 200 may be aligned with direction 4230 of predetermined road model trajectory 4212.

In one exemplary embodiment, first ANR may include, for example, a determination of an angle by which the steering wheel or front wheels of vehicle 200 may be turned to help ensure that heading direction 4240 of vehicle 200 may be aligned with direction 4230 of predetermined road model trajectory 4212. In another exemplary embodiment, first autonomous navigational response may also include a reduction or acceleration in a current velocity of vehicle 200 to help ensure that heading direction 4240 of vehicle 200 may be aligned with direction 4230 of predetermined road model trajectory 4212 in a predetermined amount of time. Processing unit 110 may be configured to execute instructions stored in navigational response module 408 to trigger first ANR by, for example, turning the steering wheel of vehicle 200 to achieve a rotation of an angle 1. Rotation by angle 1 may help align heading direction 4240 of vehicle 200 with direction 4230.

When vehicle 200 is located on road segment 4206, processing unit 110 may be configured to align a local coordinate system of vehicle 200 with a local coordinate system associated with road segment 4206. After aligning the two coordinate systems, processing unit 110 may be configured to determine a direction 4250 of predetermined road model trajectory 4226 at current location 4214 of vehicle 200. Processing unit 110 may determine direction 4250 as a direction tangential to predetermined road model trajectory 4226. In one exemplary embodiment, processing unit 110 may be configured to determine direction 4250 based on a gradient or slope of a three-dimensional polynomial representing predetermined road model trajectory 4226.

Processing unit 110 may also be configured to determine heading direction 4260 of vehicle 200. As illustrated in FIG. 42, heading direction 4260 of vehicle 200 may be a direction along which image capture device 122 may be oriented relative to the local coordinate system associated with vehicle 200. Processing unit 110 may be configured to determine whether heading direction 4260 of vehicle 200 is aligned with (i.e., generally parallel to) direction 4250 of predetermined road model trajectory 4226. When heading direction 4260 is not aligned with direction 4250 of predetermined road model trajectory 4226 at current location 4214 of vehicle 200, processing unit 110 may determine a second ANR that may help ensure that heading direction 4260 of vehicle 200 may be aligned with direction 4250 of predetermined road model trajectory 4226.

In one exemplary embodiment, the second ANR may include, for example, a determination of an angle 2 by which the steering wheel or front wheels of vehicle 200 may be turned to help ensure that heading direction 4260 of vehicle 200 may be aligned with direction 4250 of predetermined road model trajectory 4226. In another exemplary embodiment, the second ANR may also include a reduction or acceleration in a current velocity of vehicle 200 to help ensure that heading direction 4260 of vehicle 200 may be aligned with direction 4250 of predetermined road model trajectory 4226 in a predetermined amount of time. Processing unit 110 may be configured to execute instructions stored in navigational response module 408 to trigger second ANR by, for example, turning the steering wheel of vehicle 200 to achieve a rotation of angle 2. Rotation by angle 2 may help align heading direction 4260 of vehicle 200 with direction 4250.

When vehicle 200 is located on overlap segment 4220 of road segments 4204, 4206, processing unit 110 may be configured to align the local coordinate system of vehicle 200 with both the local coordinate system associated with road segment 4204 as well as the local coordinate system associated with road segment 4206. Thus, processing unit 110 may be configured to determine a third ANR based on both maps 4200 and 4202. In one exemplary embodiment, processing unit 110 may determine the third ANR as an angle 3 by which the steering wheel or front wheels of vehicle 200 may be turned to help ensure that heading direction 4240 of vehicle 200 may be aligned with heading direction 4230 of predetermined road model trajectory, and heading direction 4260 of vehicle 200 may be aligned with direction 4250 of predetermined road model trajectory 4226. Thus, for example, processing unit 110 may determine angle $\square_3$ as a combination of angles 1 and 2.

Image acquisition unit 120 may repeatedly acquire an image of the environment in front of vehicle 200, for example, after a predetermined amount of time. Processing unit 110 may also be configured to repeatedly detect whether current location 4214 of vehicle 200 lies on road segment 4204, road segment 4206, or in overlap segment 4220. Processing unit 110 may determine first, second, or third ANR (e.g., angles 1, 2, or 3) based on where vehicle 200 is located on road segments 4204, 4206. Thus, image acquisition unit 120 and processing unit 110 may cooperate to navigate vehicle 200 along road segments 4204 and 4206 using overlap segment 4220.

Figure 43A:
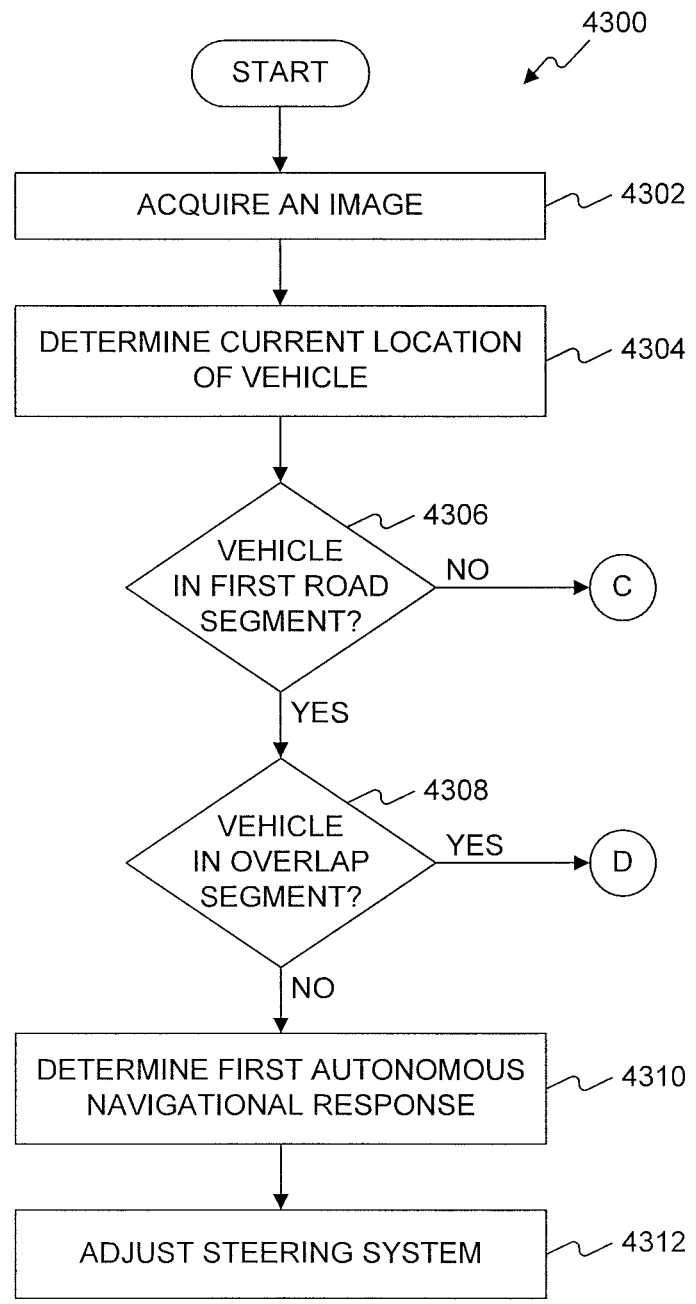
FIGS. 43A, 43B, and 43C are flowcharts showing an exemplary process for navigating an exemplary vehicle using overlapping maps.
Figure 43B:
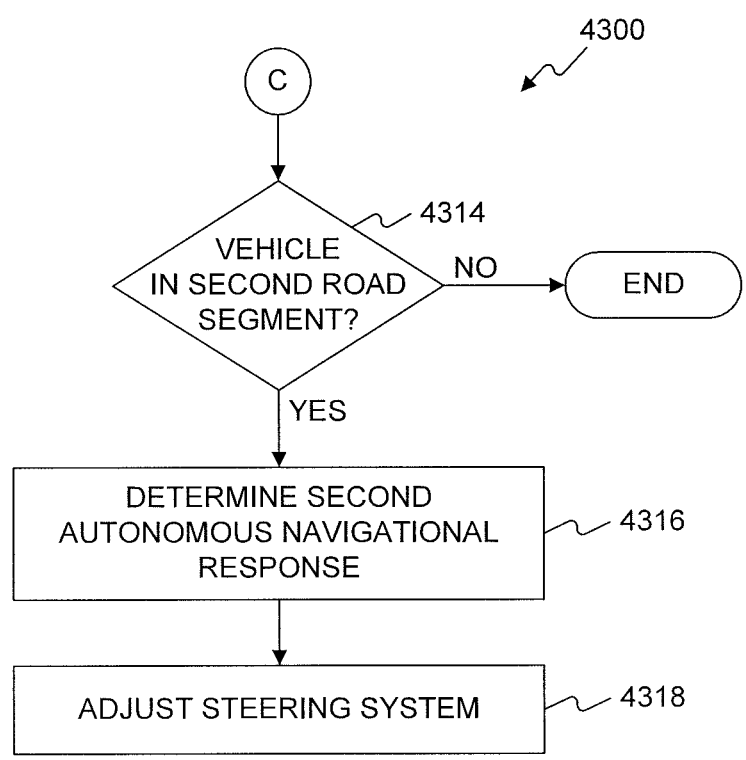
Figure 43C:
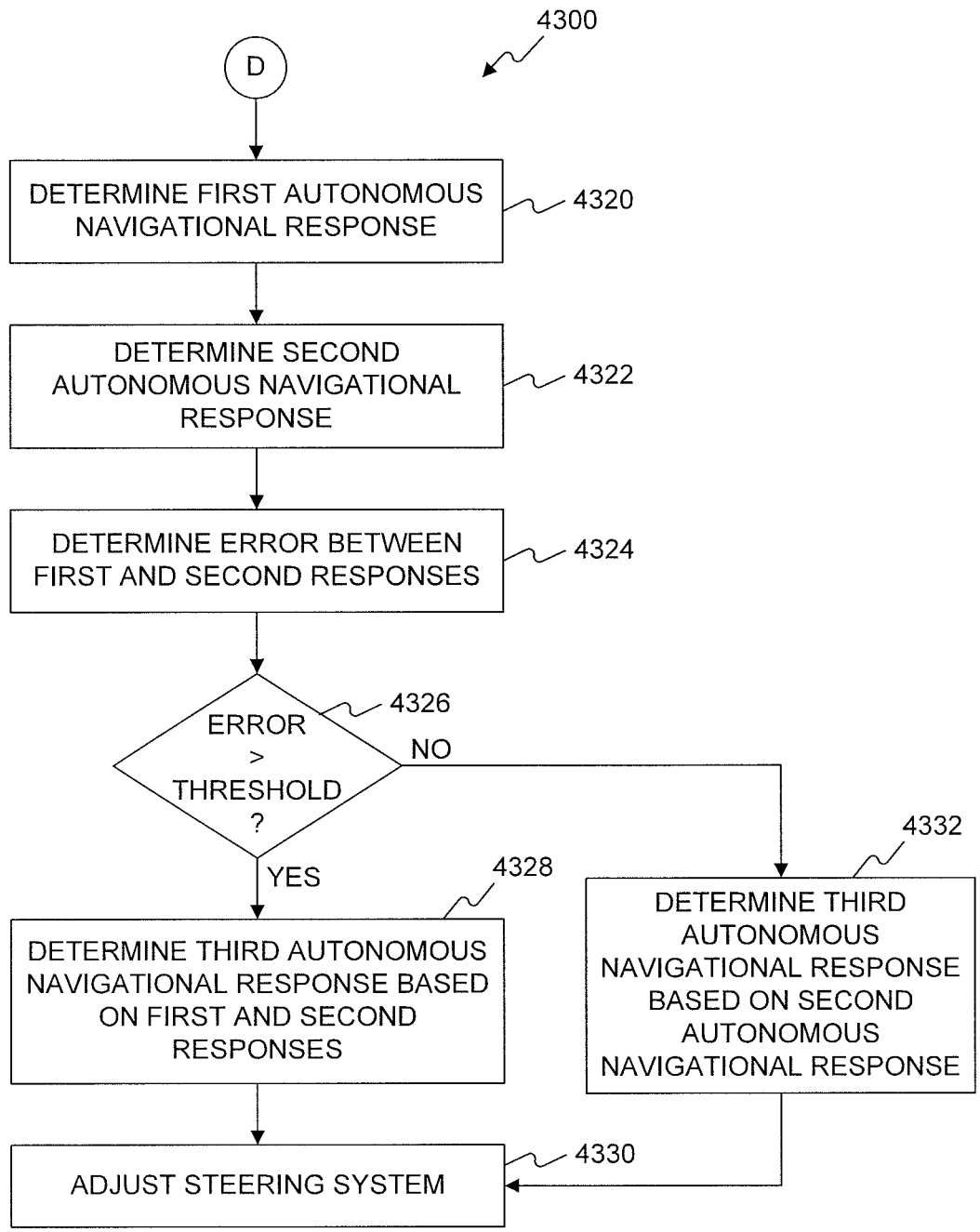

FIGS. 43A-C include flowcharts showing an exemplary process 4300, for navigating vehicle 200 along road segments 4204, 4206, using overlapping maps 4200, 4202, consistent with disclosed embodiments. Steps of process 4300 may be performed by one or more of processing unit 110 and image acquisition unit 120, with or without the need to access memory 140 or 150. The order and arrangement of steps in process 4300 is provided for purposes of illustration. As will be appreciated from this disclosure, modifications may be made to process 4300 by, for example, adding, combining, removing, and/or rearranging the steps of process 4300.

As illustrated in FIG. 43A, process 4300 may include a step 4302 of acquiring an image representative of an environment of the vehicle. In one exemplary embodiment, image acquisition unit 120 may acquire one or more images of an area forward of vehicle 200 (or to the sides or rear of a vehicle, for example). For example, image acquisition unit 120 may obtain an image using image capture device 122 having a field of view 202. In other exemplary embodiments, image acquisition unit 120 may acquire images from one or more of image capture devices 122, 124, 126, having fields of view 202, 204, 206. Image acquisition unit 120 may transmit the one or more images to processing unit 110 over a data connection (e.g., digital, wired, USB, wireless, Bluetooth, etc.).

Process 4300 may also include a step 4302 of determining current location 4214 of vehicle 200. Processing unit 110 may receive the one or more images from image acquisition unit 120. Processing unit 110 may execute monocular image analysis module 402 to analyze the plurality of images at step 4302, as described in further detail in connection with FIGS. 5B-5D. By performing the analysis, processing unit 110 may detect a set of features within the set of images, for example, one or more landmarks. Processing unit 110 may use the landmarks and perform processes similar to those discussed above, for example, in FIGS. 34-36 to determine current location 4214 of vehicle 200.

Process 4300 may include a step 4306 of determining whether vehicle 200 is located on first road segment 4304. Processing unit 110 may determine whether vehicle 200 is located on first road segment 4304 in many ways. For example, processing unit may compare its current location 4214 determined in, for example, step 4304 with predetermined road model trajectory 4212 to determine whether current position 4214 is located on predetermined road model trajectory 4212. Processing unit may determine that vehicle 200 is located on first road segment 4304 when current position 4214 is located on predetermined road model trajectory 4212. In another exemplary embodiment, processing unit 110 may use landmarks and directional indicators for the landmarks to determine whether a current position 4214 of vehicle 200 is located on road segment 4204. For example, as discussed above with respect to FIGS. 34-36, if a directional indicator of a recognized landmark intersects with predetermined road model trajectory 4212 (discussed above, e.g., in relation to FIGS. 34-36), processing unit 110 may determine that current location 4214 of vehicle 200 lies in road segment 4204. When processing unit 110 determines that vehicle 200 is located in road segment 4204 (Step 4306: Yes), processing unit 110 may proceed to step 4308. When processing unit 110 determines, however, that vehicle 200 is not located on road segment 4204 (Step 4306: No), processing unit 110 may proceed to step 4314 via process segment C.

In step 4308, processing unit 110 may determine whether vehicle 200 is located in overlap segment 4220. Processing unit 110 may use processes similar to those discussed above with respect to step 4306 to determine whether vehicle 200 is located in overlap segment 4220. For example, processing unit 110 may determine whether a direction indicator corresponding to a recognized landmark intersects predetermined road model trajectory 4212 in the portion of predetermined road model trajectory 4212 located between A and B in overlap segment 4220. In another exemplary embodiment, processing unit 110 may compare current location 4214 of vehicle 200 with the mathematical representation of predetermined road model trajectory 4212 to determine whether vehicle 200 is located in overlap segment 4220. In yet another exemplary embodiment, processing unit 110 may determine a distance travelled by vehicle 200 along predetermined road model trajectory 4212 in first road segment 4204. Processing unit may determine the distance travelled using processes similar to those discussed above with respect to FIGS. 37-39 regarding navigation using tail alignment. Processing unit 110 may determine whether current location 4214 of vehicle 200 lies in overlap segment 4220 based on the distance travelled by vehicle 200. When processing unit 110 determines that vehicle 200 is located within overlap segment 4220 (Step 4308: Yes), processing unit 110 may proceed to step 4320 via process segment D. When processing unit 110 determines, however, that vehicle 200 is not located within overlap segment 4220 (Step 4308: No), processing unit 110 may proceed to step 4310.

Process 4300 may include a step 4310 of determining first ANR. Processing unit 110 may determine first ANR based on its determination that vehicle 200 is located in first road segment 4204 but not in overlap segment 4220. In one exemplary embodiment, processing unit 110 may obtain a mathematical representation (e.g. three-dimensional polynomial) of predetermined road model trajectory 4212. Processing unit 110 may determine direction 4230 of predetermined road model trajectory 4212 as a vector oriented tangentially to predetermined road model trajectory 4212 at current location 4214 of vehicle 200. For example, processing unit 110 may determine direction 4230 as a vector pointing along a gradient of the mathematical representation of predetermined road model trajectory 4212 at current location 4214. Although the above description assumes that current location 4214 of vehicle 200 is located on predetermined road model trajectory 4212, processing unit 110 may perform processes similar to those discussed above with respect to FIGS. 34-39 when vehicle 200 is not located on predetermined road model trajectory 4212. For example, processing unit may determine a transform required to move vehicle 200 to predetermined road model trajectory 4212 before determining direction 4230 as discussed above.

Processing unit 110 may also determine a heading direction 4240 of vehicle 200. For example, as illustrated in FIG. 42, processing unit 110 may determine heading direction 4240 of vehicle 200 as the direction in which image capture device 122 may be oriented relative to a local coordinate system associated with vehicle 200. In another exemplary embodiment, processing unit 200 may determine heading direction 4240 as the direction of motion of vehicle 200 at current location 4214. In yet another exemplary embodiment, processing unit may determine heading direction 4240 based on a travelled trajectory as discussed above with respect to FIGS. 37-39. Processing unit 110 may determine a rotational angle $\square_1$ between heading direction 4240 and direction 4230 of predetermined road model trajectory 4212. In one exemplary embodiment, first ANR may include rotation angle 1 that may help ensure that heading direction 4240 of vehicle 200 may be aligned with direction 4230 of predetermined road model trajectory 4212. In another exemplary embodiment, first ANR may also include accelerations or decelerations of vehicle 200 that may be required to help ensure that heading direction 4240 of vehicle 200 may be aligned with direction 4230 of predetermined road model trajectory 4212 in a predetermined amount of time.

Process 4300 may also include a step 4312 of adjusting steering system 240 based on first ANR. Processing unit 110 may be configured to execute instructions stored in navigational response module 408 to trigger first ANR by, for example, turning the steering wheel of vehicle 200 to achieve a rotation of angle 1. Processing unit 110 may also execute instructions stored in navigational response module 408 to control throttling system 220 and/or braking system 230 to appropriately control a speed of vehicle 200 to help ensure that heading direction 4240 of vehicle 200 may be aligned with direction 4230 of predetermined road model trajectory 4212 in a predetermined amount of time.

Returning to step 4306, when processing unit 110 determines that vehicle 200 is not located on road segment 4204 (Step 4306: No), processing unit 110 may proceed to step 4314 via process segment C. In step 4314, processing unit 110 may determine whether vehicle 200 is located in road segment 4206. Processing unit 110 may perform operations similar to those discussed above in step 4306 to determine whether vehicle 200 is located in road segment 4206. When processing unit 110 determines that vehicle 200 is not located in road segment 4206, process 4300 may end. When processing unit 110 determines, however, that vehicle 200 is located in road segment 4206, processing unit 100 may proceed to step 4316 of determining second ANR.

Processing unit 110 may determine second ANR using processes similar to those discussed above with respect to step 4310. For example, processing unit 110 may determine a direction 4250 of predetermined road model trajectory 4226 at current location 4214 of vehicle 200, a heading direction 4260, and an angle of rotation 2, which may help ensure that heading direction 4260 of vehicle 200 may be aligned with direction 4250. Further, like first ANR, second ANR may also include accelerations or decelerations of vehicle 200 that may be required to help ensure that heading direction 4260 of vehicle 200 may be aligned with direction 4250 of predetermined road model trajectory 4226 in a predetermined amount of time.

Process 4300 may also include a step 4318 of adjusting steering system 240 based on second ANR. Processing unit 110 may be configured to execute instructions stored in navigational response module 408 to trigger second ANR by, for example, turning the steering wheel of vehicle 200 to achieve a rotation of angle 2. Processing unit 110 may also execute instructions stored in navigational response module 408 to control throttling system 220 and/or braking system 230 to appropriately control a speed of vehicle 200 to help ensure that heading direction 4260 of vehicle 200 may be aligned with direction 4250 of predetermined road model trajectory 4226 in a predetermined amount of time.

Returning to step 4308, when processing unit 110 determines that vehicle 200 is located on overlap segment 4220 (Step 4308: Yes), processing unit 110 may proceed to step 4320 via process segment D. In step 4320, processing unit 110 may determine first ANR. Processing unit 110 may determine first ANR using operations similar to those discussed above with respect to step 4310. Thus, for example, processing unit may determine a direction 4240 of predetermined road model trajectory 4212 at current location 4214 of vehicle 200, a heading direction 4230, and an angle of rotation 1, which may help ensure that heading direction 4240 of vehicle 200 may be aligned with direction 4230. Further, first ANR may also include accelerations or decelerations of vehicle 200 that may be required to help ensure that heading direction 4240 of vehicle 200 may be aligned with direction 4230 of predetermined road model trajectory 4212 in a predetermined amount of time.

Process 4300 may also include a step 4322 of determining a second ANR. Processing unit 110 may determine second ANR using operations similar to those discussed above with respect to step 4316. Thus, for example, processing unit may determine a direction 4260 of predetermined road model trajectory 4226 at current location 4214 of vehicle 200, a heading direction 4250, and an angle of rotation 2, which may help ensure that heading direction 4260 of vehicle 200 may be aligned with direction 4250. Further, second ANR may also include accelerations or decelerations of vehicle 200 that may be required to help ensure that heading direction 4260 of vehicle 200 may be aligned with direction 4250 of predetermined road model trajectory 4226 in a predetermined amount of time.

Process 4300 may also include a step 4324 of determining an error between first ANR and second ANR. In one exemplary embodiment, processing unit 110 may determine the error as an error between angles of rotation 1 and 2 determined, for example, in steps 4320 and 4322. In another exemplary embodiment, processing unit 110 may determine the error as an error between direction 4230 of predetermined road model trajectory 4212 and direction 4250 of predetermined road model trajectory 4226. In another exemplary embodiment, processing unit 110 may determine the error as a cosine distance between directions 4230 and 4250. One of ordinary skill in the art would recognize that processing unit 110 may use other mathematical functions to determine the error between directions 4230 and 4250.

Process 4300 may also include a step 4326 of determining whether the error is less than a threshold error. Because processing unit 110 may perform step 4324 only when vehicle 200 is located in overlap segment 4220, the error may indicate whether the co-ordinate frame of vehicle 200 is aligned with both road segments 4204 and 4206. It is contemplated that in some embodiments when vehicle 200 first enters overlap segment 4220, the error may exceed the threshold error and navigating vehicle 200 based on both navigational maps 4200 and 4202 may improve accuracy. As vehicle 200 travels further within overlap segment 4220, the error may decrease and may eventually become less than the threshold error. When the co-ordinate frame of vehicle 200 is aligned with both road segments 4204 and 4206, the error may be smaller than the threshold error and it may be sufficient to start navigating vehicle 200 based only on navigational map 4202.

When processing unit 110 determines that the error is greater than the threshold error (Step 4326: Yes), processing unit 110 may proceed to step 4328. In step 4328, processing unit 110 may determine third ANR based on both the first ANR and the second ANR so that vehicle 200 may be navigated based on both maps 4200 and 4202. Thus, for example, processing unit 110 may determine a third angle of rotation 3 as a combination of angles of rotation 1 and 2 determined, for example, in steps 4320 and 4322. In some exemplary embodiments, the combination may be an average, a weighted average, or some other mathematical combination of angles of rotation 1 and 2. Likewise, processing unit 110 may determine accelerations or decelerations for vehicle 200 based on a combination of the accelerations and/or decelerations determined, for example, in steps 4320 and 4322.

Process 4300 may also include a step 4330 of adjusting steering system 240 based on third ANR. Processing unit 110 may be configured to execute instructions stored in navigational response module 408 to trigger third ANR by, for example, turning the steering wheel of vehicle 200 to achieve a rotation of angle 3. Processing unit 110 may also execute instructions stored in navigational response module 408 to control throttling system 220 and/or braking system 230 based on the accelerations and/or decelerations determined in steps 4330 or 4332.

Returning to step 4326, when processing unit 110 determines that the error is less than the threshold error (Step 4326: No), processing unit 110 may proceed to step 4332 of determining the third ANR based only on the second ANR. As discussed above, when the error is less than the threshold error, it may be sufficient to navigate vehicle 200 based only on map 4202. Thus, in one exemplary embodiment, processing unit 110 may set third ANR equal to second ANR. In another exemplary embodiment, processing unit 110 may set third ANR by scaling (i.e. magnifying or attenuating) second ANR using a scaling factor. After completing step 4332, processing unit 110 may proceed to step 4330 of adjusting steering system 240 based on third ANR.

Processing unit 110 and/or image acquisition unit 120 may repeat process 4300 after a predetermined amount of time. In one exemplary embodiment, the predetermined amount of time may range between about 0.5 seconds to 1.5 seconds. By repeatedly determining a current location 4214 of vehicle 200, determining whether current location 4214 lies in overlap segment 4220, and determining first ANR, second ANR, and third ANR based on the location of vehicle 200, processing unit 110 and/or image acquisition unit 120 may help to navigate vehicle 200, using overlapping road segment 4220 of local maps 4200, 4202.

Sparse Map Autonomous Vehicle Navigation

In some embodiments, the disclosed systems and methods may use a sparse map for autonomous vehicle navigation. As discussed above regarding FIGS. 8-11D, the sparse map may provide sufficient information for navigation without requiring excessive data storage or data transfer rates. Further, a vehicle (which may be an autonomous vehicle) may use the sparse map to navigate one or more roads. For example, as discussed below in further detail, vehicle 200 may determine an autonomous navigational response based on analysis of the sparse map and at least one image representative of an environment of vehicle 200.

In some embodiments, vehicle 200 may access a sparse map that may include data related to a road on which vehicle 200 is traveling and potentially landmarks along the road that may be sufficient for vehicle navigation. As described in sections above, the sparse data maps accessed by vehicle 200 may require significantly less storage space and data transfer bandwidth as compared with digital maps including detailed map information, such as image data collected along a road. For example, rather than storing detailed representations of a road segment on which vehicle 200 is traveling, the sparse data map may store three dimensional polynomial representations of preferred vehicle paths along the road. A polynomial representation of a preferred vehicle path along the road may be a polynomial representation of a target trajectory along a road segment. These paths may require very little data storage space.

Consistent with disclosed embodiments, an autonomous vehicle system may use a sparse map for navigation. As discussed earlier, at the core of the sparse maps, one or more three-dimensional contours may represent predetermined trajectories that autonomous vehicles may traverse as they move along associated road segments. As also discussed earlier, the sparse maps may also include other features, such as one or more recognized landmarks, road signature profiles, and any other road-related features useful in navigating a vehicle.

In some embodiments, an autonomous vehicle may include a vehicle body and a processor configured to receive data included in a sparse map and generate navigational instructions for navigating the vehicle along a road segment based on the data in the sparse map.

As discussed above in connection with FIG. 8, vehicle 200 (which may be an autonomous vehicle) may access sparse map 800 to navigate. As shown in FIG. 8, in some embodiments, sparse map 800 may be stored in a memory, such as memory 140 or 150. For example, sparse map 800 may be stored on a storage device or a non-transitory computer-readable medium provided onboard vehicle 200 (e.g., a storage device included in a navigation system onboard vehicle 200). A processor (e.g., processing unit 110) provided on vehicle 200 may access sparse map 4400 stored in the storage device or computer-readable medium provided onboard vehicle 200 in order to generate navigational instructions for guiding the autonomous vehicle 200 as it traverses a road segment.

Figure 44:
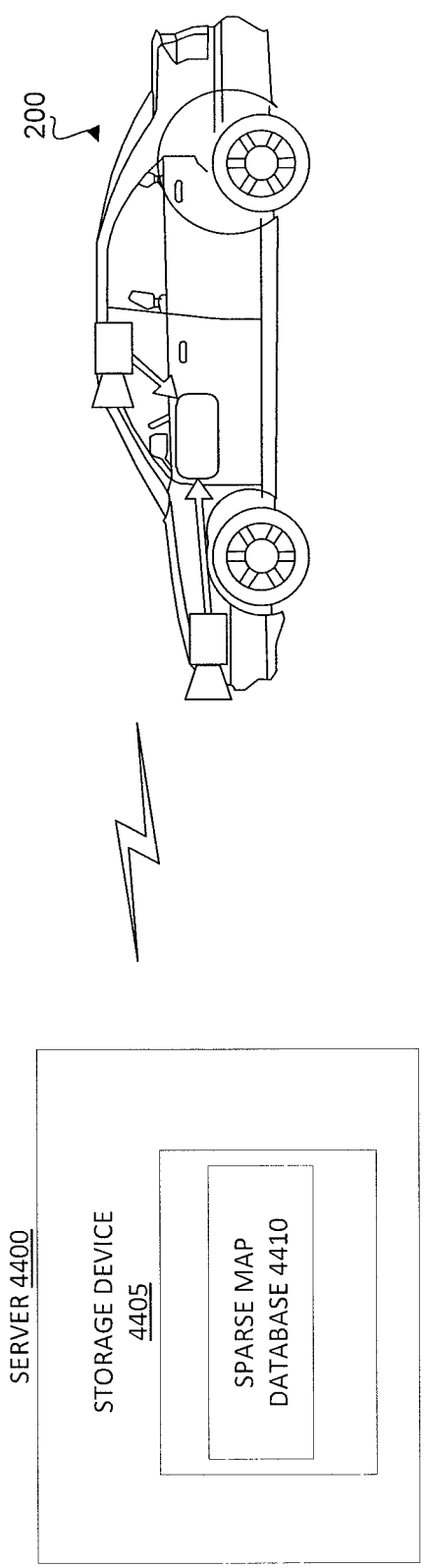
FIG. 44 shows an exemplary remote server in communication a vehicle, consistent with the disclosed embodiments.

In some embodiments, sparse map 800 may be stored remotely. FIG. 44 shows an example of vehicle 200 receiving data from a remote server 4400, consistent with disclosed embodiments. As shown in FIG. 44, remote server 4400 may include a storage device 4405 (e.g., a computer-readable medium) provided on remote server 4400 that communicates with vehicle 200. For example, remote server 4400 may store a sparse map database 4410 in storage device 4405. Sparse map database 4410 may include sparse map 800. In some embodiments, sparse map database 4410 may include a plurality of sparse maps. Sparse map database 4410 may be indexed based on certain regions (e.g., based on geographical boundaries, country boundaries, state boundaries, etc.) or based on any appropriate parameter (e.g., type or size of vehicle, climate, etc.). Vehicle 200 may communicate with remote server 440 via one or more networks (e.g., over a cellular network and/or the Internet, etc.) through a wireless communication path. In some embodiments, a processor (e.g., processing unit 110) provided on vehicle 200 may receive data included in sparse map database 4410 over one or more networks from remove server 4400. Furthermore, vehicle 200 may execute instructions for navigating vehicle 200 using sparse map 800, as discussed below in further detail.

As discussed above in reference to FIG. 8, sparse map 800 may include representations of a plurality of target trajectories 810 for guiding autonomous driving or navigation along a road segment. Such target trajectories may be stored as three-dimensional splines. The target trajectories stored in sparse map 800 may be determined based on two or more reconstructed trajectories of prior traversals of vehicles along a particular road segment. A road segment may be associated with a single target trajectory or multiple target trajectories. For example, on a two lane road, a first target trajectory may be stored to represent an intended path of travel along the road in a first direction, and a second target trajectory may be stored to represent an intended path of travel along the road in another direction (e.g., opposite to the first direction). Additional target trajectories may be stored with respect to a particular road segment.

Sparse map 800 may also include data relating to a plurality of predetermined landmarks 820 associated with particular road segments, local maps, etc. As discussed in detail in other sections, these landmarks may be used in navigation of vehicle 200. For example, in some embodiments, the landmarks may be used to determine a current position of vehicle 200 relative to a stored target trajectory. With this position information, vehicle 200 may be able to adjust a heading direction to match a direction of the target trajectory at the determined location.

Landmarks may include, for example, any identifiable, fixed object in an environment of at least one road segment or any observable characteristic associated with a particular section of a particular road segment. In some cases, landmarks may include traffic signs (e.g., speed limit signs, hazard signs, etc.). In other cases, landmarks may include road characteristic profiles associated with a particular section of a road segment. Further examples of various types of landmarks are discussed in previous sections, and some landmark examples are shown and discussed above in connection with FIG. 10.

Figure 45:
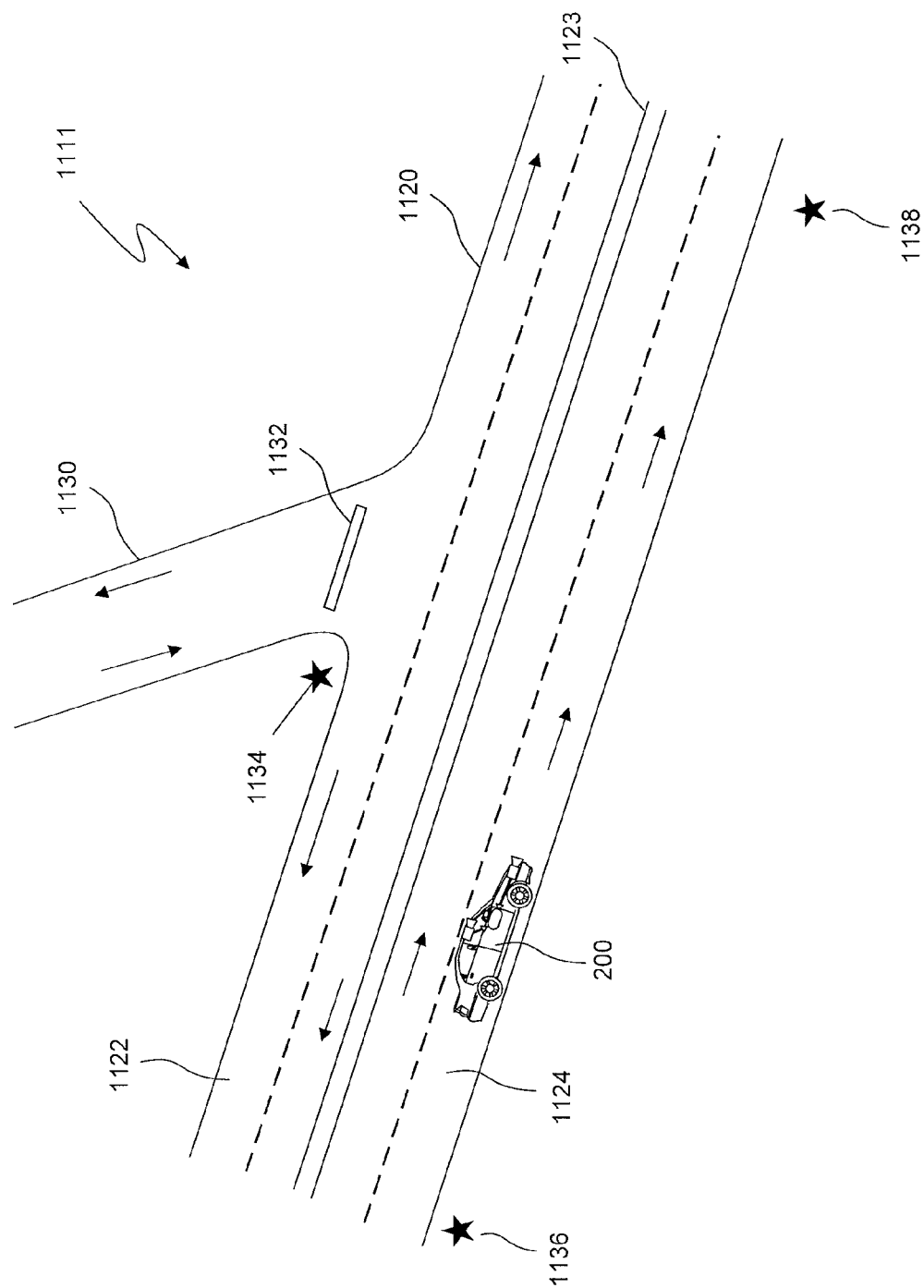
FIG. 45 shows a vehicle navigating along a multi-lane road, consistent with disclosed embodiments.

FIG. 45 shows vehicle 200 navigating along a multi-lane road consistent with disclosed embodiments. Here, a vehicle 200 may navigate road segments present within a geographic region 1111 shown previously in FIG. 11B. As previously discussed in relation to FIG. 11B, road segment 1120 may include a multilane road with lanes 1122 and 1124, double yellow line 1123, and branching road segment 1130 that intersects with road segment 1120. Geographic region 1111 may also include other road features, such as a stop line 1132, a stop sign 1134, a speed limit sign 1136, and a hazard sign 1138.

Figure 46:
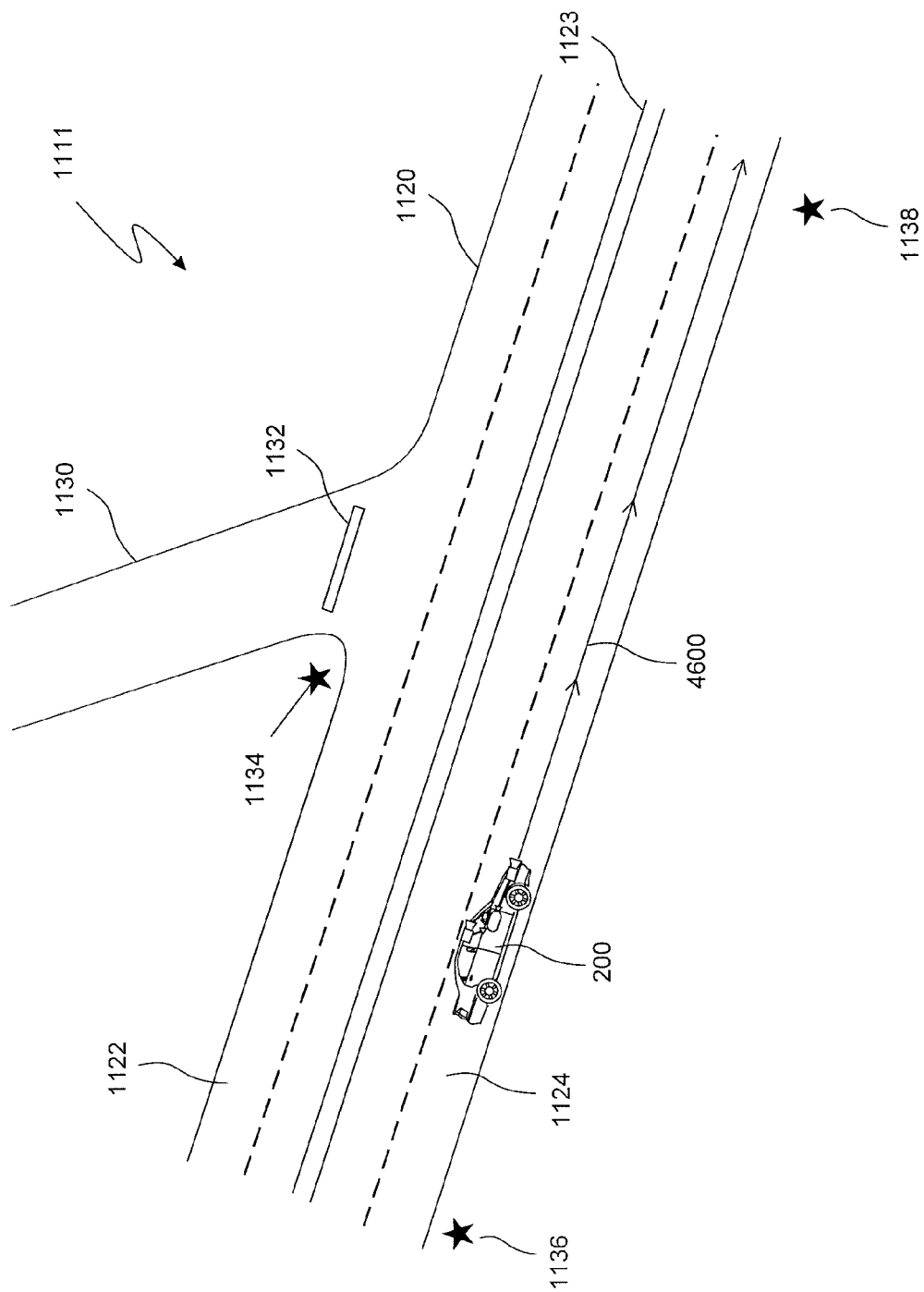
FIG. 46 shows a vehicle navigating using target trajectories along a multi-lane road, consistent with disclosed embodiments.

FIG. 46 shows vehicle 200 navigating using target trajectories along a multi-lane road consistent with disclosed embodiments. A vehicle 200 may navigate geographic region 1111 shown previously in FIG. 11B and FIG. 45, using target trajectory 4600. Target trajectory 4600 may be included in a local map (e.g., local map 1140 of FIG. 11C) of sparse map 800, and may provide a target trajectory for one or more lanes associated with a road segment. As previously discussed, sparse map 800 may include representations of road-related features associated with geographic region 1111, such as representations of one or more landmarks identified in geographic region 1111. Such landmarks may include speed limit sign 1136 and hazard sign 1138. Vehicle 200 may use speed limit sign 1136 and hazard sign 1138 to assist in determining its current location relative to target trajectory 4600. Based on the determined current location of vehicle 200 relative to target trajectory 4600, vehicle 200 may adjust its heading to match a direction of the target trajectory at the determined location.

As discussed above, in some embodiments, sparse map 800 may also include road signature profiles. Such road signature profiles may be associated with any discernible/measurable variation in at least one parameter associated with a road. For example, in some cases, such profiles may be associated with variations in surface roughness of a particular road segment, variations in road width over a particular road segment, variations in distances between dashed lines painted along a particular road segment, variations in road curvature along a particular road segment, etc.

Figure 47:
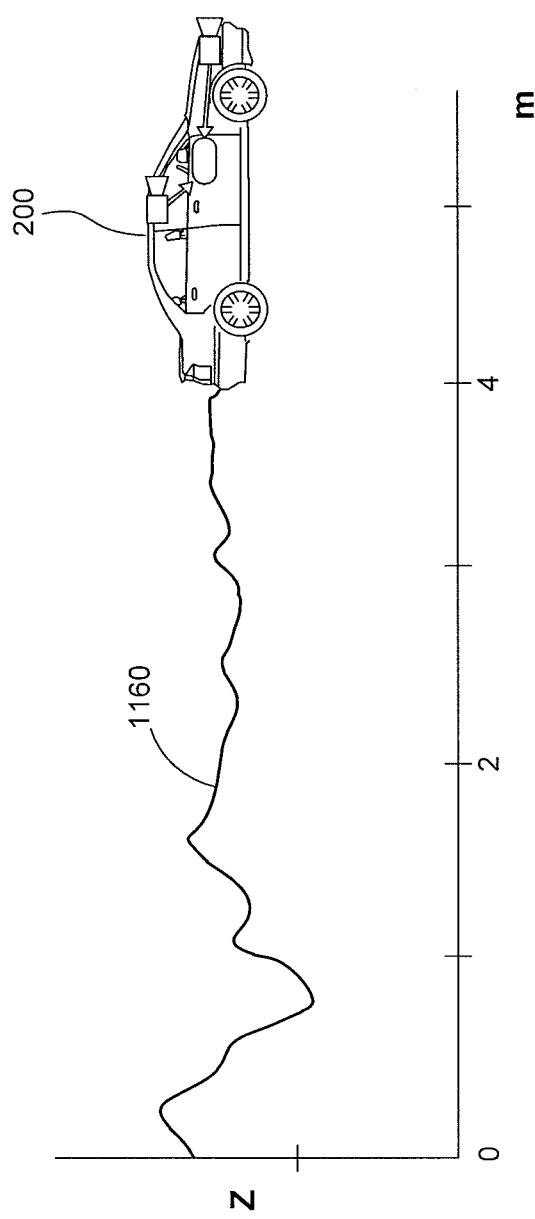
FIG. 47 shows an example of a road signature profile, consistent with the disclosed embodiments.

FIG. 47 shows an example of a road signature profile 1160 associated with vehicle 200 as it travels on the road shown in FIGS. 45 and 46. While profile 1160 may represent any of the parameters mentioned above, or others, in relation to vehicle 200, in one example, profile 1160 may represent a measure of road surface roughness obtained by monitoring one or more sensors providing outputs indicative of an amount of suspension displacement as a vehicle 200 travels a road segment in FIG. 46. Alternatively, profile 1160 may represent variation in road width, as determined based on image data obtained via a camera onboard vehicle 200 traveling in a road segment in FIG. 46. Such profiles may be useful, for example, in determining a particular location of vehicle 200 relative to target trajectory 4600, and may aid in navigation of vehicle 200. That is, as vehicle 200 traverses a road segment of FIG. 46, vehicle 200 may measure a profile associated with one or more parameters associated with that road segment. If the measured profile can be correlated/matched with a predetermined profile that plots the parameter variation with respect to position along the road segment, then the measured and predetermined profiles may be used by vehicle 200 (e.g., by overlaying corresponding sections of the measured and predetermined profiles) in order to determine a current position along the road segment and, therefore, a current position relative to target trajectory 4600 for the road segment. Measurements of the profile by vehicle 200 may continue as vehicle 200 travels in lane 1124 of FIG. 46 in order to continuously determine a current position along the road segment and a current position of vehicle 200 relative to target trajectory 4600. As such, navigation of vehicle 200 may be provided.

Figure 48:
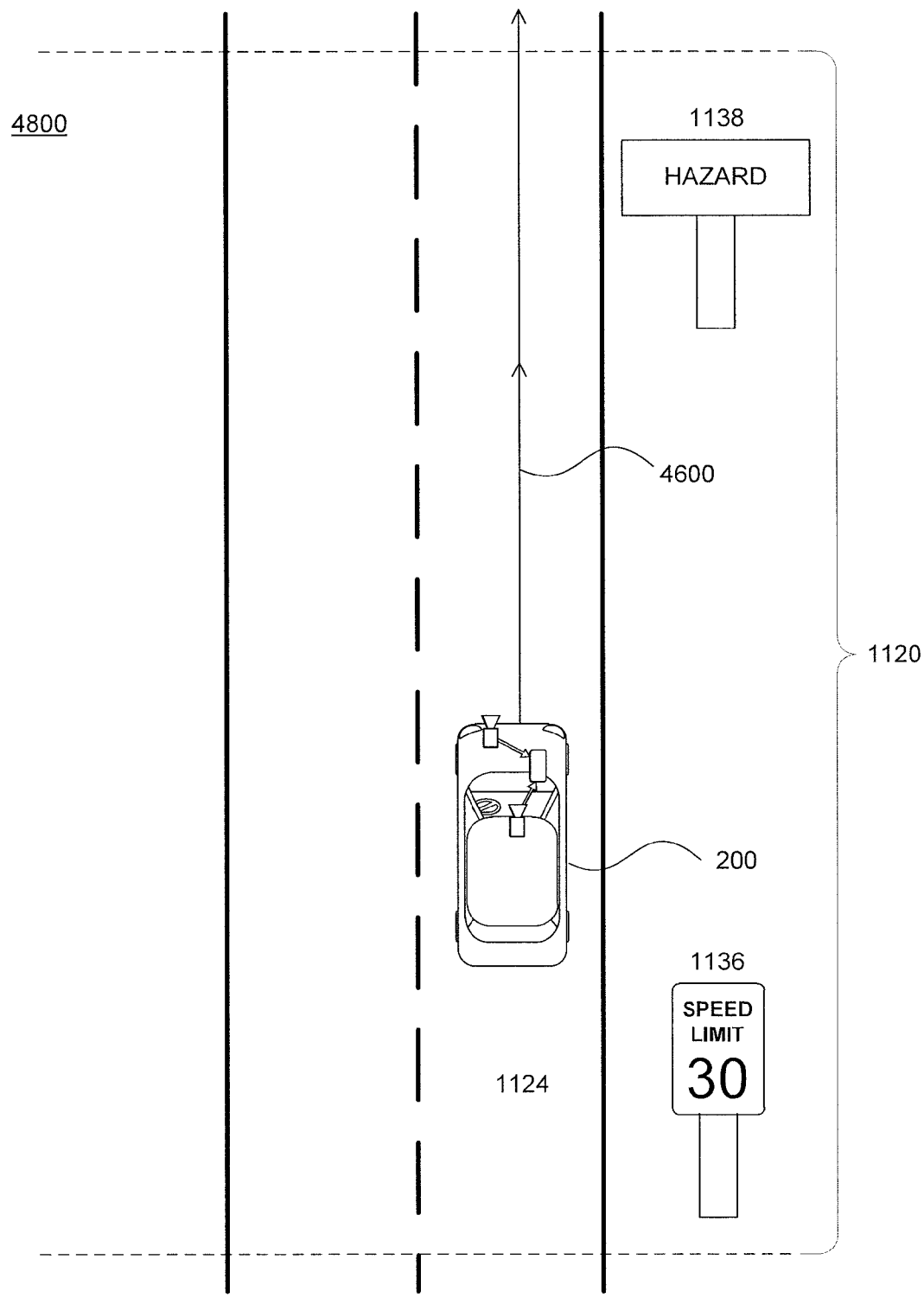
FIG. 48 illustrates an exemplary environment, consistent with the disclosed embodiments.

FIG. 48 is an illustration of an example of a portion of a road environment 4800, as shown in FIGS. 45 and 46. In this example, FIG. 48 shows road segment 1120. Vehicle 200 may be traveling along road segment 1120. Along the road segment 1120, landmarks such as speed limit sign 1136 and hazard sign 1138 may be present. Speed limit sign 1136 and hazard sign 1138 may be recognized landmarks that are stored in sparse map 800, and may be used for autonomous vehicle navigation along road segment 1120 (e.g., for locating vehicle 200, and/or for determining a target trajectory of vehicle 200). Recognized landmarks 1136 and 1138 in sparse map 800 may be spaced apart from each other at a certain rate. For example, recognized landmarks may be spaced apart in the sparse map at a rate of no more than 0.5 per kilometer, at a rate of no more than 1 per kilometer, or at a rate of no more than 1 per 100 meters. Landmarks 1136 and 1138 may be used, for example, to assist vehicle 200 in determining its current location relative to target trajectory 4600, such that the vehicle may adjust its heading to match a direction of the target trajectory at the determined location.

Figure 49:
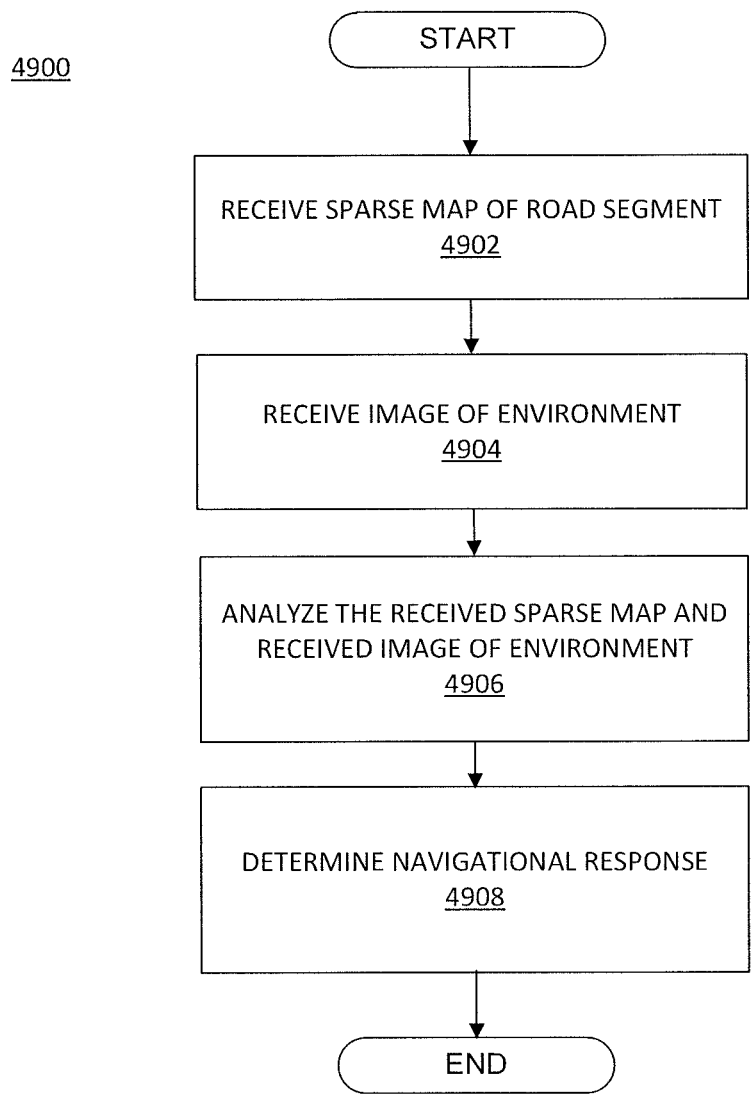
FIG. 49 is a flow chart showing an exemplary process for sparse map autonomous vehicle navigation, consistent with the disclosed embodiments

FIG. 49 is a flow chart showing an exemplary process 4900 for sparse map autonomous navigation consistent with the disclosed embodiments. Processing unit 110 may utilize one of or both of application processor 180 and image processor 190 to implement process 4900. As discussed below in further detail, vehicle 200 may determine an autonomous navigational response based on analysis of a sparse map and at least one image representative of an environment of vehicle 200.

At step 4902, processing unit 110 may receive a sparse map of a road segment, such as sparse map 800, from memory 140 or 150. For example, the sparse map may be transmitted to processing unit 110 based on a calculation of the position of vehicle 200 by position sensor 130. In other exemplary embodiments, vehicle 200 may receive the sparse map from remote server 4400. The sparse map data may have a particular data density. The data density of the sparse map may be expressed in terms of data unit per unit distance. For example, the sparse map may have a data density of no more than 1 megabyte per kilometer. In another example, the sparse map may have a data density of no more than 100 kilobytes per kilometer. In another example, the sparse map may have a data density of no more than 10 kilobytes per kilometer. Data density may be expressed in terms of any conceivable data unit and unit distance. Further, the sparse map may include a polynomial representation of a target trajectory along the road segment.

At step 4904, processing unit 110 may receive at least one image representative of an environment of vehicle 200. For example, processing unit 110 may receive at least one image from image acquisition unit 120 using image capture device 122. In other exemplary embodiments, image acquisition unit 120 may acquire one or more images from one or more of image capture devices 122, 124, and 126. Image acquisition unit 120 may transmit the one or more images to processing unit 110 over a data connection (e.g., digital, wired, USB, wireless, Bluetooth, etc.).

At step 4906, processing unit 110 may analyze the received sparse map and the at least one image of the environment of vehicle 200. For example, processing unit 110 may execute monocular image analysis module 402 to analyze one or more images, as described in further detail in connection with FIGS. 5B-5D. By performing the analysis, processing unit 110 may detect a set of features within the set of images, for example, one or more landmarks, such as landmarks 1134, 1136, and 1138. As discussed earlier, landmarks may include one or more traffic signs, arrow markings, lane markings, dashed lane markings, traffic lights, stop lines, directional signs, reflectors, landmark beacons, lampposts, a change is spacing of lines on the road, signs for businesses, and the like. Furthermore, processing unit 110 may analyze the sparse map to determine that an object in one or more images is a recognized landmark. For example, processing unit 110 may compare the image of the object to data stored in the sparse map. Based on the comparison, the image processor 190 may determine whether or not the object is a recognized landmark. Processing unit 110 may use recognized landmarks from captured image data of the environment and/or GPS data to determine a position of vehicle 200. Processing unit 110 may then determine a position of vehicle 200 relative to a target trajectory of the sparse map.

At step 4908, processing unit 110 may cause one or more navigational responses in vehicle 200 based solely on the analysis of the sparse map and at least one image of the environment performed at step 4906. For example, processing unit 110 may select an appropriate navigational response based on the position of vehicle 200 relative to the target trajectory of the sparse map. Navigational responses may include, for example, a turn, a lane shift, a change in acceleration, and the like. Processing unit 110 may cause system 100 to provide inputs (e.g., control signals) to one or more of throttling system 220, braking system 230, and steering system 240 as shown in FIG. 2F to navigate vehicle 200 (e.g., by causing an acceleration, a turn, a lane shift, etc.) to provide a navigational response. System 100 may provide inputs to one or more of throttling system 220, braking system 230, and steering system 240 over one or more data links (e.g., any wired and/or wireless link or links for transmitting data). Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Navigation Based on Expected Landmark Location

Landmarks appearing in one or more images captured by a camera onboard a vehicle may be used in the disclosed embodiments to determine a location of a vehicle along a road model trajectory. Such landmarks may include recognized landmarks represented, for example, in sparse map 800. Processing unit 110 of vehicle 200 may analyze images captured from one or more cameras onboard vehicle 200 to look for and verify the presence of a recognized landmark (from sparse data map 800) in the captured images. According to techniques described in detail in other sections of the disclosure, the verified, recognized landmarks in the environment of the vehicle can then be used to navigate the vehicle (e.g., by enabling a determination of a position of vehicle 200 along a target trajectory associated with a road segment).

In the disclosed embodiments, however, processor unit 110 may also generate navigational instructions on not only those landmarks appearing in captured images, but also based on an expected location of the recognized landmark as conveyed by sparse data map 800. For example, braking of a vehicle may be initiated a certain distance from recognized landmarks such as a stop line, a traffic light, a stop sign, a sharp curve, etc., even before those landmarks are detectable via an on-board camera. Landmarks may include, for example, any identifiable, fixed object in an environment of at least one road segment or any observable characteristic associated with a particular section of the road segment. In some cases, landmarks may include traffic signs (e.g., speed limit signs, hazard signs, etc.). In other cases, landmarks may include road characteristic profiles associated with a particular section of a road segment. Further examples of various types of landmarks are discussed in previous sections, and some landmark examples are shown in FIG. 10.

Figure 50:
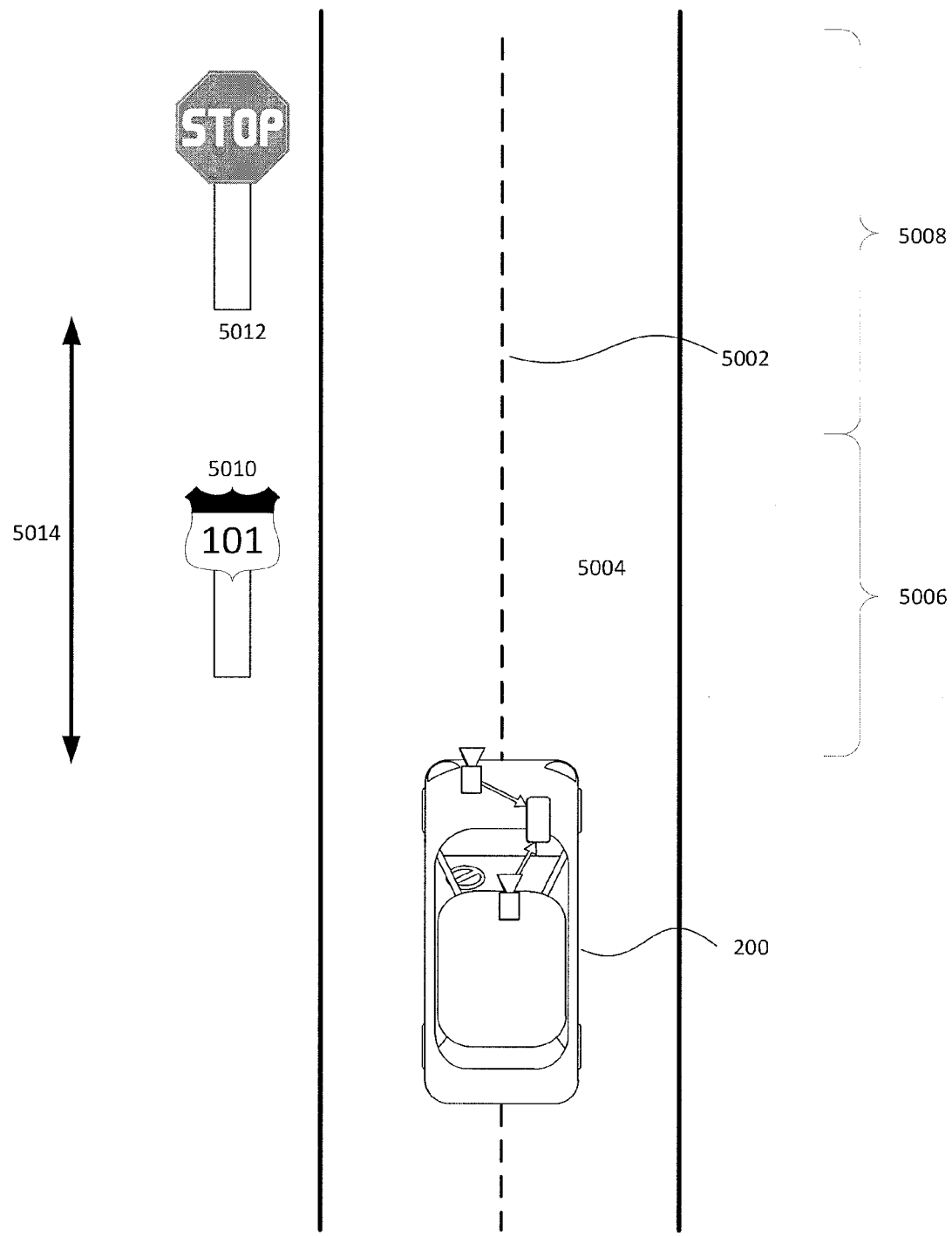
FIG. 50 illustrates an example environment for autonomous navigation based on an expected landmark location consistent with the disclosed embodiments.

FIG. 50 illustrates an example environment consistent with the disclosed embodiments. Vehicle 200 (which may be an autonomous vehicle) may travel along a target road model trajectory 5002 in road 5004. Vehicle 200 may be equipped with one or more image capture devices (e.g., one or more of image capture device 122, 124, or 126) that capture an image of the environment of the vehicle. The one or more image capture devices may have a sight range 5006. Sight range 5006 may define a range at which an image capture device of vehicle 200 can capture accurate images of the environment around vehicle 200. For example, sight range 5006 may define the range at which the field of view, focal length, resolution focus, sharpness, image quality, and the like of the image capture device of vehicle 200 is sufficient to provide images for navigation of vehicle 200.

Region 5008 may define a range outside of the sight range 5006 of an image capture device of vehicle 200. In region 5008, an image capture device of vehicle 200 may not be able to capture images of the environment around vehicle 200 that are sufficient to allow navigation of vehicle 200. In other exemplary embodiments, each image capture device may have a different sight range.

As shown in FIG. 50, recognized landmark 5010 is within sight range 5006. Because recognized landmark 5010 is within sight range 5006, it may be captured by an image capture device of vehicle 200 and identified, and used to navigate vehicle 200. Recognized landmark 5010 may be identified by vehicle 200 according to techniques discussed above in connection with, for example, FIGS. 34-36.

As previously discussed, recognized landmark 5012 is within region 5008. However, region 5008 defines a range outside of the sight range 5006 of an image capture device of vehicle 200. Accordingly, vehicle 200 may not be able to identify recognized landmark 5012 using an image capture device of vehicle 200 because recognized landmark 5012 is out of the sight range of the image capture device.

Consistent with disclosed embodiments, vehicle 200 may identify recognized landmark 5012 using alternative techniques. For example, an image capture device of vehicle 200 may capture an image of the environment within sight range 5006. A processor of vehicle 200 (e.g., processing unit 110) may receive the image. The processor may then determine a position of vehicle 200 along predetermined road model trajectory 5002 in road 5004 based on the captured image. For example, as discussed in other sections, the processor may compare data information representing recognized landmark 5010 from the captured image of the environment to stored data, such as data stored in sparse map 800, discussed above, to determine a position of vehicle 200 along predetermined road model trajectory 5002 in road 5004.

Based on the determined position of vehicle 200, the processor may then identify a recognized landmark beyond sight range 5006 (e.g., recognized landmark 5012) forward of the vehicle 200. For example, by accessing information stored in sparse data map 800 or any portion of sparse data map 800 (e.g., any received local map portions of sparse data map 800) processing unit 110 of vehicle 200 may determine the next expected recognized landmark to be encountered by vehicle 200 (or any other recognized landmark to be encountered by vehicle 200). The processor may also determine a predetermined position of recognized landmark 5012 based on the information available in sparse data map 800. Then, processing unit 110 may determine a current distance 5014 between the vehicle 200 and expected, recognized landmark 5012. The current distance 5014 between the vehicle 200 and the recognized landmark 5012 may be determined by comparing the determined position of vehicle 200 with the predetermined position of recognized landmark 5012. Based on the distance 5014, the processor of vehicle 200 may then determine an autonomous navigational response for the vehicle. For example, among other responses, processing unit 110 may initiate braking in advance of landmark 5012 even prior to detection of landmark 5012 in any captured images from image capture devices onboard vehicle 200.

Figure 51:
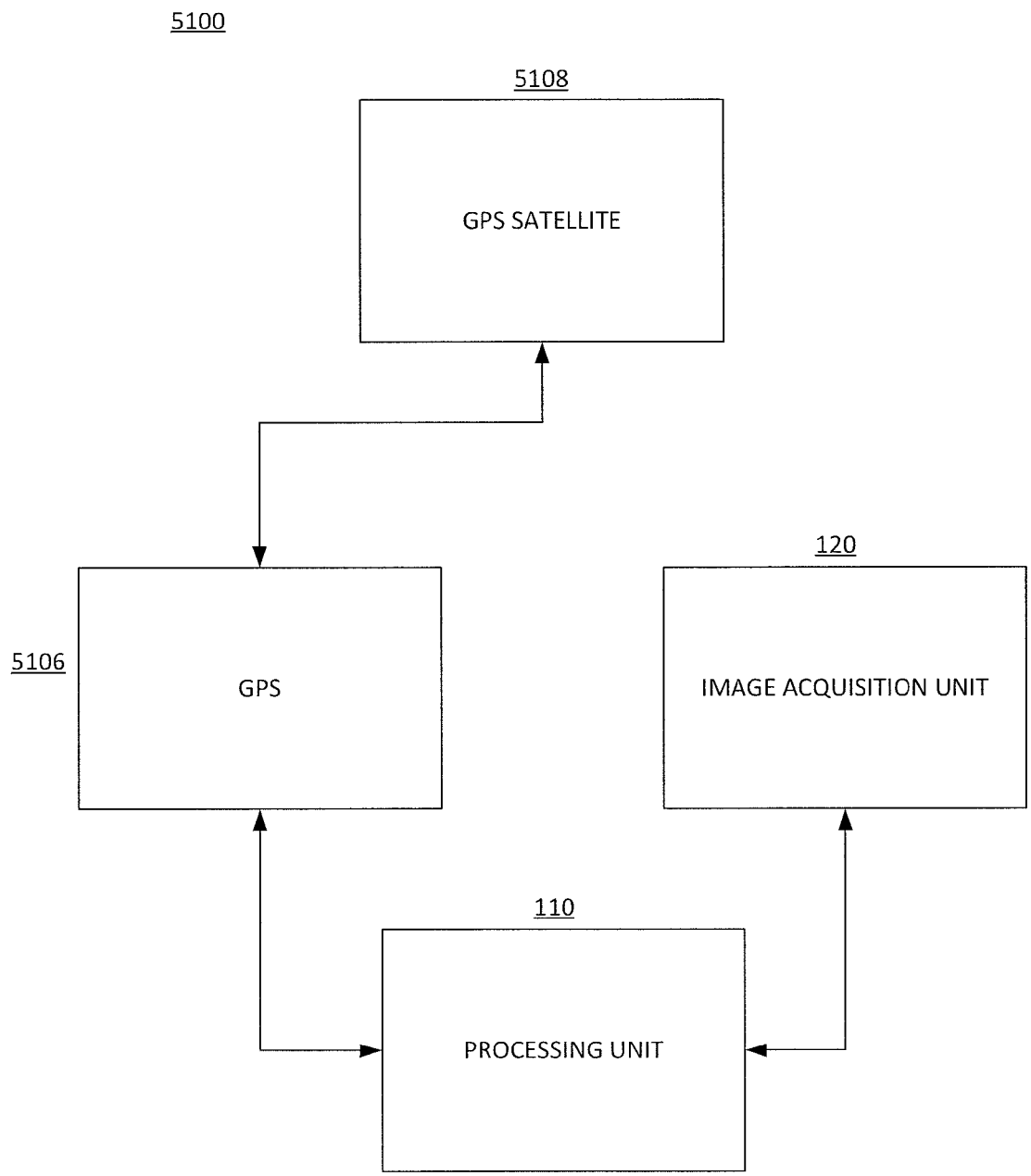
FIG. 51 illustrates a configuration for autonomous navigation consistent with the disclosed embodiments.

FIG. 51 illustrates a configuration 5100 for autonomous navigation consistent with disclosed embodiments. As discussed earlier, processing unit 110 may receive images from an image acquisition unit 120. Image acquisition unit may include one or more image capture devices (e.g., image capture device 122, 124, or 126). The images may depict an environment of vehicle 200 within the field of view of an image capture device onboard vehicle 200.

While GPS data need not be relied upon to determine an accurate position of vehicle 200 along a target trajectory, GPS data (e.g., GPS data from GPS unit 5106) may be used as an index for determining relevant local maps to access from within sparse data map 800. Such GPS data may also be used as a general index to aid in verifying an observed recognized landmark.

Figure 52:
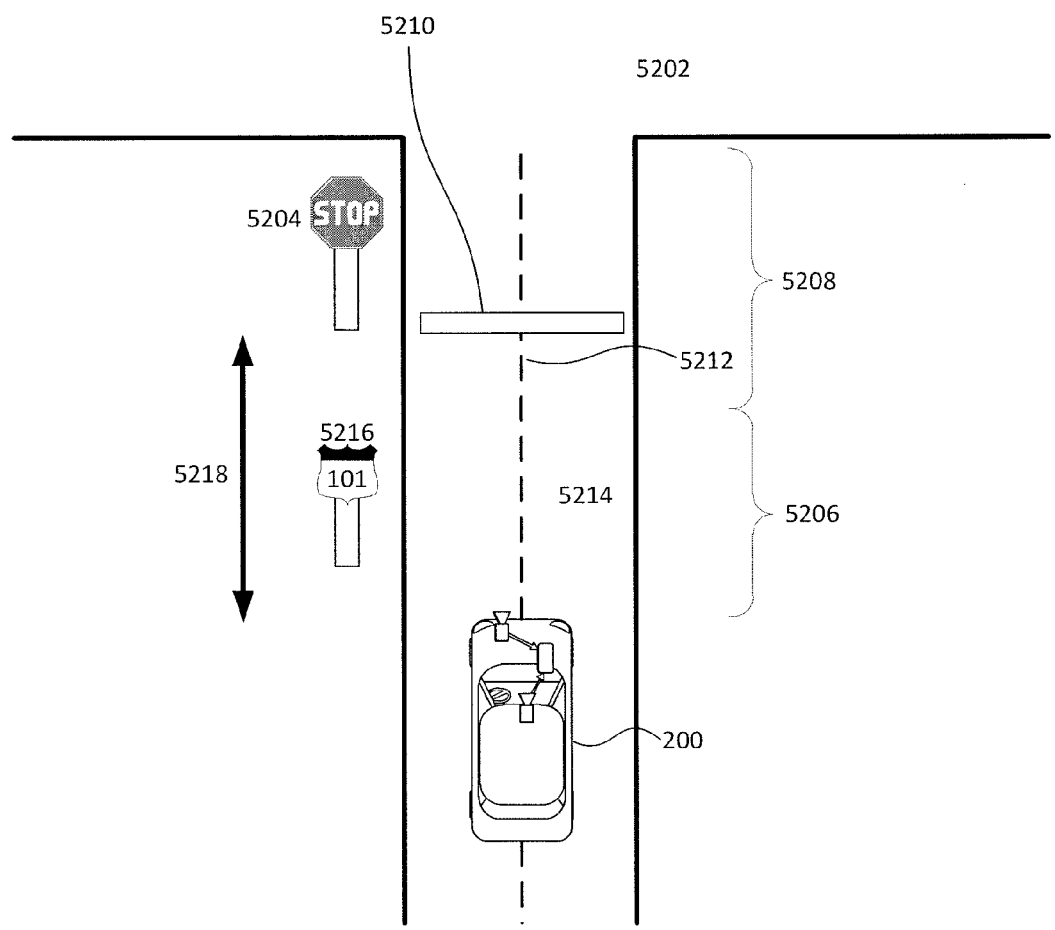
FIG. 52 illustrates another example environment for autonomous navigation based on an expected landmark location consistent with the disclosed embodiments.

FIG. 52 shows an example of an environment 5200 consistent with the present disclosure. As shown in FIG. 52, a vehicle 200 may approach a junction 5202 with a stop sign 5204 and a stop line 5210. One or both of stop sign 5204 or stop line 5210 may correspond to recognized landmarks represented in sparse data map 800. Either or both of stop sign 5204 or stop line 5210 may be located in a region 5208 beyond a focal length of an image capture device aboard vehicle 200 or otherwise outside of a usable sight range of the image capture device. Based on information stored in sparse data map 800 relative to stop sign 56204 and/or stop line 5210, processing unit 110 may initiate braking based on a determined, expected distance to stop line 5204 or stop line 5210 even before stop line 5204 or 5210 have been identified in images received from the image capture device onboard vehicle 200. Such a navigation technique, for example, may aid in slowing vehicle 200 gradually or according to a predetermined braking profile even without visual confirmation of a distance to a trigger for braking (e.g., stop sign 5204, stop line 5210, an expected curve, etc.).

Figure 53:
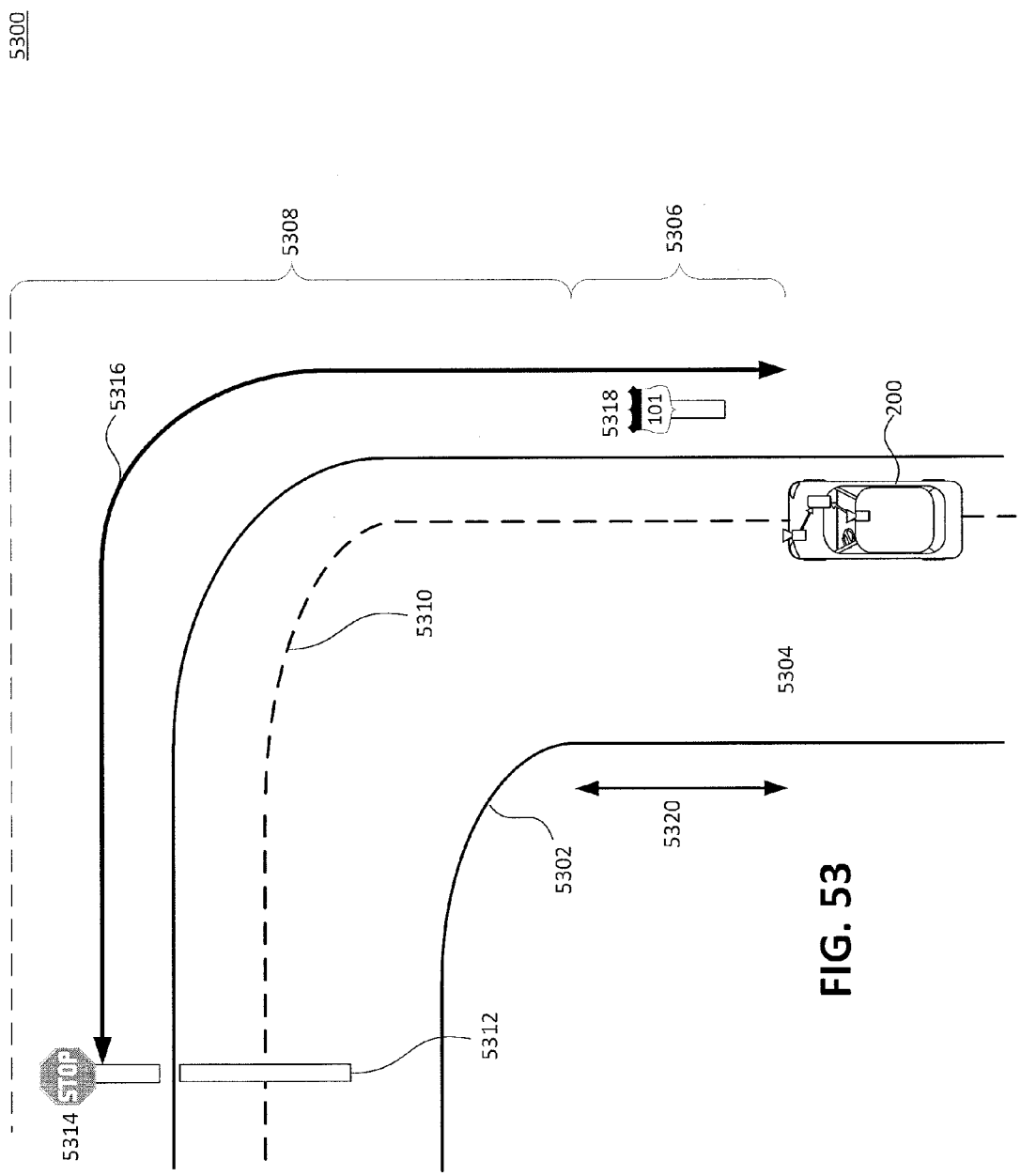
FIG. 53 illustrates another example environment for autonomous navigation based on an expected landmark location consistent with the disclosed embodiments.

FIG. 53 shows another example environment 5300 consistent with the present disclosure. As shown in FIG. 53, a vehicle 200 may approach a curve 5302 of road 5304. Vehicle 200 may include an image acquisition unit (e.g., image acquisition unit 120) including one or more image capture devices that provide a sight range of 5306. Region 5308 may define a range outside of the sight range 5306 of the image acquisition unit of vehicle 200.

Vehicle 200 may need to slow down in speed or implement steering to account for curve 5302 in road 5304. To plan a slowdown in speed or implement steering, it may be useful to know in advance where the curve 5302 is located. However, curve 5302 may be located in region 5308, which is beyond the focal length of an image capture device aboard vehicle 200. Thus, vehicle 200 may use a predetermined position of curve 5302, for example, as represented in sparse data map 800, as well as the position of vehicle 200 along predetermined road model trajectory 5310, to determine a distance 5320 to curve 5302. This distance may be used to slow vehicle 200 change a course of vehicle 200, etc. before the curve appears in images captured by an onboard camera.

Consistent with disclosed embodiments, to determine distance 5320 to curve 5302, the image acquisition device of vehicle 200 may capture an image of the environment. The image may include a recognized landmark 5318. A processor of vehicle 200 (e.g., processing unit 110) may receive the image and determine a position of vehicle 200 along predetermined road model trajectory 5310 based on the captured image and the position of recognized landmark 5318. Based on the determined position of vehicle 200, the processor may then identify curve 5302 beyond sight range 5306 forward of the vehicle 200 based on information included in sparse data map 800 relevant to curve 5302. Position information included in sparse data map 800 for curve 5302 may be compared with a determined position for vehicle 200 along a target trajectory for vehicle 200 to determine a distance between vehicle 200 and curve 5302. This distance can be used in generating a navigational response for vehicle 200 prior to identification of curve 5302 within images captured by a camera onboard vehicle 200.

Figure 54:
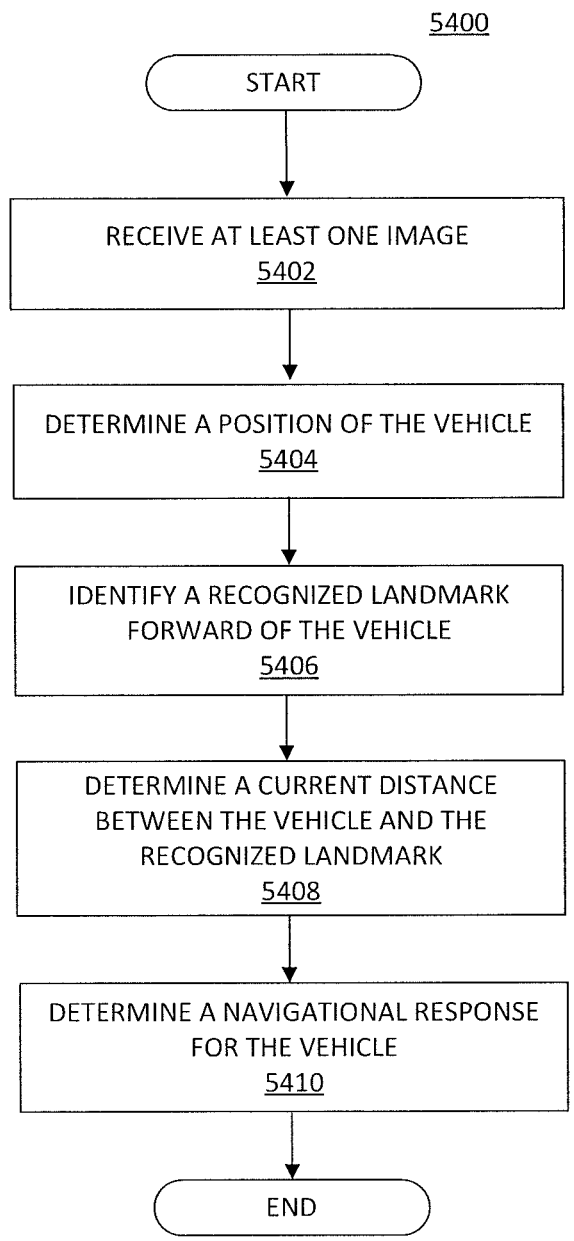
FIG. 54 is a flow chart showing an exemplary process for autonomous navigation based on an expected landmark location consistent with the disclosed embodiments.

FIG. 54 is a flow chart showing an exemplary process 5400 for autonomously navigating vehicle 200 consistent with the disclosed embodiments. A processing unit (e.g., processing unit 110) of vehicle 200 may use one of or both of application processor 180 and image processor 190 to implement process 5400. As discussed below in further detail, vehicle 200 may autonomously navigate along a road segment based on a predetermined landmark location. Furthermore, the predetermined landmark location may be beyond a sight range of vehicle 200.

At step 5402, a processing unit (e.g., processing unit 110) of vehicle 200 may receive at least one image from an image capture device (e.g., image capture device 122) of vehicle 200. The at least one image may be representative of an environment of vehicle 200. The at least one image may include data representative of one or more landmarks in the environment. For example, the at least one image may include data representative of landmarks such as road signs (including stop signs, yield signs, and the like), traffic lights, general signs, lines on the road, and curves along a road segment. As discussed in previous sections, a processing unit of vehicle 200 may verify recognized landmarks that appear in the at least one image.

At step 5404, the processing unit of vehicle 200 may determine a position of vehicle 200. For example, the processing unit of vehicle 200 may determine a position of vehicle 200 along a predetermined road model trajectory associated with a road segment based, at least in part, on information associated with the at least one image.

At step 5406, a recognized landmark beyond the focal range of the image capture device of vehicle 200 and forward of vehicle 200 may be identified. The identification may be based on the determined position of vehicle 200 along the predetermined road model trajectory associated with the road segment. For example, information about recognized landmarks along a predetermined road model trajectory may be previously stored in a sparse map, such as sparse map 800, discussed above. Based on the determined position of vehicle 200 along the predetermined road model trajectory associated with the road segment, the processing unit of vehicle 200 may determine that one or more recognized landmarks are located forward of vehicle 200 along the predetermined road model trajectory, but beyond a sight range of the image capture device of vehicle 200. Moreover, the processing unit of vehicle 200 may access a predetermined position of the recognized landmarks by accessing sparse map 800.

At step 5408, a current distance between the vehicle and the recognized landmark located forward of vehicle 200 beyond a sight range of the image capture device of vehicle 200 may be determined. The current distance may be determined by comparing the determined position of vehicle 200 along the predetermined road model trajectory associated with the road segment to the predetermined position of the recognized landmark forward of vehicle 200 beyond the sight range.

At step 5410, an autonomous navigational response for the vehicle may be determined based on the determined current distance between vehicle 200 and the recognized landmark located forward of vehicle 200. Processing unit 110 may control one or more of throttling system 220, braking system 230, and steering system 240 to perform a certain navigational response, as discussed in other sections of this disclosure. For example, an autonomous navigational response may include sending a control signal to braking system 230 to provide the application of brakes associated with vehicle 200. In another example, an autonomous navigational response may include sending a control signal to steering system 240 to modify a steering angle of vehicle 200.

Autonomous Navigation Based on Road Signatures

Consistent with disclosed embodiments, the system may navigate based on predetermined road signatures without using landmarks. As discussed above, such road signatures may be associated with any discernible or measurable variation in at least one parameter associated with a road. For example, in some cases, road signatures may be associated with variations in surface roughness of a particular road segment, variations in road width over a particular road segment, variations in distances between dashed lines painted along a particular road segment, variations in road curvature along a particular road segment, etc. The road signatures may be identified as a vehicle traverses a road segment based on visual information (e.g., images obtained from a camera) or based on other sensor output (e.g., one or more suspension sensor outputs, accelerometers, etc.). These signatures may be used to locate the vehicle along a predetermined road profile, and the forward trajectory can then be determined for the vehicle based on the direction of the road model at the determined location compared to a heading direction for the vehicle.

Figure 55:
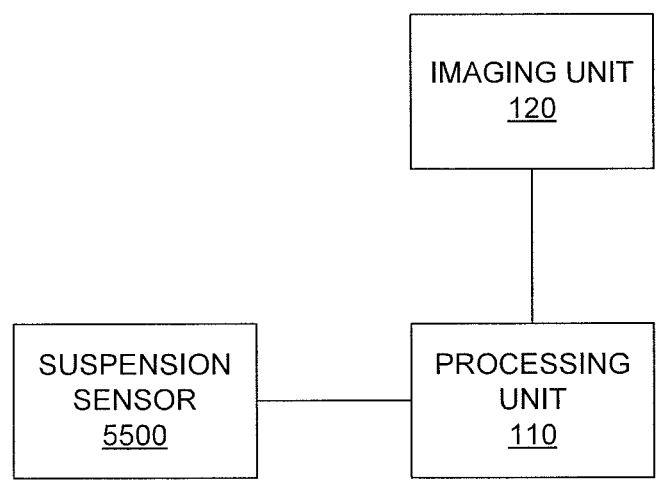
FIG. 55 is a diagrammatic representation of exemplary vehicle control systems consistent with the disclosed embodiments.

FIG. 55 is a diagrammatic representation of exemplary vehicle control systems, consistent with the disclosed embodiments. As illustrated in FIG. 55, vehicle 200 (which may be an autonomous vehicle) may include processing unit 110, which may have features similar to those discussed above with respect to FIGS. 1 and 2F. Vehicle 200 may also include imaging unit 220, which may also have features similar to those discussed above with respect to FIGS. 1 and 2F. In addition, vehicle 200 may include one or more suspension sensors 5500 capable of detecting movement of the suspension of vehicle 200 relative to a road surface. For example, signals from suspension sensors 5500 located adjacent each wheel of vehicle 200 may be used to determine a local shape, inclination, or banking of the road surface over which vehicle 200 may be located. In some exemplary embodiments, vehicle 200 may additionally or alternatively include accelerometers or other position sensors that may acquire information regarding variations in the road surface as vehicle 200 travels over the road surface. It is also contemplated that system 100 illustrated in FIG. 55 may include some or all of the components described above with respect to, for example, FIGS. 1 and 2F.

Figure 56:
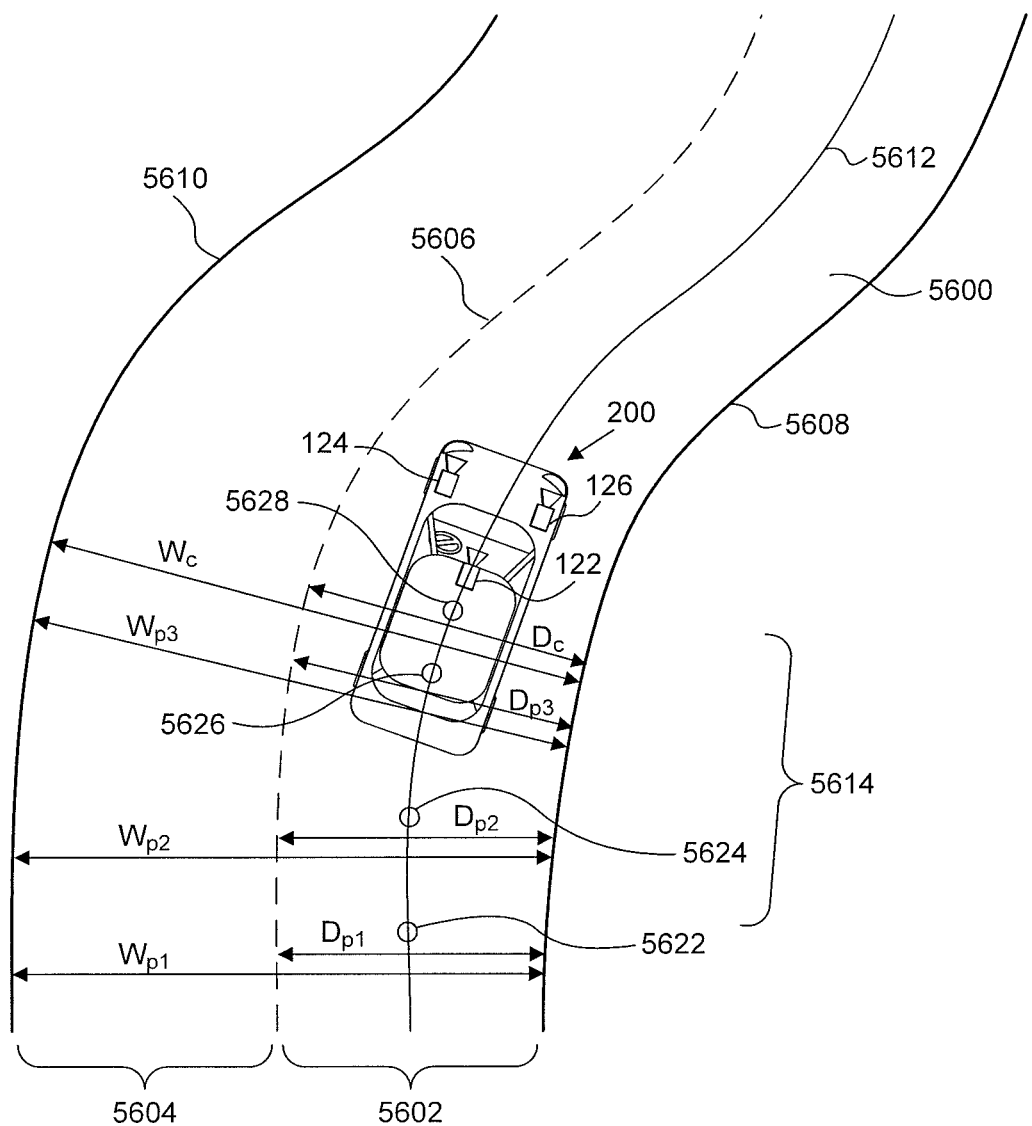
FIG. 56 is diagrammatic top view representation of an exemplary vehicle including a system consistent with the disclosed embodiments in which the vehicle navigates using lane width profiles or road width profiles.

FIG. 56 illustrates vehicle 200 travelling on road segment 5600 in which the disclosed systems and methods for navigating vehicle 200 using one or more road signatures may be used. Road segment 5600 may include lanes 5602 and 5604. As illustrated in FIG. 56, lane 5602 may be delimited by road center 5606 and right side 5608, whereas lane 5604 may be delimited by left side 5610 and road center 5606. Lanes 5602 and 5604 may have the same or different widths. It is also contemplated that each of lanes 5602, 5604 may have uniform or non-uniform widths along a length of road segment 5600. Although FIG. 56 depicts road segment 5600 as including only two lanes 5602, 5604, it is contemplated that road segment 5600 may include any number of lanes.

In one exemplary embodiment as illustrated in FIG. 56, vehicle 200 may travel along lane 5602. Vehicle 200 may be configured to travel along predetermined road model trajectory 5612, which may define a preferred path (e.g., a target road model trajectory) within lane 5602 of road segment 5600. In some exemplary embodiments, predetermined road model trajectory 5612 may be located equidistant from road center 5606 and right side 5608. It is contemplated however that predetermined road model trajectory 5612 may be located nearer to one or the other of center 5606 and right side 5608 of road segment 5600. In some embodiments, road model trajectory 5612 may be located elsewhere with respect to the road. For example, road model trajectory 5612 may be located to approximately coincide with a center of a roadway, a road edge, a lane edge, etc.

In some embodiments, predetermined road model trajectory 5612 may be mathematically represented by a three-dimensional polynomial function, which may be stored in memories 140, 150 associated with vehicle 200. It is also contemplated that the three-dimensional polynomial representation of road model trajectory 5612 may be stored in a storage device located remotely from vehicle 200. Processing unit 110 of vehicle 200 may be configured to retrieve predetermined road model trajectory 5612 from storage device over a wireless communications interface.

Vehicle 200 may be equipped with image capture devices 122, 124, 126 of image acquisition unit 120. It is contemplated that vehicle 200 may include more or fewer image capture devices than those shown in FIG. 56. Image capture devices 122, 124, 126 may be configured to acquire a plurality of images representative of an environment of vehicle 200, as vehicle 200 travels along road segment 5600. For example, one or more of image capture devices 122, 124, 126 may obtain the plurality of images showing views forward of vehicle 200. Processing unit 110 of vehicle 200 may be configured to detect a location of vehicle 200 at vehicle travels along road segment 5600 based on the one or more images obtained by image capture devices 122, 124, 126 or based on signals received from, for example, suspension sensor 5500.

As illustrated in FIG. 56, vehicle 200 may travel via locations 5622, 5624, 5626, to current location 5628. Although only three prior locations 5622-5626 are illustrated in FIG. 56, one of ordinary skill in the art would recognize that any number of previous locations of vehicle 200 may be present on road segment 5600. Processing unit 110 may analyze the one or more images received from image capture devices 122, 124, 126, to determine, for example, road widths $W_{p1}$, $W_{p2}$, $W_{p3}$, $W_c$ at locations 5622, 5624, 5626, 5628, respectively, where the subscript "p" refers to a previous location and the subscript "c" refers to current location 5628 of vehicle 200. In some exemplary embodiments, processing unit 110 may additionally or alternatively determine, for example, lane widths $D_{p1}$, $D_{p2}$, $D_{p3}$, $D_c$ at locations 5622, 5624, 5626, 5628, respectively. Processing unit 110 may generate a road width profile or a lane width profile over portion 5614 of road segment 5600. The determined road width profile or lane width profile may correspond to current location 5628.

Figure 57:
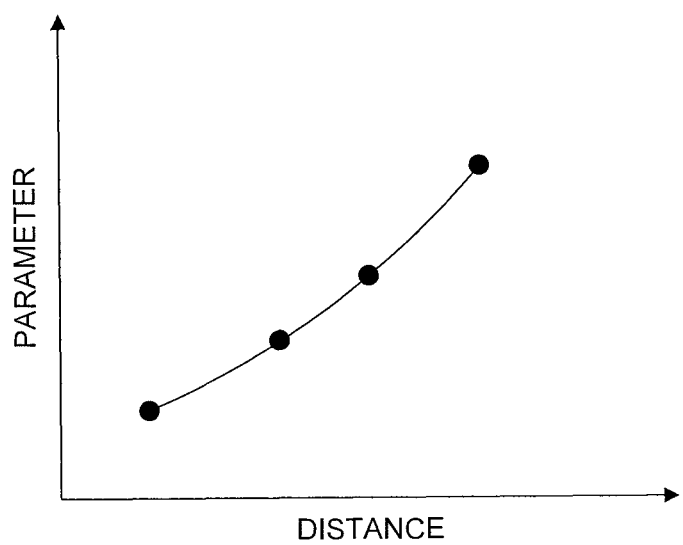
FIG. 57 is graph showing an exemplary profile that may be used by the vehicle control systems consistent with the disclosed embodiments.

FIG. 57 illustrates an exemplary profile 5700 generated by processing unit 110 of vehicle 200. As illustrated in FIG. 57, road width, lane width, or other parameters may be charted on the y-axis against a distance travelled by vehicle 200 along road segment 5600 on the x-axis. Processing unit 110 may determine the distance travelled using systems and methods similar to those discussed above with respect to FIGS. 34-36.

Processing unit 110 may determine a local feature of road segment 5600 corresponding to current location 5628 of vehicle 200. For example, processing unit 110 may determine a mathematical representation for the profile (e.g. profile shown in FIG. 57) by curve fitting the determined road widths $W_{p1}$, $W_{p2}$, $W_{p3}$, $W_c$ and/or lane widths $D_{p1}$, $D_{p2}$, $D_{p3}$, $D_c$. In one exemplary embodiment, processing unit 110 may determine, for example, coefficients (e.g. $a_1$, $a_2$, ... $a_n$) associated with the curve fit of the road width profile or the lane width profile. The determined coefficients may represent the local feature of road segment 5600 at current location 5628. In another exemplary embodiment, processing unit 110 may determine a slope of profile 5700 as the local feature. It is contemplated that processing unit 110 may perform other mathematical operations on profile 5700 to determine the local feature of road segment 5600 corresponding to a current location of vehicle 200.

Processing unit 110 may retrieve a predetermined signature feature associated with road segment 5600, for example, from database 160 stored in memories 140, 150. In one exemplary embodiment, the predetermined signature features may include coefficients of best or preferred fit lines representing road width profiles or lane width profiles corresponding to various locations along predetermined road model trajectory 5612. For example, the predetermined signature features may include coefficients $b_1$, $b_2$, ... $b_n$ at location 1; $c_1$, $c_2$, ... $c_n$ at location 2; $d_1$, $d_2$, ... $d_n$ at location 3, etc. Processing unit 110 may compare the coefficients (e.g. $a_1$, $a_2$, ... $a_n$) determined based on road widths $W_{p1}$, $W_{p2}$, $W_{p3}$, $W_c$ and/or lane widths $D_{p1}$, $D_{p2}$, $D_{p3}$, $D_c$ with the coefficients (e.g. $b_1$, $b_2$, ... $b_n$; $c_1$, $c_2$, ... $c_n$; $d_1$, $d_2$, ... $d_n$; etc.). Processing unit 110 may determine current location 5628 of vehicle 200 based on a match of the coefficients. For example, if coefficients $a_1$, $a_2$, ... $a_n$ match with coefficients $c_1$, $c_2$, ... $c_n$, respectively, processing unit 110 may determine location 5628 of vehicle 200 as corresponding to location 2 of predetermined road model trajectory 5612.

Processing unit 110 may determine a match in many ways. In one exemplary embodiment, processing unit 110 may determine a distance measure between the coefficients (e.g. $a_1$, $a_2$, ... $a_n$) and each set of coefficients (e.g. $b_1$, $b_2$, ... $b_n$; $c_1$, $c_2$, ... $c_n$; $d_1$, $d_2$, ... $d_n$; etc.) corresponding to locations 1, 2, 3, etc. Processing unit 110 may determine that there is a match when at least one of the determined distance measures is less than a threshold distance. In other exemplary embodiments, processing unit 110 may determine an error between the coefficients (e.g. $a_1$, $a_2$, ... $a_n$) and each set of coefficients (e.g. $b_1$, $b_2$, ... $b_n$; $c_1$, $c_2$, ... $c_n$; $d_1$, $d_2$, ... $d_n$; etc.) corresponding to locations 1, 2, 3, etc. Processing unit 110 may determine a match when at least one error is less than a threshold error. One of ordinary skill in the art would recognize that processing unit 110 may use other mathematical computations to determine a correlation or match between the two sets of coefficients.

In some exemplary embodiments, processing unit 110 may use road width $W_4$ and/or lane width $w_4$ as local feature to determine current location 5628 of vehicle 500. For example, the predetermined signature features of road segment 5600 may include road widths $w_1$, $w_2$, $w_3$, $w_4$, $w_5$, ... $w_n$ corresponding to locations 1, 2, 3, 4, 5, ... n along predetermined road model trajectory 5612. Additionally, or alternatively, the predetermined signature features of road segment 5600 may include lane widths $d_1$, $d_2$, $d_3$, $d_4$, $d_5$, ... $d_n$ corresponding to locations 1, 2, 3, 4, 5, ... n along predetermined road model trajectory 5612. Processing unit 110 may compare road width $W_c$ and/or lane width $D_c$ with road widths $w_1$, $w_2$, $w_3$, $w_4$, $w_5$, ... $w_n$ and/or lane widths $d_1$, $d_2$, $d_3$, $d_4$, $d_5$, ... $d_n$, respectively, to determine current location 5628. For example, if road width $W_c$ matches with road width $w_5$, processing unit 110 may determine location 5628 as corresponding to location 5. Likewise, if lane width $D_c$ matches with lane width $d_3$, processing unit 110 may determine location 5628 as corresponding to location 3. Processing unit may determine whether road width $W_4$ and/or lane width $D_4$ and match using matching techniques similar to those discussed above.

Processing unit 110 may use other parameters to determine current location 5628. For example, processing unit 110 may determine one or more of average road width $W_{avg}$ (e.g. average of $W_{p1}$, $W_{p2}$, $W_{p3}$, $W_c$), road width variance $W_{var}$ (e.g. variance of $W_{1p}$, $W_{p2}$, $W_{p3}$, $W_c$), average lane width $D_{avg}$ (e.g. average of $D_{p1}$, $D_{p2}$, $D_{p3}$, $D_c$), lane width variance $D_{var}$ (e.g. variance of $D_{p1}$, $D_{p2}$, $D_{p3}$, $D_c$), or other parameters such as median, mode, etc. to represent the local feature corresponding to current location 5628. The corresponding predetermined road signature feature may also be represented by average road widths, road width variances, average lane widths, lane width variances, median or mode values of road widths, median or mode values of lane widths, etc., at predetermined locations on predetermined road model trajectory 5612. Processing unit 110 may determine current location 5628 of vehicle 200 by comparing the determined local feature and the predetermined road signature features as discussed above.

Figure 58:
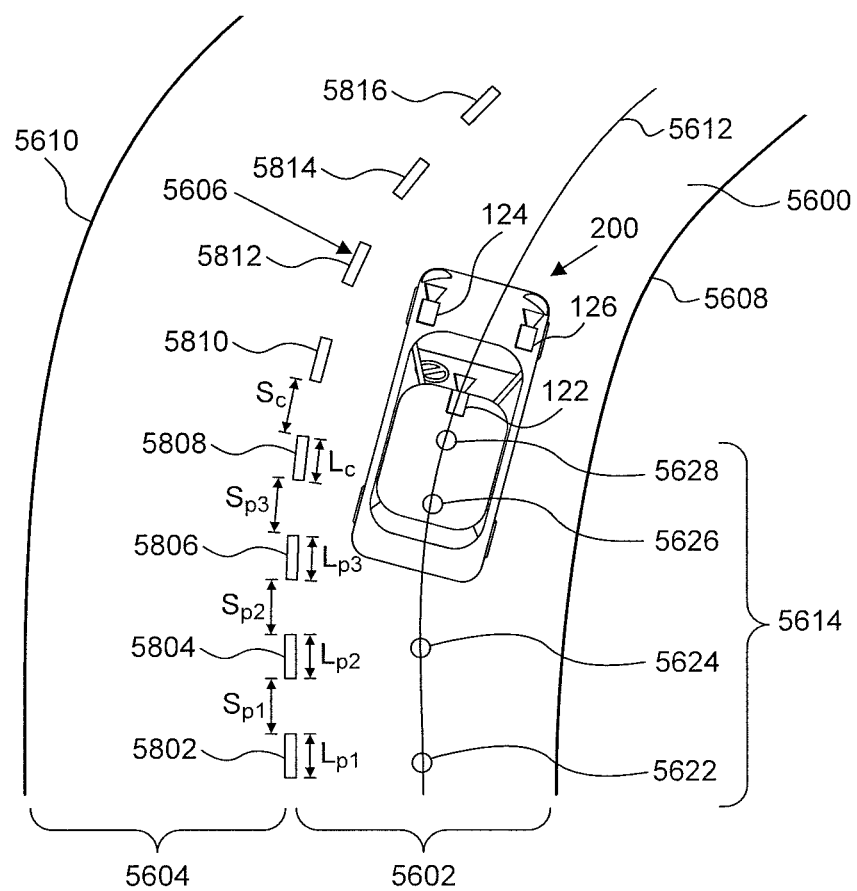
FIG. 58 is a diagrammatic top view representation of an exemplary vehicle including a system consistent with the disclosed embodiments in which the vehicle navigates using lengths or spacings of road markings on a road segment.

In some exemplary embodiments, the local features and predetermined signature features of road segment 5600 may be based on lengths of, or spacing between, marks on road (road markings) segment 5600. FIG. 58 illustrates vehicle 200 travelling on road segment 5600 in which the predetermined road signatures may be based on road markings on road segment 5600. For example, FIG. 58 illustrates road center 5606 as a dashed line represented by road markings 5802-5816. As vehicle 200 travels along road segment 5600, processing unit 110 may analyze the one or more images received from the one or more image capture devices 122, 124, 126, etc. to detect road markings 5802-5816. Processing unit 110 may also determine, for example, spacings $S_{p1}$, $S_{p2}$, $S_{p3}$, $S_c$ between road markings 5802-5804, 5804-5806, 5806-5808, 5808-5810, respectively. Processing unit 110 may additionally or alternatively determine lengths $L_{p1}$, $L_{p2}$, $L_{p3}$, $L_c$ for road markings 5802, 5804, 5806, 5808, respectively. In one exemplary embodiment, processing unit may generate a dashed line spacing profile or a dashed line length profile based on spacings $S_{p1}$, $S_{p2}$, $S_{p3}$, $S_c$ or lengths $L_{p1}$, $L_{p2}$, $L_{p3}$, $L_c$, respectively, in a manner similar to the profiles discussed above with respect to FIGS. 56 and 57. Processing unit 110 may also determine a local feature based on coefficients of curve fits to the dashed line spacing profile and/or dashed line length profile as discussed above with respect to FIGS. 56 and 57. Processing unit 110 may compare the local feature (e.g., coefficients representing the dashed line spacing profile or dashed line length profile) to predetermined signature features of road segment 5600. For example, processing unit 110 may compare the coefficients representing the determined dashed line spacing profile or dashed line length profile with predetermined coefficients of dashed line spacing/length profiles at known locations along predetermined road model trajectory. Processing unit 110 may determine current location 5628 of vehicle 200 when the coefficients of the determined dashed line spacing/length profiles match the predetermined coefficients at a particular known location as discussed above with respect to FIGS. 56 and 57.

In some exemplary embodiments, processing unit 110 may use dashed line spacing $S_c$ and/or dashed line length $L_c$ as a local feature to determine current location 5628 of vehicle 500. For example, the predetermined signature features of road segment 5600 may include dashed lane spacings $s_1$, $s_2$, $s_3$, $s_4$, $s_5$, ... $s_n$ corresponding to locations 1, 2, 3, 4, 5, ... n along predetermined road model trajectory 5612. Additionally, or alternatively, the predetermined signature features of road segment 5600 may include dashed line lengths $l_1$, $l_2$, $l_3$, $l_4$, $l_5$, ... $l_n$ corresponding to locations 1, 2, 3, 4, 5, ... n along predetermined road model trajectory 5612. Processing unit 110 may compare dashed line spacing $S_c$ and/or dashed line length $L_c$ with dashed lane spacings $s_1$, $s_2$, $s_3$, $s_4$, $S_5$, ... $s_n$ and/or dashed line lengths $l_1$, $l_2$, $l_3$, $l_4$, $l_5$, ... $l_n$, respectively, to determine current location 5628. For example, if dashed line spacing $S_c$ matches with dashed line spacing $s_5$, processing unit 110 may determine location 5628 as corresponding to location 5. Likewise, if dashed line length $L_c$ matches with dashed line length $l_3$, processing unit 110 may determine location 5628 as corresponding to location 3. Processing unit may determine whether dashed line spacing $S_c$ and/or dashed lane length $L_c$ match the predetermined dashed line lengths or spacings using matching techniques similar to those discussed above.

In other exemplary embodiments, processing unit 110 may determine an average dash line length $L_{avg}$, dash line variance $L_{var}$, dash line spacing average $S_{avg}$, or dash line spacing variance $S_{var}$ as a local parameter. Processing unit 110 may compare dash mark length $L_{avg}$, dash mark variance $lL_{var}$, dash mark spacing average $S_{avg}$, or dash mark spacing variance $S_{var}$ with predetermined values of dash mark length, dash mark variance, dash mark spacing average, or dash mark spacing variance at various locations along predetermined road model trajectory 5612. The predetermined values of dash mark length, dash mark variance, dash mark spacing average, or dash mark spacing variance at various locations may constitute predetermined signature features of road segment 5600. Processing unit 110 may determine current location 5628 of vehicle 200 as the location for which at least one of dash mark length $L_{avg}$, dash mark variance $L_{var}$, dash mark spacing average $S_{avg}$, or dash mark spacing variance $S_{var}$ matches a predetermined corresponding value of dash mark length, dash mark variance, dash mark spacing average, or dash mark spacing.

In yet other exemplary embodiments, processing unit 110 may use a number of dashed lines as a local feature. For example, road markings 5802-5816 may be painted at a fixed length and spacing when they are painted by a machine. Thus, it may be possible to determine current location 5628 of vehicle 200 based on a count of the road markings as vehicle 200 travels on road segment 5600. Processing unit 110 may determine a count "$N_c$" of dash marks that vehicle 200 may have passed till it reaches current location 5628. Processing unit 110 may compare count $N_c$ with counts $n_1$, $n_2$, $n_3$, ... $n_n$ corresponding to the number of road markings up to locations 1, 2, 3, ... n, respectively, along predetermined road model trajectory 5612. Counts $n_1$, $n_2$, $n_3$, ... n, may correspond to the predetermined signature feature of road segment 5600. In one example, when count $N_c$ matches $n_2$, processing unit may determine current location 5628 as corresponding to location 2.

Figure 59:
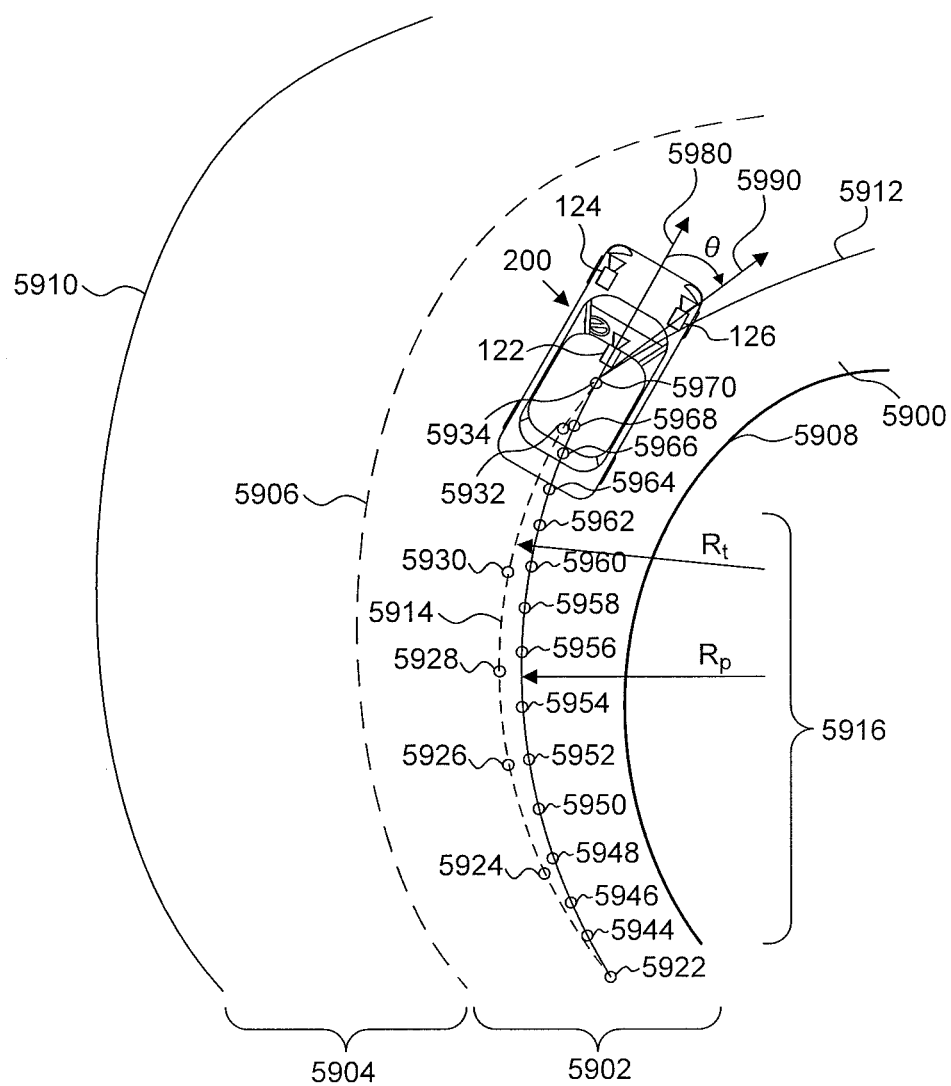
FIG. 59 is a diagrammatic top view representation of an exemplary vehicle including a system consistent with the disclosed embodiments in which the vehicle navigates using information regarding curvature of a road segment.

In some exemplary embodiments, the local features and predetermined signature features of road segment 5600 may be based on radii of curvature of the predetermined road model trajectory and an actual trajectory travelled by vehicle 200. For example, as illustrated in FIG. 59, vehicle 200 may travel over road segment 5900, which may include lanes 5902 and 5904. As illustrated in FIG. 59, lane 5902 may be delimited by road center 5906 and right side 5908, whereas lane 5904 may be delimited by left side 5910 and road center 5906. Vehicle 200 may be configured to travel along predetermined road model trajectory 5912, which may define a preferred path (e.g., a target road model trajectory) within lane 5902 of road segment 5900 that vehicle 200 may follow as vehicle 200 travels along road segment 5900. As also illustrated in FIG. 59, vehicle 200 may travel via previous locations 5922, 5924, 5926, 5928, 5930, 5932 to current location 5934. Although only six previous locations 5922-5932 are illustrated in FIG. 59, one of ordinary skill in the art would recognize that any number of previous locations of vehicle 200 may be present on road segment 5900.

Processing unit 110 may determine travelled trajectory 5914 of vehicle 200 as passing through previous locations 5922-5932 of vehicle 200. In one exemplary embodiment, processing unit 110 may fit a curve, which may be a three-dimensional polynomial similar to that representing predetermined road model trajectory 5912, through locations 5922-5932. Processing unit 110 may also determine first parameter values representative of curvatures of various segments (portions or sections) of predetermined road model trajectory 5912. Further, processing unit 110 may determine second parameter values representative of a curvature of travelled trajectory 5914. Processing unit 110 may determine current location 5934 of vehicle 200 based on the first and second parameter values.

For example, consider the case where $R_1, R_2, R_3, \ldots R_z$ represent radii of curvature of segments $C_1, C_2, C_3, \ldots C_z$ of predetermined road model trajectory 5912. Referring to FIG. 59, portions $C_1, C_2, C_3, \ldots C_z$ of predetermined road model trajectory 5912 may represent sections of predetermined road model trajectory 5912 between locations 5922-5944, 5922-5946, 5922-5948, etc. Processing unit may determine, for example, a radius of curvature $R_t$ of travelled trajectory 5914 between locations 5922 and 5934. Processing unit 110 may compare radius of curvature $R_t$ with the radii $R_1, R_2, R_3, \ldots R_z$. Processing unit 110 may determine current location 5934 of vehicle 200 as a location 5970 when radius of curvature $R_t$ matches the radius of curvature $R_p$ of a portion of predetermined road model trajectory lying between location 5922 and 5970. Processing unit 110 may determine a match between radii $R_t$ and $R_p$ using matching techniques similar to those discussed above.

Figure 60:
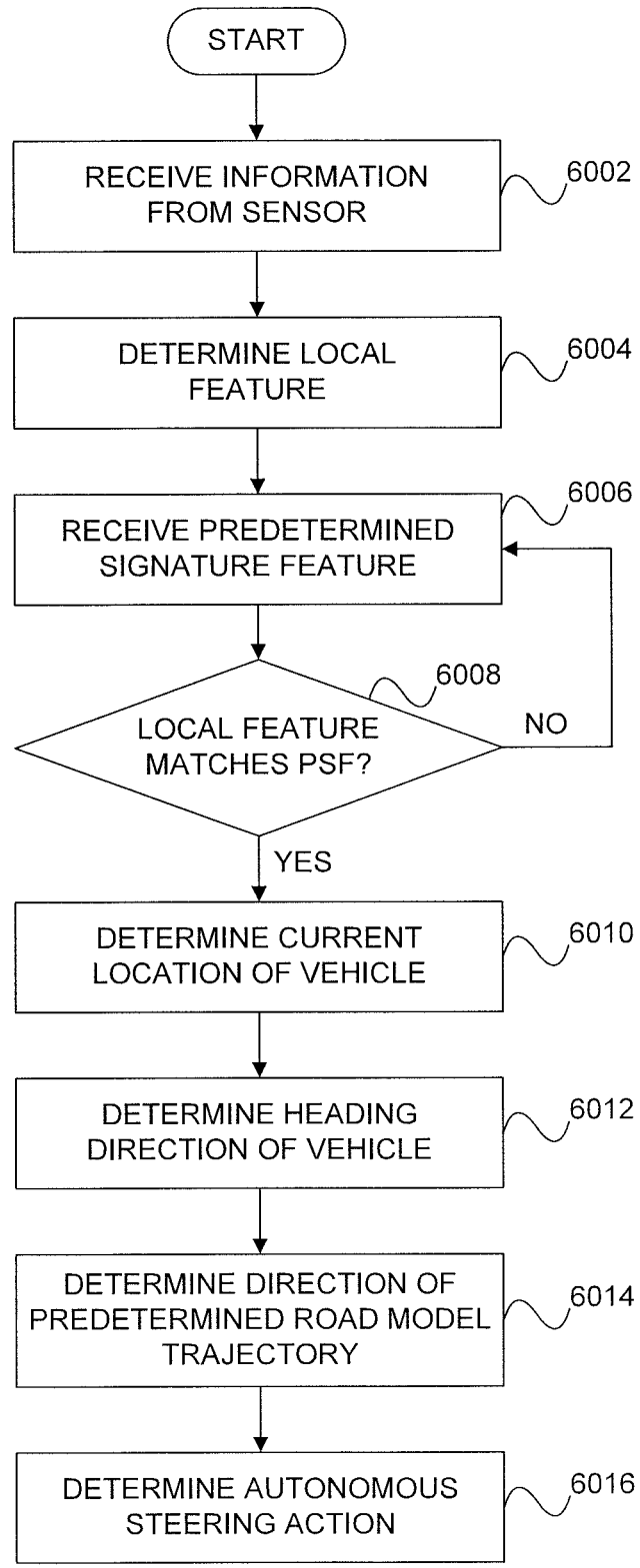
FIG. 60 is a flowchart showing an exemplary process for navigating an exemplary vehicle using road signatures.

FIG. 60 is a flowchart showing an exemplary process 6000, for navigating vehicle 200 along road segment 5900 (or 5600), using road signatures, consistent with disclosed embodiments. Steps of process 6000 may be performed by one or more of processing unit 110 and image acquisition unit 120, with or without the need to access memory 140 or 150. The order and arrangement of steps in process 6000 is provided for purposes of illustration. As will be appreciated from this disclosure, modifications may be made to process 6000 by, for example, adding, combining, removing, and/or rearranging the steps for the process.

As illustrated in FIG. 60, process 6000 may include a step 6002 of receiving information regarding one or more aspects of road segment 5900 (or 5600) from a sensor. In one exemplary embodiment, sensor may include one or more of image capture devices 122, 124, 126, which may acquire one or more images representative of an environment of the vehicle. In one exemplary embodiment, image acquisition unit 120 may acquire one or more images of an area forward of vehicle 200 (or to the sides or rear of a vehicle, for example). For example, image acquisition unit 120 may obtain an image using image capture device 122 having a field of view 202. In other exemplary embodiments, image acquisition unit 120 may acquire images from one or more of image capture devices 122, 124, 126, having fields of view 202, 204, 206. Image acquisition unit 120 may transmit the one or more images to processing unit 110 over a data connection (e.g., digital, wired, USB, wireless, Bluetooth, etc.).

In another exemplary embodiment, the sensor may include one or more suspension sensors 5500 on vehicle 200. Suspension sensor 5500 may be configured to generate signals responsive to a movement of the suspension of vehicle 200 relative to a surface of road segment 5900 (or 5600). Processing unit 110 may receive signals from the one or more suspension sensors 5500 on vehicle 200 as vehicle 200 moves along road segment 5900 (or 5600). For example, processing unit 110 may receive information regarding the relative height of vehicle 200 adjacent each of its wheels based on suspension sensors 5500 located adjacent to the wheels. Processing unit 110 may use this information to determine a road surface profile at the location of vehicle 200. The road surface profile may provide information regarding a bank or inclination of, for example, lane 5902 (or 5602) relative to road center 5906 or right side 5908. In some embodiments, the road surface profile may also identify a bump in road segment 5900 (or 5600) based on the signals from the one or more suspension sensors 5500.

Process 6000 may also include a step 6004 of determining a local feature based on the information received from the sensor (e.g. imaging unit 110, one or more suspension sensors 5500, etc.). The local feature may represent one or more aspects of the road segment at current location 5628 or 5932 of vehicle 200. For example, the local feature may include at least one of a road width, a lane width, or a road surface profile at current location 5932 of vehicle 200. In some exemplary embodiments, the local feature may be based on data collected by processing unit 110 as vehicle travels along predetermined road model trajectory to current location 5932. In particular, based on road widths, lane widths, lengths of road markings (dashes), spacing between adjacent road markings (dashes), etc., determined as vehicle travels to current location 5932, processing unit 110 may determine a road width profile, a lane width profile, a dashed line length profile, a dashed line spacing profile, second parameter values representing a curvature of travelled trajectory 5914, and/or other parameters as discussed above with respect to FIGS. 55-58.

Process 6000 may include a step 6006 of receiving predetermined signature features for road segment 5900. For example, processing unit 110 may retrieve the predetermined signature features from a database 160 stored in memories 140, 150 associated with vehicle 200 or from a database 160 located remotely from vehicle 200. As discussed above with respect to FIGS. 56-59, the predetermined signature features may include one or more predetermined parameter values representing at least one of a road width, a lane width, a dashed line length, a dashed line spacing, etc., at predetermined locations along predetermined road model trajectory 5912. In some exemplary embodiments, the predetermined signature features may also include one or more of a road width profile over at least a portion of the road segment, a lane width profile over at least a portion of the road segment, a dashed line spacing profile over at least a portion of the road segment, a predetermined number of road markings along at least a portion of the road segment, a road surface profile over at least a portion of the road segment, or a predetermined curvature associated with the road segment at various predetermined locations along predetermined road model trajectory 5912. In some exemplary embodiments, processing unit 110 may retrieve a first set of parameter values representing at least one predetermined signature feature of road segment 5900.

Further still, in some exemplary embodiments, the predetermined signature features may start at a known location (e.g., an intersection) and, if lane marking segment lengths and spacing are known and lane marking segments are counted, processing unit 110 may determine a location about the road from the known location. In some embodiments, a combination of known lengths for specific segments (e.g., typically close to the intersection) together with statistics on regarding consistent segment lengths and spacing may also be used as a predetermined signature feature. Further, in some embodiments, a predetermined signature feature may include a combination of two repetitive features, such as the combination of lane marking segments and lampposts. In still yet other embodiments, a predetermined signature feature may include a combination of GPS data (e.g., an approximate location) and lane mark segments.

Process 6000 may also include a step 6008 of determining whether the local feature determined, for example, in step 6004 matches the at least one predetermined signature feature, retrieved for example in step 6006. Processing unit 110 may determine whether there is a match as discussed above with respect to FIGS. 57-59. When processing unit 110 determines that the local feature matches a predetermined signature feature (Step 6008: Yes), processing unit 110 may proceed to step 6010. In step 6010, processing unit may determine current location 5628, 5932 of vehicle 200. Processing unit 110 may determine current location 5932 as discussed above with respect to FIGS. 57-59. Returning to step 6008, when processing unit 110 determines, however, that the local feature does not match a predetermined signature feature (Step 6008: No), processing unit 110 may return to step 6006 to retrieve another predetermined signature feature from database 160.

Process 6000 may include a step 6012 of determining heading direction 5980 of vehicle 200 at current location 5628, 5932. Processing unit 110 may determine heading direction 5980 using one or more operations discussed above with respect to FIGS. 37-39. For example, processing unit 110 may determine heading direction 5980 as a gradient of travelled trajectory 5914 at current location 5932 of vehicle 200. Process 6000 may also include a step 6014 of determining a direction 5990 of predetermine road model trajectory 5912. Processing unit 110 may determine direction 5990 using one or more operations discussed above with respect to FIGS. 37-43. For example, processing unit 110 may determine direction 5990 as a vector oriented tangentially to predetermined road model trajectory 5912 at current location 5932 of vehicle 200. Processing unit 110 may determine the tangential vector as a vector pointing along a gradient of the mathematical representation of predetermined road model trajectory 5912 at current location 5932.

Process 6000 may also include a step 6016 of determining an autonomous steering action for vehicle 200. Processing unit 110 may determine a rotational angle: between heading direction 5980 and direction 5990 of predetermined road model trajectory 5912. Processing unit 110 may execute the instructions in navigational module 408 to determine an autonomous steering action for vehicle 200 that may help ensure that heading direction 5980 of vehicle 200 is aligned (i.e., parallel) with direction 5990 of predetermined road model trajectory 5912 at current location 5932 of vehicle 200. Processing unit 110 may also send control signals to steering system 240 to adjust rotation of the wheels of vehicle 200 to turn vehicle 200 so that heading direction 5980 may be aligned with direction 5990 of predetermined road model trajectory 5912 at current location 5932.

Processing unit 110 and/or image acquisition unit 120 may repeat steps 6002 through 6016 after a predetermined amount of time. In one exemplary embodiment, the predetermined amount of time may range between about 0.5 seconds to 1.5 seconds. By repeatedly determining current location 5932 of vehicle 200 based on road signatures, heading direction 5980 based on travelled trajectory 5914, direction 5990 of predetermined road model trajectory 3410 at current location 5932, and the autonomous steering action required to align heading direction 5980 with direction 5990, processing unit 110 and/or image acquisition unit 120 may help to navigate vehicle 200, using road signatures, so that vehicle 200 may travel along road segment 5912.

Forward Navigation Based on Rearward Facing Camera

Consistent with disclosed embodiments, in situations where adverse lighting conditions inhibit navigation using a forward facing camera (e.g., driving into bright sun), navigation can be based on image information obtained from a rearward facing camera.

In one embodiment, a system for autonomously navigating a vehicle may include at least one processor. The at least one processor may be programmed to receive from a rearward facing camera, at least one image representing an area at a rear of the vehicle, analyze the at least one rearward facing image to locate in the image a representation of at least one landmark, determine at least one indicator of position of the landmark relative to the vehicle, determine a forward trajectory for the vehicle based, at least in part, upon the indicator of position of the landmark relative to the vehicle, and cause the vehicle to navigate along the determined forward trajectory.

In related embodiments, the indicator of position of the landmark may include a distance between the vehicle and the landmark and/or a relative angle between the vehicle and the landmark. The landmark may include a road marking, a lane marking, a reflector, a pole, a change in line pattern on a road, a road sign, or any other observable feature associated with a road segment. The landmark may include a backside of a road sign, for example. The at least one processor may be further programmed to determine a lane offset amount of the vehicle within a current lane of travel based on the indicator of position of the landmark, and determination of the forward trajectory may be based on the determined lane offset amount. The at least one processor may be further programmed to receive from another camera, at least one image representing another area of the vehicle, and determination of the forward trajectory may be further based on the at least one image received from the other camera.

In some embodiments, the rearward facing camera may be mounted on an object connected to the vehicle. The object may be a trailer, a bike carrier, a mounting base, a ski/snowboard carrier, or a luggage carrier. The rearward camera interface may be a detachable interface or a wireless interface.

FIG. 61A is a diagrammatic side view representation of an exemplary vehicle 6100 consistent with the disclosed embodiments. Vehicle 6100 may be similar to vehicle 200 of FIG. 2A, except that vehicle 6100 includes in its body an image capture device 6102 facing in a rearward direction relative to vehicle 6100. System 6104 may be similar to system 100 of FIG. 1 and may include a processing unit 6106 similar to processing unit 110. As shown in FIG. 61A, image capture device 6102 may be positioned in the vicinity of a trunk of vehicle 6100. Image capture device 6102 may also be located, for example, at one of the following locations: on or in a side mirror of vehicle 6100; on the roof of vehicle 6100; on a side of vehicle 6100; mounted on, positioned behind, or positioned in front of any of the windows/windshield of vehicle 6100; on or in a rear bumper; mounted in or near light figures on the back of vehicle 6100; or any other locations where image capture device 6102 may capture an image of an area rear of vehicle 6100. In some embodiments, as discussed above, image capture device 6102 may be mounted behind a glare shield that is flush with the rear windshield of vehicle 6100. Such a shield may minimize the impact of reflections from inside vehicle 6100 on image capture device 6102.

FIG. 61A shows one image capture device 6102 facing a rearward direction of vehicle 6100. However, other embodiments may include a plurality of image capture devices located at different positions and facing a rearward direction of vehicle 6100. For example, a first image capture device may be located in the trunk of vehicle 6100 facing a rearward, slightly downward direction of the vehicle 6100, and a second image capture device may be mounted on the roof of vehicle 6100 facing a rearward, slightly upward direction of vehicle 6100. In another example, a first image capture device may be mounted on a left side mirror of vehicle 6100, and a second image capture device may be mounted on a right side mirror of vehicle 6100. Both the first and second image capture devices may face a rearward direction of vehicle 6100.

In some embodiments, the relative positioning of the image capture devices may be selected such that the fields of view of the image capture devices overlap fully, partially, or not at all. Further the image capture devices may have the same or different fields of view and the same or different focal lengths.

FIG. 61A shows an image capture device 6102 facing in a rearward direction relative to vehicle 6100. However, a skilled artesian would recognize that vehicle 6100 may further include any number of image capture devices facing in various directions and that processing unit 6106 may be further programmed to operate these additional image capture devices. For example, vehicle 6100 may further include image capture devices 122 and 124 of FIG. 2A, and processing unit 6106 may be programmed to perform the programmed functions of processing unit 110 of system 100. A skilled artesian would further recognize that having a plurality of image capture devices, one facing a rearward direction of vehicle 6100 and another facing a forward direction of vehicle 6100, may be beneficial in situations where adverse lighting conditions may inhibit navigation using one of the image capture devices (e.g., driving into bright sun). Since adverse lighting conditions rarely affect both image capture devices thereof, system 6104 may be configured to navigate based on images received from an image capture device affected less adversely by the lighting condition in these situations.

In some embodiments, a forward trajectory for the vehicle may be determined based on an image received from a rearward facing camera together with or independent from an image received from a forward facing camera. In some embodiments, a forward trajectory may be determined by, for example, averaging two determined trajectories, one based on images received from a rearward facing camera, and another based on images received from a forward facing camera.

In some embodiments, images from a forward facing camera and a rearward facing camera may be analyzed to determine which is currently providing more useful images. Based on this determination, images from the forward facing camera or the rearward facing camera may selectively be used in navigating the vehicle. For example, in a situation where vehicle 6100 may face a bright light source (e.g., the sun) that causes the forward facing camera to capture an image lacking sufficient detail on which navigational responses may accurately be determined, images collected from a rearward facing camera, not affected by the same light source may be used in navigating the vehicle. This determination and selection of images from the available image streams may be made on the fly.

In some embodiments, navigation may be based on images received from a rearward facing camera because one or more objects (e.g., a large truck or other vehicle) is blocking a portion of a field of view of a forward facing camera. In other situations, navigation may be based on a images collected from a rearward facing camera as a supplement to images collected from a forward facing camera. For example, in some embodiments a vehicle may locate a recognized landmark in a field of view of its forward facing camera. From a time when that recognized landmark first comes into view of the forward facing camera until a time when the vehicle has passed the recognized landmark (or the landmark has otherwise passed out of the field of view of the forward facing camera), navigation can proceed based on images captured of the recognized landmark (e.g., based on any of the techniques described above). Navigation based on the recognized landmark, however, need not end when the vehicle passes the landmark. Rather, a rearward facing camera can capture images of the same recognized landmark as the vehicle travels away from the landmark. These images can be used, as described above, to determine a location of the vehicle relative to a target trajectory for a particular road segment, and images of the backside of the recognized landmark may be usable as long as the backside of the landmark is visible or appears in the images captured by the rearward facing camera. Using such a technique may extend an amount of time that a vehicle can navigate with the benefit of a recognized landmark and delay a time when the vehicle must transition to dead reckoning or another navigational technique not anchored by a known location of a recognized landmark. As a result, navigational error may be even further reduced such that the vehicle even more closely follows a target trajectory.

In some embodiments, an object(s) may be present at the back of vehicle 6100, and this object may be in the field of vision of image capture device 6102, interfering with image capture device's 6102 ability to accurately capture images representing an area at a rear of vehicle 6100. The object may be, for example, a trailer, a mounting base, a bike carrier, a ski/snowboard carrier, or luggage carrier. In these embodiments, image capture device 6102 may be mounted on the object and arranged to capture images representing an area at a rear of the object. FIG. 61B illustrates an exemplary vehicle with such an object.

FIG. 61B is a diagrammatic side view representation of an exemplary vehicle 6150 consistent with the disclosed embodiments. Vehicle 6150 is similar to vehicle 6100 except that vehicle 6150 is towing a trailer 6108 and image capture device 6102 is mounted on trailer 6108. As shown in FIG. 61B, image capture device 6102 is facing a rearward direction of trailer 6108 and positioned to capture images representing an area at a rear of trailer 6108. As discussed above, the presence of trailer 6108 may interfere with any image capture devices that may be mounted on the body of vehicle 6150 and face a rearward direction of vehicle 6108.

In some embodiments, image capture device 6102 of FIG. 61B may have been previously mounted in or on the body of vehicle 6150 (similar to image capture device 6102 of FIG. 61A) and is now repositioned on trailer 6108. In these embodiments, image capture device 6102 may be electrically connected to system 6104 via a detachable electrical interface 6110. A "detachable electrical interface" may be broadly defined as a set of connectors that can be connected and disconnected by a driver or a passenger (or any other person, who may not be a skilled artesian). Detachable electrical interface 6110 allows a user who may not be a skilled artesian, such as the driver or passengers of vehicle 6150, to remount image capture device 6102, for example, from trailer 6108 to vehicle 6150. This capability may be especially useful in situations where vehicle 6150 frequently switches between operating with and without trailer 6108. In other embodiments, rearward facing camera 6102 may be configured to communicate wirelessly with processing unit 6106.

Figure 62:
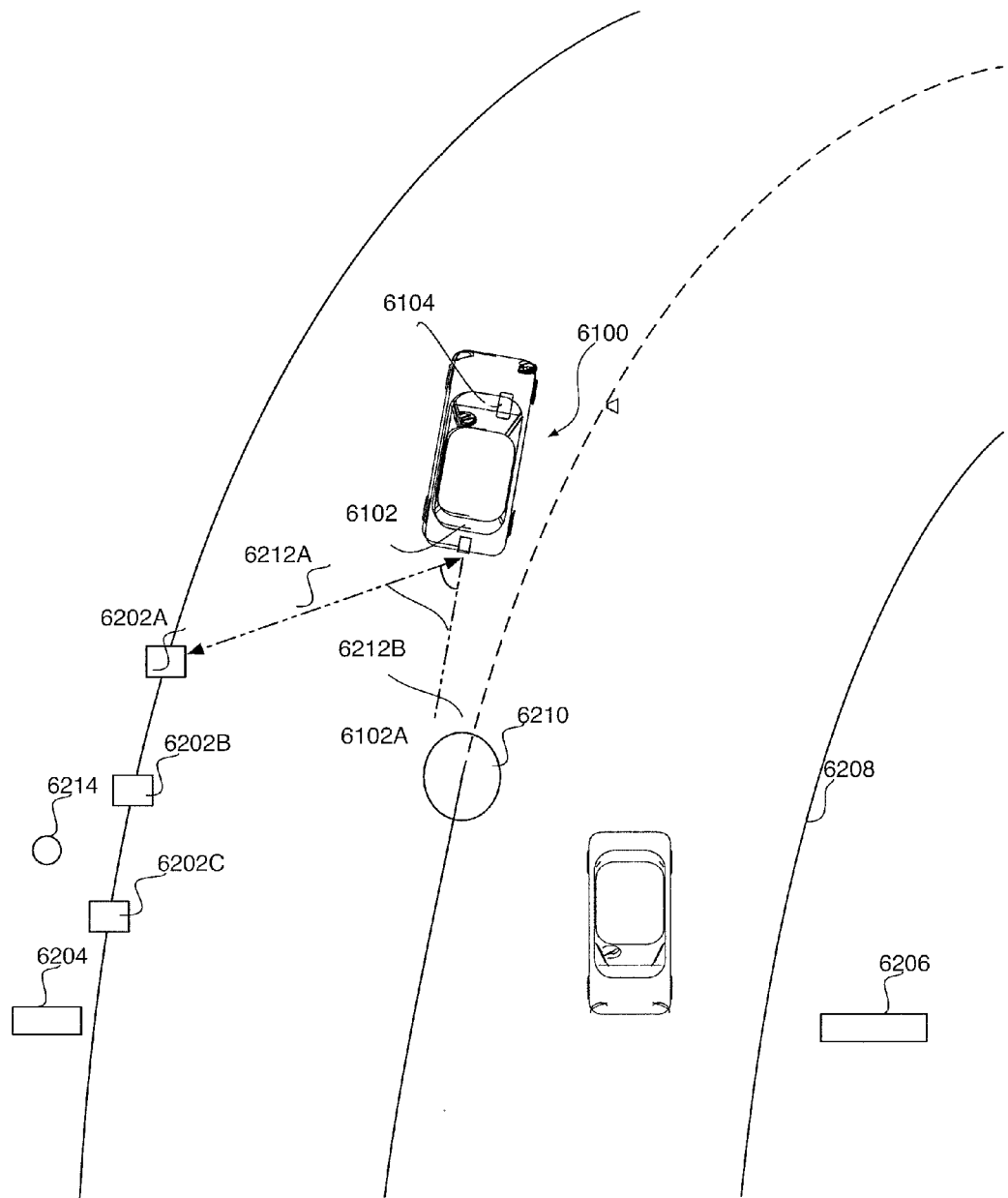
FIG. 62 is a diagrammatic top view representation of an exemplary vehicle autonomously navigating on a road consistent with disclosed embodiments.

FIG. 62 is a diagrammatic top view representation of an exemplary vehicle autonomously navigating on a road consistent with disclosed embodiments. FIG. 62 shows vehicle 6100 of FIG. 61A including image capture device 6102 (with its line of sight 6102A) and system 6104 for autonomously navigating vehicle 6100. FIG. 62 also shows several potential, recognized landmarks, including a road roughness profile 6208 associated with a particular road segment, a change in lane markings 6210, reflectors 6202A-C, a road sign 6204 facing away from vehicle 6100, a road sign 6206 facing towards vehicle 6100, and a pole 6214.

FIG. 62 also shows indicators of position of a landmark relative to vehicle 6100. The indicators of position in FIG. 62 include a distance 6212A and/or a relative angle 6212B between a landmark (e.g., reflector 6202A) and vehicle 6100. An "indicator of position" may refer to any information that relates to a position. Thus, an indicator of position of a landmark may include any information related to the position of the landmark. In the example of FIG. 62, indicators of position of a landmark are determined relative to vehicle 6100.

As shown in FIG. 62, distance 6212A is the distance between image capture device 6102 and the landmark, and angle 6212B is the angle between line of sight 6102A of image capture device 6102 and an imaginary line from image capture device 6102 to the landmark. However, in some embodiments, distance 6212A may be the distance between a reference point in the vicinity of vehicle 6100 and the landmark, and angle 6212B may be the angle between a reference line through the reference point and an imaginary line from the reference point to the landmark. The reference point may be, for example, the center of vehicle 6100, and the reference line may be, for example, a line through the center of vehicle 6100.

In some embodiments, one or more landmarks and/or one or more indicators of position may be used in autonomous navigation of vehicle 6100. For example, the indicators of position may be used to determine a current location of a vehicle relative to a target trajectory stored in sparse map 800, for example. Any of the techniques discussed above with respect to landmark recognition and use in determining one or more navigational responses for a vehicle may be employed based on images received from a rearward facing camera.

Figure 63:
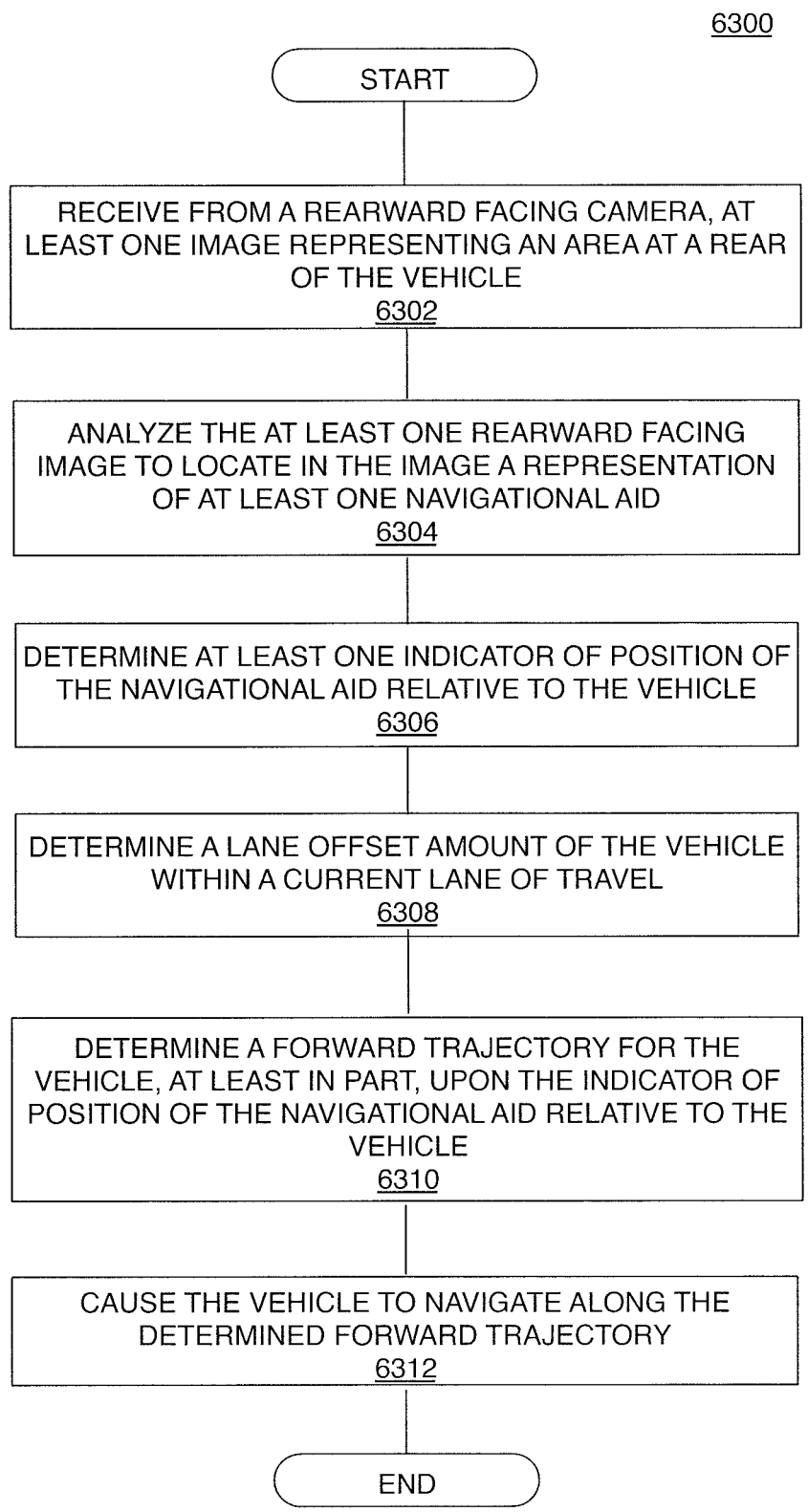
FIG. 63 is a flowchart showing an exemplary process for autonomously navigating a vehicle consistent with disclosed embodiments.

FIG. 63 is a flowchart showing an exemplary process for using one or more landmarks and one or more indicators of position for autonomously navigating a vehicle. Process 6300 may use at least one image from a rearward facing camera and analyze the at least one image to navigate a vehicle along a forward trajectory.

At step 6302, processing unit 6106 may receive from a rearward facing camera, at least one image representing an area at a rear of vehicle 6100. At an optional step, processing unit 6106 may receive from another camera, at least one image representing another area of vehicle 6100. In some embodiments, processing unit 6106 may receive the images via one or more camera interfaces. For example, processing unit 6106 may receive at least one image representing an area at a rear of the vehicle via a rearward camera interface and receive one image representing an area at a front of the vehicle via a forward camera interface. In some embodiments, as discussed above, the one or more camera interfaces may include a detachable interface or a wireless interface.

At step 6304, processing unit 6106 may analyze the at least one rearward facing image to locate in the image a representation of at least one landmark. As discussed above in reference to FIG. 62, a landmark may include, for example, a road profile 6208, a change in lane markings 6210, reflectors 6202A-C, a road sign 6204 facing away from vehicle 6100, a road sign 6206 facing towards vehicle 6100, and a pole 621. Alternatively, or additionally, a landmark may include, for example, a traffic sign, an arrow marking, a lane marking, a traffic light, a stop line, a directional sign, a landmark beacon, a lamppost, a directional sign, a speed limit sign, a road marking, a business sign, a distance marker, or a change in spacing of lines on the road.

In some embodiments, before or after a landmark is located in the received image, processing unit 6106 may retrieve information relating to recognized landmarks in the vicinity of the autonomous vehicle. The information relating to landmarks may include, for example, information relating to size and/or shape of a landmark. The information relating to landmarks may be retrieved from, for example, a database, which may be located in system 6104 or located external to vehicle 6100 (connected to system 6104 via a communication system such as a cellular network or other wireless platform).

At step 6306, processing unit 6106 may determine at least one indicator of position of the landmark relative to the vehicle. For example, an indicator of position may include a distance between a landmark and the vehicle and/or a relative angle between a landmark and the vehicle. As discussed above in reference to FIG. 62, the distance may be, for example, distance 6212A, which is the distance between image capture device 6102 and the landmark, and the angle may be angle 6212B, which is the angle between line of sight 6102A of image capture device 6102 and an imaginary line from image capture device 6102 to the landmark.

In some embodiments, processing unit 6106 may determine at least one indicator of position of the landmark relative to the vehicle based on the representation of the located landmarks in the received image. For example, the size and shape of the representation of the located landmarks in the received image may be used to estimate distance 6212A from vehicle 6100 (e.g., by monitoring a change in scale of the object over multiple image frames). In another example, coordinates of the pixels occupied by the representation of the located landmarks in the received image may be used to estimate angle 6212B. In embodiments where information relating to landmarks is retrieved by processing unit 6106, the information may be used to model and compare with the representation of the located landmarks in the received image. In these embodiments, the information may improve the accuracy of the determined indicators of position.

At an optional step 6308, processing unit 6106 may determine a lane offset amount of the vehicle within a current lane of travel (or even make a determination of a current lane of travel) based on the indicator of position of the landmark relative to the vehicle. For example, such an offset determination or lane determination may be determined by knowing a position of a recognized landmark along with a relative positioning of the recognized landmark with respect to lanes of a road segment. Thus, once a distance and direction are determined relative to a recognized landmark, the current lane of travel and/or amount of lane offset within a particular lane of travel may be calculated. A lane offset of a vehicle may refer to a perpendicular distance from a lane indicator to a reference point. In some embodiments, the reference point may correspond to an edge of a vehicle or a point along a centerline of a vehicle. In other embodiments, the reference point may correspond to a mid-point of a lane or a road. A lane indicator may include, for example, a lane marking, a road edge, reflectors for improving visibility of a lane, or any other object that is on or near the boundaries of a lane. In the above example, the lane offset may be the perpendicular distance from road edge 6208 to vehicle 6100.

At step 6310, processing unit 6106 may determine a forward trajectory for the vehicle based, at least in part, upon the indicator of position of the landmark relative to the vehicle. In embodiments where the optional step 6308 is performed, processing unit 6106 may determine the forward trajectory for the vehicle further based on the determined lane offset amount. In embodiments where processing unit 6106 received from another camera, at least one image representing another area of vehicle 6100, processing unit 6106 may determine the forward trajectory for the vehicle further based on the at least one image received from the another camera. Such a trajectory determination may be based on any of the techniques described above (e.g., navigation based on recognized landmarks, tail alignment, etc.)

At step 6312, processing unit 6106 may cause vehicle 6100 to navigate along the determined forward trajectory. In some embodiments, processing unit 6106 may cause one or more navigational responses in vehicle 6100 to navigate along the determined forward trajectory. Navigational responses may include, for example, a turn, a lane shift, a change in acceleration, and the like. Additionally, multiple navigational responses may occur simultaneously, in sequence, or any combination thereof to navigate along the determined forward trajectory. For instance, processing unit 6106 may cause vehicle 6100 to shift one lane over and then accelerate by, for example, sequentially transmitting control signals to steering system 240 and throttling system 220. Alternatively, processing unit 110 may cause vehicle 6100 to brake while at the same time shifting lanes by, for example, simultaneously transmitting control signals to braking system 230 and steering system 240.

Navigation Based on Free Space Determination

Consistent with disclosed embodiments, the system can recognize parked vehicles, road edges, barriers, pedestrians, and other objects to determine free space boundaries within which the vehicle can travel.

In some situations, free space boundaries may be used to navigate a vehicle. These situations may include, for example, when lane markings are not visible because lanes do not exist and/or because obstacles are covering the lane marks (e.g., parked cars and snow). Alternatively, free space boundaries may be used to navigate a vehicle in addition to the lane-mark-based navigation method to increase the robustness of the system.

Figure 64:
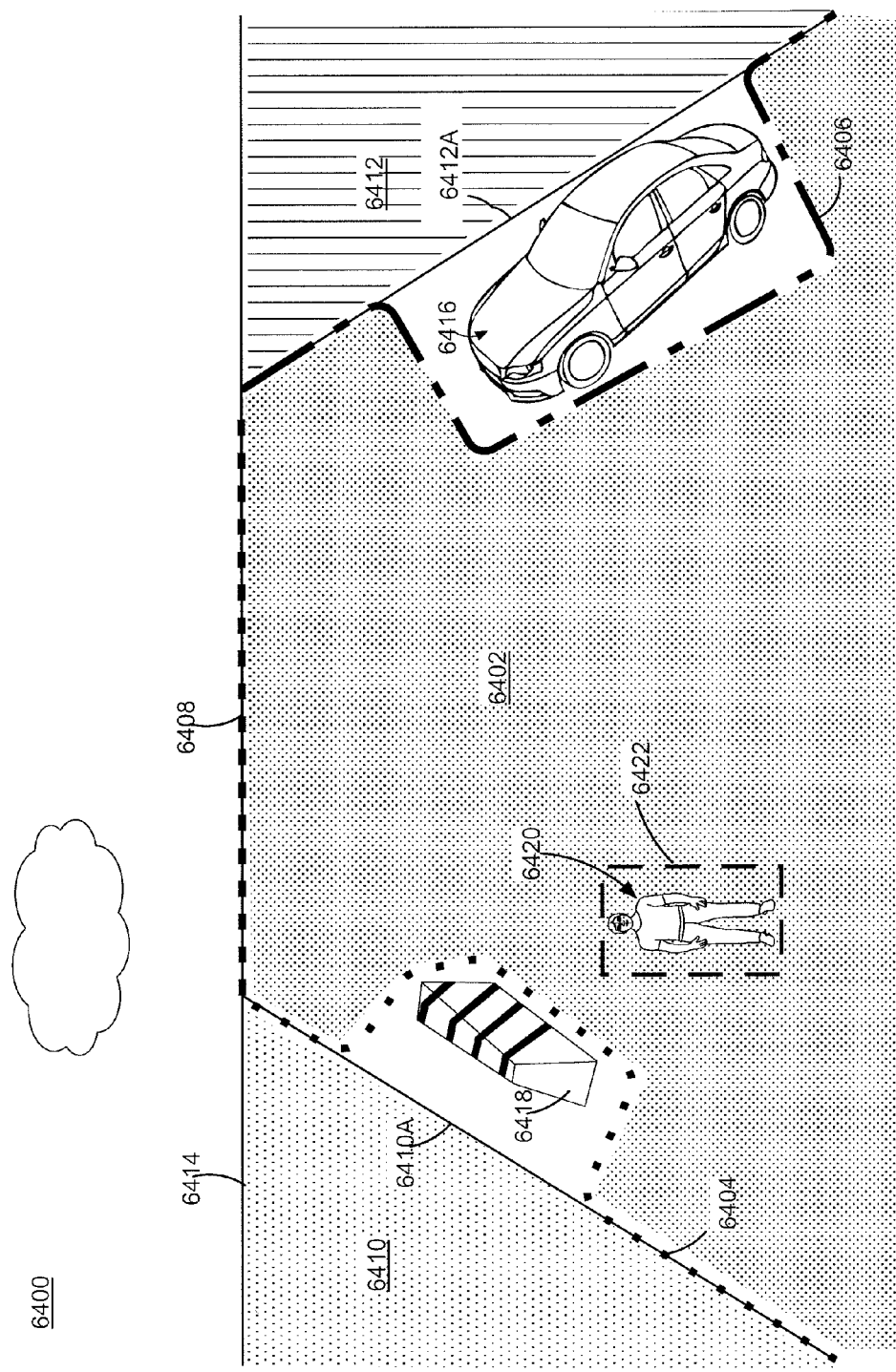
FIG. 64 is a diagrammatic perspective view of an environment captured by a forward facing image capture device on an exemplary vehicle consistent with disclosed embodiments.

FIG. 64 is a diagrammatic perspective view of an environment 6400 captured by a forward facing image capture device on an exemplary vehicle consistent with disclosed embodiments. The exemplary vehicle may be, for example, vehicle 200 described above in reference to FIGS. 2A-2F and may include a processing unit, such as processing unit 110 of vehicle 200. The forward facing image capture device may be, for example, image capture device 122, image capture device 124, or image capture device 126 of vehicle 200.

FIG. 64 shows a non-road area 6410 with a road edge 6410A, a sidewalk 6412 with a curb 6412A, and a road horizon 6414. A road barrier 6418 may be present in the vicinity of road edge 6410A, and a car 6416 may be parked in the vicinity of curb 6412A. FIG. 64 also shows a first free space boundary 6404, a second free space boundary 6406, and a forward free space boundary 6408. Forward free space boundary 6408 may extend between first free space boundary 6404 and second free space boundary 6406. A free space region 6402 forward of the vehicle (not shown in the figure) may be a region bound by these three boundaries and may represent a physically drivable region within environment 6400. First and second free space boundaries 6404, 6406 may each correspond to, for example, a road edge, a road barrier, a parked car, a curb, a lane dividing structure, a tunnel wall, and/or a bridge structure, or a combination thereof. Forward free space 6408 may correspond to, for example, an end of the road, a road horizon, a road barrier, a vehicle, or a combination thereof.

In the example of FIG. 64, first and second free space boundaries 6404, 6406 may each correspond to a plurality of objects. For example, first free space boundary 6404 may correspond to a portion of road edge 6410A and road barrier 6418, and second free space boundary 6406 may correspond to a portion of curb 6412A and parked car 6414. However, in some embodiments, each free space boundary may correspond to a single object. Similarly, forward free space 6408 may correspond to one or more objects. For example, in FIG. 64, forward free space 6408 corresponds to road horizon 6414.

In some embodiments, one or more obstacles may exist in free space region 6402 bound by the three free space boundaries 6404, 6406, and 6408. In these embodiments, the obstacles may be excluded from free space region 6402. In FIG. 64, for example, pedestrian 6420 is standing inside free space region 6402 bound by the three free space boundaries 6404, 6406, and 6408. Therefore, pedestrian 6420 may be excluded from free space region 6402. Alternatively, regions surrounding the obstacles may be excluded from free space region 6402. For example, a region 6422 surrounding pedestrian 6420, instead of the region occupied by pedestrian 6420, may be excluded from free space region 6402. Obstacles may include, for example, a pedestrian, another vehicle, and debris.

A size of a region (e.g., region 6422) surrounding an obstacle (e.g., pedestrian 6420) may determine the minimum distance that may exist between the vehicle and the obstacle during navigation. In some embodiments, the size of the region may be substantially the same as the size of the obstacle. In other embodiments, the size of the region may be determined based on the type of the obstacle. For example, region 6422 surrounding pedestrian 6420 may be relatively large for safety reasons, while another region surrounding debris may be relatively small. In some embodiments, the size of the region may be determined based on the speed at which the obstacle is moving, frame rate of the image capture device, speed of the vehicle, or a combination thereof. In some embodiments, a shape of a region surrounding an obstacle may be a circle, a triangle, a rectangle, or a polygon.

In FIG. 64, first free space boundary 6404 corresponds to a portion of road edge 6410 and road barrier 6148, and second free space boundary 6406 corresponds to a portion of curb 6412A and parked car 6416. However, in other embodiments, first and second free space boundaries 6404, 6406 may correspond to road edge 6410A and curb 6412A, respectively, and road barrier 6148 and parked car 6416 may be considered as obstacles.

In some embodiments, regions between obstacles may be excluded from free space region 6402. For example, if a width of a region between two obstacles is less than the width of the vehicle, the region may be excluded from free space region 6402.

Figure 65:
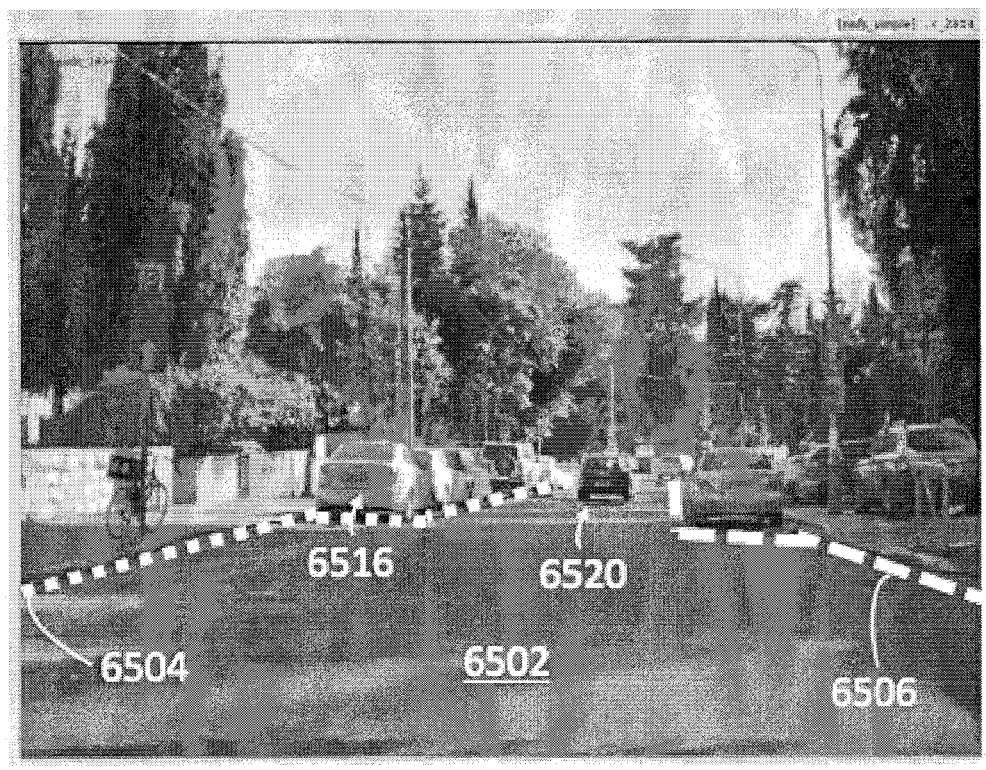
FIG. 65 is an exemplary image received from a forward facing image capture device of a vehicle consistent with disclosed embodiments.

FIG. 65 is an exemplary image received from a forward facing image capture device of a vehicle consistent with disclosed embodiments. FIG. 65 shows a first free space boundary 6504 and a second free space boundary 6506. Both free space boundaries correspond to curbs and parked cars (e.g., parked car 6516) on each side of the road. FIG. 65 also shows a free space region 6502, which may be defined by first free space boundary 6504, a second free space boundary 6506, and a forward free space boundary (not shown). Additionally, FIG. 65 shows a moving car 6520, which may be considered as an obstacle. Therefore, moving car 6520 may be excluded from free space region 6502.

Figure 66:
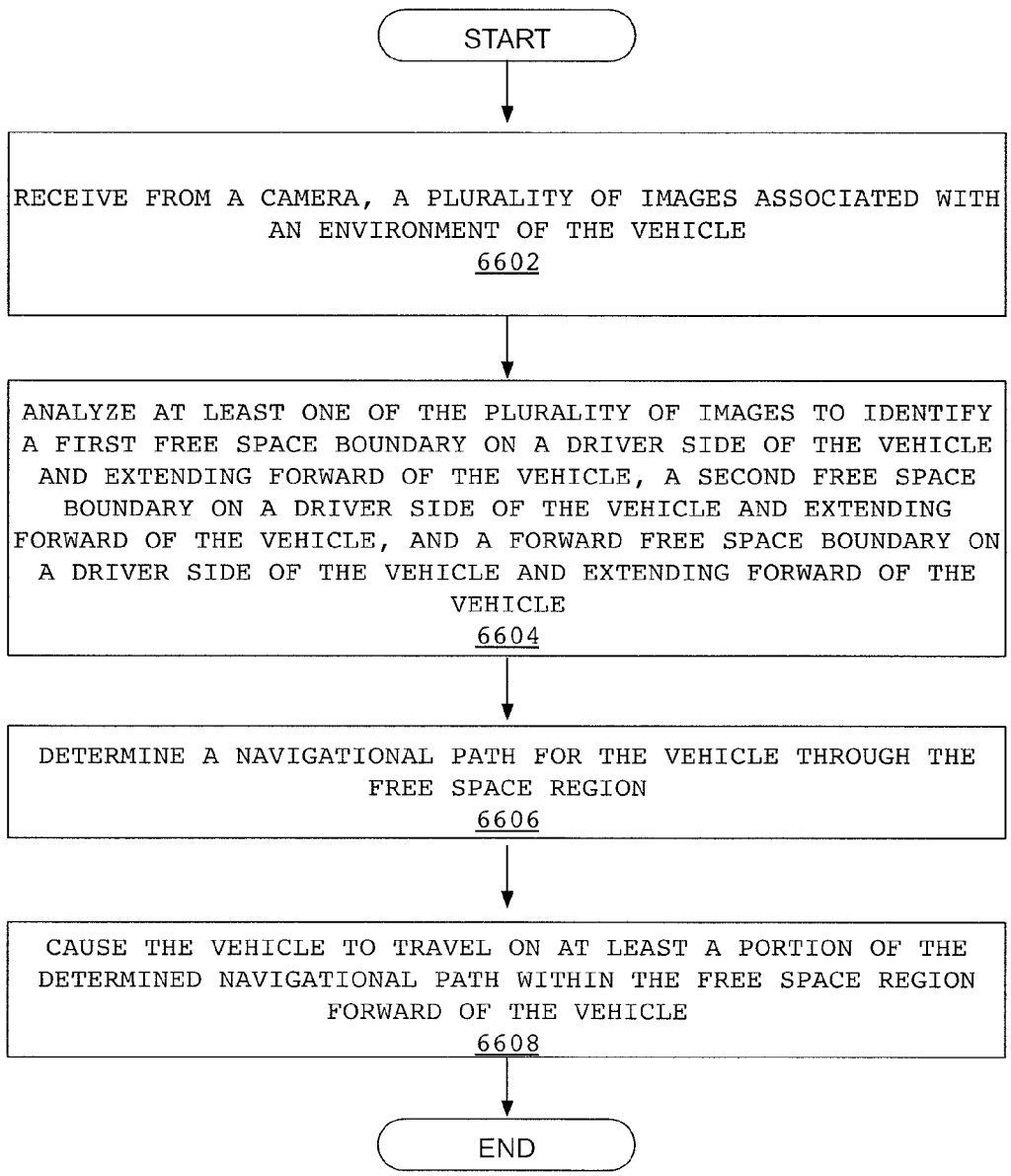
FIG. 66 is a flowchart showing an exemplary process for navigating a vehicle by determining a free space region in which the vehicle can travel consistent with disclosed embodiments.

FIG. 66 is a flowchart showing exemplary process 6600 for navigating vehicle 200 based on free space region 6402 in which vehicle 200 can travel consistent with disclosed embodiments. Process 6300 may use a plurality of images from a forward facing image capture device, analyze at least one image of the plurality of images to identify free space boundaries and define a free space region bound by the identified free space boundaries. Furthermore, process 6300 may navigate a vehicle based on the defined free space region.

At step 6602, processing unit 110 may receive from image capture device 122, a plurality of images associated with environment 6400 of vehicle 200. As discussed above, FIG. 65 is an example of an image that may be received from image capture device 122. In some embodiments, images may be captured at different times by image capture device 122 (e.g., images may be captured apart by less than a second, 1 second, 2 second, etc.). In some embodiments, vehicle 200 may include a plurality of image capture devices (e.g., image capture devices 122 and 124 of vehicle 200), and processing unit 110 may receive from each image capture device, a plurality of images associated with environment 6400 of vehicle 200. The plurality of images received from each image capture device may be images captured at different times by each image capture device.

At step 6604, processing unit 110 may analyze at least one of the plurality of images received from, for example, image capture device 122. In embodiments where a single plurality of images is generated based on images received from a plurality of image capture devices, processing unit 110 may analyze at least one image of the single plurality of images. Alternatively, each image received from each image capture device may be analyzed independently.

Additionally, processing unit 110 may identify a first free space boundary 6404 on a driver side of vehicle 200 and extending forward of vehicle 200, a second free space boundary 6406 on a passenger side of vehicle 200 and extending forward of vehicle 200, and a forward free space boundary 6408 forward of vehicle 200 and extending between first free space boundary 6404 and second free space boundary 6406. Additionally, processing unit 110 may further identify a free space region 6402 forward of the vehicle as the region bound by first free space boundary 6404, the second free space boundary 6406, and forward free space boundary 6408. As discussed above, first and second free space boundaries 6404, 6406 may each correspond to, for example, a road edge, a road barrier, a parked car, a curb, a lane dividing structure, a tunnel wall, and/or a bridge structure, or a combination thereof. Furthermore, as discussed above, forward free space 6408 may correspond to, for example, an end of the road, a road horizon, a road barrier, a vehicle, or a combination thereof.

At an optional step, processing unit 110 may identify, based on the analysis at step 6604, an obstacle (e.g., pedestrian 6420) forward of vehicle 200 and exclude the identified obstacle from free space region 6402 forward of vehicle 200. Alternatively, processing unit 110 may identify, based on analysis of the at least one of the plurality of images at step 6640, an obstacle (e.g., pedestrian 6420) forward of the vehicle and exclude a region (e.g., region 6422) surrounding the identified obstacle from free space region 6402 forward of the vehicle.

In some embodiments, as discussed above, the size of the region surrounding the identified obstacle may be substantially the same as the size of the obstacle, or alternatively, the size of the region surrounding the obstacle may be determined based on the type of obstacle. In some embodiments, as discussed above, the size of the region may be determined based on the speed at which the obstacle is moving, a frame rate of image capture device 122, speed of vehicle 200, or a combination thereof.

At another optional step, processing unit 110 may exclude, from free space region 6402, regions between the identified obstacles and/or regions between identified obstacles and free space boundaries 6404, 6406. In some embodiments, as discussed above, processing unit 110 may determine whether to exclude the regions between the identified obstacles based on a distance between the identified obstacles. Furthermore, processing unit 110 may determine whether to exclude the regions between identified obstacles and free space boundaries 6404, 6406 based on the distance between identified obstacles and free space boundaries 6404, 6406.

At step 6606, processing unit 110 may determine a navigational path for vehicle 200 through free space region 6402. In some embodiments, the navigational path may be a path through the center of free space region 6402. In other embodiments, the navigational path may be a path that is a predetermined distance away from one of first and second free space boundaries 6404, 6406. The predetermined distance may be a fixed distance, or alternatively, the predetermined distance may be determined based on, for example, one or more of the following: speed of vehicle 200, width of free space region 6402, and number of obstacles within free space region 6402. Alternatively, the navigational path may be, for example, a path that uses the minimum number of navigational responses or the shorted path.

At step 6608, processing unit 110 may cause vehicle 200 to travel on at least a portion of the determined navigational path within the free space region 6402 forward of vehicle 200. In some embodiments, processing unit 110 may cause one or more navigational responses in vehicle 200 to navigate along the determined navigational path. Navigational responses may include, for example, a turn, a lane shift, a change in acceleration, and the like. Additionally, multiple navigational responses may occur simultaneously, in sequence, or any combination thereof to navigate along the determined forward trajectory. For instance, processing unit 110 may cause vehicle 200 to move laterally and then accelerate by, for example, sequentially transmitting control signals to steering system 240 and throttling system 220. Alternatively, processing unit 110 may cause vehicle 200 to brake while at the same time moving laterally, for example, simultaneously transmitting control signals to braking system 230 and steering system 240. Further, for example, the free space boundary may serve as a localization aid in the same way that lane marks are being used. Once the free space boundary is encoded, it may describe a 3D curve in space. At the localization stage, the projection of that 3D curve to the image may provide a localization cue, since it may collide with the free space detection at that location.

Navigating in Snow

Consistent with disclosed embodiments, the system may determine the edges of a road in poor weather conditions, such as when a road is covered in snow. For example, the system may take into account changes in light, the curve of a tree line, and tire tracks to determine probable locations of the edges of the road.

Figure 67:
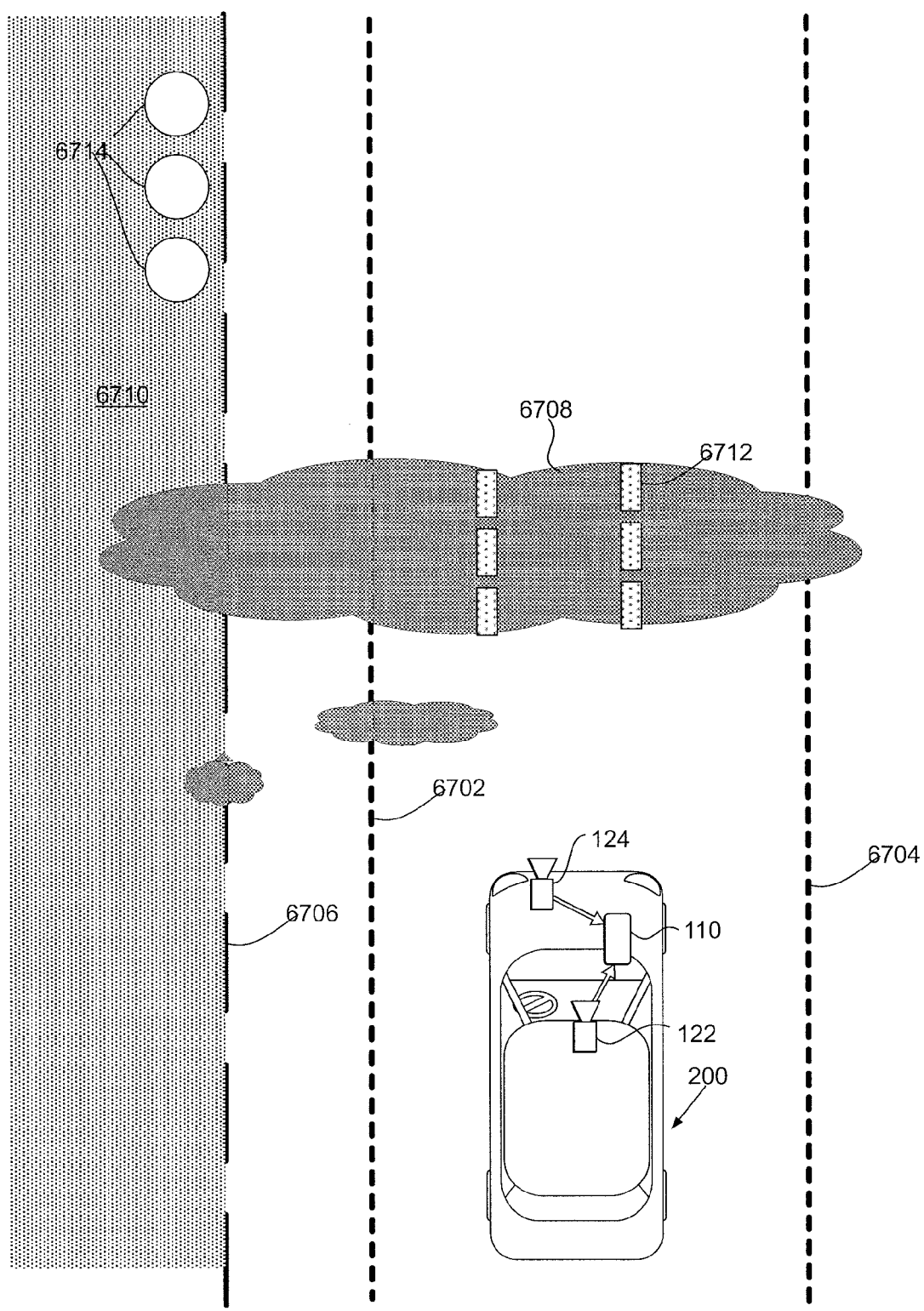
FIG. 67 is a diagrammatic top view representation of an exemplary vehicle navigating on a road with snow covering at least some lane markings and road edges consistent with disclosed embodiments.

FIG. 67 is a diagrammatic top view representation of an exemplary vehicle navigating on a road with snow covering at least some lane markings and road edges consistent with disclosed embodiments. The exemplary vehicle may be, for example, vehicle 200 described above in reference to FIGS. 2A-2F and may include a processing unit, such as processing unit 110 of vehicle 200. The forward facing image capture device may be, for example, image capture device 122, image capture device 124, or image capture device 126 of vehicle 200.

In FIG. 67, the road may include a driver side lane mark 6702 and a passenger side lane mark 6704. FIG. 67 also shows a non-road area 6710 and a road edge 6706. In one example, non-road area 6710 may be a non-paved area, a sidewalk, or a beginning of a hill. In another example, non-road area 6710 may be an area without a platform, such as an area with a sharp vertical drop (i.e., cliff).

FIG. 67 also shows an area covered by snow 6708. Specifically, area 6708 covers a portion of road edge 6706 and portions of lane marks 6702, 6704. Thus, road edge 6706 and/or one or more of lane marks 6702, 6704 may not be readily apparent through analysis of images captured during navigation of vehicle 200. In such situations, vehicle 200 may navigate based on analysis of captured images by determining probable locations for road edges bounding the portion of the road that is covered with snow.

In some embodiments, the determination of the probable locations for road edges may be based on tire tracks 6712 over an area covered by snow 6708. For example, the presence of tire tracks 6712 may indicate that the portion of an area covered by snow 6708 with tire tracks 6712 is within the bounds of road edges. In some embodiments, the processing unit of the vehicle may consider the path of the tire tracks as a viable navigational path and may cause the vehicle to follow the tire tracks subject to consideration of other criteria (e.g., whether the tracks remain within an area determined as likely corresponding to the road or, more specifically, a lane of travel for the vehicle).

In other embodiments, the determination of the probable locations for road edges may be based on a change of light across a surface of area covered by snow 6708. The source of the light may include, for example, headlights of vehicle 200, light from other vehicles, street lights, or the sun. The change of light across the surface of area covered by snow 6708 may occur for various reasons. In one example, surface roughness of non-road area 6710 and surface roughness of the road may be different; non-road area 6710 may be a gravel area, while the road may be a paved area. In another example, non-road area 6710 and the road may not be level. Non-road area 6710 may be a sidewalk, which is typically raised above the road; alternatively, non-road area 6710 may be a hill or a cliff. Each of these may alter the surface of a covering of snow and may be recognized based on certain variations in the surface of the snow covering (e.g., changes in height, changes in texture, etc.) which may be accentuated by shadows cast across the snow surface.

In other embodiments, the determination of the probable locations for road edges may be based on a plurality of trees (e.g., forming a tree line) along an edge of the road. For example, in FIG. 67, trees 6714 may be present along the road edge and visible even when snow covers road edge 6706. In situations where trees 6714 are present close to road edge 6714, the location of trees 6714 may be used as a probable location of a road edge. However, in some situations, trees 6714 may be present some distance away from a road edge. Therefore, in some embodiments, the probable location of a road edge may be determined as a location that is a distance away from the location of trees 6714. The distance may be a fixed value, or alternatively, the distance may be dynamically determined based on, for example, a last visible road edge.

In other embodiments, the determination of the probable locations for road edges may be based on an observed changes in curvature at a surface of the snow. The change in curvature at a surface of the snow may occur for various reasons. For example, a change in curvature at a surface of snow may occur when non-road area 6710 and the road are not level. In situations where non-road area 6710 is, for example, a sidewalk typically raised above the road, the snow may pile up near road edge 6706 thereby changing the curvature of snow near road edge 6706. In other situations, the non-road area may be a beginning of a hill, and the curvature at the surface of the snow may follow the curvature of the hill beginning at road edge 6706. In these embodiments, the location where the curvature begins to change may be determined as a probable location of a road edge.

Figure 68:
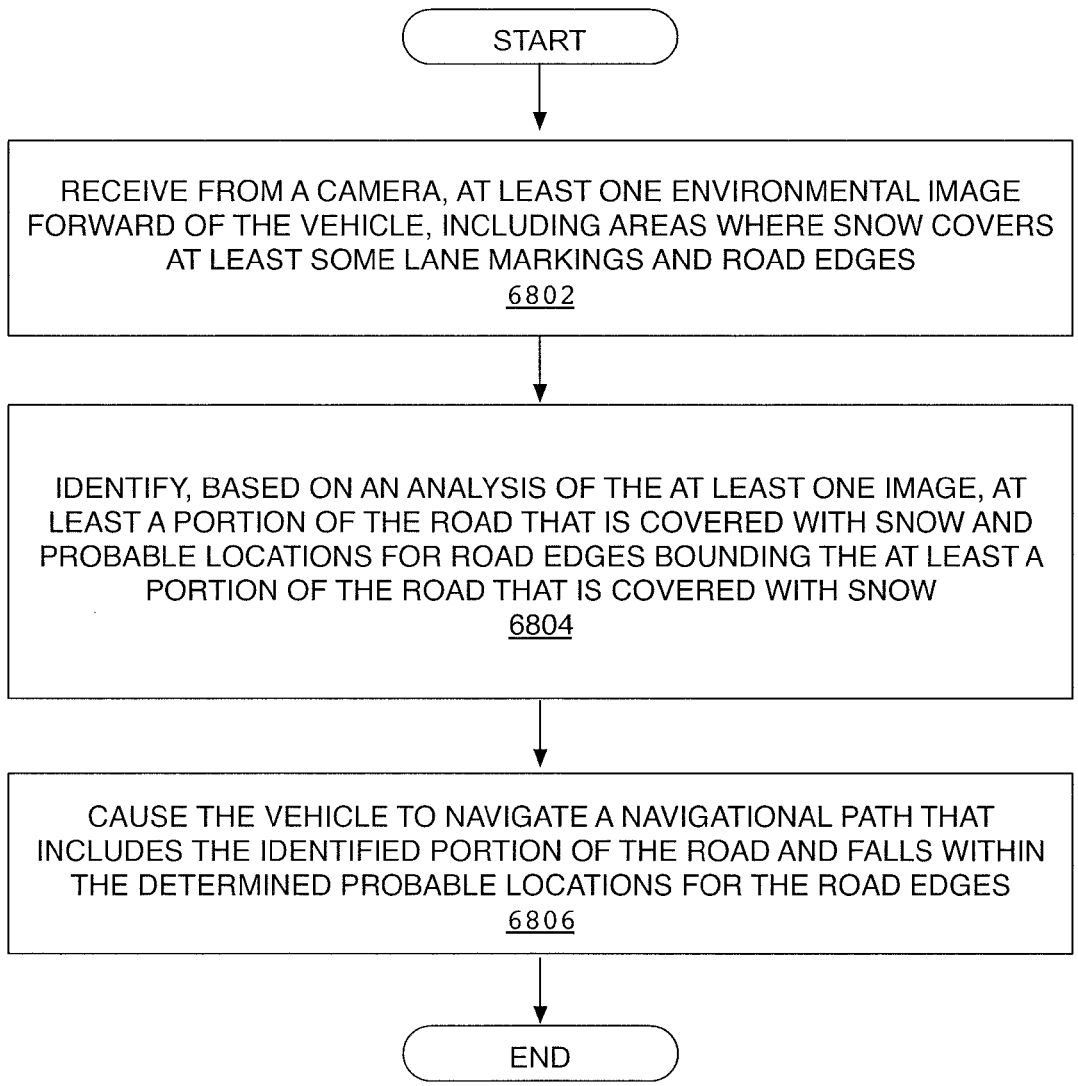
FIG. 68 is a flowchart showing an exemplary process for navigating a vehicle on a road with snow covering at least some lane markings and road edges consistent with disclosed embodiments.

FIG. 68 is a flowchart showing an exemplary process 6800 for navigating vehicle 200 on a road with snow covering at least some lane markings and road edges consistent with disclosed embodiments. Process 6800 may use the probable locations for road edges, as described above, to navigate vehicle 200.

At 6802, processing unit 110 may receive from an image capture device, at least one environmental image forward of the vehicle, including areas where snow covers at least some lane markings (e.g., lane marks 6702, 6704) and road edges (e.g., road edge 6706).

At step 6804, processing unit 110 may identify, based on an analysis of the at least one image, at least a portion of the road that is covered with snow and probable locations for road edges bounding the at least a portion of the road that is covered with snow. As discussed above, the analysis of the at least one image may include identifying at least one tire track in the snow, a change of light across a surface of the snow, and/or a trees along an edge of the road. Further, as discussed above, the analysis of the at least one image may include recognizing a change in curvature at a surface of the snow, where the recognized change in curvature is determined to correspond to a probable location of a road edge.

In some embodiments, the analysis of the at least one image may include a pixel analysis of the at least one image in which at least a first pixel is compared to at least a second pixel in order to determine a feature associated with a surface of the snow covering at least some lane markings and road edges. For example, each pixel in the image may be compared with every adjacent pixel. In some embodiments, a color of the first pixel may be compared to a color of at least the second pixel. Alternatively, or additionally, an intensity of a color component of the first pixel may be compared to an intensity of the color component of at least the second pixel. In other embodiments, the following properties of a pixel may be compared.

In some embodiments, the pixel analysis may identify features such as an edge of tire track 6712 or road edge 6706. The analysis for identifying such features may include identifying a set of pixels where a rate in which a pixel property changes exceeds a threshold rate. The pixel property may include, for example, color of a pixel and/or intensity of a color component of a pixel.

At step 6806, processing unit 110 may cause the vehicle to navigate a navigational path that includes the identified portion of the road and falls within the determined probable locations for the road edges.

In embodiments where the probable location for road edges are determined based on the identified tire tracks 6712, processing unit 110 may cause vehicle 200 to navigate by at least partially following the identified tire tracks 6712 in the snow. In embodiments where the probable location for road edges (e.g., road edges 6702, 6704) are determined based on a change of light across a surface of area covered by snow 6708, a plurality of trees (e.g., forming a tree line) along an edge of the road, and/or a change in curvature at a surface of the snow, processing unit 110 may cause vehicle 200 to navigate between the determined edges of the road.

Furthermore, in embodiments where edges of the road are determined by analyzing pixels of the image received at step 6802, processing unit 110 may cause vehicle 200 to navigate between the determined edges of the road. In embodiments where an edge of a tire track is determined by analyzing pixels of the image received at step 6802, processing unit 110 may cause vehicle 200 to navigate by at least partially following tire tracks in the snow.

In some embodiments, processing unit 110 may cause one or more navigational responses in vehicle 200 to navigate along the determined navigational path. Navigational responses may include, for example, a turn, a lane shift, a change in acceleration, and the like. Additionally, multiple navigational responses may occur simultaneously, in sequence, or any combination thereof to navigate along the determined forward trajectory. For instance, processing unit 110 may cause vehicle 200 to move laterally and then accelerate by, for example, sequentially transmitting control signals to steering system 240 and throttling system 220. Alternatively, processing unit 110 may cause vehicle 200 to brake while at the same time moving laterally, for example, simultaneously transmitting control signals to braking system 230 and steering system 240.

Additional techniques may also be employed by processing unit 110 for navigating a vehicle on a road at least partially covered with snow. For example, in some embodiments, one or more neural networks may be employed to aid in determination of a proposed path of travel along a road covered in snow. This technique may be referred to as holistic path prediction (HPP). Such a neural network may be trained, for example, by being supplied with images as a user drives along a road. To train the neural network in navigation of a snow covered road, various testing situations involving snow covered roads may be used. Using images (perhaps thousands of training images, millions of images, or more) of roads covered with snow captured as a driver navigates a vehicle along snow covered roads, the neural network will learn to develop a proposed navigational path along the snow. The process may involve setting up the neural network to periodically or continuously generate a proposed navigational path based on observed features of the snow covered road (including, for example, aspects of the surface of the road, edges of the road, sides of the road, barriers present, objects adjacent to the road, cars on the road, etc.) and test the proposed navigational path against actual behavior of the driver. Where the proposed navigational path diverges from the actual path the driver follows, the neural network will analyze the available images and make adjustments to its processing algorithm in order to provide a different response in a similar situation in the future (e.g., to provide a proposed navigational path that more closely matches the behavior of the driver). Once trained, the neural network may provide a proposed navigational path over a road covered with snow. Navigation through snow may be based solely on the output of a single trained neural network In some embodiments, however, other techniques may be used to navigate the vehicle through snow. In some embodiments, the free space determination technique described in another section of this disclosure may be used to define a path forward of the vehicle through an area perceived as free space. For example, based on a captured image or image stream, processing unit 110 may analyze at least one of the plurality of images to identify a first free space boundary on a driver side of the vehicle and extending forward of the vehicle. A second free space boundary may be identified on a passenger side of the vehicle and extending forward of the vehicle. A forward free space boundary may be identified forward of the vehicle and extending between the first free space boundary and the second free space boundary. Of course, these boundaries need not be straight lines, but instead, can be represented by a complex series of curves or line segments that delineate sometimes highly irregular boundary conditions (especially on the sides of the vehicle). Together, first free space boundary, the second free space boundary, and the forward free space boundary define a free space region forward of the vehicle. Processing unit 110 may then determine a proposed navigational path for the vehicle through the free space region. Navigation of the vehicle through snow may be based on the free space determination technique alone. It should be noted that the free space determination technique may be implemented using one or more neural networks. In some embodiments, the neural network that implements the free space determination technique may be different from the neural network that implements the HPP technique.

In some embodiments, navigation through snow may be based on one or more techniques used in combination. For example, any of the disclosed navigational systems may be used together to navigate a vehicle in snow. In some embodiments, the free space determination technique may be combined with the HPP technique. That is, a plurality of captured images may be supplied to a neural network implementing the free space technique in order to obtain a first proposed navigational path for the vehicle. The plurality of captured images may also be supplied to the neural network implementing the HPP technique to obtain a second proposed navigational path for the vehicle. If the processing unit determines that the first proposed navigational path agrees with the second proposed navigational path, then the processing unit may cause the vehicle to travel on at least a portion of one of the proposed navigational paths (or an aggregate of the proposed navigational paths). In this context, agreement does not necessarily require an exact match of the proposed navigational paths. Rather, agreement may be determined if the proposed navigational paths have greater than a predetermined degree of correlation (which may be determined using any suitable compare function).

If the first proposed navigational path does not agree with the second proposed navigational path, then a prompt may be provided to the user to take over control of at least some aspect of the vehicle. Alternatively, additional information may be considered in order to determine an appropriate navigational path for the vehicle. For example, where there is disagreement in the proposed navigational paths from the free space and HPP techniques, processing unit 110 may look to a target trajectory from sparse data map 800 (along with an ego motion estimation or landmark based determination of a current position relative to the target trajectory) to determine a direction of travel for the vehicle. Outputs from other modules operating on processing unit 110 may also be consulted. For example, a vehicle detection module may provide an indication of the presence of other vehicles in the environment of the host vehicle. Such vehicles may be used to aid in path prediction for the host vehicle (e.g., by following a lead vehicle, avoiding a parked vehicle, etc.). A hazard detection module may be consulted to determine the presence of any edges in or along the roadway having a height exceeding a threshold. A curve detection module may be consulted to locate a curve forward of the vehicle and to propose a path through the curve. Any other suitable detection/analysis module operating on processing unit 110 may also be consulted for input that may aid in establishing a valid path forward for the host vehicle.

The description and the figures above show a road that is covered by snow; however, in some embodiments, a road may be covered with object(s) other than snow. For example, the road may be covered with sand or gravel instead of snow, and the disclosed embodiments may similarly be applied to roads covered with these objects.

Autonomous Vehicle Speed Calibration

In some situations, vehicle navigation can be based on dead reckoning (for example, at least for short segments) where the vehicle determines its current location based on its last known position, its speed history, and its motion history. Dead reckoning, however, may introduce accumulating errors because every new position determination may rely upon measurements of translational and rotational velocities, which may introduce a certain level of error. Similarly, each new position determination may rely upon a previously determined coordinate, which, in turn, may have been based on measurements including their own inaccuracies. Such inaccuracies and errors may be imparted into the dead reckoned position determinations through various sources, such as the outputs of vehicle speed sensors for example. Even small inaccuracies in speed sensing may accumulate over time. For example, in some cases, small errors in speed sensing (e.g., on the order of 1 km/hr or even less) may result position determination errors on the order of 1 meter, 5 meters, or more over a kilometer. Such errors, however, may be reduced or eliminated through calibration of vehicle speed sensors. According to the disclosed embodiments, such calibration may be performed by an autonomous vehicle based on known landmark positions or based on a reference distance along a road segment being traversed by the vehicle.

Figure 69:
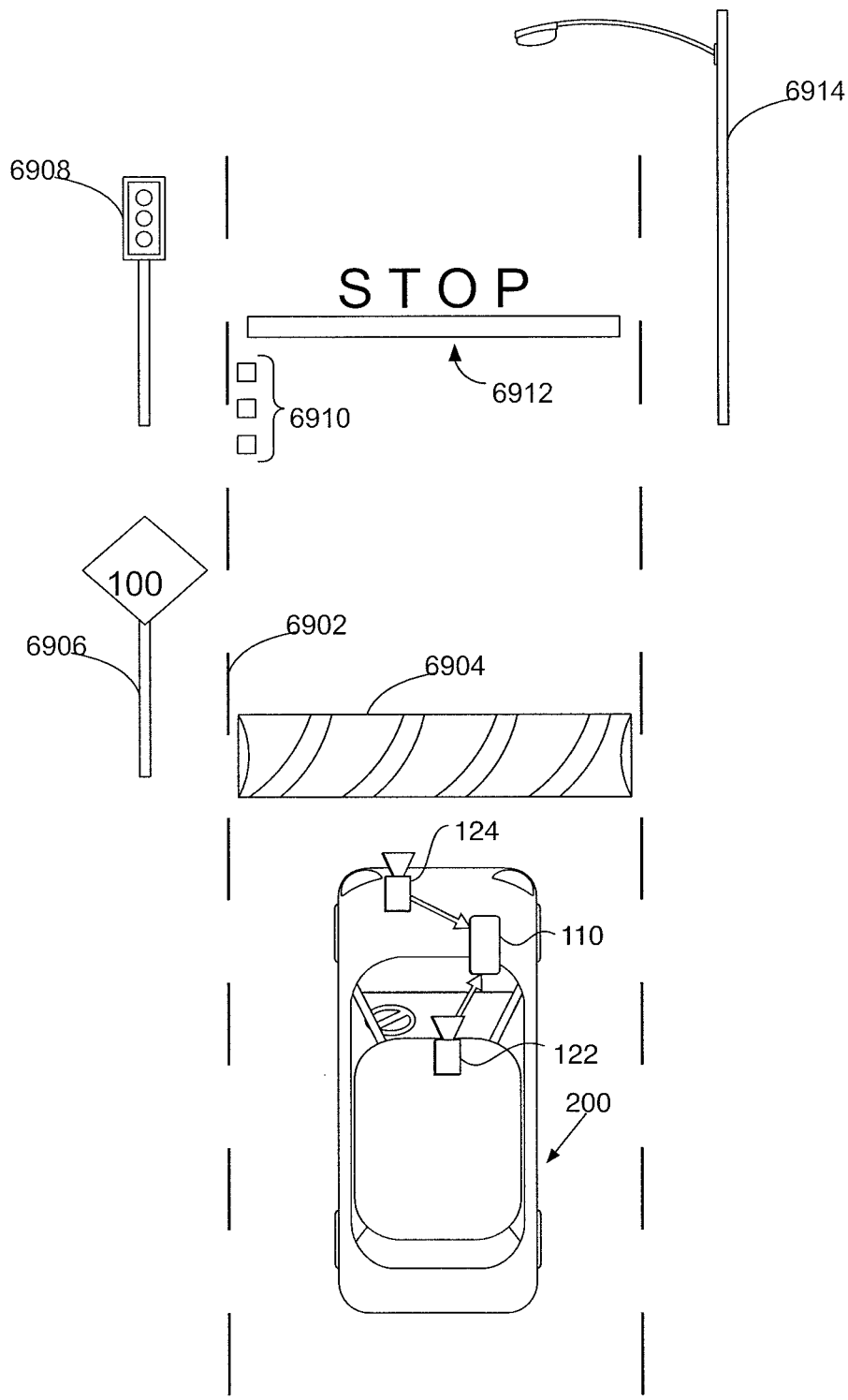
FIG. 69 is a diagrammatic top view representation of an exemplary vehicle including a system for calibrating a speed of the vehicle consistent with disclosed embodiments.

FIG. 69 is a diagrammatic top view representation of an exemplary vehicle including a system for calibrating a speed of the vehicle consistent with disclosed embodiments. The exemplary vehicle may be, for example, vehicle 200 described above in reference to FIGS. 2A-2F and may include a processing unit, such as processing unit 110 of vehicle 200. The forward facing image capture device may include, for example, image capture device 122, image capture device 124, or image capture device 126 of vehicle 200. Such image capture devices may be configured to obtain images of an environment forward, to the side, and/or to the rear of vehicle 200.

In some embodiments, vehicle 200 may include various sensors. Such sensors may include one or more speed sensors, GPS receivers, accelerometers, etc.

In some embodiments, recognized landmarks may be used in a speed calibration process for the vehicle. Such recognized landmarks may include those landmarks represented in sparse map 800, for example. FIG. 69 shows examples of landmarks that may be used for calibrating speed of vehicle 200. For example, FIG. 69 shows landmarks such as a traffic sign 6906, a dashed lane marking 6902, a traffic light 6908, a stop line 6912, reflectors 6910, and a lamp post 6914. Other landmarks may include, for example, an arrow marking, a directional sign, a landmark beacon, a speed bump 6904, etc.

In some embodiments, processing unit 110 of vehicle 200 may identify one or more recognized landmarks. Processing unit 110 may identify the one or more recognized visual landmarks based on any of the previously described techniques. For example, processing unit 110 may receive a local map associated with sparse map 800 (or may even receive or be loaded with sparse map 800) including representations of recognized landmarks. Because these landmarks may be indexed and/or because processing unit 110 may be aware of a current position of vehicle 200 (e.g., with respect to a target trajectory along a road segment), processor unit 110 may anticipate a location for the next expected recognized landmark as it traverses a road segment. In this way, processor unit 110 may even "look" to a particular location within images received from image capture device 122 where the next recognized landmark is expected to appear. Once the recognized landmark is located within a captured image or captured images, processor unit 110 may verify that the landmark appearing in the images is the expected recognized landmark. For example, various characteristics associated with the landmark in a captured image may be compared with information stored in sparse data map 800 relative to the recognized landmark. Such characteristics may include a size, landmark type (e.g., speed limit sign, hazard sign, etc.), position, distance from a previous landmark, etc. If the observed characteristics for a landmark match those stored relative to a recognized landmark, then processor unit 110 can conclude that the observed landmark is the expected recognized landmark.

In some embodiments, after identifying a recognized landmark, processing unit 110 may retrieve information associated with the recognized landmarks. The information may include, for example, positional information of the recognized landmarks. In some embodiments, the information associated with the recognized landmarks may be stored on a remote server, and processing unit 110 may instruct a wireless system of vehicle 200, which may include a wireless transceiver, to retrieve the information associated with the recognized landmarks. In other cases, the information may already reside on vehicle 200 (e.g., within a local map from sparse data map 800 received during navigation or within a sparse data map 800 preloaded into memory of vehicle 200). In some embodiments, this positional information may be used to calibrate one or more indicators of speed of an autonomous vehicle (e.g., one or more speed sensors of vehicle 200).

Figure 70:
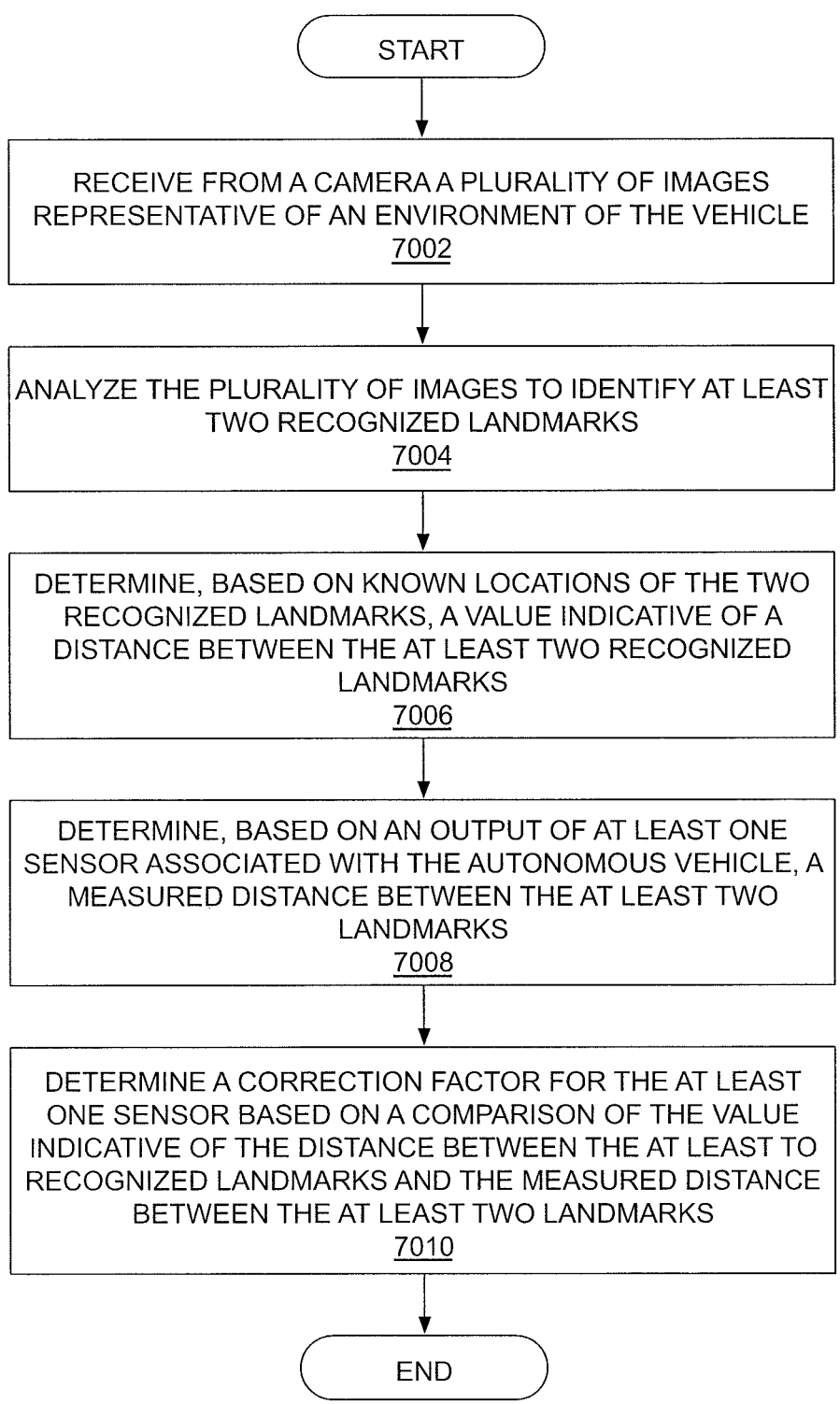
FIG. 70 is a flowchart showing an exemplary process for calibrating a speed of a vehicle consistent with disclosed embodiments.

FIG. 70 is a flowchart showing an exemplary process 7000 for calibrating a speed of vehicle 200 consistent with disclosed embodiments. At step 7002, processing unit 110 may receive from an image capture device 122 a plurality of images representative of an environment of vehicle 200. In some embodiments, images may be captured at different times by image capture device 122 (e.g., images may be captured many times per second, for example). In some embodiments, vehicle 200 may include a plurality of image capture devices (e.g., image capture devices 122 and 124 of vehicle 200), and processing unit 110 may receive from each image capture device, a plurality of images representative of an environment of vehicle 200. The plurality of images received from each image capture device may include images captured at different times by one or more of the image capture devices on the vehicle.

At step 7004, processing unit 110 may analyze the plurality of images to identify at least two recognized landmarks present in the images. The two recognized landmarks need not be present in a single image from among the plurality of images. In fact, in many cases, the two recognized landmarks identified in the plurality of images will not appear in the same images. Rather, a first recognized landmark may be identified in a first image received from an image capture device. At a later time, and perhaps many image frames later (e.g., 10s, 100s, or 1000s of image frames later, or more), a second recognized landmark may be identified in another of the plurality of images received from the image capture device. The first recognized landmark may be used to determine a first location S1 of the vehicle along a target trajectory at time T1, and the second recognized landmark may be used to determine a second location S2 of the vehicle along the target trajectory at time T2. Using information such as a measured distance between S1 and S2 and knowing a time difference between T1 and T2 may enable the processor unit of the vehicle to determine a speed over which the distance between S1 and S2 was covered. This speed can be compared to an integrated velocity obtained based on an output of the vehicle's speed sensor. In some embodiments, this comparison may yield a correction factor needed to adjust/calibrate the vehicle's speed sensor to match the speed determined based on the S1 to S2 speed calculation.

Alternatively, or additionally, the processor unit may use an output of the vehicle's speed sensor to determine a sensor-based distance reading between S1 and S2. This sensor based distance reading can be compared to a calculated distance between S1 and S2 in order to determine an appropriate correction factor to calibrate the vehicle's speed sensor.

Processing unit 110 may identify recognized landmarks in a captured image stream according to any of the techniques described elsewhere in the disclosure. For example, processing unit 110 may compare one or more observed characteristics of a potential landmark to characteristics for a recognized landmark stored in sparse data map 800. Where one or more of the observed characteristics is found to match the stored characteristics, then processing unit 110 may conclude that the observed potential landmark is, in fact, a recognized landmark. Such characteristics may include, among other things, size, shape, location, distance to another recognized landmark, landmark type, condensed image signature, etc.

At step 7006, processing unit 110 may determine, based on known locations of the two recognized landmarks, a value indicative of a distance between the at least two recognized landmarks. For example, as discussed above, processing unit 110 may retrieve or otherwise rely upon information associated with the recognized landmarks after identifying the recognized landmarks. Further, the information may include positional information of the recognized landmarks, and processing unit 110 may compute a distance between the two recognized landmarks based on the retrieved positional information associated with the two landmarks. Positional information may include, for example, global coordinates of each recognized landmark determined, for example, based on an aggregation of position determinations (e.g., GPS based position determinations) made by a plurality of vehicles upon prior traversals along the road segments including the two recognized landmarks.

At step 7008, processing unit 110 may determine, based on an output of at least one sensor associated with the autonomous vehicle, a measured distance between the at least two landmarks. In some embodiments, processing unit 110 may use an odometry technique based on images captured by image capture device 122, inertial sensors, and/or a speedometer of vehicle 200 to measure the distance between the two recognized landmarks. For example, as noted above, a first position of the vehicle S1 may be used as a starting point and a second position of the vehicle S2 may be used as an ending point. These positions may be determined based on images collected of the first and second recognized landmarks, respectively, using techniques described in other sections of the disclosure. The vehicle sensors (e.g., the speedometer) can be used to measure a distance between location S1 and S2. This measured distance may be compared to a calculated distance between locations S1 and S2, for example, along a predetermined target trajectory of the vehicle.

In some embodiments, S1 and S2 may be selected according to a particular relationship with the recognized landmarks. For example, S1 and S2 may be selected as locations where lines extending from the first and second landmarks, respectively, intersect the target trajectory at right angles. Of course, any other suitable relationship may also be used. In such embodiments, where S2 and S1 are defined according to a predetermined relationship, a distance between S2 and S1 may be known and represented, for example, in sparse data map 800 (e.g., as a distance value to the preceding recognized landmark). Thus, rather than having to calculate a distance between S1 and S2, in such embodiments, this distance value may already be available from sparse data map 800. As in previous embodiments, the predetermined distance between S1 and S2 may be compared to the distance between S1 and S2 measured using the vehicle sensors.

For example, in some embodiments, measuring the distance between the two landmarks may be done via a GPS device (e.g., position sensor 130). For example, two landmarks may be selected, which are distant from each other (e.g., 5 km) and the road between them may be rather straight. A length of that road segment may be measured, for example, by subtracting the GPS coordinates of the two landmarks. Each such coordinate may be measured with an error of a few meters (i.e., the GPS error), but due to the long length of the road segment this may be a relatively small error.

At step 7010, processing unit 110 may determine a correction factor for the at least one sensor based on a comparison of the value indicative of the distance between the at least two recognized landmarks and the measured distance between the at least two landmarks. The correctional factor may be, for example, a ratio of the value indicative of the distance between the at least to recognized landmarks and the measured distance between the at least two landmarks. In some embodiments, the correction factor may be referred to as a calibration factor and may represent a value that may be used to transform the measured distance value based on the vehicle's sensors into the calculated/predetermined distance value.

In an optional step, processing unit 110 may determine a composite correction factor based on a plurality of determined correction factors. Correction factors of the plurality of determined correction factors may be determined based on different set of landmarks. In some embodiments, the composite correction factor is determined by averaging the plurality of determined correction factors or by finding a mean of the plurality of determined correction factors.

Figure 71:
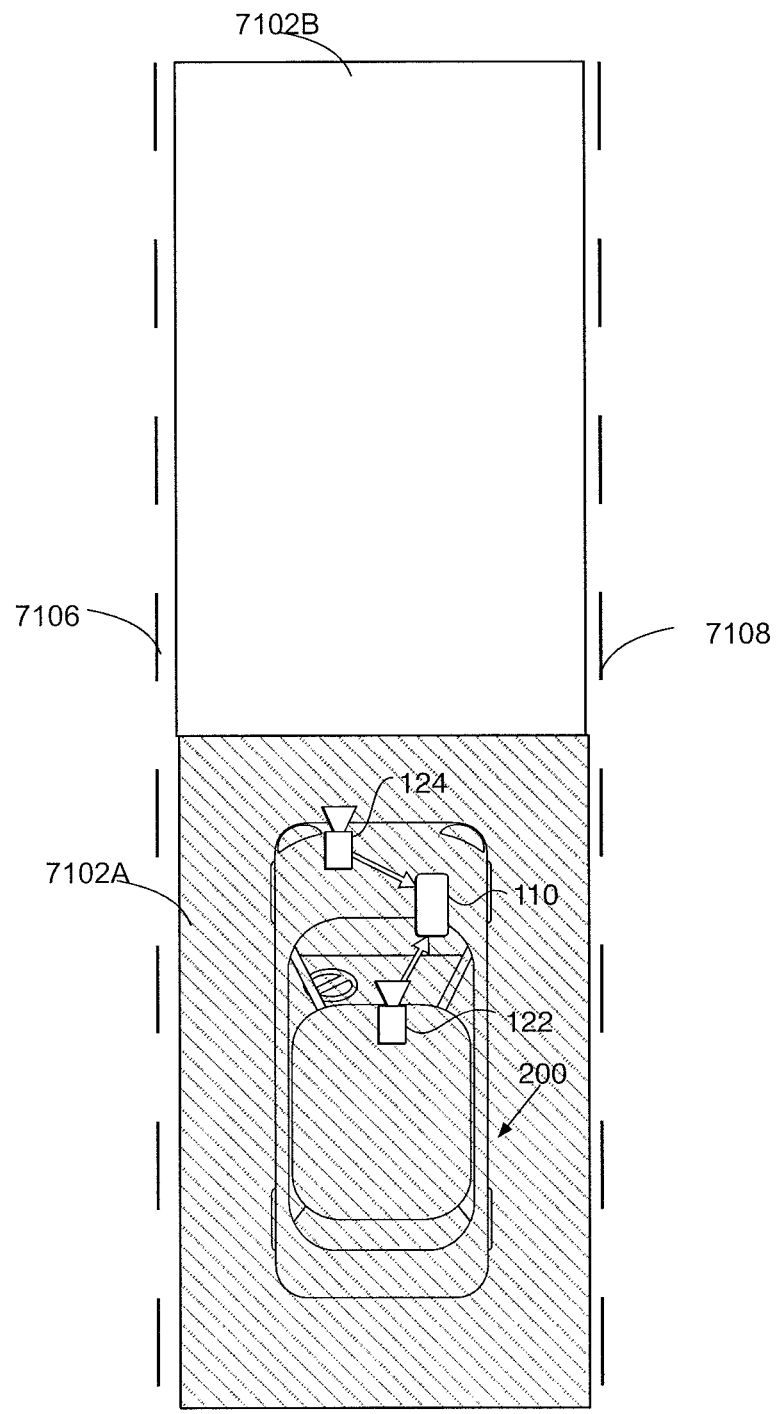
FIG. 71 is another diagrammatic top view representation of an exemplary vehicle including a system for calibrating a speed of the vehicle consistent with disclosed embodiments.

FIG. 71 is a diagrammatic top view representation of exemplary vehicle 200 including a system for calibrating an indicator of speed of the vehicle consistent with disclosed embodiments. In the example of FIG. 71, vehicle 200 is traveling on a first road segment 7102A. FIG. 71 also shows a second road segment 7102B and lane marks 7104, 7106. A road segment is includes any portion of a road.

In some embodiments, processing unit 110 may determine a distance along a road segment (e.g., road segments 7102A or 7102B) using one or more sensors of vehicle 200. In one example, processing unit 110 may determine, using one or more sensors of vehicle 200, a road signature profile associated with the road segment vehicle 200 is traveling on (e.g., road segment 7102A). Such road signature profile may be associated with any discernible/measurable variation in at least one parameter associated with the road segment. In some cases, such profile may be associated with, for example, variations in surface roughness of a particular road segment, variations in road width over a particular road segment, variations in distances between dashed lines painted along a particular road segment, variations in road curvature along a particular road segment, etc. As discussed above, FIG. 11D shows exemplary road signature profile 1160. While a road signature profile may represent any of the parameters mentioned above, or others, in one example, the road signature profile may represent a measure of road surface roughness, as obtained, for example, by monitoring one or more sensors providing outputs indicative of an amount of suspension displacement as vehicle 200 travels on first road segment 7102A. Alternatively, road signature profile 1160 may represent variation in road width, as determined based on image data obtained via image capture device 122 of vehicle 200 traveling on first road segment 7102A. Such profile may be useful, for example, in determining a particular location of an autonomous vehicle relative to a particular target trajectory. That is, as it traverses a road segment, an autonomous vehicle may measure a profile associated with one or more parameters associated with the road segment. If the measured profile can be correlated/matched with a predetermined profile that plots the parameter variation with respect to position along the road segment, then the measured and predetermined profiles may be used (e.g., by overlaying corresponding sections of the measured and predetermined profiles) in order to determine a current position along the road segment and, therefore, a current position relative to a target trajectory for the road segment. A distance along a road segment may be determined based on a plurality of positions determined along a road segment.

Figure 72:
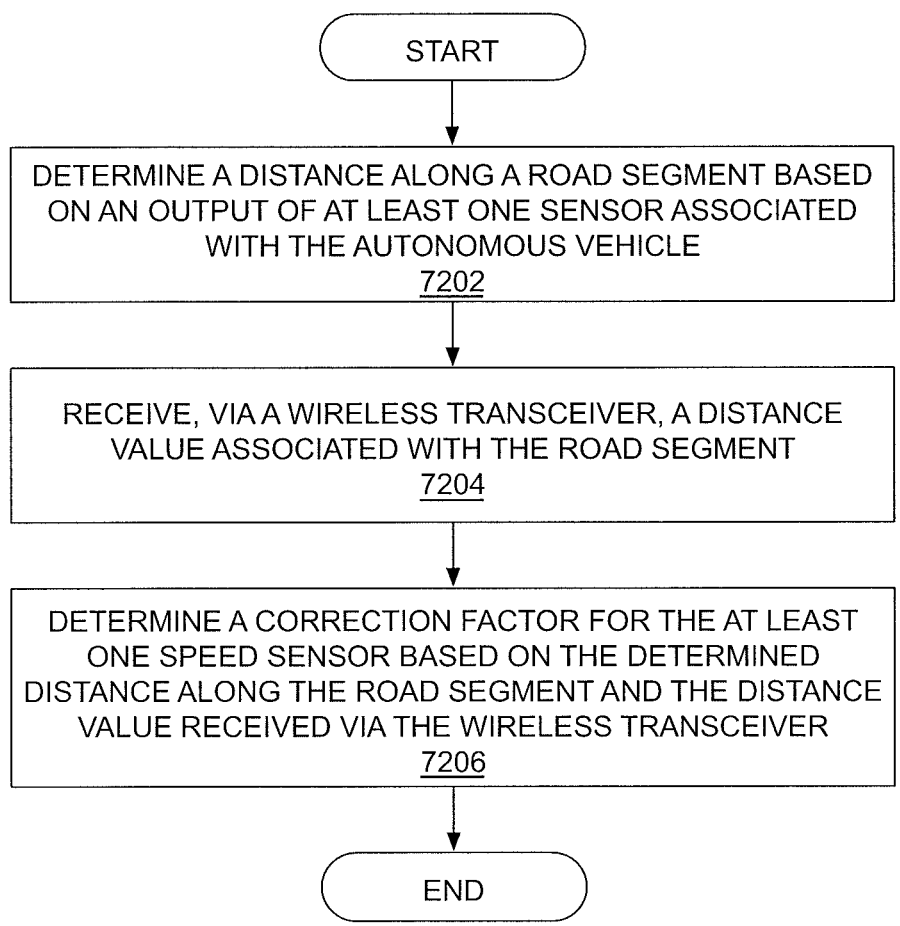
FIG. 72 is a flowchart showing another exemplary process for calibrating a speed of a vehicle consistent with disclosed embodiments.

FIG. 72 is a flowchart showing exemplary process 7200 for calibrating an indicator of speed of vehicle 200 consistent with disclosed embodiments. In some embodiments, vehicle 200 may calibrate the indicator of speed of vehicle 200 by calculating a correction factor based on a distance determined along the road segment and a distance value received via the wireless transceiver. That is, rather than determining positions S1 and S2 based on landmarks and then calculating a distance between positions S1 and S2, a distance value for a predetermined portion of a road segment may be received via sparse data map 800 (e.g., via a wireless transceiver).

At step 7204, processing unit 110 may receive, via a wireless transceiver, a distance value associated with the road segment. In one example, the wireless transceiver may be a 3GPP-compatible or an LTE-compatible transceiver. The distance value associated with the road segment stored on the remote server may be determined based on prior measurements made by a plurality of measuring vehicles. For example, a plurality of vehicles may have previously traveled on the same road segment in the past and uploaded the determined distance values associated with the road segment (e.g., between two or more predetermined reference points, landmarks, etc.) to the remote server. The distance value associated with the road segment stored on the remote server may be an average of the distance values determined by the plurality of measuring vehicles.

In some embodiments, the distance value associated with the road segment stored on the remote server may be determined based on prior measurements made by at least 100 measuring vehicles. In other embodiments, the distance value associated with the road segment stored on the remote server may be determined based on prior measurements made by at least 1000 measuring vehicles.

At step 7206, processing unit 110 may determine a correction factor for the at least one speed sensor based on the determined distance along the road segment and the distance value received via the wireless transceiver. The correctional factor may be, for example, a ratio of the distance along the road segment determined using a sensor and the distance value received via the wireless transceiver. And, the correction factor may represent a value that may be used to transform the measured distance value based on the vehicle's sensors into the received/predetermined distance value.

In an optional step, processing unit 110 may determine a composite correction factor based on a plurality of determined correction factors. Correction factors of the plurality of determined correction factors may be determined based on different landmarks. In some embodiments, the composite correction factor is determined by averaging the plurality of determined correction factors or by finding a mean of the plurality of determined correction factors.

Determining Lane Assignment Based on Recognized Landmark Location

In addition to determining a lane assignment based on analysis of a camera output (e.g., seeing additional lanes to the right and/or left of a current lane of travel for the vehicle), the system may determine and/or validate a lane assignment based on a determined lateral position of recognized landmarks relative to the vehicle.

Figure 73:
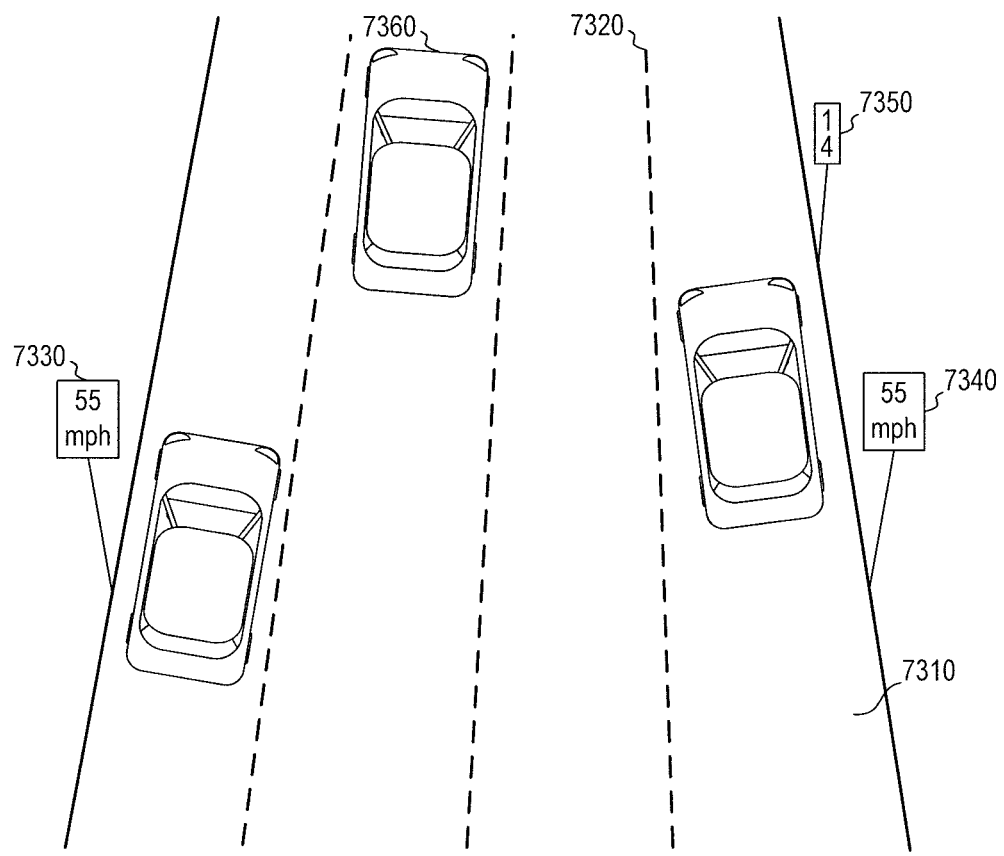
FIG. 73 is an illustration of a street view of an exemplary road segment, consistent with disclosed embodiments.

FIG. 73 is a diagrammatic illustration of a street view of an exemplary road segment, consistent with disclosed embodiments. As shown in FIG. 73, road segment 7300 may include a number of components, including road 7310, lane marker 7320, landmarks 7330, 7340, and 7350, etc. In addition to the components depicted in exemplary road segment 7300, a road segment may include other components, including fewer or additional lanes, landmarks, etc., as would be understood by one of ordinary skill in the art.

In one embodiment, road segment 7300 may include road 7310, which may be divided by one or more lane markers 7320 into two or more lanes. Road segment 7300 may also include one or more vehicles, such as vehicle 7360. Moreover, road segment 7300 may include one or more landmarks, such as landmarks 7330, 7340, and 7350. In one embodiment, such as shown in FIG. 73, landmarks may be placed alongside road 7310. Landmarks placed alongside road 7310 may include, for example, traffic signs (e.g., speed limit signs, such as landmarks 7330 and 7340), mile markers (e.g., landmark 7350), billboards, exit signs, etc. Landmarks may also include general purpose signs (e.g., non-semantic signs relating to businesses or information sources, etc.). Alternatively, landmarks may be placed on or above road 7310. Landmarks placed on or above road 7310 may include, for example, lane markers (e.g., lane marker 7320), reflectors, exit signs, marquees, etc. Landmarks can also include any of the examples discussed elsewhere in this disclosure.

Figure 74:
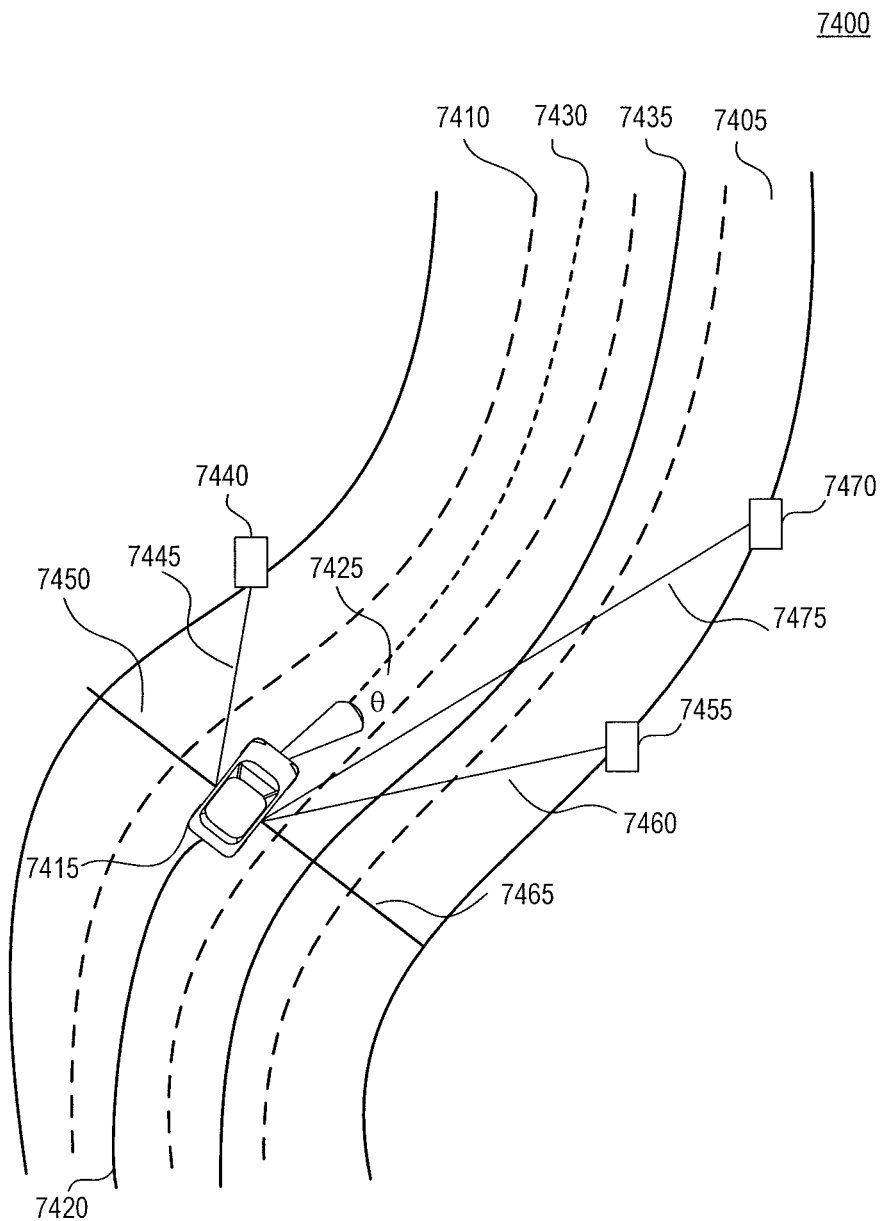
FIG. 74 is an illustration of birds-eye view of an exemplary road segment, consistent with disclosed embodiments.

FIG. 74 is a diagrammatic illustration of a birds-eye view of an exemplary road segment, consistent with disclosed embodiments. As shown in FIG. 74, exemplary road segment 7400 may include a number of components, including road 7405, lane marker 7410, vehicle 7415, traversed path 7420, heading 7425, predicted path 7430, predetermined road model trajectory 7435, landmarks 7440, 7455, and 7470, direct offset distances 7445, 7460, and 7475, and lateral offset distances 7450 and 7465. In addition to the components depicted in exemplary road segment 7300, a road segment may include other components, including fewer or additional lanes, landmarks, and vehicles, as would be understood by one of ordinary skill in the art.

In one embodiment, road segment 7400 may include road 7405, which may be divided by one or more lane markers 7410 into two or more lanes. Road segment 7300 may also include one or more vehicles, such as vehicle 7415. Moreover, road segment 7400 may include one or more landmarks, such as landmarks 7440, 7455, and 7470.

In one embodiment, vehicle 7415 may travel along one or more lanes of road 7405 in a path. The path that vehicle 7415 has already traveled is represented in FIG. 74 as traversed path 7420. The direction in which vehicle 7415 is headed is depicted as heading 7425. Based on the current location of vehicle 7145 and heading 7425, among other factors, a path that vehicle 7415 is expected to travel, such as predicted path 7430, may be determined. FIG. 74 also depicts predetermined road model trajectory 7435, which may represent an ideal path for vehicle 7415.

In one embodiment, direct offset distances 7445, 7460, and 7475 may represent the distance between vehicle 7415 and landmarks 7440, 7455, and 7470, respectively. Lateral offset distances 7450 and 7465 may represent the distance between vehicle 7415 and the landmarks 7440 and 7455 when vehicle 7415 is directly alongside those landmarks.

For example, two techniques may be used to calculate the number of lanes based on the lateral distance estimation between the host vehicle and the landmark. As a first example, a clustering technique may be used. Using mean-shift clustering, the system may calculate the number of lanes and the lane assignment for each drive. Next, for enriching the number of observations and to provide observations from each lane, the system may add observations for the adjacent lanes (e.g., if the lanes' DNN networks decided there are such lanes). Next, the system may determine the road width and splitting it into lanes based on the calculated lane width. As a second example, in another technique, based on sightings of vehicles where the lanes' DNN network determined they are either on the extreme (left or right) lane or on the one adjacent to it, the system may create a set of estimations of the lateral distance between the land mark and the extreme left or right lane mark. Next, using either a voting or a least squares mechanism, the system may determine an agreed distance estimation between the land mark and the road edges. Next, from the distance estimates to the road edges, the system may extract the road width, and determine the number of lanes by dividing the road width by the median lane width observed in the drives. The system may assign a lane to each drive based on which bin the observed distance between the host.

Figure 75:
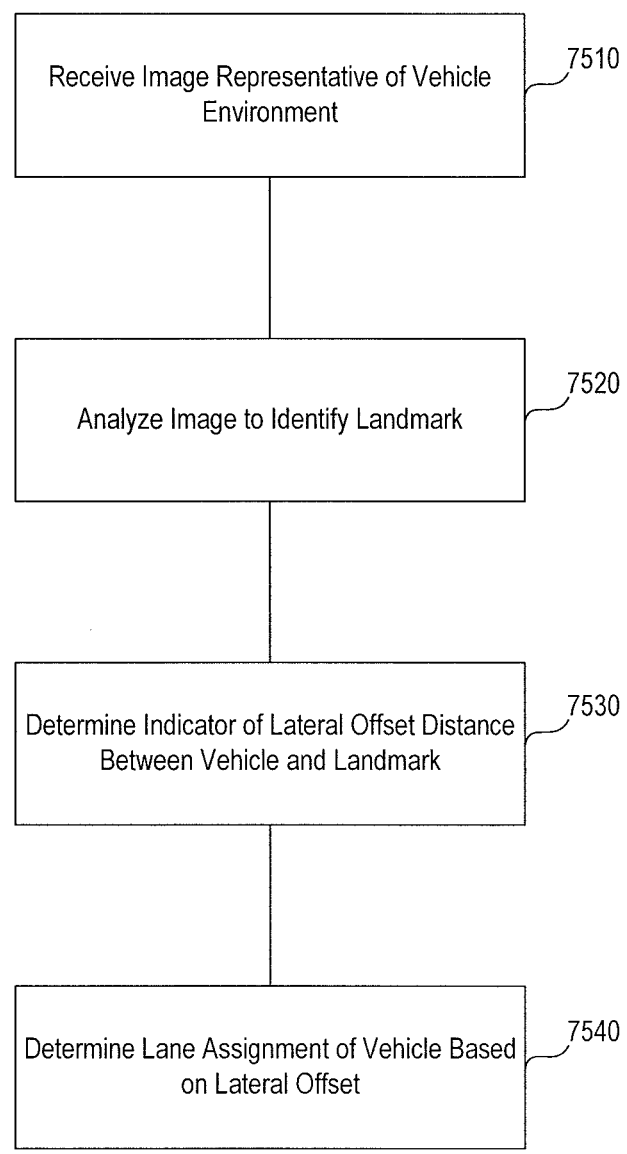
FIG. 75 is a flowchart showing an exemplary process for determining a lane assignment for a vehicle, consistent with disclosed embodiments.

FIG. 75 is a flowchart showing an exemplary process 7500 for determining a lane assignment for a vehicle (which may be an autonomous vehicle) along a road segment, consistent with disclosed embodiments. The steps associated with this exemplary process may be performed by the components of FIG. 1. For example, the steps associated with the process may be performed by application processor 180 and/or image processor 190 of system 100 illustrated in FIG. 1.

In step 7510, at least one processor receives from a camera at least one image representative of an environment of the vehicle. For example, image processor 128 may receive one or more images from one or more of cameras 122, 124, and 126 representing an environment of the vehicle. Image processor 128 may provide the one or more images to application processor 180 for further analysis. The environment of the vehicle may include the area surrounding the exterior of the vehicle, such as the road segment and any signs, buildings, or landscaping along the road segment. In one embodiment, the environment of the vehicle includes the road segment, a number of lanes, and the at least one recognized landmark.

In step 7520, the at least one processor analyzes the at least one image to identify at least one recognized landmark. In one embodiment, the at least one recognized landmark includes at least one of a traffic sign, an arrow marking, a lane marking, a dashed lane marking, a traffic light, a stop line, a directional sign, a reflector, a landmark beacon, or a lamppost, etc. For example, the at least one recognized landmark may include landmarks 7330, 7340, and 7350, each of which is a traffic sign. In particular, landmarks 7330 and 7340 are speed limit signs, and landmark 7350 is a mile marker sign. In another embodiment, the at least one recognized landmark includes a sign for a business. For example, the at least one recognized landmark may include a billboard advertisement for a business or a sign marking the location of a business.

In step 7530, the at least one processor determines an indicator of a lateral offset distance between the vehicle and the at least one recognized landmark. In some embodiments, the determination of the indicator of the lateral offset distance between the vehicle and the at least one recognized landmark may be based on a known position of the at least one recognized landmark. The known position of the at least one recognized landmark may be stored, for example, in memory 140 or map database 160 (e.g., as part of sparse map 800).

In step 7540, the at least one processor determines a lane assignment of the vehicle along the road segment based on the indicator of the lateral offset distance between the vehicle and the at least one recognized landmark. For example, the at least one processor may determine which lane the vehicle is travelling in based the indicator of lateral offset distance. For example, a lane assignment may be determined based on knowledge of a lateral distance from the recognized landmark to a lane edge closest to the recognized landmark, to any lane edges present on the road, to a target trajectory associated with a road segment, or to multiple target trajectories associate with the road segment, etc. The determined indicator of lateral offset distance between the recognized landmark and the host vehicle may be compared to any of these quantities, among others, and then used to determine a current lane assignment based on one or more arithmetic and/or trigonometric calculations.

In one embodiment, the at least one recognized landmark includes a first recognized landmark on a first side of the vehicle and a second recognized landmark on a second side of the vehicle and wherein determination of the lane assignment of the vehicle along the road segment is based on a first indicator of lateral offset distance between the vehicle and the first recognized landmark and a second indicator of lateral offset distance between the vehicle and the second recognized landmark. The lane assignment may be determined based on a ratio of the first indicator of lateral offset distance to the second indicator of lateral offset distance. For example, if the vehicle is located 20 feet from a landmark posted on the left edge of the road and 60 feet from a landmark posted on the right edge of the road, then the lane assignment may be determined based on this ratio, given information on the number of lanes on the road segment or lane width. Alternatively, the lane assignment may be calculated separately based on the indicators of lateral offset distance between the vehicle and the first and second recognized landmarks, and these separate calculations may be checked against one another to verify that the determined lane assignment(s) are correct.

Super Landmarks as Navigation Aids

The system may navigate by using recognized landmarks to aid in determining a current location of an autonomous vehicle along a road model trajectory. In some situations, however, landmark identity may be ambiguous (e.g., where there is a high density of similar types of landmarks). In such situations, landmarks may be grouped together to aid in their recognition. For example, distances between landmarks within a group of landmarks may be used to create a super landmark signature to aid in positive identification of the landmarks. Other characteristics, such as landmark sequences within a group of landmarks, may also be used.

Figure 76:
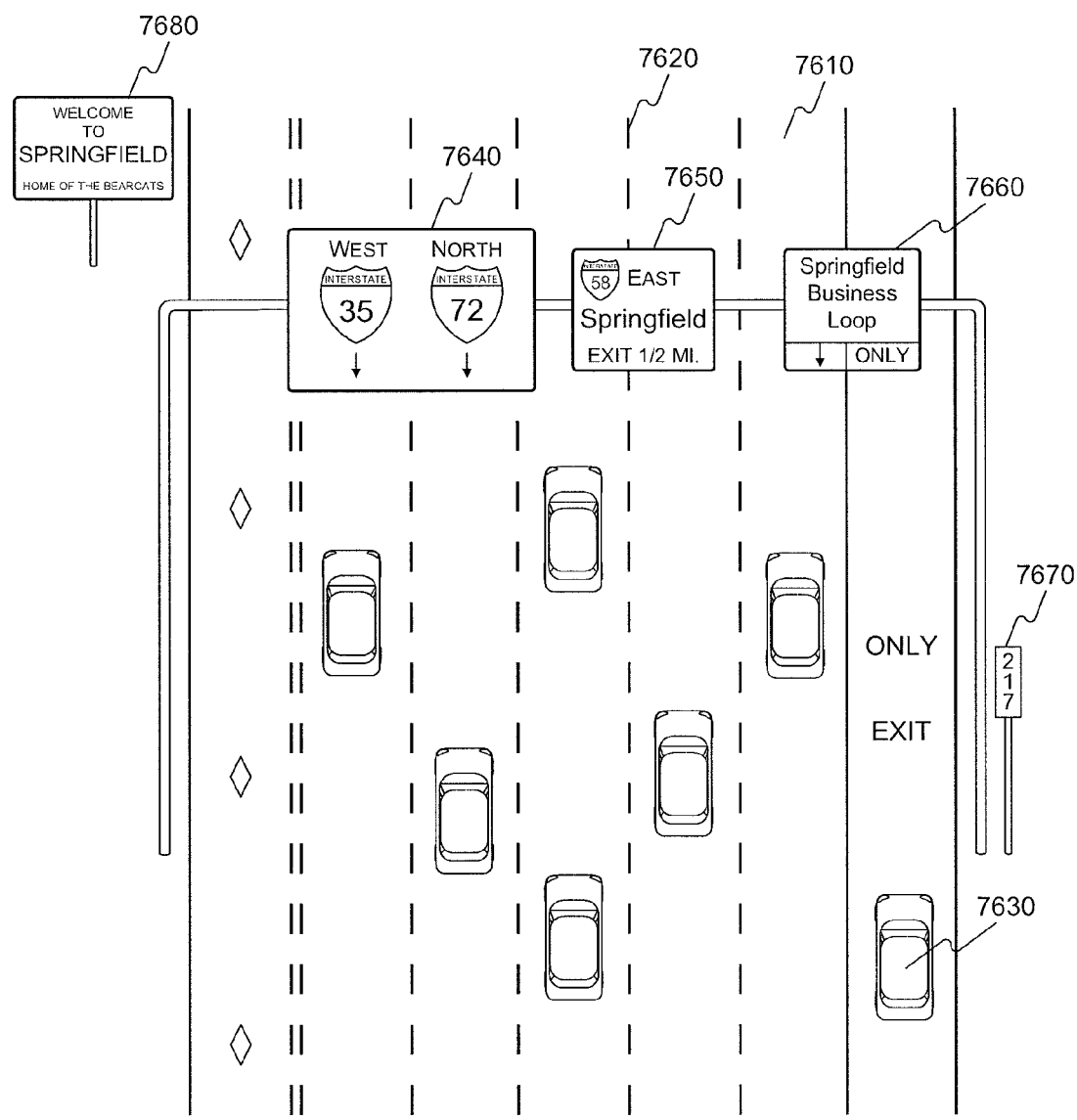
FIG. 76 is an illustration of a street view of an exemplary road segment, consistent with disclosed embodiments.

FIG. 76 is an illustration of a street view of an exemplary road segment, consistent with disclosed embodiments. As shown in FIG. 76, road segment 7600 may include a number of components, including road 7610, lane marker 7620, vehicle 7630, and landmarks 7640, 7650, 7660, 7670, and 7680. In addition to the components depicted in exemplary road segment 7600, a road segment may include other components, including fewer or additional lanes, landmarks, and vehicles, as would be understood by one of ordinary skill in the art.

In one embodiment, road segment 7600 may include road 7610, which may be divided by one or more lane markers 7620 into two or more lanes. Road segment 7600 may also include one or more vehicles, such as vehicle 7630. Moreover, road segment 7600 may include one or more landmarks, such as landmarks 7640, 7650, 7660, 7670, and 7680. In one embodiment, landmarks may be assigned to structures/objects associated with road 7610 (e.g., landmarks 7670 and 7680). Landmarks along road 7610 may include, for example, traffic signs (e.g., mile markers, such as landmark 7670), billboards (e.g., landmark 7680), lane markers (e.g., landmark 7620), reflectors, traffic signs (e.g., exit signs, such as landmarks 7640, 7650, and 7660), marquees, etc. Landmarks identified or otherwise represented in sparse data map 800 may be referred to as recognized landmarks.

Some areas, especially in urban environments, may have high densities of recognized landmarks. Thus, in some cases, distinguishing between certain recognized landmarks may be difficult based on comparisons based solely on landmark size, shape, type, indexed location, etc. To further aid in identifying one or more recognized landmarks from within images captured of a vehicle's environment, a group of two or more landmarks may be designated as a super landmark. Such a super landmark may offer additional characteristics that may aid in identifying or verifying one or more recognized landmarks (e.g., from among the group of landmarks).

In FIG. 76, for example, a super landmark may be formed from the group consisting of landmarks 7640, 7650, 7660, 7670, and 7680, or some subset of two or more of those landmarks. By grouping two or more landmarks together, the probability of accurately identifying constituent landmarks from a distant vantage point may be increased.

A super landmark may be associated with one or more characteristics, such as distances between constituent landmarks, a number of landmarks in the group, an ordering sequence, one or more relative spatial relationships between the members of the landmark group, etc. Moreover, these characteristics may be used to generate a super landmark signature. The super landmark signature may represent a unique form of identifying the group of landmarks or even a single landmark within the group.

Figure 77A:
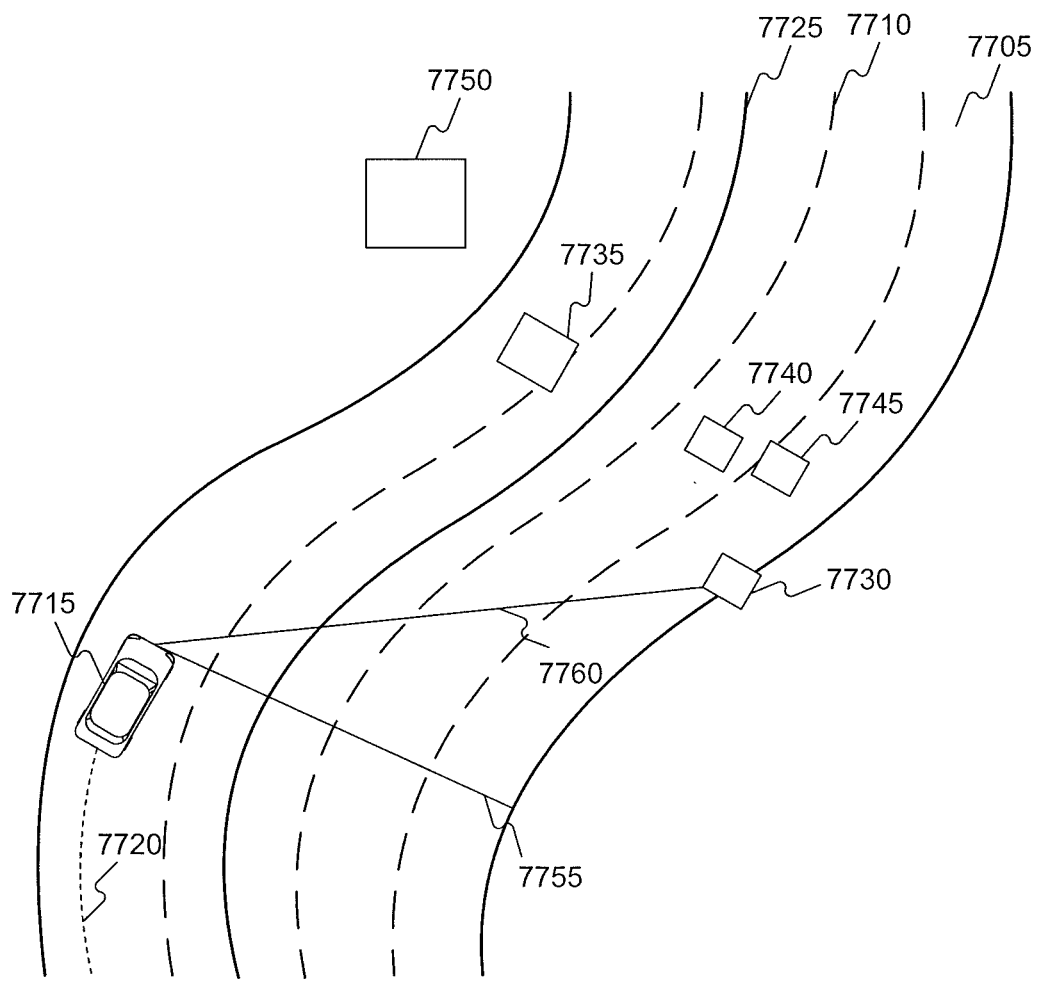
FIG. 77A is an illustration of birds-eye view of an exemplary road segment, consistent with disclosed embodiments.

FIG. 77A is an illustration of birds-eye view of an exemplary road segment, consistent with disclosed embodiments. As shown in FIG. 77, exemplary road segment 7700 may be associated with a number of components, including road 7705, lane marker 7710, vehicle 7715, traversed path 7720, predetermined road model trajectory 7725, landmarks 7730, 7735, 7740, 7745, and 7750, lateral offset vector 7755, and direct offset vector 7760. In addition to the components depicted in exemplary road segment 7700, a road segment may be associated with other components, including fewer or additional lanes, landmarks, and vehicles, as would be understood by one of ordinary skill in the art.

In one embodiment, road segment 7700 may include road 7705, which may be divided by one or more lane markers 7710 into two or more lanes. Road segment 7700 may also include one or more vehicles, such as vehicle 7715. Moreover, road segment 7700 may include one or more landmarks, such as landmarks 7730, 7735, 7740, 7745, and 7750.

In one embodiment, vehicle 7715 may travel along one or more lanes of road 7705 in a path. The path that vehicle 7715 has already traveled is represented in FIG. 77 as traversed path 7720. FIG. 77 also depicts predetermined road model trajectory 7725, which may represent a target path for vehicle 7715.

In one embodiment, a direct offset vector may be a vector connecting vehicle 7715 and a landmark. For example, direct offset vector 7760 may be a vector connecting vehicle 7715 and landmark 7730. The distance between vehicle 7715 and a landmark may be equivalent to the magnitude of direct offset vector connecting vehicle 7715 with the landmark. A lateral offset vector may be a vector connecting vehicle 7715 with a point on the side of the road in line with a landmark. The lateral offset distance for a vehicle with respect to a landmark may be equivalent to the magnitude of the lateral offset vector and, further, may be equivalent to the distance between vehicle 7715 and the landmark when vehicle 7715 is directly alongside the landmark. The lateral offset distance between vehicle 7715 and a landmark may be computed by determining a sum of a first distance between the vehicle and the edge of the road on which the landmark is located and a second distance between that edge and the landmark.

Figure 77B:
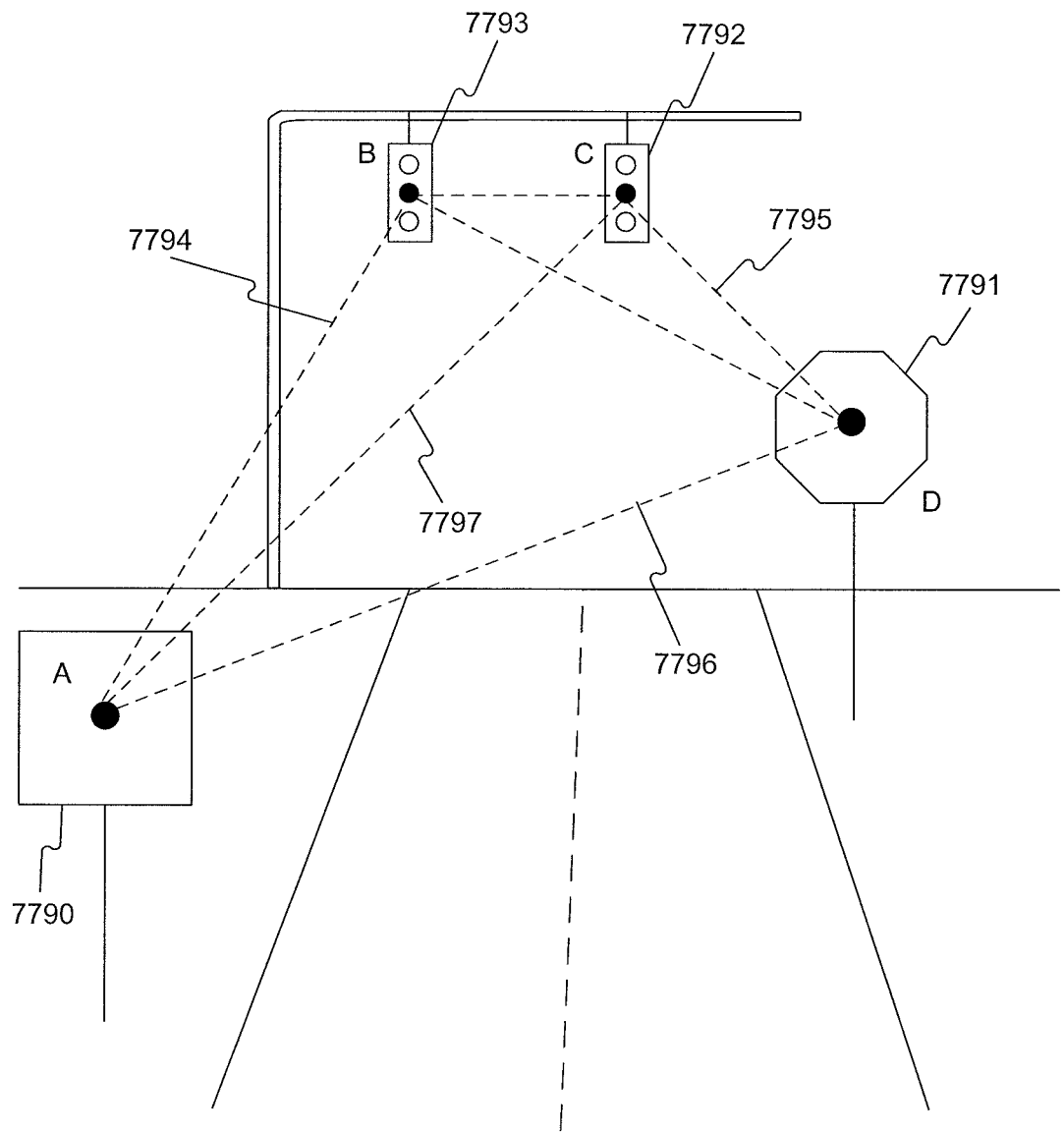
FIG. 77B is an illustration of a street view of an exemplary road segment consistent with disclosed embodiments.

FIG. 77B provides a street level view of a road segment including a super landmark made up of four recognized landmarks: a speed limit sign 7790, a stop sign 7791, and two traffic lights 7792 and 7793. Any of the recognized landmarks included in the super landmark group may be identified based on recognition of various relationships between the landmarks included in the group. For example, a sequence, which may be stored in sparse data map 800, of a speed limit sign at a distance D1, followed by a stop sign at a distance D2, and two traffic lights at a distance D3 from a host vehicle (where D3>D2>D1) may constitute a unique, recognizable characteristic of the super landmark that may aid in verifying speed limit sign 7790, for example, as a recognized landmark from sparse data map 800.

Other relationships between the members of a super landmark may also be stored in sparse data map 800. For example, at a particular predetermined distance from recognized landmark 7790 and along a target trajectory associated with the road segment, the super landmark may form a polynomial 7794 between points A, B, C, and D each associated with a center of a member of the super landmark. The segment lengths A-B, B-C, C-D, and D-A may be determined and stored in sparse data map 800 for one or more positions relative to the location of the super landmark. Additionally, a triangle 7795 may be formed by traffic light 7793, traffic light 7792, and stop sign 7791. Again, the lengths of the sides as well as angles of triangle 7795 may be referenced in sparse data map 800 for one or more positions relative to the location of the super landmark. Similar information may be determined and stored for a triangles 7796 (between points A, C, and D) and 7797 (between points A-B-C). Such angles, shapes, and segment lengths may aid in recognition of a super landmark from a certain viewing location relative to the super landmark. For example, once the vehicle is located at a viewing location for which visual information for the super landmark is included in sparse data map 800, the processing unit of the vehicle can analyze images captured by one or more cameras onboard the vehicle to look for expected shapes, patterns, angles, segment lengths, etc. to determine whether a group of objects forms an expected super landmark. Upon verifying the recognized super landmark, position determinations for the vehicle along a target trajectory may commence based on any of the landmarks included in a super landmark group.

Figure 78:
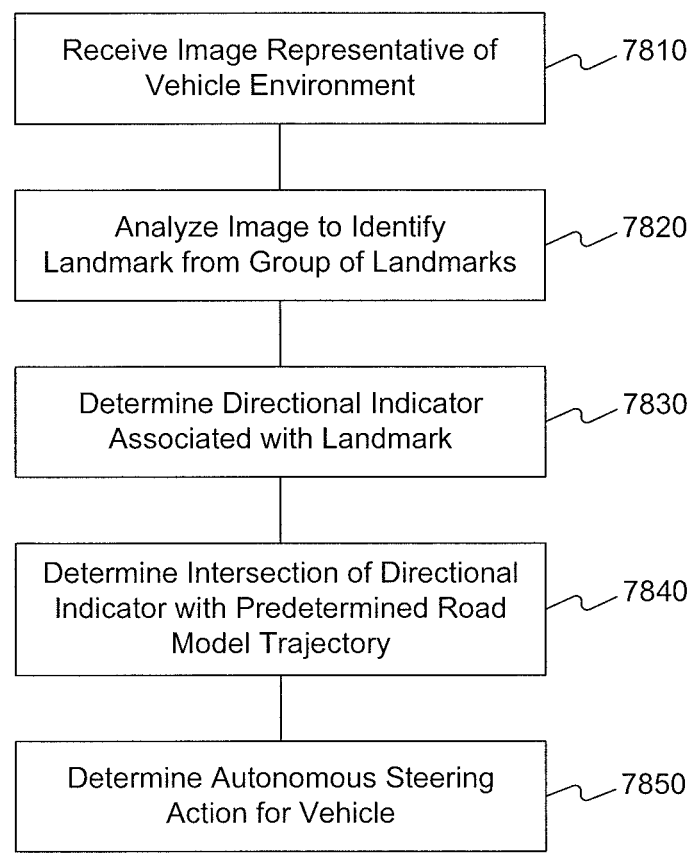
FIG. 78 is a flowchart showing an exemplary process for autonomously navigating a vehicle along a road segment, consistent with disclosed embodiments.

FIG. 78 is a flowchart showing an exemplary process 7800 for autonomously navigating a vehicle along a road segment, consistent with disclosed embodiments. The steps associated with this exemplary process may be performed by the components of FIG. 1. For example, the steps associated with the process may be performed by application processor 180 and/or image processor 190 of system 100 illustrated in FIG. 1.

In step 7810, at least one processor may receive from a camera at least one image representative of an environment of the vehicle. For example, image processor 128 may receive one or more images from one or more of cameras 122, 124, and 126 representing an environment of the vehicle. Image processor 128 may provide the one or more images to application processor 180 for further analysis. The environment of the vehicle may include the area surrounding the exterior of the vehicle, such as the road segment and any signs, buildings, or landscaping along the road segment. In one embodiment, the environment of the vehicle includes the road segment, a number of lanes, and the at least one recognized landmark.

In step 7820, the at least one processor may analyze the at least one image to identify a super landmark and identify at least one recognized landmark from the super landmark. In one embodiment, the at least one recognized landmark includes at least one of a traffic sign, an arrow marking, a lane marking, a dashed lane marking, a traffic light, a stop line, a directional sign, a reflector, a landmark beacon, or a lamppost. For example, the at least one recognized landmark may include landmarks 7640, 7650, 7660, and 7670, each of which is a traffic sign. In particular, landmarks 7640, 7650, and 7660 are exit signs, and landmark 7670 is a mile marker sign. In another embodiment, the at least one recognized landmark includes a sign for a business. For example, the at least one recognized landmark may include a billboard advertisement for a business (e.g., landmark 7680) or a sign marking the location of a business.

As noted above, identification of the at least one landmark is based, at least in part, upon one or more landmark group characteristics associated with the group of landmarks. In one embodiment, the one or more landmark group characteristics may include relative distances between members of the group of landmarks. For example, the landmark group characteristics may include information that specifies the distance that separates each landmark in the group from each of the other landmarks in the group. In another embodiment, the one or more landmark group characteristics may include an ordering sequence of members of the group of landmarks. For example, the group of landmarks may be associated with a sequence indicating the order in which the landmarks appear from left to right, front to back, etc., when viewed from the road. In yet another embodiment, the one or more landmark group characteristics may include a number of landmarks included in the group of landmarks.

Referring to FIG. 76 as an example, a landmark group (or super landmark) may consist of landmarks 7640, 7650, 7660, 7670, and 7680. This landmark group may be associated with landmark group characteristics, including the relative distances between each landmark and each of the other landmarks in the group, an ordering sequence of landmarks in the group, and a number of landmarks. In the example depicted in FIG. 76, the landmark group characteristics may include information that specifies the distance between landmark 7680 and each of landmarks 7640, 7650, 7660, and 7670, the distance between landmark 7640 and each of landmarks 7650, 7660, and 7670, the distance between landmark 7650 and each of landmarks 7660 and 7670, and the distance between landmarks 7660 and 7670.

Further, in this example, an ordering sequence may indicate that the order of landmarks in the group from left to right (when viewed from the perspective of a vehicle driving along the road, e.g., vehicle 7630) is 7680, 7640, 7650, 7660, and 7670. Alternatively or additionally, the ordering sequence may indicate that the order of landmarks in the group from front to back (e.g., earliest to latest traversed in a path along the road) is first 7670, then 7640, 7650, and 7660, and last 7680. Moreover, the landmark group characteristics may specify that this exemplary landmark group includes five landmarks.

In one embodiment, identification of the at least one landmark may be based, at least in part, upon a super landmark signature associated with the group of landmarks. A super landmark signature may be a signature for uniquely identifying a group of landmarks. In one embodiment, a super landmark signature may be based on one or more of the landmark group characteristics discussed above (e.g., number of landmarks, relative distance between landmarks, and ordering sequence of landmarks).

Once a recognized landmark is identified based on an identified characteristic of the super landmark group, predetermined characteristics of the recognized landmark may be used to assist a host vehicle in navigation. For example, in some embodiments, the recognized landmark may be used to determine a current position of the host vehicle. In some cases, the current position of the host vehicle may be determined relative to a target trajectory from sparse data model 800. Knowing the current position relative to a target trajectory may aid in determining a steering angle needed to cause the vehicle to follow the target trajectory (for example, by comparing a heading direction to a direction of the target trajectory at the determined current position of the vehicle relative to the target trajectory).

A position of the vehicle relative to a target trajectory from sparse data map 800 may be determined in a variety of ways. For example, in some embodiments, a 6D Kalman filtering technique may be employed. In other embodiments, a directional indicator may be used relative to the vehicle and the recognized landmark. For example, in step 7830, the at least one processor may determine, relative to the vehicle, a directional indicator associated with the at least one landmark. In one embodiment, the directional indicator may include a line or vector connecting the vehicle and the at least one landmark. The directional indicator may indicate the direction in which the vehicle would have to travel to arrive at the at least one landmark. For example, in the exemplary embodiment depicted in FIG. 77, direct offset vector 7760 may represent a directional indicator associated with landmark 7730 relative to vehicle 7715.

In step 7840, the at least one processor may determine an intersection of the directional indicator with a predetermined road model trajectory associated with the road segment. In one embodiment, the predetermined road model trajectory may include a three-dimensional polynomial representation of a target trajectory along the road segment. The target trajectory may include an ideal trajectory for the vehicle for a specific location along the road segment. In one embodiment, the at least one processor may further be programmed to determine a location along the predetermined road model trajectory based on a vehicle velocity. For example, the at least one processor may access information the location and velocity of the vehicle at a specific time, compute an estimated distance traveled based on the velocity and time passed since the vehicle was at that location, and identify a point along the predetermined road model trajectory that is the estimated distance beyond the previously observed location.

In step 7850, the at least one processor may determine an autonomous steering action for the vehicle based on a direction of the predetermined road model trajectory at the determined intersection. In one embodiment, determining an autonomous steering action for the vehicle may include comparing a heading direction of the vehicle to the predetermined road model trajectory at the determined intersection. In one embodiment, the autonomous steering action for the vehicle may include changing the heading of the vehicle. In another embodiment, the autonomous steering action for the vehicle may include changing the speed of the vehicle by applying the gas or brake to accelerate or decelerate, respectively.

Adaptive Autonomous Navigation

In some embodiments, the disclosed systems and methods may provide adaptive autonomous navigation and update a sparse map. For example, the disclosed systems and methods may adapt navigation based on user intervention, provide adapt navigate based on determinations made by the system (e.g., a self-aware system), adapt a road model based on whether observed conditions on a road are transient or non-transient (e.g., an adaptive road model manager), and manage a road model based on selective feedback received from one or more systems. These adaptive systems and methods are discussed in further detail below.

Adaptive Navigation Based on User Intervention

In some embodiments, the disclosed systems and methods may involve adaptive navigation based on user intervention. For example, as discussed in earlier sections, a road model assembled based upon input from existing vehicles may be distributed from a server (e.g., server 1230, discussed earlier) to vehicles. Based on feedback received from autonomous vehicles, the system may determine whether one or more updates (e.g., adaptations to the model) are needed to the road model to account for changes in road situations, for example. For example, in some embodiments, a user may intervene to alter a maneuver of a vehicle (which may be an autonomous vehicle) while the vehicle is traveling on a roadway according to the road model. An altered maneuver of the vehicle based on user intervention may be made in contradistinction to override predetermined vehicular trajectory instructions provided by the road model. Further, the disclosed systems and methods may capture and store navigational situation information about the situation in which the override occurred and/or send the navigational situation information from the vehicle to the server over one or more networks (e.g., over a cellular network and/or the Internet, etc.) for analysis. As discussed herein, navigational situation information may include one or more of a location of a vehicle, a distance of a vehicle to a recognized landmark, an observed condition, a time of day, an image or a video captured by an image capture device of a vehicle, or any other suitable informational source regarding a navigational situation.

Figure 79A:
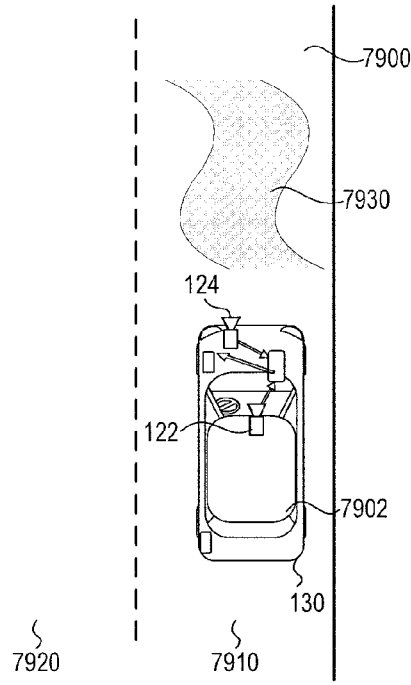
FIG. 79A illustrates a plan view of a vehicle traveling on a roadway approaching wintery and icy road conditions at a particular location consistent with disclosed embodiments.

FIG. 79A illustrates a plan view of vehicle 7902 traveling on a roadway 7900 approaching wintery and icy road conditions 7930 at a particular location consistent with disclosed embodiments. Vehicle 7902 may include a system that provides navigation features, including features that adapt navigation based on user intervention. Vehicle 7902 may include components such as those discussed above in connection with vehicle 200. For example, as depicted, vehicle 7902 may be equipped with image capture devices 122 and 124; more or fewer image capture devices (including cameras, for example) may be employed.

As shown, roadway 7900 may be subdivided into lanes, such as lanes 7910 and 7920. Lanes 7910 and 7920 are shown as examples; a given roadway 7900 may have additional lanes based on the size and nature of the roadway, for example, an interstate highway. In the example of FIG. 79A, vehicle 7902 is traveling in lane 7910 according to instructions derived from the road model (e.g., a heading direction along a target trajectory) and approaching wintery and icy road conditions 7930 at a particular vehicle location as identified by, e.g., position sensor 130, a temperator sensor, and/or an ice sensor. Where a user intervenes in order to override autonomously generated steering instructions (e.g., those enabling the vehicle to maintain a course along the target trajectory) and alter the course of the vehicle 7902 traveling in lane 7910 (e.g., to turn due to the icy conditions), processing unit 110 may store navigational situation information and/or send the navigational situation information to a server of the road model system for use in making a possible update. In this example, the navigational situation information may include a location of the vehicle identified by position sensor 130 or based on a landmark-based determination of position along a target trajectory, an image captured by an image capture device included in the vehicle depicting the vehicle's environment, an image stream (e.g., a video), sensor output data (e.g., from speedometers, accelerometers, etc.).

In some embodiments, processing unit 110 may send the navigational situational information from the vehicle to the server via a wireless data connection over one or more networks (e.g., over a cellular network and/or the Internet, etc.). The server side may analyze the received information (e.g., using automated image analysis processes) to determine whether any updates to sparse data model 800 are warranted based on the detected user intervention. In this example, the server may recognize the presence of wintery or icy road conditions in the images (a temporary or transient condition) and, therefore, may determine not to change or update the road model.

Figure 79B:
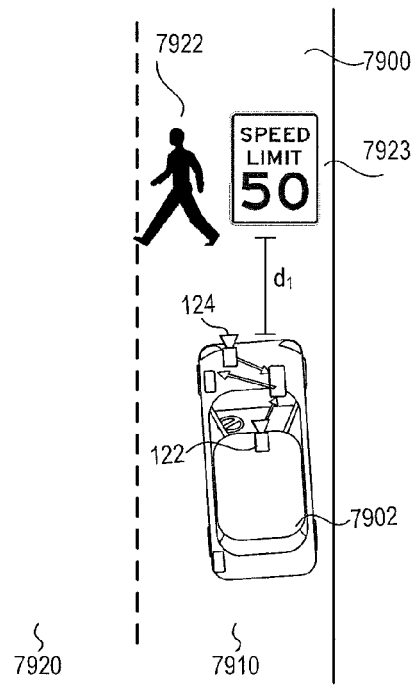
FIG. 79B illustrates a plan view of a vehicle traveling on a roadway approaching a pedestrian consistent with disclosed embodiments.

FIG. 79B illustrates a plan view of vehicle 7902 traveling on a roadway approaching a pedestrian consistent with disclosed embodiments. In the example of FIG. 79B, vehicle 7902 is driving in lane 7910 of roadway 7900 with a pedestrian 7922. As shown, pedestrian 7922 may suddenly become positioned directly in the roadway 7900 crossing either lane 7910 or 7920. In this example, when a user intervenes to override the road model in order to avoid the pedestrian and alter the maneuver of the vehicle 7902 traveling in lane 7910 along a target trajectory associated with the road segment, navigational situation information including a position of the vehicle along a target trajectory for a road segment (e.g., determined based on a distance $d_1$ to a recognized landmark, such as speed limit sign 7923), video or images including capturing conditions of the vehicle's surroundings during the user intervention, sensor data, etc. In example shown in FIG. 49B, given the temporary nature of a crossing pedestrian the server may determine not change or update the road model.

Although the example shown in FIG. 79B depicts speed limit sign 7923, other recognized landmarks (not shown) may be used. Landmarks may include, for example, any identifiable, fixed object in an environment of at least one road segment or any observable characteristic associated with a particular section of the road segment. In some cases, landmarks may include traffic signs (e.g., speed limit signs, hazard signs, etc.). In other cases, landmarks may include road characteristic profiles associated with a particular section of a road segment. Further examples of various types of landmarks are discussed in previous sections, and some landmark examples are shown in FIG. 10.

Figure 79C:
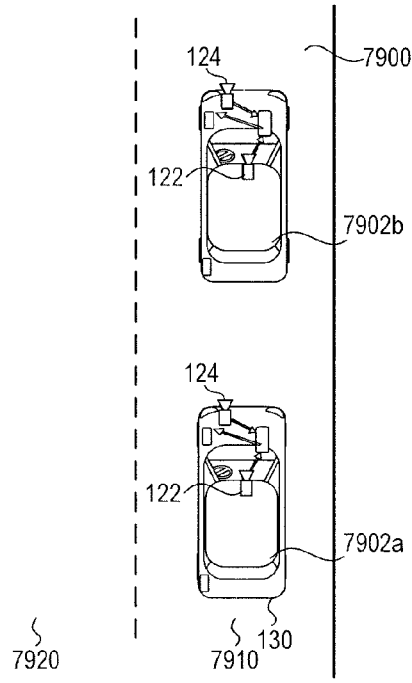
FIG. 79C illustrates a plan view of a vehicle traveling on a roadway in close proximity to another vehicle consistent with disclosed embodiments.

FIG. 79C illustrates a plan view of a vehicle traveling on a roadway in close proximity to another vehicle consistent with disclosed embodiments. In the example of FIG. 79C, two vehicles 7902a and 7902b are driving in lane 7910 of roadway 7900. As shown, vehicle 7902b has suddenly driven directly in front of vehicle 7902a in lane 7910 of roadway 7900. Where a user intervenes to override the road model and alter the course of the vehicle 7902a traveling in lane 7910 (e.g., to turn due to the proximate vehicle), navigational situation information may be captured and stored in memory (e.g., memory 140) and/or sent to a server (e.g., server 1230) for making a possible update to the road model. For example, in this example, the navigational situation information may include a location of vehicle 7902a. The navigational situation information may further include one more images depicting the environment of vehicle 7902 at the time of the user intervention. Given the temporary nature of another contiguous or proximate vehicle, however, the server may not change or update the road model.

Figure 79D:
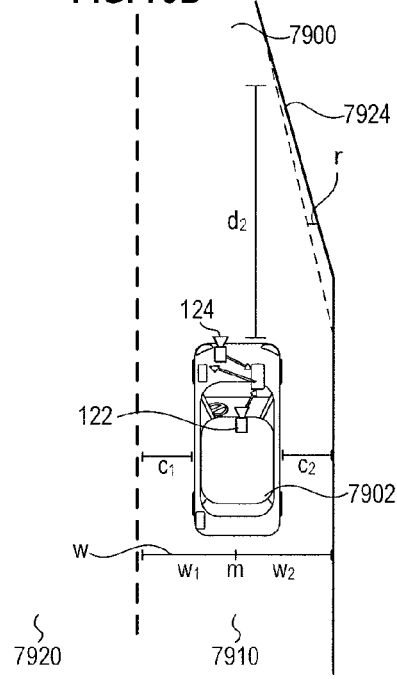
FIG. 79D illustrates a plan view of a vehicle traveling on a roadway in a lane that is ending consistent with disclosed embodiments.

FIG. 79D illustrates a plan view of a vehicle traveling on a roadway in a lane that is ending consistent with disclosed embodiments. Vehicle 7902 may receive from image capture devices 122 and 124 at least one environmental image of a turning roadway 7900 representative of a lane 7910 ending. Lane 7910 may be ending based on a recent change to lane 7910 resulting an abrupt shortening distance of $d_2$. For example, the lane may be ending as a result of recently positioned concrete barriers at the site of a construction zone. As a result of this unexpected shortening, a user may intervene to change the course of vehicle 7902 in view of the change to lane 7910. As will be discussed in more detail in another section, it is also possible for processing unit 110 to recognize the ending lane (e.g., based on captured images of concrete barriers in front of the vehicle) and automatically adjust the course of the vehicle and send navigational situation information to the server for use in possible updates to sparse data model 800. As a result of the user intervention, the system may measure distances (such as $c_1$ and $c_2$). For example, distances $c_1$ and $c_2$ may represent the distance from a side of vehicle 7902 to the edge of lane 7910, be it lane constraint 7924 or the dashed center line in the middle of roadway 7900 dividing lanes 7910/7920. In other embodiments, a distance may be measured to lane constraint 7924 on the far side of lane 7920 (not shown). In addition to distances $c_1$ and $c_2$ described above, in some embodiments, processing unit 110 may further be configured to calculate distances $w_1$ and $w_2$ and midpoint m of lane 7910 relative to one or more lane constraints associated with that lane. When summed together, distances $w_1$ and $w_2$ equal measurement w as shown in FIG. 79D.

In this example, where a user intervenes to override the road model to alter the maneuver of the vehicle 7902 traveling in lane 7910, navigational situation information including distances $c_1$, $c_2$, $d_2$, $w_1$, and $w_2$ to a lane constraint 7924 may be captured and stored in memory (e.g., memory 140) and/or sent to the server for making a possible update to the road model. Of course, other navigational situation information may also be collected and sent to a server for review. Such information may include sensor outputs, captured images/image streams, a position of the vehicle, etc. Given the permanent or semi-permanent nature of an ending lane marked by concrete barriers, the server may decide to change or update the road model. Accordingly, vehicles may receive an updated to the road model that causes the vehicles to follow a new or updated target trajectory for the road segment upon approaching new lane constraint 7924.

Figure 80:
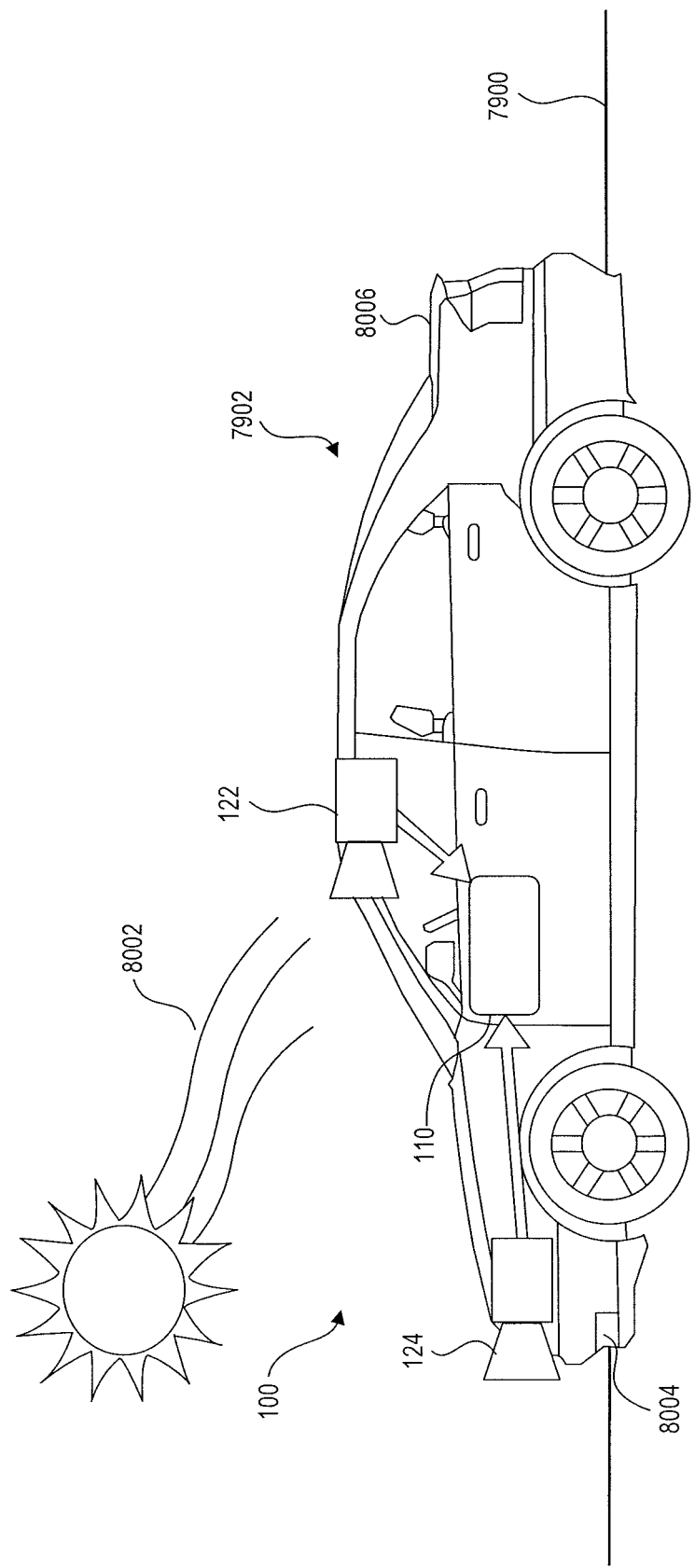
FIG. 80 illustrates a diagrammatic side view representation of an exemplary vehicle including the system consistent with the disclosed embodiments.

FIG. 80 illustrates a diagrammatic side view representation of an exemplary vehicle 7902 including system 100 consistent with the disclosed embodiments. As is shown, vehicle 7902 may be limited by a vision inhibitor such as glare 8002 from the sun and/or a malfunctioning lamp 8004. Vehicle 7902 is additionally depicted with sensors 8006 and system 100 is capable of determining whether or not it is day or night. The sensors 8006 may include, for example, an IR sensor and/or an accelerometer. For example, where a user intervenes to override the road model to move vehicle 7902 to avoid a glare produced by sun, the processing unit 110 may capture navigational situation information reflecting a time of day and/or the presence of glare. Processing unit 110 may store the navigational situational information and/or transmit the navigational situation information to a server for storage and/or analysis. Given the temporary nature of the glare, the server may decide not to change or update the road model.

Figure 81:
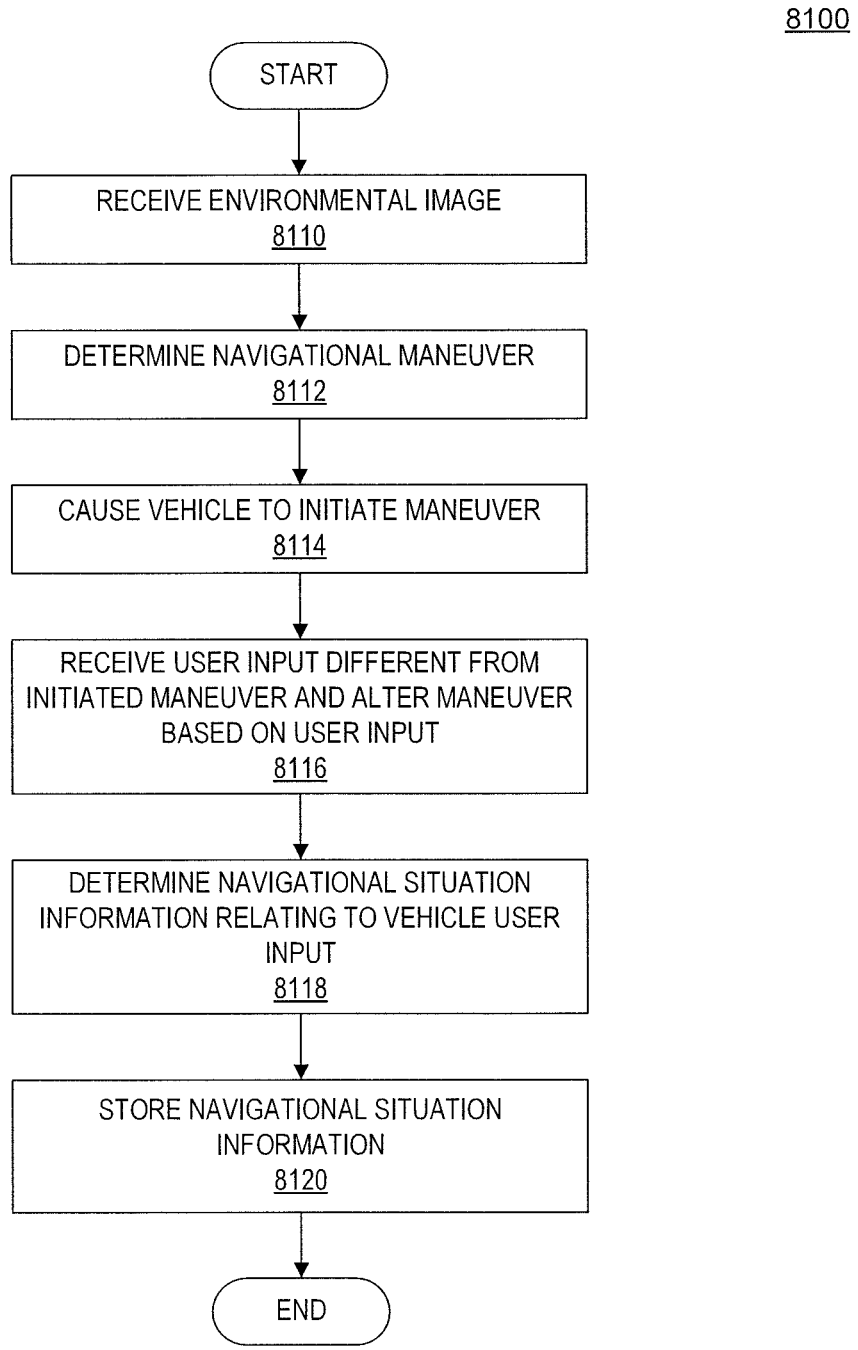
FIG. 81 illustrates an example flowchart representing a method for adaptive navigation of a vehicle based on user intervention consistent with the disclosed embodiments.

FIG. 81 illustrates an example flowchart representing a method for adaptive navigation of a vehicle based on user intervention overriding the road model consistent with the disclosed embodiments. In particular, FIG. 81 illustrates a process 8100 for adaptive navigation of a vehicle consistent with disclosed embodiments. Steps of process 8100 may be performed by processing unit 110 of system 100. Process 8100 may allow for user input and a navigational maneuver based on analysis of an environmental image. Where there is user input that deviates from a navigational maneuver prescribed by the road model, the maneuver may be altered according to the user input and the conditions surrounding the user input may be captured and stored and/or sent to a server for making a possible update to the road model.

At step 8110, processing unit 110 may receive at least one environmental image of an area forward of vehicle 7902. For example, the image may show one or more recognized landmarks. As discussed elsewhere in detail, a recognized landmark may be verified in the captured image and used to determine a position of the vehicle along a target trajectory for a particular road segment. Based on the determined position, the processing unit 110 may cause one or more navigational responses, for example, to maintain the vehicle along the target trajectory.

At step 8112, processing unit 110 may include determining a navigational maneuver responsive to an analysis of at least one environmental image of an area forward of vehicle 7902. For example, based on the landmark-based position determination for the vehicle along the target trajectory, the processing unit 110 may cause one or more navigational responses to maintain the vehicle along the target trajectory.

At step 8114, process 8100 may cause vehicle 7902 to initiate the navigational maneuver. For example, processing unit 110 may send instructions to one or more systems associated with vehicle 7902 to initiate the navigational maneuver and may cause vehicle 7902 to drive according to a predetermined trajectory along roadway 7900. Consistent with the disclosed embodiments, an initiation instruction may be sent to a throttling system 220, braking system 230, and/or steering system 240.

At step 8116, the system may receive a user input that differs from one or more aspects of the navigational maneuver implemented by processing unit 110 based on sparse data map 800. For example, a user input to one or more of throttling system 220, braking system 230, and/or steering system 240 may differ from an initiated maneuver and cause an override to alter the maneuver based on the received user input.

Based on detection of a user override or intervention condition, processing unit 110 may collect navigational situation information relating the vehicle and the user input at the time before, during, and/or after the user intervention. For example, processing unit 110 may receive information relating to the user input, including information specifying at least one of a degree of turn, an amount of acceleration, and an amount of braking of a vehicle 7902, etc. caused by the user intervention (step 8118).

At step 8118, processing unit 110 may determine additional navigational situation information relating to vehicle user input. The navigational situation information may include, for example, a location of the vehicle, a distance to one or more recognized landmarks, a location determined by position sensor 130, one or more images captured by an image capture device of vehicle 7902, sensor outputs etc.

At step 8020, processing unit 110 may store the navigational situation information into memory 140 or 150 of system 100 in association with information relating to the user input. Alternatively, in other embodiments, the navigational situation information may be transmitted to a server (e.g., server 1230) for use in a making a possible update to the road model. Alternatively, in still yet other embodiments, system 100 may not store the navigational situation information if system 100 determines that the navigation situation information is associated with a condition that may not occur in the future (e.g., a special condition or a transient condition), such as related to pedestrian or an animal moving in front of vehicle 7902. System 100 may determine that such conditions do not warrant further analysis and this may determine to not store the navigational situation information associated with the transient condition.

Self-Aware System for Adaptive Navigation

In some embodiments, the disclosed systems and methods may provide a self-aware system for adaptive navigation. For example, a server (e.g., server 1230), may distribute a road model to vehicles. Based on feedback received from autonomous vehicles, the system may determine whether one or more updates (e.g., adaptations to the model) are needed to the road model to account for changes in road situations. For example, in some embodiments, a vehicle (which may be an autonomous vehicle) may travel on a roadway based on the road model and may make use of observations made by the self-aware system in order to adjust a navigational maneuver of the vehicle based on a navigational adjustment condition. As discussed herein, a navigational adjustment condition may include any observable or measurable condition in an environment of a vehicle. The system may determine a navigational maneuver for the vehicle based, at least in part, on a comparison of a motion of the vehicle with respect to a predetermined model representative of a road segment. The system may receive from a camera, at least one image representative of an environment of the vehicle, and then determine, based on analysis of the at least one image, an existence in the environment of the vehicle of a navigational adjustment condition. Based on this analysis, the system may, without user intervention, cause the vehicle to adjust the navigational maneuver based on the existence of the navigational adjustment condition. The system may store information relating to the navigational adjustment condition, including, for example, data, an image, or a video related to the navigational adjustment condition. And, the system may transmit the stored information to one or more server-based systems for analysis and/or determination of whether an update to the road model is needed.

In some embodiments, the system onboard the vehicle or in the cloud may identify an object or a condition that is estimated to be associated with the navigational adjustment condition. The system may establish whether the navigational adjustment condition is temporary or not and whether the road model should be updated or not. The system may also establish in this way whether to collect further information from future traversals of the same area, location, road, region, etc.

Figure 82A:
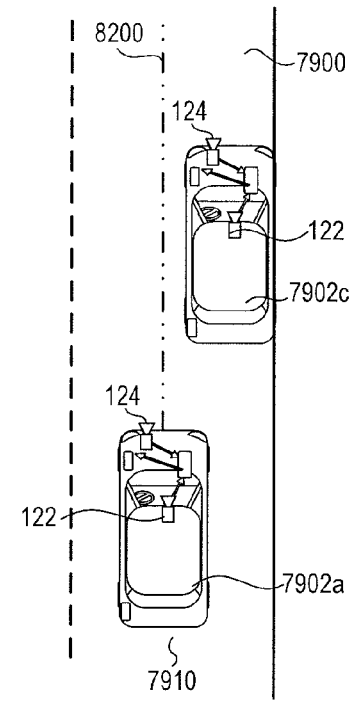
FIG. 82A illustrates a plan view of a vehicle traveling on a roadway with a parked car consistent with disclosed embodiments.

FIG. 82A illustrates a plan view of a vehicle traveling on a roadway with a parked car consistent with disclosed embodiments. In particular, FIG. 82A illustrates vehicle 7902a traveling according to a three-dimensional spline representative of a predetermined path of travel 8200 (e.g., a target trajectory) along roadway 7900 where a second vehicle 7902c is parked directly in front of vehicle 7902a. Vehicle 7902a may include a system that provides navigation features, including features that allow for navigation based on user input. Vehicle 7902a may include components such as those discussed above in connection with vehicle 200. For example, as depicted, vehicle 7902a may be equipped with image capture devices 122 and 124; more or fewer image capture devices (including cameras, for example) may be employed.

As shown, roadway 7900 may be subdivided into lanes, such as lanes 7910 and 7920. Vehicle 7902a may receive from one or more of image capture devices 122 and 124 at least one environmental image including an image of a parked vehicle 7902c. In the example of FIG. 82A, vehicle 7902a is traveling along path 8200 in lane 7910 according to instructions derived from the road model (e.g., a heading direction along a target trajectory) and approaching parked vehicle 7902c. Where the system overrides autonomously generated steering instructions (e.g., those enabling the vehicle to maintain a course along the target trajectory) to adjust a maneuver of vehicle 7902a due to a navigational adjustment condition, e.g., to avoid parked vehicle 7902c, navigational adjustment condition information may be captured and stored in memory (e.g., memory 140) and/or sent to a server (e.g., server 1230) for making a possible update to the road model. In this example, the navigational adjustment condition information may include a location of vehicle 7902c when the autonomous navigational change (e.g., made by the self-aware system) was made. The vehicle position may be identified by position sensor 130 or based on a landmark-based determination of position along a target trajectory. Other navigational condition information may be included in one or more images captured by an image capture device included in vehicle 7902c depicting the vehicle's environment (e.g., an image including parked vehicle 7902c), an image stream (e.g., a video), and/or sensor output data (e.g., from speedometers, accelerometers, etc.).

In some embodiments, processing unit 110 may send the navigational situational information from the vehicle to the server via a wireless data connection over one or more networks (e.g., over a cellular network and/or the Internet, etc.). The server side may analyze the received information (e.g., using automated image analysis processes) to determine whether any updates to sparse data model 800 are warranted based on the detected system intervention. In this example, the server may recognize the presence of the parked car in or near a target trajectory of the host vehicle and determine that the parked car represents a temporary or transient condition. Therefore, the server may determine not to change or update the road model. However, in some embodiments, based on the location of vehicle 7902a, the server may determine that the parked car is located in a residential area and therefore may change or update the road model due to the likelihood of vehicles being parked along the shoulder of the road. Furthermore, in some embodiments, system 100 onboard the vehicle may classify an object or condition and system 100 may determine whether or not to change or update the road model.

Figure 82B:
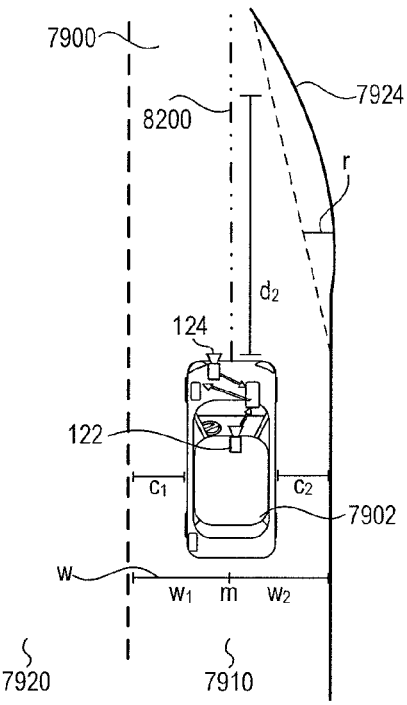
FIG. 82B illustrates a plan view of a vehicle traveling on a roadway in a lane that is ending consistent with the disclosed embodiments.

FIG. 82B illustrates a plan view of a vehicle traveling on a roadway along a target trajectory associated with the road segment consistent with the disclosed embodiments. Vehicle 7902 may receive from image capture devices 122 and 124 at least one environmental image of a turning roadway 7900 representative of a lane 7910 ending. This change in lane 7910 may be due to recent modifications to a road, and thus may not be yet reflected in the sparse data model 800.

In this example, the vehicle systems may recognize the ending lane and override navigation according to the road model in order to adjust a maneuver of the vehicle 7902 traveling along path 8200 in lane 7910. For example, processing unit 110, using one or more images captured with cameras aboard the vehicle may recognize a blockage in the path along the target trajectory associated with the road segment. Processing unit 110 may adjust steering of the vehicle to leave a path indicated by the target trajectory in order to avoid lane constraint 7924. As a result of the system generated navigational adjustment, navigational adjustment condition information (e.g., including the existence of an ending of lane 7910, any of distances $c_1$, $c_2$, $d_2$, r, $w_1$, and $w_2$ etc.) may be stored in memory (e.g., memory 140) and/or sent to a server (e.g. server 123) for possible update of the road model. In some embodiments, in addition or alternatively, the navigational adjustment condition information may include a location of vehicle 7902 based on data determined by position sensor 130 and/or a position of vehicle 7902 relative to one or more recognized landmarks.

The server side may analyze the received information (e.g., using automated image analysis processes) to determine whether any updates to sparse data model 800 are warranted based on the detected system intervention. In some embodiments, the server may or may not update the road model based on the received navigational adjustment condition information. For example, given the permanent nature of an ending lane accompanied by a lane shift, the server may decide it is necessary to change or update the road model. Accordingly, the sever may modify the road model in order to steer or turn to merge at these distances $c_1$, $c_2$, $d_2$, $w_1$, and $w_2$ upon approaching lane constraint 7924. The model may also be updated based on a received, reconstructed and actual trajectory taken by vehicle 7902 as it navigated past the ending lane. Additionally, rather than aggregating the actual path of vehicle 7902 with other trajectories stored in sparse data model 800 for the particular road segment (e.g., by averaging the path of vehicle 7902 with other trajectories stored in sparse data model 800), the target trajectory may be defaulted to the path of vehicle 7902. That is, because the server may determine that the cause of the navigational change was a non-transient (or semi-permanent) condition, the path of vehicle 7902 may be more accurate for the particular road segment than other trajectories for the road segment collected before the condition existed. The same approach and analysis could also be employed by the server upon receiving navigational modifications based not on control by the self-aware vehicle system, but on user intervention (described above).

Figure 82C:
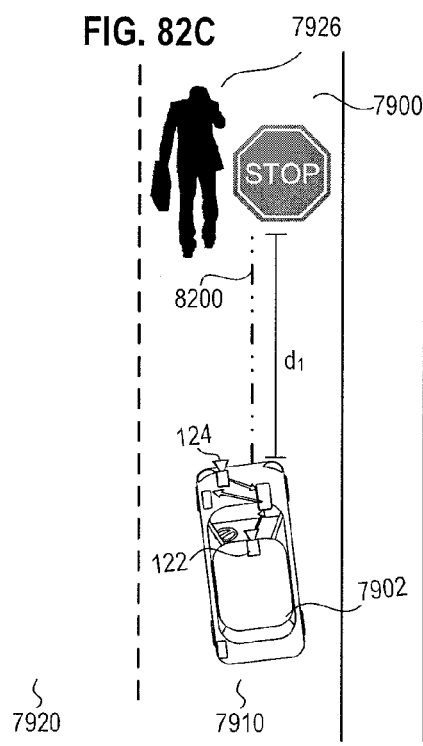
FIG. 82C illustrates a plan view of a vehicle traveling on a roadway approaching a pedestrian consistent with disclosed embodiments.

FIG. 82C illustrates a plan view of a vehicle traveling on a roadway approaching a pedestrian consistent with disclosed embodiments. In the example of FIG. 82C, vehicle 7902 is driving in lane 7910 of roadway 7900 with pedestrian 7926. As shown, pedestrian 7926 may be positioned directly in roadway 7900 or alternatively may be positioned to the side of roadway 7900. Vehicle 7902 may travel in lane 7910 according to instructions derived based on the road model (e.g., a heading direction along a target trajectory) and may approach pedestrian 7926. Vehicle 7902 may receive from image capture devices 122 and 124 at least one environmental image including an image of pedestrian 7926. Where the system intervenes to override the road model to adjust a maneuver of the vehicle 7902 traveling in lane 7910 to avoid pedestrian 7926, navigational adjustment condition information including, for example, a distance $d_1$ to a stop sign and/or a capture image depicting pedestrian 7926 may be captured and stored in memory (e.g., memory 140) and/or sent to a server (e.g., server 1230) for making a possible update to the road model. The server side may analyze the received information (e.g., using automated image analysis processes) to determine whether any updates to sparse data model 800 are warranted based on the detected system intervention. In this example, given the temporary nature of a pedestrian, the server may determine to not change or update the road model.

Optionally, in some embodiments, when the cause of the intervention is not confidently ascertained by the system, or when the nature of the cause in not clear or is inherently not constant or stable, the server may issue an alert and/or provide one, two, or more alternative paths or road models. In such an embodiment, the server may cause the system onboard the vehicle to examine the situation on the ground including when the vehicle arrived at the point or area where the deviation or intervention occurred. The server may further provide a location of a suspected and/or verified cause of the intervention, to allow the system to focus on that area. As such, the system may have more time and more information to evaluate the situation.

Figure 82D:
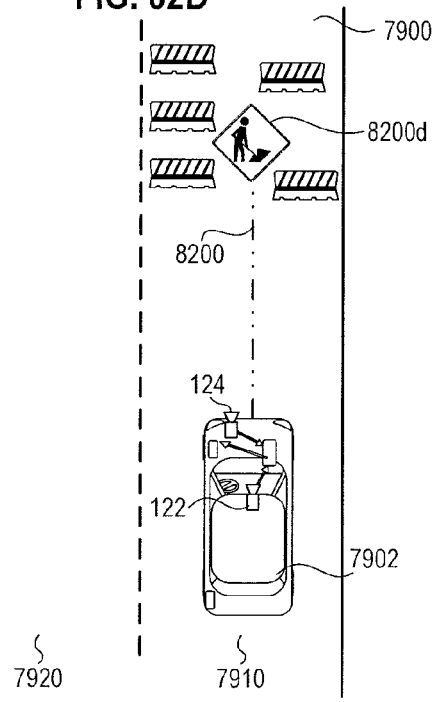
FIG. 82D illustrates a plan view of a vehicle traveling on a roadway approaching an area of construction consistent with the disclosed embodiments.

FIG. 82D illustrates a plan view of a vehicle traveling on a roadway approaching an area of construction consistent with the disclosed embodiments. As shown, vehicle 7902 is traveling a target trajectory associated with the road segment (e.g., according to a three-dimensional spline representative of a predetermined target trajectory 8200) along a roadway 7900 where a construction area 8200*d* is located directly in front of vehicle 7902. Vehicle 7902 may receive from image capture devices 122 and 124 at least one environmental image including an image of construction area 8200*d*. Where the system intervenes to override one or more navigational maneuvers generated based on the road model in order to avoid construction area 8200*d*, navigational adjustment condition information may be stored. Such information may include, for example, the existence of a construction area 8200*d* (e.g., as depicted in one or more captured images). The navigational adjustment condition information may also be sent to a server (e.g. server 120) for a making one or more possible updates to sparse data model 800. In some embodiments, the navigational adjustment condition information may include a location of vehicle 7902 based on, for example, a position sensor 130 and/or a location of a known landmark relative to vehicle 7902 at the time of adjustment. The server side may analyze the received information (e.g., using automated image analysis processes) to determine whether any updates to sparse data model 800 are warranted based on the detected system intervention. In this example, due to the non-transient nature of the roadway construction (where non-transient may refer to a condition likely to exist longer than a predetermined period of time, including, for example, several hours, a day, a week, a month, or more), the server may determine to change or update the road model.

Figure 83:
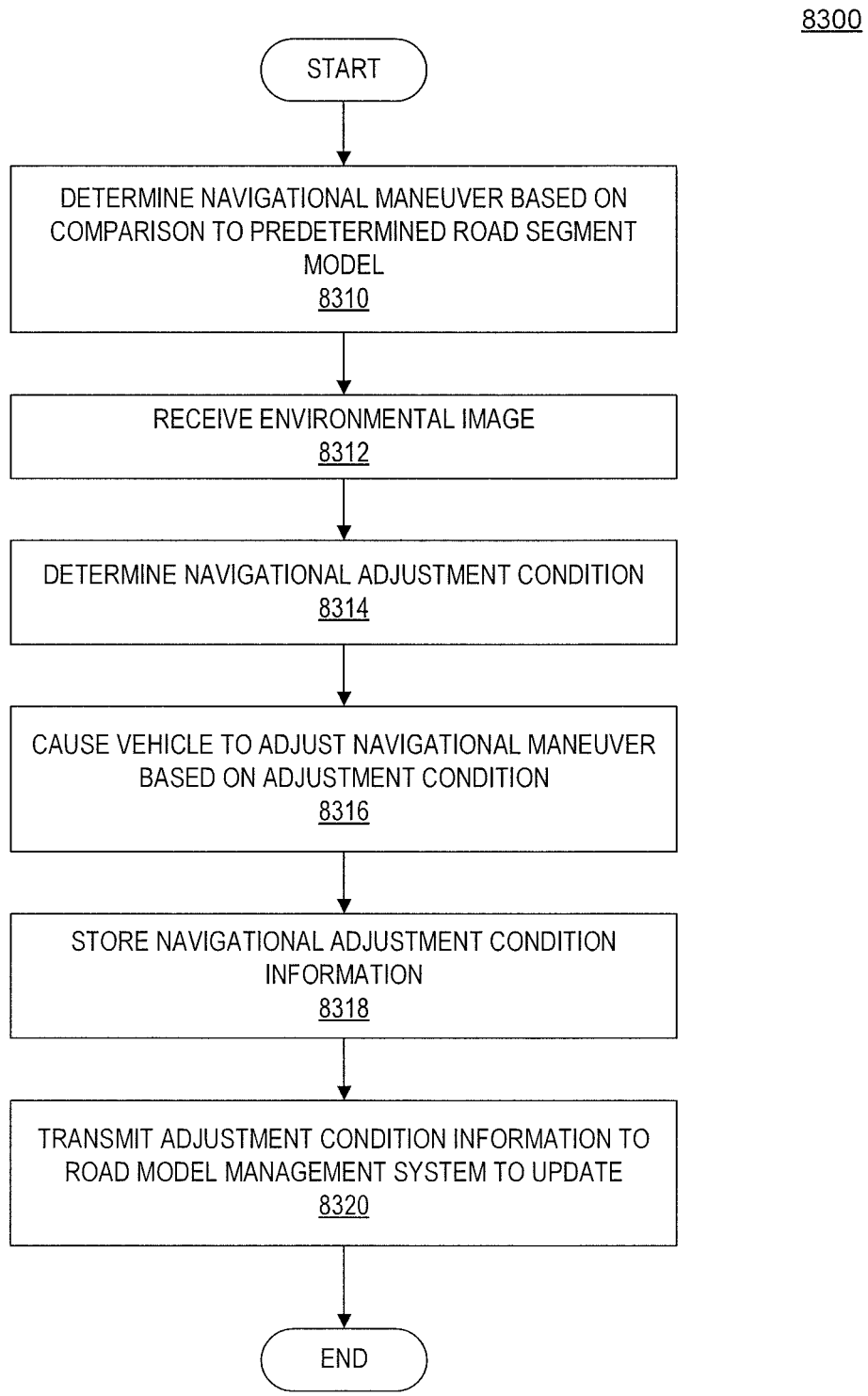
FIG. 83 illustrates an example flowchart representing a method for self-aware navigation of a vehicle consistent with the disclosed embodiments.

FIG. 83 illustrates an example flowchart representing a method for model adaptation based on self-aware navigation of a vehicle consistent with the disclosed embodiments. In particular, FIG. 83 illustrates a process 8300 that may be performed by processing unit 110 of system 100. As discussed below, process 8300 may use a road model defining a predetermined vehicle trajectory 8200. Where a maneuver deviates from navigational maneuvers developed based on the predetermined model vehicle trajectory 8200, the model and information regarding a navigational adjustment condition may be captured and stored and/or sent to a server (e.g., server 1230) for making a possible update to the road model.

At step 8310, processing unit 110 may determine a navigational maneuver based on a comparison of a vehicle position with respect to a predetermined model associated with a road segment. As discussed elsewhere in detail, a recognized landmark may be verified in the captured image and used to determine a position of the vehicle along a target trajectory for a particular road segment. Based on the determined position, the processing unit 110 may cause one or more navigational responses, for example, a navigational maneuver to maintain the vehicle (e.g., steer the vehicle) along the target trajectory.

At step 8312, processing unit 110 may receive an environmental image of an area forward of vehicle 7902. For example, processing unit 110 may receive an image of an environment of vehicle 7902 that includes a parked vehicle, a lane constraint having a road curvature or turning roadway radius r providing information indicative, for example, of a roadway lane ending, a pedestrian and/or construction area.

At step 8314, processing unit 110 may determine an existence of a navigational adjustment condition. The navigational adjustment condition may be determined responsive to an analysis of at least one environmental image of an area forward of vehicle 7902 and may include, for example, a parked car in front of vehicle 7902*a*, a roadway curvature having turn radius r providing information indicative, for example, of construction area in lane 7910. These are, of course, examples, and the captured images may include any of a multitude of conditions within an environment of the vehicle that may warrant an adjustment in navigation away from a target trajectory included in sparse data model 800.

At step 8316, processing unit 110 may cause vehicle 7902 to adjust the navigational maneuver based on the navigational adjustment condition. For example, processing unit 110 may cause vehicle 7902 to change heading directions away from a direction of the target trajectory in order to avoid a parked car, a road construction site, a pedestrian, etc. Consistent with the disclosed embodiments, instructions may be sent to a throttling system 220, braking system 230, and/or steering system 240 in order to cause the adjustment to one or more navigational maneuvers generated based on sparse data model 800.

At step 8318, processing unit 110 may store information relating to the navigational adjustment condition information into memory 140 or 150 of system 100. Such information may include one or more images captured of the environment of the vehicle at the time of the navigational adjustment that resulted in a departure from the target trajectory of sparse data model 800. The information may also include a position of the vehicle, outputs of one or more sensors associated with the vehicle, etc.

At step 8320, processing unit 110 may transmit the navigational adjustment condition information to a road model management system (e.g., server 1230) for analysis and for potentially updating a predetermined model representative of the roadway.

Adaptive Road Model Manager

In some embodiments, the disclosed systems and methods may provide an adaptive road model manager. The adaptive road model manager may be provided by a server (e.g., server 1230), which may receive data from vehicles and decide whether or not to make an update to the road model if an adjustment from an expected vehicular navigational maneuver was not due to a transient condition. The vehicles may send data to the server regarding navigational departures from the road model using a wireless data connection over one or more networks (e.g., including over a cellular network and/or the Internet). For example, the server may receive from each of a plurality of autonomous vehicles navigational situation information associated with an occurrence of an adjustment to a determined navigational maneuver. The server may analyze the navigational situation information and determine, based on the analysis of the navigational situation information, whether the adjustment to the determined navigational maneuver was due to a transient condition. In some embodiments, the server may detect the navigational maneuver from raw data provided by the vehicle (e.g., by processing image data). The server may update the predetermined model representative of the at least one road segment if the adjustment to the determined navigational maneuver was not due to a transient condition. As discussed herein, a transient condition is any condition expected to change after a predetermined time period (e.g., less than a few hours, a day, or a week or more) such that an update to a road model is not warranted or desirable. Such transient conditions may be expected to no longer be present after the predetermined time period and therefore the server may determine to not change or update to the road model. Conversely, if the server determines the adjustment was not due to a transient condition, the server may determine to update the road model.

In some embodiments, when a navigational maneuver is detected, the server may mark the respective area of the road model as being associated with a suspected change. The server may then determine from further updates from the same location or a nearby location (e.g., in some embodiments, "'pulling" such updates from vehicles at the location or nearby the location), and may process the data in an attempt to verify the change. When the change is verified, the server may update the model, and may subsequently communicate the updated model of the respective area, replacing the former version of the model. The server may implement a confidence level such that the update occurs when the confidence level is above a certain level. The confidence level may be associated with the type of maneuver, the similarity between two or more maneuvers, identification of a source of the adjustment, a frequency of consistent updates, and the number of ratio of inconsistent updates, environmental conditions, such as weather, urban vs. rural environments, etc. The severity of the cause of the maneuver may also be taken into account when determining the confidence level. If the maneuver is severe (e.g., a sharp turn) and the cause may be associated with a potential weather situation and, in some embodiments, a less restrictive approval process can may be used.

FIG. 84A illustrates a plan view of a vehicle traveling on a roadway with multiple parked cars consistent with the disclosed embodiments. As shown, vehicle 7902a is traveling according to a target trajectory (e.g., a three-dimensional spline representative of a predetermined path of travel 8400) of a road model along roadway 7900 where another vehicle 7902c is parked directly in front of vehicle 7902a. Roadway 7900 may be subdivided into lanes, such as lanes 7910 and 7920. Where either the system or user intervenes to override a navigational maneuver generated based on the road model and adjust a maneuver of the vehicle 7902 traveling along path 8400 in lane 7910 to avoid parked vehicles 7902c, navigational situation information including, for example, the existence of parked cars 7902c in lane 7910 (e.g., as depicted in one or more images captured by an image captured device of vehicle 7902a) may be may be sent to a server (e.g., server 1230) for analysis.

Figure 85A:
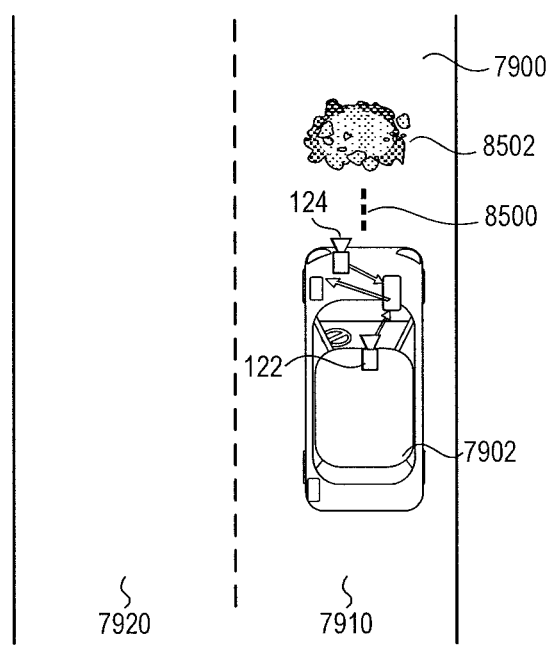
FIG. 85A illustrates a plan view of a vehicle traveling on a roadway with a pot hole directly in front of the vehicle consistent with the disclosed embodiments.
Figure 85B:
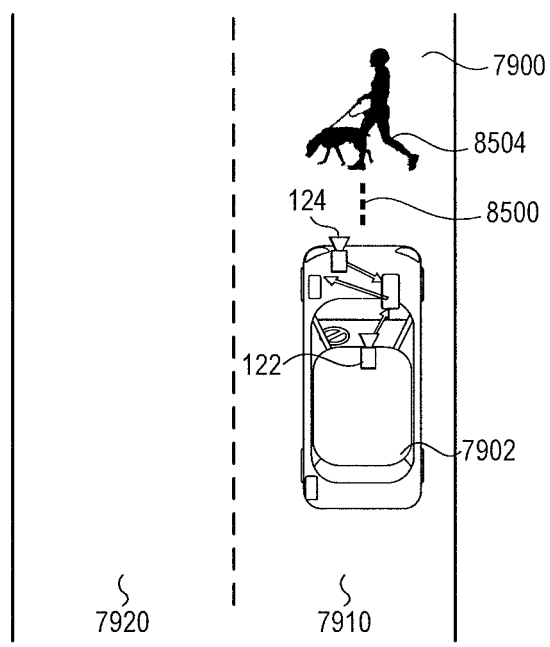
FIG. 85B illustrates a plan view of a vehicle traveling on a roadway with an animal and a pedestrian crossing in front of a vehicle consistent with the disclosed embodiments.

The server side may analyze the received information (e.g., using automated image analysis processes) to determine whether any updates to sparse data model 800 are warranted based on whether or not the adjustment was due to a transient condition. Where the adjustment was not due to the existence of a transient condition, the road model may be updated. For example, where an experienced condition is determined to be one likely to persist beyond a predetermined time threshold (e.g., a few hours, a day, or a week or more) updates may be made to the model. In some embodiments, the threshold for determining a transient condition may be dependent on a geographic region in which the condition is determined to occur, on an average number of vehicles that travel the road segment in which the condition was encountered, or any other suitable criteria. For example, in geographic regions, such as rural regions, that include fewer vehicles likely to encounter a road-related condition, a time threshold for making the transient or not transient determination may be longer that another geographic region (e.g., an urban environment) that includes more vehicles likely to encounter the road-related condition over a particular time period. That is, as the average number of vehicles traveling a road segment increases, the time threshold for making the transient determination may be lower. Such an approach may reduce the number of cars traveling in an urban environment that will need to rely upon their internal systems (camera, sensors, processor, etc.) to recognize a road condition that warrants a navigational response different from one expected based on sparse model 800. At the same time, a longer transient time threshold in lower trafficked areas may reduce the likelihood that the model is changed to account for an experienced road condition and, a short time later (e.g., within hours, a day, etc.) needs to be changed back to its original state, for example, after the experience road condition no longer exists. Conversely, where a navigational adjustment is determined to be in response to a transient condition, the server may elect to not make any updates to the road model. For example, where either the system or user intervenes to navigate the vehicle 7902a into lane 7920 to avoid vehicles 7902c parked on the shoulder yet abutting into lane 7910 (FIG. 84A), where ith the system or user navigates the host vehicle to avoid an intervening car 7902d (FIG. 84B), wherein the system or user navigates the host vehicle to avoid a temporary barrier 8402 (such as a fallen tree, as shown in FIG. 84C), or where the system or user navigates the host vehicle to avoid markers 8200d designating temporary roadwork (FIG. 84D), where the system or user navigates the host vehicle to avoid a pothole 8502 present in the roadway (FIG. 85A), where the system or user navigates the host vehicle to avoid a pedestrian 8504 or pedestrian in the roadway (FIG. 85B), the server may determine in each case that the experienced condition constitutes a transient condition not warranting an update to sparse data model 800.

In some cases, and as described above, certain road conditions may be classified as transient based on a determination of a probable time of their existence (less than a few hours, a day, a week, etc.). In other cases, a determination of whether a certain road condition is a transient one may be based on factors other than or in addition to time. For example, in the case of a pothole captured in one or more images, the server (or the processing unit associated with a host vehicle) may determine a depth of the pothole, which may aid in determining whether the pothole represents a transient condition and, therefore, whether sparse data model 800 should be updated in view of the pothole. If the pothole 8502 is determined to have a depth that could result in potential damage to the host vehicle if driven through (e.g., a depth on the order of greater than 3 cm, 5 cm, 10 cm or more), then the pothole may be categorized as non-transient. Similarly, if the pothole 8502 is located in a geographic region in which road repair is known to be somewhat slow (e.g., requiring more than a day to repair, a week to repair, or longer), then a pothole may be categorized as non-transient.

Determination of whether a particular road condition constitutes a transient condition may be fully automated and performed by one or more server-based systems. For example, in some embodiments, the one or more server based systems may employ automated image analysis techniques based on one or more images captured by cameras onboard a host vehicle. In some embodiments, the image analysis techniques may include machine learning systems trained to recognize certain shapes, road features, and/or objects. For example, the server may be trained to recognized in an image or image stream the presence of a concrete barrier (possibly indicating the presence of a non-transient construction or lane separation condition), a pothole in the surface of the road (a possible transient or non-transient condition depending on the size, depth, etc.), a road edge intersecting with an expected path of travel (potentially indicating a non-transient lane shift or new traffic pattern), a parked car (a potentially transient condition), an animal shape in the road (a potentially transient condition), or any other relevant shapes, objects, or road features.

The image analysis techniques employed by the server may also include a text recognition component to determine a meaning associated with text present in an image. For example, where text appears in one or more uploaded images from an environment of a host vehicle, the server may determine whether text exists in the images. If text exists, the server may use techniques such as optical character recognition to assist in determining whether the text may relate to a reason that a system or user of a host vehicle caused a navigational maneuver differing from that expected based on sparse model 800. For example, where a sign is identified in an image, and the sign is determined to include the text "NEW TRAFFIC PATTERN AHEAD," the text may assist the server in determining that the experienced condition had a non-transient nature. Similarly, signs such as "ROAD CLOSED AHEAD" or "BRIDGE OUT" may also help indicate the presence of a non-transient condition for which an update to sparse road model 800 may be justified.

The server-based system may also be configured to take into account other information when determining whether an experienced road condition is transient. For example, the server may determine an average number of vehicles that travel a road segment over a particular amount of time. Such information may be helpful in determining the number of vehicles a temporary condition is likely to affect over an amount of time that the condition is expected to persist. Higher numbers of vehicles impacted by the condition may suggest a determination that the sparse data model 800 should be updated.

In some embodiments, determination of whether a particular road condition constitutes a transient condition may include at least some level of human assistance. For example, in addition to the automated features described above, a human operator may also be involved in reviewing information uploaded from one or more vehicles and/or determining whether sparse data model 800 should be updated in view of the received information.

Figure 86:
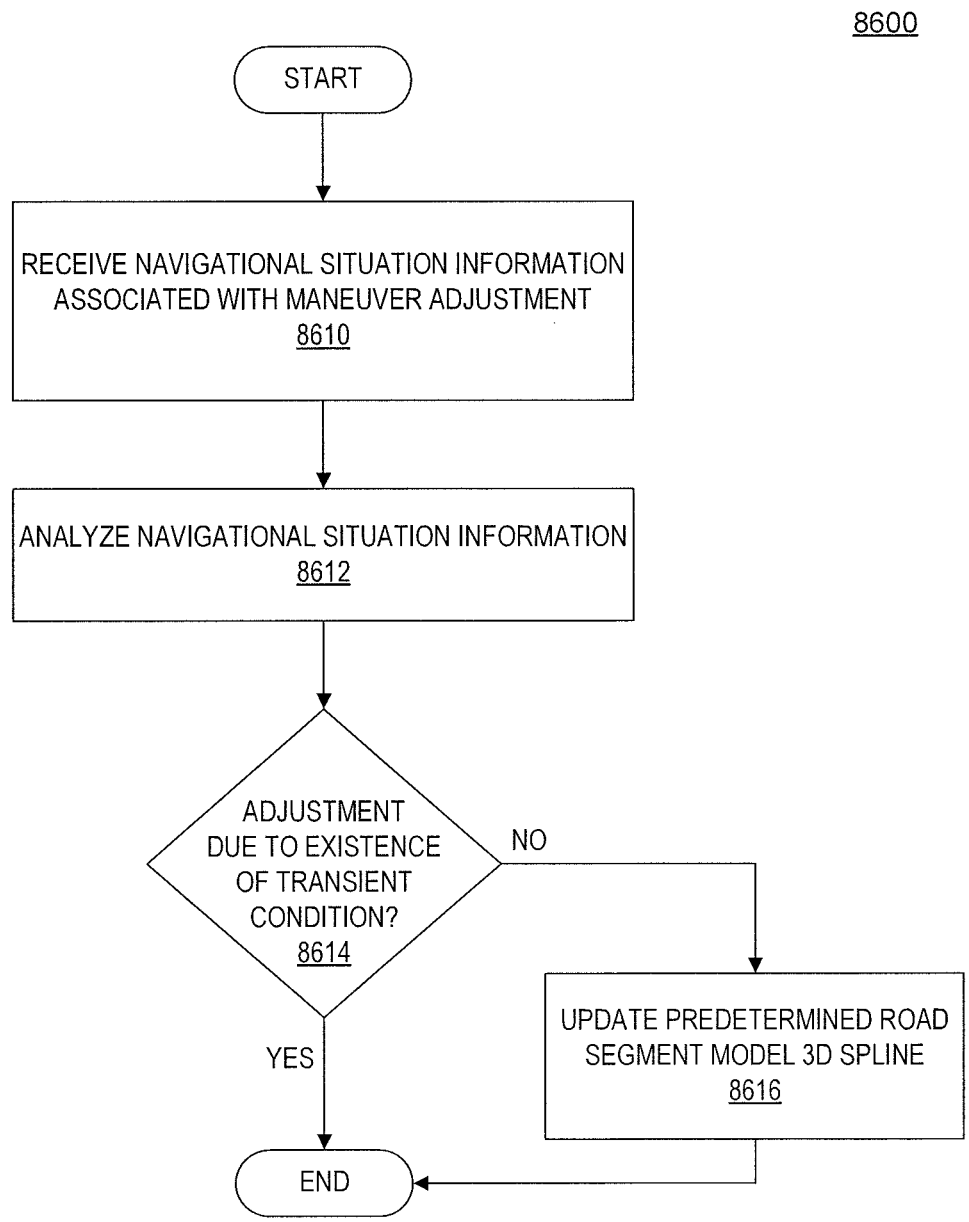
FIG. 86 illustrates an example flowchart representing a method for an adaptive road model manager consistent with disclosed embodiments.

FIG. 86 illustrates an example flowchart representing a method for an adaptive road model manager consistent with disclosed embodiments. In particular, FIG. 86 illustrates a process 8600 for an adaptive road model manager consistent with disclosed embodiments. Steps of process 8600 may be performed by a server (e.g., server 1230), which may receive data from a plurality of autonomous vehicles over one or more networks (e.g., cellular and/or the Internet, etc.).

At step 8610, the server may receive from each of a plurality of autonomous vehicles navigational situation information associated with an occurrence of an adjustment to a determined navigational maneuver. The navigational situation information may result from system or user invention overriding the road model. The navigational situation information may include at least one image or a video representing an environment of vehicle 7902. In some embodiments, the navigational situation information may further include a location of vehicle 7902 (e.g., as determined by position sensor 130 and/or based on a distance of vehicle 7902 to a recognized landmark).

At step 8612, the server may analyze the navigational situation information. For example, the server side may analyze the received information (e.g., using automated image analysis processes) to determine what is depicted in the at least one image or video representing an environment of vehicle 7902. This analysis may include identification of the existence of, for example, a parked car, an intervening car, a temporary barrier, such as a fallen tree directly in front of a vehicle, roadwork, a low light condition, a glare condition, a pothole, an animal, or a pedestrian.

At step 8614, the server may determine, based on the analysis of the navigational situation information, whether the adjustment to the determined maneuver was due to a transient condition. For example, A transient condition may include where a second vehicle is parked directly in front of a vehicle, a vehicle intervenes directly in front of vehicle, barrier, such as a fallen tree lies directly in front of a vehicle, a low light condition, a glare condition, a pothole (e.g., one of a minimal depth), an animal, or a pedestrian.

At step 8616, process 8600 may include the server updating the predetermined model representative of the at least one road segment if the adjustment to the determined navigational maneuver was not due to a transient condition. For example, a condition that may be non-transient may include a substantial pothole, long-term and/or extensive roadwork, etc. This update may include an update to the three-dimensional spline representing a predetermined path of travel along at least one road segment.

Road Model Management Based on Selective Feedback

In some embodiments, the disclosed systems and methods may manage a road model based on selective feedback received from one or more vehicles. As discussed in earlier sections, the road model may include a target trajectory (e.g., a three-dimensional spline representing a predetermined path of travel along a road segment). Consistent with disclosed embodiments, a server (e.g., server 1230) may selectively receive road environment information from autonomous vehicles in order to update the road model. As used herein, road environment information may include any information related to an observable or measurable condition associated with a road or a road segment. The server may selectively receive the road environment information based on a variety of criteria. Relative to the disclosed embodiments, selectively receiving information may refer to any ability of a server based system to limit data transmissions sent from one or more autonomous vehicles to the server. Such limitations placed on data transmissions from the one or more autonomous vehicles may be made based any suitable criteria.

For example, in some embodiments, the server may limit a frequency at which road environment information is uploaded to the server from a particular vehicle, from a group of vehicles, and/or from vehicles traveling within a particular geographic region. Such limitations may be placed based on a determined model confidence level associated with a particular geographic region. In some embodiments, the server may limit data transmissions from autonomous vehicles to only those transmissions including information suggesting a potential discrepancy with respect to at least one aspect of the road model (such information, for example, may be determined as prompting one or more updates to the model). The server may determine whether one or more updates to the road model are required based on the road environment information selectively received from the autonomous vehicles and may update the road model to include the one or more updates. Examples of a server selectively receiving road environment information from autonomous vehicles are discussed below.

FIG. 87A illustrates a plan view of a vehicle traveling on an interstate roadway consistent with the disclosed embodiments. As shown, vehicle 7902 is traveling along a predetermined path of travel 8700 (e.g., a target trajectory according to a road model) associated with interstate roadway 7900. As shown, roadway 7900 may be subdivided into lanes, such as lanes 7910 and 7920. The server may selectively receive road environment information based on navigation by vehicle 7902 through a road environment, such as roadway 7900. For example, the road environment information may include one or more images captured by an image capture device of vehicle 7902; location information representing a position of vehicle 7902 determined by, for example, using position sensor 130 and/or based on a position of vehicle 7902 relative to a recognized landmark; outputs from one or more sensors associate with vehicle 7902, etc. Based upon the road environment information, the server may determine whether updates to the road model are required.

In the example shown in FIG. 87A, a single particular vehicle 7902 is shown traveling along an interstate roadway 7900 and following a target trajectory 8700. FIG. 87B illustrates a plan view of a group of vehicles 7902e, 7902f, 7902g, and 7902h traveling along a city roadway 7900 and following target trajectories 8700a and 8700b that may be associated with lanes 7910 and 7920 of roadway 7900, for example. FIG. 87C illustrates a plan view of a vehicle 7902i traveling within a rural geographic region 8722 on roadway 7900. FIG. 87D illustrates a vehicle 7902 traveling on a roadway 7900 including a newly modified traffic pattern. For example, where once lane 7910 may have extended forward of vehicle 7902, a new traffic pattern may exist where lane 7910 now comes to an end forward of vehicle 7902.

Information relating to the navigation of vehicle 7902 in any of these situations, among others, may be collected and uploaded to one or more server based systems that maintain sparse data map 800. Based on the received information, the server may analyze whether one or more updates are needed to sparse data map 800 and, if an update is determined to be justified, then the server may make the update to sparse data map 800. In some embodiments, the analysis and updating may be performed automatically by the server via automated image analysis of images captured by cameras aboard vehicle 7910, automated review of sensor and position information, automated cross-correlation of information received from multiple autonomous vehicles, etc. In some embodiments, an operator associated with the server-based system may assist in review of the information received from the autonomous vehicles and determination of whether updates to sparse data model 800 are needed based on the received information.

In some embodiments, the server may be configured to receive navigational information from all available autonomous vehicles. Further, this information may be uploaded to the server based on a predetermined protocol. For example, the information may be uploaded across a streaming data feed. Additionally or alternatively, the information may be uploaded to the server at a predetermined periodic rate (e.g., several times per second, once per second, once per minute, once every several minutes, once per hour, or any other suitable time interval). The information may also be uploaded to the server based on aspects of the vehicle's navigation. For example, navigational information may be uploaded from a vehicle to the server as the vehicle moves from one road segment to another or as the vehicle moves from one local map associated with sparse data map 800 to another.

In some embodiments, the server may be configured to selectively control the receipt of navigational information from one or more autonomous vehicle. That is, rather than receiving all available navigational information from all available autonomous vehicles, the server may restrict the amount of information it receives from one or more available autonomous vehicles. In this way, the server may reduce the amount of bandwidth needed for communicating with available autonomous vehicles. Such selective control of information flow from the autonomous vehicles and the server may also reduce an amount of processing resources required to process the communications incoming from the autonomous vehicles.

The selective control of information flow between the autonomous vehicles and the server may be based on any suitable criteria. In some embodiments, the selectivity may be based on the type of road that a vehicle is traversing. With reference to the example shown in FIG. 87A, vehicle 7902 is traversing an interstate, which may be a well-traveled road. In such situations, the server may have accumulated a significant amount of navigational information relating to the interstate road, its various lanes, the landmarks associated with the road, etc. In such circumstances, continuing to receive full information uploads from every vehicle that travels along the interstate roadway may not contribute to significant or further refinements of the road model represented in sparse data map 800. Therefore, the server may limit, or an autonomous vehicle traveling along a certain type of road or a particular road segment may limit, the amount or type of information uploaded to the server.

In some embodiments, the server may forego automatic information uploads altogether from vehicles traveling along a particular interstate roadway, a heavily traveled urban road, or any other road where sparse data model 800 is determined to require no additional refinements. Instead, in some embodiments, the server may selectively acquire data from vehicles traveling along such roads as a means for periodically confirming that sparse data map 800 remains valid along selected roadways. For example, the server may interrogate one or more vehicles determined to be traveling along an interstate, heavily traveled road segment, etc. to collect navigational information from the interrogated vehicle. This information may include information relating to a reconstructed trajectory of the vehicle along the roadway, a position of the vehicle on the roadway, sensor information from the vehicle, captured images from cameras onboard the vehicle, etc. Using this technique, the server may periodically monitor the state of a roadway and determine whether updates are needed to sparse data model 800 without unnecessary usage of data transmission and/or data processing resources.

In some embodiments, the server may also selectively control data flow from an autonomous vehicle based on the number of cars determined to be traveling within a group along a roadway. For example, where a group of autonomous vehicles (e.g., two or more vehicles) is determined to be traveling within a certain proximity of one another (e.g., within 100 meters, 1 km, or any other suitable proximity envelope), information upload may be restricted from any of the members of the group. For example, the server may restrict information transfer to only one member of the group, any subset of members of the group, one member of the group from each lane of the road, etc.

In some embodiments, the server may also selectively control data flow from an autonomous vehicle based on a geographic region. For example, some geographic regions may include road segments for which sparse data model 800 already includes refined target trajectories, landmark representations, landmark positions, etc. For example, in certain geographic regions (e.g., urban environments, heavily traveled roadways, etc.), sparse data model 800 may be generated based upon multiple traversals of various road segments by vehicles in a data collection mode. Each traversal may result in additional data relevant to road segments in a geographic region from which sparse data model 800 may be refined. In some cases, sparse data map 800 for certain geographic regions may be based upon 100, 1000, 10000 or more prior traversals of various road segments. In those regions, additional information received from one or more autonomous vehicles may not serve as a basis for further, significant refinements of sparse data model. Thus, the server may restrict uploads from vehicles traveling in certain geographic regions. For example, in some cases, the server may preclude all automatic transmissions of road data from vehicles traveling in selected geographic regions. In other cases, the server may enable transmission of data from only a portion of vehicles traveling in a certain geographic region (e.g., 1 of 2 vehicles, 1 of 5, 1 of 100, etc.). In other cases, the server may receive transmissions from only those vehicles in a geographic location that the server identifies and queries for updated road information. The server can use information received from any portion of the vehicles from a certain geographic region to verify and/or update any aspect of sparse data model 800.

In some embodiments, the server may also selectively control data flow from an autonomous vehicle based on a confidence level assigned to a particular local map, road segment, geographic region, etc. For example, like the geographic region example, certain road segments, local maps, and/or geographic regions may be associated with a confidence level indicative of, for example, a level of refinement of sparse data map 800 in those areas. The server may restrict transmission of road information from vehicles traveling on any roads, local map areas, or geographic regions associated with a confidence level above a predetermined threshold. For example, in some cases, the server may preclude all automatic transmissions of road data from vehicles traveling in regions with a confidence level above a predetermined threshold. In other cases, the server may enable transmission of data from only a portion of vehicles traveling in those regions (e.g., 1 of 2 vehicles, 1 of 5, 1 of 100, etc.). In other cases, the server may receive transmissions from only those vehicles in a high-confidence area (one including a confidence level above a predetermined threshold) that the server identifies and queries for updated road information. The server can use information received from any portion of the vehicles from a high-confidence level region to verify and/or update any aspect of sparse data model 800.

In some embodiments, the server may also selectively control data flow from an autonomous vehicle based on the type of information included within the navigational information to be uploaded by a particular autonomous vehicle. For example, in many cases, the road information uploaded to the server from various host vehicles may not significantly impact sparse data model 800. For example, in high-confidence level geographic areas or road segments etc., additional road information from traversing vehicles may be useful for verifying the continued accuracy of sparse data model 800, but such information may not offer a potential for additional significant refinements to sparse data model 800. Thus, continued transmission of information that verifies sparse data model 800, but does not offer a potential for significant further refinement of sparse data model 800 may consume data transmission and processing resources without a potential for significant benefit.

In such cases, it may be desirable for the server to limit data transmissions from vehicles. Instead of receiving data transmissions automatically from all (or even a part of) available vehicles, the server may restrict data transmissions from vehicles to only those experiencing situations that may impact sparse road model 800. For example, where a vehicle traversing a road segment experiences a situation that requires a navigational response that departs from one anticipated by the sparse data model 800 (e.g., where the vehicle must travel a path different from a target trajectory for a road segment), then the processing unit 110 may determine that such a departure has occurred and may relay that information to the server. In response, the server may query the vehicle for information relating to the navigational departure so that the server can determine whether any updates are needed to sparse data model 800. In other words, the server may elect to receive road information from vehicles only where the information suggests that a change may be needed to sparse data model 800.

Figure 88:
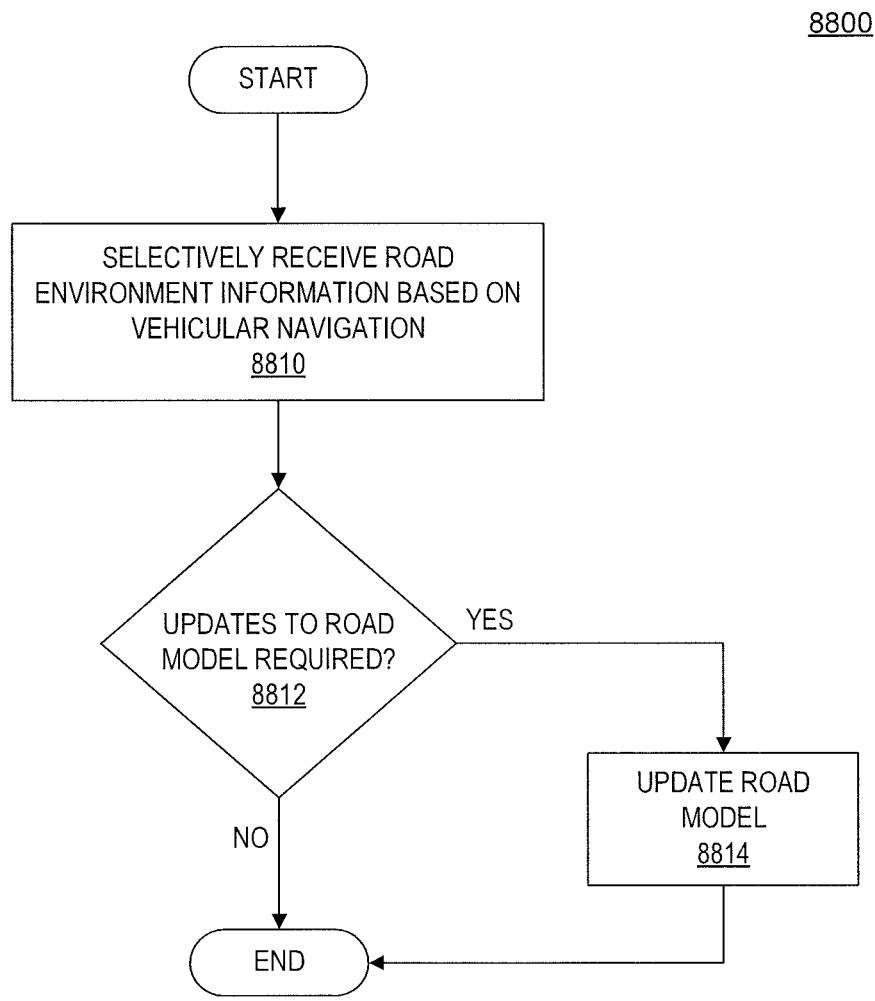

FIG. 88 illustrates an example flowchart representing a method for road model management based on selective feedback consistent with the disclosed embodiments. Steps of process 8800 may be performed by ae server (e.g., server 1230). As discussed below, process 8800 may involve selectively receiving feedback to potentially update the road model based upon road environment information from autonomous vehicles.

At step 8810, the server may selectively receive road environment information based on navigation from a plurality of autonomous vehicles through their respective road environments. For example, the server may selectively apply a limitation on a frequency of information transmissions received from a particular vehicle, from a group of vehicles, from vehicles traveling within a particular geographic region, or from vehicles based on a determined model confidence level associated with a particular geographic region. Further, in some embodiments, the server may selectively limit data transmissions from vehicles only to those transmissions that reflect a potential discrepancy with respect to at least one aspect of a predetermined road model.

At step 8812, the server may determine whether one or more updates to the road model are required based on the road environment information. If the server determines that updates to the road model are justified based on information selectively received from one or more autonomous vehicles, those updates may be made at step 8814.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for autonomously navigating a vehicle along a road segment, the system comprising:
    at least one processor programmed to:
        receive from a camera at least one image representative of an environment of the vehicle;
        analyze the at least one image to identify at least one recognized landmark, wherein the at least one recognized landmark is part of a group of recognized landmarks, and identification of the at least one recognized landmark is based, at least in part, upon one or more landmark group characteristics associated with the group of recognized landmarks;
        update a current location of the vehicle relative to a predetermined road model trajectory associated with the road segment based, at least in part, on a predetermined location of the recognized landmark; and
        determine an autonomous steering action for the vehicle based on a direction of the predetermined road model trajectory at the determined current location of the vehicle relative to the predetermined road model trajectory.

2. The system of claim 1, wherein the at least one recognized landmark includes at least one of a traffic sign, an arrow marking, a lane marking, a dashed lane marking, a traffic light, a stop line, a directional sign, a reflector, a landmark beacon, or a lamppost.

3. The system of claim 1, wherein the at least one recognized landmark includes a sign for a business.

4. The system of claim 1, wherein the predetermined road model trajectory includes a three-dimensional polynomial representation of a target trajectory along the road segment.

5. The system of claim 1, wherein the at least one processor is further programmed to determine a current location of the vehicle along the predetermined road model trajectory based on a vehicle velocity.

6. The system of claim 1, wherein the one or more landmark group characteristics include relative distances between members of the group of recognized landmarks.

7. The system of claim 1, wherein the one or more landmark group characteristics include an ordering sequence of members of the group of recognized landmarks.

8. The system of claim 1, wherein the one or more landmark group characteristics include a number of landmarks included in the group of recognized landmarks.

9. The system of claim 1, wherein identification of the at least one recognized landmark is based, at least in part, upon a super landmark signature associated with the group of recognized landmarks.

10. The system of claim 1, wherein the at least one processor is programmed to determine an autonomous steering action for the vehicle by comparing a heading direction of the vehicle to the predetermined road model trajectory at the determined current location of the vehicle.

11. A computer-implemented method for autonomously navigating a vehicle along a road segment, the method comprising the following operations performed by one or more processors:
    receiving from a camera at least one image representative of an environment of the vehicle;
    analyzing the at least one image to identify at least one recognized landmark, wherein the at least one recognized landmark is part of a group of recognized landmarks, and identification of the at least one recognized landmark is based, at least in part, upon one or more landmark group characteristics associated with the group of recognized landmarks;
    updating a current location of the vehicle relative to a predetermined road model trajectory associated with the road segment based, at least in part, on a predetermined location of the recognized landmark; and
    determining an autonomous steering action for the vehicle based on a direction of the predetermined road model trajectory at the determined current location of the vehicle relative to the predetermined road model trajectory.

12. The method of claim 11, wherein the at least one recognized landmark includes at least one of a traffic sign, an arrow marking, a lane marking, a dashed lane marking, a traffic light, a stop line, a directional sign, a reflector, a landmark beacon, or a lamppost.

13. The method of claim 11, wherein the at least one recognized landmark includes a sign for a business.

14. The method of claim 11, wherein the one or more landmark group characteristics include relative distances between members of the group of recognized landmarks.

15. The method of claim 11, wherein the one or more landmark group characteristics include an ordering sequence of members of the group of recognized landmarks.

16. A tangible and non-transitory computer-readable storage medium that comprises a set of instructions that are executable by at least one processor to cause the at least one processor to perform a method for autonomously navigating a vehicle along a road segment, the method comprising:
receiving from a camera at least one image representative of an environment of the vehicle;
analyzing the at least one image to identify at least one recognized landmark, wherein the at least one recognized landmark is part of a group of recognized landmarks, and identification of the at least one recognized landmark is based, at least in part, upon one or more landmark group characteristics associated with the group of recognized landmarks;
updating a current location of the vehicle relative to a predetermined road model trajectory associated with the road segment based, at least in part, on a predetermined location of the recognized landmark; and
determining an autonomous steering action for the vehicle based on a direction of the predetermined road model trajectory at the determined current location of the vehicle relative to the predetermined road model trajectory.

17. The tangible and non-transitory computer-readable storage medium of claim 16, wherein the at least one landmark includes at least one of a traffic sign, an arrow marking, a lane marking, a dashed lane marking, a traffic light, a stop line, a directional sign, a reflector, a landmark beacon, or a lamppost.

18. The tangible and non-transitory computer-readable storage medium of claim 16, wherein the at least one recognized landmark includes a sign for a business.

19. The tangible and non-transitory computer-readable storage medium of claim 16, wherein the one or more landmark group characteristics include relative distances between members of the group of recognized landmarks.

20. The tangible and non-transitory computer-readable storage medium of claim 16, wherein the one or more landmark group characteristics include an ordering sequence of members of the group of recognized landmarks.

21. The system of claim 1, wherein the one or more landmark group characteristics associated with the group of recognized landmarks include a relationship shared by members of the group of recognized landmarks.

22. The system of claim 1, wherein the one or more landmark group characteristics associated with the group of recognized landmarks include a spatial relationship between members of the group of recognized landmarks.

23. The system of claim 9, wherein the super landmark signature associated with the group of recognized landmarks is configured to enable recognition of members of the group of recognized landmarks.

24. The system of claim 9, wherein the super landmark signature associated with the group of recognized landmarks is configured to enable recognition of at least one of a number of landmarks include in the group of recognized landmarks, relative distances between members of the group of recognized landmarks, or an ordering sequence of members of the group of recognized landmarks.

25. The method of claim 11, wherein the one or more landmark group characteristics associated with the group of recognized landmarks include a relationship shared by members of the group of recognized landmarks.

26. The method of claim 11, wherein the one or more landmark group characteristics associated with the group of recognized landmarks include a spatial relationship between members of the group of recognized landmarks.

27. The tangible and non-transitory computer-readable storage medium of claim 16, wherein the one or more landmark group characteristics associated with the group of recognized landmarks include a relationship shared by members of the group of recognized landmarks.

28. The tangible and non-transitory computer-readable storage medium of claim 16, wherein the one or more landmark group characteristics associated with the group of recognized landmarks include a spatial relationship between members of the group of recognized landmarks.

* * * * *